FIG. 18    EXECUTION TIMER 900

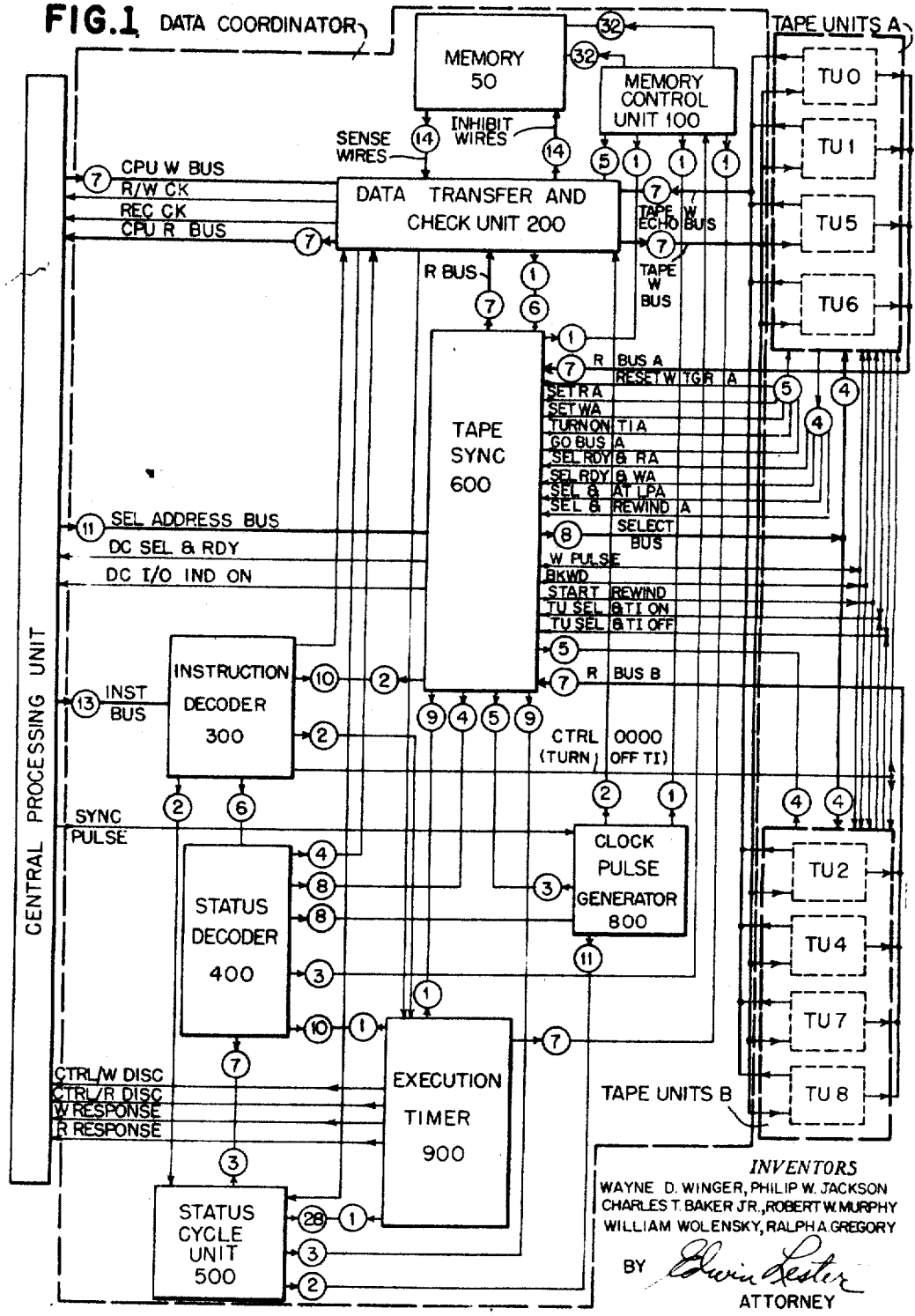

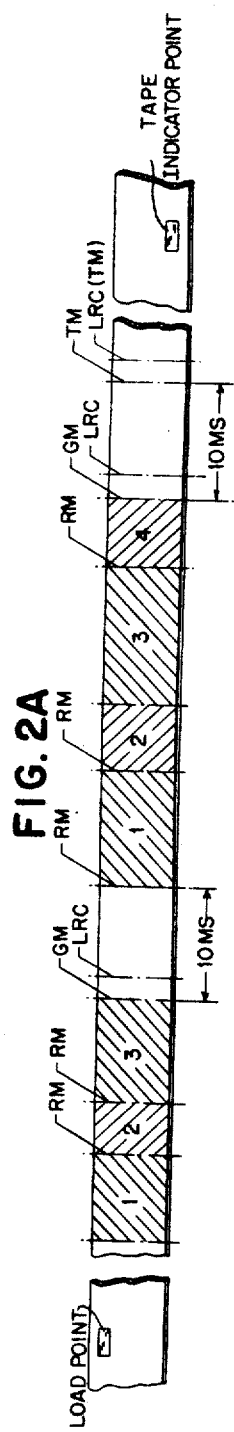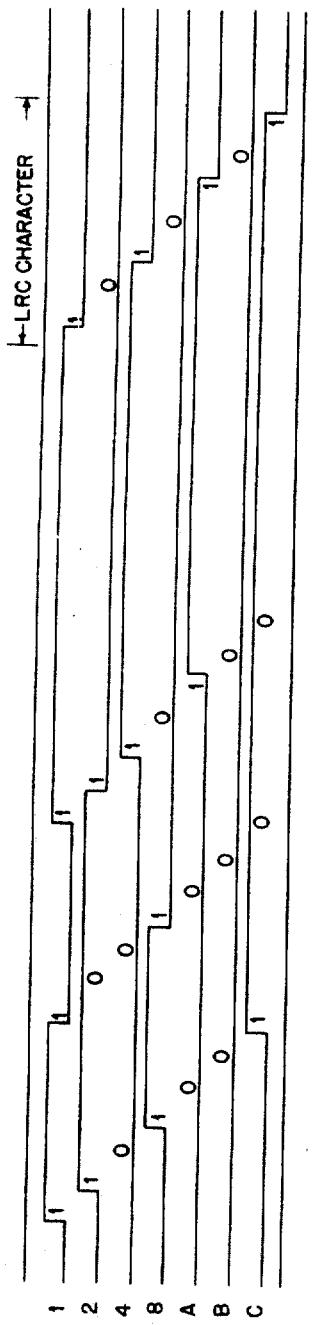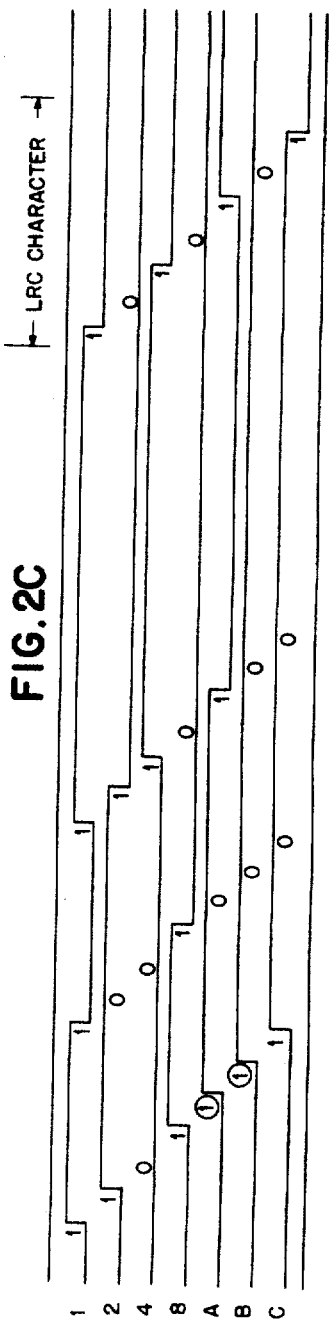

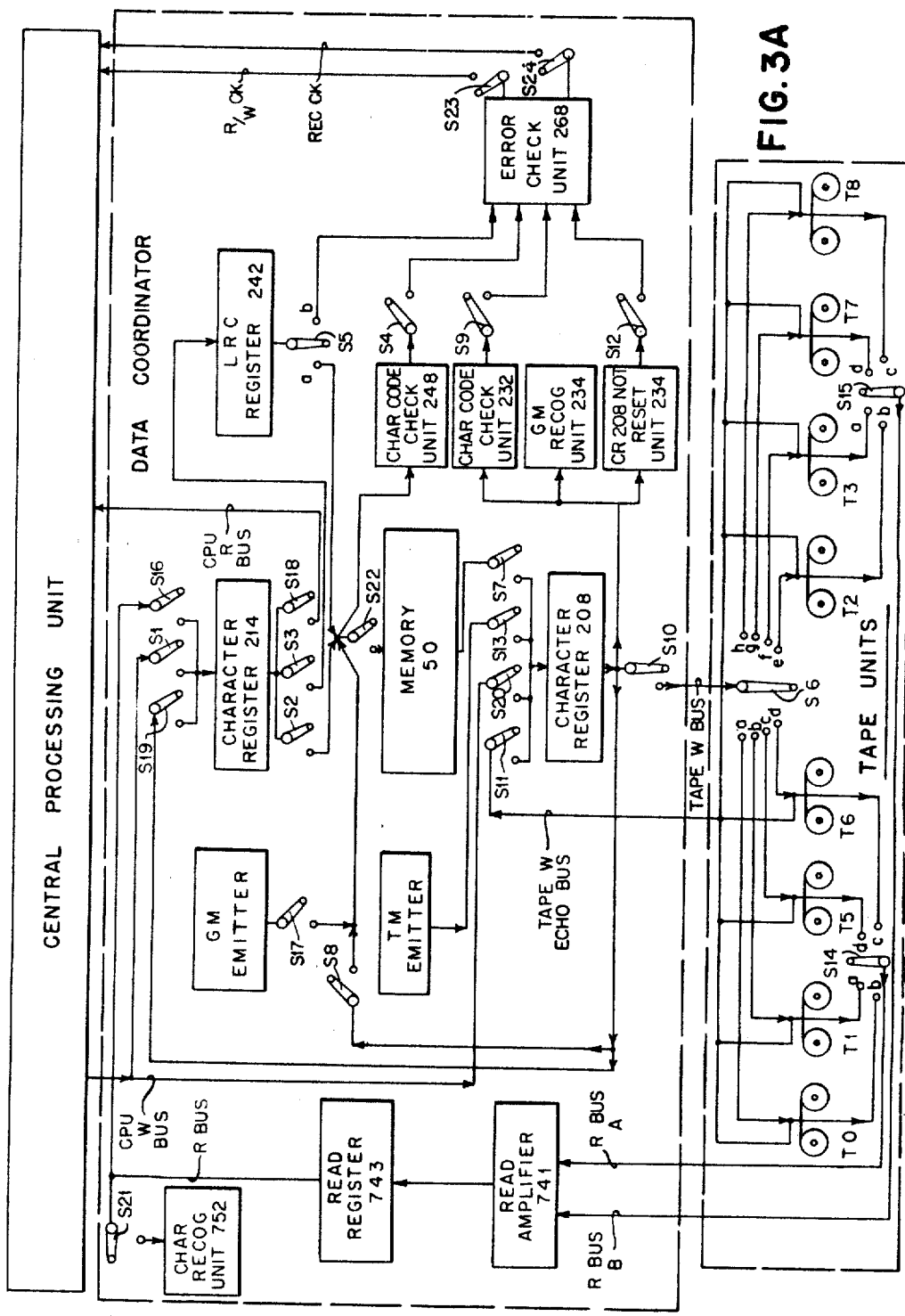

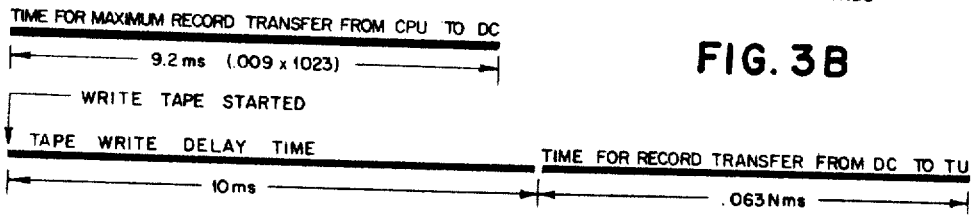
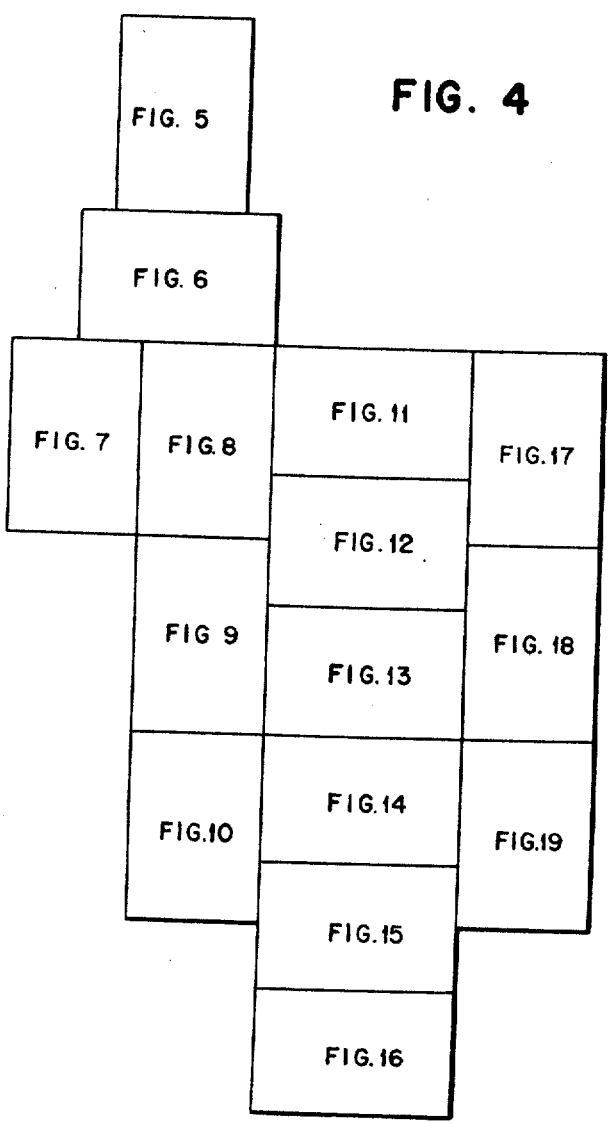

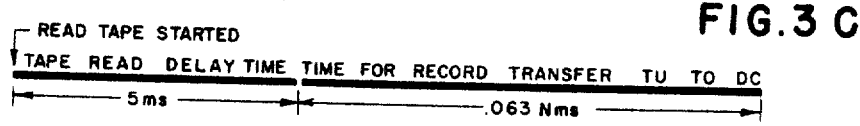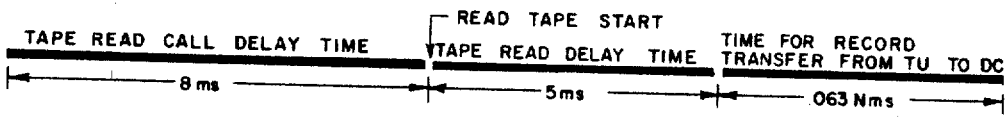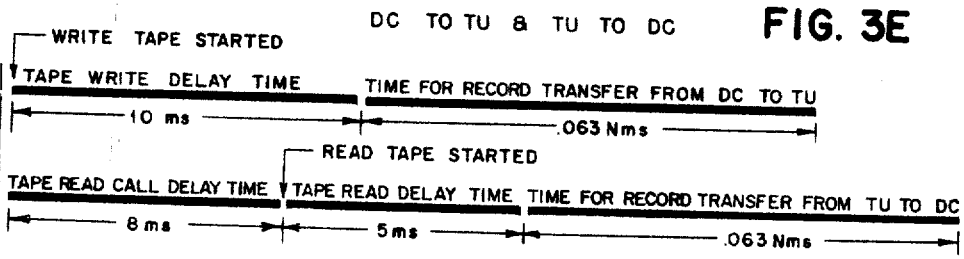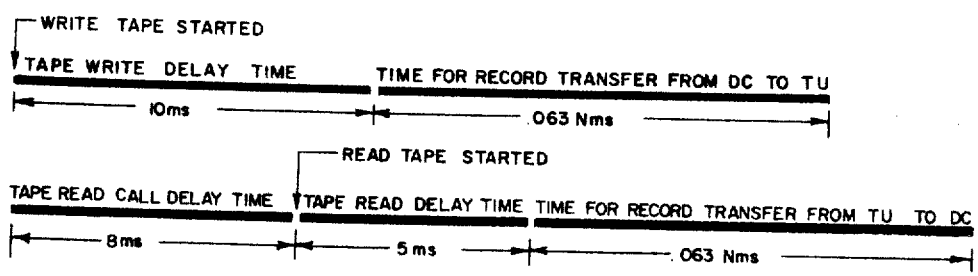

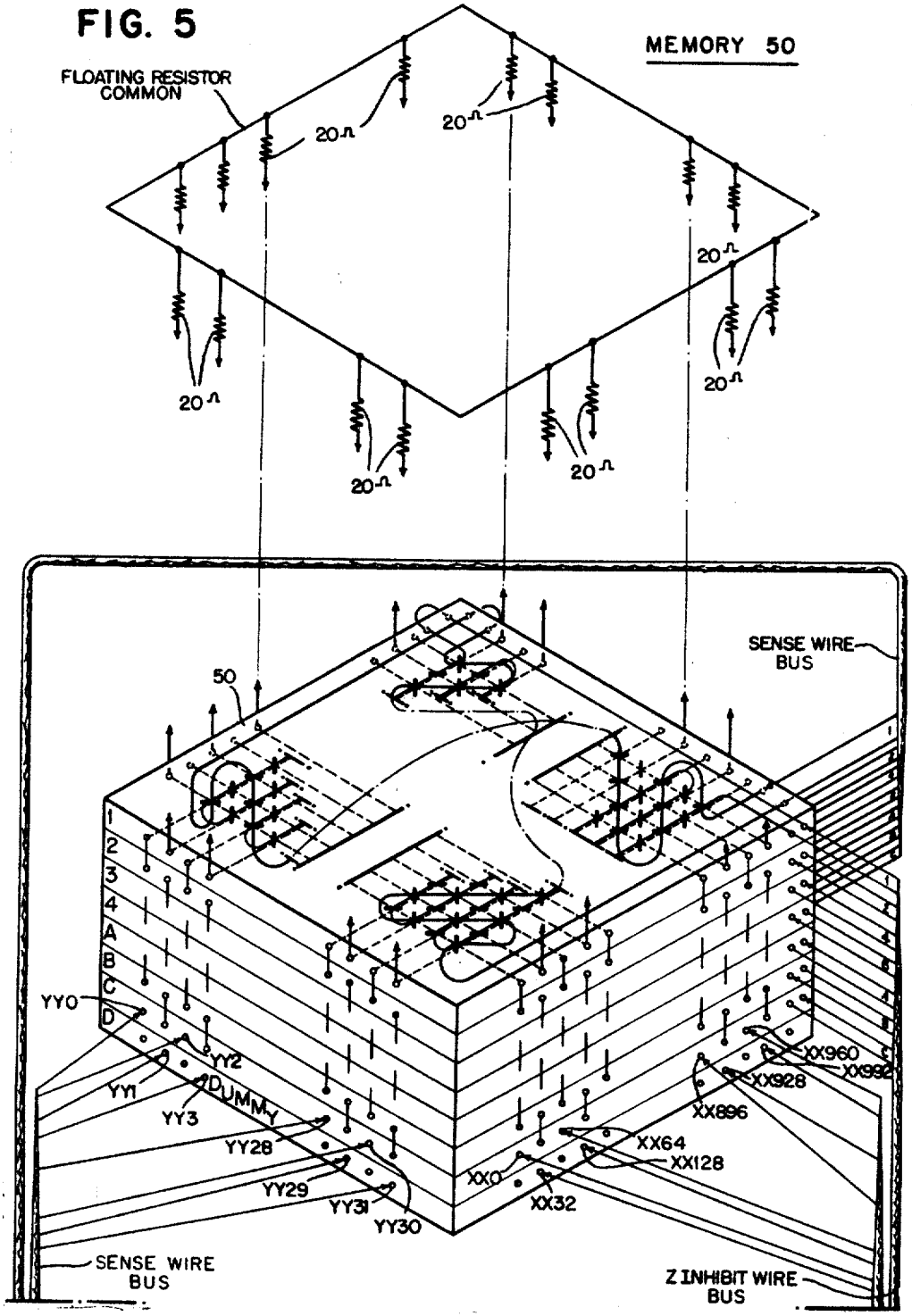

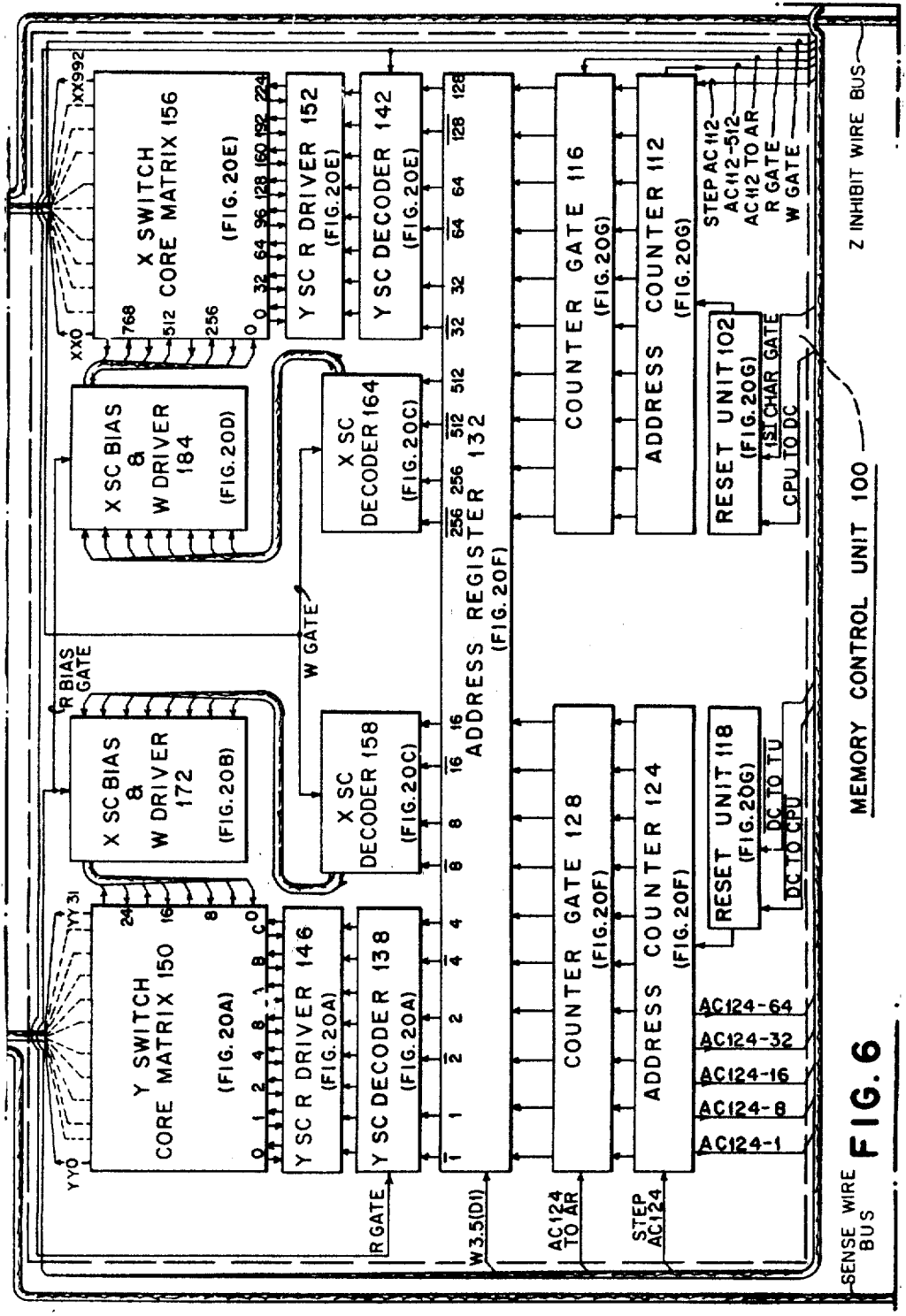

EXECUTION TIMER 900

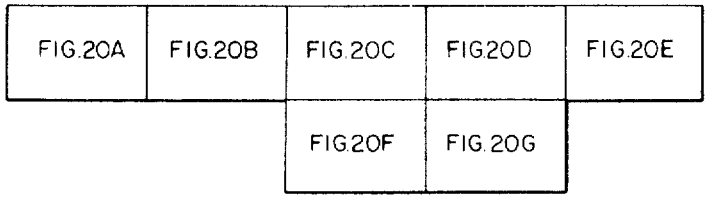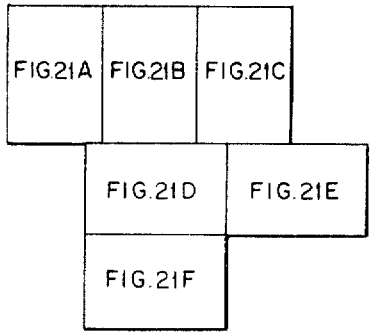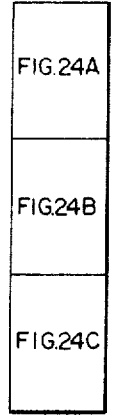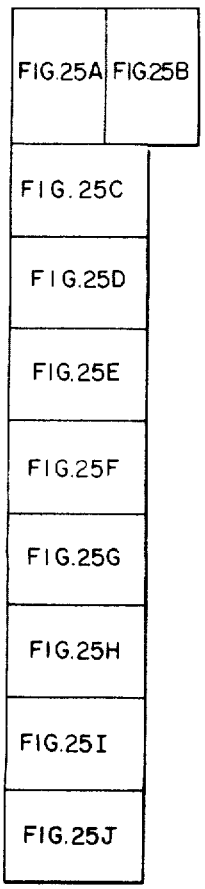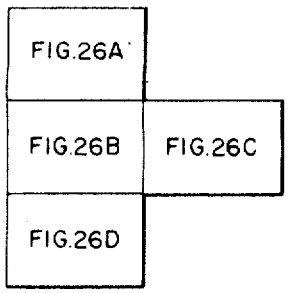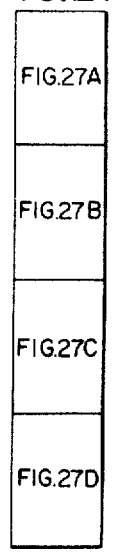

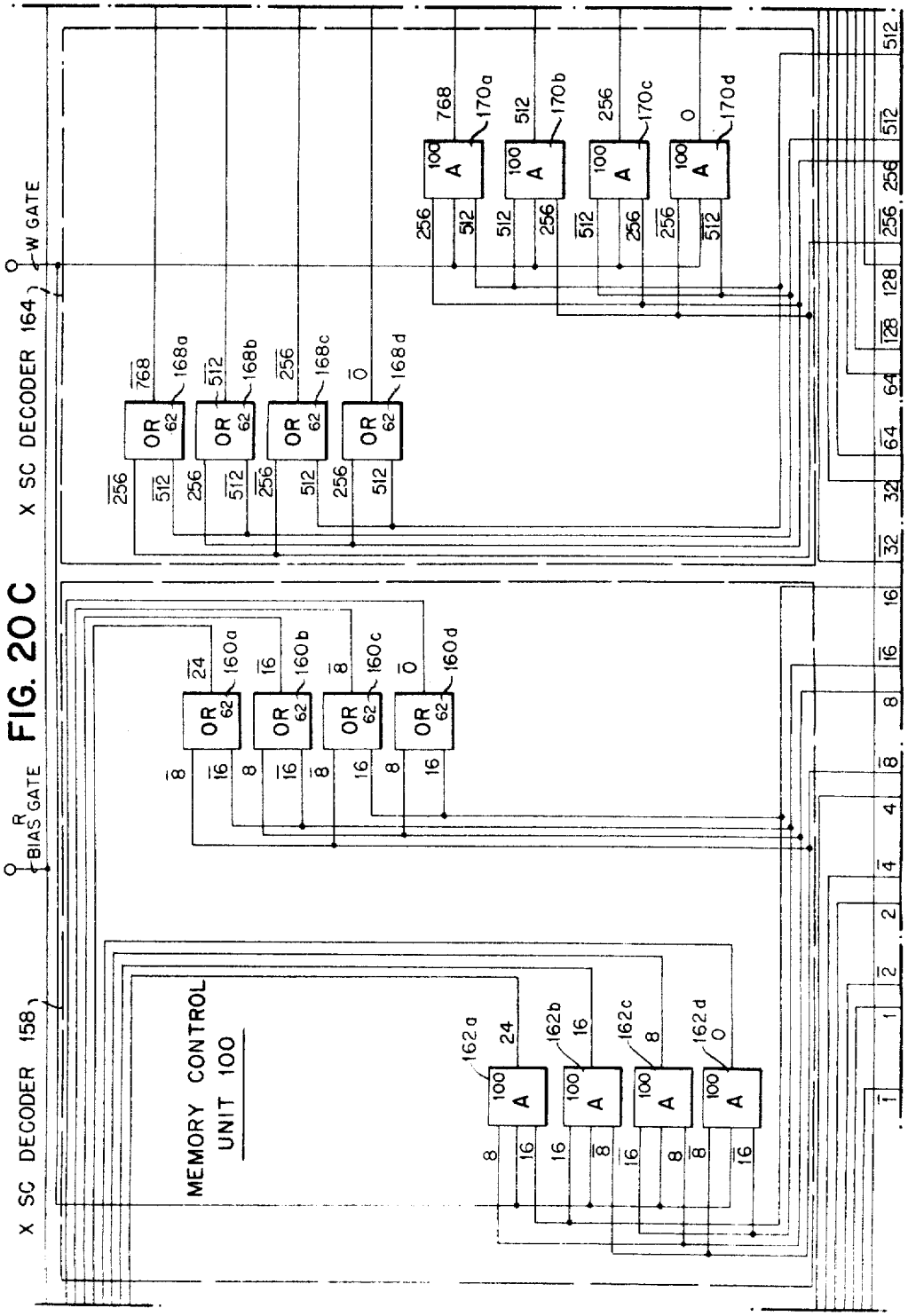

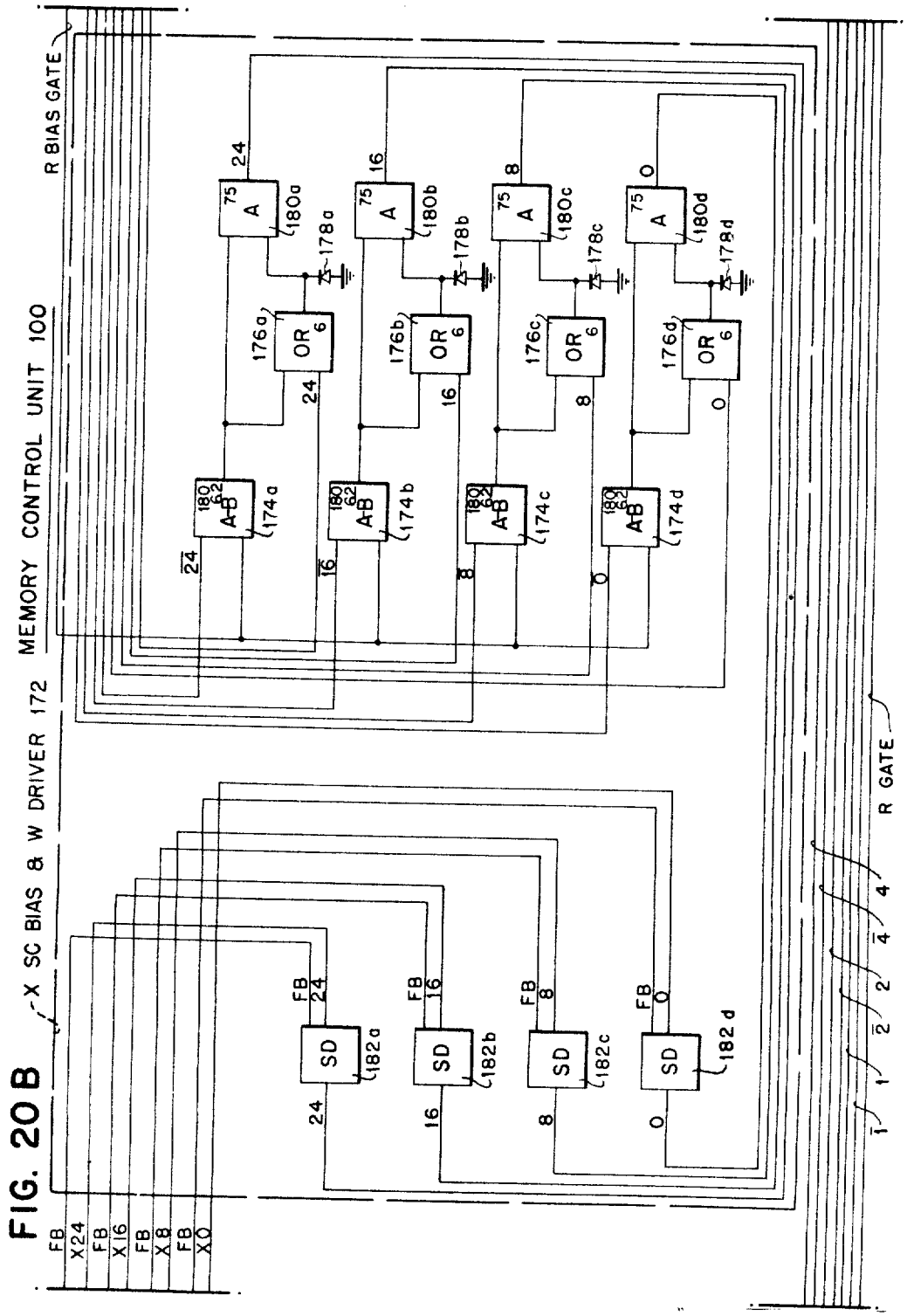

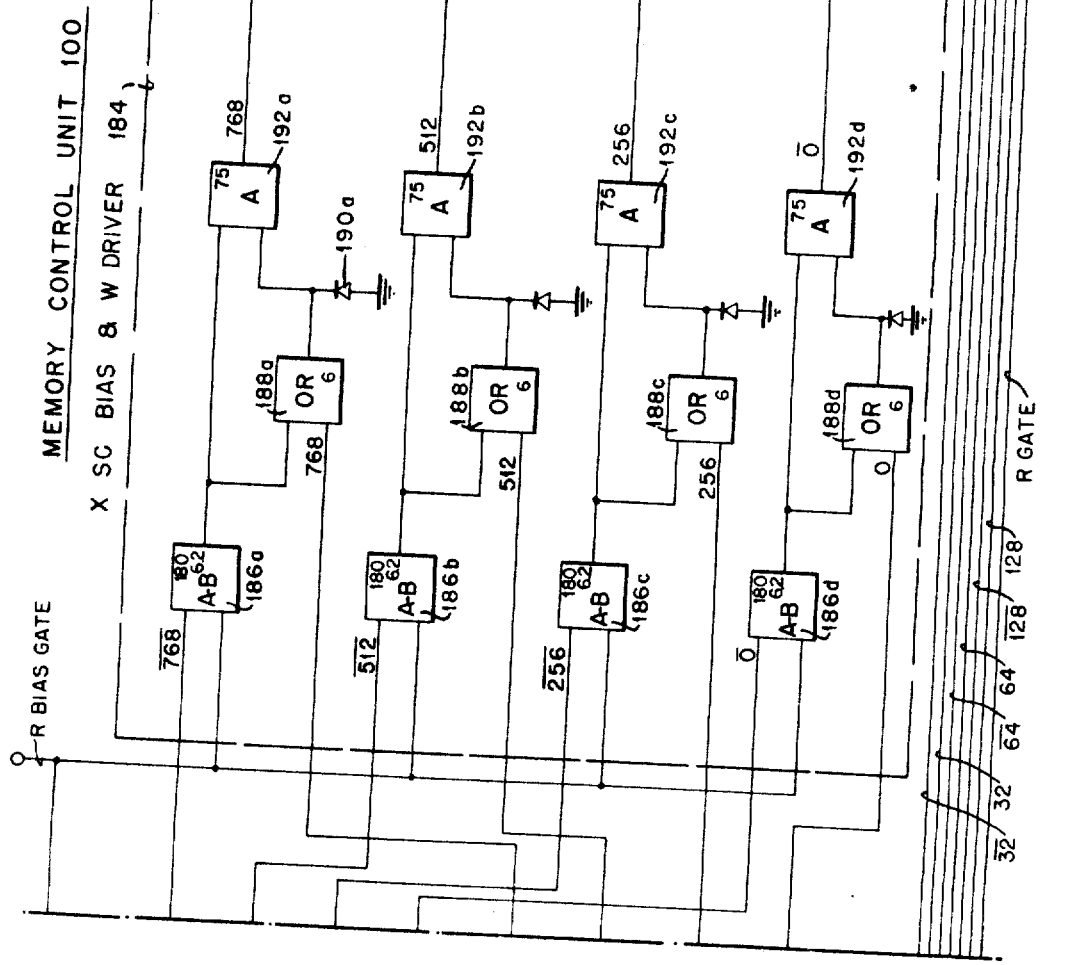

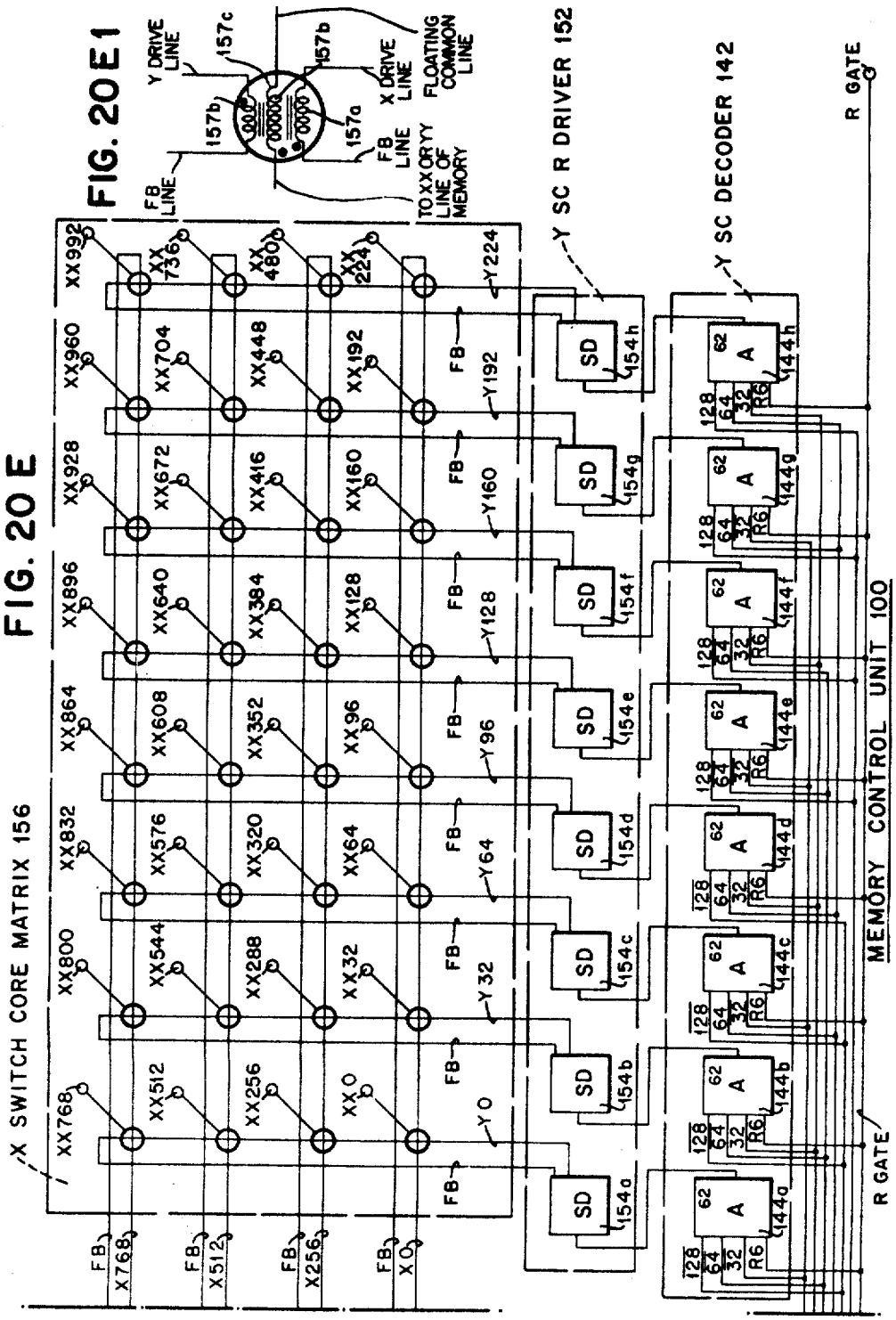

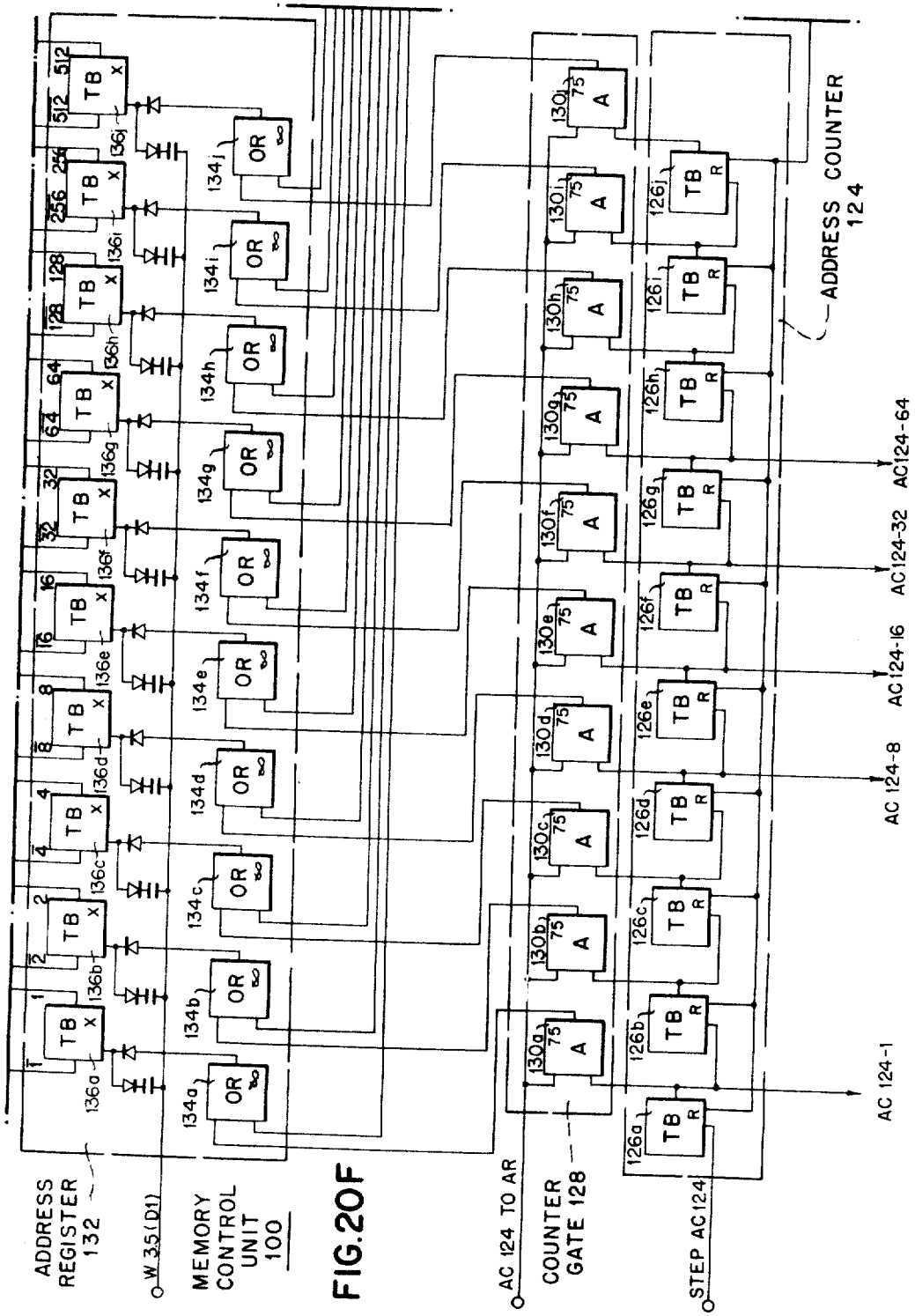

Nov. 15, 1960  R. A. GREGORY ET AL  2,960,683
DATA COORDINATOR
Filed June 20, 1956
90 Sheets-Sheet 28

Nov. 15, 1960  R. A. GREGORY ET AL  2,960,683
DATA COORDINATOR
Filed June 20, 1956  90 Sheets-Sheet 29

Nov. 15, 1960   R. A. GREGORY ET AL   2,960,683
DATA COORDINATOR

Filed June 20, 1956   90 Sheets-Sheet 32

FIG. 21D

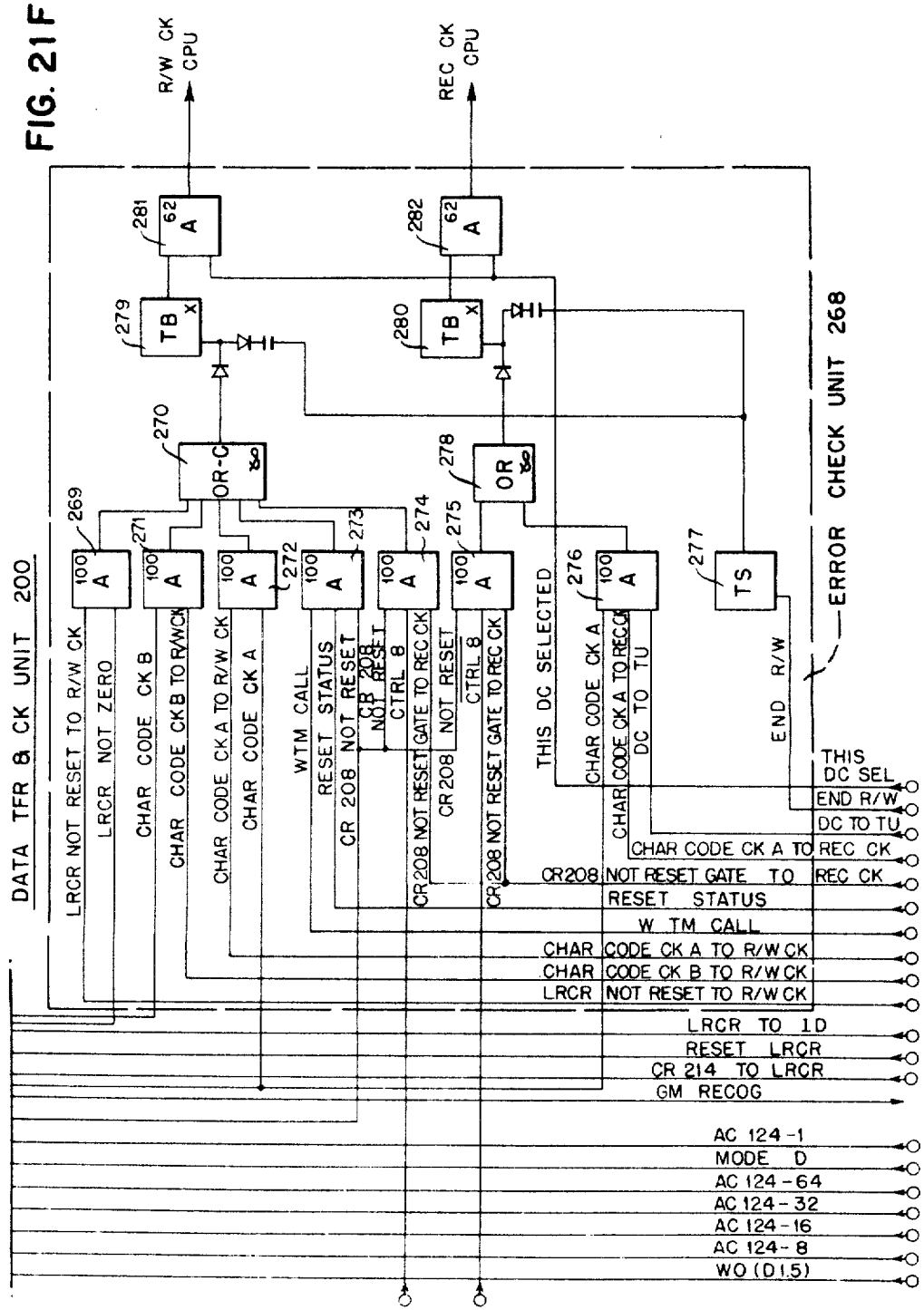

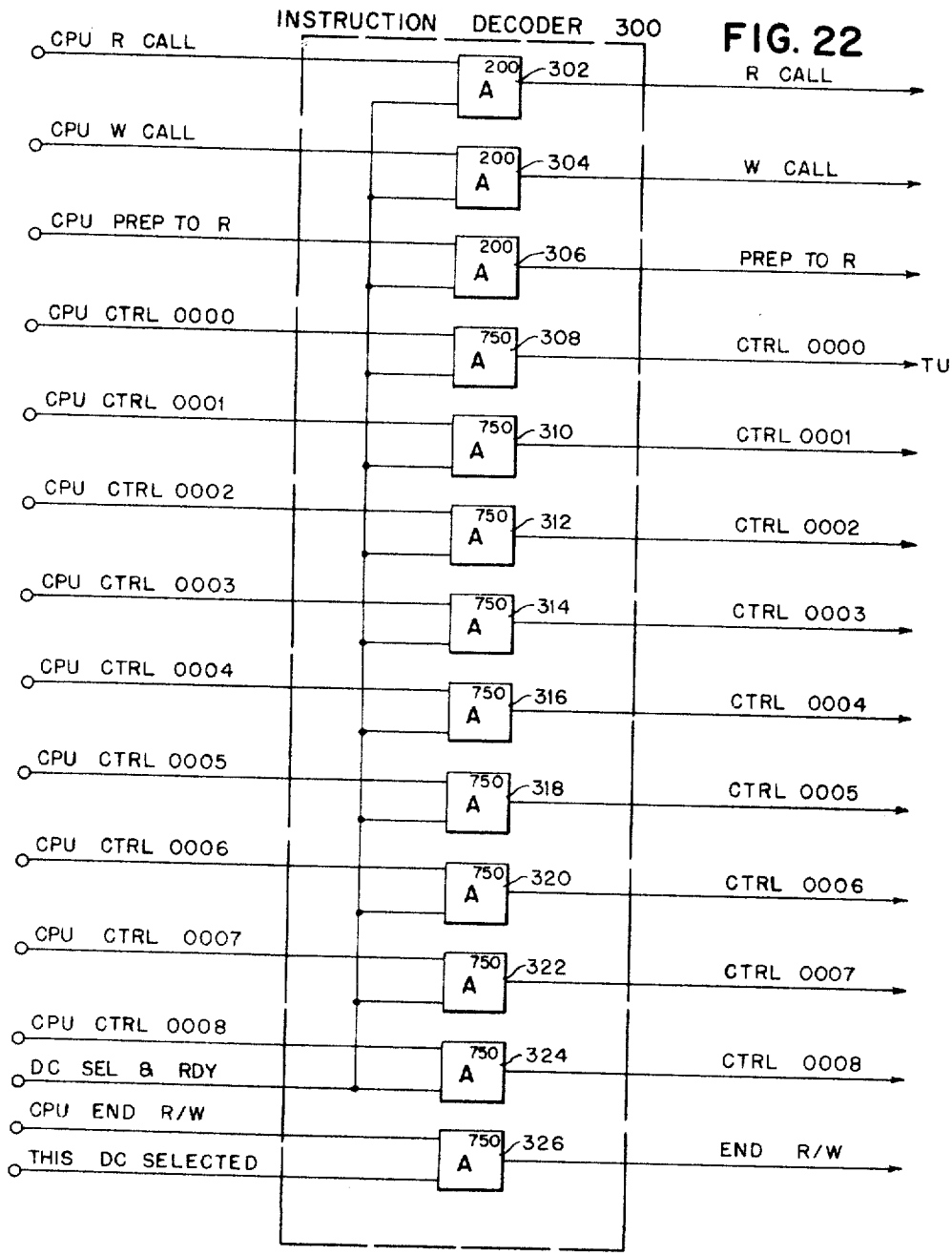

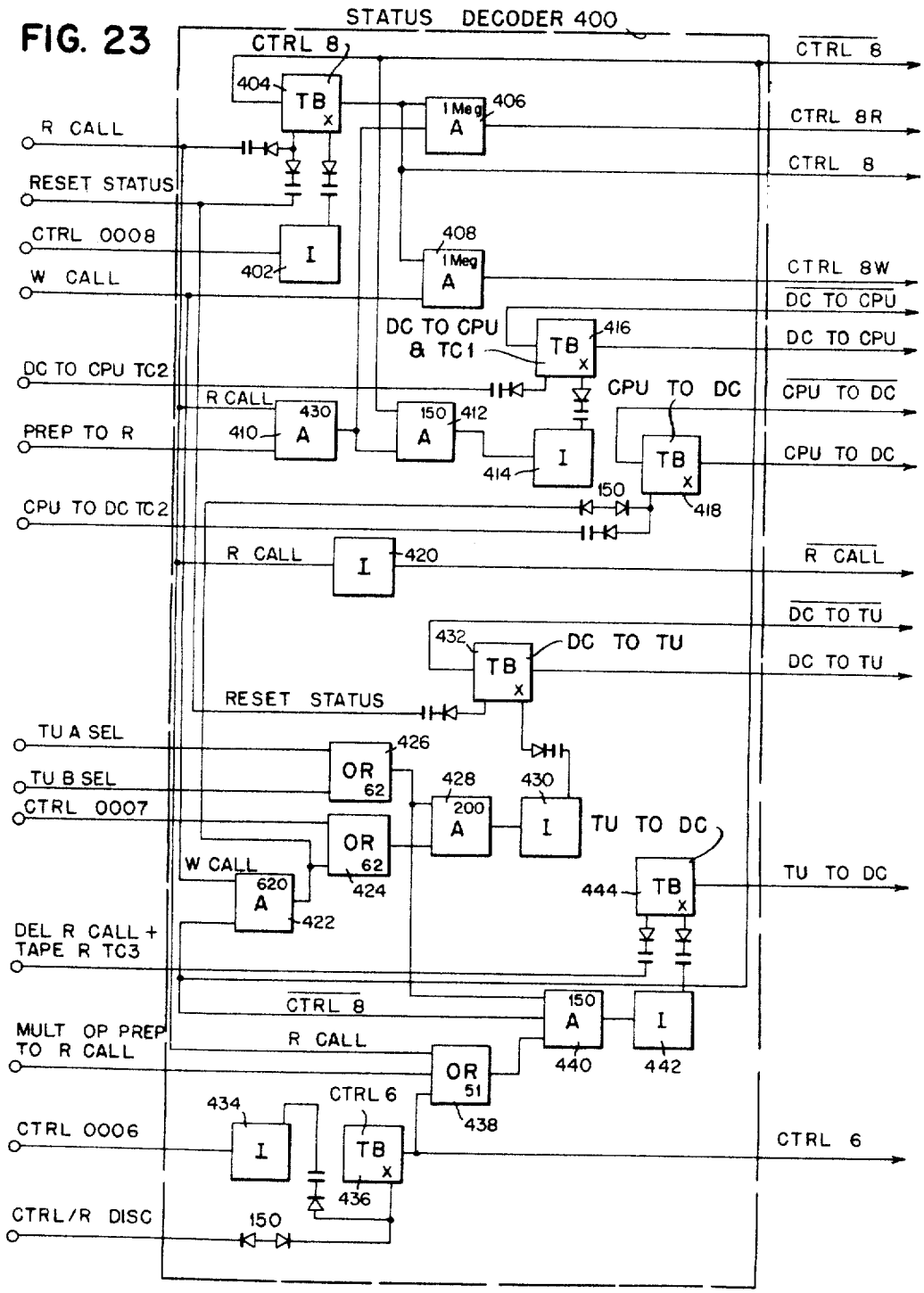

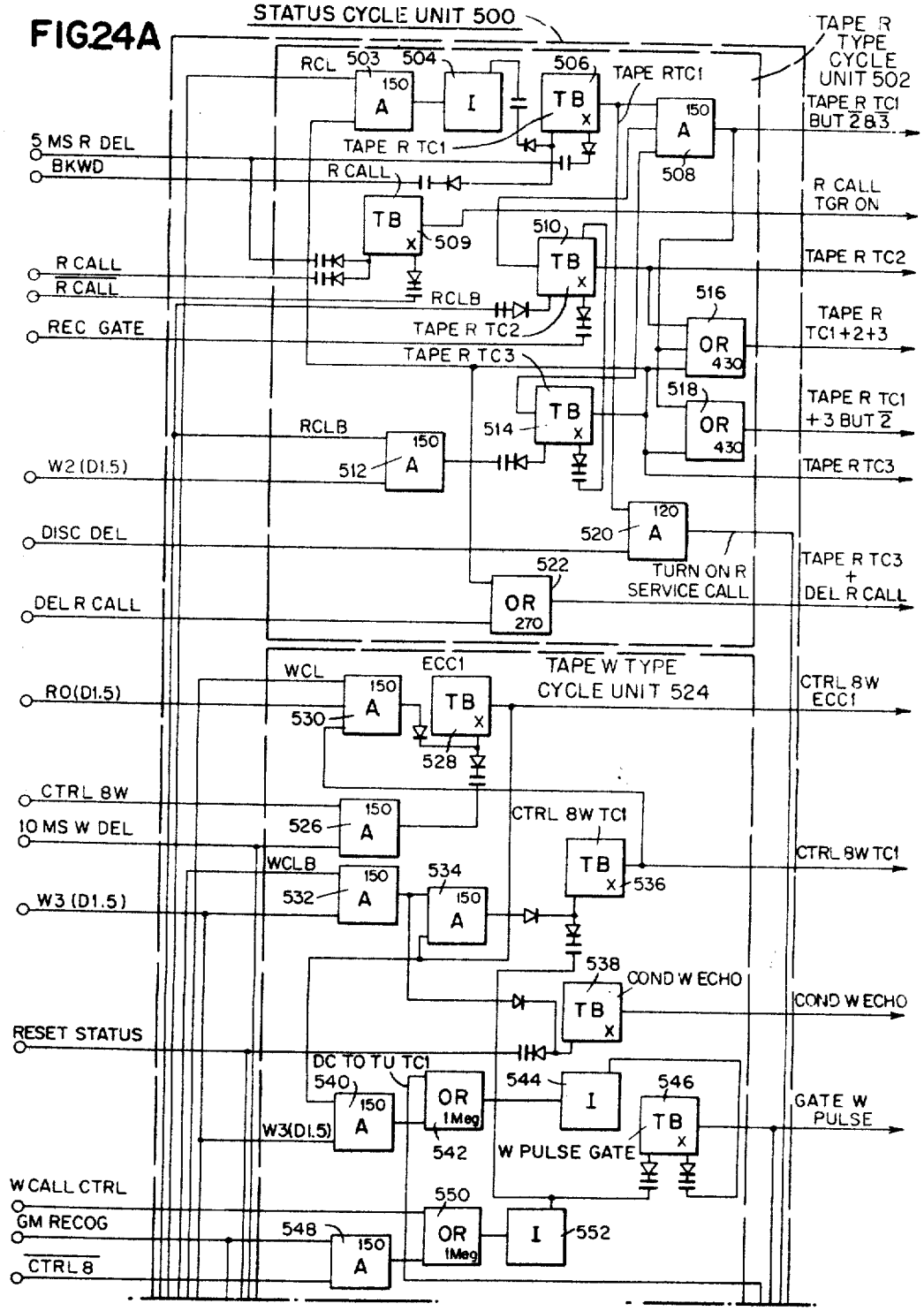

Nov. 15, 1960 — R. A. GREGORY ET AL — 2,960,683
DATA COORDINATOR
Filed June 20, 1956 — 90 Sheets-Sheet 39

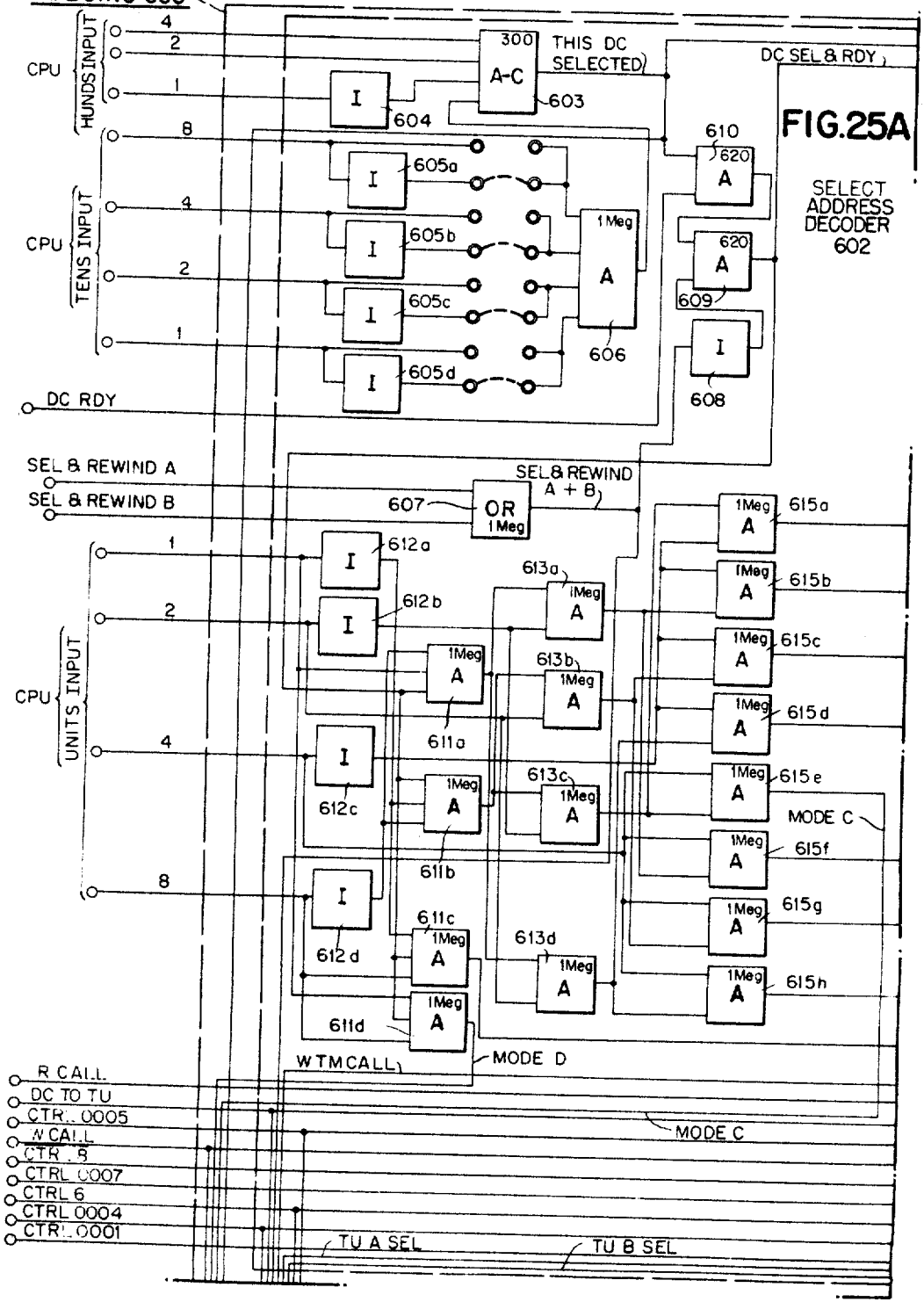

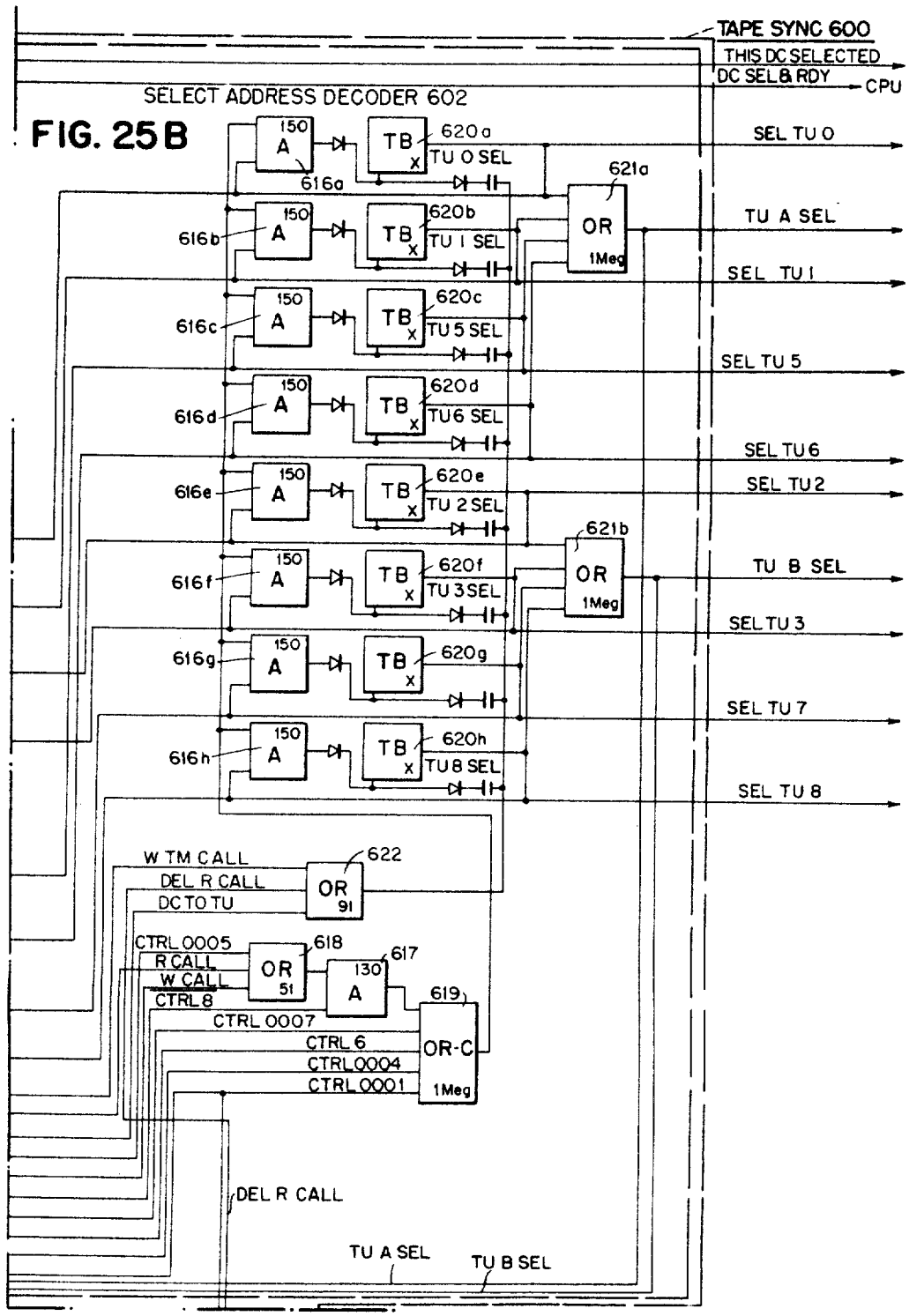

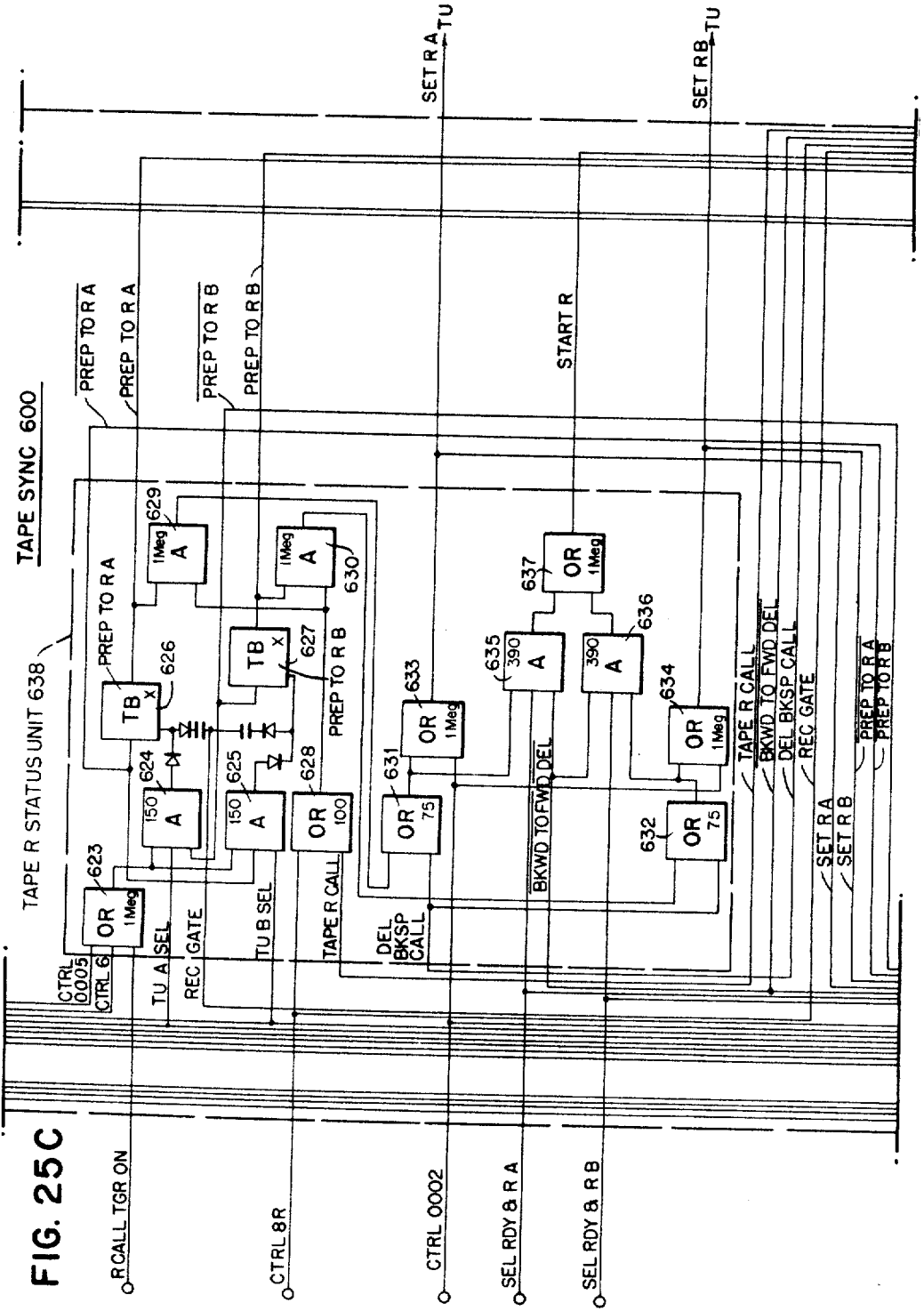

Nov. 15, 1960

R. A. GREGORY ET AL 2,960,683

DATA COORDINATOR

Filed June 20, 1956

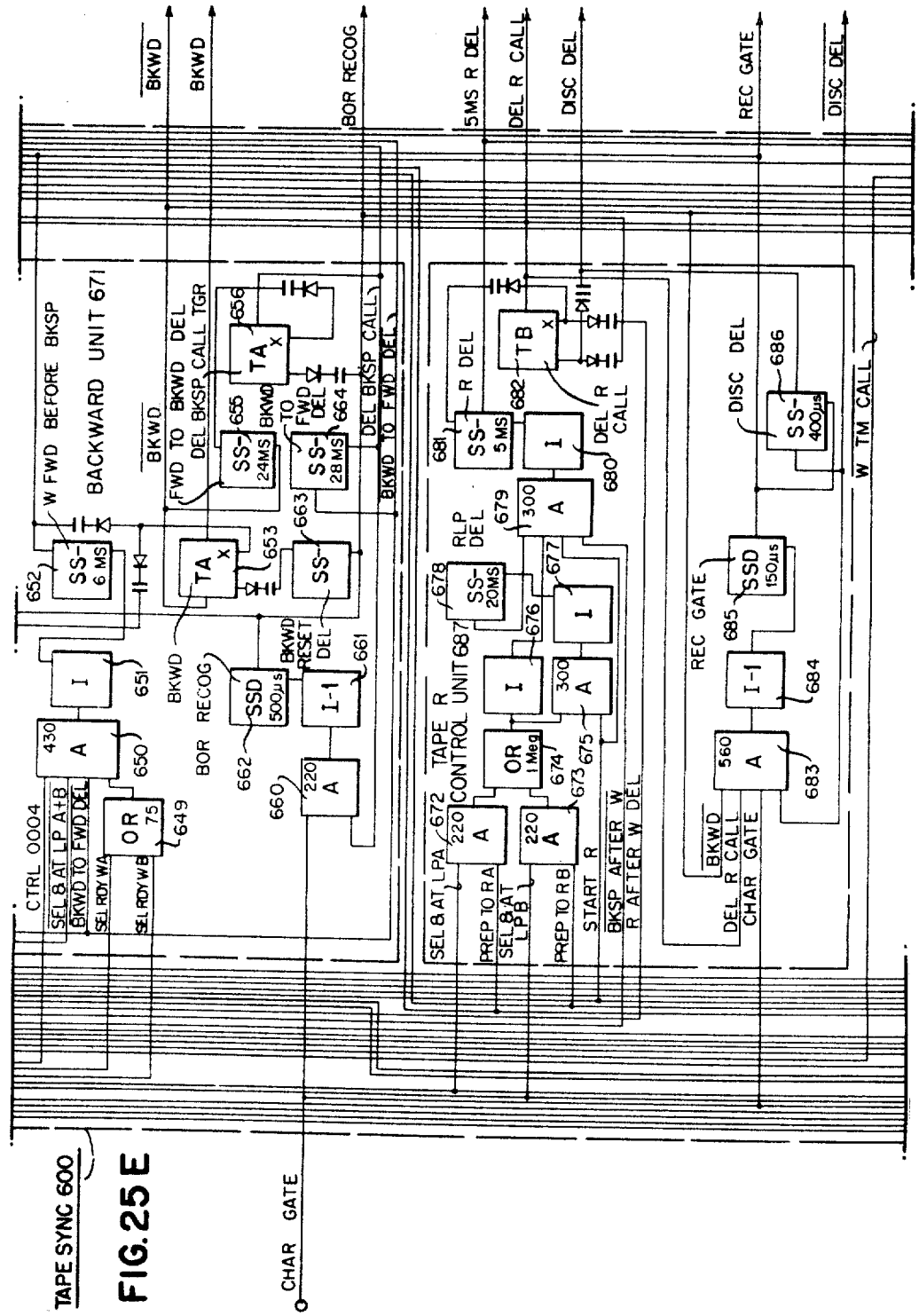

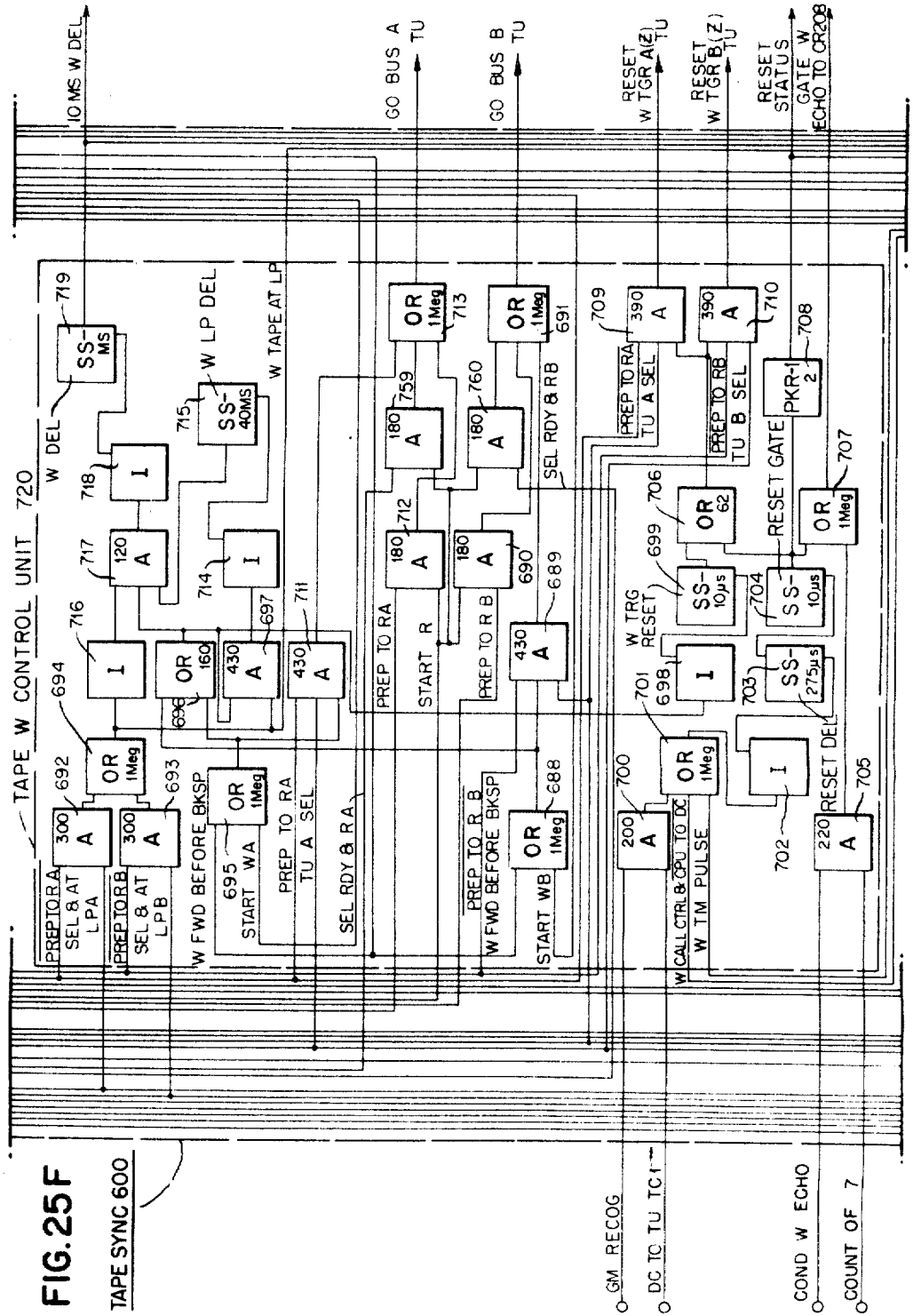

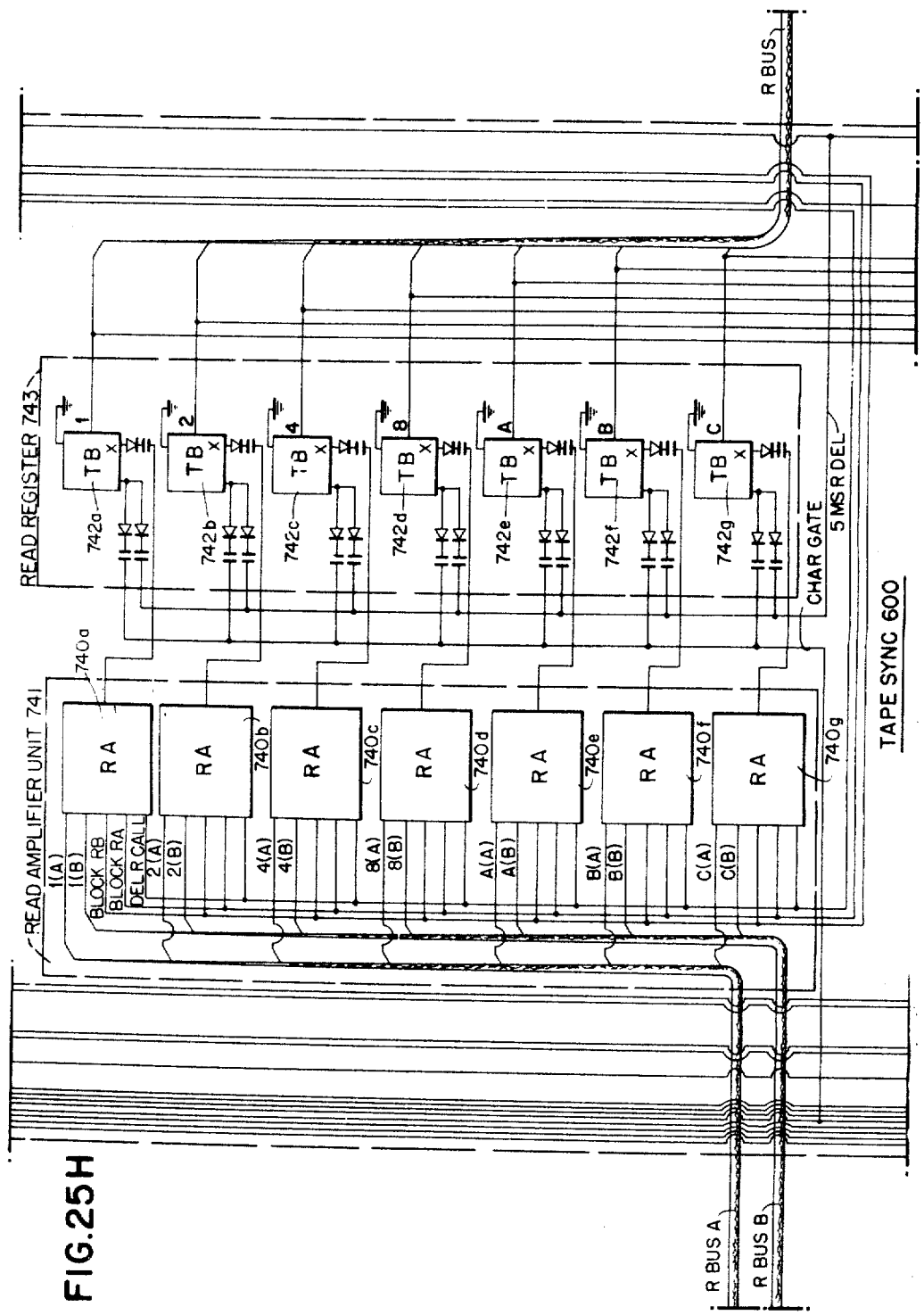

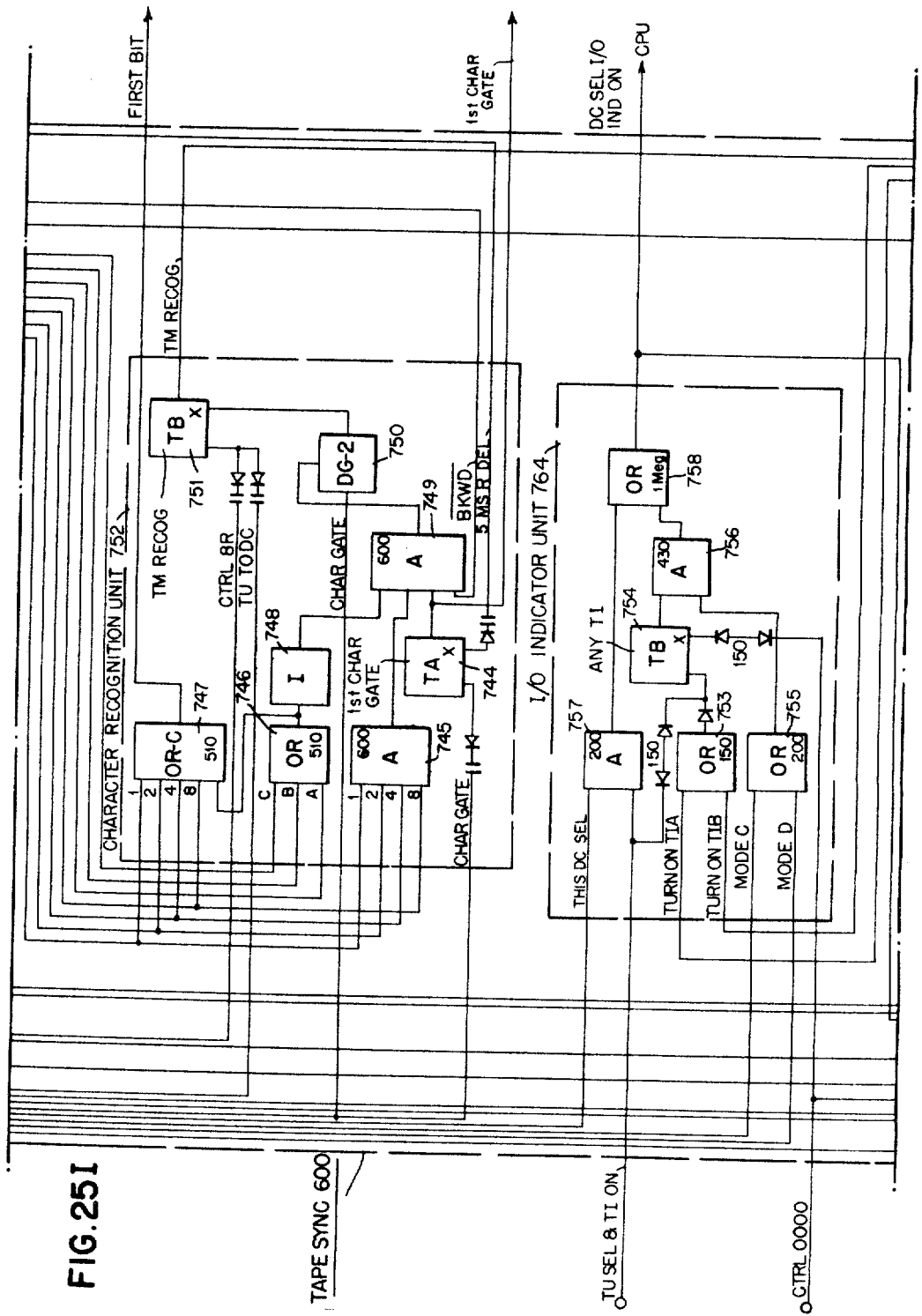

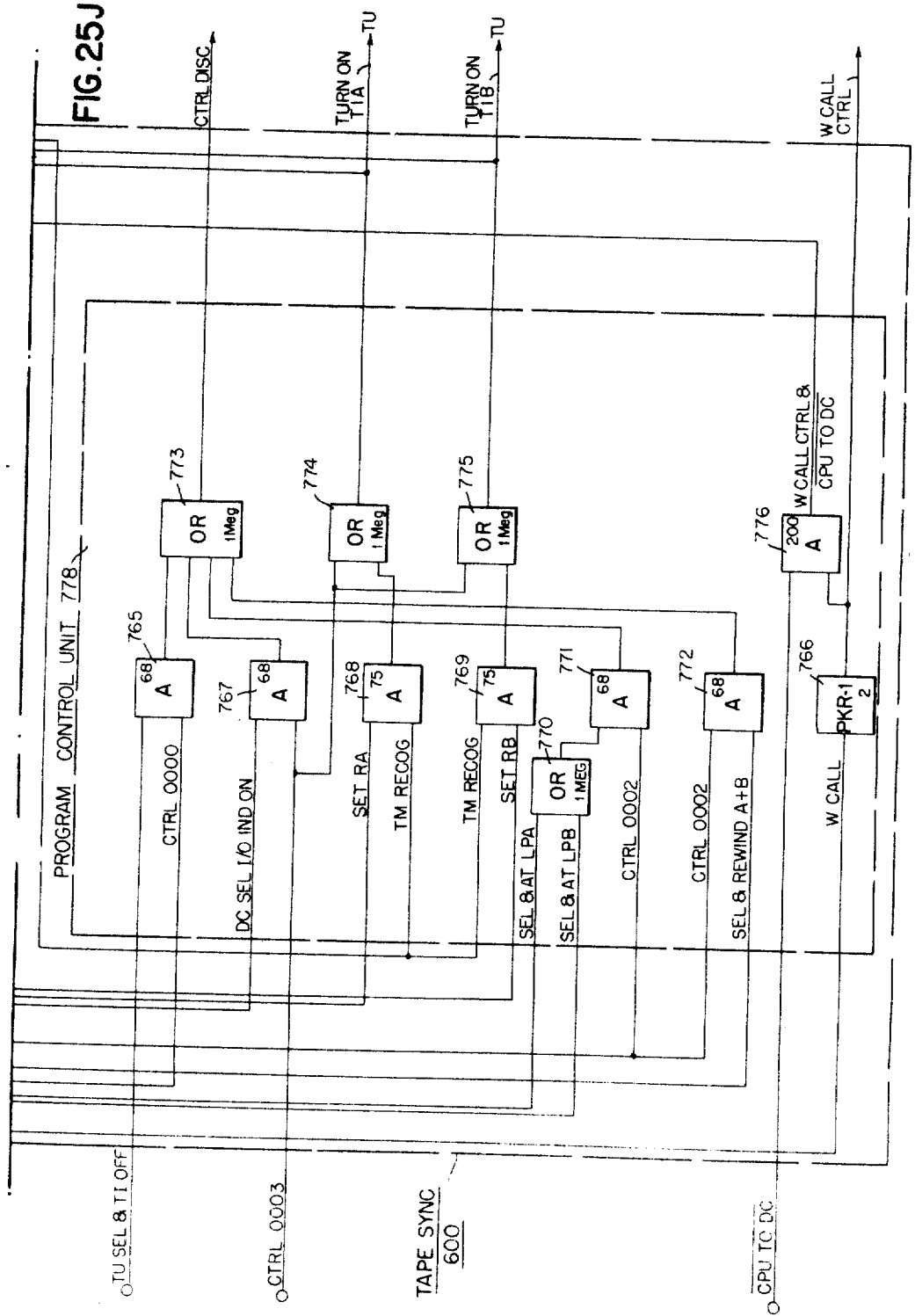

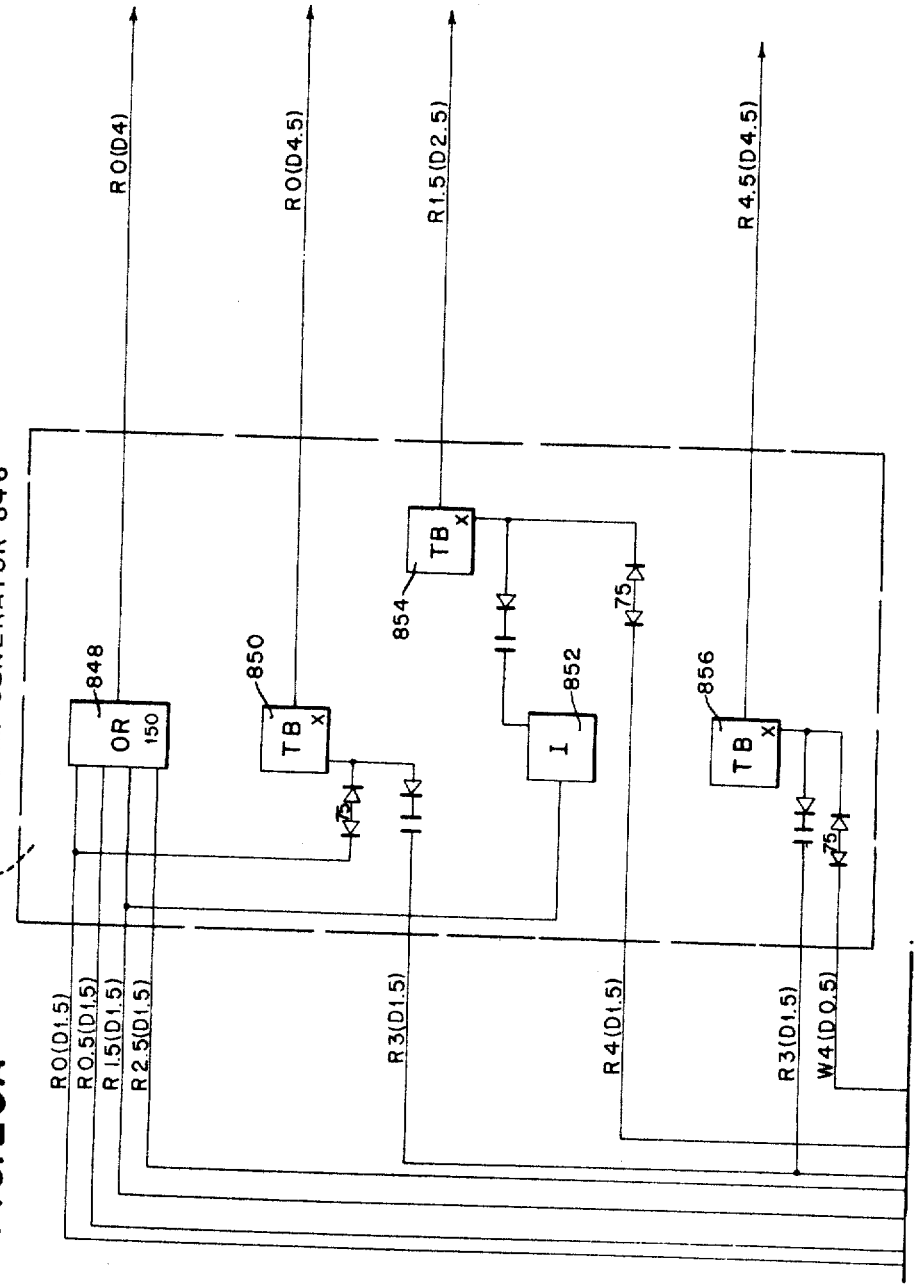

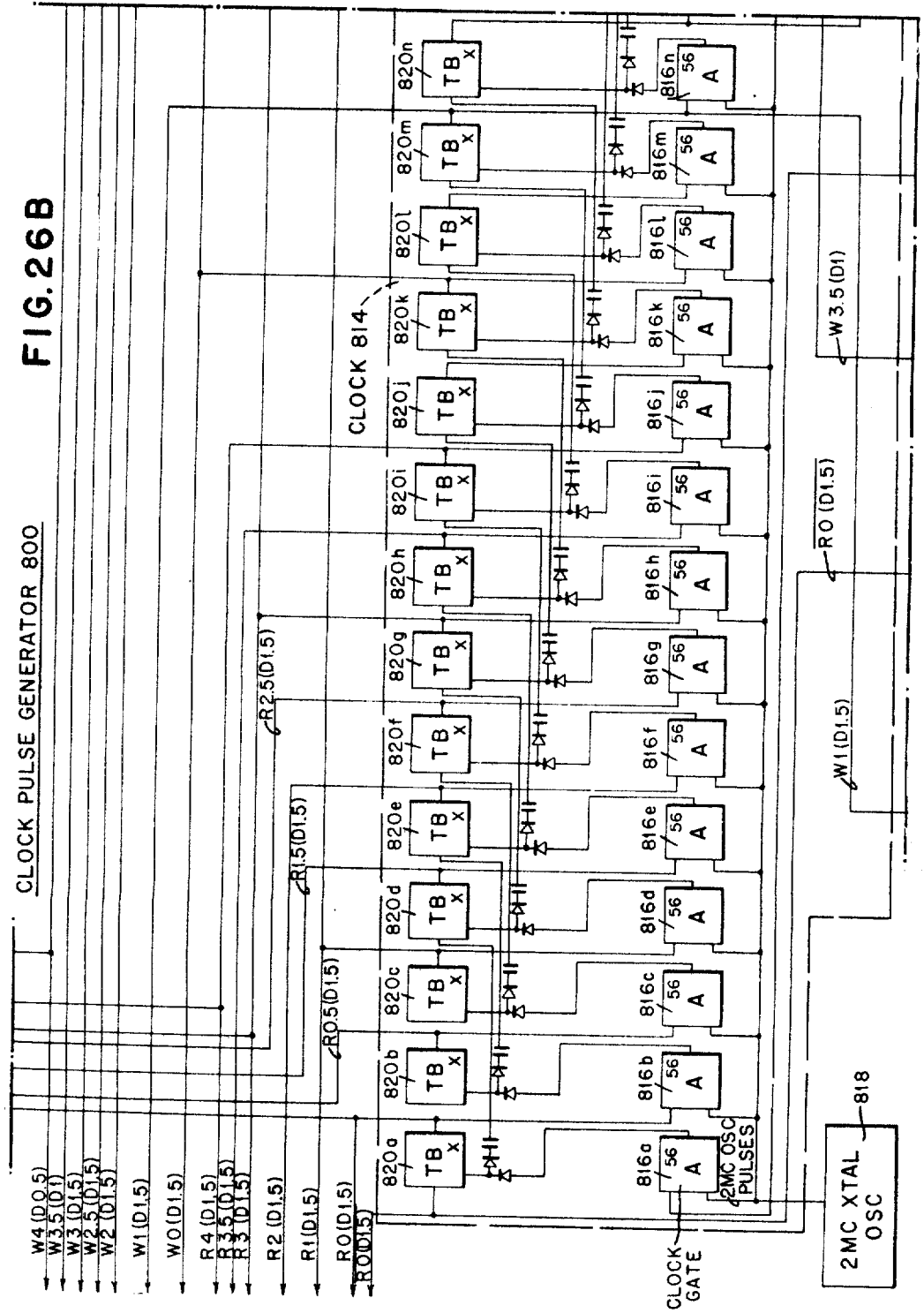

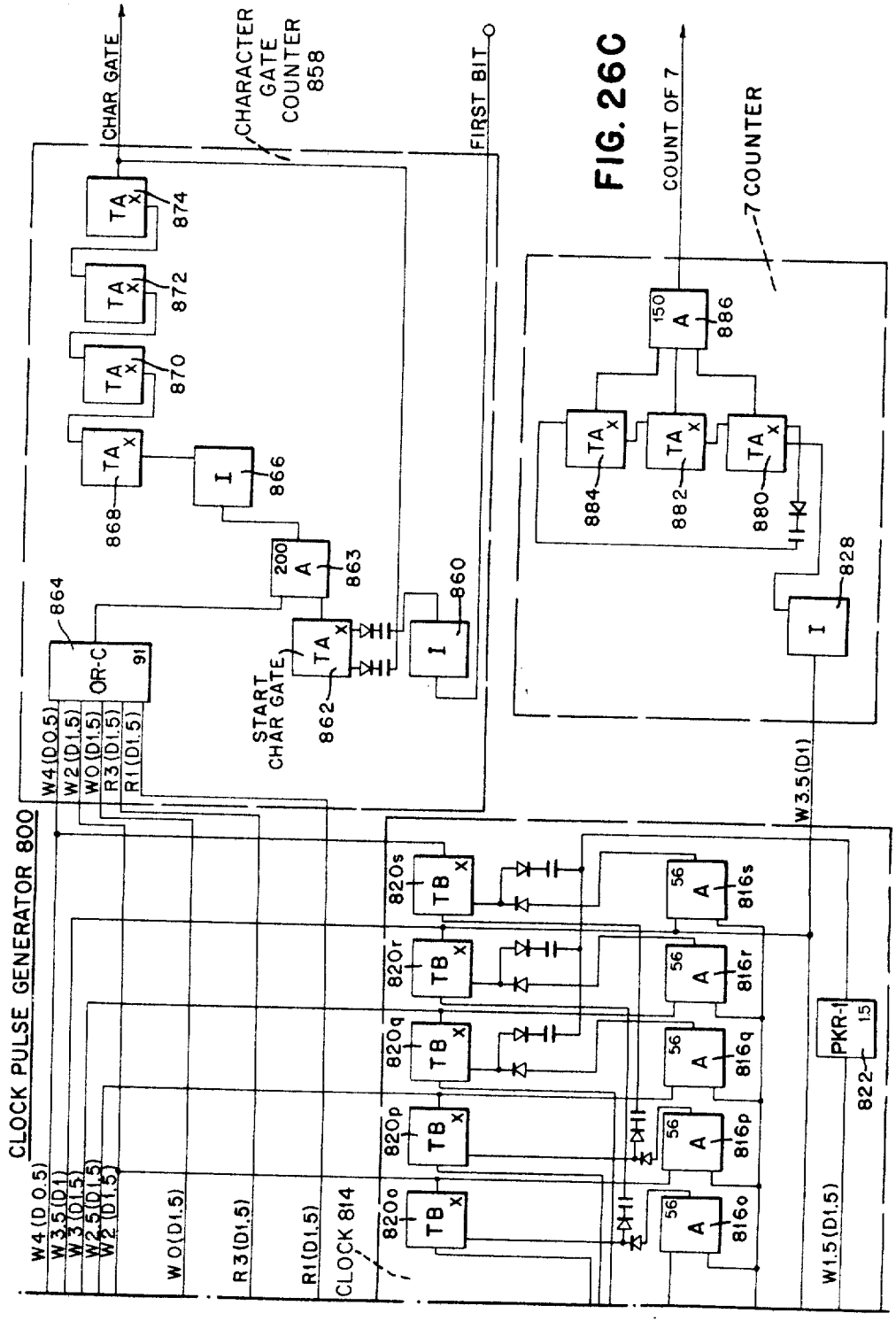

Nov. 15, 1960

R. A. GREGORY ET AL 2,960,683

DATA COORDINATOR

Filed June 20, 1956

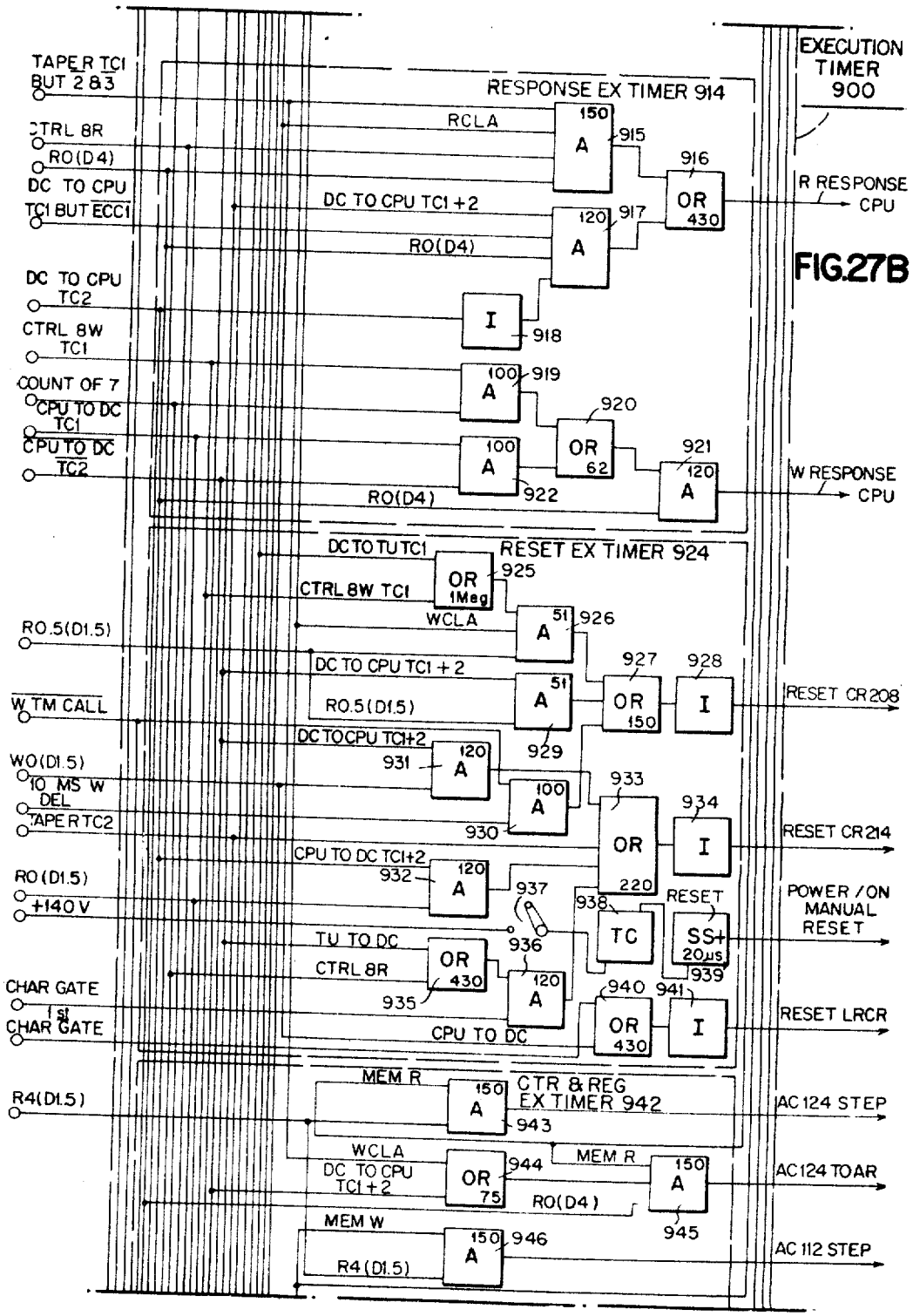

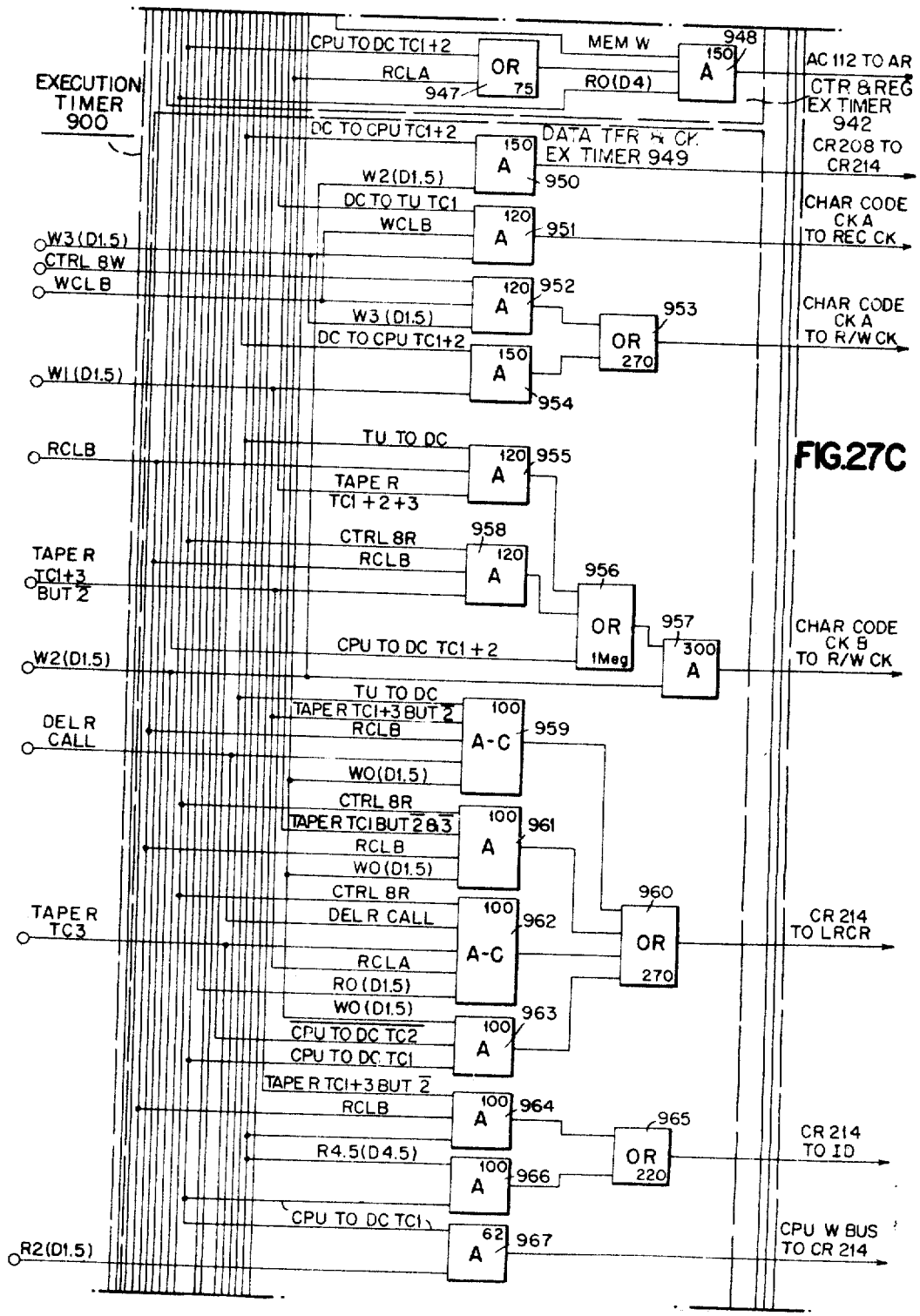

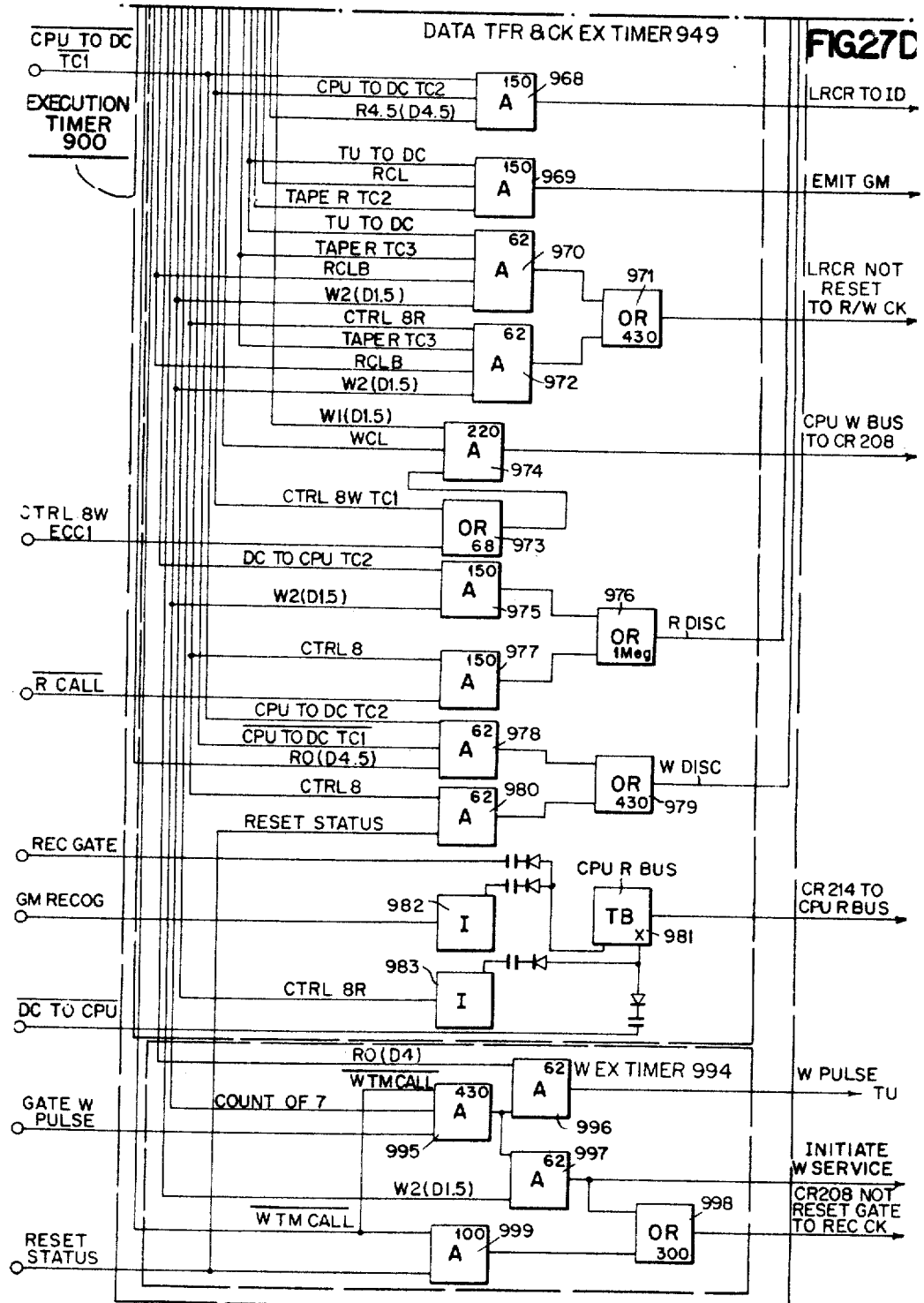

Nov. 15, 1960 R. A. GREGORY ET AL 2,960,683
DATA COORDINATOR
Filed June 20, 1956 90 Sheets-Sheet 58

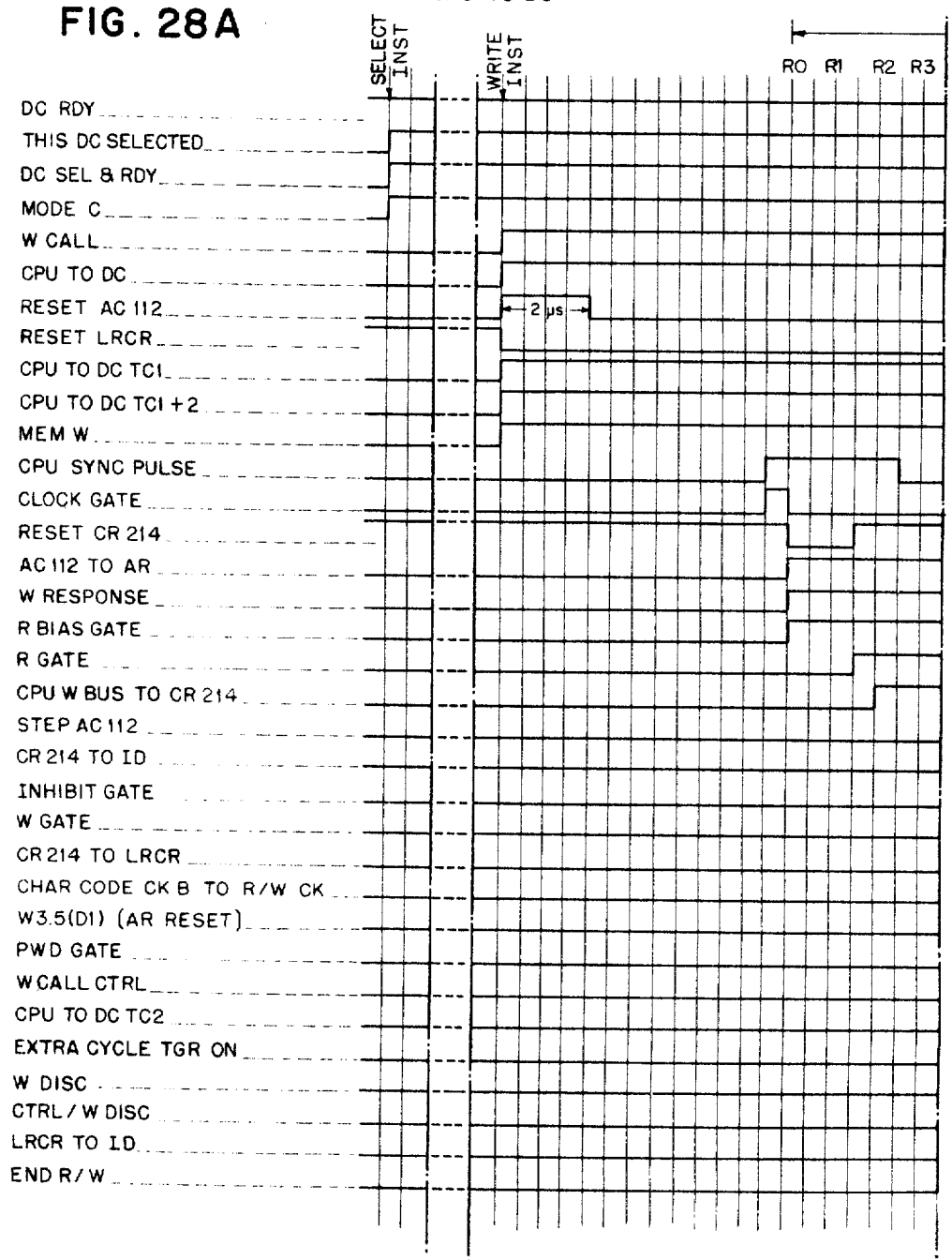

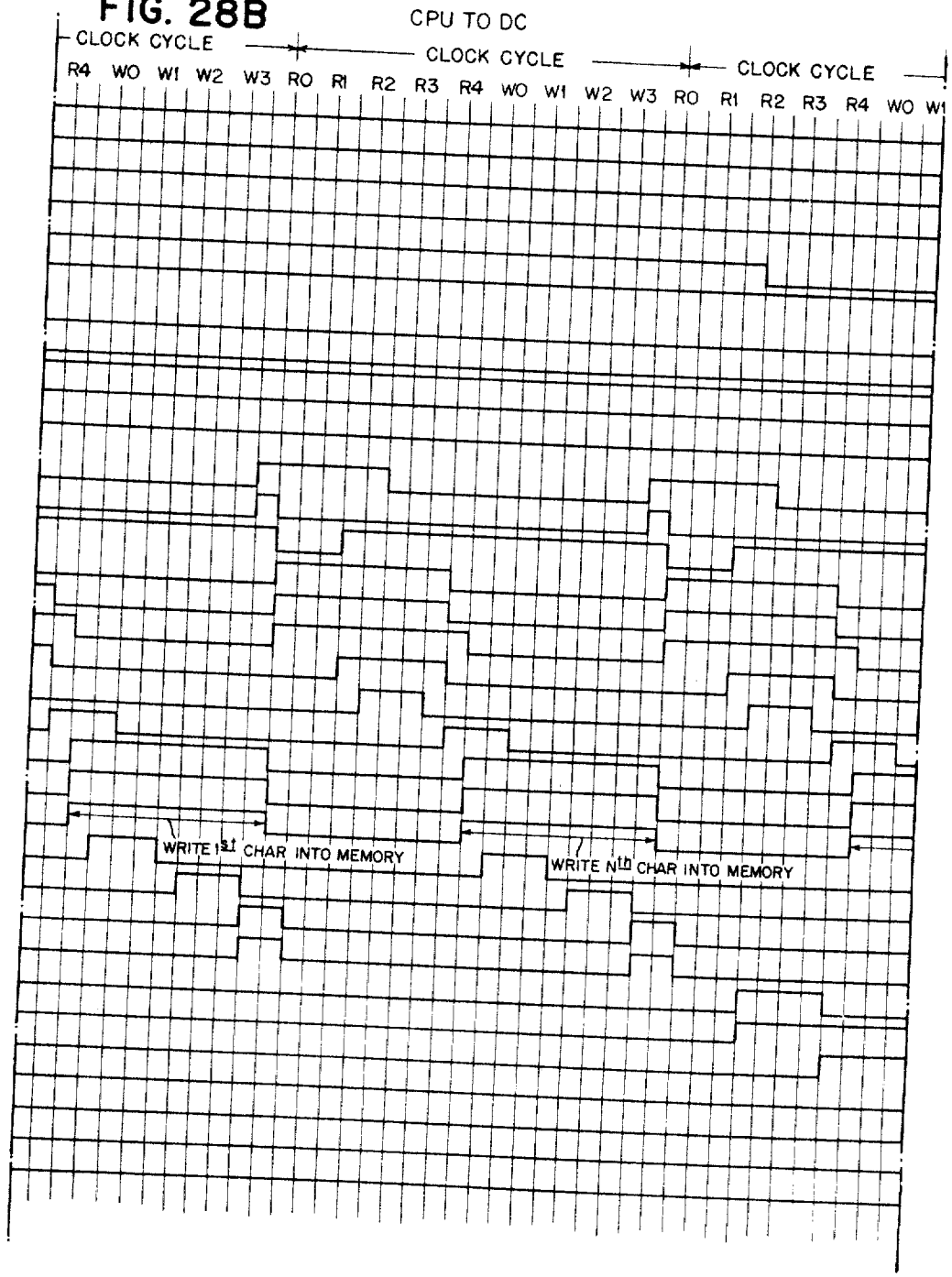

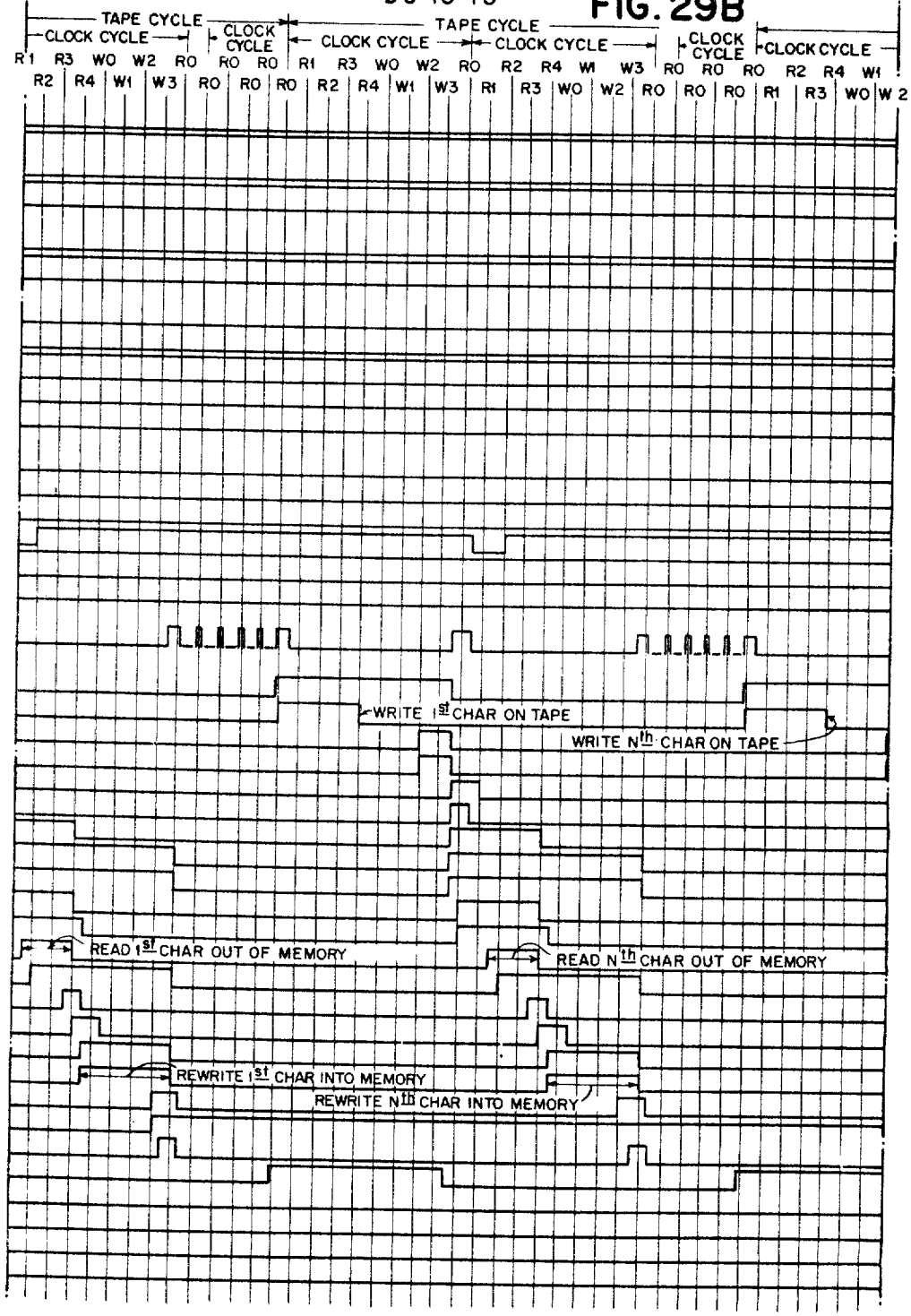

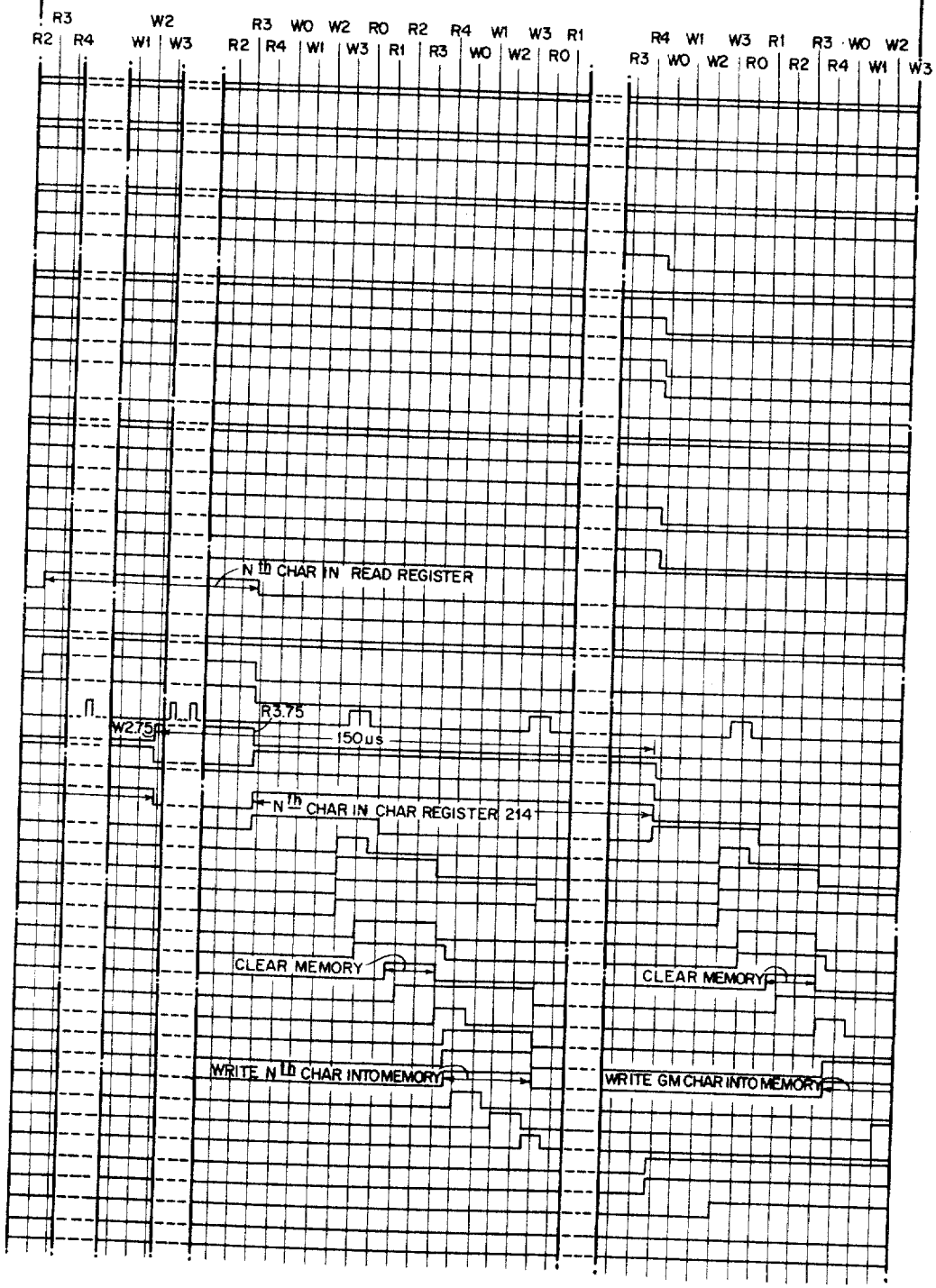

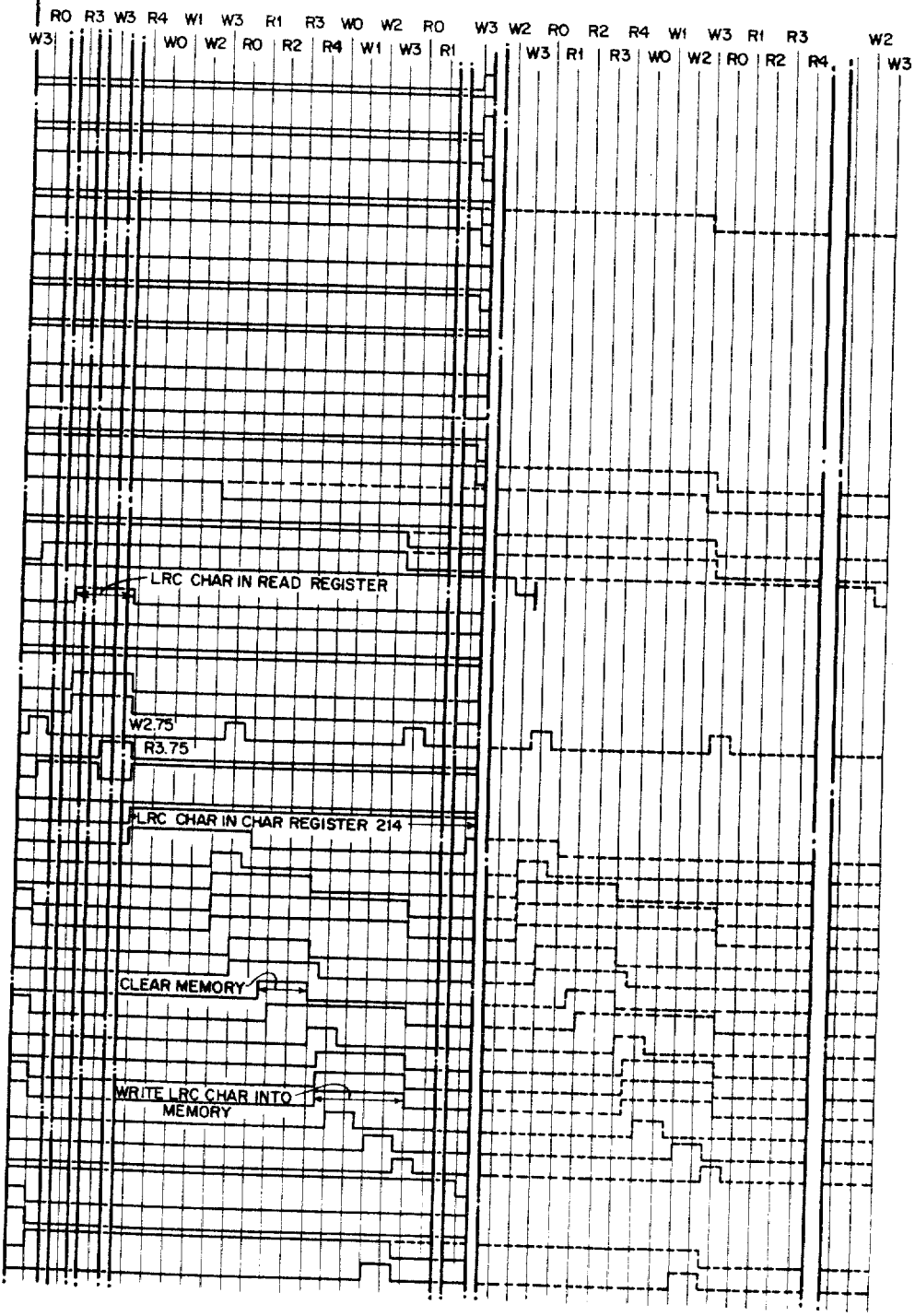

Nov. 15, 1960

R. A. GREGORY ET AL 2,960,683

DATA COORDINATOR

Filed June 20, 1956

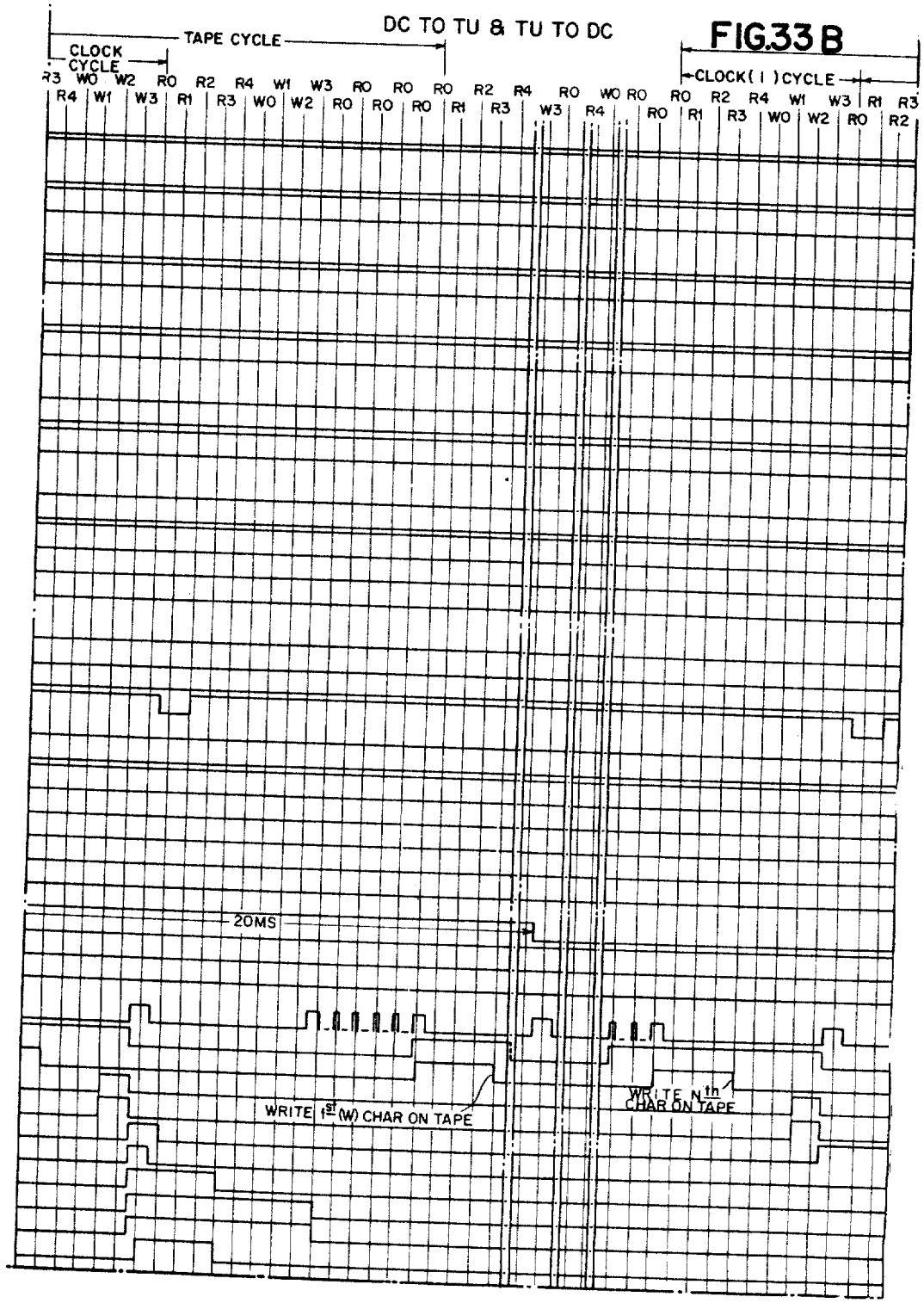

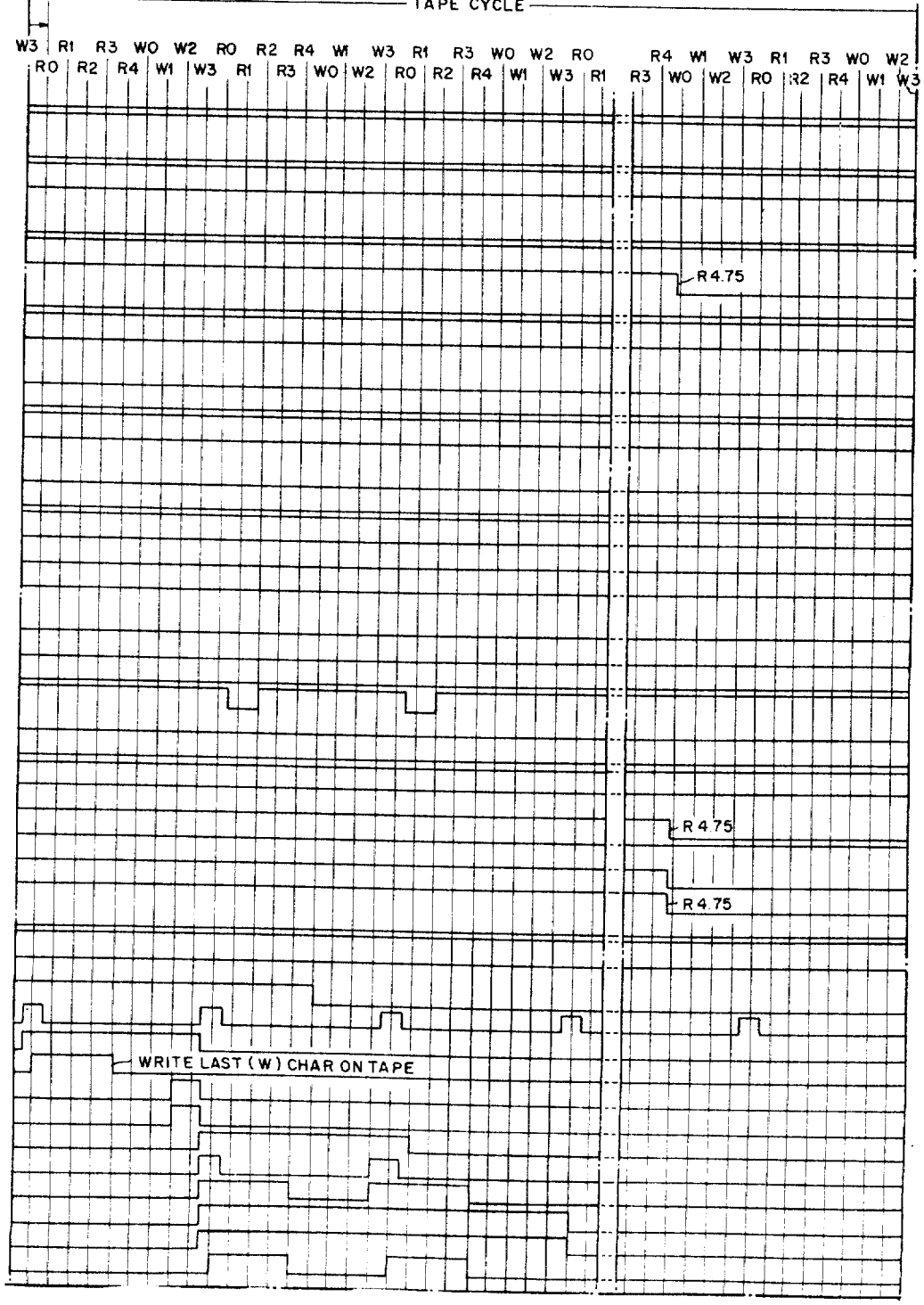

Nov. 15, 1960    R. A. GREGORY ET AL    2,960,683
DATA COORDINATOR
Filed June 20, 1956    90 Sheets-Sheet 74

FIG.33F    DC TO TU & TU TO DC

- R BIAS GATE
- R GATE
- WCL B
- MEM TO CR 208
- STEP AC 124
- INHIBIT GATE
- W GATE
- CHAR CODE CK A TO REC CK
- COND W ECHO
- PW D GATE
- GATE W ECHO TO CR 208 RESET
- R DELAY
- DEL R CALL
- TAPE R TC3 + DEL R CALL
- TAPE R TC1
- TAPE R TC1 BUT 2̄ & 3̄
- TAPE R TC1 +2+3
- TAPE R TC1 + 3 BUT 2̄
- FIRST TGR OF R REG ON
- FIRST CHAR GATE
- RESET AC 112
- RESET LRCR
- FIRST BIT
- START CHAR GATE TGR ON
- CHAR GATE
- RESET CR 214
- REC GATE
- CR 214 TGRS ON
- R SERVICE TGR ON
- RCL A
- RCL
- MEM W
- AC 112 TO AR
- RCL B
- STEP AC 112
- CR 214 TO ID
- CR 214 TO LRCR
- CHAR CODE CK B TO R/W CK
- R SERVICE CALL
- GM RECOG
- RESET DELAY
- DISC DELAY
- TAPE R TC2
- EMIT GM
- TAPE R TC3
- RESET GATE
- RESET STATUS
- LRCR NOT RESET TO R/W CK

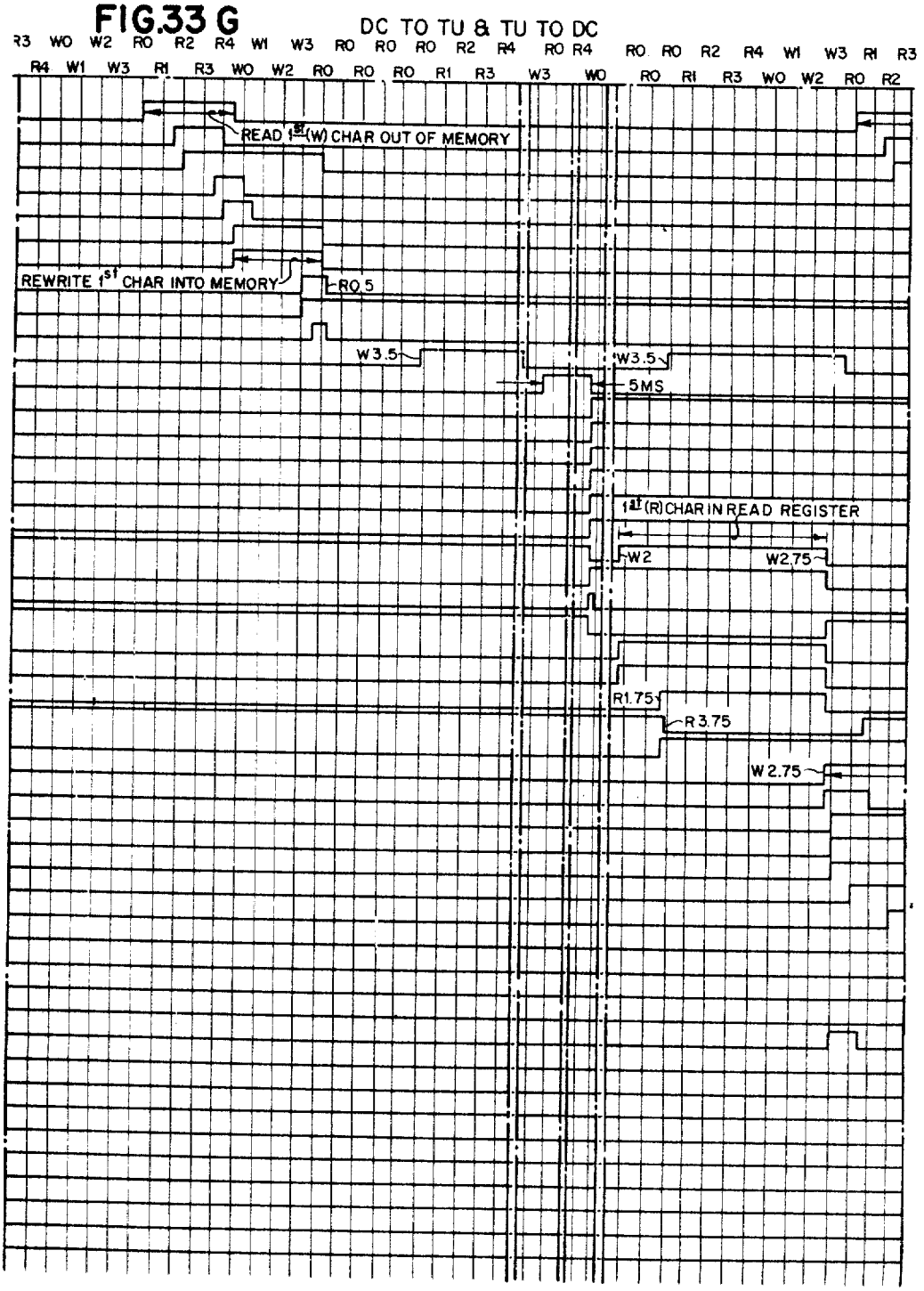

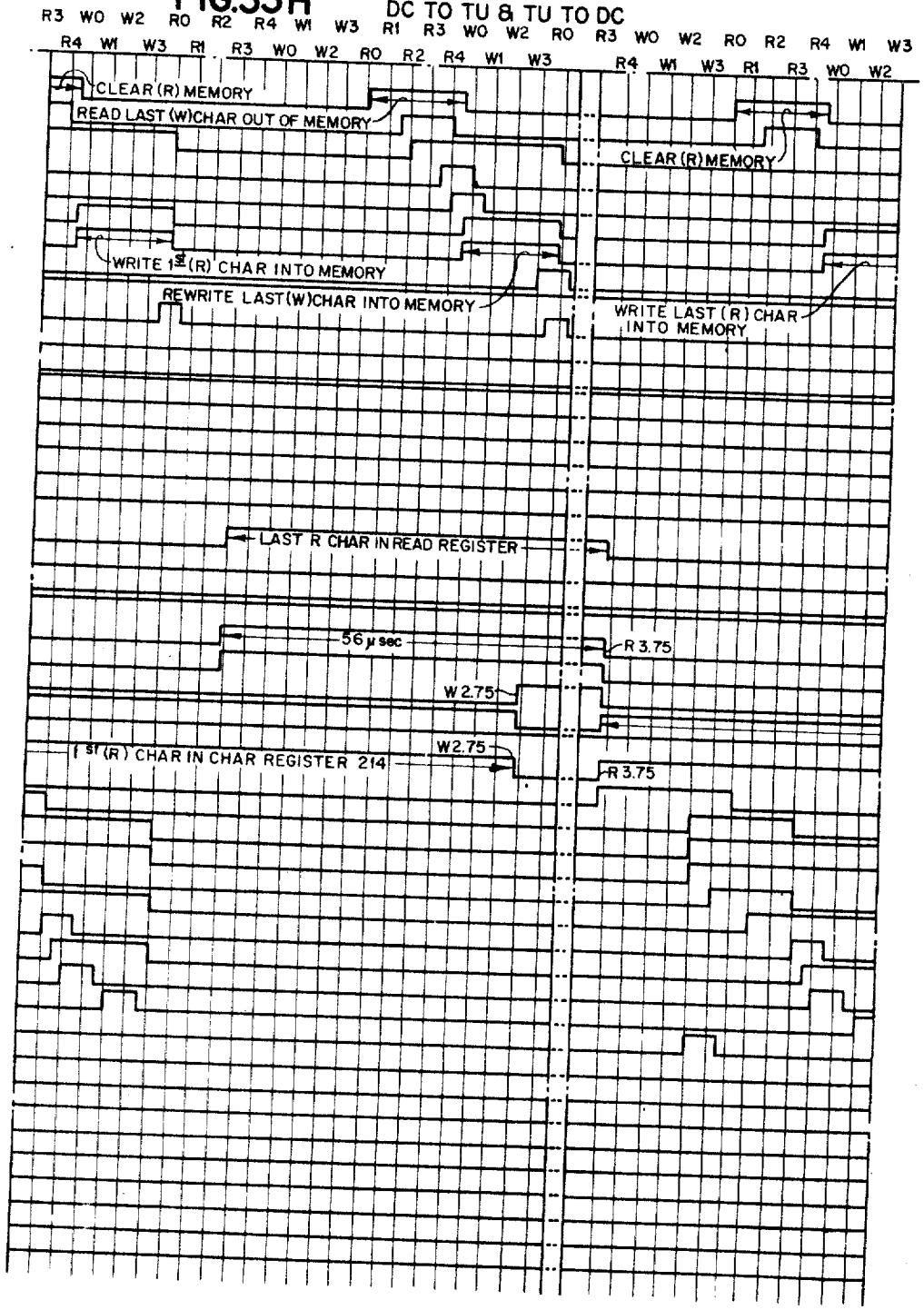

FIG. 33 I  DC TO TU & TU TO DC

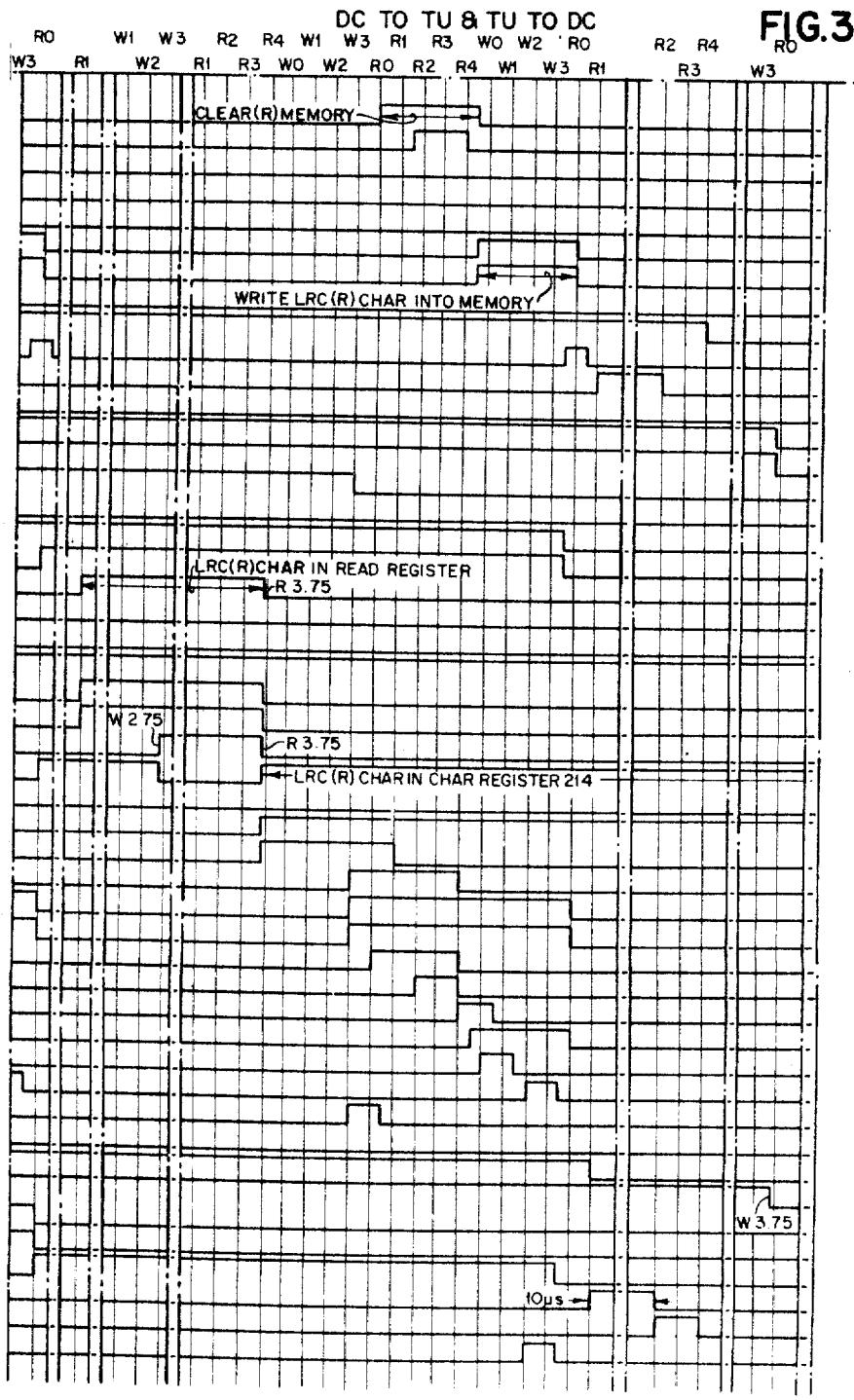

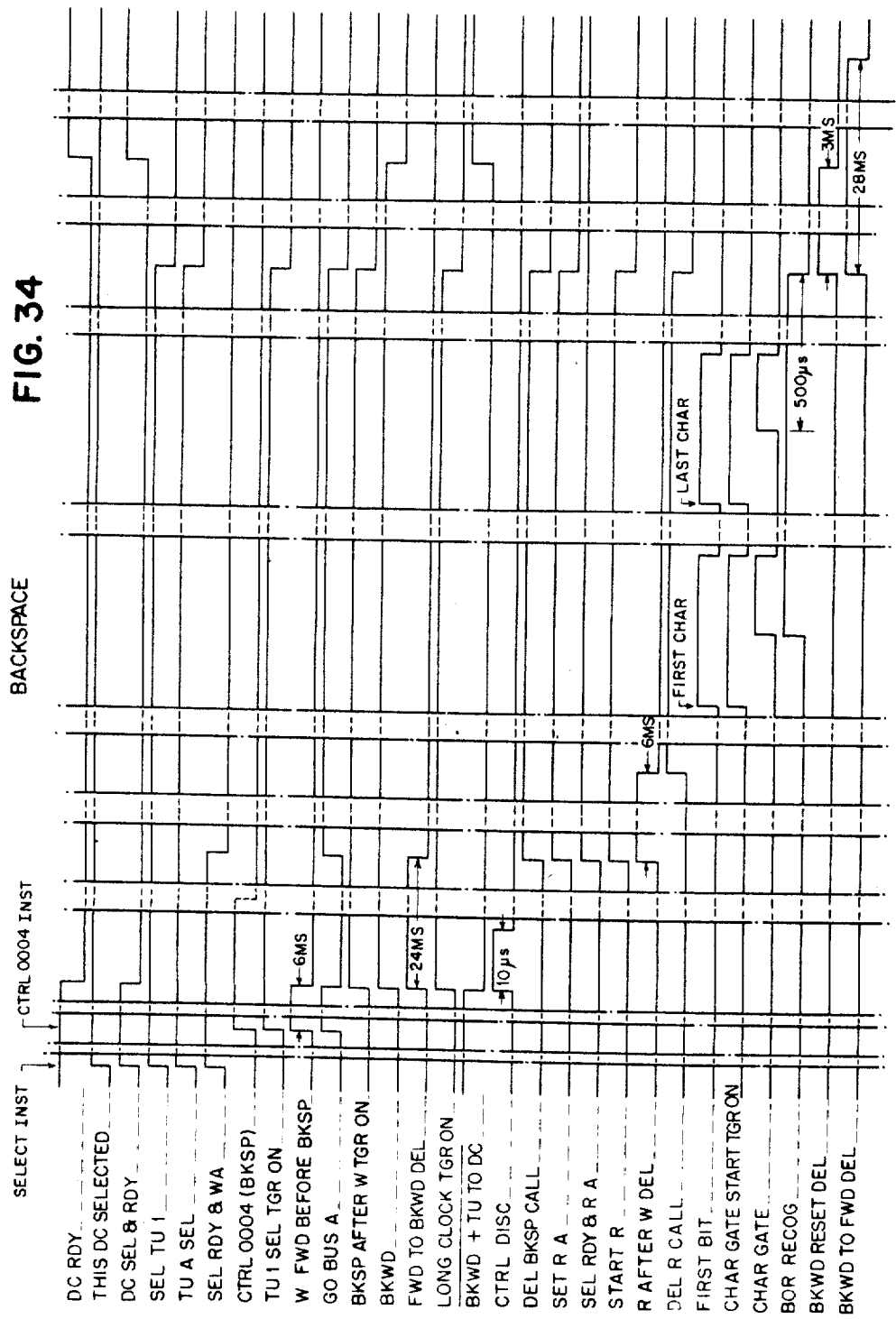

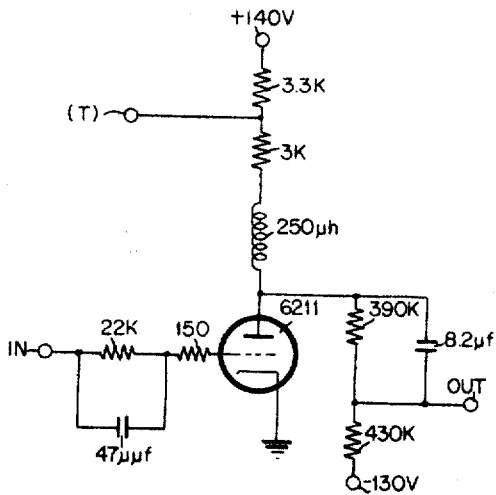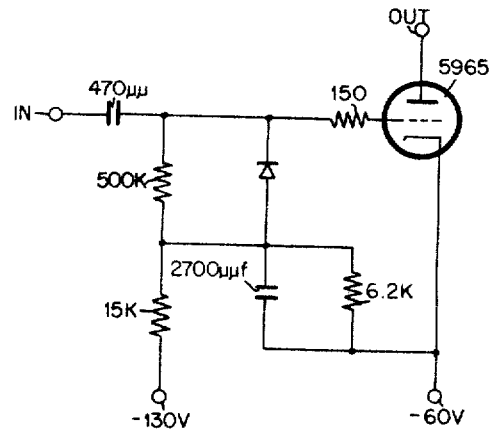
FIG. 40 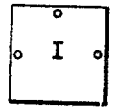   FIG. 41 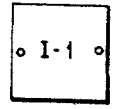
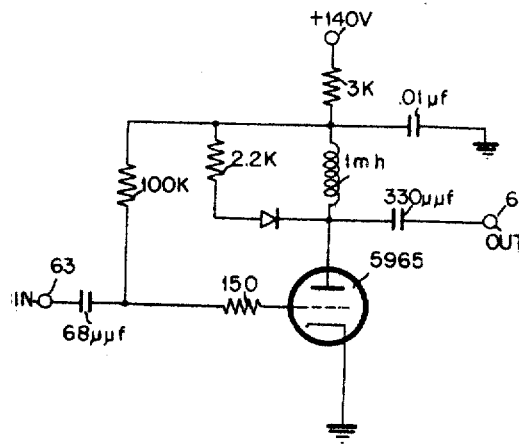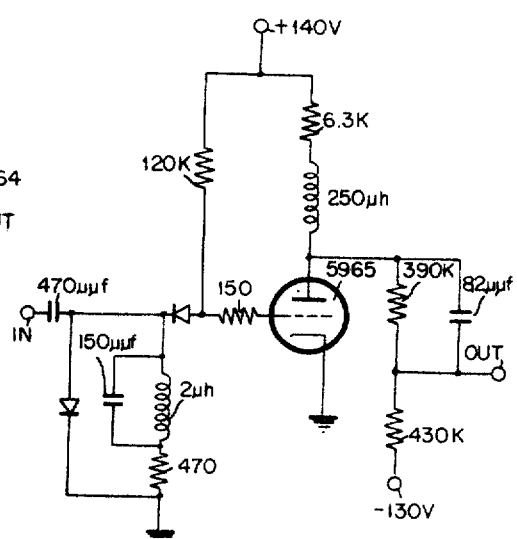
FIG. 42    FIG. 43 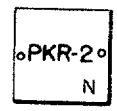

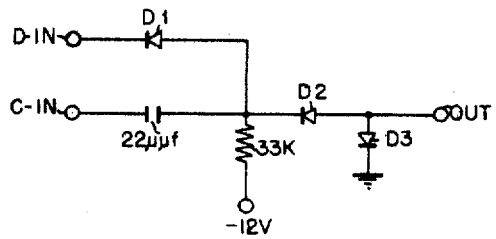

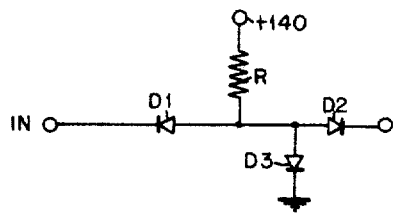

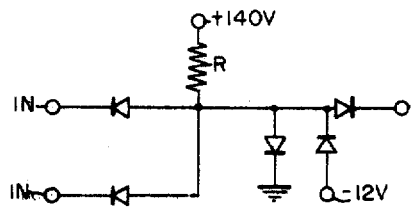

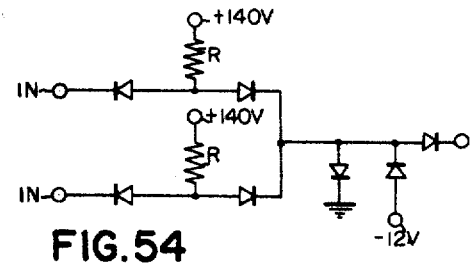

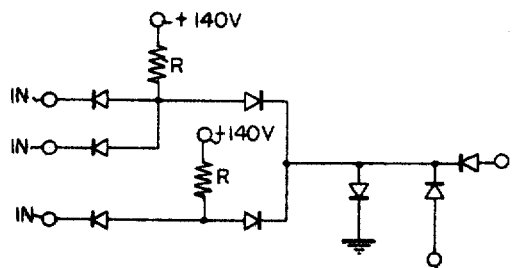

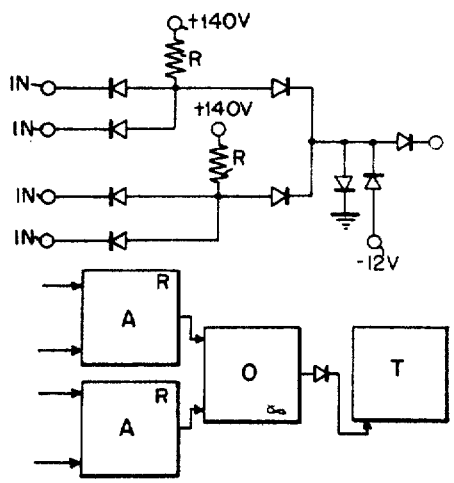
FIG. 56

United States Patent Office 2,960,683
Patented Nov. 15, 1960

2,960,683
DATA COORDINATOR

Ralph A. Gregory, Poughkeepsie, Charles T. Baker, Jr., Wappingers Falls, William Wolensky, Poughkeepsie, and Philip W. Jackson and Wayne D. Winger, Wappingers Falls, and Robert W. Murphy, Poughkeepsie, N.Y., assignors to International Business Machines Corporation, New York, N.Y., a corporation of New York Filed June 20, 1956, Ser. No. 592,545
29 Claims. (Cl. 340—172.5)

This invention relates to data processing and, more particularly, to a system for coordinating data transfer between a central processing unit and an input/output unit.

At the present time, high speed automatic electronic data processing machines are utilized for rapidly processing data. These machines generally consist of a central processing unit having a plurality of independent input/output units, such as magnetic tape units, punched card units, typewriters, keyboards, high speed printers, magnetic drums etc., associated therewith which may be separately connected to the central processing unit thereby providing a flexible system. However, these input/output units are asynchronous with respect to the central processing unit, as for example, the magnetic tape unit may process data at the rate of 63 microseconds per character while the central processing unit may process data at the rate of 9 microseconds per character. Consequently, when an input/output unit is selected, the speed at which data is transferred between the central processing unit and the selected input/output unit must be controlled by the selected input/output unit. Therefore, this slows down the system and ties up the central processing unit for a relatively long period of time.

Accordingly, the principal object of the present invention is to provide a highly flexible buffer device between a central processing unit and an input/output unit.

Another object of the present invention is to provide an improved buffer device which transfers data between a central processing unit and the device at the central processing unit speed and transfers data between the device and an input/output unit at the input/output unit speed.

Still another object of the invention is to provide an improved storage device for transferring data between a tape unit and the device whereby the tape unit is started and brought up to speed during which period a data transfer is accomplished between the device and a central unit.

A further object of the invention is to provide an improved buffer device for transferring information from the device to a tape unit whereby the tape unit is started and brought up to speed during which time a data transfer is accomplished from a central processing unit to the device.

A still further object of the invention is to provide an improved buffer storage device for transferring data from the device to a central unit and simultaneously start a tape unit so that by the time the tape unit is up to speed the data transfer is complete and the device is ready to receive data from the tape unit.

Another object of the invention is to provide an improved storage device for transferring data from the device to one tape unit concurrently with the transfer of data from another tape unit to the device.

Still another object of the invention is to provide an improved buffer storage device which is effective while a central processing unit is performing a computation to transfer information from a storage portion of the device to one tape unit concurrently with the transfer of information from another tape unit to the same storage portion of the device.

A further object of the invention is to provide an improved buffer device having a magnetic core memory for selectively transferring a predetermined portion of a large record of information from the memory to a central processing unit.

A still further object of the invention is to provide an improved storage addressing system whereby an address register is concurrently cleared and set with a new address.

Another object of the invention is to provide an improved storage device operable selectively with a plurality of tape units and including novel means for remembering which tape units are selected.

Still another object of the invention is to provide an improved storage device operable with a central processing unit for transferring information between a tape unit and the device including a novel arrangement for rendering the device inaccessible to the central unit during the information transfer.

A further object of the invention is the provision of a novel arrangement for supervising the accuracy of information flow between a pair of storage devices.

A still further object of the invention is to provide a novel arrangement for creating a check character during the transfer of a record, consisting of a plurality of characters, from a central processing unit to a buffer storage device and storing the check character in the device at the end of the record.

Another object of the invention is the provision of a novel arrangement for creating a check character during the transfer of a record, consisting of a plurality of characters, from a tape unit to a buffer storage device and storing the check character in the device at the end of the record.

Still another object of the invention is the provision of a novel arrangement for creating a check character during the transfer of a record, consisting of a plurality of characters, from a buffer storage device to a tape unit including means for extracting a corresponding check character from the device after the record transfer and comparing the check characters to provide a check of the accuracy of the record transfer.

A further object of the invention is to provide a novel arrangement for checking a record transfer from a storage device to a tape unit by comparing, character by character, each character written on the tape unit with each character transferred from the storage device.

A still further object of the invention is the provision of a novel arrangement for code checking and comparison checking, character by character, a record transfer between a pair of storage devices.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is an overall block diagram illustrating the general arrangement and interconnections of the major components comprising the DATA COORDINATOR.

Fig. 2A is a representation of a TAPE section having variable length RECORDS grouped thereon.

Fig. 2B is a representation of a TAPE section having a properly recorded RECORD thereon.

Fig. 2C is a representation of a TAPE section having a pair of 1 bits appear erroneously in place of a pair of 0 bits in the encircled positions.

Fig. 3A is a flow diagram illustrating the general flow of information through the system.

Fig. 3B is a timing chart showing an early tape start during a CPU TO DC TO TU mode of operation.

Fig. 3C is a timing chart showing an early tape start during a DC TO CPU & TU TO DC mode of operation when less than 512 CHARACTERS are being transferred from DC TO CPU.

Fig. 3D is a timing chart showing an early tape start during a DC TO CPU & TU TO DC mode of operation when the maximum RECORD is being transferred from DC TO CPU.

Fig. 3E is a timing chart showing a RECORD transfer from DC TO TU concurrently with a RECORD transfer from TU TO DC.

Fig. 3F is a timing chart showing an early tape start during a CPU TO DC TO TU & TU TO DC mode of operation.

Fig. 4 illustrates how Figs. 5 to 10, inclusive, may be placed to form a composite block diagram showing a breakdown, in logical block form, of the major components of the DATA COORDINATOR.

Fig. 5 shows an isometric view of a 3 dimensional magnetic core MEMORY.

Fig. 6 shows the breakdown, in logical block form, of the MEMORY CONTROL UNIT.

Figs. 11 to 14, inclusive, illustrate the the breakdown, in logical block form, of a portion of the TAPE SYNCHRONIZER.

Figure 15:
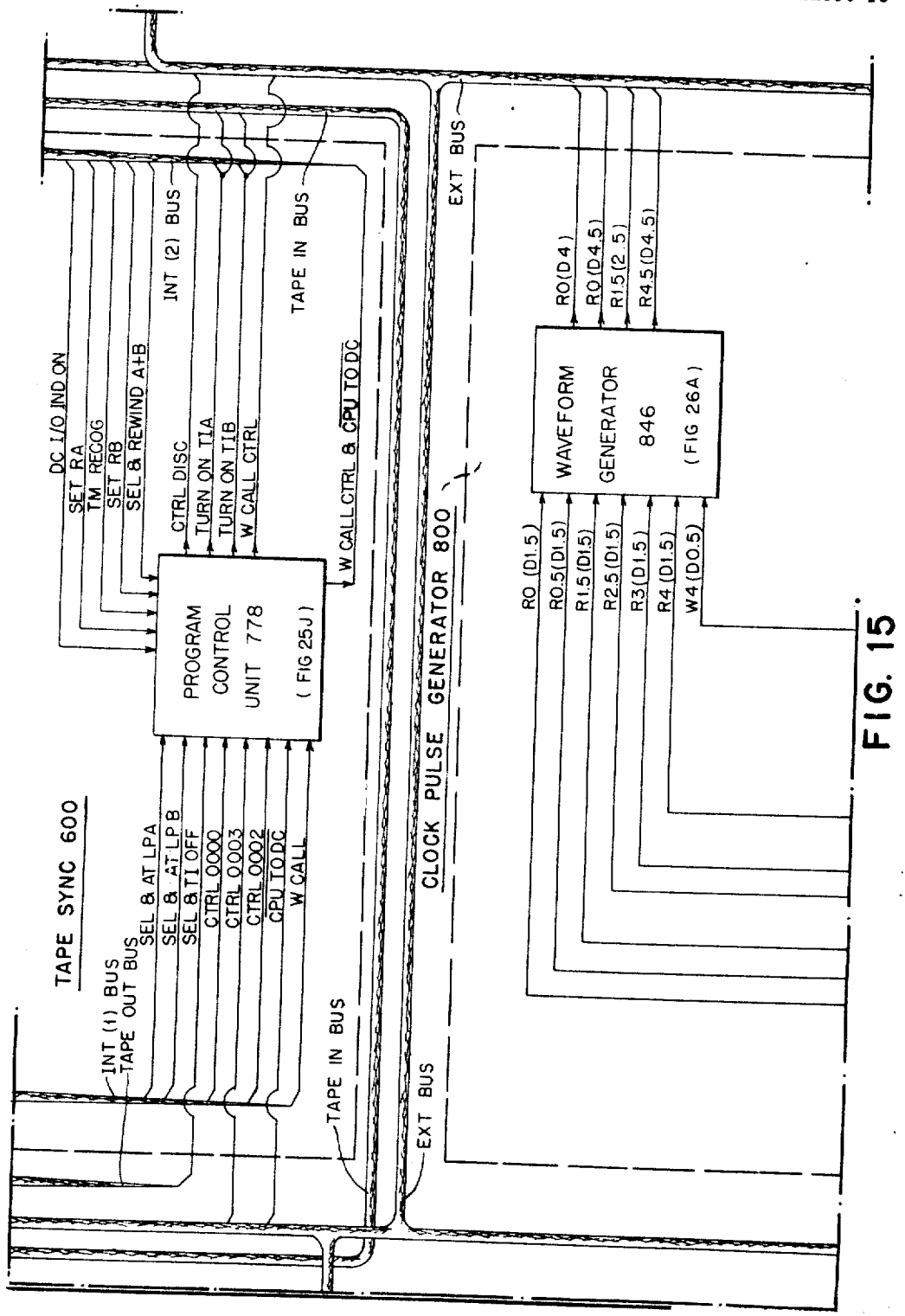

Fig. 15 shows the breakdown, in logical block form, of the remaining portion of the TAPE SYNCHRONIZER and a portion of the CLOCK PULSE GENERATOR.

Figure 16:
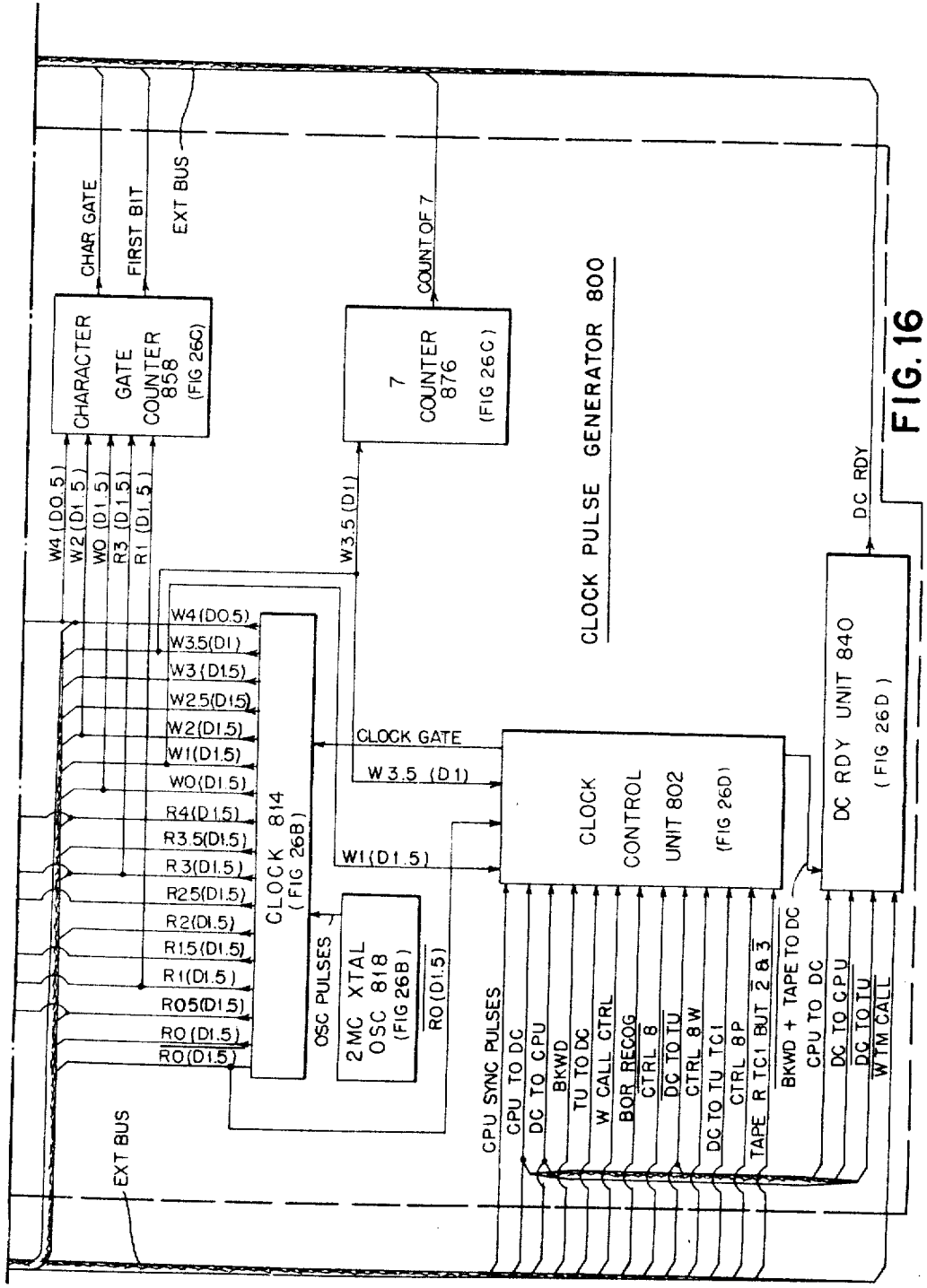

Fig. 16 illustrates the breakdown, in logical block form, of the remaining portion of the CLOCK PULSE GENERATOR.

Figure 17:
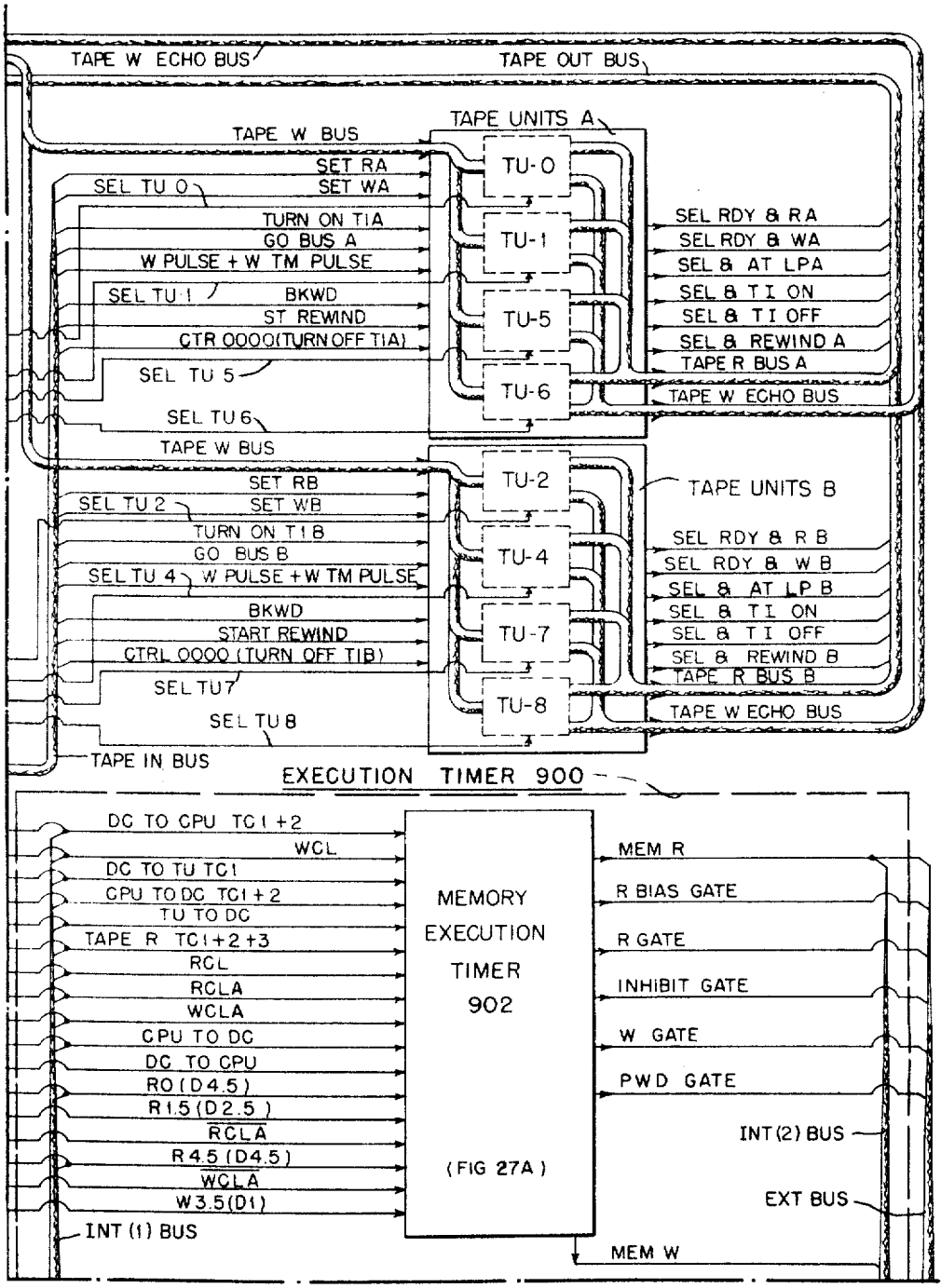

Fig. 17 shows, in logical block form, the TAPE UNITS and a portion of the EXECUTION TIMER.

Figure 18:
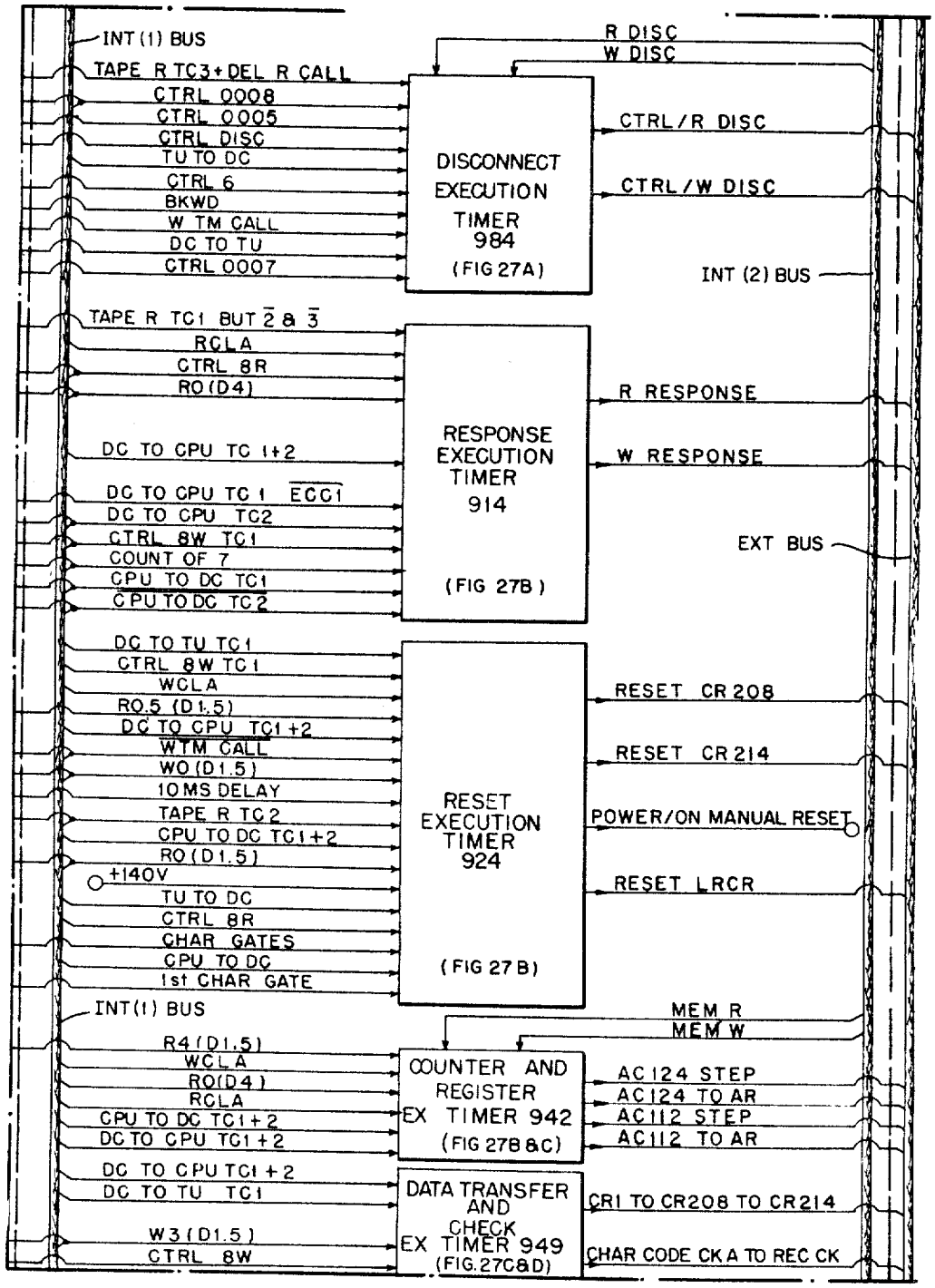
Figure 19:
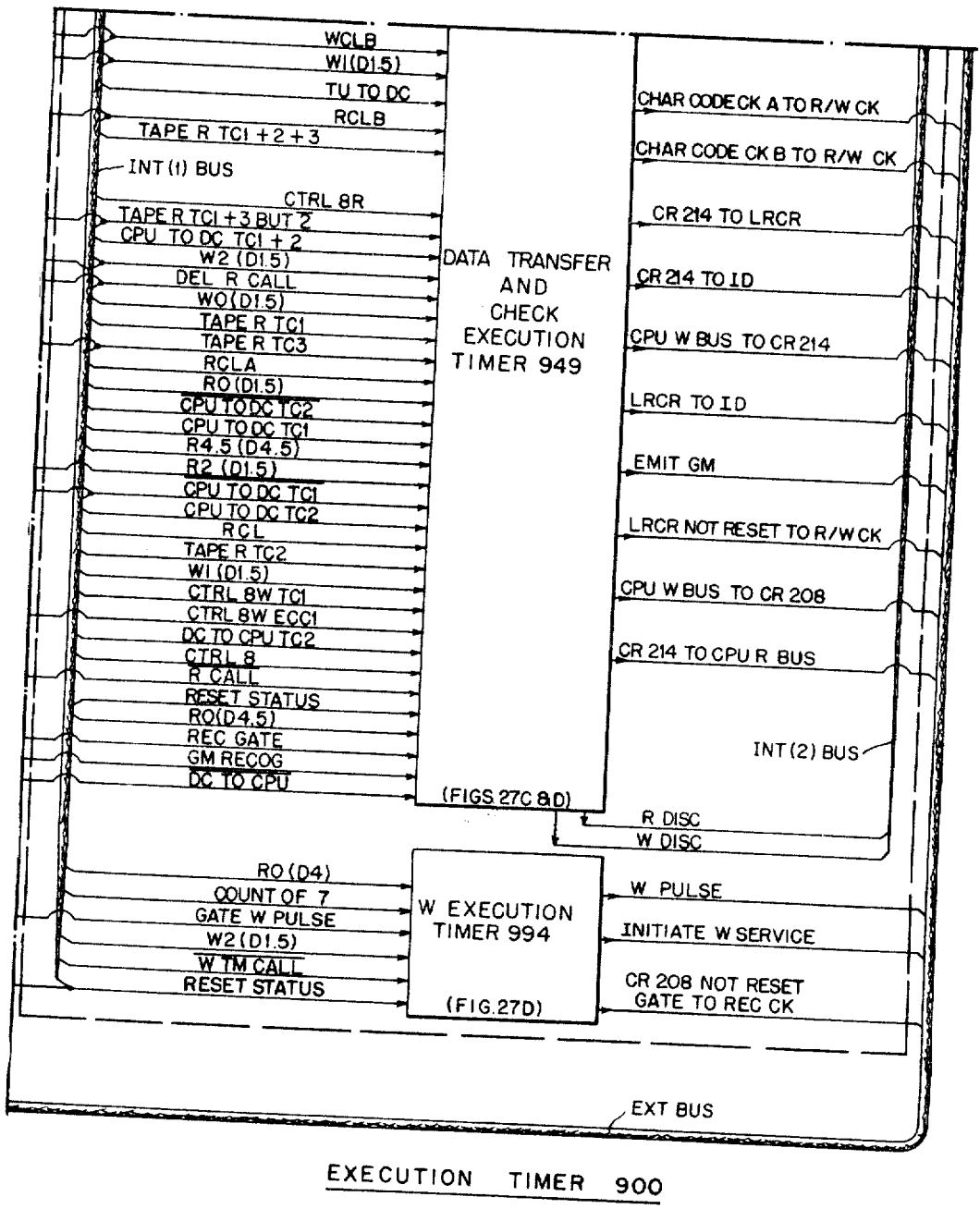

Figs. 18 and 19 show the breakdown, in logical block form, of the remaining portion of the EXECUTION TIMER.

Figure 20A:
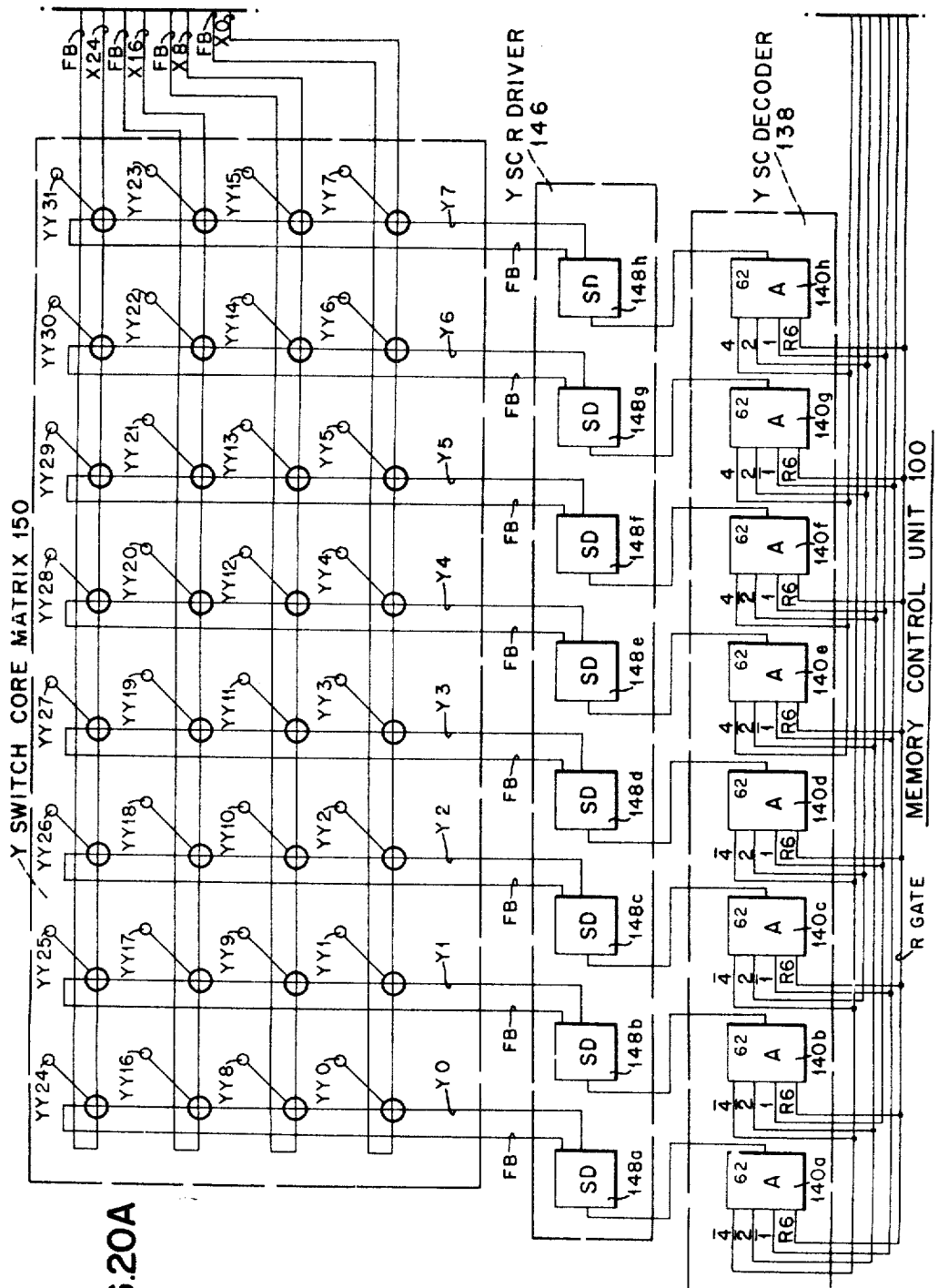
Figure 20G:
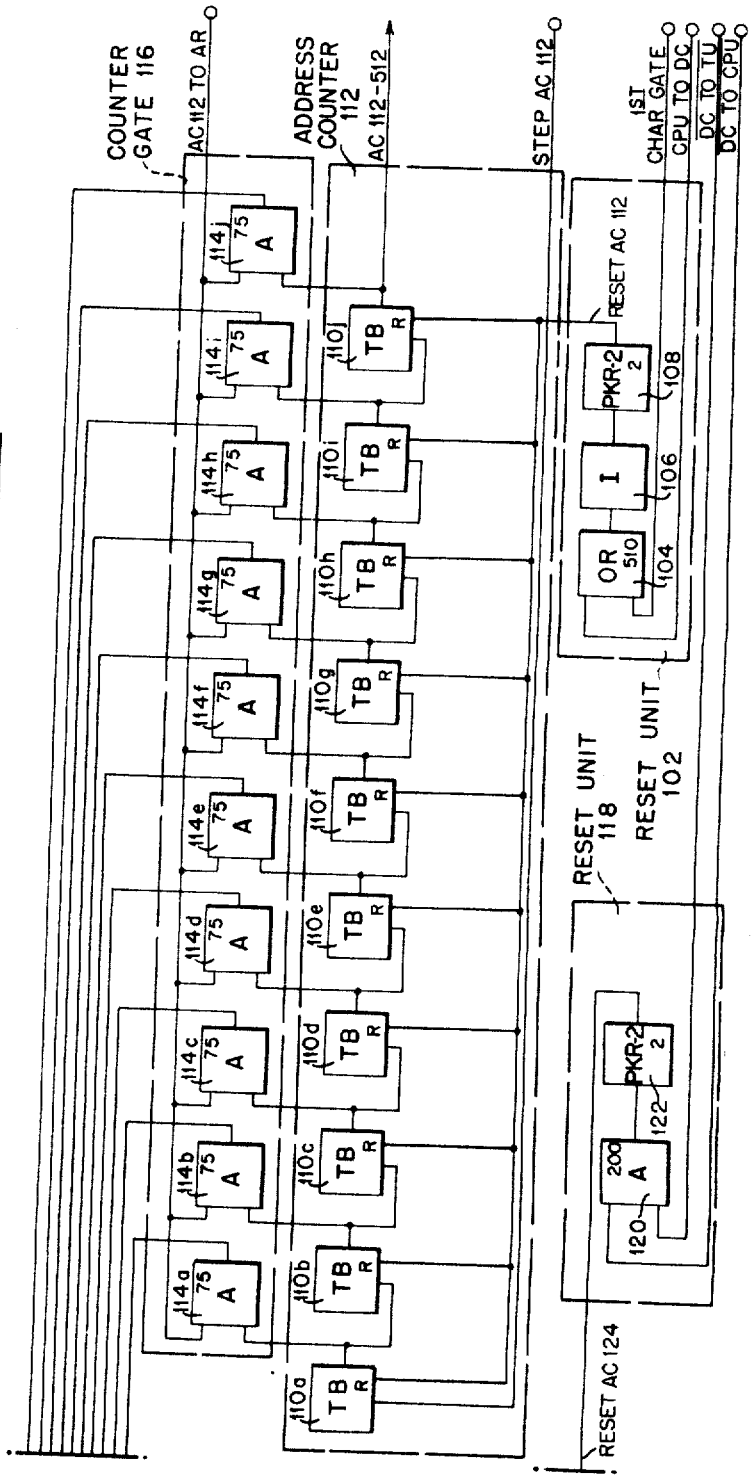

Fig. 20 illustrates how Figs. 20A to 20G, inclusive, may be placed to form a composite block diagram showing a breakdown, in symbolic block form, of the logical block diagrams of the MEMORY CONTROL UNIT.

Fig. 20A shows, in symbolic block form, the details of the Y SWITCH CORE MATRIX, the Y SC R DRIVER and the Y SC DECODER of the MEMORY CONTROL UNIT shown in Fig. 6.

Fig. 20B illustrates in symbolic block form, the details of the X SC BIAS & W DRIVER of the MEMORY CONTROL UNIT shown in Fig. 6.

Fig. 20C shows, in symbolic block form, the details of the X SC DECODERS of the MEMORY CONTROL UNIT shown in Fig. 6.

Fig. 20D illustrates, in symbolic block form, the details of the X SC BIAS & W DRIVER of the MEMORY CONTROL UNIT shown in Fig. 6.

Fig. 20E shows, in symbolic block form, the details of the X SWITCH CORE MATRIX, the Y SC R DRIVER and the Y SC DECODER of the MEMORY CONTROL UNIT shown in Fig. 6.

Fig. 20E1 shows a diagrammatic view of a SWITCH CORE used in the X and Y SWITCH CORE MATRICES of the MEMORY CONTROL UNIT shown in Fig. 6.

Fig. 20F illustrates, in symbolic block form, the details of the ADDRESS REGISTER, the COUNTER GATE and the ADDRESS COUNTER of the MEMORY CONTROL UNIT shown in Fig. 6.

Fig. 20G shows, in symbolic form, the details of the COUNTER GATE, the ADDRESS COUNTER and the RESET UNITS of the MEMORY CONTROL UNIT shown in Fig. 6.

Fig. 21 illustrates how Figs. 21A to 21F, inclusive, may be placed to form a composite block diagram showing a breakdown, in symbolic block form, of the logical block diagrams of the DATA TRANSFER & CHECK UNIT.

Figure 7:
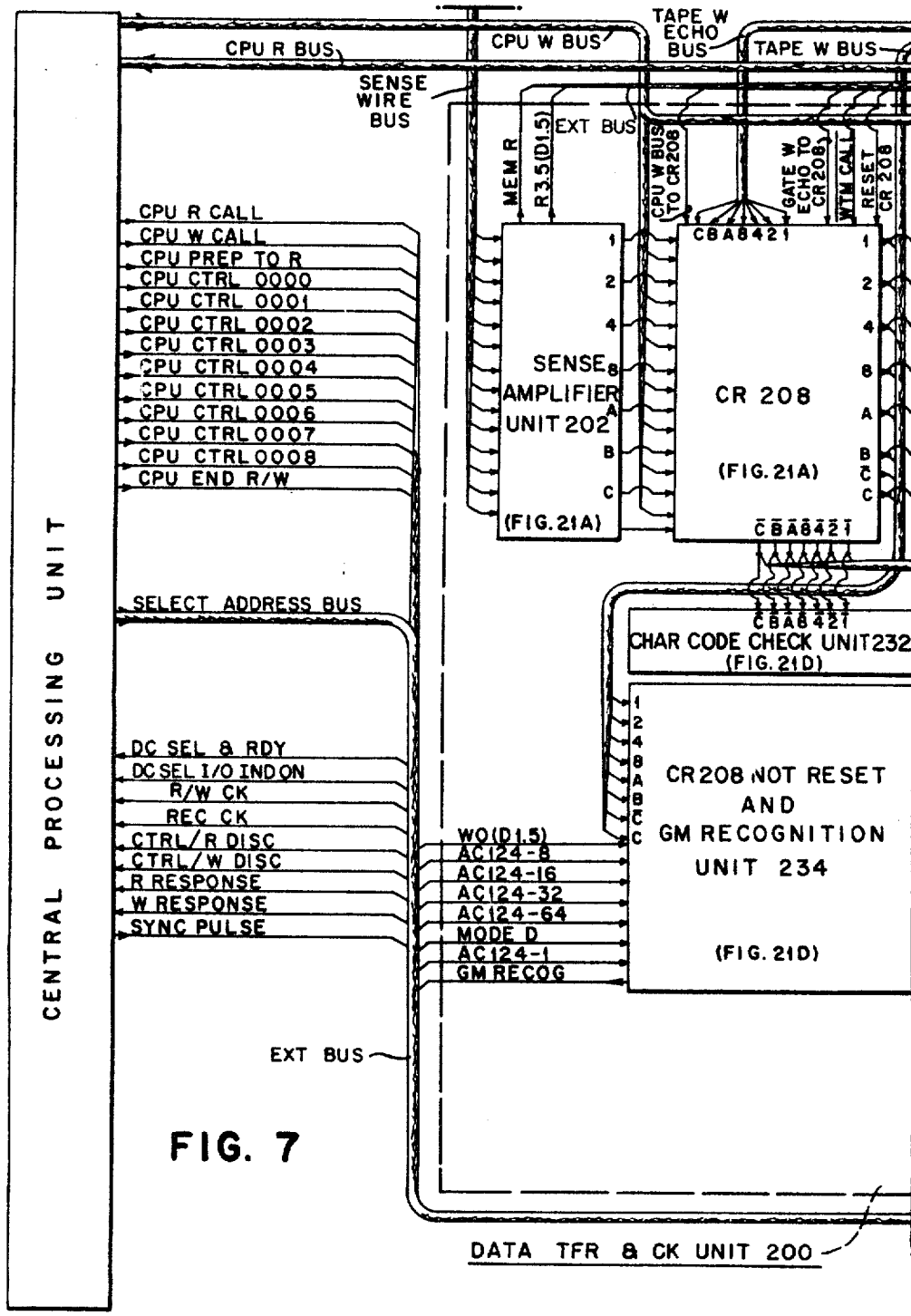
Figs. 7 and 8 illustrate the break down, in logical block form, of the DATA TRANSFER & CHECK UNIT.
Figure 21A:
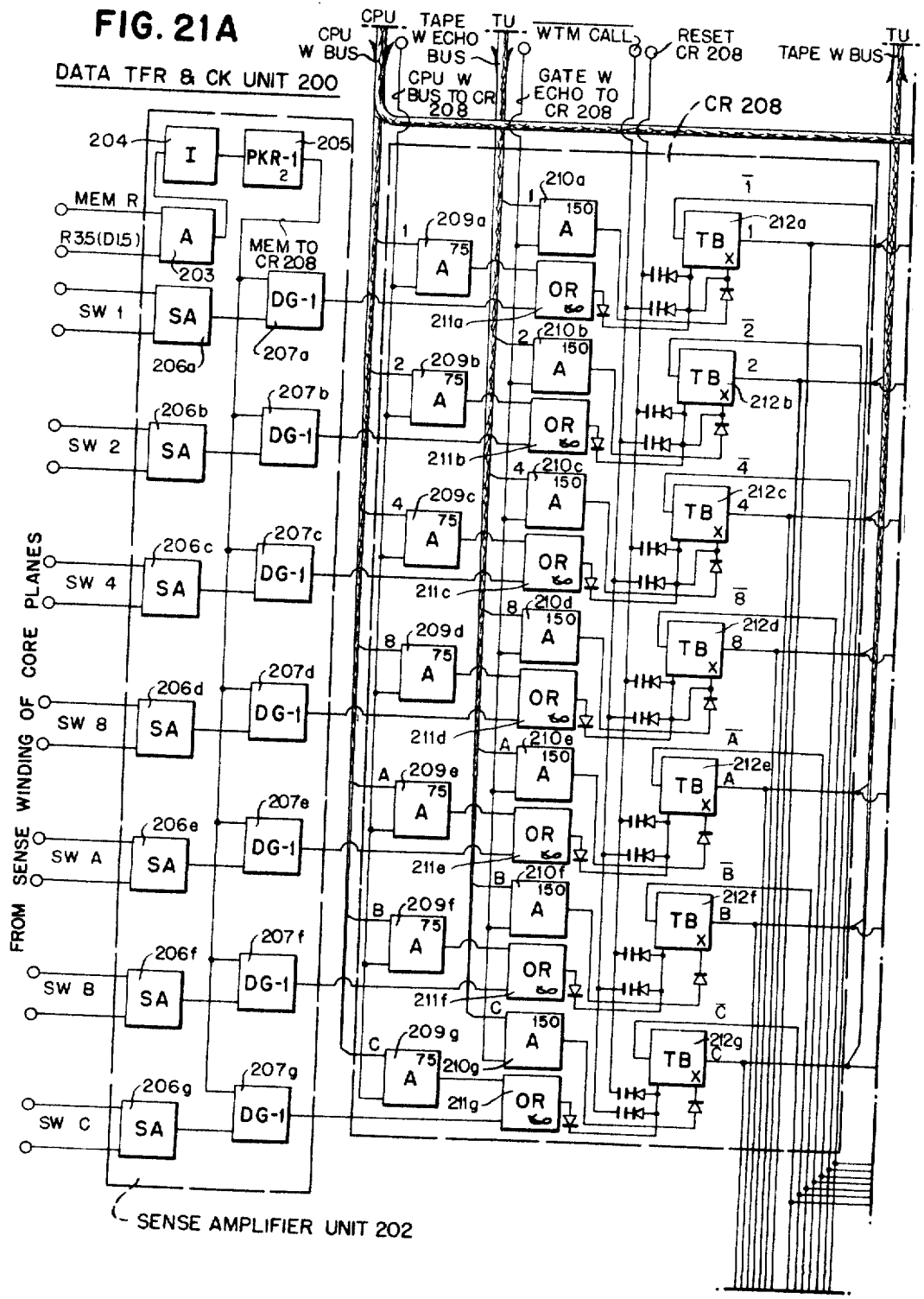

Fig. 21A shows, in symbolic block form, the details of the SENSE AMPLIFIER UNIT and a CHARACTER REGISTER of the DATA TRANSFER & CHECK UNIT shown in Fig. 7.

Figure 8:
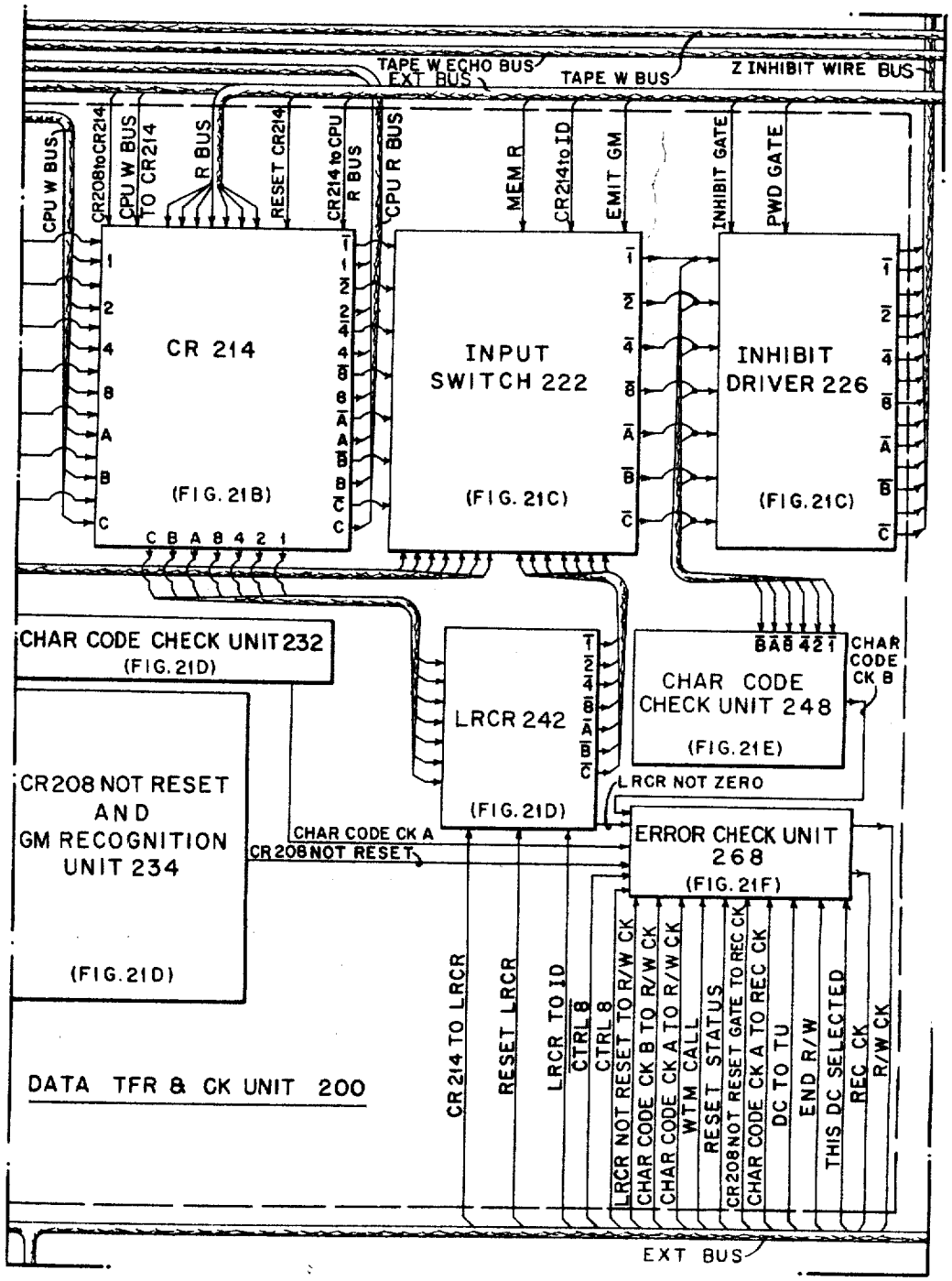
Figure 21B:
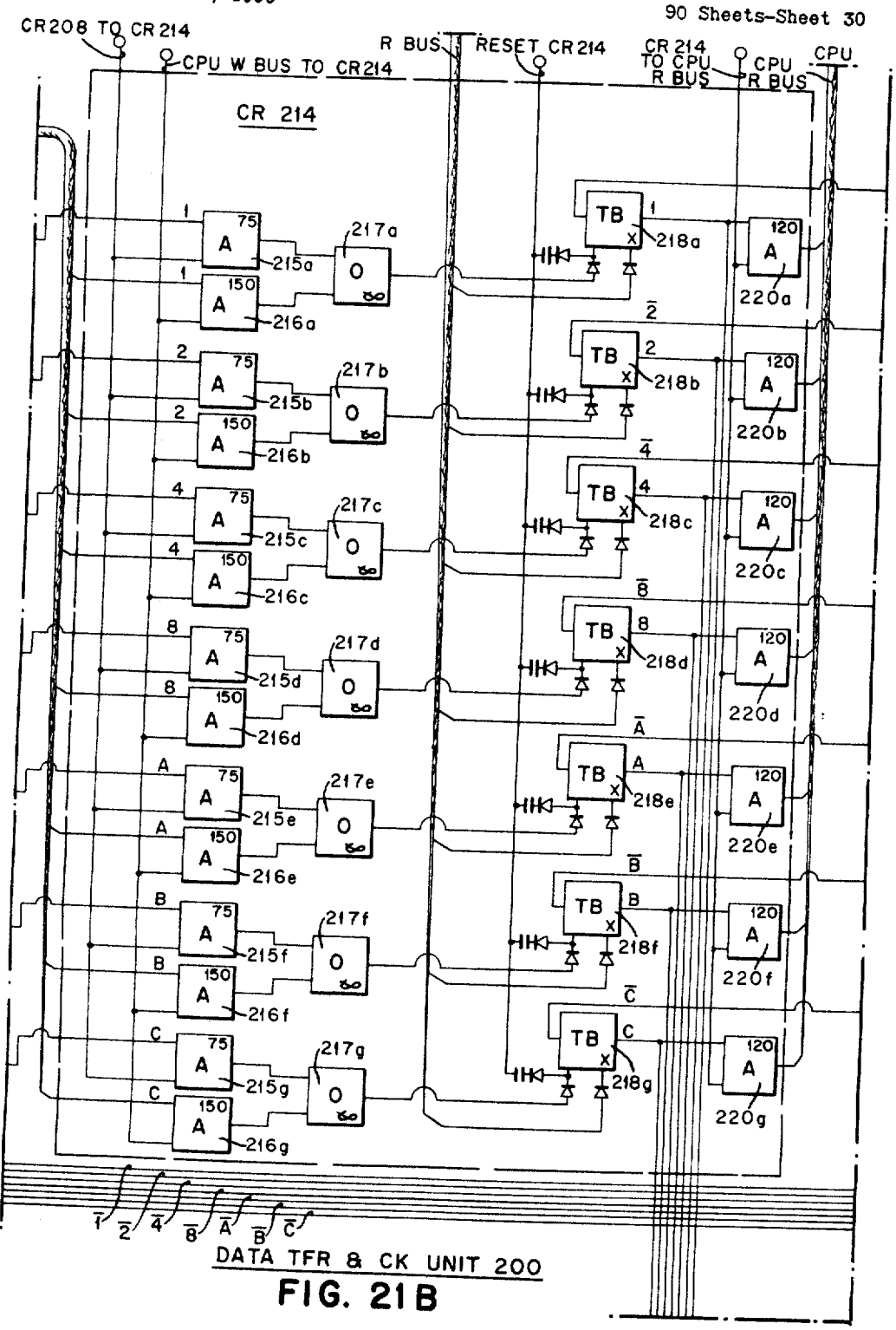

Fig. 21B illustrates in symbolic block form, the details of another CHARACTER REGISTER of the DATA TRANSFER & CHECK UNIT shown in Fig. 8.

Figure 21C:
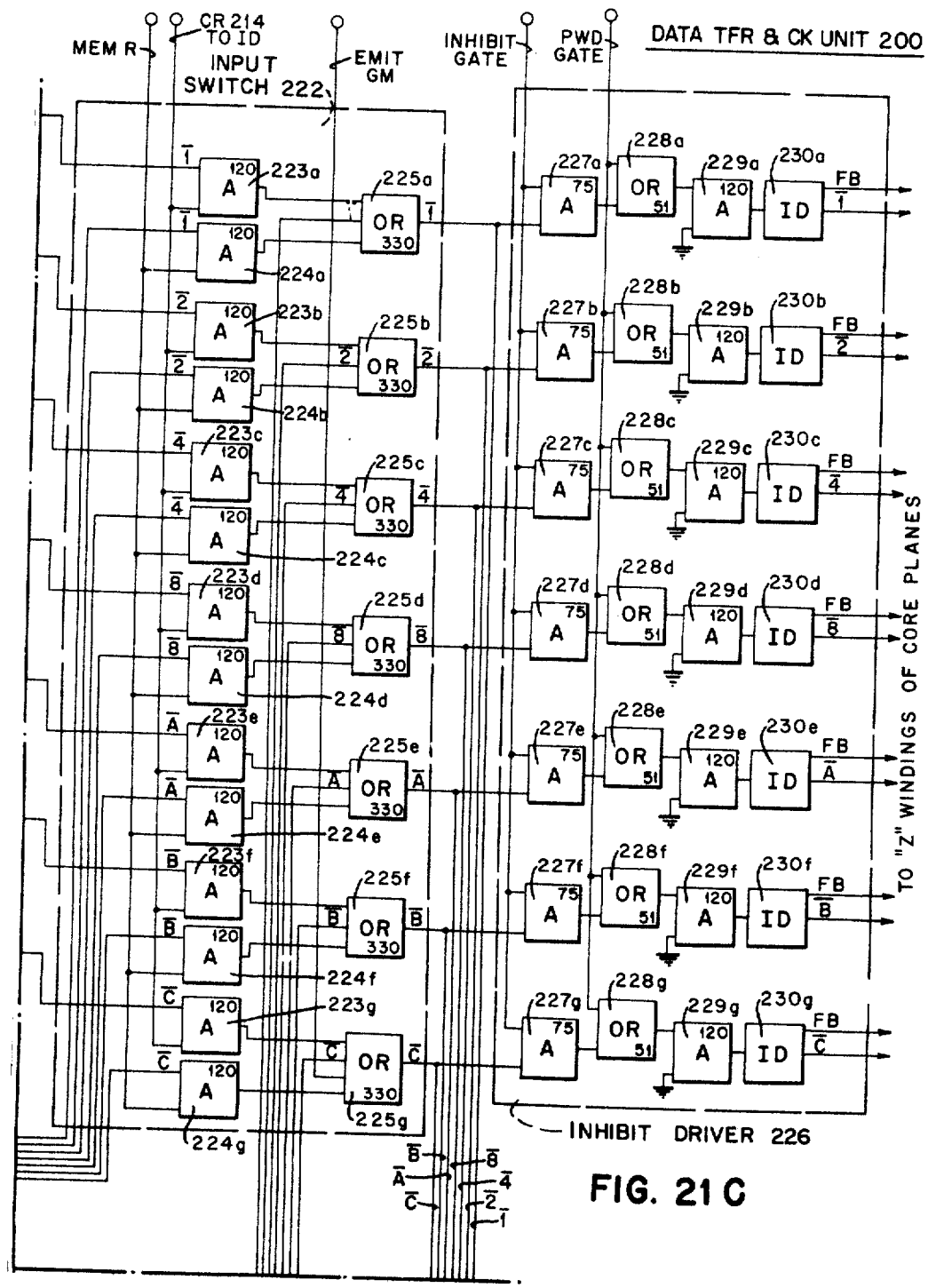

Fig. 21C illustrates, in symbolic block form, the INPUT SWITCH and INHIBIT DRIVER of the DATA TRANSFER & CHECK UNIT shown in Fig. 8.

Fig. 21D illustrates, in symbolic block form, the details of the LRCR, the CR 208 NOT RESET & GM RECOGNITION UNIT and the CHAR CODE CHECK UNIT of the DATA TRANSFER & CHECK UNIT shown in Figs. 7 and 8.

Figure 21E:
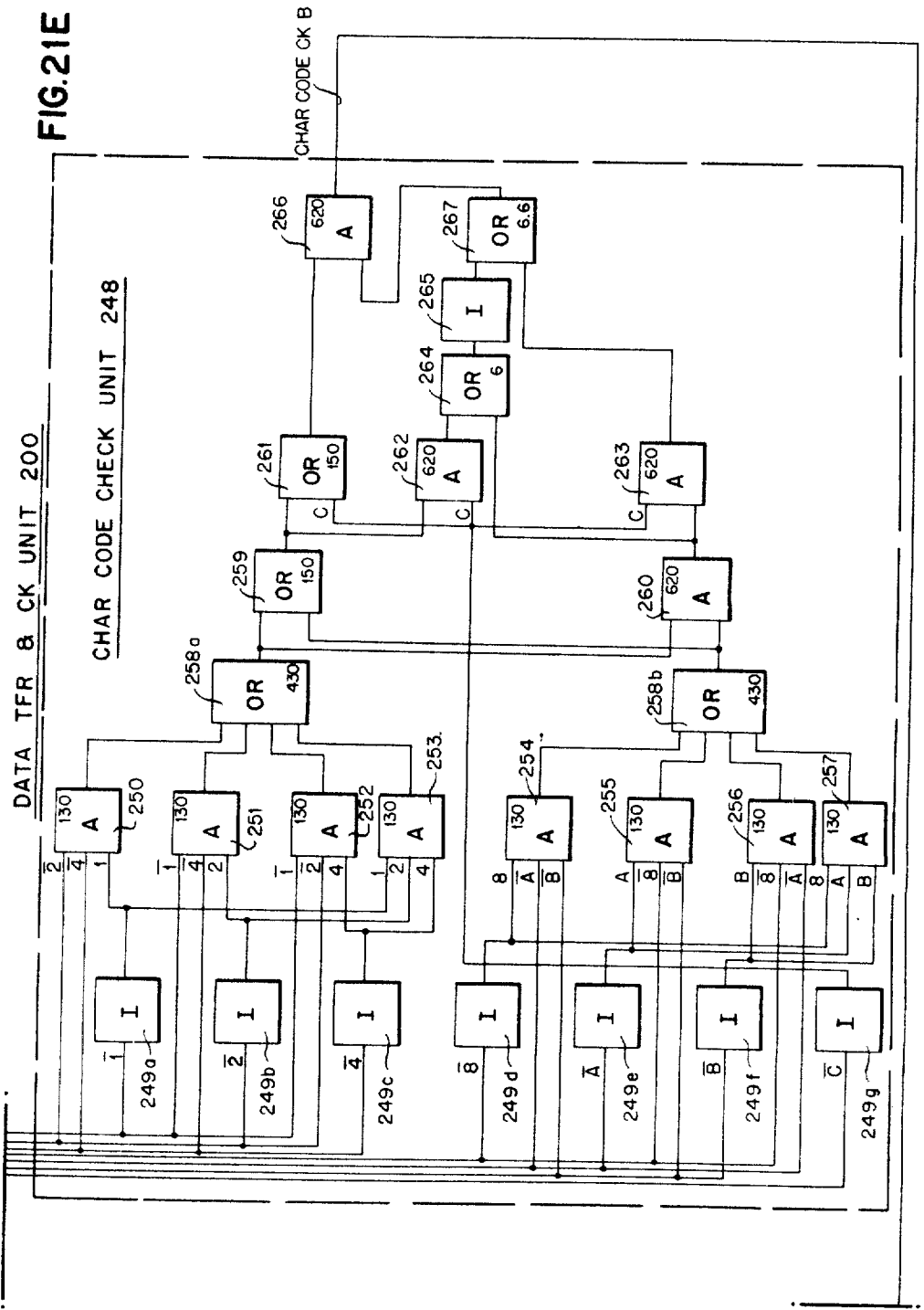

Fig. 21E illustrates, in symbolic block form, the details of the CHAR CODE CHECK UNIT shown in Fig. 8.

Fig. 21F illustrates, in symbolic block form, the details of the ERROR CHECK UNIT of the DATA TRANSFER CHECK UNIT shown in Fig. 8.

Figure 9:
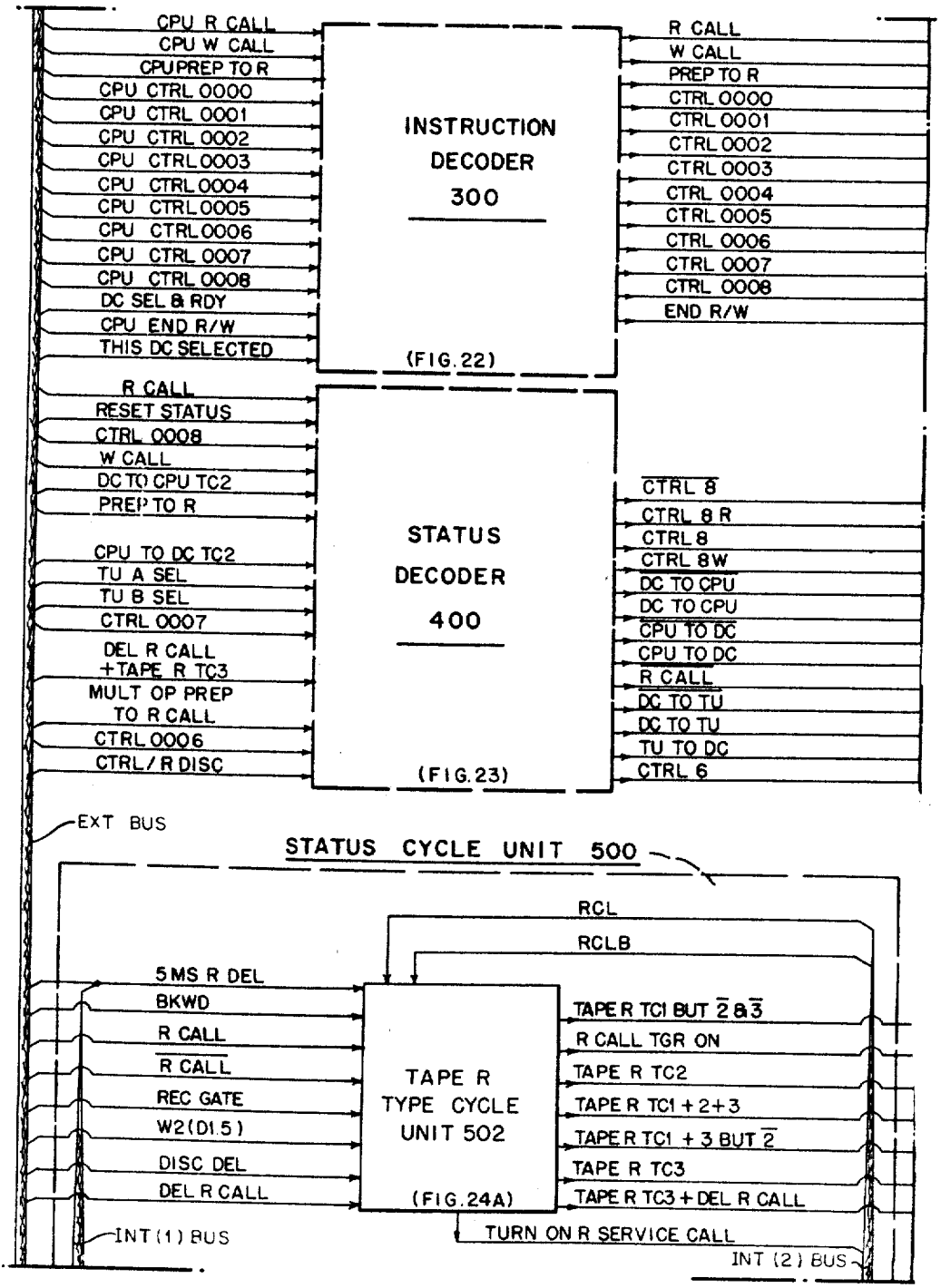
Fig. 9 illustrates, in logical block form, the INSTRUCTION DECODER, STATUS DECODER and a portion of the STATUS CYCLE UNIT.

Fig. 22 shows, in symbolic block form, the details of the INSTRUCTION DECODER shown in Fig. 9.

Fig. 23 illustrates, in symbolic block form, the details of the STATUS DECODER shown in Fig. 9.

Figure 24B:
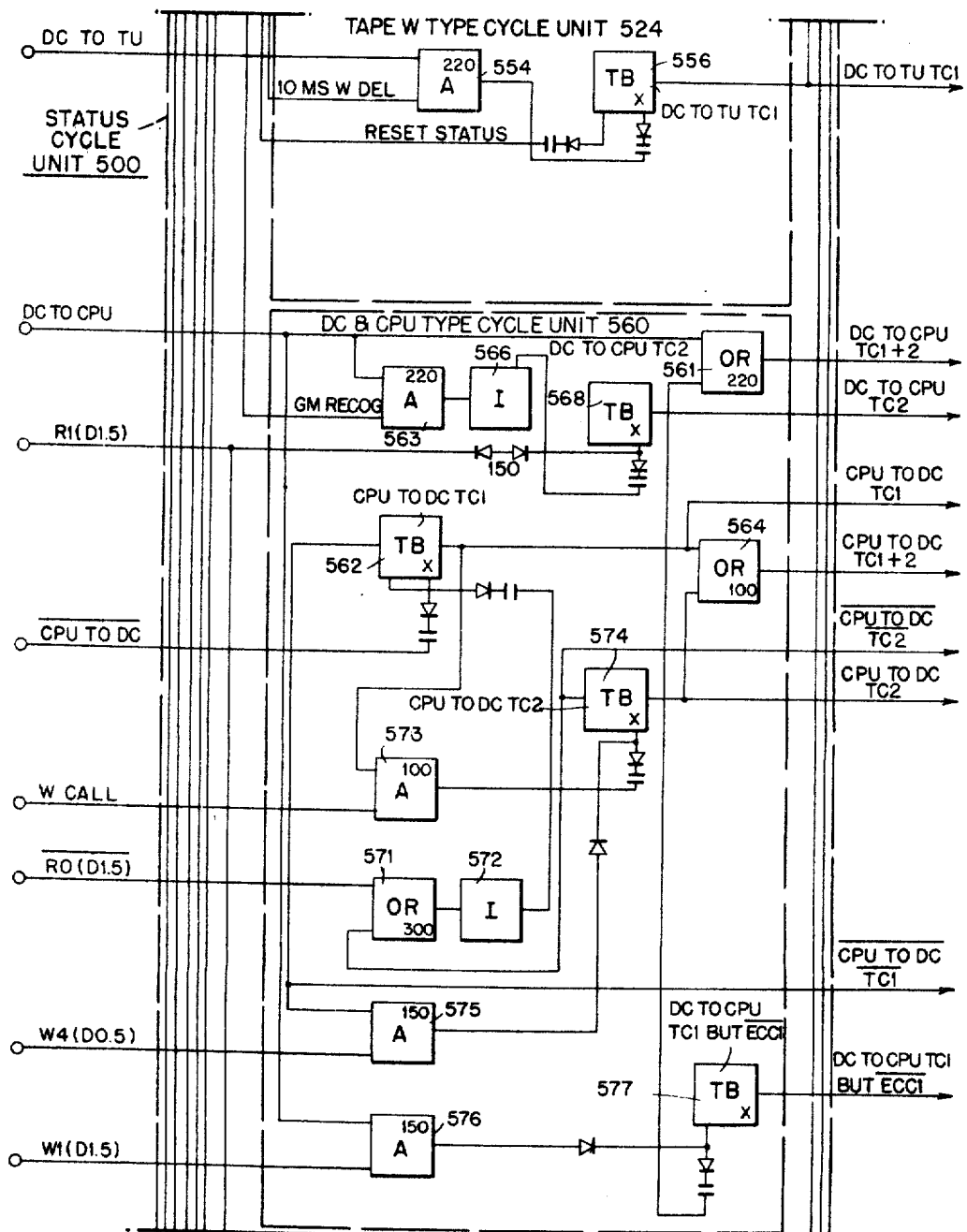
Figure 24C:
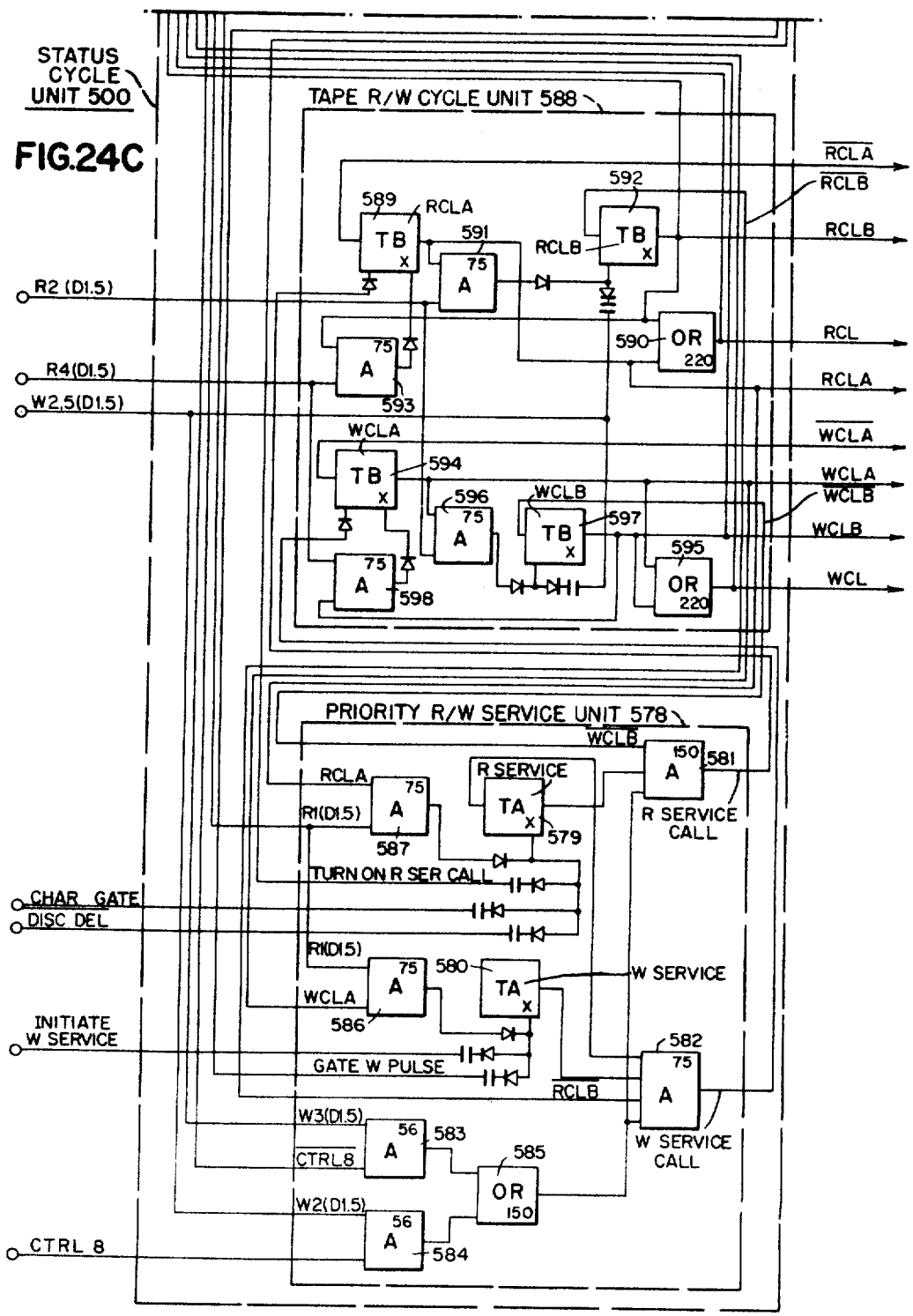

Fig. 24 illustrates how Figs. 24A to 24C, inclusive, may be placed to form a composite block diagram showing the breakdown, in symbolic block form, of the logical block diagrams of the STATUS CYCLE UNIT.

Figure 10:
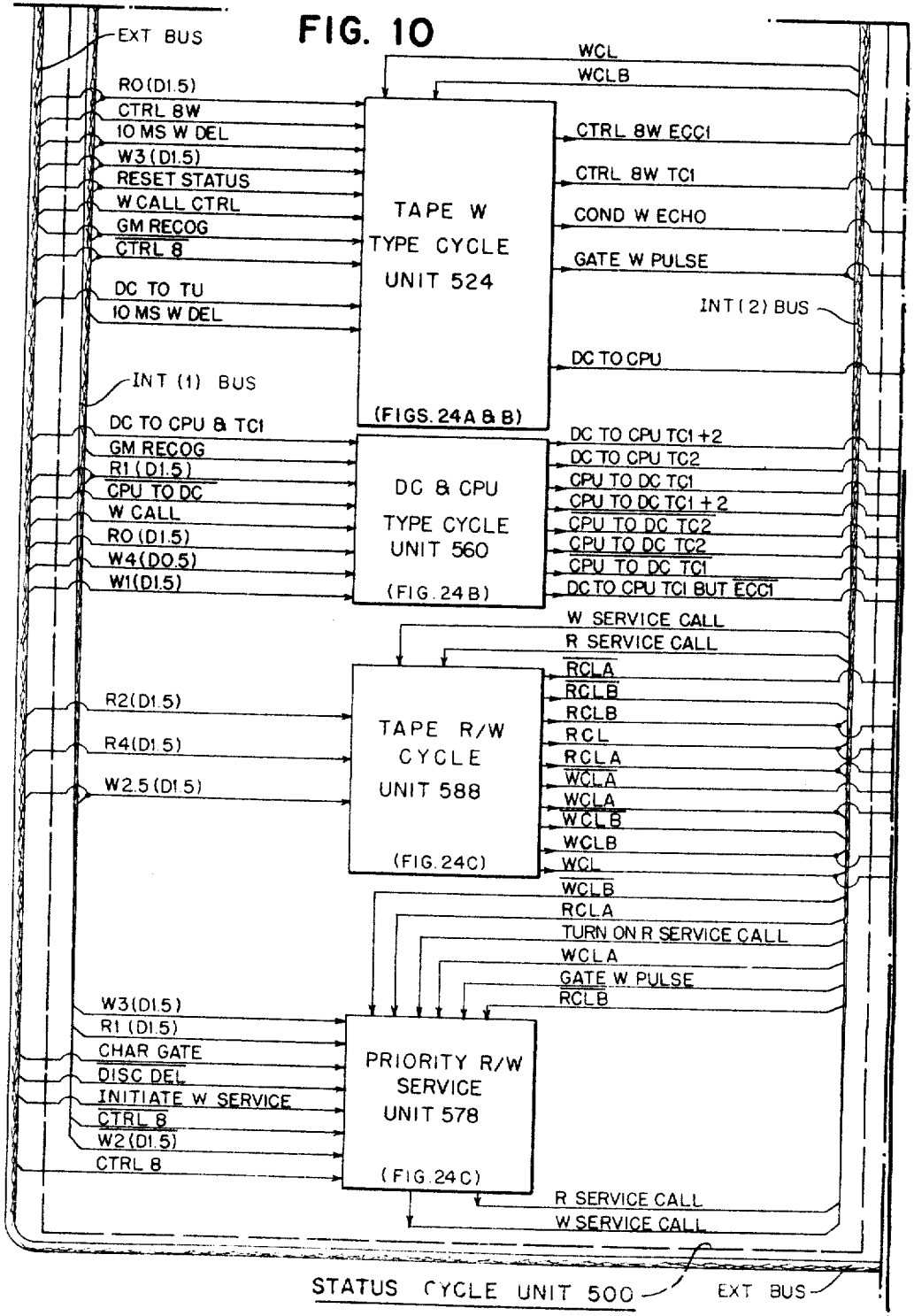
Fig. 10 shows the breakdown, in logical block form, of the remaining portion of the STATUS CYCLE UNIT.

Fig. 24A illustrates, in symbolic form, the details of the TAPE R TYPE CYCLE UNIT and a portion of the TAPE W TYPE CYCLE UNIT of the STATUS CYCLE UNIT shown in Figs. 9 and 10.

Fig. 24B shows, in symbolic form, the details of the remaining portion of the TAPE W TYPE CYCLE UNIT and the DC & CPU TYPE CYCLE UNIT of the STATUS CYCLE UNIT shown in Fig. 10.

Fig. 24C illustrates, in symbolic block form, the details of the TAPE R/W CYCLE UNIT and the PRIORITY R/W SERVICE UNIT of the STATUS CYCLE UNIT shown in Fig. 10.

Figure 25G:
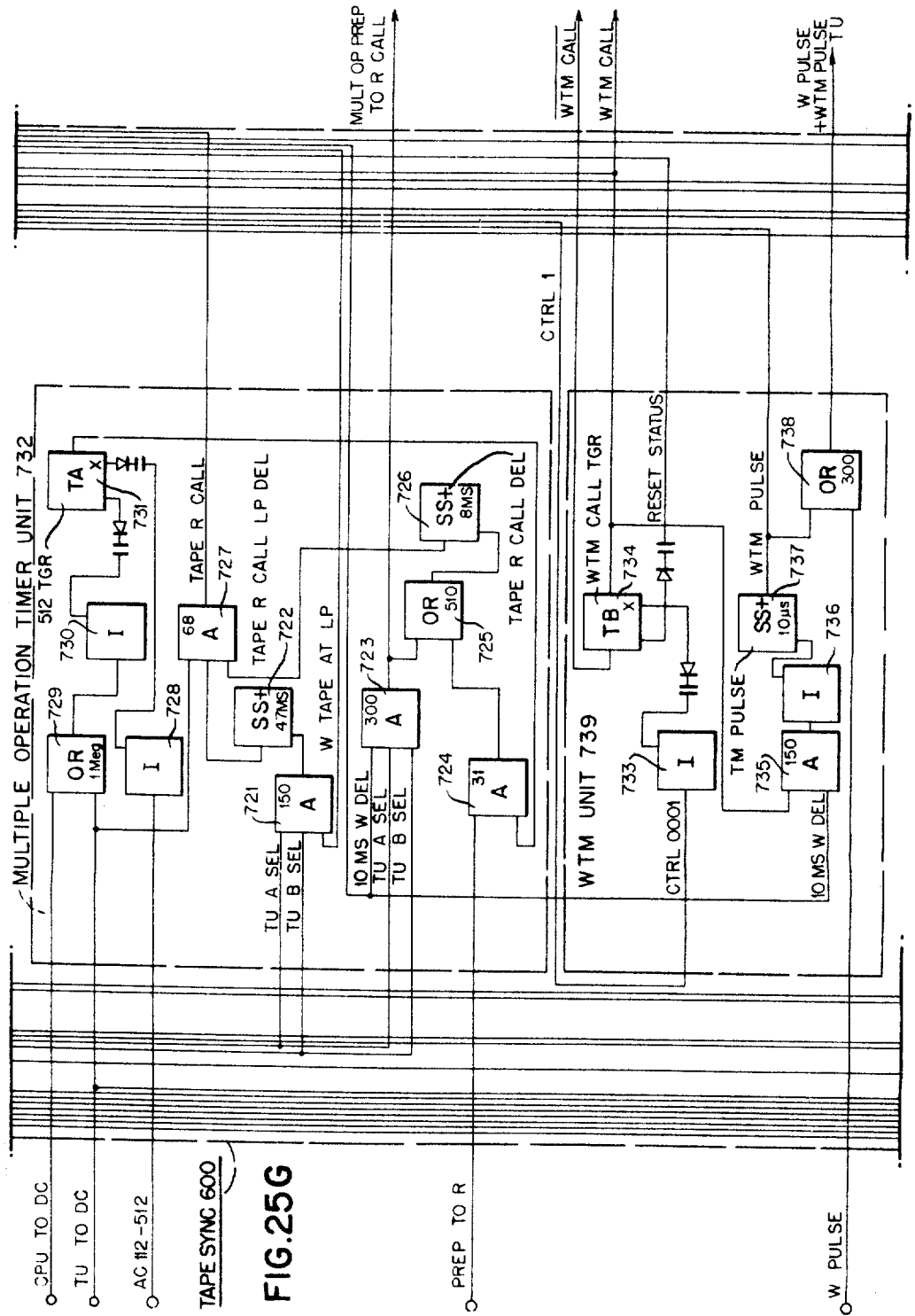

Fig. 25 shows how Figs. 25A to 25J, inclusive, may be placed to form a composite block diagram showing a breakdown, in symbolic block form, of the logical block diagrams of the TAPE SYNCHRONIZER.

Figure 12:
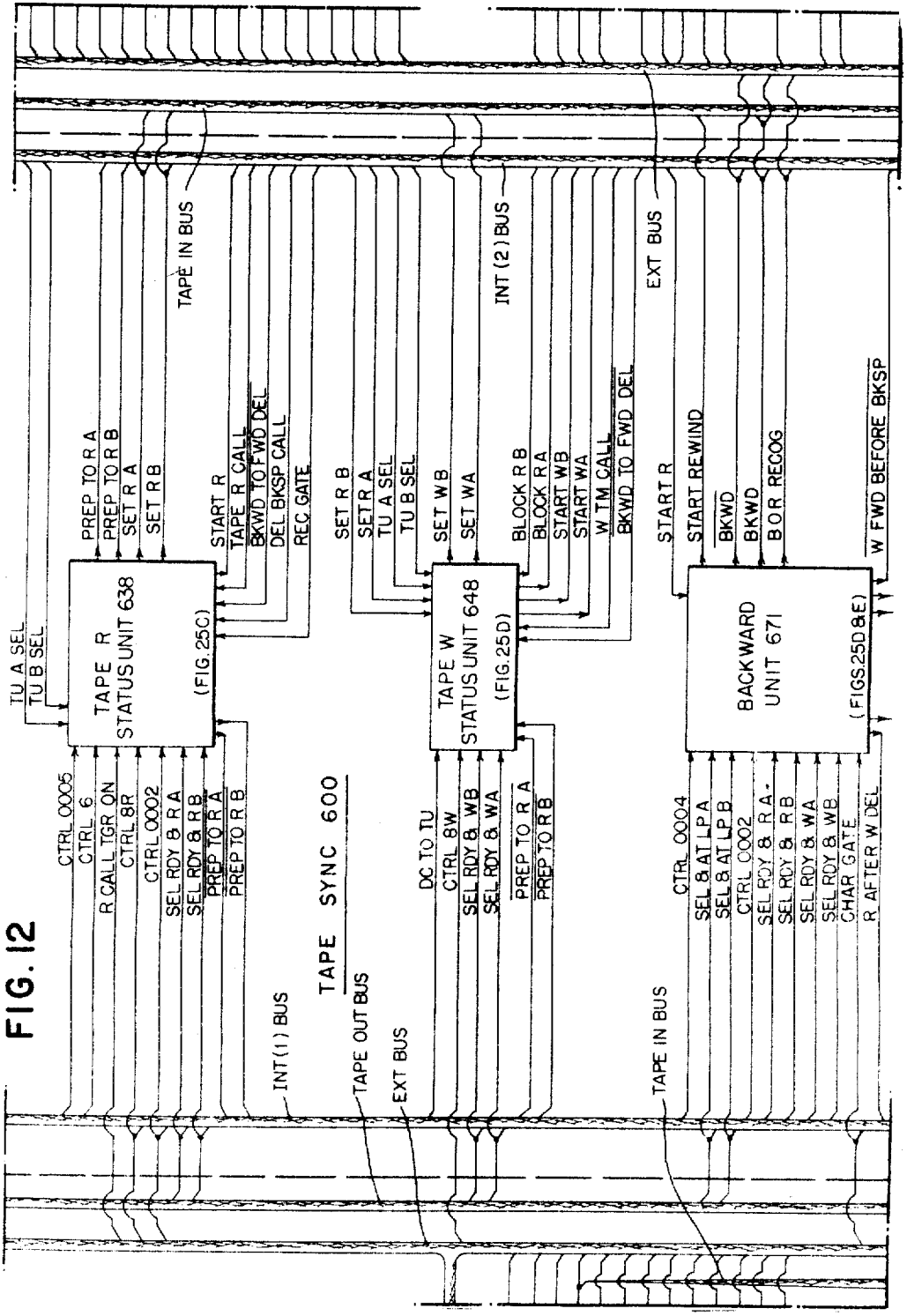

Figs. 25A and 25B illustrate, in symbolic block form, the details of the TAPE R STATUS UNIT of the TAPE SYNCHRONIZER shown in Fig. 12.

Fig. 25D shows, in symbolic block form, the details of the TAPE W STATUS UNIT and a portion of the BACKWARD UNIT of the TAPE SYNCHRONIZER shown in Fig. 12.

Figure 13:
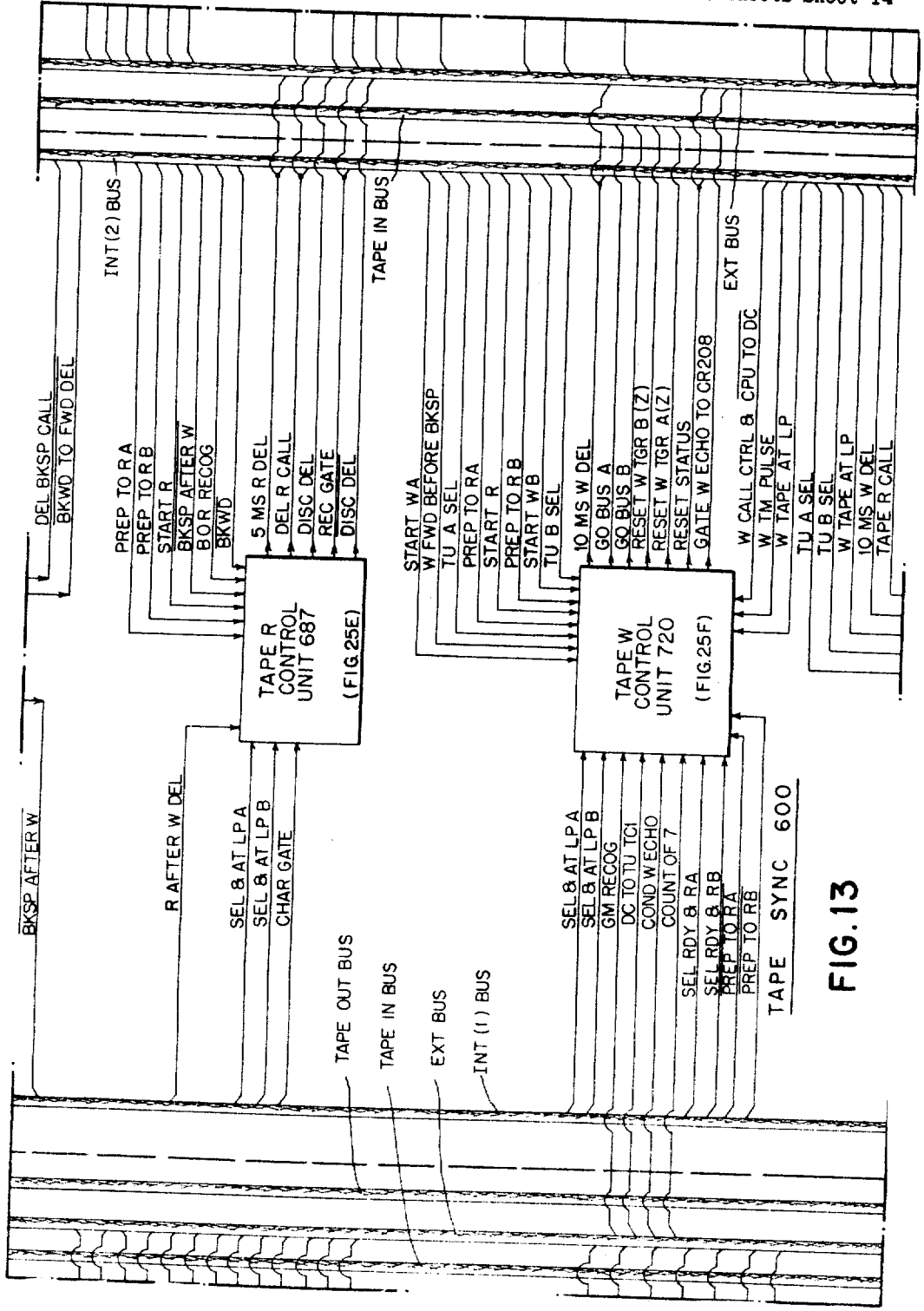

Fig. 25E illustrates, in symbolic block form, the details of the remaining portion of the BACKWARD UNIT and the TAPE R CONTROL UNIT of the TAPE SYNCHRONIZER shown in Figs. 12 and 13.

Fig. 25F shows, in symbolic block form, the details of the TAPE W CONTROL UNIT of the TAPE SYNCHRONIZER shown in Fig. 13.

Figure 14:
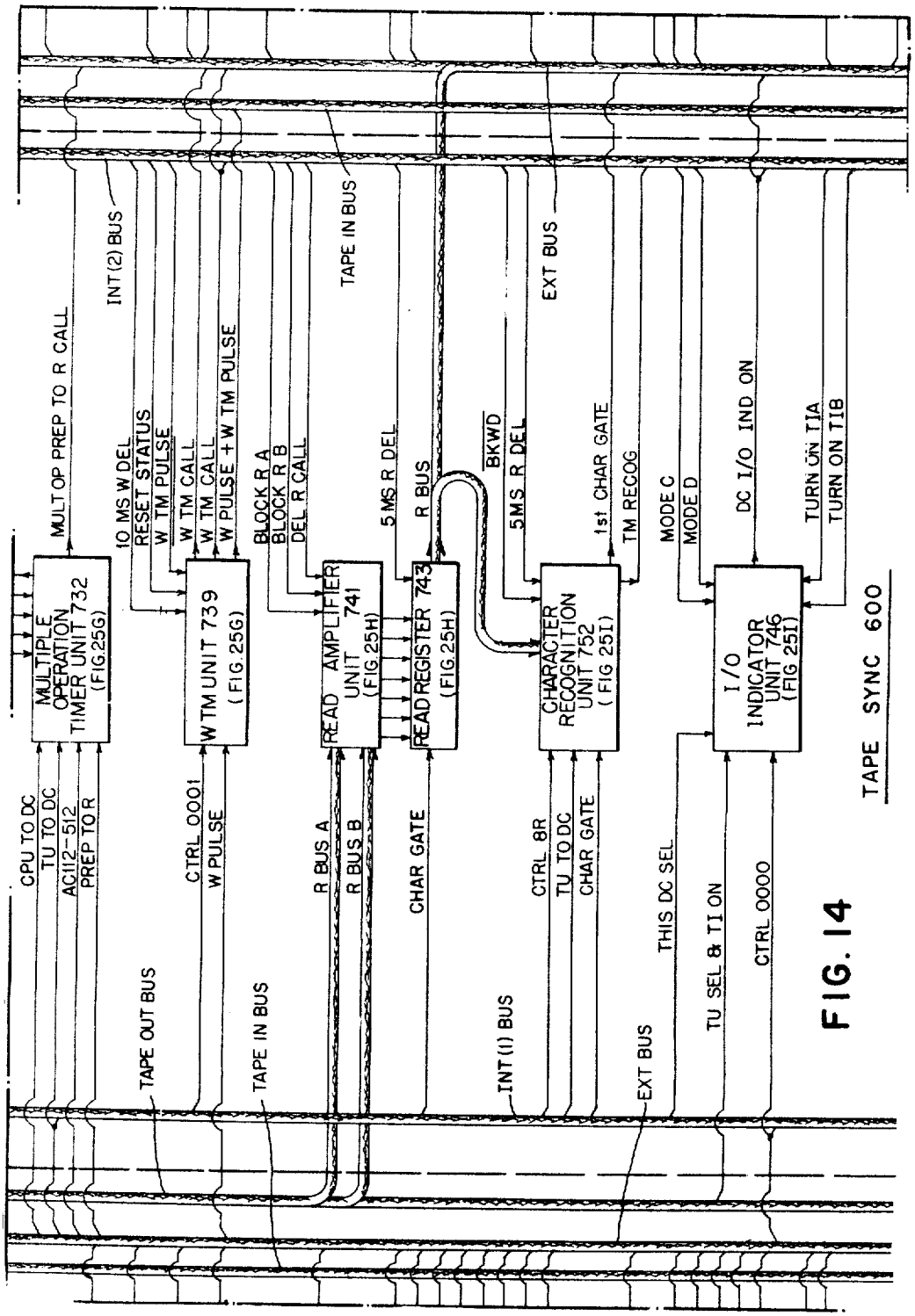

Fig. 25G illustrates, in symbolic block form, the details of the MULTIPLE OPERATION TIMER UNIT and the W TM UNIT of the TAPE SYNCHRONIZER shown in Fig. 14.

Fig. 25H shows, in symbolic block form, the details of the READ AMPLIFIER UNIT and the READ REGISTER of the TAPE SYNCHRONIZER shown in Fig. 14.

Fig. 25I illustrates, in symbolic block form, the details of the CHARACTER RECOGNITION UNIT and the I/O INDICATOR UNIT of the TAPE SYNCHRONIZER shown in Fig. 14.

Fig. 25J shows, in symbolic block form, the details of the PROGRAM CONTROL UNIT of the TAPE SYNCHRONIZER shown in Fig. 15.

Figure 26D:
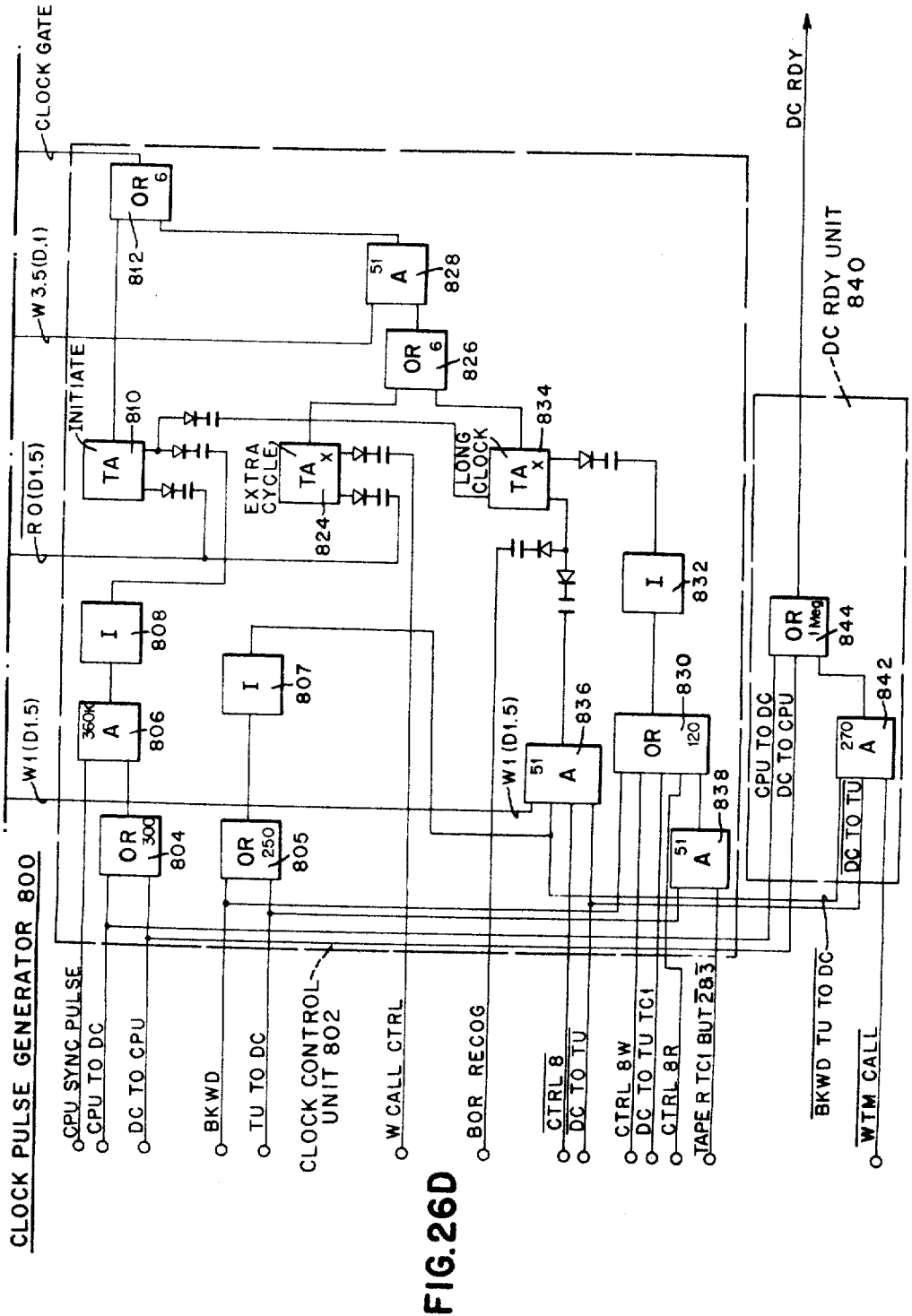

Fig. 26 illustrates how Figs. 26A to 26D, inclusive, may be placed to form a composite block diagram showing a breakdown, in symbolic block form, of the logical block diagrams of the CLOCK PULSE GENERATOR.

Fig. 26A shows, in symbolic block form, the details of the WAVEFORM GENERATOR of the CLOCK PULSE GENERATOR shown in Fig. 15.

Fig. 26B illustrates, in symbolic block form, the details of the CLOCK of the CLOCK PULSE GENERATOR shown in Fig. 16.

Fig. 26C shows, in symbolic block form, the details of the CHARACTER GATE COUNTER and the 7 COUNTER of the CLOCK PULSE GENERATOR shown in Fig. 16.

Fig. 26D illustrates, in symbolic block form, the details of the CLOCK CONTROL UNIT and the DC RDY UNIT of the CLOCK PULSE GENERATOR shown in Fig. 16.

Figure 27A:
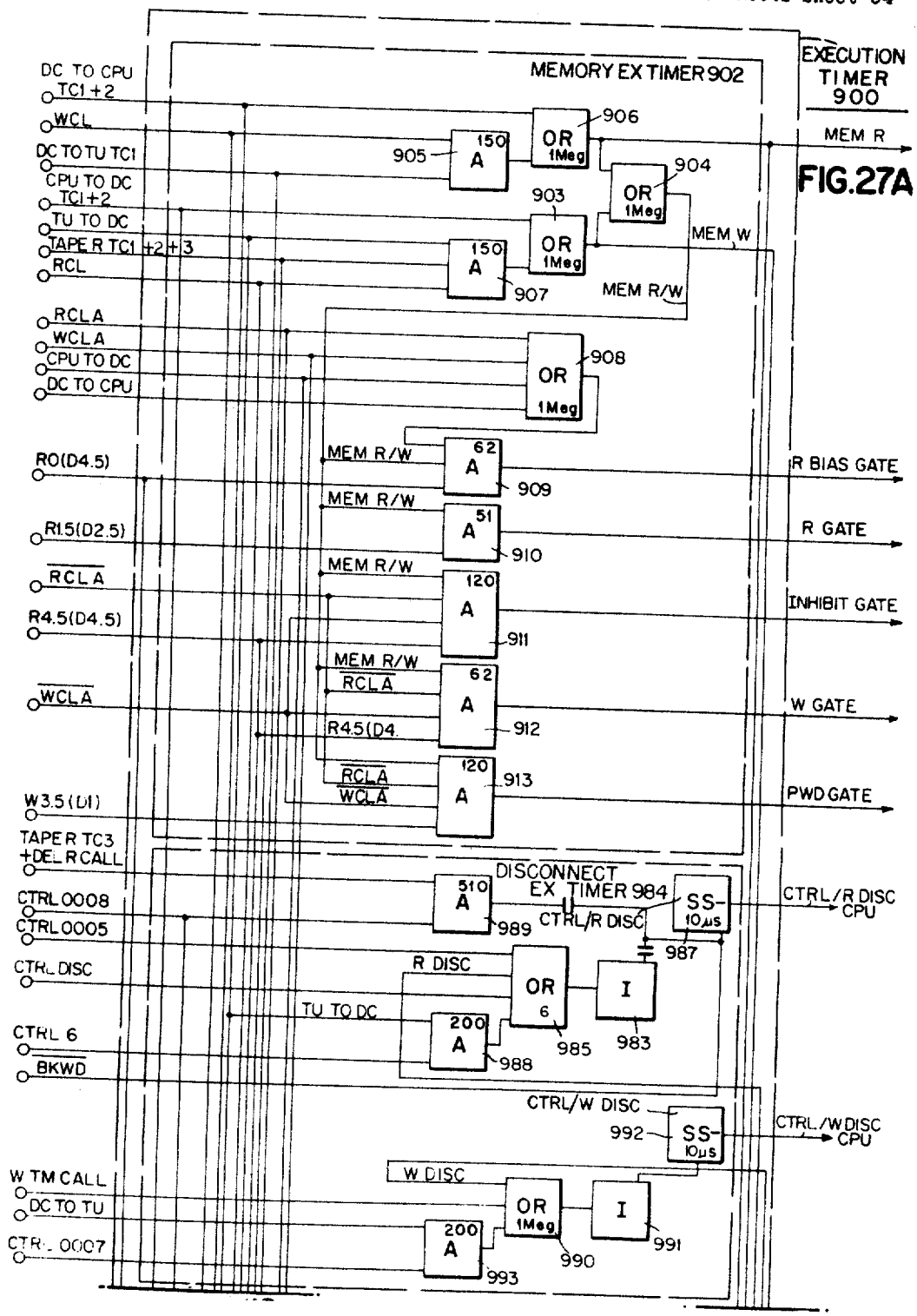

Fig. 27 illustrates how Figs. 27A to 27D, inclusive, may be placed to form a composite diagram showing a breakdown, in symbolic block form, of the logical block diagrams of the EXECUTION TIMER.

Fig. 27A shows, in symbolic block form, the details of the MEMORY EX TIMER and the DISCONNECT EX TIMER of the EXECUTION TIMER shown in Fig. 17.

Fig. 27B illustrates, in symbolic block form, the details of the RESPONSE EX TIMER, the RESET EX TIMER and a portion of the CTR & REG EX TIMER of the EXECUTION TIMER shown in Fig. 18.

Fig. 27C shows, in symbolic block form, the details of the remaining portion of the CTR & REG EX TIMER and a portion of the DATA TFR & CK EX TIMER of the EXECUTION TIMER shown in Figs. 18 and 19.

Fig. 27D illustrates, in symbolic block form, the details of the remaining portion of the DATA TFR & CK EX TIMER and the W EX TIMER of the EXECUTION TIMER shown in Fig. 19.

Figure 28:
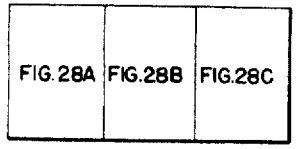
Figure 28C:
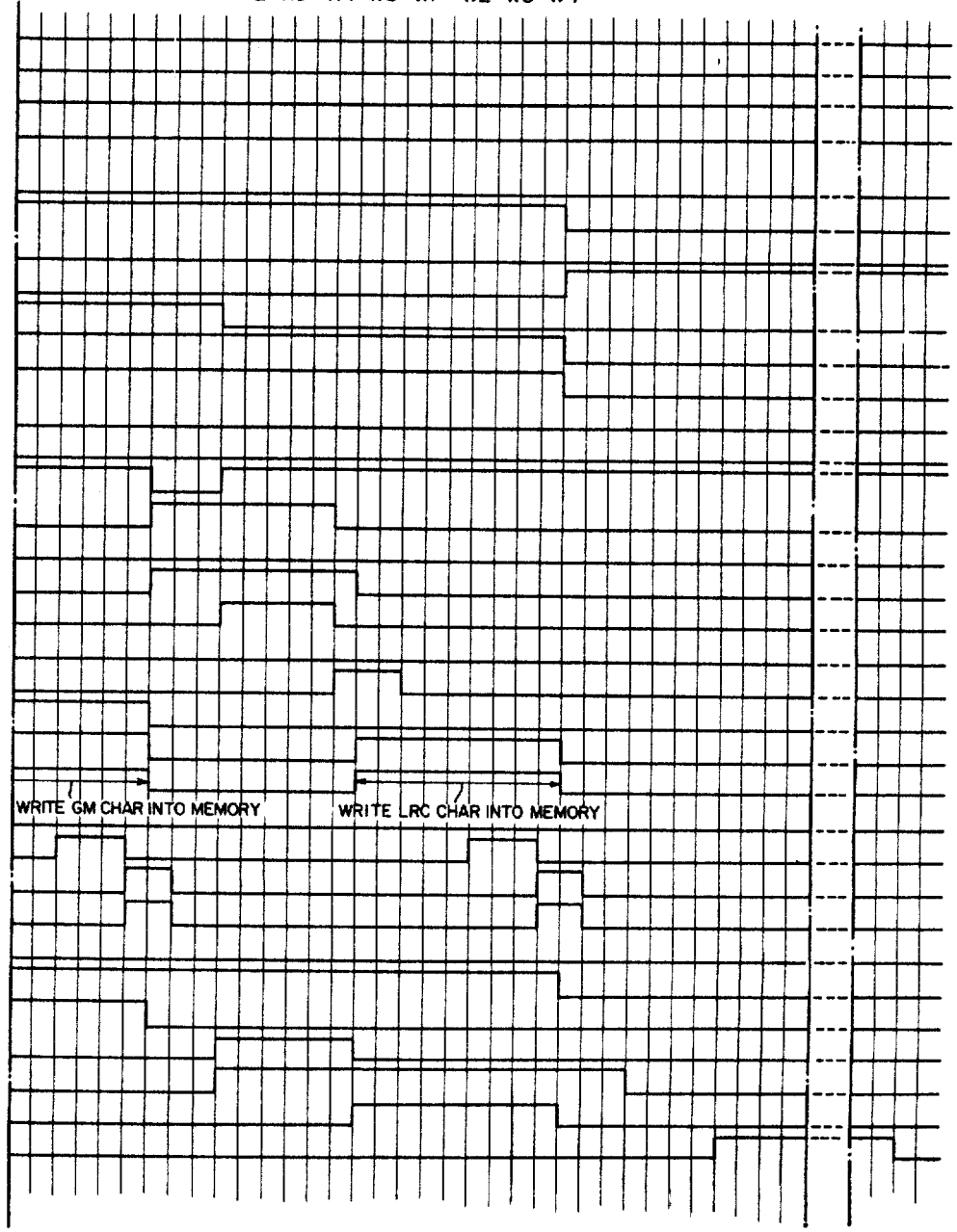

Fig. 28 illustrates how Figs. 28A to 28C, inclusive, may be placed to form a composite timing diagram.

Figs. 28A to 28C, inclusive, is a timing diagram of a CPU TO DC mode of operation.

Figure 29:
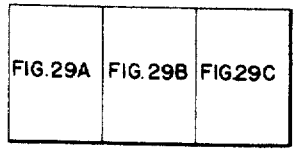
Figure 29A:
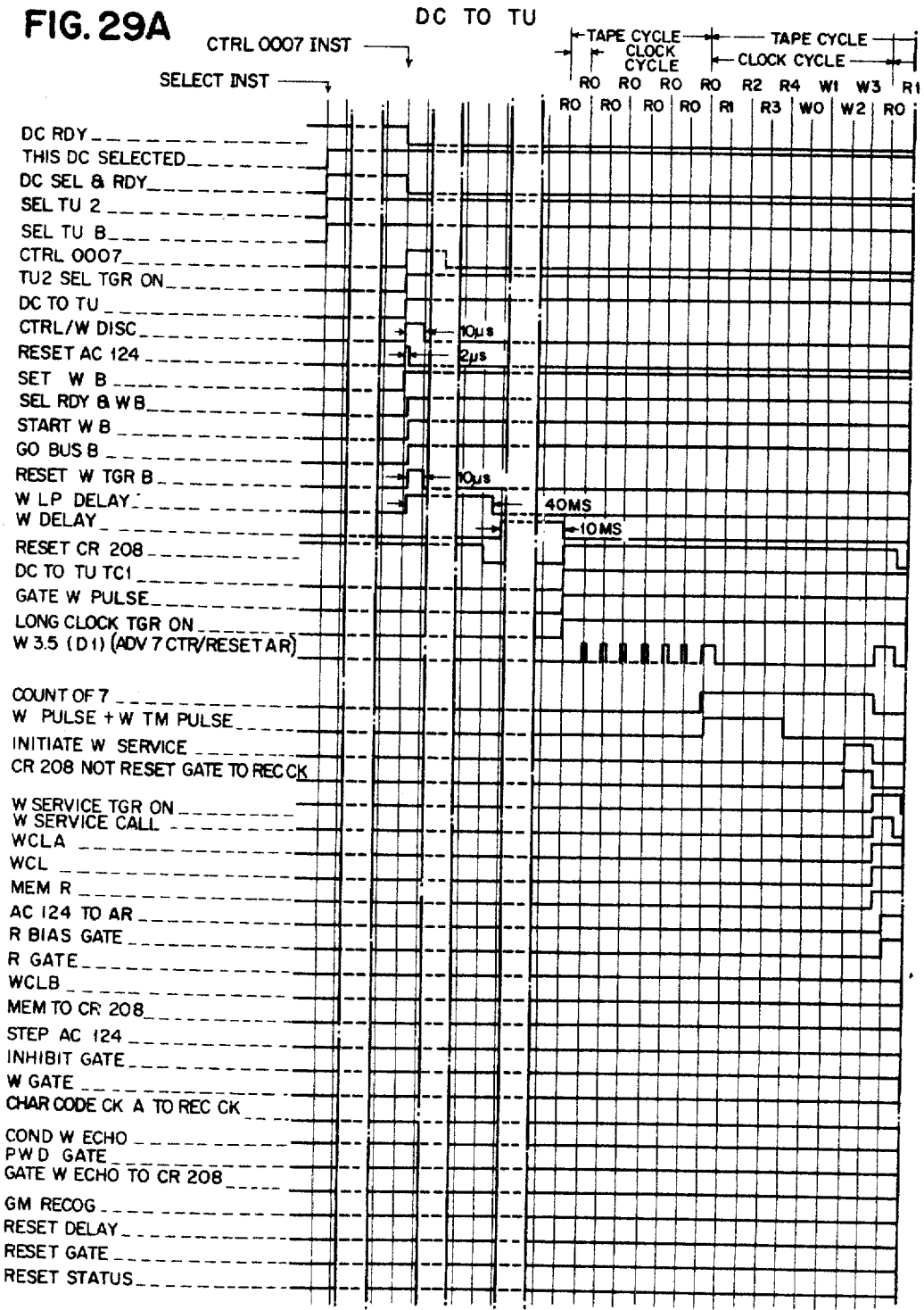
Figure 29C:
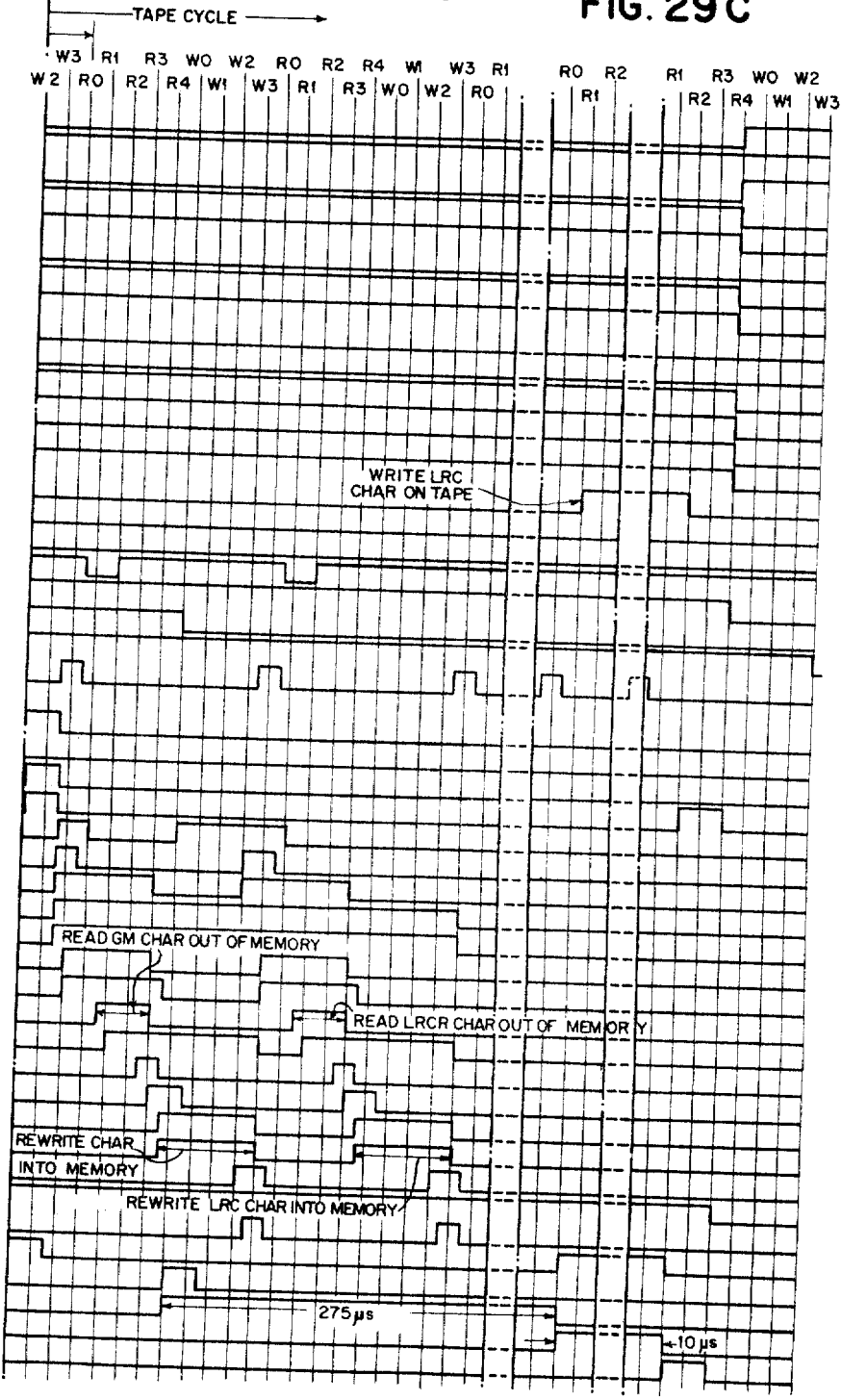

Fig. 29 illustrates how Figs. 29A to 29C, inclusive, may be placed to form a composite timing diagram.

Figs. 29A to 29C, inclusive, shows a timing diagram of a DC TO TU mode of operation.

Figure 30:
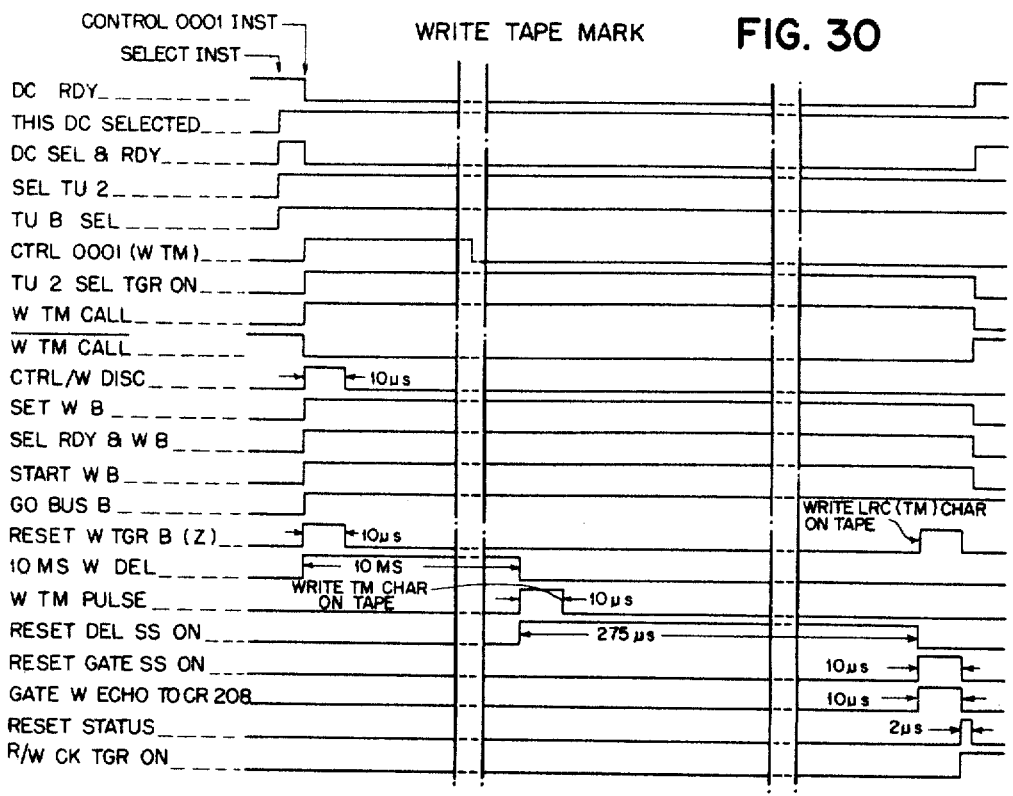

Fig. 30 shows a timing diagram of a W TM mode of operation.

Figure 31:
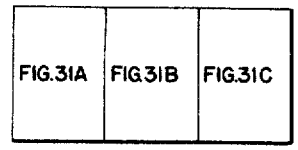
Figure 31A:
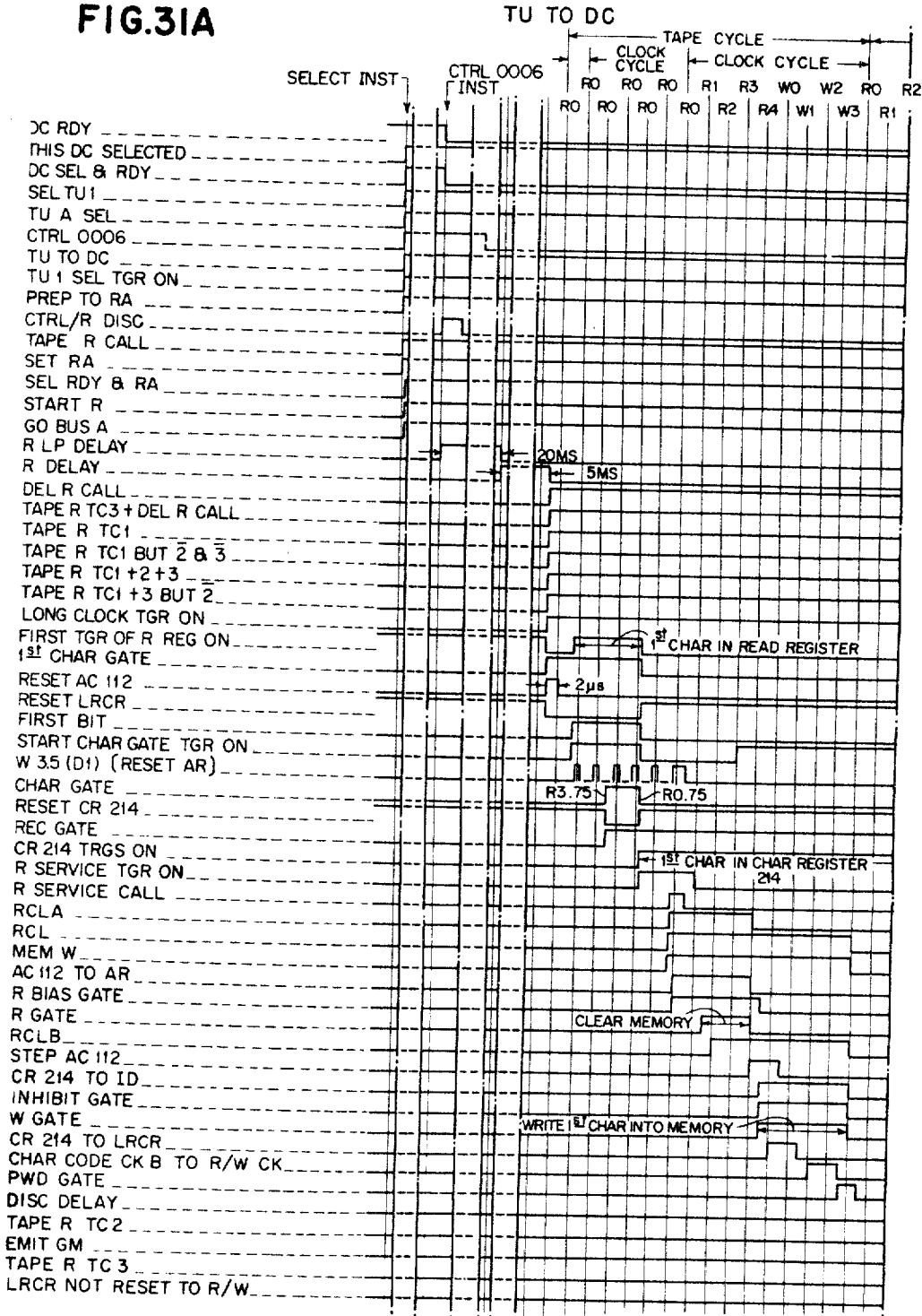

Fig. 31 illustrates how Figs. 31A to 31C, inclusive, may be placed to form a composite timing diagram.

Figs. 31A to 31C, inclusive, shows a timing diagram of a TU TO DC mode of operation.

Figure 32:
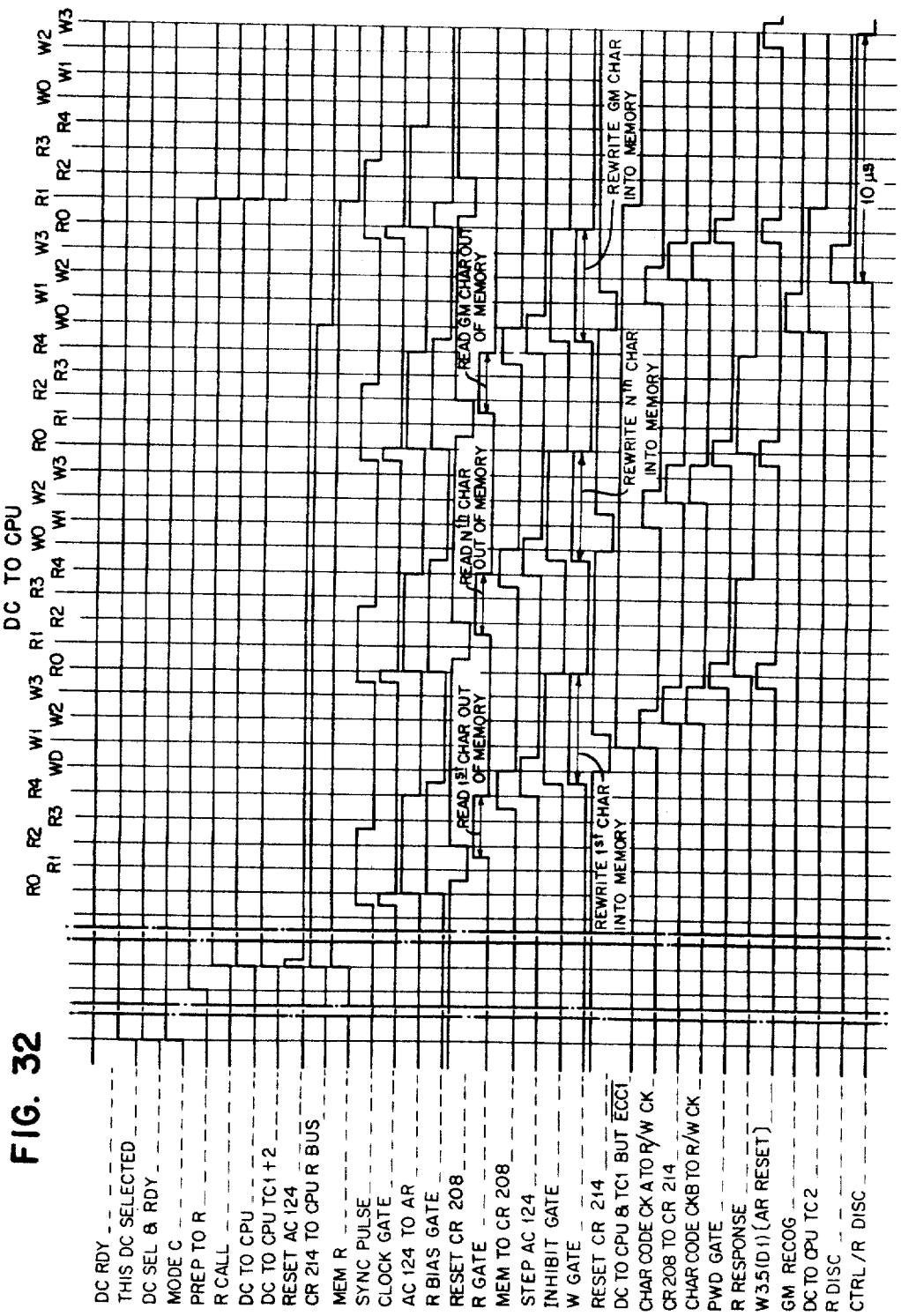

Fig. 32 is a timing diagram of a DC TO CPU mode of operation.

Figure 33:
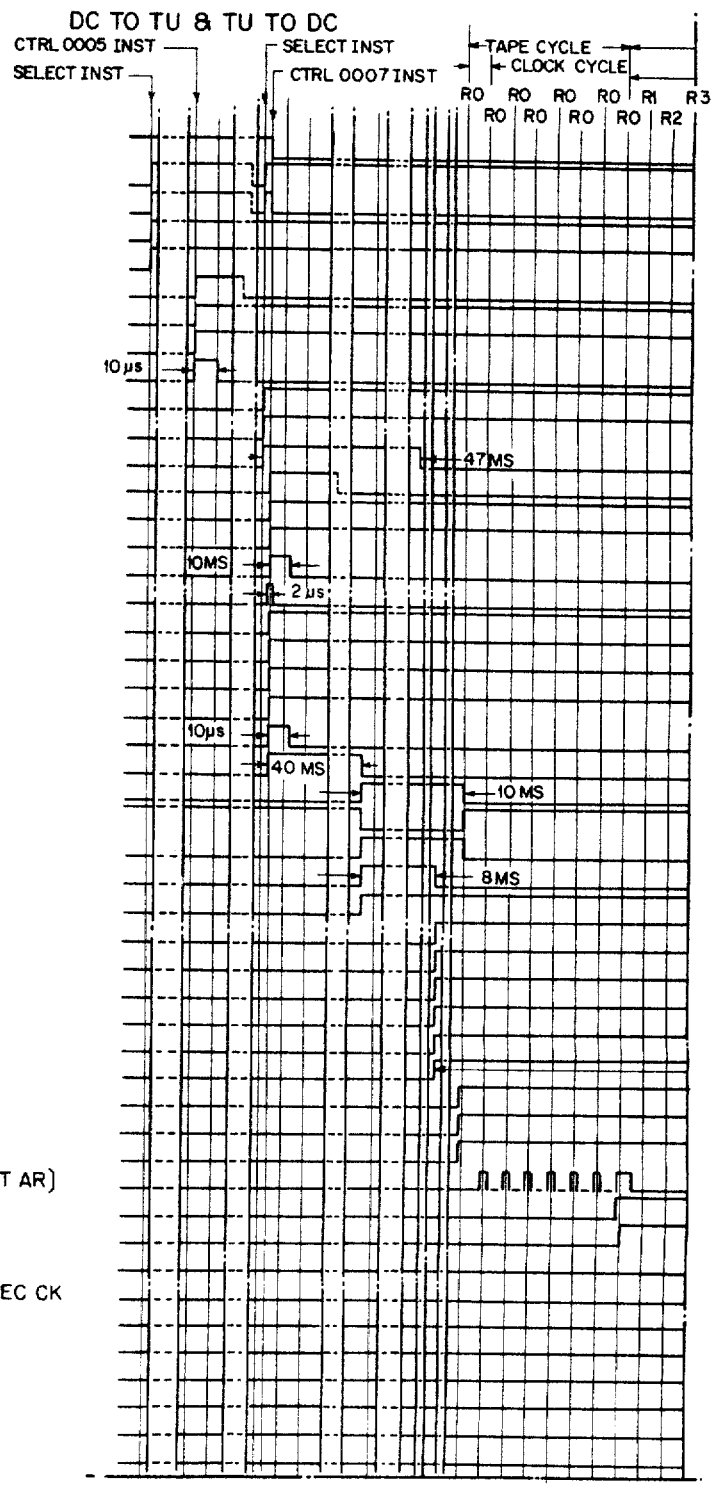
Figure 33C:
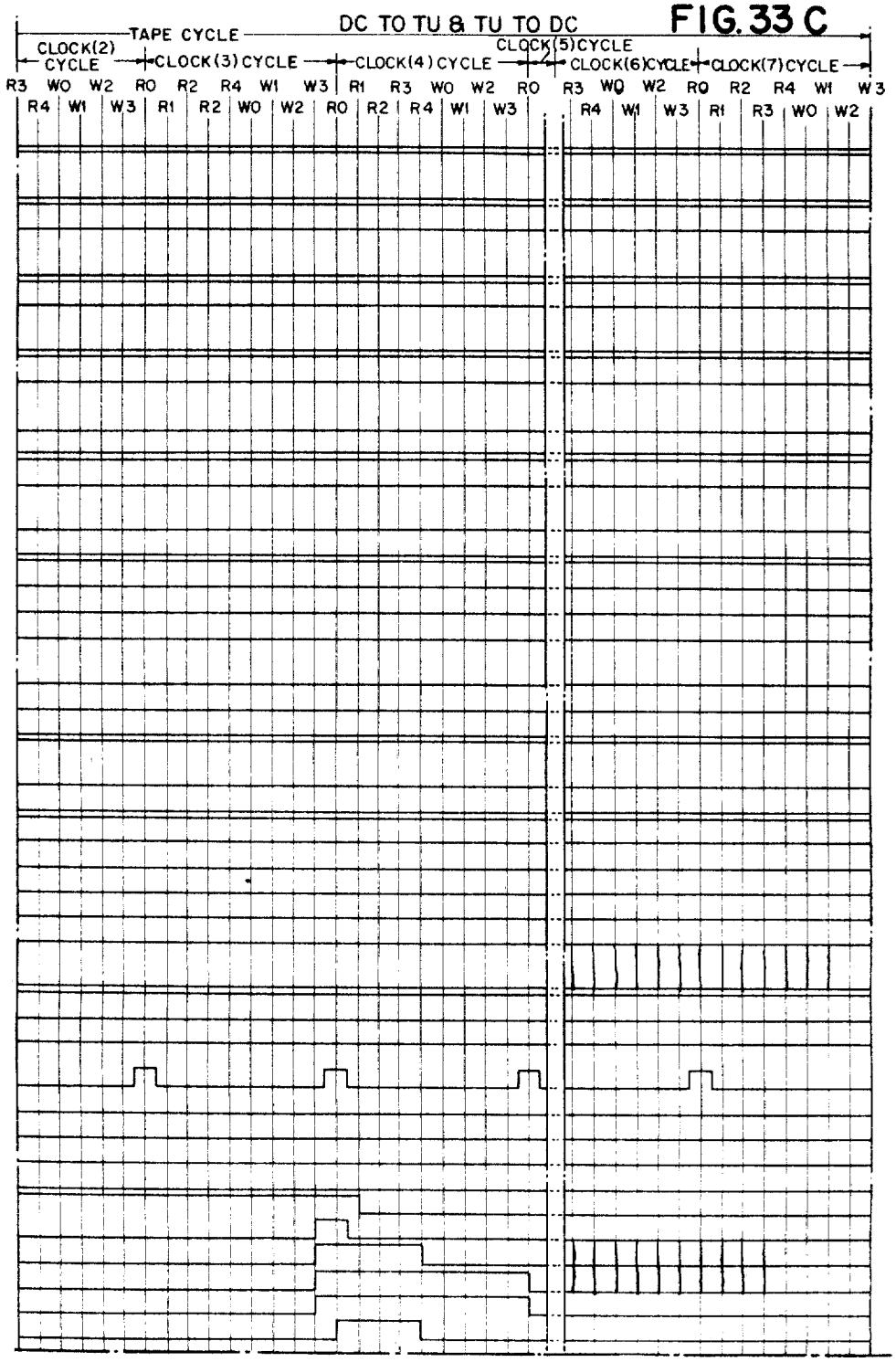
Figure 33E:
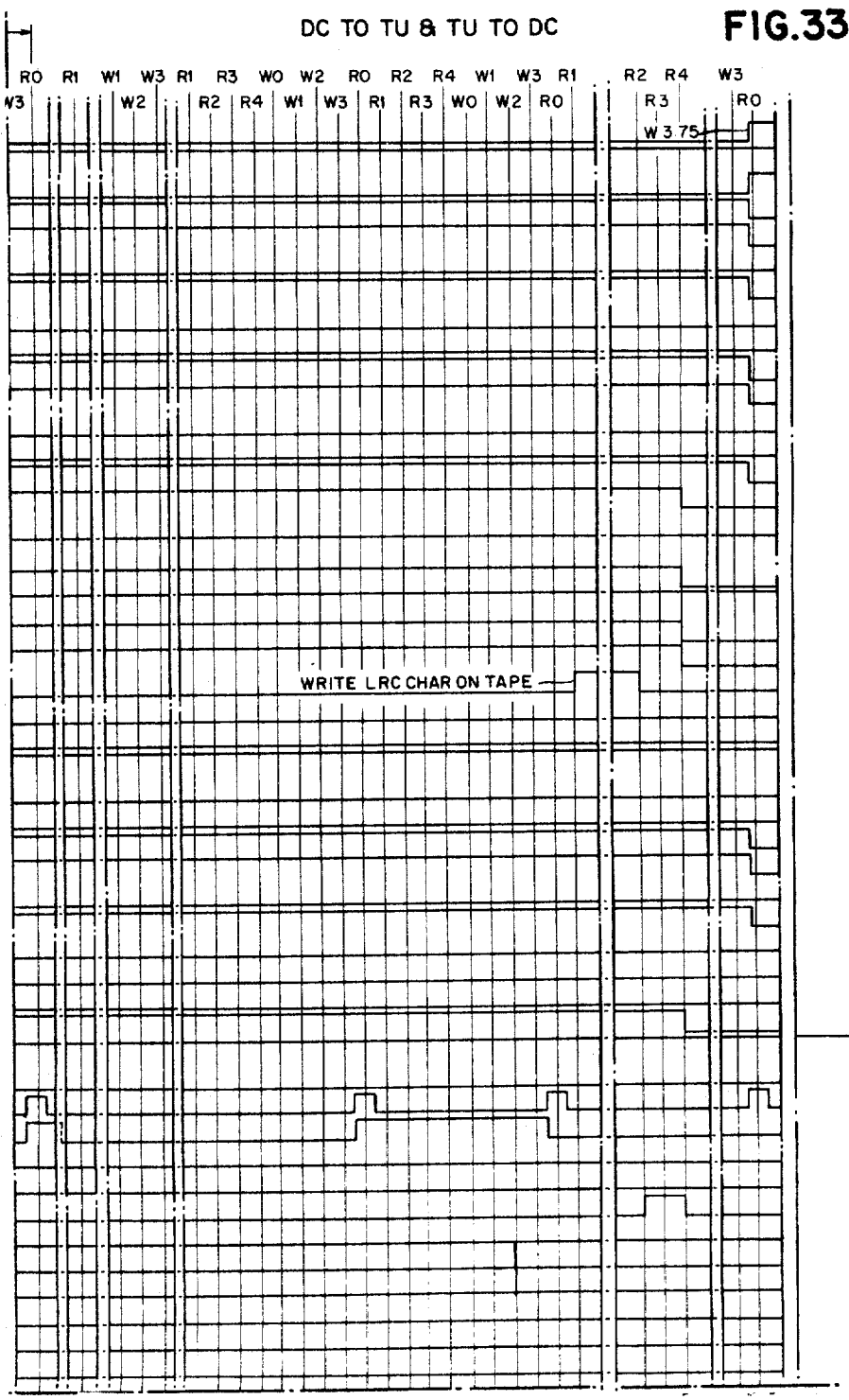

Fig. 33 illustrates how Figs. 33A to 33J, inclusive, may be placed to form a composite timing diagram.

Figs. 33A to 33J, inclusive, are a timing diagram of a DC TO TU & TU TO DC mode of operation.

Figure 34:
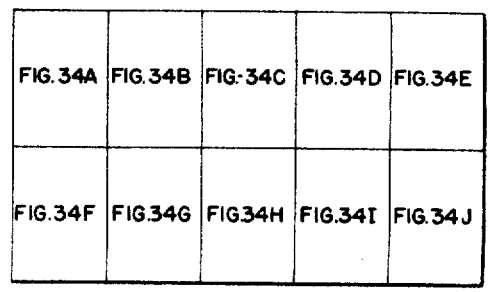

Fig. 34 shows a timing diagram of a BACKSPACE mode of operation.

Figure 35:
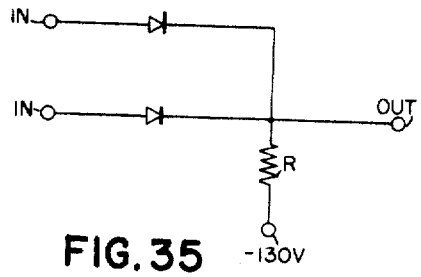

Fig. 35 shows both the block symbol and the schematic circuit of a standard positive OR circuit used in the invention.

Figure 36:
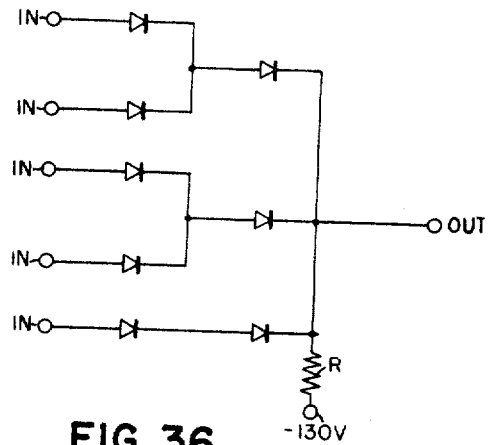

Fig. 36 shows both the block symbol and the schematic circuit of an OR-C circuit used in the invention.

Figure 37:
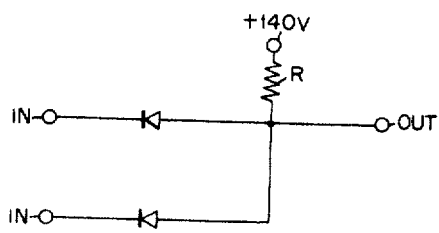

Fig. 37 illustrates both the block symbol and the schematic circuit of a standard positive AND circuit used in the invention.

Figure 38:
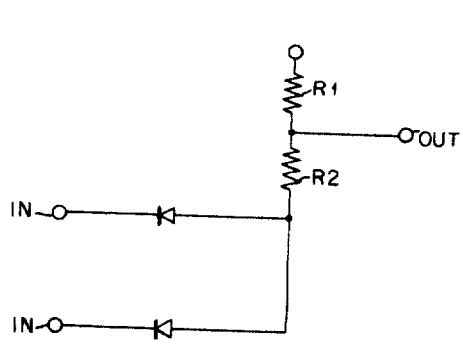

Fig. 38 illustrates both the block symbol and the schematic circuit of an A-B circuit used in the invention.

Figure 39:
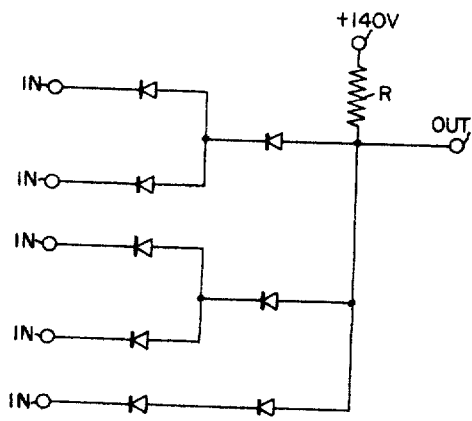

Fig. 39 shows both the block symbol and the schematic circuit of an A-C circuit used in the invention.

Fig. 40 illustrates both the block symbol and the schematic circuit of a standard inverter I-1 used in the invention.

Fig. 41 shows both the block symbol and the schematic circuit of an inverter I-1 used in the invention.

Fig. 42 illustrates both the block symbol and the schematic circuit of a standard peaker PKR-1 used in the invention.

Fig. 43 shows both the block symbol and the schematic circuit of the peaker PKR-2 used in the invention.

Figure 44:
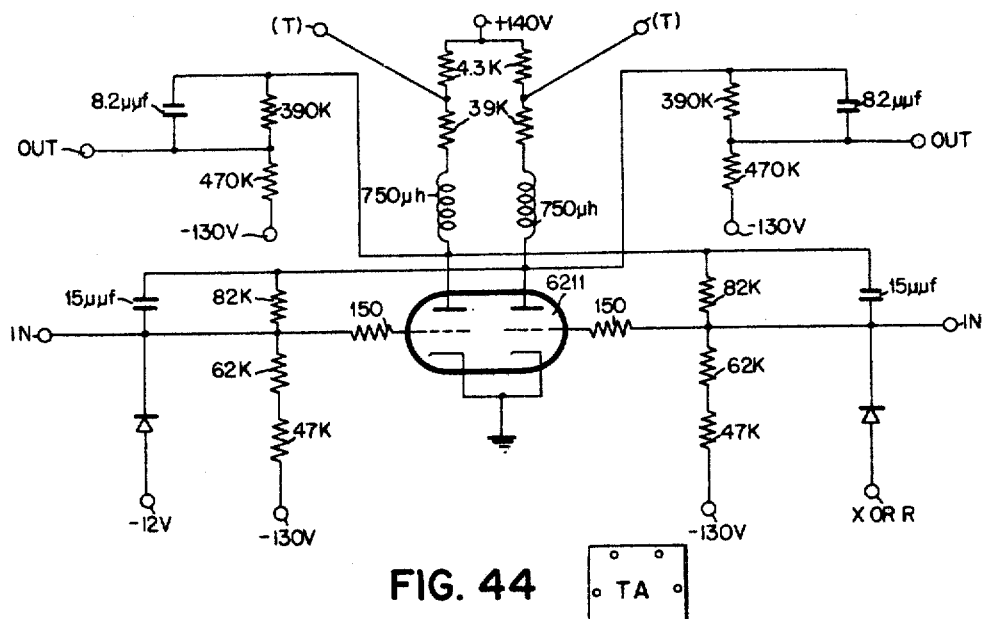

Fig. 44 illustrates both the block symbol and the schematic circuit of a standard trigger TA used in the invention.

Figure 45:
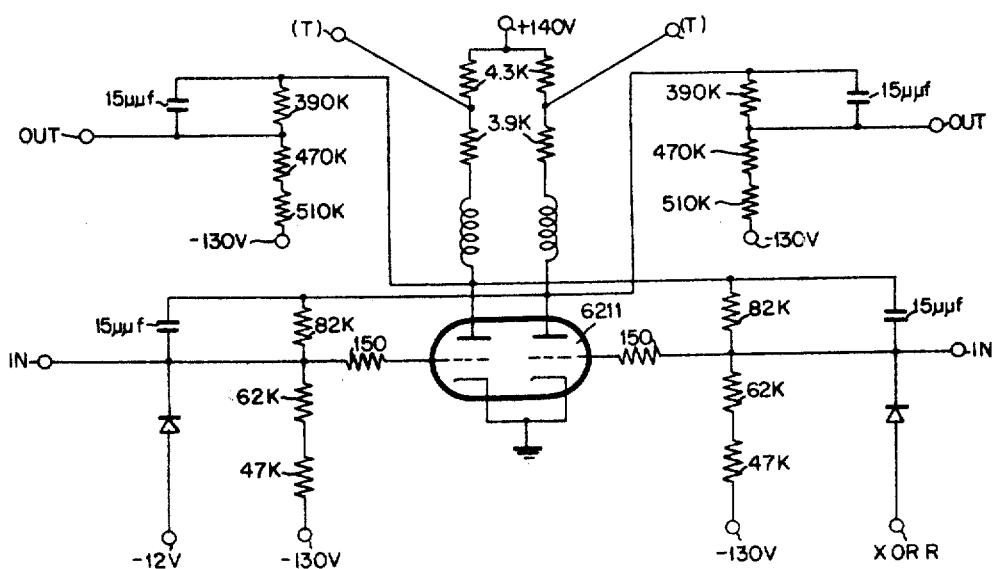
Figure 46:
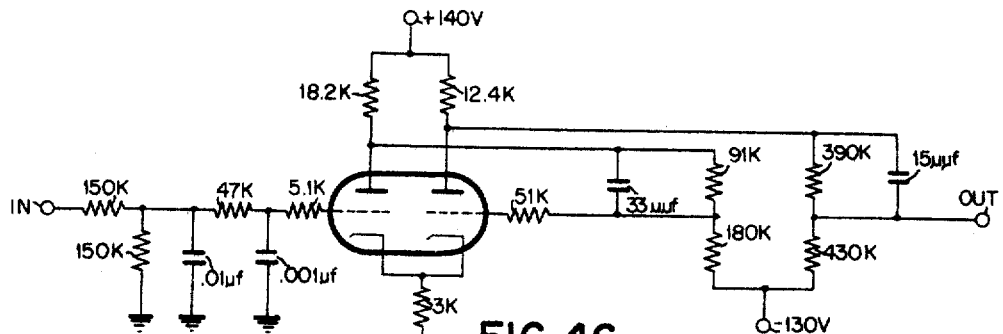
Figure 47:
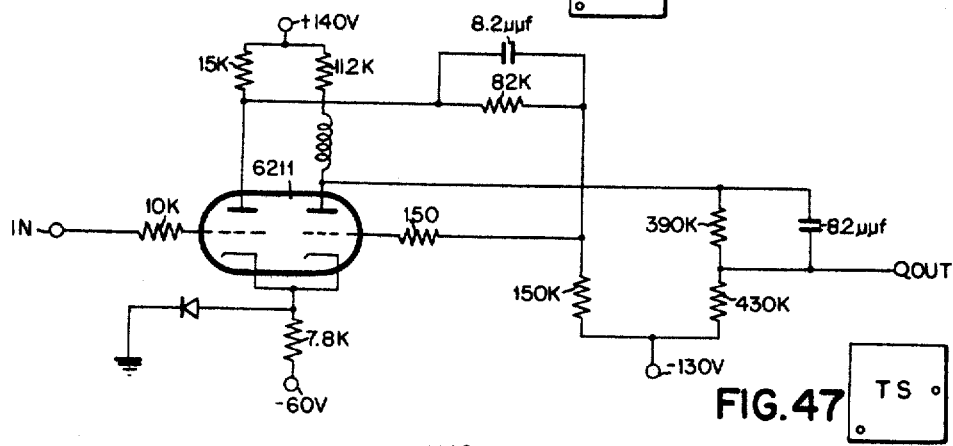

Figs. 45 to 47, inclusive, show both the block symbol and the schematic circuits of other types of triggers TB, TC and TS, respectively, used in the invention.

Figure 48:
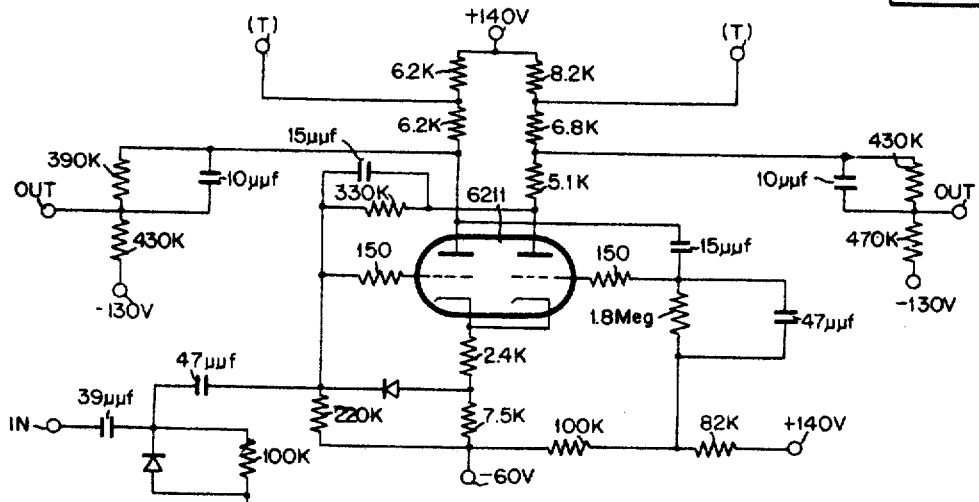

Fig. 48 illustrates both the block symbol and the schematic circuit of a positive input single shot multivibrator SS+ used in the invention.

Figure 49:
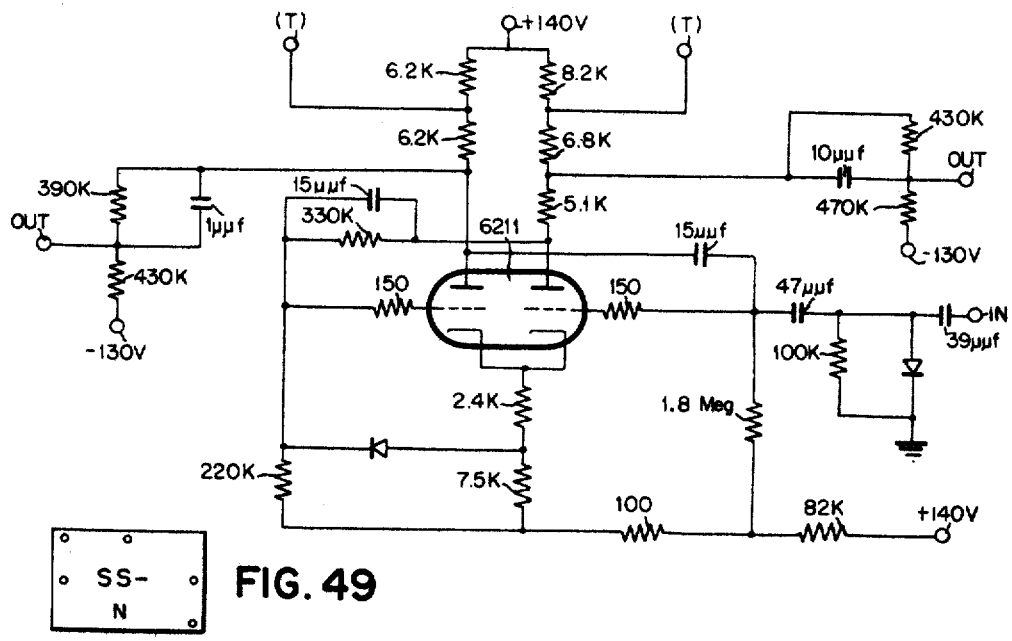

Fig. 49 shows both the block symbol and the schematic circuit of a negative input single shot multivibrator SS− used in the invention.

Figure 50:
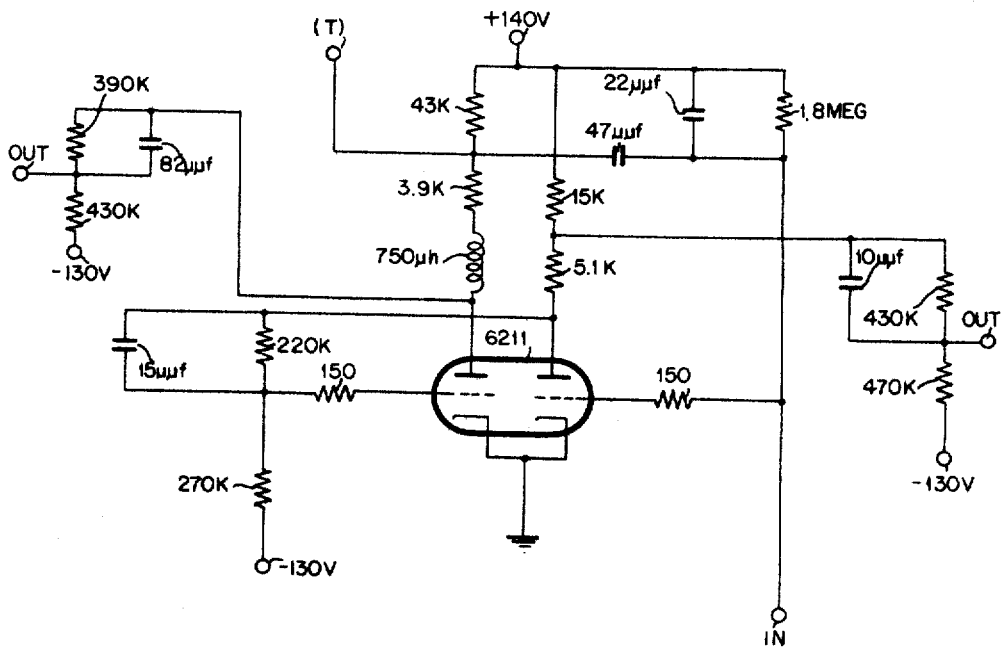

Fig. 50 illustrates both the block symbol and the schematic circuit of a hold over single shot multivibrator $SS_D$ used in the invention.

Figs. 51 to 61 show both the block symbols and the schematic circuit of the various trigger input circuits used in the invention.

Figure 62:
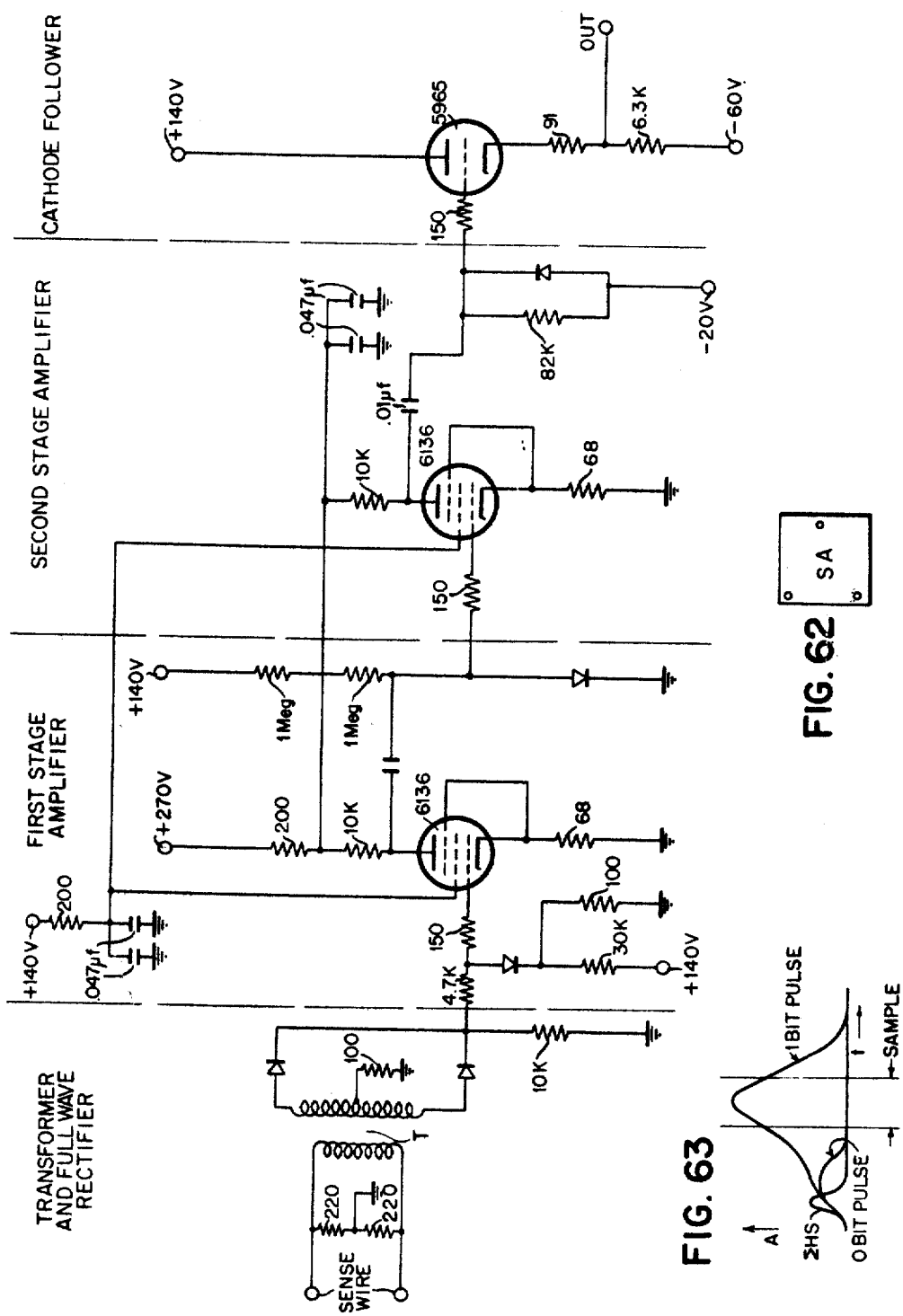

Fig. 62 illustrates both the block symbol and the schematic circuit of a sense amplifier used in the invention.

Figure 63:
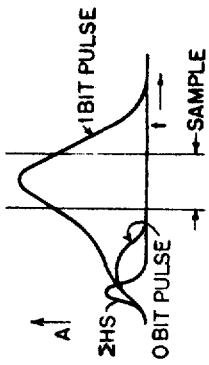

Fig. 63 is a diagrammatic representation of the various waveforms applied at the input of the sense amplifier shown in Fig. 62.

Figure 64:
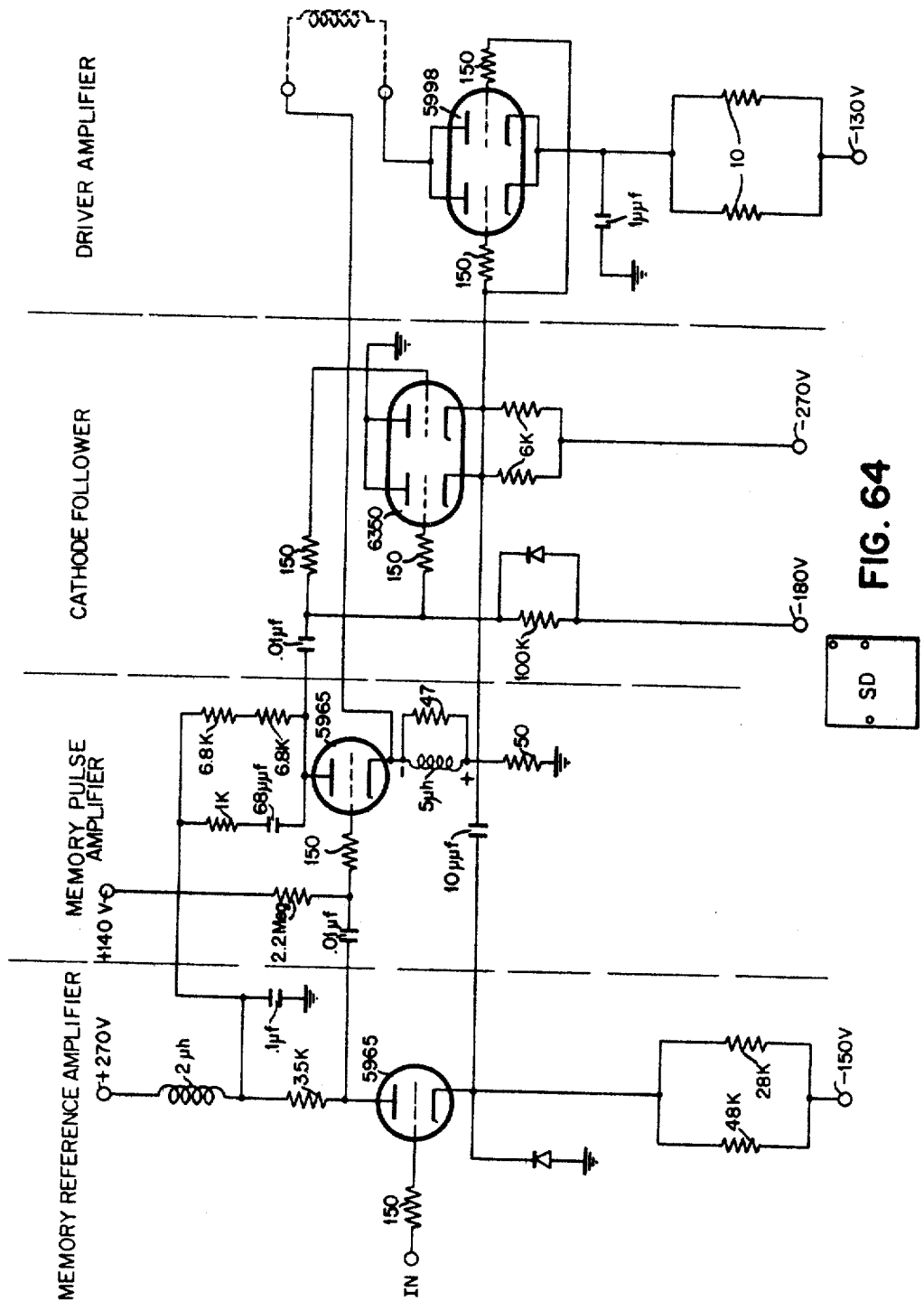

Fig. 64 illustrates both the block symbol and the schematic circuit of a switch core driver used in the invention.

Figure 65:
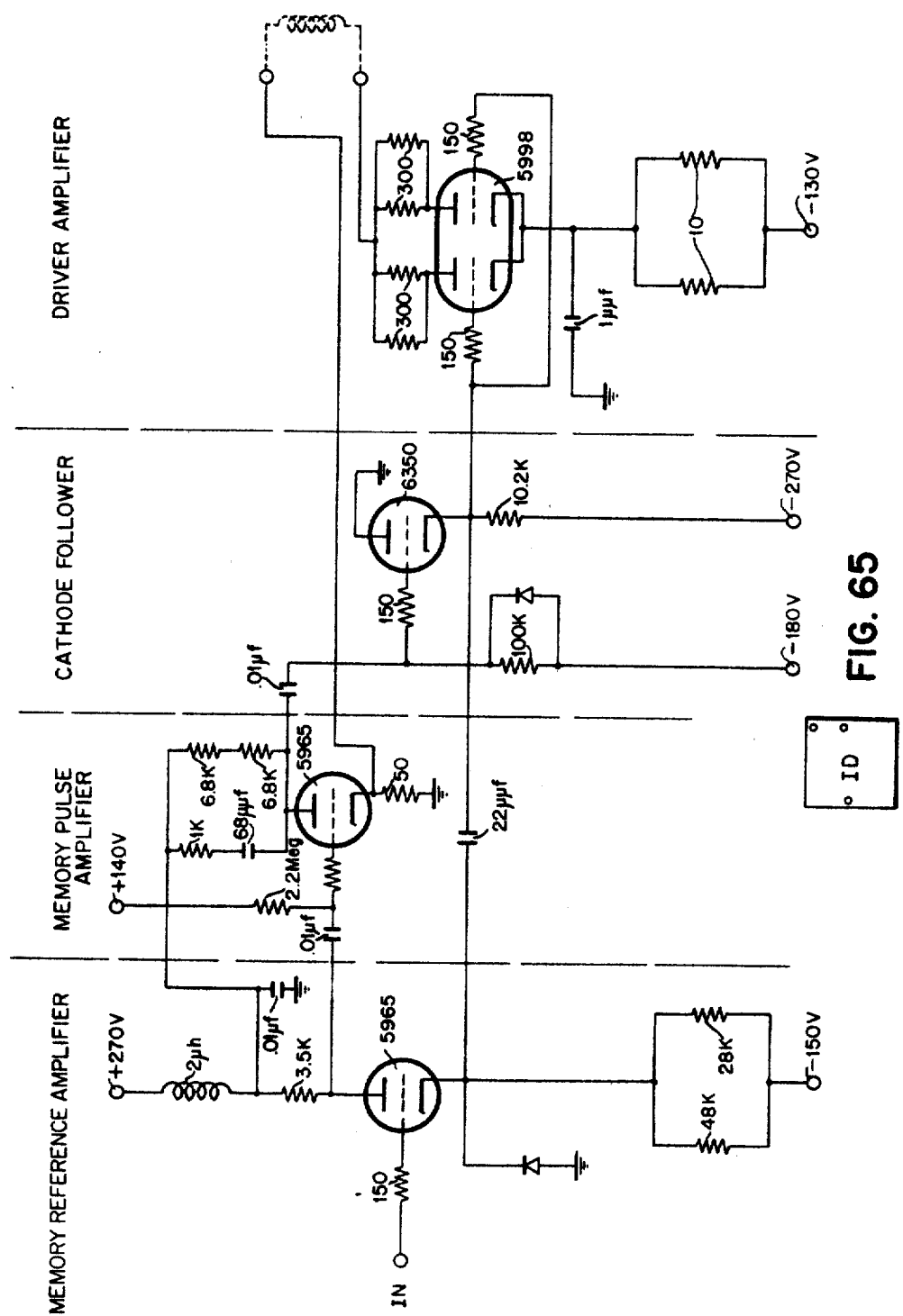

Fig. 65 illustrates both the block symbol and the schematic circuit of an inhibit driver used in the invention.

Figure 66:
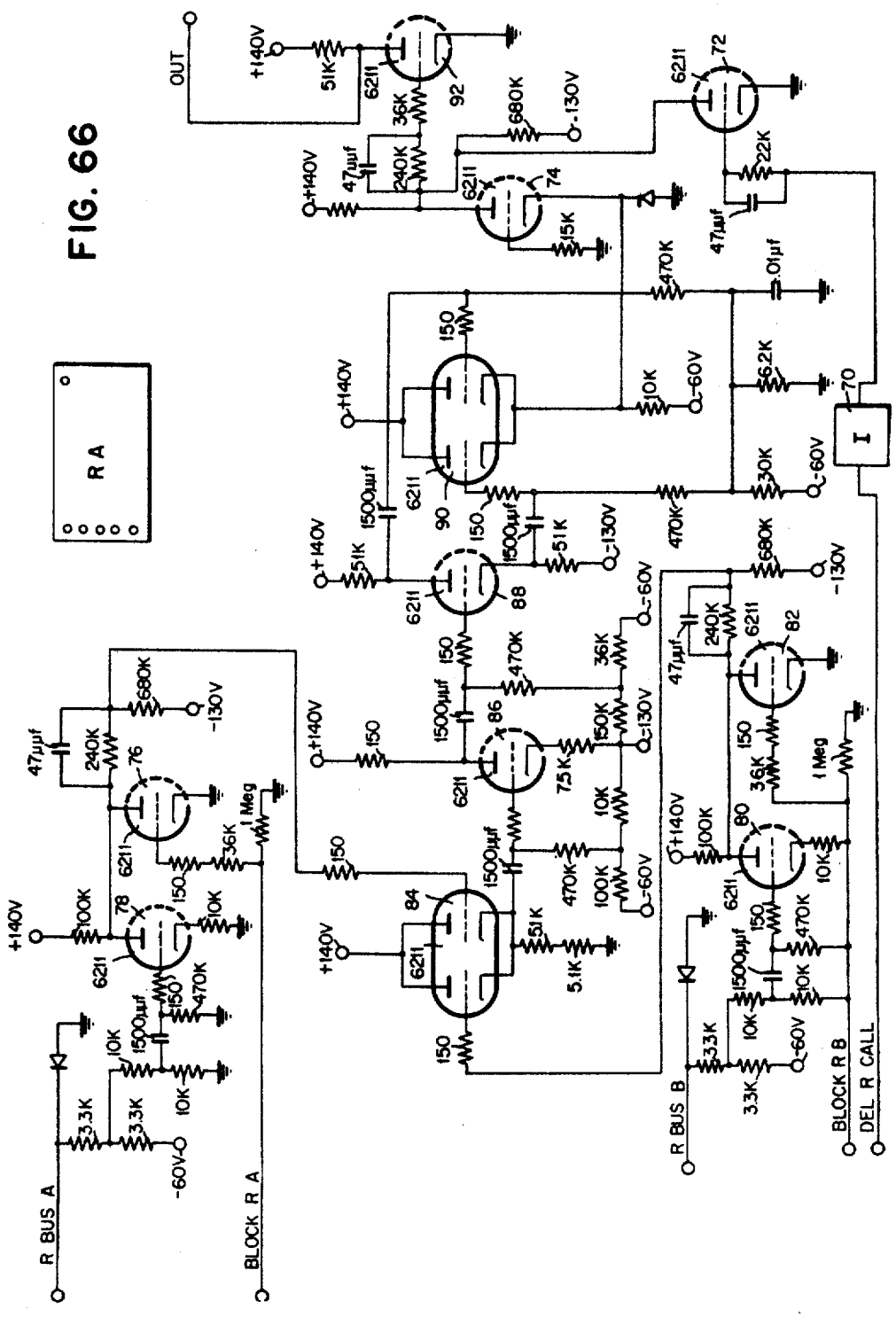

Fig. 66 illustrates both the block symbol and the schematic circuit of the read amplifier used in the invention.

The specific description of the invention will be developed in reference to the topics and sub-topics noted in the following index of the subject matter of the present invention.

INDEX

| | Column |
|---|---|
| Form and coding of data | 6 |
| Form and coding of instructions | 8 |
| General machine organization | 10 |
| Tape organization | 13 |
| Memory organization | 16 |
| General information flow and checking | 17 |
| Character code checking | 31 |
| Memory operation | 33 |
| Post write disturbance | 35 |
| Inhibit driving | 36 |
| Memory control unit | 37 |
| Clock pulse generator | 42 |
| Data coordinator ready | 45 |
| Select address decoding | 45 |
| Central processing unit to data coordinator | 48 |
| Data coordinator to tape unit | 61 |
| Write tape mark (control 0001) | 80 |
| Central processing unit to tape unit (control 0008W) | 85 |
| Central processing unit to data coordinator to tape unit (early tape start) | 96 |
| Tape unit to data coordinator | 100 |
| Data coordinator to central processing unit | 123 |
| Microsecond interrogation | 134 |
| Data coordinator to central processing unit and tape unit to data coordinator (early tape start) | 136 |
| Tape unit to central processing unit (control 0008R) | 142 |
| Data coordinator to tape unit and tape unit to data coordinator (read while writing) | 154 |
| Central processing unit to data coordinator to tape unit and tape unit to data coordinator (early tape start—read while writing) | 175 |
| Rewind (control 0002) | 180 |
| Turn on tape indicator (control 0003) | 182 |
| Turn off tape indicator (control 0000) | 184 |
| Backspace (control 0004) | 185 |
| Block symbols | 191 |

FORM AND CODING OF DATA

The basic unit of DATA is a CHARACTER which may be a decimal digit, an alphabetic letter or a symbol, as for example, the decimal digit 7, the letter A, or the symbol #. The next larger grouping of DATA is a WORD which may be comprised of any desired number of CHARACTERS. Further, a WORD may be composed solely of numerical CHARACTERS, as for example, the date 09 27 54, or solely of alphabetic CHARACTERS, as for example, the name JOHN JONES, or an alphanumeric mixture of CHARACTERS, as for example, the address 1701 SMITH STREET, or a numeric and symbolic mixture of CHARACTERS, as for example, a specific quantity of items +702. The next larger grouping of DATA is a RECORD which may be comprised of any desired number of related words containing an alphanumeric and symbolic mixture of CHARACTERS. Thus, for example, a RECORD may contain an order as follows, 092754 JOHN JONES 1701 SMITH STREET +702.

In the unit of the present invention, DATA is coded according to the binary system of notation as many of the basic circuits of the unit assume two stable states and therefore, are well suited to such a system of notation. Consequently, each CHARACTER of DATA, whether it be aliphatic, numeric or symbolic, is represented in binary form by a code consisting of seven binary digits or bits labeled CBA8421 as for example:

|     | C | B | A | 8 | 4 | 2 | 1 |
|-----|---|---|---|---|---|---|---|
| A = | 1 | 1 | 1 | 0 | 0 | 0 | 1 |
| 7 = | 1 | 0 | 0 | 0 | 1 | 1 | 1 |
| # = | 1 | 0 | 0 | 1 | 0 | 1 | 1 |

The four bits corresponding to the decimal digits 8421 are the digit part of the CHARACTER. The two bits corresponding to the alphabetic CHARACTERS BA are the zone part of the CHARACTER and are used to identify the significance of the digit part of the CHARACTER. Thus, since two bits can have four possible combinations, namely, 00, 01, 10 and 11, they may be used with the same digit part to designate four different CHARACTERS, as for example:

|     | C | B | A | 8 | 4 | 2 | 1 |
|-----|---|---|---|---|---|---|---|
| 2 = | 1 | 0 | 0 | 0 | 0 | 1 | 0 |
| S = | 0 | 0 | 1 | 0 | 0 | 1 | 0 |
| K = | 0 | 1 | 0 | 0 | 0 | 1 | 0 |
| B = | 1 | 1 | 1 | 0 | 0 | 1 | 0 |

The seventh bit corresponding to the alphabetic CHARACTER C is the redundancy check bit which is made 0 or 1 so as to give an even number of 1 bits for every CHARACTER of DATA. In other words, if any one of the seven bits of a CHARACTER should be changed by some disturbance or machine failure the count of 1 bits would no longer be even and the error would be detected by the machine. Thus, with this coding arrangement, the 26 CHARACTERS of the alphabet, the 10 decimal digits and a predetermined number of symbols may be represented by the seven bit system of notation.

When utilizing the DATA COORDINATOR, a RECORD may be of any practical length within the capacity of the machine. The last CHARACTER of the RECORD is a special CHARACTER, hereinafter referred to as a RECORD MARK CHARACTER, which is coded as follows;

RM—1011010 and designates the end of the RECORD.

Also, short RECORDS of variable length may be grouped, with each RECORD within the group being separated by a RECORD MARK CHARACTER. Another special CHARACTER is provided, hereinafter referred to as a GROUP MARK CHARACTER, which is coded as follows;

GM—0111111 and follows the last CHARACTER of a group of RECORDS to designate the end of the group of RECORDS.

Lastly, the end of a file of information on a TAPE is followed by a special CHARACTER, hereinafter referred to as a TAPE MARK CHARACTER, which is coded as follows:

TM—0001111

FORM AND CODING OF INSTRUCTIONS

A CENTRAL PROCESSING MACHINE generally operates according to a PROGRAM consisting of a series of instructions, which may be ARITHMETIC instructions, TRANSFER instructions, SHIFT instructions, INPUT/OUTPUT instructions, etc. An instruction, whether it be an INPUT/OUTPUT instruction or otherwise, consists of five CHARACTERS divided into two specific parts. The first part is a single CHARACTER, called the OPERATION part, while the other part, consisting of the remaining four CHARACTERS is called the ADDRESS part.

INPUT/OUTPUT instructions are generally a two step process. Thus, assuming that the CENTRAL PROCESSING UNIT has several DATA COORDINATOR UNITS associated with it, then, ADDRESSES 0600 to 0609 pertain to the first UNIT; ADDRESS 0610 to 0019 pertain to the second UNIT; ADDRESSES 0620 to 0629 pertain to the third UNIT, etc. The first step is to provide a SELECT instruction which selects a particular INPUT/OUTPUT UNIT.

The SELECT instruction may be in the following form:

|     | C | B | A | 8 | 4 | 2 | 1 |
|-----|---|---|---|---|---|---|---|
| 2 = | 1 | 0 | 0 | 0 | 0 | 1 | 0 |
| 0 = | 0 | 0 | 0 | 1 | 0 | 1 | 0 |
| 6 = | 0 | 0 | 0 | 0 | 1 | 1 | 0 |
| 0 = | 0 | 0 | 0 | 1 | 0 | 1 | 0 |
| 7 = | 1 | 0 | 0 | 0 | 1 | 1 | 1 |

The first CHARACTER, namely, 2 is the OPERATION part and is the code for a SELECT operation, that is, select a particular type of INPUT/OUTPUT UNIT. The remaining four CHARACTERS is the ADDRESS part of the instruction and designates one of that particular type of an INPUT/OUTPUT UNIT and an ADDRESS therein. Thus, the 0 in the thousands order and the 6 in the hundreds order designates the DATA COORDINATOR as the INPUT/OUTPUT UNIT, the 0 in the tens order designates the first DATA COORDINATOR as the selected unit and the 7 in the units order designates that the TAPE UNIT 7 is to be used with the SELECTED DATA COORDINATOR. It should be noted that the units order is used to select one of 8 TAPE UNITS or designates that an operation is to be performed between the SELECTED DATA COORDINATOR and the CENTRAL PROCESSING UNIT and does not involve a TAPE UNIT. Thus, the digits 0 to 3 and 5 to 8 refer to TAPE UNITS 0 to 3 and TAPE UNITS 5 to 8, respectively, while digits 4 and 9 refer to CPU to DC operation or vice versa.

In the next step of the process, either a WRITE instruction, READ instruction or a CONTROL instruction is given.

If a SELECT instruction is given having a 4 or 9 in the units order followed by a WRITE instruction, then, a RECORD or group of RECORDS is read from the MEMORY of the CENTRAL PROCESSING UNIT, starting at the ADDRESS part of the WRITE instruction, and transferred to the SELECTED DATA COORDI- NATOR. An example of a WRITE instruction is as follows:

|   | C | B | A | 8 | 4 | 2 | 1 |
|---|---|---|---|---|---|---|---|
| R= | 1 | 1 | 0 | 1 | 0 | 0 | 1 |
| 1= | 1 | 0 | 0 | 0 | 0 | 0 | 1 |
| 1= | 1 | 0 | 0 | 0 | 0 | 0 | 1 |
| 3= | 0 | 0 | 0 | 0 | 0 | 1 | 1 |
| 2= | 1 | 0 | 0 | 0 | 0 | 1 | 0 |

The first CHARACTER, namely, R is the OPERATION part of the instruction and is the code for a WRITE operation. The digit parts of the remaining four CHARACTERS of the instruction designates the ADDRESS 1132 in the MEMORY of the CENTRAL PROCESSING UNIT starting from which a RECORD or group of RECORDS may be used.

If a SELECT instruction is given having a 4 or 9 in the units order followed by a READ instruction, then, a RECORD or group of RECORDS is transferred from the SELECTED DATA COORDINATOR and written in the MEMORY of the CENTRAL PROCESSING UNIT, starting at the ADDRESS designated by the ADDRESS part of the READ instruction. An example of a READ instruction is as follows:

|   | C | B | A | 8 | 4 | 2 | 1 |
|---|---|---|---|---|---|---|---|
| Y= | 1 | 1 | 0 | 1 | 0 | 0 | 1 |
| 0= | 0 | 0 | 0 | 1 | 0 | 1 | 0 |
| 1= | 1 | 0 | 0 | 0 | 0 | 0 | 1 |
| 7= | 1 | 0 | 0 | 0 | 1 | 1 | 1 |
| 3= | 0 | 0 | 0 | 0 | 0 | 1 | 1 |

The first CHARACTER, namely, Y is the OPERATION part of the instruction and is the code for a READ instruction and is the code for a READ operation. The digit parts of the remaining four CHARACTERS of the instruction designates the ADDRESS 1132 in the MEMORY of the CENTRAL PROCESSING UNIT starting at which a RECORD or group of RECORDS may be stored.

If a SELECT instruction is given having a digit in the units order other than 4 or 9 followed by a CONTROL 0006 or 0007 instruction, then, a RECORD or group of RECORDS is either read from a TAPE UNIT designates by the units digit of the SELECT instruction and transferred to the SELECTED DATA COORDINATOR or transferred from the SELECTED DATA COORDINATOR and written on the designated TAPE UNIT.

An example of a CONTROL instruction is as follows:

|   | C | B | A | 8 | 4 | 2 | 1 |
|---|---|---|---|---|---|---|---|
| 3= | 0 | 0 | 0 | 0 | 0 | 1 | 1 |
| 0= | 0 | 0 | 0 | 1 | 0 | 0 | 1 |
| 0= | 0 | 0 | 0 | 1 | 0 | 0 | 1 |
| 0= | 0 | 0 | 0 | 1 | 0 | 0 | 1 |
| 6= | 0 | 0 | 0 | 1 | 1 | 0 |

The first CHARACTER, namely, 3 is the OPERATION part of the instruction and is the code for a CONTROL instruction. The digit parts of the remaining four CHARACTERS of the instrution designates that a RECORD or group of RECORDS is to be transferred from a SELECTED TAPE UNIT to the SELECTED DATA COORDINATOR associated therewith.

There are seven CONTROL instructions other than the above CONTROL 0006 and 0007 instruction which control various features of operation of the machine. The CONTROL instruction always applies to the last selected unit and the address part specifies the feature to be controlled as follows:

CONTROL 0000 instruction functions to turn OFF the TAPE INDICATOR of the previously selected TAPE UNIT, if it is ON.

CONTROL 0001 instruction functions to cause a TAPE MARK CHARACTER to be written on the previously selected TAPE UNIT.

CONTROL 0002 instruction functions to cause the previously SELECTED TAPE UNIT to perform a REWIND operation.

CONTROL 0003 instruction functions to turn ON the TAPE INDICATOR of the previously selected TAPE UNIT, if it is OFF.

CONTROL 0004 instruction functions to cause the previously SELECTED TAPE UNIT to perform a BACKSPACE operation.

CONTROL 0005 instruction functions to prepare the SELECTED DATA COORDINATOR to perform a read while writing operation.

CONTROL 0008 instruction functions to cause the DATA COORDINATOR to be by-passed during the execution of the next read or write instruction so as to transfer a RECORD or group of RECORDS directly between a SELECTED TAPE UNIT and the MEMORY of the CENTRAL PROCESSING UNIT.

GENERAL MACHINE ORGANIZATION

To facilitate the understanding of the invention, resort has been had to four levels of drawings. The first level shows in simplified block form the general arrangement and interconnections of the major components comprising the DATA COORDINATOR and also serves as an index to the next lower level. The second level is a composite block diagram showing a breakdown, in logical block form, of the major components of the DATA COORDINATOR and the intra-connections between the logical block diagrams in each major component as well as the inter-connections between the logical block diagrams of each major component. This second level also serves as an index to the next lower level. The third level shows in symbolic block form, the breakdown of the logical block diagrams in each of the major components of the DATA COORDINATOR and also serves as an index for the next lower level. The fourth level shows the individual block symbols and their schematic circuit equivalents.

Referring now to Fig. 1, there is shown in block form the general arrangement and interconnections between the major components comprising the DATA COORDINATOR. The single light line connecting the several major components of the machine indicate paths through which TIMING and CONTROL signals will flow. The single heavy lines connecting the several major components of the machine with the CENTRAL PROCESSING UNIT and the various TAPE UNITS indicate paths through which DATA will flow. The direction of flow on any single line may be in one direction or may be bi-directional and is indicated by an arrowhead or arrowheads on the line. If in one direction, a single circled number is shown on the line indicating the actual number of lines connecting the one component to the other except if there is just one line in which case no circled number is shown. If bi-directional, two circled numbers are shown on the line, each indicating the actual number of lines connecting the one component, which is nearest to it, to the other. Thus, for example, there is a single bi-directional line connected between the STATUS DECODER 400 and the STATUS CYCLE UNIT 500 with the two circled numbers 7 and 3 indicating that there are actually 7 output lines connected from the STATUS DECODER 400 to the STATUS CYCLE UNIT 500 and 3 output lines connected from the STATUS CYCLE UNIT 500 to the STATUS DECODER 400.

It can be seen from Fig. 1 that the DATA COORDINATOR of the present invention includes a MEMORY 50 of the magnetic core type, a MEMORY CONTROL UNIT 100 for controlling the operation of the MEM- ORY 50, a DATA TRANSFER & CHECK UNIT 200 for storing and checking CHARACTERS during a RECORD transfer, an INSTRUCTION DECODER 300 for decoding the instruction DATA applied thereto from the CENTRAL PROCESSING UNIT, a STATUS DECODER 400 for decoding the output of the INSTRUCTION DECODER 300 to determine the status of the mode of operation to be performed, a STATUS CYCLE UNIT 500 for controlling the various cycles of operation within a particular status, a TAPE SYNCHRONIZER 600 for synchronizing the operation of the DATA COORDINATOR with a SELECTED TAPE UNIT, a CLOCK PULSE GENERATOR 800 for establishing the various timing pulses used throughout the DATA COORDINATOR and an EXECUTION TIMER 900 for controlling the execution of the various modes of operation.

Further, it can be seen from Fig. 1 that there are two groups of TAPE UNITS, each containing four TAPE UNITS, associated with the DATA COORDINATOR. If two TAPE UNITS are selected, as in a concurrent read while writing mode of operation, the TAPE UNIT associated with reading must be selected from one group and the TAPE UNIT associated with writing must be selected from the other group, or visa versa. Thus, for example, TAPE UNIT 1 may be selected from the TAPE UNITS A group for reading while TAPE UNIT 2 may be selected from the TAPE UNITS B group for concurrent writing. As explained in the section on FORM AND CODING OF INSTRUCTIONS, the units digit of the ADDRESS part of the SELECT instruction is used for designating a particular TAPE UNIT. Thus, the units digits 0 to 3 and 5 to 8 refer to TAPE UNITS 0 to 3 and TAPE UNITS 5 to 8, respectively.

The type of magnetic TAPE UNIT used with the DATA COORDINATOR of the present invention is completely shown and described in application Serial No. 468,832, filed November 15, 1954, and assigned to this assignee. Consequently, reference may be made thereto for a detailed description of a typical TAPE UNIT. Also, it should be noted that in the drawings of the present invention when a line is indicated as being connected to a TAPE UNIT, this line is labeled and a corresponding labeled line will be found in the drawings of the above mentioned application except in the case of the RESET W TGR line which is identified as the WR CHECK CHAR line and the W PULSE+W TM PULSE line which is identified as the W PULSE line in the above mentioned application.

It can be seen from Fig. 1 that there are a number of labeled lines which are common to the two groups of TAPE UNITS. Additionally, there is a set of nine labeled lines which are connected between the TAPE SYNCHRONIZER 600 and the group of TAPE UNITS A which are designated by the suffix A, as for example, the line SET W A. Also, there is another similar set of nine lines connected between the TAPE SYNCHRONIZER 600 and the group of TAPE UNITS B, which lines are not labeled in Fig. 1 but which will be distinguished from the first set in other figures of the drawings by the suffix B added to the designation on the line, as for example, the line SET W B.

The CENTRAL PROCESSING UNIT used with the DATA COORDINATOR of the present invention may be of the IBM 705 type, the general operation of which is disclosed in the Preliminary Manual of Operation of the IBM TYPE 705 Electronic Data-Processing Machine copyrighted in 1955, and those lines which are connected between the two are labeled as shown in Fig. 1.

The organization of the DATA COORDINATOR will now be described with reference to Figs. 5 to 19, inclusive, which are the second level of the drawings illustrating the breakdown, in logical block form, of the major components of the DATA COORDINATOR.

Referring now to Fig. 5, the MEMORY 50 is shown as including a three dimensional magnetic core system having 7 bit planes and a dummy plane to provide storage for 1024 7 bit CHARACTERS.

Referring now to Fig. 6, the MEMORY CONTROL UNIT 100 is shown as including a pair of RESET UNITS 102 and 118, a pair of ADDRESS COUNTERS 112 and 124, a pair of COUNTER GATES 116 and 128, and ADDRESS REGISTER 132, a pair of X SC DECODERS 138 and 142, 158 and 154, a pair of Y SC DECODERS 138 and 142, a pair of X SC BIAS & W DRIVERS 172 and 184, a pair of Y SC R DRIVERS 146 and 152, an X SWITCH CORE MATRIX 156 and a Y SWITCH CORE MATRIX 150.

Referring now to Figs. 7 and 8, the DATA TRANSFER & CHECK UNIT 200 is shown as including a SENSE AMPLIFIER UNIT 202, a pair of CHARACTER REGISTERS 208 and 214, an INPUT SWITCH 222, an INHIBIT DRIVER 226, a pair of CHARACTER CODE CHECK UNITS 232 and 248, a LRC REGISTER 242, a CR 208 NOT RESET & GM RECOGNITION UNIT 234 and an ERROR CHECK UNIT 268.

Referring now to Fig. 9, the INSTRUCTION DECODER 300 is shown as included within a single logical block as in the STATUS DECODER 400.

Referring now to Figs. 9 and 10, the STATUS CYCLE UNIT 500 is shown as including a TAPE R TYPE CYCLE UNIT 502, a TAPE W TYPE CYCLE UNIT 524, a DC & CPU TYPE CYCLE UNIT 560, a TAPE R/W CYCLE UNIT 588 and a PRIORITY R/W SERVICE UNIT 578.

Referring now to Figs. 11 to 15, inclusive, the TAPE SYNCHRONIZER 600 is shown as including a SELECT ADDRESS DECODER 602, a TAPE R STATUS UNIT 638, a TAPE W STATUS UNIT 648, a BACKWARD UNIT 671, a TAPE R CONTROL UNIT 687, a TAPE W CONTROL UNIT 720, a MULTIPLE OPERATION TIMER UNIT 732, a READ AMPLIFIER UNIT 741, a READ REGISTER 743, a CHARACTER RECOGNITION UNIT 752, a I/O INDICATOR UNIT 764 and a PROGRAM CONTROL UNIT 778.

Referring now to Figs. 15 and 16, the CLOCK PULSE GENERATOR 800 is shown as including a WAVEFORM GENERATOR 846, a CLOCK 814, a CHARACTER GATE COUNTER 858, a 7 COUNTER 876, a XTAL OSCILLATOR 818, a CLOCK CONTROL UNIT 802 and a DC RDY UNIT 840.

Referring now to Figs. 17 to 19, inclusive, the EXECUTION TIMER 900 is shown as including a MEMORY EXECUTION TIMER 902, a DISCONNECT TIMER 984, a RESPONSE EXECUTION TIMER 914, a RESET EXECUTION TIMER 924, a COUNTER & REGISTER EXECUTION TIMER 942, a DATA TRANSFER & CHECK EXECUTION TIMER 949 and a W EXECUTION TIMER 994.

It should be noted that within each logical block diagram a number is shown identifying the figure or figures on which the details of that logical block diagram will be found, in symbolic block form. Thus, for example, referring to the logical block diagram of the TAPE R STATUS UNIT 638 in Fig. 12, the designation Fig. 25C is shown within the block and if reference is made to Fig. 25C the details of the TAPE R STATUS UNIT 638 will be found in symbolic block form.

Additionally, if Figs. 5 to 19, inclusive, are placed in a manner as shown in Fig. 4, then, a composite block diagram is formed, in logical block form, of the major components of the DATA COORDINATOR. In this form, the intra-connections between the logical block diagrams within a major component as well as the inter-connections between the various major components can be clearly observed. To facilitate the understanding of these connections, resort has been made to the use of a TAPE IN BUS, a TAPE OUT BUS and, where necessary, an INTERNAL (INT) and EXTERNAL (EXT) BUSSES.

The INTERNAL BUS BUSSES, when necessary, will be found within the dotted outline of a major component, and are of two types, namely, the INT (1) and INT (2) while the EXTERNAL BUS will be found without the dotted lines of the major components.

The INT (1) BUS, when used, functions to connect an output line from the EXT BUS or from the TAPE OUT BUS to one or more logical block diagrams within a major component and also to connect the output of one logical block diagram, within a major component, to one or more of the remaining logical block diagrams within the same major component. Thus, for example, referring to the TAPE SYNCHRONIZER 600 in Figs. 11 to 15, it can be seen that the CTRL 0002 output line from the EXT BUS is connected via the INT (1) BUS to the BACKWARD UNIT 671 in Fig. 12 and to the PROGRAM CONTROL UNIT 778 in Fig. 15. Also, it can be seen that the $\overline{\text{PREP TO R A}}$ output line from the TAPE R STATUS UNIT 638 in Fig. 12 is connected via the INT (1) BUS to the TAPE W STATUS UNIT 648 and the TAPE W CONTROL UNIT 720 in Fig. 13. Additionally, the actual lines within the INT (1) BUS are shown in the breakdown of the logical block diagrams of a major component, as for example, in Figs. 25A to 25J, inclusive, of the TAPE SYNCHRONIZER 600.

Figure 11:
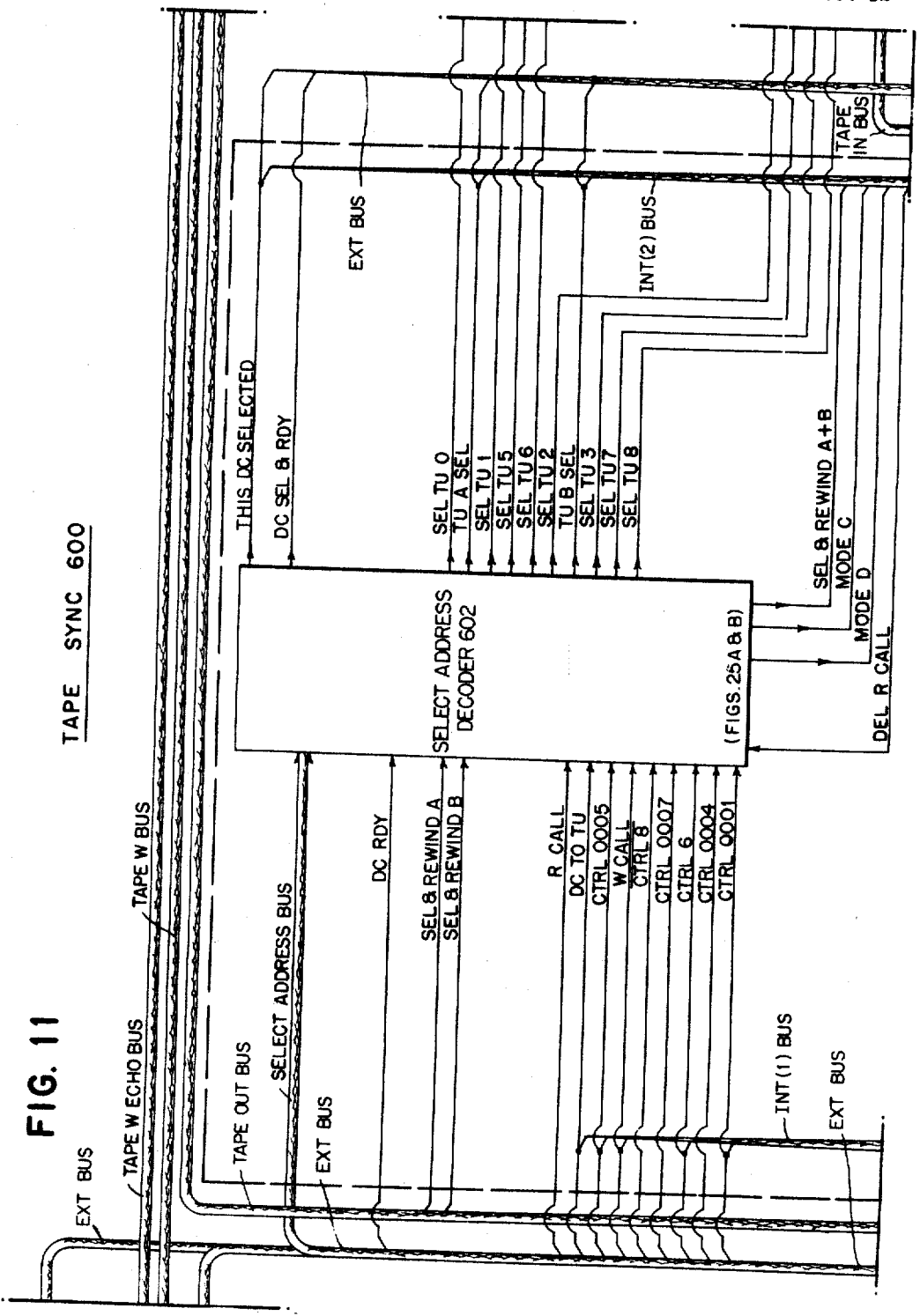

Similarly, the INT (2) BUS functions to connect the output of one logical block diagram within a major component to one or more of the remaining logical block diagrams of the same major component. Thus, for example, referring to the TAPE SYNCHRONIZER 600 in Figs. 11 to 15, it can be seen that the SET R A output line from the TAPE R STATUS UNIT 638 in Fig. 11 is connected via the INT (2) BUS to the TAPE W STATUS UNIT 648 and the PROGRAM CONTROL UNIT 778 in Fig. 15. Additionally, the actual lines within the INT (2) BUS are shown in the breakdown of the logical block diagrams of a major component, as for example, in Figs. 25A to 25J, inclusive, of the TAPE SYNCHRONIZER 600.

The TAPE IN BUS functions to connect the output lines from various logical block diagrams of the system to the TAPE UNITS shown in Fig. 17. Thus, for example, the BKWD output line from the BACKWARD UNIT 671 in Fig. 12 is connected via the TAPE IN BUS to the TAPE UNITS while the SELECT & REWIND A output line from the TAPE UNITS A is connected via the TAPE OUT BUS to the SELECT ADDRESS DECODER 602 in Fig. 11.

Also, when an output line from a TAPE UNIT is connected to more than one logical block diagram within a major component, then, the TAPE OUT BUS functions to connect that line directly to one logical block diagram within the major component and via the INT (1) BUS to the other logical block diagrams within the same major component. Thus, for example, referring to Fig. 17, the SEL & AT LP B line is connected via the TAPE OUT BUS directly to the BACKWARD UNIT 671 in Fig. 12 and via the INT (1) BUS to the TAPE R CONTROL UNIT 687 in Fig. 13, to the TAPE W CONTROL UNIT 720 and to the PROGRAM CONTROL UNIT 778 in Fig. 15.

The EXT BUS functions to connect the output lines from the various logical block diagrams of the system to the CPU and vise versa and to interconnect the various major components of the DATA COORDINATOR.

TAPE ORGANIZATION

Generally, a TAPE UNIT consists of a TAPE DRIVE mechanism, a TAPE SENSING mechanism and a reel of magnetic TAPE. A pair of TAPE REELS are provided to hold the TAPE and are driven intermittently so that a pair of TAPE loops are formed. The TAPE loops are maintained in vacuum columns on either side of the TAPE SENSING and DRIVE mechanism. Pressure sensitive switches in the vacuum columns provide signals for controlling the reel driving mechanism to reel and unreel the TAPE as fast as the DRIVE mechanism feeds it without putting undue stresses on the TAPE.

The TAPE is driven at a rate of approximately 75 inches per second during a TAPE read, TAPE write or BACKSPACE operation and the recording density is approximately 212 bits per inch (63 microseconds per CHARACTER). A high-speed rewind is provided to allow a full reel to be rewound in approximately 1 minute. In a REWIND operation, the TAPE UNIT automatically pulls the TAPE out of the vacuum columns, opens the TAPE sensing mechanism and retracts the TAPE driving mechanism so that a direct reel to reel transfer of TAPE can be effected.

Referring now to Fig. 2A, photo-sensitive markers are placed at the beginning and end of a reel of TAPE to enable the TAPE UNIT to sense the beginning and end of the TAPE. The markers are small pieces of plastic, one inch by $\%_6$ inch, coated with vaporized aluminum on one side and with adhesive on the other. When they are pasted to the uncoated side of the TAPE, reflected light from the bright surface of the spots is sensed by photoelectric means to detect the beginning and physical end of the TAPE. The strip at the beginning of the TAPE is hereinafter referred to as the LOAD POINT of the TAPE while the strip at the end of the TAPE is hereinafter referred to as the TAPE INDICATOR POINT. Each TAPE UNIT is provided with a TAPE INDICATOR UNIT which turns ON to indicate either the physical end of TAPE or the end of a file information. Additional reference will be made to the TAPE INDICATOR hereinafter in the sections on CONTROL 0003 mode of operation (TURN ON TAPE INDICATOR) and CONTROL 0000 mode of operation (TURN OFF TAPE INDICATOR).

RECORDS of any length may be stored on the TAPE up to the capacity of the MEMORY of the CENTRAL PROCESSING UNIT. As explained in the section on FORM AND CODING OF DATA a RECORD may consist of a variable number of CHARACTERS, with the last CHARACTER of the RECORD being a RECORD MARK CHARACTER to indicate the end of the RECORD as illustrated in Fig. 2A. Also, as explained previously a plurality of RECORDS may be grouped on the TAPE to comprise a group of RECORDS which may vary in length due to the variable length RECORDS that may be within the group as illustrated in Fig. 2A. The last CHARACTER of a group of RECORDS is a GROUP MARK CHARACTER which indicates the end of a group of RECORDS. Additionally, groups of RECORDS may be further grouped to form a file of RECORDS with the last CHARACTER of the file being a TAPE MARK CHARACTER to indicate the end of file as illustrated in Fig. 2A.

Groups of RECORDS within a file are separated by a 10 millisecond or approximately ¾ inch gap which represents the period of deceleration necessary to bring the TAPE to a stop and acceleration necessary to subsequently bring the TAPE up to speed.

The method of recording information on the TAPE is the non-return to zero (IBM), wherein the recording head always saturates the TAPE in one polarity or the other as illustrated diagrammatically in Fig. 2B. A 1 bit is recorded by reversing the current in the appropriate R/W head so that the polarity of the saturation recording reverses at that point. A 0 bit is recorded by continued saturation in the same direction. Thus, on reading, a 1 bit is sensed by a change of flux whereas a 0 bit is sensed by the absence of a change of flux. In the tape unit, the TAPE is passed between guides as it moves over the R/W heads. These guides are designed for nominal TAPE width plus the maximum tolerance. However, if the TAPE width varies, it may pass loosely in the guides and become displaced (TAPE SKEW) so that the bits of a CHARACTER, which are normally written perpendicular to the edge of the TAPE and read in parallel, may assume a slight angle to the edge of the TAPE, as illustrated in Figs. 2B and 2C, resulting in the serial reading of the bits of a CHARACTER. The READ REGISTER 743 in Fig. 25H and the CHARACTER REGISTER 214 in Fig. 21B are provided to account for TAPE reading variation due to TAPE SKEW as will be explained in greater detail in the description of the TAPE reading mode of operation.

A CHARACTER of DATA on TAPE is represented by a particular combination of six information bits and a check bit written transversely of the TAPE. The tracks on the TAPE may be referred to as the 1, 2, 4, 8, A, B and C tracks. Combination of bits in the 1, 2, 4 and 8 tracks represent the numeric or digit portion of the CHARACTER. Combination of bits in the A and B tracks represent the zone portion of the CHARACTER while, what will hereinafter be referred to as a vertical redundancy check bit, is recorded in the C track of the TAPE. This vertical check bit is always either 1 or 0 so that the total number of 1 bits in a CHARACTER is always even. By utilizing an even bit count, each CHARACTER will have at least two 1 bits therein (including the check bit) thereby reducing the possibility of undetected reading failures.

During a TAPE writing operation various checks are made of the information being written on the TAPE. Thus, a CHARACTER CODE CHECK is made of each CHARACTER to be written on the TAPE. This is a vertical check, CHARACTER by CHARACTER, to insure that there are an even number of 1 bits in the CHARACTER. The circuit for performing this check will be described in the section on CHARACTER CODE CHECKING. The TAPE writing process involves the sampling of six information lines and a check bit line from a CHARACTER REGISTER. This sampling process causes certain combinations of write triggers in the TAPE UNIT to change from one state to its opposite state in accordance with the bits of the CHARACTER being written. The process of changing the write triggers from one state to the other results in the generation of a combination of pulses which are echoed back to the CHARACTER REGISTER which still retains the CHARACTER just written on the TAPE. If the CHARACTER that is written on the TAPE is identical to the CHARACTER that is stored in the CHARACTER REGISTER then, the CHARACTER REGISTER is reset, but if there is a discrepancy, then, it is not reset and this condition is detected to signal an error, as will be explained in greater detail in the section on the TAPE writing mode of operation (DC TO TU).

Referring now to Figs. 2B and 2C, in addition to the vertical check, there is also employed a so-called longitudinal redundancy check. After the last CHARACTER of a RECORD or group of RECORDS has been written on the TAPE, the write triggers in the TAPE UNIT are reset causing an additional CHARACTER, hereinafter referred to as the longitudinal redundancy check (LRC) CHARACTER to be written on the TAPE, as illustrated in Fig. 2, so that the number of 1 bits in a horizontal direction of each track is even. The manner in which the LRC CHARACTER is used may be seen from Figs. 2B and 2C, where Fig. 2B illustrates a properly recorded TAPE section and Fig. 2C illustrates an improper recorded TAPE section in which a pair of 1 bits (circled) appear erroneously in place of a pair of 0 bits. This could result from an error in reading, or from damage to the TAPE after it is recorded. Thus, during a TAPE reading operation a CHARACTER CODE CHECK is made of each CHARACTER read from the TAPE to insure that there are an even number of 1 bits in the CHARACTER. Under the above assumed condition, where a pair of 1 bits appear in place of a pair of 0 bits, when a vertical check is made, no error is detected inasmuch as there are an even number of 1 bits in the first CHARACTER. However, during a TAPE reading operation an even count check is made, as will be explained in greater detail in the section on the TAPE reading mode of operation (TU TO DC) to insure that there are an even number of 1 bits in a horizontal direction of each track. Under the above assumed condition, it will be noted from Fig. 2C that an odd count of 1 bits will be detected in tracks A and B indicating an error. Thus, it should be apparent that a double check is made of a RECORD or group of RECORDS being read from a TAPE. Hence, a correct bit count for each individual CHARACTER and an incorrect longitudinal bit count indicator that two bits were dropped from a single CHARACTER or two spurious bits were read as part of a CHARACTER. Also, an incorrect bit count for one or more CHARACTERS and a correct longitudinal bit count indicate multiple compensating single bit errors. Additionally, an incorrect bit count for one or more individual CHARACTERS and an incorrect longitudinal bit count indicate one or more single bit errors which do not compensate each other.

Experience has shown that a substantial number of errors in reading of the TAPE are caused by a temporary imperfection, such as the presence of a speck of dust on the TAPE. Such errors can generally be corrected by rereading the RECORD or group of RECORDS involved. For this reason there is provided herein means for backspacing the TAPE upon detection of a reading error, so that the TAPE may be reread with the elimination of such error on a subsequent rereading. If the reading is not corrected by this procedure, it is presumed that some substantial reason for the error is present and the machine will stop.

MEMORY ORGANIZATION

Referring now to Fig. 5, the DATA COORDINATOR employs a three dimensional magnetic core MEMORY 50. Magnetic cores are utilized as the basic storage elements of the MEMORY 50 inasmuch as they are capable of storing an information by virtue of their residual magnetism.

The three dimensional MEMORY 50 is comprised of 7 bit planes, each of which consists of 1024 ferrite magnetic cores, hereinafter referred to as MEMORY CORES, arranged in a 32 x 32 matrix, and a dummy plane. The 7 bit planes of the MEMORY 50 are hereinafter referred to as the C bit plane, B bit plane, A bit plane, 8 bit plane, 4 bit plane, 2 bit plane and 1 bit plane corresponding to the 7 bits of a CHARACTER of DATA. Each group of 7 MEMORY CORES occupying corresponding positions in the 7 bit planes comprise a STORAGE REGISTER for a CHARACTER and since each of the 7 bit planes consist of 1024 MEMORY CORES, the MEMORY 50 provides 1024 STORAGE REGISTERS for 1024 CHARACTERS of DATA. Thus, the C bits of all of the 1024 CHARACTERS are stored in the C bit plane, the B bits of all of the 1024 CHARACTERS are stored in the B bit plane, etc.

Each MEMORY CORE has four wires passing therethrough, namely, an X current carrying wire, a Y current carrying wire, an inhibit current carrying wire Z and a sense wire SW.

Since each bit plane consists of a 32 x 32 array, provision is made for 32 separate and distinct X wires XX0, XX32, XX64 . . . XX960 and XX992 and 32 separate and distinct Y wires YY0, YY1, YY2 . . . YY30 and YY31 which run at 90° to each other. Corresponding X wires in each bit plane are serially connected in such a manner that an X wire consists of a single wire passing from the C bit plane serially through the B, A, 8, 4, 2 and 1 bit planes and then via a 20 ohm terminating resistor to a floating resistor common line. Likewise, corresponding Y wires in each bit plane are serially connected in such a manner that a Y wire consists of a single wire passing from the C bit plane serially through the B, A, 8, 4, 2 and 1 bit and then via a 20 ohm terminating resistor to the floating resistor common line. Therefore, a selected X wire and Y wire intersect a 7 MEMORY CORES, occupying corresponding positions in each of the 7 bit planes, which comprise the 7 bit STORAGE REGISTER for a 7 bit CHARACTER of DATA.

It should also be noted that alternate X and Y wires are passed via the DUMMY plane before passing via the C bit plane so that the alternate X and Y wires pass in opposite directions through each bit plane. Thus, for example, the YY0 wire is applied directly to the front of the C bit plane and then through from front to back whereas the YY1 wire is applied directly to the DUMMY plane, then, through from front to back and up to the C bit plane and then through from back to front, etc. so that adjacent X and Y wires pass in opposite directions through each bit plane. This arrangement, in combination with the floating resistor common line, permits current flowing in a selected wire to reach the floating resistor common line and then pass via the unselected wires to offset the effects of any unwanted current that may have been induced in these wires.

There are 7 separate and distinct, that is, unconnected inhibit wires Z, one for each of the 7 bit planes, arranged so that each Z wire runs parallel to the X wires in the associated plane and passes through every core in the plane.

Also, there are 7 separate and distinct, that is, unconnected sense wires SW, one for each of the 7 planes, arranged so that each sense wire runs at 45° to any of the other previously mentioned wires and passes through all of the cores of its associated plane in a bipolar fashion, that is, the sense wire enters some of the MEMORY CORES from the front and some from the back so that a change in flux causes a positive pulse to be induced in the sense wire in one case and a negative pulse in the other case. This arrangement is utilized to minimize the effects of half select currents pulses in a manner to be described hereinafter.

GENERAL INFORMATION FLOW AND CHECKING

Referring now to Fig. 3A, a flow chart is shown in purely diagrammatic form on which the flow of information through the DATA COORDINATOR may be traced. The various operations of the DATA COORDINATOR that involve information flow are as follows:

(1) Central Processing Unit to Data Coordinator
 (CPU TO DC)
(2) Data Coordinator to Tape Unit
 (DC TO TU)
(3) Write Tape Mark (Control 0001)
 (W TM)
(4) Central Processing Unit to Tape Unit (Control 0008W)
 (CPU TO TU)
(5) Central Processing Unit to Data Coordinator to Tape Unit (Early Tape Start)
 (CPU TO DC TO TU)
(6) Tape Unit to Data Coordinator
 (TU TO DC)
(7) Data Coordinator to Central Processing Unit
 (DC TO CPU)
(8) Microsecond Interrogation
 (DC TO CPU)
(9) Data Coordinator to Central Processing Unit and Tape Unit to Data Coordinator (Early Tape Start)
 (DC TO CPU & TU TO DC)
(10) Tape Unit to Central Processing Unit (Control 0008R)
 (TU TO CPU)
(11) Data Coordinator to Tape Unit and Tape Unit to Data Coordinator (Read while writing)
 (DC TO TU & TU TO DC)
(12) Central Processing Unit to Data Coordinator to Tape Unit and Tape Unit to Data Coordinator (Early Tape Start-Read while writing)
 (CPU TO DC TO TU & TU TO DC)

A general outline will now be given of the information flow and checking in these various modes of operation, the details of which will be described in later sections.

CPU TO DC

The CPU TO DC mode of operation functions to transfer a RECORD or group of RECORDS from the CENTRAL PROCESSING UNIT to the MEMORY 50 of the DATA COORDINATOR.

When a WRITE instruction is given, the CPU goes through a cycle of operation during which the first CHARACTER of the RECORD or group of RECORDS is transferred from the CPU to the CPU W BUS. Then, the LRC REGISTER 242 is cleared in preparation for initiating the production of an LRC CHARACTER and the CHARACTER REGISTER 214 is cleared in preparation for receiving the first CHARACTER presently on the CPU W BUS. Following this, the first SELECTED STORAGE REGISTER in the MEMORY 50 is cleared in preparation for receiving the first CHARACTER.

Now, switch S1 is momentarily closed and the first CHARACTER is transferred from the CPU W BUS to the CHARACTER REGISTER 214. Next, switches S2 and S22 are closed causing the output of the CHARACTER REGISTER 214 to be sampled so that the first CHARACTER is transferred and stored in the first SELECTED STORAGE REGISTER of the MEMORY 50. At the same time, the output of the CHARACTER REGISTER 214 is sensed by the CHAR CODE CHECK UNIT 248 to check whether an odd or even number of 1 bits in the first CHARACTER. Switch S3 is then momentarily closed and the output of the CHARACTER REGISTER 214 is again sampled so that the first CHARACTER is transferred to the LRC REGISTER 242 to initiate the production of an LRC CHARACTER.

At the proper time, switch S4 is momentarily closed to transfer a signal to the ERROR CHECK UNIT 268 if the CHAR CODE CHECK UNIT 248 detected an odd number of 1 bits in the first CHARACTER. Switches S2 and S22 are now opened and the CPU is then signalled to apply the next CHARACTER to the CPU W BUS.

A similar procedure is followed for each CHARACTER of the RECORD or group of RECORDS transferred from the CPU to the DC.

Now, let it be assumed that a complete RECORD or group of RECORDS has been transferred to the MEMORY 50 and the LRC CHARACTER created during the RECORD transfer is presently stored in the LRC REGISTER 242. Also, let it be assumed that a GM CHARACTER now appears on the CPU W BUS. Steps similar to those previously described are performed to transfer the GM CHARACTER to the CHARACTER REGISTER 214 and then to the MEMORY 50, where it is stored in the STORAGE REGISTER next following that in which the last CHARACTER of the RECORD or group of RECORDS is stored after which a CHARACTER CODE CHECK is made to insure that there are an even number of 1 bits in the GM CHARACTER. However, in this cycle of operation, switch S3 is not closed and, consequently, the GM CHARACTER is not transferred to the LRC REGISTER 242.

Next, an extra cycle of operation is performed, during which, the switch S5 is momentarily placed in position *a* and the output of the LRC REGISTER 242 is sampled to transfer the LRC CHARACTER created during the writing operation to the next SELECTED STORAGE REGISTER of the MEMORY 50. The output of the LRC REGISTER 242 is also sensed by the CHAR CODE CHECK UNIT 248 to check whether there are an odd or even number of 1 bits in the LRC CHARACTER. Following this, switch S4 is again momentarily closed to transfer a signal to the ERROR CHECK UNIT 268 if the CHAR CODE CHECK UNIT 248 detected an odd number of 1 bits in the LRC CHARACTER.

At the end of this mode of operation, switch S23 is closed causing the ERROR CHECK UNIT 268 to transfer a signal to the CPU, via the R/W CK line, if a CHARACTER CODE CHECK error was detected by the CHAR CODE CHECK UNIT 248, during the RECORD transfer.

Thus, during this mode of operation, a CHARACTER CODE CHECK is made of each CHARACTER transferred to the MEMORY 50 to check whether there are an odd or even number of 1 bits in each CHARACTER. Also, an LRC CHARACTER is created and stored in the MEMORY 50, which is utilized for a comparison check when the RECORD, presently stored in the MEMORY 50, is transferred to a SELECTED TAPE, as will be explained hereinafter.

DC TO TU

The DC TO TU mode of operation functions to transfer a RECORD or group of RECORDS from the MEMORY 50 of the DATA COORDINATOR to a SELECTED TAPE UNIT.

Initially, let it be assumed, that the switch S6 is moved to position *e* so as to SELECT the TAPE UNIT 2. Then, the DATA COORDINATOR applies a signal to the SELECTED TAPE UNIT 2 causing it to be set to a WRITE STATUS in preparation for the forthcoming WRITE operation.

As soon as the SELECTED TAPE UNIT 2 is set to the WRITE STATUS it transfers a signal back to the DATA COORDINATOR indicating that is selected and ready to write. The DATA COORDINATOR, in response signals the SELECTED TAPE UNIT 2 to start its TAPE moving in a forward direction. If the LOAD POINT of the SELECTED TAPE is initially being sensed, a LOAD POINT DELAY is provided to allow sufficient time for the LOAD POINT to pass the R/W heads of the SELECTED TAPE UNIT. If the LOAD POINT of the SELECTED TAPE is not initially being sensed, then, a 10 millisecond WRITE DELAY is provided to allow ample time for the SELECTED TAPE to get up to speed. Also, at the proper time, the CHARACTER REGISTER 208 is cleared in preparation for receiving the first CHARACTER from the MEMORY 50.

At the end of the WRITE DELAY period, a write operation is initiated. At the proper time, switch 8 is closed in preparation for rewriting the first CHARACTER that is read of the MEMORY 50. Now the first CHARACTER of the RECORD or group of RECORDS is read out of the first SELECTED STORAGE REGISTER of the MEMORY 50 and switch S7 is momentarily closed to transfer the first CHARACTER to the CHARACTER REGISTER 208. The output of the CHARACTER REGISTER 208 is sensed by the CHAR CODE CHECK UNIT 232 to check whether there are an odd or even number of 1 bits in the first CHARACTER.

Next, switch S22 is momentarily closed causing the output of the CHARACTER REGISTER 208 to be sampled so that the first CHARACTER is rewritten back pled into the MEMORY 50. Then, switch S9 is momentarily closed to transfer a signal to the ERROR CHECK UNIT 268 if the CHAR CODE CHECK UNIT 232 detected an odd number of 1 bits in the first CHARACTER.

Switch S11 is now closed in preparation for receiving the first CHARACTER to be echoed back on the TAPE W ECHO BUS. Following this, switch S10 is momentarily closed causing the first CHARACTER to be transferred via the TAPE W BUS to the SELECTED TAPE UNIT 2 where it is written on TAPE and a combination of signals corresponding to this CHARACTER is echoed back via the TAPE W ECHO BUS to reset the CHARACTER REGISTER 208 if the CHARACTER that is written on the SELECTED TAPE corresponds to the CHARACTER that is stored in the CHARACTER REGISTER 208. Now, the output of the CHARACTER REGISTER 208 is sensed by the CR 208 NOT RESET UNIT 234 to check whether the CHARACTER REGISTER 208 is reset. Switch S12 is then momentarily closed to transfer a signal to the ERROR CHECK UNIT 268 if the CR 208 NOT RESET UNIT 234 detected that the CHARACTER REGISTER 208 was not reset due to a discrepancy between the CHARACTER stored in the CHARACTER REGISTER 208 and the CHARACTER written on the SELECTED TAPE. After this, CHARACTER REGISTER 208 is cleared in preparation for receiving the next CHARACTER.

In a similar manner each CHARACTER of the RECORD or group of RECORDS is read out of the MEMORY 50 and transferred to the SELECTED TAPE.

Now, let it be assumed that a cycle of operation is performed during which the GM CHARACTER is read out of the MEMORY 50 and stored in the CHARACTER REGISTER 208. A check is made by the CHAR CODE CHECK UNIT 232 to determine whether there are an odd or even number of 1 bits in the GM CHARACTER, after which, the GM CHARACTER is rewritten back in the MEMORY 50.

At the proper time, the output of the CHARACTER REGISTER 208 is sensed by the GM RECOGNITION UNIT 234 and if the GM CHARACTER is recognized, then, switch S10 is not closed and, consequently, the GM CHARACTER is not written on the SELECTED TAPE. Following this, switch S9 is momentarily closed to transfer a signal to the ERROR CHECK UNIT 268 if the CHAR CODE CHECK UNIT 232 detected an odd number of 1 bits in the GM CHARACTER.

Next, the CHARACTER REGISTER 208 is cleared in preparation for receiving the LRC CHARACTER which may be the LRC CHARACTER that was created during the RECORD transfer from the CPU TO DC or the LRC CHARACTER that was created during a TAPE read operation as will be explained hereinafter.

The LRC CHARACTER is read out of the MEMORY 50 and switch S7 is momentarily closed causing the LRC CHARACTER to be transferred to the CHARACTER REGISTER 208. The output of the CHARACTER REGISTER 208 is sensed by the CHAR CODE CHECK UNIT 232 to check whether there are an odd or even number of 1 bits in the LRC CHARACTER.

Next, switch S22 is momentarily closed whereby the output of the CHARACTER REGISTER 208 is sampled and the LRC CHARACTER is rewritten back into the MEMORY 50. Following this, switch S9 is momentarily closed to transfer a signal to the ERROR CHECK UNIT 268 if the CHAR CODE CHECK UNIT 232 detected an odd number of 1 bits in the LRC CHARACTER.

After a RESET DELAY period, switch S11 is closed in preparation for receiving the LRC CHARACTER to be echoed back on the TAPE W ECHO BUS. At the same time, the DATA COORDINATOR signals the SELECTED TAPE UNIT 2 to reset the WRITE triggers therein causing an LRC CHARACTER to be written on the SELECTED TAPE and a combination of signals corresponding to this CHARACTER is echoed back via the TAPE W ECHO BUS to reset the CHARACTER REGISTER 208, if the LRC CHARACTER that is written on the SELECTED TAPE corresponds to the previously created LRC CHARACTER presently stored in the CHARACTER REGISTER 208. The output of the CHARACTER REGISTER 208 is sensed by the CR 208

NOT RESET UNIT 234 to check whether the CHARACTER REGISTER 208 is reset. Following this, switch S12 is momentarily closed to apply a signal to the ERROR CHECK UNIT 268 if the CR 208 NOT RESET UNIT 234 detected that the CHARACTER REGISTER 208 was not reset due to a discrepancy between the LRC CHARACTER written on the SELECTED TAPE and the previously created LRC CHARACTER presently stored in the CHARACTER REGISTER 208.

After this, the DC TO TU mode of operation is terminated and the CPU is signalled that the DATA COORDINATOR is no longer busy with a TAPE operation and is ready to proceed with a new operation.

After the next READ or WRITE instruction involving the DATA COORDINATOR is completed, switch S24 is momentarily closed causing the ERROR CHECK UNIT 268 to transfer a signal to the CPU, via the REC CK line, if a CHARACTER CODE CHECK error was detected by the CHAR CODE CHECK UNIT 232 or if an ECHO CHECK error was detected by the CR 208 NOT RESET UNIT 234 during the RECORD transfer.

Thus, during this mode of operation a CHARACTER CODE CHECK is made of each CHARACTER read out of the MEMORY 50 to check whether there are an odd or even number of 1 bits in each CHARACTER. Also, an ECHO CHECK is made of each CHARACTER written on the SELECTED TAPE to insure that each CHARACTER written on the SELECTED TAPE corresponds to the CHARACTER transferred from the DATA COORDINATOR.

WRITE TAPE MARK
(Control 0001)

The W TM mode of operation functions to write a special CHARACTER, namely, a TAPE MARK CHARACTER on a SELECTED TAPE to serve as an indication of the end of a file of RECORDS.

Initially, let it be assumed that switch S6 is moved to position $d$ thereby selecting TAPE UNIT 6 on whose TAPE a TM CHARACTER is to be written. Now, switch S13 is momentarily closed and the TM EMITTER emits a combination of signals corresponding to the TM CHARACTER which is stored in the CHARACTER REGISTER 208. Then, the DATA COORDINATOR applies a signal to the SELECTED TAPE UNIT 6 causing it to be set to the WRITE STATUS.

As soon as the SELECTED TAPE UNIT 6 is set the WRITE STATUS it transfers a signal back to the DATA COORDINATOR indicating that it is selected and ready to write. The DATA COORDINATOR, in response thereto, signals the SELECTED TAPE UNIT 6 to start its TAPE moving in a forward direction. Again, a 10 millisecond WRITE DELAY period is provided to allow sufficient for the SELECTED TAPE to get up to speed before the TM CHARACTER is written on the TAPE. At the end of the WRITE DELAY period, switch S10 is momentarily closed causing the TM CHARACTER to be transferred via the TAPE W BUS to the SELECTED TAPE UNIT 6 where it is written on the TAPE thereof.

After a RESET DELAY period, switch S11 is closed in preparation for receiving the LRC CHARACTER to be echoed back on the TAPE W ECHO BUS. At the same time, the WRITE triggers of the SELECTED TAPE UNIT 6 is reset causisng an LRC CHARACTER to be written on the SELECTED TAPE which, since it is a 1 CHARACTER check, is identical to the TM CHARACTER and a combination of signals corresponding thereto is echoed back via the TAPE W ECHO BUS to reset the CHARACTER REGISTER 208, if the LRC (TM) CHARACTER that is written on the SELECTED TAPE corresponds to the TM CHARACTER presently stored in the CHARACTER REGISTER 208. The output of the CHARACTER REGISTER 208 is sensed by the CR 208 NOT RESET UNIT 234 to check whether the CHARACTER REGISTER 208 is reset.

After a 10 microsecond RESET GATE period, switch S12 is momentarily closed to apply a signal to the ERROR CHECK UNIT 268 if the CR 208 NOT RESET UNIT 234 detected that the CHARACTER REGISTER 208 was not reset due to a discrepancy between the LRC (TM) CHARACTER written on the SELECTED TAPE and the TM CHARACTER stored in the CHARACTER REGISTER 208.

After the completion of the next READ or WRITE instruction involving the DATA COORDINATOR, switch S23 is momentarily closed causing the ERROR CHECK UNIT 268 to transfer a signal to the CPU, via the R/W CK line, if an ECHO CHECK error was detected by the CR 208 NOT RESET UNIT 234.

CPU TO TU

The CPU to TU mode of operation functions to by-pass the MEMORY 50 of the DATA COORDINATOR whenever the length of a RECORD or group of RECORDS exceeds the capacity of the MEMORY 50 and transfers the RECORD or group of RECORDS from the CENTRAL PROCESSING UNIT directly to a SELECTED TAPE UNIT.

Initially, let it be assumed, that the switch S6 is moved to position $a$ so as to SELECT the TAPE UNIT 0. Now, when a WRITE instruction is given, the CPU goes through a cycle of operation during which the first CHARACTER of the RECORD or group of RECORDS is transferred from the CPU to the CPU W BUS. Then, the DATA COORDINATOR applies a signal to the SELECTED TAPE UNIT 0 causing it to be set to a WRITE STATUS in preparation for the forthcoming WRITE operation.

As soon as the SELECTED TAPE UNIT 0 is set to the WRITE STATUS it transfers a signal back to the DATA COORDINATOR indicating that it is selected and ready to write. The DATA COORDINATOR, in response thereto, signals the SELECTED TAPE UNIT 0 to start its TAPE moving in a forward direction. If the LOAD POINT of the SELECTED TAPE is initially being sensed, a LOAD POINT DELAY is provided to allow sufficient time for the LOAD POINT to pass the R/W heads of the SELECTED TAPE UNIT 0. If the LOAD POINT of the SELECTED TAPE is not initially being sensed, then, a 10 millisecond WRITE DELAY is provided to allow ample time for the SELECTED TAPE to get up to speed. Also, at the proper time, the CHARACTER REGISTER 208 is cleared in preparation for receiving the first CHARACTER presently on the CPU W BUS.

After the WRITE DELAY period, switch S20 is momentarily closed causing the first CHARACTER, presently on the CPU W BUS, to be transferred to the CHARACTER REGISTER 208. The output of the CHARACTER REGISTER 208 is sensed by the CHAR CODE CHECK UNIT 232 to check whether there are an odd or even number of 1 bits in the first CHARACTER. Then, switch S9 is momentarily cloed to transfer a signal to the ERROR CHECK UNIT 268 if the CHAR CODE CHECK UNIT 232 detected an odd number of 1 bits in the first CHARACTER. Following this, the CPU is signalled to apply the next CHARACTER to the CPU W BUS.

Switch S11 is now closed in preparation for receiving the first CHARACTER to be echoed back on the TAPE W ECHO BUS. Following this, switch S10 is momentarily closed causing the first CHARACTER to be transferred via the TAPE W BUS to the SELECTED TAPE UNIT 0 where it is written on the TAPE and a combination of signals corresponding to this CHARACTER is echoed back via the TAPE W ECHO BUS to reset the CHARACTER REGISTER 208 if the CHARACTER that is written on the SELECTED TAPE corresponds to the CHARACTER that is stored in the CHARACTER REGISTER 208. Now, the output of the CHARACTER REGISTER 208 is applied to the CR 208 NOT RESET UNIT 234 where a check is made to determine whether the CHARACTER REGISTER 208 is reset. Switch S12 is then momentarily closed to transfer a signal to the ERROR CHECK UNIT 268 if the CR 208 NOT RESET UNIT 234 detected that the CHARACTER REGISTER 208 was not reset, due to a discrepancy between the CHARACTER stored in the CHARACTER REGISTER 208 and the CHARACTER written on the SELECTED TAPE. Next, the CHARACTER REGISTER 208 is cleared in preparation for receiving the next CHARACTER.

In a similar manner each CHARACTER of the RECORD or group of RECORDS by-passes the MEMORY 50 of the DATA COORDINATOR and is transferred from the CENTRAL PROCESSING UNIT directly to the TAPE of the SELECTED TAPE UNIT 0.

Now, let it be assumed that a GM CHARACTER appears on the CPU W BUS. Since a GM CHARACTER is not written on TAPE, switch S20 is not closed and, consequently, the GM CHARACTER is not transferred to the CHARACTER REGISTER 208. Therefore, no CHARACTER CODE CHECK is made by the CHAR CODE CHECK UNIT 232. After a RESET DELAY period, the DATA COORDINATOR signals the SELECTED TAPE UNIT 0 to reset the WRITE triggers therein causing an LRC CHARACTER to be written on the SELECTED TAPE.

At the end of this mode of operation, switch S23 is momentarily closed causing the ERROR CHECK UNIT 268 to transfer a signal to the CPU, via the R/W CK line, if a CHARACTER CODE CHECK error was detected by the CHAR CODE CHECK UNIT 232 or if an ECHO CHECK error was detected by the CR 208 NOT RESET UNIT 234 during the RECORD transfer.

Thus, during this mode of operation a CHARACTER CODE CHECK is made of each CHARACTER transferred to the SELECTED TAPE to check whether there are an odd or even number of 1 bits in each CHARACTER. Also, an ECHO CHECK is made of each CHARACTER of the RECORD or group of RECORDS written on the SELECTED TAPE to insure that each CHARACTER written on the SELECTED TAPE corresponds to the CHARACTER transferred from the CHARACTER REGISTER 208.

CPU TO DC TO TU (Early Tape Start)

The MEMORY 50 of the DATA COORDINATOR has a storage capacity for 1024 CHARACTERS. However, since one STORAGE REGISTER of the MEMORY 50 must be reserved for the LRC CHARACTER created during the CPU TO DC mode of operation, the maximum RECORD or group of RECORDS that can be transferred from the CENTRAL PROCESSING UNIT to the DATA COORDINATOR is 1023 CHARACTERS, including the GM CHARACTER. Also, since it requires 9 microseconds to process each CHARACTER, it would require approximately 9.2 milliseconds to transfer the maximum RECORD or group of RECORDS from the CENTRAL PROCESSING UNIT to the DATA COORDINATOR. Additionally, as explained in the DC TO TU mode of operation, when the TAPE of a SELECTED TAPE UNIT is started, a 10 millisecond WRITE DELAY is provided before the TAPE writing operation commences. Consequently, referring to Fig. 3B, it can be seen that the CPU TO DC TO TU mode of operation functions to utilize this delay period to transfer a RECORD or group of RECORDS from the CENTRAL PROCESSING UNIT to the MEMORY 50 of the DATA COORDINATOR so that by the time the TAPE writing operation commences the RECORD transfer to the DATA COORDINATOR is completed and the DATA COORDINATOR is ready to transfer the RECORD or group of RECORDS now in the MEMORY 50 to the SELECTED TAPE.

Initially, switch S6 is moved to select one of the TAPE UNITS. Then, a WRITE instruction is given, causing the CPU to go through a cycle of operation during which the first CHARACTER of the RECORD or group of RECORDS to be transferred to the DATA COORDINATOR is applied to the CPU W BUS. Next, the LRC REGISTER 242 is cleared in preparation for initiating the production of a LRC CHARACTER and, following this, the DATA COORDINATOR applies a signal to the SELECTED TAPE UNIT causing it to be set to a WRITE STATUS in preparation for the forthcoming WRITE operation.

As soon as the SELECTED TAPE UNIT is set to the WRITE STATUS it transfers a signal back to the DATA COORDINATOR indicating that it is selected and ready to write. The DATA COORDINATOR, in response thereto, signals the SELECTED TAPE UNIT to start its TAPE moving in a forward direction. If the LOAD POINT of the SELECTED TAPE is not initially being sensed, then, the 10 millisecond WRITE DELAY is INITIATED to allow ample time for the SELECTED TAPE to get up to speed and, at the proper time, CHARACTER REGISTERS 208 and 214 are cleared in preparation for receiving the first CHARACTER from the MEMORY 50 and the first CHARACTER presently on the CPU W BUS, respectively. During the 10 millisecond WRITE DELAY period, the RECORD transfer from the CENTRAL PROCESSING UNIT to the DATA COORDINATOR is completed and, by the end of the WRITE DELAY period, the DATA COORDINATOR is ready to transfer the RECORD or group of RECORDS to the SELECTED TAPE UNIT. The DATA flow between the CENTRAL PROCESSING UNIT and the DATA COORDINATOR and between the DATA COORDINATOR is similar to that previously described in the CPU TO DC and DC TO TU modes of operation.

TU TO DC

The TU TO DC mode of operation functions to transfer a RECORD or group of RECORDS from the TAPE of a SELECTED TAPE UNIT to the MEMORY 50 of the DATA COORDINATOR.

Initially, let it be assumed, that the switch S15 is moved to position e so as to SELECT the TAPE UNIT 8. It should be noted that if the TAPE reading operation was to be from TAPE UNIT 0, 1, 5 or 6, the switch S14 would be used to make the selection. Following this, the DATA COORDINATOR applies a signal to the SELECTED TAPE UNIT 8 causing it to be set to a READ STATUS in preparation for the forthcoming READ operation.

As soon as the SELECTED TAPE UNIT 8 is set to the READ STATUS it transfers a signal back to the DATA COORDINATOR indicating that it is selected and ready to read. The DATA COORDINATOR, in response thereto, signals the SELECTED TAPE UNIT 8 to start its TAPE moving in a forward direction. If the LOAD POINT of the SELECTED TAPE is initially being sensed, a LOAD POINT DELAY is provided to allow sufficient time for the LOAD POINT to pass the R/W heads of the SELECTED TAPE UNIT. If the LOAD POINT of the SELECTED TAPE is not initially being sensed, then, a 5 millisecond READ DELAY is provided to allow sufficient time for the SELECTED TAPE to accelerate up to its operating speed before a TAPE reading operation commences.

At the end of the READ DELAY period, the READ REGISTER 743 is cleared in preparation for receiving the first CHARACTER read from the SELECTED TAPE and the LRC REGISTER 242 is cleared in preparation for initiating the production on an LRC CHARACTER during the TAPE reading operation. Next the first CHARACTER is read from the TAPE of the SELECTED TAPE UNIT 8 and transferred via the R BUS B to the READ AMPLIFIER UNIT 741 where it is amplified and transferred to the READ REGISTER 743. Following this, the CHARACTER REGISTER 214 is cleared in preparation for receiving the first CHARAC- TER from the READ REGISTER 742. Now, switch S21 is momentarily closed whereby the output of the READ REGISTER 743 is sampled by the CHAR RECOG UNIT 752 to check whether the first CHARACTER read from the SELECTED TAPE is a TAPE MARK CHARACTER.

The READ REGISTER 743 is then reset causing the first CHARACTER presently stored therein to be applied to the R BUS and switch S16 is momentarily closed causing the first CHARACTER to be transferred to the CHARACTER REGISTER 214. At the same time, the CHAR RECOG UNIT 752 signals the SELECTED TAPE UNIT 8 to turn ON its TAPE indicator if it detected that the first CHARACTER read from the SELECTED TAPE was a TAPE MARK CHARACTER. Following this, the first SELECTED STORAGE REGISTER in the MEMORY 50 is cleared in preparation for receiving the first CHARACTER read from the SELECTED TAPE.

Now, switches S2 and S22 are closed causing the output of the CHARACTER REGISTER 214 to be sampled so that the first CHARACTER is transferred and stored in the first SELECTED STORAGE REGISTER of the MEMORY 50. At the same time, the output of the CHARACTER REGISTER 214 is sensed by the CHAR CODE CHECK UNIT 248 to check whether there are an odd or even number of 1 bits in the first CHARACTER. Switch S3 is then momentarily closed and the output of the CHARACTER REGISTER 214 is again sampled so that the first CHARACTER is transferred to the LRC REGISTER 242 to initiate the production of an LRC CHARACTER.

At the proper time, switch S4 is momentarily closed to transfer a signal to the ERROR CHECK UNIT 268 if the CHAR CODE CHECK UNIT 248 detected an odd number of 1 bits in the first CHARACTER.

A similar procedure is followed for each CHARACTER of the RECORD or group of RECORDS read from the SELECTED TAPE and transferred to the MEMORY 50 of the DATA COORDINATOR. However, it should be noted that the TAPE reading operation is asynchronous.

Now, let it be assumed that a complete RECORD or group of RECORDS has been transferred to the MEMORY 50 and the LRC CHARACTER created during the TAPE reading operation is presently stored in the LRC REGISTER 242. Now, CHARACTER REGISTER 214 is cleared in preparation for receiving the LRC CHARACTER to be read from the SELECTED TAPE, after which, the next SELECTED STORAGE REGISTER in the MEMORY 50 is cleared in preparation for receiving a GM CHARACTER. Following this, switches S17 and S22 are momentarily closed and the GM EMITTER produces an output which causes a CHARACTER, corresponding to a GM CHARACTER, to be stored in the MEMORY 50 and, also, to be applied to the CHAR CODE CHECK UNIT 248 to check whether there are an odd or even number of 1 bits in the GM CHARACTER. Next, switch S4 is momentarily closed to transfer a signal to the ERROR CHECK UNIT 268 if the CHAR CODE CHECK UNIT 248 detected an odd number of 1 bits in the GM CHARACTER.

Sometime later, the LRC CHARACTER (which was written on TAPE as per the DC TO TU mode of operation) is read from the SELECTED TAPE and applied via the R BUS B to the READ AMPLIFIER UNIT 741 where it is amplified and transferred to the READ REGISTER 743.

The READ REGISTER 743 is then reset causing the LRC CHARACTER to be applied to the R BUS and switch S16 is momentarily closed causing the LRC CHARACTER to be stored in the CHARACTER REGISTER 214. Following this, the next SELECTED STORAGE REGISTER of the MEMORY 50 is cleared in preparation for receiving the LRC CHARACTER.

Now, switches S2 and S22 are closed causing the output of the CHARACTER REGISTER 214 to be sampled so that the LRC CHARACTER read from the SELECTED TAPE is transferred to and stored in the SELECTED STORAGE REGISTER of the MEMORY 50. At the same time, the output of the CHARACTER REGISTER 214 is sensed by the CHAR CODE CHECK UNIT 248 to check whether there are an odd or even number of 1 bits in the LRC CHARACTER. Switch S3 is then momentarily closed and the output of the CHARACTER REGISTER 214 is again sampled so that the LRC CHARACTER read from the SELECTED TAPE is transferred to reset the LRC REGISTER 242 if the LRC CHARACTER that was read from the SELECTED TAPE corresponds to the LRC CHARACTER created during the TAPE reading operation and presently stored in the LRC REGISTER 242.

At the proper time, switch S4 is momentarily closed to transfer a signal to the ERROR CHECK UNIT 268 if the CHAR CODE CHECK UNIT 248 detected an odd number of 1 bits in the LRC CHARACTER read from the SELECTED TAPE.

Sometime later, switch S5 is momentarily moved to position b to transfer a signal to the ERROR CHECK UNIT 268 if the LRC REGISTER 242 was not reset, due to a discrepancy between the LRC CHARACTER read from the SELECTED TAPE and the LRC CHARACTER created during the TAPE reading operation.

After this, the TU TO DC mode of operation is terminated and the CPU is signalled that the DATA COORDINATOR is no longer busy with a TAPE operation and is ready to proceed with a new operation.

After the next READ or WRITE instruction involving the DATA COORDINATOR is completed, switch S23 is momentarily closed causing the ERROR CHECK UNIT 268 to transfer a signal to the CPU, via the R/W CK line, if a CHARACTER CODE CHECK error was detected by the CHAR CODE CHECK UNIT 248 or if the LRC REGISTER 242 was not reset due to an LRC error.

Thus, during this mode of operation, a CHARACTER CODE CHECK is made of each CHARACTER read out of the MEMORY 50 to check whether there are an odd or even number of 1 bits in each CHARACTER. Also, an ECHO CHECK is made of the LRC CHARACTER created during the TAPE reading operation and the LRC CHARACTER read from the SELECTED TAPE.

DC TO CPU

The DC TO CPU mode of operation functions to transfer a RECORD or group of RECORDS from the MEMORY 50 of the DATA COORDINATOR to the CENTRAL PROCESSING UNIT.

Initially, switch S18 is closed to connect the output of the CHARACTER REGISTER 214 to the CPU R BUS. Next, the CHARACTER REGISTER 208 is cleared in preparation for receiving the first CHARACTER from the MEMORY 50. Also, at the proper time, switch S8 is closed in preparation for rewriting the first CHARACTER that is read out of the MEMORY 50. Now, the first CHARACTER is read out of the first SELECTED STORAGE REGISTER of the MEMORY 50 and switch S7 is momentarily closed to transfer the CHARACTER to the CHARACTER REGISTER 208. The output of the CHARACTER REGISTER 208 is sensed by the CHAR CODE CHECK UNIT 232 to check whether there are an odd or even number of 1 bits in the CHARACTER.

Next, switch S22 is momentarily closed causing the output of the CHARACTER REGISTER 208 to be sampled so that the first CHARACTER is rewritten back into the MEMORY 50. Following this, CHARACTER REGISTER 214 is cleared in preparation for receiving the first CHARACTER still presently stored in the CHARACTER REGISTER 208. Then, switch S9 is momentarily closed to transfer a signal to the ERROR CHECK UNIT 268 if the CHAR CODE CHECK UNIT 232 detected an odd number of 1 bits in the first CHARACTER.

Switch S19 is now closed to transfer the first CHARACTER from the CHARACTER REGISTER 208 to the CHARACTER REGISTER 214. Since the switch S18 is still closed, the output of the CHARACTER REGISTER 214 is connected to the CPU R BUS so that the first CHARACTER effectively appears on the CPU R BUS. The CPU is then signalled to sample the CPU R BUS causing the first CHARACTER to be transferred to the CENTRAL PROCESSING UNIT.

A similar procedure is followed for each CHARACTER of the RECORD or group of RECORDS transferred from the DC to the CPU.

Now, let it be assumed that a complete RECORD or group of RECORDS has been transferred from the DC to the CPU and that a GM CHARACTER has been read out of the MEMORY 50, stored in the CHARACTER REGISTER 208 and checked by the CHAR CODE CHECK UNIT 232. At the proper time, the output of the CHARACTER REGISTER 208 is sensed by the GM RECOGNITION UNIT 234 and if the GM CHARACTER is recognized, then, switch S18 is opened to disconnect the output of the CHARACTER REGISTER 214 from the CPU R BUS to prevent the GM CHARACTER from being transferred to the CPU. Following this, switch S22 is momentarily closed causing the GM CHARACTER to be rewritten back into the MEMORY 50, after which, switch S9 is momentarily closed to transfer a signal to the ERROR CHECK UNIT 268 if the CHAR CODE CHECK UNIT 232 detected an odd number of 1 bits in GM CHARACTER. Also, when the GM CHARACTER is recognized, the present mode of operation is terminated and the LRC CHARACTER, presently stored in the MEMORY 50, is not processed.

At the end of this mode of operation switch S23 is closed causing the ERROR CHECK UNIT 268 to transfer a signal to the CPU, via the R/W CK line, if a CHARACTER CODE CHECK error was detected by the CHAR CODE CK UNIT 232 during the RECORD transfer. Thus, during this mode of operation a CHARACTER CODE CHECK is made of each CHARACTER read out of the MEMORY 50 to check whether there are an odd or even number of 1 bits in each CHARACTER.

The MICROSECOND INTERROGATION mode of operation is similar to that of the DC TO CPU mode of operation except that special provision is made to transfer only 8, 16, 32 or 64 CHARACTERS of a RECORD or group of RECORDS from the DATA COORDINATOR to the CENTRAL PROCESSING UNIT. The details of the selection of this small part of a possible maximum 1022 CHARACTER RECORD or group of RECORDS will be described in greater detail hereinafter in the section on MICROSECOND INTERROGATION.

DC TO CPU AND TU TO DC
(Early Tape Start)

When the TAPE at a SELECTED TAPE UNIT is started, a 5 millisecond READ DELAY is provided, as explained hereinbefore in the TU TO DC mode of operation, to allow sufficient time for the SELECTED TAPE to accelerate to its normal operating speed before the TAPE reading operation commences. Consequently, the DC TO CPU & TU TO DC mode of operation functions to utilize this delay period to transfer a RECORD or group of RECORDS from the DATA COORDINATOR to the CENTRAL PROCESSING UNIT so that by the end of the READ DELAY period, when the TAPE reading operation commences, the previous transfer from the DATA COORDINATOR to the CENTRAL PROCESSING UNIT is completed and the DATA COORDINATOR is ready to receive the next RECORD or group of RECORDS from the SELECTED TAPE.

At the beginning of this mode of operation a check is made to determine if the RECORD or group of RECORDS presently stored in the DATA COORDINATOR, is greater than 512 CHARACTERS. If the RECORD or group of RECORDS is less than 512 CHARACTERS, then, referring to Fig. 3C, since it takes 9 microseconds to process each CHARACTER transferred from the DATA COORDINATOR to the CENTRAL PROCESSING UNIT, it would only require approximately 4.6 milliseconds to transfer a maximum of 511 CHARACTERS from the DATA COORDINATOR to the CENTRAL PROCESSING UNIT. Therefore, the SELECTED TAPE may be started at the same time that the RECORD transfer is started and by the end of the 5 millisecond TAPE READ DELAY period, the RECORD transfer from the DATA COORDINATOR to the CENTRAL PROCESSING UNIT is completed and the DATA COORDINATOR is read to receive the next RECORD or GROUP of RECORDS from the SELECTED TAPE.

Since neither the GM or LRC CHARACTER is transferred to the CENTRAL PROCESSING UNIT during a DC TO CPU mode of operation, then, a maximum of 1022 CHARACTERS may be transferred from the DATA COORDINATOR to the CENTRAL PROCESSING UNIT. Consequently, referring to Fig. 3D, it would require a period of approximately 9.2 milliseconds to transfer the maximum RECORD or group of RECORDS from the DATA COORDINATOR to the CENTRAL PROCESSING UNIT which period exceeds the 5 millisecond TAPE READ DELAY period. Therefore, in the latter case, a TAPE READ CALL DELAY is initiated simultaneously with the start of the RECORD transfer from the DATA COORDINATOR to the CENTRAL PROCESSING UNIT. At the end of this delay period, the TAPE is started and the 5 millisecond TAPE READ DELAY period commences. The maximum RECORD transfer from the DATA COORDINATOR to the CENTRAL PROCESSING UNIT is completed during the 5 millisecond TAPE READ DELAY period and by the time the TAPE reading operation commences the DATA COORDINATOR is ready to receive the next RECORD or group of RECORDS from the SELECTED TAPE.

The DATA flow between the DATA COORDINATOR and the CENTRAL PROCESSING UNIT and between the SELECTED TAPE UNIT and the DATA COORDINATOR is similar to that previously described in the DC TO CPU AND TU TO DC modes of operations and the details of the present mode of operation will be described hereinafter in the section on DC TO CPU & TU TO DC.

TU TO CPU

The TU TO CPU mode of operation functions to bypass the MEMORY 50 of the DATA COORDINATOR whenever the length of a RECORD or group of RECORDS exceeds the capacity of the MEMORY 50 and transfer the RECORD or group of RECORDS from a SELECTED TAPE UNIT directly to the CENTRAL PROCESSING UNIT.

Initially, let it be assumed, that the switch S14 is moved to position d so as to SELECT the TAPE UNIT 5. Following this, switch S18 is closed to connect the output of the CHARACTER REGISTER 214 to the CPU R BUS. Next the DATA COORDINATOR applies a signal to the SELECTED TAPE UNIT 5 causing it to be set to a READ STATUS in preparation for the forthcoming READ operation.

As soon as the SELECTED TAPE UNIT 5 is set to the READ STATUS it transfers a signal back to the DATA COORDINATOR indicating that it is selected and ready to read. The DATA COORDINATOR, in response thereto, signals the SELECTED TAPE UNIT 5 to start its TAPE moving in a forward direction. If the LOAD POINT of the SELECTED tape is initially being sensed, a LOAD POINT DELAY is provided to allow sufficient time for the LOAD POINT to pass the R/W heads of the SELECTED TAPE UNIT. If the LOAD POINT of the SELECTED TAPE is not initially being sensed, then, a 5 millisecond READ DELAY is provided to allow sufficient time for the SELECTED TAPE to accelerate up to its operating speed before a TAPE reading operation commences.

At the end of the READ DELAY period, the READ REGISTER 743 is cleared in preparation for receiving the first CHARACTER read from the SELECTED TAPE and the LRC REGISTER 242 is cleared in preparation for initiating the production of an LRC CHARACTER during the TAPE reading operation. Next, the first CHARACTER is read from the TAPE of the SELECTED TAPE UNIT 5 and transferred via the R BUS B to the READ AMPLIFIER UNIT 741 where it is amplified and transferred to the READ REGISTER 743. Following this, the CHARACTER REGISTER 214 is cleared in preparation for receiving the first CHARACTER from the READ REGISTER 743. Now, switch S21 is momentarily closed whereby the output of the READ REGISTER 743 is sampled by the CHAR RECOG UNIT 752 to check whether the first CHARACTER read from the SELECTED TAPE is a TAPE MARK CHARACTER.

The READ REGISTER 743 is then reset causing the first CHARACTER presently stored therein to be applied to the R BUS and switch S16 is momentarily closed to transfer the first CHARACTER to the CHARACTER REGISTER 214. At the same time, the CHAR RECOG UNIT 752 signals the SELECTED TAPE UNIT 5 to turn ON its TAPE INDICATOR if it detected that the first CHARACTER read from the SELECTED TAPE was a TAPE MARK CHARACTER. Since switch S18 is still closed, the output of the CHARACTER REGISTER 214 is connected to the CPU R BUS so that the first CHARACTER effectively appears on the CPU R BUS. The CPU is then signalled to sample the CPU R BUS causing the first CHARACTER to be transferred to the CENTRAL PROCESSING UNIT.

Now, switch S2 is closed causing the output of the CHARACTER REGISTER 124 to be sensed by the CHAR CODE CHECK UNIT 248 to check whether there are an even number of 1 bits in the first CHARACTER. Switch S3 is then momentarily closed and the output of the CHARACTER REGISTER 214 is again sampled so that the first CHARACTER is transferred to the LRC REGISTER 242 to initiate the production of an LRC CHARACTER.

At the proper time, switch S4 is momentarily closed to transfer a signal to the ERROR CHECK UNIT 268 if the CHAR CODE CHECK UNIT 248 detected an odd number of 1 bits in the first CHARACTER.

In a similar manner, each CHARACTER of the RECORD or group of RECORDS by-passes the MEMORY 50 of the DATA COORDINATOR and is transferred from the SELECTED TAPE UNIT 5 directly to the CENTRAL PROCESSING UNIT. However, it should be noted that the TAPE reading operation is asynchronous.

Now, let it be assumed that a complete RECORD or group of RECORDS has been transferred to the CENTRAL PROCESSING UNIT and that the LRC CHARACTER created during the TAPE reading operation is presently stored in the LRC REGISTER 242. CHARACTER REGISTER 214 is then cleared in preparation for receiving the LRC CHARACTER to be read from the SELECTED TAPE and switch S18 is opened to disconnect the output of the CHARACTER REGISTER 214 from the CPU R BUS to prevent the LRC CHARACTER from being transferred to the CPU.

Sometime later, the LRC CHARACTER (which was written on TAPE as per the DC TO TU mode of operation) is read from the SELECTED TAPE and applied via the R BUS A to the READ AMPLIFIER UNIT 741 where it is amplified and transferred to the READ REGISTER 748.

The READ REGISTER 743 is then reset causing the LRC CHARACTER to be applied to the R BUS and switch S16 is momentarily closed causing the LRC CHARACTER to be stored in the CHARACTER REGISTER 214. Following, switch S3 is momentarily closed and the output of the CHARACTER REGISTER 214 is sampled so that the LRC CHARACTER read from the SELECTED TAPE is transferred to reset the LRC REGISTER 242, if the LRC CHARACTER thus was read from the SELECTED TAPE corresponds to the LRC CHARACTER created during the TAPE reading operation, presently stored in the LRC REGISTER 242. Now, switch S2 is closed causing the output of the CHARACTER REGISTER 214 to be sensed by the CHAR CODE CHECK UNIT 248 to check whether there are an odd or even number of 1 bits in the LRC CHARACTER.

At the proper time, switch S4 is momentarily closed to transfer a signal to the ERROR CHECK UNIT 268 if the CHAR CODE CHECK UNIT 248 detected an odd number of 1 bits in the LRC CHARACTER read from the SELECTED TAPE.

Sometime later, switch S5 is momentarily moved to position b to transfer a signal to the ERROR CHECK UNIT 268 if the LRC REGISTER 242 is not reset, due to a discrepancy between the LRC CHARACTER read from the SELECTED TAPE and the LRC CHARACTER created during the TAPE reading operation.

After this, the TU TO CPU mode of operation is terminated and the CPU is signalled that the DATA COORDINATOR is no longer busy with a TAPE operation and is ready to proceed the new operation.

At the end of this mode of operation, switch S23 is closed causing the ERROR CHECK UNIT 268 to transfer a signal to the CPU, via the R/W CK line if a CHARACTER CODE CHECK error was detected by the CHAR CODE CHECK UNIT 248 or if the LRC REGISTER 242 is not reset due to an LRC error.

Thus, during this mode of operation, a CHAR CODE CHECK is made of each CHARACTER transferred to the CENTRAL PROCESSING UNIT to check whether there are an odd or an even number of 1 bits in each CHARACTER. Also, an ECHO CHECK is made of the LRC CHARACTER created during the TAPE reading operation and the LRC CHARACTER read from the SELECTED TAPE.

DC TO TU AND TU TO DC

The DC TO TU & TU TO DC mode of operation function to transfer a RECORD or group of RECORDS from the DATA COORDINATOR to a SELECTED TAPE UNIT concurrently with a transfer of a RECORD or group of RECORDS from another SELECTED TAPE UNIT to the DATA COORDINATOR.

When the TAPE of a SELECTED TAPE UNIT is started, a 5 millisecond READ DELAY is provided, as explained hereinbefore in the TU TO DC mode of operation, to allow sufficient time for the SELECTED TAPE to accelerate to its normal operating speed before the TAPE reading operation commences. Also, when the TAPE of a SELECTED TAPE UNIT is started, a 10 millisecond WRITE DELAY is provided, as explained hereinbefore in the DC TO TU mode of operation, before the TAPE writing operation commences which period exceeds the 5 milliseconds TAPE READ DELAY PERIOD. Consequently, referring to Fig. 3E, in a concurrent read while writing operation, an 8 millisecond TAPE READ CALL DELAY is initiated simultaneously with the 10 millisecond TAPE WRITE DELAY. At the end of the TAPE READ CALL DELAY period, the READ TAPE is started and the 5 millisecond TAPE READ DELAY period is initiated. During the TAPE READ DELAY period, the DC TO TU RECORD transfer commences so that by the time the TAPE reading operation commences, the DATA COORDINATOR is ready to receive the RECORD or group of RECORDS from the READ TAPE and thereafter a concurrent read while writing operation may proceed.

The DATA flow between the DATA COORDINATOR and a SELECTED TAPE UNIT and between another SELECTED TAPE UNIT and the DATA COORDINATOR is similar to that previously described in the DC TO TU and TU TO DC modes of operation.

Referring now to Fig. 3A, it can be seen that the TAPE UNITS used with the DATA COORDINATOR are divided into two groups. Hence, when performing a concurrent read while writing operation the TAPE UNIT associated with the reading must be selected from one group and the TAPE UNIT associated with the writing must be selected from the other group.

It should be noted that the DATA COORDINATOR has a clock cycle of 9 microseconds during which a CHARACTER may be either read out of or written into the MEMORY 50. Also, it should be noted that during a TAPE operation, CHARACTERS are processed at the rate of 63 microseconds per CHARACTER so that there are 7 clock cycles for each CHARACTER processed. Therefore, in the concurrent read while writing operation, a CHARACTER, which is to be written on a SELECTED TAPE, is read out of the MEMORY 50 during one of the 7 clock cycles while a CHARACTER, which is read from another SELECTED TAPE, is written into the MEMORY 50 during another one of the 7 clock cycles. However, since CHARACTERS are read asynchronously from a SELECTED TAPE, it is possible that an attempt will be made to read a CHARACTER out of the MEMORY 50 during the same clock cycle that a CHARACTER is being written into the MEMORY 50. Since there are 7 clock cycles for each CHARACTER process, provision is made whereby, in such situations, priority is given to the writing of the CHARACTER into the MEMORY 50 and reading a CHARACTER out of the MEMORY 50 is delayed and performed during a subsequent one of the 7 clock cycles.

CPU TO DC TO TU AND TU TO DC
(Early Tape Start)

The MEMORY 50 of the DATA COORDINATOR has a storage capacity for 1024 CHARACTERS. However, as explained hereinbefore in the section on CPU TO DC TO TU, the maximum RECORD or group of RECORDS that can be transferred from the CENTRAL PROCESSING UNIT to the TAPE COORDINATOR is 1023 CHARACTERS, which transfer requires approximately 9.2 milliseconds. Additionally, as explained in the DC TO TU mode of operation, when the TAPE of the SELECTED TAPE UNIT is started, a 10 millisecond WRITE DELAY is provided before the TAPE writing operation commences. Consequently, referring to Fig. 3F, the CPU TO DC TO TU & TU TO DC mode of operation functions to utilize this delay period to transfer a RECORD or group of RECORDS from the CENTRAL PROCESSING UNIT to the MEMORY 50 of the DATA COORDINATOR. Then, by the time TAPE writing operation commences, the RECORD or group of RECORDS now in the DATA COORDINATOR is transferred to a SELECTED TAPE UNIT and after a period of delay a RECORD or group of RECORDS is concurrently transferred from another SELECTED TAPE UNIT to the DATA COORDINATOR.

The DATA flow between the CENTRAL PROCESSING UNIT and the DATA COORDINATOR, between the DATA COORDINATOR and a SELECTED TAPE UNIT and between another SELECTED TAPE UNIT and the DATA COORDINATOR is similar to that previously described in the CPU TO DC, DC TO TU and TU TO DC modes of operation.

CHARACTER CODE CHECKING

CHARACTERS of DATA are binary coded, as explained in the section on FORM AND CODING OF DATA, and arranged to contain an even number of 1 bits. CHARACTER CODE CHECKS are made in the machine, by the CHAR CODE CHECK UNIT 232 and 248 in Fig. 21D and 21E, respectively, to insure that there are an even number of 1 bits in the CHARACTER or CHARACTERS being processed. Each of these CHARACTER CODE CHECK UNITS function to produce a positive output signal whenever an odd number of 1 bits is detected in the CHARACTER.

Since these circuits are identical, the details of only one is shown in Fig. 21E which will now be described. Negative signals, corresponding to the CHARACTER to be checked, are applied to the CHAR CODE CHECK UNIT 248 in Fig. 21E via the $\bar{1}, \bar{2}, \bar{4}, \bar{8}, \bar{A}, \bar{B}$ and $\bar{C}$ lines.

Now, let it be assumed that a CHARACTER having an even number of 1 bits is applied to the CHAR CODE CHECK UNIT 248, as for example, the CHARACTER 1101010. Consequently, a positive signal is applied via the $\bar{1}$ line to one input of each of the AND circuits 251 and 252 and to the inverter 249a where it is inverted to a negative signal and applied via the 1 line to one input of each of the AND circuits 250 and 253. A negative signal is applied via the $\bar{2}$ line to a second input of each of the AND circuits 250 and 252 and to the inverter 249b where it is inverted to a positive signal and applied via the 2 line to a second input of each of the AND circuits 251 and 253. A positive signal is applied via the $\bar{4}$ line to the remaining inputs of each of the AND circuit 250 and 251 and to the inverter 249c where it is inverted to a negative signal and applied via the 4 line to the remaining inputs of each of the AND circuits 252 and 253. A negative signal is applied via the $\bar{8}$ line to one input of each of the AND circuits 255 and 256 and to the inverter 249d where it is inverted to a positive signal and applied via the 8 line to one input of each of the AND circuits 254 and 257. A positive signal is applied via the $\bar{A}$ line to a second input of each of the AND circuits 254 and 256 and to the inverter 249e where it is inverted to a negative signal and applied via the A line to a second input of each of the AND circuits 255 and 257. A negative signal is applied via the $\bar{B}$ line to the remaining input of each of the AND circuits 254 and 255 and to the inverter 249f where it is inverted to a positive signal and applied via the B line to the remaining input of each of the AND circuits 256 and 257. A negative signal is applied via the $\bar{C}$ line to the inverter 249g where it is inverted to a positive signal and applied via the C line to one input of each of the AND circuits 262 and 263 and the OR circuit 261. It will be noted that only the AND circuit 251 has positive signals to all of its inputs causing a positive signal be passed via the OR circuits 258a and 259 to the remaining input of the OR circuit 261 and the AND circuit 262. The positive signals at the inputs of the OR circuit 261 cause a positive signal to be applied to one input of the AND circuit 266. The positive signals at the inputs of the AND circuit 262 cause a positive signal to be applied via the OR circuit 264 to the inverter 265 where it is inverted to a negative signal and applied via the OR circuit 267 to decondition the AND circuit 266 thereby preventing the CHAR CODE CK B line from coming up. Hence, it should be apparent that a positive signal will not be produced at the output of the CHAR CODE CHECK UNIT 248 if the CHARACTER has an even number of 1 bits. Also, it should be obvious that, by a somewhat similar process of decoding, every CHARACTER having an even number of 1 bits will effectively block the AND circuit 266.

Now, let it be assumed that a CHARACTER having an odd number of 1 bits is applied to the CHAR CODE CHECK UNIT 248 as for example, the CHARACTER 0010110. Consequently, a positive signal is applied via the $\bar{1}$ line to one input of each of the AND circuits 251 and 252 and to the inverter 249a where it is inverted to a negative signal and applied via the 1 line to one input of each of the AND circuits 250 and 253. A negative signal is applied via the $\overline{2}$ line to a second input of each of the AND circuits 250 and 252 and to the inverter 249b where it is inverted to a positive signal and applied via the 2 line to a second input of each of the AND circuits 251 and 253. A negative signal is applied via the $\overline{4}$ line to the remaining input of each of the AND circuits 250 and 251 and to the inverter 249c where it is inverted to a positive signal and applied via the 4 line to the remaining input of each of the AND circuits 252 and 253. A positive signal is applied via the $\overline{8}$ line to one input of each of the AND circuits 255 and 256 and to the inverter 249d where it is inverted to a negative signal and applied via the 8 line to one input of each of the AND circuits 254 and 257. A negative signal is applied via the $\overline{A}$ line to a second input of each of the AND circuits 254 and 256 and to the inverter 249e where it is inverted to a postive signal and applied via the A line to a second input of each of the AND circuit 255 and 257. A positive signal is applied via the $\overline{B}$ line to the remaining input of each of the AND circuits 254 and 255 and to the inverter 249f where it is inverted to a negative signal and applied via the B line to the remaining input of each of the AND circuits 256 and 257. A positive signal is applied via the $\overline{C}$ line to the inverter 249g where it is inverted to a negative signal and applied via the C line to one input of each of the AND circuits 262 and 263 and the OR circuit 261. Since only the AND circuit 255 has all positive inputs, it applies a positive signal via the OR circuit 258b to one input of the AND circuit 260 and via the OR circuits 259 and 261 to one input of the AND circuit 266. Since the AND circuit 262 is deconditioned by the negative signal on the C line, it applies a negative signal via the OR circuit 264 to the inverter 265 where it is inverted to a positive signal and passed via the OR circuit 267 and via the now conditioned AND circuit 266 to bring up the CHAR CODE CK B line. Thus, it should be apparent that, by a somewhat similar process of decoding, the CHAR CODE CK UNIT 248 produces a positive signal output whenever there is an odd number of 1 bits in the CHARACTER being checked.

MEMORY OPERATION

Magnetic cores are binary elements inasmuch as they possess two stable states of magnetism. The two points of stable magnetism are called the remanent points 1 and 0. Thus, when the core in in the 1 position it is said to be in the undisturbed one state whereas when the core is in the 0 position it is said to be in the undisturbed zero state.

The application of current to a wire passing through a magnetic core causes the core to follow a hysteresis loop as a function of the direction of flow and magnitude of the current. The magnitude of current necessary to change the state of the core is hereinafter referred to as the threshold value $I_0$. If the magnitude of the applied current is less than the threshold value $I_0$, it causes some magnetic excursion on the hysteresis loop but when the current is removed the core will return to essentially the same remanent state at which it started. On the other hand, if a positive current $+I$, of a magnitude greater than the threshold value $I_0$, is applied to a core in the zero state, the core follows the hysteresis loop to positive saturation and when the positive current is removed the core comes to rest in the one state. Likewise, if a negative current $-I$, of a magnitude greater than the threshold value $I_0$, is applied to a core in the one state, the core follows the hysteresis loop to negative saturation and when the negative current is removed the core comes to rest in the zero state. Therefore, it is apparent that the state of a magnetic core can be changed by the application of a current pulse of the proper polarity and magnitude.

The flux necessary to change the state of a magnetic core can be generated by the current carried in a single wire or by two wires each carrying half the current necessary to switch the core but of such polarity as to make their fluxes additive to change the state of the core.

In the MEMORY 50, each MEMORY CORE is intersected by an X and Y wire. Consequently, to change the state of a MEMORY CORE, which is at the intersection of a selected X and Y wire, current pulses are coincidently applied to the selected X and Y wires. These current pulses are hereinafter referred to as half select currents inasmuch as their magnitude is less than the threshold value and is only half of that required to change the state of the core. However, the MEMORY CORE which is at the point of intersection of the selected X and Y wires, receives the effects of both of the half select current pulses so that the combined flux exceeds the threshold value and, if in the proper direction, causes the MEMORY CORE to change from its present state to the opposite state.

In selecting a STORAGE REGISTER in the MEMORY 50, all the cores on each of the selected X and Y wires are driven by the half select current pulses applied to the SELECTED X and Y wires. Therefore, all of the MEMORY CORES, except those at the points of intersection, are caused to move through a minor hysteresis excursion or loop and, at the termination of the half select current pulses, finally reach an equilibrium state hereinafter referred to as a disturbed state. Thus, if a MEMORY CORE is in the undisturbed one state, the application of a negative half select current pulse causes the core to move through a minor loop to the disturbed one state. Likewise, if a MEMORY CORE is in the undisturbed zero state, the application of a positive half select current pulse causes the core to move through a minor loop to the disturbed zero state. Each of these minor loops results in flux changes which induce small but unwanted noise pulses in the sense wire SW. However, since the sense wire is bipolar wound, most of these noise pulses oppose each other and tend to be cancelled out.

Reading of a MEMORY CORE, which lies at the intersection of a SELECTED X and Y wire, is accomplished by coincidently applying negative half select current pulses to each of the selected wires. Thus, if the MEMORY CORE is in the one state, indicating that a 1 bit is stored therein, the application of the half select current pulses to the selected wires causes the core to travel along the hysteresis loop to negative saturation and finally coming to rest at the zero state. The flux created by this change of state induces a relatively large pulse in the sense wire passing through the selected MEMORY CORE. On the other hand, if the MEMORY CORE is in the zero state, indicating that a 0 bit is stored therein, the application of the half select current pulses to the selected wires merely causes the core to travel to negative saturation and back to the zero state. The flux created by this movement induces a relatively small pulse in the sense wire passing through the selected MEMORY CORE. Therefore, it is apparent that in reading a MEMORY CORE, if the state of the core is changed a relatively large pulse is induced in the sense wire, corresponding to a 1 bit, but if no change in state occurs only a relatively small pulse is induced in the sense wire, corresponding to a 0 bit. A time sampling arrangement, to be described hereinafter, is provided so that only the 1 bit pulse is sampled while the 0 pulse and any unwanted half select pulses which are not cancelled are ignored.

Writing a 1 bit into a MEMORY CORE which lies at the intersection of a SELECTED X and Y wire, is accomplished by coincidently applying positive half select current pulses to each of the selected wires. Thus, if the MEMORY CORE is in the zero or cleared state, the application of the half select current pulses to the selected wires causes the core to travel along the hysteresis loop to positive saturation and finally coming to rest at the one state thereby storing a 1 bit. The flux created by this change of state induces a pulse in the sense wire. However, during a writing operation, no sampling occurs so that pulses induced in the sense wire can be ignored. In writing a 0 bit into a MEMORY CORE, an opposing half current pulse is applied to the inhibit wire passing through the selected core. The flux created by this opposing half current pulse opposes the combined flux created by the half select current pulses applied to the selected wires so that the resultant flux causes the core to travel through a minor loop and finally coming to rest at the disturbed zero state thereby storing a 0 bit. Again, the flux created by this minor excursion induces a pulse in the sense wire which is ignored since no sampling occurs.

The DATA COORDINATOR has a basic cycle of operation which consists of a read portion and a write portion. Thus, in a MEMORY READ operation, during the read portion of the cycle, each bit of a 7 bit CHARACTER is read out of the MEMORY CORES, in a manner as previously described, of a SELECTED STORAGE REGISTER in the MEMORY 50, sensed by the sense wires SW, amplified by SENSE AMPLIFIERS, to be described hereinafter and transferred to a CHARACTER REGISTER whereas, in a WRITE operation during the read portion of the cycle, each bit of a 7 bit CHARACTER is read out of the MEMORY CORES of the SELECTED STORAGE REGISTER, sensed by the sense wires SW, amplified by the SENSE AMPLIFIERS but this time there is no transfer to a CHARACTER REGISTER. Therefore, in a WRITE operation, the CHARACTER read out during the read portion of the cycle is ignored and the operation, in effect, clears the STORAGE REGISTER, so that a new CHARACTER may be written therein during the next succeeding write portion of the cycle.

Also, in a READ operation, in view of the destructive nature of the read out, the CHARACTER which was read out during the read portion of the cycle and transferred to a CHARACTER REGISTER is rewritten back into the SELECTED STORAGE REGISTER during the write portion of the cycle by INHIBIT DRIVING in a manner to be described hereinafter whereas in a WRITE operation, during the write portion of the cycle a new CHARACTER is written into the SELECTED STORAGE REGISTER which was cleared during the read portion of the cycle.

POST WRITE DISTURBANCE

Whenever a MEMORY CORE is caused to move through a minor loop, as in the case of unselected cores lying on the SELECTED X and Y lines, the resulting change in flux due to such a minor loop produces a small but unwanted noise pulse. Subsequent noise pulses produced by further half selection of such cores can be minimized by a POST WRITE DISTURBANCE.

Thus, if an unselected MEMORY CORE lying on a selected wire is in the undisturbed one state, the application of a negative half select current pulse during a reading operation causes the core to move through a minor loop to a disturbed one state. Subsequently the application of a positive half select current pulse during a writing operation causes the core to move toward positive saturation. However, before the termination of the positive half select current pulse, a negative half select current pulse, hereinafter referred to as the POST WRITE DISTURBANCE pulse, is applied to the inhibit wire Z causing the core to return to a disturbed position which lies between the undisturbed one state and the disturbed one state but nearer the latter. After the termination of the positive half select current pulse the post write disturbance pulse is still maintained on the inhibit wire causing the core to traverse a smaller minor loop ending at a point very close to the last disturbed positon. During the next reading operation, if the same MEMORY CORE is subjected to a negative half select current pulse it traverses an even smaller minor loop and returns to practically the same position from which it started. It should be noted that if not for the loop previously traversed due to the POST WRITE DISTURBANCE pulse, the loop now traversed in this next reading operation would create a flux change which would induce a noise pulse in the sense wire that would have a greater magnitude than is actually produced.

Likewise, if an unselected MEMORY CORE lying on a selected wire is in the undisturbed zero state, the application of a negative select current pulse during a reading operation causes the core to move toward negative saturation and back to essentially the undisturbed zero state. Subsequently, the application of a positive half select current pulse during a write operation, causes the core to move toward positive saturation. However, before the termination of the positive half select current pulse, a POST WRITE DISTURBANCE pulse is applied to the inhibit wire Z causing the core to return to a disturbed zero state. After the termination of the positive half select current pulse the POST WRITE DISTURBANCE pulse is maintained on the inhibit wire causing the core to traverse a smaller minor loop coming to rest at a disturbed position which lies between the undisturbed zero state and the disturbed zero state but nearer the latter. During the next reading operation if the same MEMORY CORE is subjected to a negative half current pulse it traverses an even smaller minor loop and returns to practically the same disturbed position from which it started. Again, it should be noted that if not for the loop previously traversed due to the POST WRITE DISTURBANCE, the loop now traversed in this next reading operation would create a flux change which would induce a noise pulse in the sense wire that would have a greater magnitude then is actually produced.

Thus, it is apparent from the above that a POST WRITE DISTURBANCE is effective to reduce the magnitude of subsequent noise pulses.

INHIBIT DRIVING

The INHIBIT DRIVER 226 in Fig. 21C consists of 7 inhibit driving circuits, one for each of the 7 inhibit wires Z associated with the 7 bit planes of the MEMORY 50. The inhibit driving circuits are essentially gate controlled feed back current amplifiers which are conditioned in accordance with the CHARACTER content of a REGISTER and perform two functions, namely, to control the writing of bits into the MEMORY CORES of a SELECTED STORAGE REGISTER of the MEMORY 50 and to provide a POST WRITE DISTURBANCE.

Referring to Figs. 21A to 21D, it should be noted that the INPUT SWITCH 222 couples the outputs of CHARACTER REGISTER 208, CHARACTER REGISTER 214 or LRC REGISTER 242 to inputs of corresponding AND circuits 227 in the INHIBIT DRIVER 226, while the INHIBIT GATE line is connected to the remaining input of each of the AND circuits 227. Hence, depending upon whether the DATA COORDINATOR is performing a READ operation or a WRITE operation, the outputs of CHARACTER REGISTER 208, CHARACTER REGISTER 214 or LRC REGISTER 242 are applied via the INPUT SWITCH 222 to the AND circuits 227 in such a manner that those of the AND circuits which have positive signals applied thereto, corresponding to 0 bits of the CHARACTER stored in the REGISTER, are conditioned to pass a positive pulse whereas those of the AND circuits 227 which have negative signals applied thereto, corresponding to the 1 bits of the CHARACTER, block the positive pulse from passing therethrough.

At a predetermined time in the write portion of a cycle, a positive INHIBIT GATE pulse is passed via those of the AND circuits which are conditioned and via corresponding ones of the OR circuits 228 and corresponding ones of the AND circuits 229 to corresponding ones of the INHIBIT DRIVERS 230. Those of the INHIBIT DRIVERS 230 which receive an INHIBIT pulse respond thereto by applying negative half current pulses to corresponding inhibit wires Z while those of the INHIBIT DRIVERS 230 which are blocked from receiving the INHIBIT GATE pulse apply no current pulse to their corresponding inhibit wires. It will be remembered, as explained in the section on MEMORY OPERATION, that writing is accomplished by coincidentally applying positive half select current pulses to each of the SELECTED X and Y wires, the combined effect permitting a core to switch from the 0 to the 1 state, thereby storing a 1 bit. Thus, at the same instant that those of the INHIBIT DRIVERS which half select current pulses are applied to the selected X and Y wire so that those MEMORY cores, which have no INHIBIT current pulse applied to their INHIBIT wire, will have no opposing flux to prevent the core from switching and writing a 1 therein whereas those of the MEMORY CORES which have a negative half select current pulse applied to their Z wire, have an opposing flux to prevent the combined flux, due to the positive half select current pulses, from switching the MEMORY CORE and writing a 1 so that the core remains in the 0 state thereby effectively writing a 0 bit.

Near the end of the write portion of a cycle a positive PWD GATE pulse is applied to all of the OR circuits 228 and is passed via the AND circuits 229 to the INHIBIT DRIVERS 230. The INHIBIT DRIVERS 230 respond to the positive PWD GATE pulse by applying a POST WRITE DISTURBANCE pulse on all of the inhibit wires to disturb all of the MEMORY CORES in the SELECTED STORAGE REGISTER thereby minimizing subsequent noise pulses produced by further half selections in a manner as previously described.

Thus, it is apparent that the INHIBIT DRIVING circuits are effective to control writing into the MEMORY 50 and to provide a POST WRITE DISTURBANCE for reducing the half select noise pulses occuring during the read portion of subsequent cycles.

MEMORY CONTROL UNIT

The MEMORY 50 consists of 1024 STORAGE REGISTERS each of which is addressable and chosen, as explained in the section on MEMORY OPERATION, by selecting one of the 32 X wires and one of the 32 Y wires of the MEMORY 50. Consequently, the MEMORY CONTROL UNIT functions to select one of the 32 X wires and one of the 32 Y wires of the MEMORY 50 in accordance with the ADDRESS of the SELECTED STORAGE REGISTER.

Referring now to the MEMORY CONTROL UNIT 100 in Figs. 20A to 20G, this selection is accomplished by using two magnetic SWITCH CORE arrays, each of which consists of a two dimensional 4 x 8 matrix, hereinafter referred to as the X SWITCH CORE MATRIX and the Y SWITCH CORE MATRIX. A typical one of the 32 SWITCH CORES in each SWITCH CORE MATRIX is shown in Fig. 20E1 and consists of a magnetic core having a read winding 157a, a write winding 157b and an output winding 157c. The read windings in each column of the MATRICES, shown in diagrammatic form in Figs. 20A and 20E, are serially connected between a driver output of the Y SC R DRIVER 146 or 152 and a corresponding feedback input. Likewise, the write windings in each row of the MATRICES are serially connected between a driver output of the X SC BIAS & W DRIVER 172 or in Figs. 20B and 20D and a corresponding feedback input. Also, one end of each of the 32 output windings of the X SWITCH CORE MATRIX 156 is connected to one of the 32 X wires of the MEMORY 50 while the other ends of all of the output windings are connected to a floating common line. Similarly, one end of each of the 32 output windings of the Y SWITCH CORE MATRIX 150 is connected to one of the 32 Y wires of the MEMORY 50 while the other ends of all of the output windings are also connected to the floating common line.

Here again, as in the MEMORY 50, it is necessary to select one row in the X dimension and one column in the Y dimension of the X SWITCH CORE MATRIX 156 to uniquely select one SWITCH CORE which, in turn, selects one of the 32 X wires of the MEMORY 50. Likewise, it is necessary to select one row in the X dimension and one column in the Y dimension of the Y SWITCH CORE MATRIX 150 to uniquely select one SWITCH CORE which, in turn, selects one of the 32 Y wires of the MEMORY 50. Thus, by selecting four lines, two per MATRIX, it is possible to select any X and Y wire in the MEMORY 50.

Since there are 1024 addressable STORAGE REGISTERS in the MEMORY 50, provision is made for selecting a particular X and Y wire of the MEMORY 50 in accordance with ADDRESS of the SELECTED STORAGE REGISTER in the MEMORY 50. Each of the 1024 ADDRESSES are represented by a ten order binary number, as for example:

|  | 512 | 256 | 128 | 64 | 32 | 16 | 8 | 4 | 2 | 1 |
|---|---|---|---|---|---|---|---|---|---|---|
| ADDRESS 0000 | 0 | 0 | 0 | 0 | 0 | 0 | 0 | 0 | 0 | 0 |
| ADDRESS 0001 | 0 | 0 | 0 | 0 | 0 | 0 | 0 | 0 | 0 | 1 |
| ADDRESS 0765 | 1 | 0 | 1 | 1 | 1 | 1 | 1 | 1 | 0 | 1 |
| ADDRESS 1023 | 1 | 1 | 1 | 1 | 1 | 1 | 1 | 1 | 1 | 1 |

Referring to Fig. 20F, a ten order ADDRESS REGISTER 132 is provided for storing the ADDRESS of the STORAGE REGISTER in the MEMORY 50 from which a CHARACTER is to be read or in which a CHARACTER is to be written.

Initially, the ADDRESS REGISTER 132 is cleared and reset to a value corresponding to the ADDRESS 0000 starting at which a RECORD or group of RECORDS may be read out of or written into the MEMORY 50. After the first CHARACTER of the RECORD or group of RECORDS is read out of or written into the MEMORY 50, the ADDRESS REGISTER 132 is set to a value corresponding to the next succeeding ADDRESS, namely 0001, of the STORAGE REGISTER in the MEMORY 50 from which the next CHARACTER of the RECORD or group of RECORDS may be read or in which it may be written etc.

An ADDRESS COUNTER is provided for counting the number of ADDRESSES selected and is stepped by a count of 1 after each operation is performed at a SELECTED STORAGE REGISTER of the MEMORY 50. Also, it will be noted from Figs. 20F and 20G, that two counters, namely, ADDRESS COUNTER 112 and ADDRESS COUNTER 124 are provided for counting ADDRESSES. This, is necessary since during a read while writing mode of operation (DC TO TU & TU TO DC) information is being read out of and concurrently being written in to the MEMORY 50. Therefore, ADDRESS COUNTER 112 is used for counting ADDRESSES when writing into the MEMORY 50 during the CPU TO DC, TU TO DC and the DC TO TU & TU TO DC modes of operation while the ADDRESS COUNTER 124 is used for counting ADDRESSES when reading out of the MEMORY 50 during the DC TO CPU, DC TO TU and DC TO TU & TU TO DC modes of operation.

Initially, whenever a mode of operation is selected, a 2 microsecond positive pulse is applied via the RESET AC 112 or RESET AC 124 line, depending on which mode of operation is selected, to reset all of the triggers of the ADDRESS COUNTER 112 or 124 in preparation for the forthcoming operation. Any of the triggers of either of the COUNTERS, in being reset, apply a negative shift from their right-hand output to switch the state of the next succeeding trigger. However, the reset pulse is maintained up during the period of any such negative shift and is of sufficient duration as to maintain any of the triggers OFF despite the application of a negative shift from the next preceding trigger.

Now, let it be assumed that the ADDRESS REGISTER 132 is set with a value corresponding to the ADDRESS 0765 so that the triggers 136a, 136c to 136h, inclusive, and 136j are ON while the triggers 136b and 136i are OFF. Also, let it be assumed that information is being read out of the MEMORY 50 so that the ADDRESS COUNTER 124 is being utilized and stands at a count of 765. Therefore, the triggers 126a, 126c to 126h, inclusive, and 126j are ON while the triggers 126b and 126i are OFF.

At the proper time, a negative shift is applied via the STEP AC 124 line to turn OFF the trigger 126a which, in being turned OFF, applies a negative shift to turn ON the trigger 126b and thereby step the count of the ADDRESS COUNTER 124 to a count of 766. At the same time, the trigger 126a, in being turned OFF, applies a negative signal from its right-hand output to decondition the AND circuit 130a of the COUNTER GATE 128 while the trigger 126b, in being turned ON applies a positive signal from its right-hand output to condition the AND circuit 130b. The triggers 126c to 126h, inclusive and 126j in remaining ON maintain positive signals from their right-hand outputs to condition corresponding ones of the AND circuits 130 in the COUNTER GATE 128.

Shortly thereafter, a positive pulse having a 4 microsecond period, is applied via the AC 124 TO AR line to the COUNTER GATE 128. The positive pulse on the AC 124 TO AR line passes via those of the AND circuits 130 which are conditioned and via corresponding ones of the OR circuits 134 to turn ON corresponding ones of the triggers 136 in the ADDRESS REGISTER 132. Since the triggers 136c to 136h, inclusive, and 136j are already ON, the positive pulse on the AC 124 TO AR line has no effect on the state of their triggers. However, the positive pulse on the AC 124 TO AR line is effective to turn ON the trigger 136b so that all of the triggers except trigger 136i are now ON. During the 4 microsecond period that the AC 124 TO AR line is up, a negative shift is applied via the W3.5(D1) line to attempt to reset all of the triggers 136 of the ADDRESS REGISTER 132. The AC 124 TO AR line is maintained up during the period of the negative shift and, therefore, is of sufficient duration as to maintain ON any of the triggers 136, to which it is effectively applied, despite the application of the negative shift on the W3.5(D1) line. However, since the AND circuit 130a of the COUNTER GATE 128 blocked the positive pulse on the AC 124 TO AR line from being applied to the trigger 136a, the negative shift on the W3.5(D1) line is effective to reset the trigger 136a so that the triggers 136b to 136h, inclusive, and 136j are ON, corresponding to the next succeeding ADDRESS 0766. In a similar manner, after a CHARACTER is read out of or written into the MEMORY 50, the ADDRESS COUNTER 124 is stepped by a count of 1 and the next succeeding ADDRESS is transferred to the ADDRESS REGISTER 132 in accordance with the count setting of the ADDRESS COUNTER 124. Thus, it should be apparent that the ADDRESS COUNTERS keep track of the ADDRESSES being selected in the MEMORY 50 while the ADDRESS REGISTER 132 stores the ADDRESS of the STORAGE REGISTER presently being processed.

The manner in which one of the 32 X and one of the 32 Y wires of the MEMORY 50 is selected will now be described by way of example. Consequently, let it be assumed that the ADDRESS 0766 is presently stored in the ADDRESS REGISTER 132. The first five orders, 1, 2, 4, 8 and 16, of the 10 order binary number stored in the ADDRESS REGISTER 132, having 32 possible combinations, are used for selecting one of the 32 Y wires of the MEMORY 50 while the last 5 orders, 32, 64, 128, 256 and 512, of the 10 order binary number, also having 32 possible combinations, are used for selecting one of the 32 X wires of the MEMORY 50. Thus, under the assumed example the triggers 136b to 136h, inclusive, and 136j are ON while the triggers 136a and 136i are OFF so that the $\overline{1}$, 2, 4, 8, 16, $\overline{32}$, 64, 128, 256 and 512 lines are up while the 1, $\overline{2}$, $\overline{4}$, $\overline{8}$, $\overline{16}$, 32, $\overline{64}$, $\overline{128}$, $\overline{256}$ and $\overline{512}$ lines are down.

Referring now to the X SC DECODER 158 in Fig. 20C, the positive signals on the 8 and/or 16 lines are passed via the OR circuits 160b, 160c and 160d to bring up the $\overline{16}$, $\overline{8}$ and $\overline{0}$ lines and apply positive signals to condition the AND circuits 174b, 174c and 174d of the X SC BIAS & W DRIVER 172 in Fig. 20B. Likewise, referring to the X SC DECODER 164 in Fig. 20C, the positive signals on the $\overline{256}$ and/or 512 line are passed via the OR circuits 168a, 168c and 168d to bring up the $\overline{768}$, $\overline{256}$ and $\overline{0}$ lines and apply positive signals to condition the AND circuits 186a, 186c and 186d in the X SC BIAS & W DRIVER 184 in Fig. 20D.

At the proper time, a positive pulse having a period of 4.5 microseconds, is applied via the R BIAS GATE line to the X SC BIAS & W DRIVERS 172 and 184 in Figs. 20B and 20D, respectively.

Referring now to Fig. 20B, the positive pulse on the R BIAS GATE line passes via the conditioned AND circuits 174b, 174c and 174d to one input of each of the corresponding AND circuits 180b, 180c and 180d and via the OR circuits 176b, 176c and 176d to the remaining input of each of the AND circuits 180b, 180c and 180d causing them to apply positive pulses via the 16, 8 and 0 lines to the switch core drivers 182b, 182c and 182d. The switch core drivers 182b, 182c, and 182d, in response thereto apply bias current on the 16, 8 and 0 rows of the Y SWITCH CORE MATRIX 150 in Fig. 20A causing all of the switch cores on each of these rows to be driven to negative saturation. Similarly, referring to Fig. 20D, the positive pulse on the R BIAS GATE line passes via the conditioned AND circuits 186a, 186c and 186d to one input of each of the corresponding AND circuits 192a, 192c and 192d and via the OR circuits 188a, 188c and 188d to the remaining input of each of the AND circuits 192a, 192c and 192d causing them to apply positive pulses via the 0, 256 and 768 lines to the corresponding ones of the switch core drivers 194a, 194c and 194d. The switch core drivers 194a, 194c and 194d, in response thereto, apply negative bias current to the 0, 256 and 768 rows of the X SWITCH CORE MATRIX 156 in Fig. 20E causing all of the switch cores on each of these rows to be driven to negative saturation.

During the 4.5 microsecond period of the positive pulse on the R BIAS GATE line, a positive pulse is applied via the R GATE line to the Y SC DECODERS 138 and 142 in Figs. 20A and 20E.

Referring now to the Y SC DECODER 138 in Fig. 20A, the positive signals on the $\overline{1}$, 2 and 4 lines condition the AND circuit 140g while the negative signals on the 1 and $\overline{2}$ and $\overline{4}$ lines are effective to decondition the remaining AND circuits 140 of the Y SC DECODER 138. Consequently, the positive pulse on the R GATE line passes via the conditioned AND circuit 140g to the switch core driver 148g which, in response thereto, applies a positive select current pulse to drive column 6 of the Y SWITCH CORE MATRIX 150. Since only one switch core in the column is in the unbiased state, namely, the switch core at the intersection of row 24 and column 6 only that switch core switched from the reset to the set position and induces a current in its secondary causing a negative half select current pulse to be applied via the YY30 wire to the MEMORY 50.

At the same time, referring to the Y SC DECODER 142 in Fig. 20E, the positive signals on the 32, 64 and 128 lines condition the AND circuit 144h while the negative signals on the $\overline{32}$, $\overline{64}$ and $\overline{128}$ lines are effective to decondition the remaining AND circuits 144 of the Y SC DECODER. Consequently, the positive pulse on the R GATE line passes via the conditioned AND circuit 144h to the switch core driver 154h which, in response thereto, applies a positive select current pulse to drive column 224 of the X SWITCH CORE MATRIX 156. Since only one switch core in the column is in the unbiased state, namely, the switch core at the point of intersection of column 224 and row 768, only that switch core switches from the reset to the set position and induces a current in its secondary causing a negative half select current pulse to be applied via the X736 wire to the MEMORY 50. Thus, it should be apparent, that the XX736 and YY30 wires are chosen in accordance with the ADDRESS 0766 setting of the ADDRESS REGISTER 132. During a READ operation this causes a CHARACTER to be read out of the MEMORY 50 while during a WRITE operation this effectively causes the SELECTED STORAGE REGISTER to be cleared in preparation for receiving a CHARACTER as will be explained in greater detail hereinafter in the description of the various modes of operation. When the positive pulse on the R BIAS GATE line terminates, the bias is removed from the unselected rows of the X and Y SWITCH CORE MATRICES 156 and 150. Now, referring to the X SC DECODER 158 in Fig. 20C, the positive signal is still on the 8 and 16 lines condition the AND circuit 162a while the negative signals still on the $\overline{8}$ and $\overline{16}$ lines decondition the AND circuits 162b, 162c and 162d. Consequently, at the proper time, a positive pulse is applied to the W GATE line which passes via the conditioned AND circuit 162a to bring up the 24 line which condition is passed to the X SC BIAS & W DRIVER 172 in Fig. 20B. The positive pulse on the 24 line passes via the OR circuit 176a and the AND circuit 180a to the switch core driver 182a which, in response thereto, applies a negative current driving pulse along row 24 of the Y SWITCH CORE MATRIX 150 in Fig. 20A. Since only one switch core in row 24 is in the set position, namely, the switch core at the intersection of row 24 and column 6, only that switch core is switched back from the set to the reset position and induces a current in its secondary causing a positive half select current pulse to be applied via the SELECTED YY30 wire to the MEMORY 50.

Similarly, referring to the X SC DECODER 164 in Fig. 20C, the positive signals still on the $\overline{256}$ and 512 are applied to condition the AND circuit 170b while the negative signals still on the 256 and $\overline{512}$ lines decondition the AND circuits 170a, 170c, and 170d. Consequently, at the same time, the positive pulse on the W GATE line passes via the conditioned AND circuit 170b to bring up the 512 line which condition is passed to the X SC BIAS & W DRIVER 184 in Fig. 20D. The positive pulse on the 512 line passes via the OR circuit 188b and the AND circuit 192b to the switch core driver 194b which, in response thereto, applies a negative current driving pulse along row 512 of the X SWITCH CORE MATRIX 156 in Fig. 20E. Since only one switch core in row 512 is in the set position, namely, the switch core at the intersection of row 512 and column 224, only that switch core is switched back from the set to the reset position and induces current in its secondary causing a positive half select current pulse to be applied via the selected XX736 wire of the MEMORY 50. Thus, it should be apparent, that the XX736 and YY30 lines are selected in accordance with the ADDRESS (0766) setting in the ADDRESS REGISTER 132. During a READ operation this causes a CHARACTER which was previously read out to be rewritten into the SELECTED STORAGE REGISTER of the MEMORY 50 while during a WRITE operation this effectively causes a CHARACTER to be written into the MEMORY 50 as will be explained in greater detail hereinafter in the description of the various modes of operation.

In a similar manner, each STORAGE REGISTER of the MEMORY 50 is chosen by selecting one of the 32 X wires and one of the 32 Y wires of the MEMORY 50 in accordance with the ADDRESS of the SELECTED STORAGE REGISTER in the MEMORY 50.

CLOCK PULSE GENERATOR

Referring now to Figs. 26A, 26B and 26D, there is shown in block form the CLOCK PULSE GENERATOR 800, the main function of which is to establish the various timing pulses used throughout the machine.

The CLOCK PULSE GENERATOR 800 is composed of a PULSE GENERATOR 818, a CLOCK CONTROL UNIT 802, a CLOCK 814 and a WAVEFORM GENERATOR 846. The PULSE GENERATOR 818 includes a crystal controlled oscillator, of known type, which generates a signal at a basic frequency of 2 megacycles (MC) so that the smalled subdivision or basic period of time in the DATA COORDINATOR is 0.5 microsecond. The CLOCK CONTROL UNIT 802 is the means for gating the operation of the CLOCK 814, that is, for conditioning the CLOCK 814 to be driven by the 2 MC PULSE GENERATOR 818. The CLOCK 814 is composed of a ring of nineteen triggers 820 which, being driven by the 2 MC PULSE GENERATOR 818, has a 9 microsecond basic cycle of operation consisting of a 5 microsecond read portion, during which time a CHARACTER may be read out of the MEMORY 50 of the DATA COORDINATOR, and a 4 microsecond write portion, during which time a CHARACTER may be written into the MEMORY 50 of the DATA COORDINATOR.

The various clock pulse generated by the CLOCK 814 have maximum periods of only 1.5 microseconds, as will be explained hereinafter. However, various circuits in the machine require pulses having periods which are greater than 1.5 microseconds. Consequently, the WAVEFORM GENERATOR 846 mixes various clock pulses generated by the CLOCK 814 to produce the extended period pulses required by the various circuits of the machine.

Before proceeding with a detailed description of the CLOCK PULSE GENERATOR 800, an explanation of the various reference characters and pulse notations to be used is now given.

The reference characters R and W are hereinafter referred to as clock pulses corresponding to the read portion and write portion, respectively, of the clock cycle of operation. A number added as a suffix to the reference characters R or W, for example R0 or W1, is hereinafter referred to as an index point in the clock cycle, with each index point corresponding to the leading edge of a clock pulse. Thus, the starting point or initial index point in each portion of the clock cycle is designated as R0 and W0, with each succeeding index point being separated from the preceding index point by the basic period of time, namely, 0.5 microsecond. Thus a clock cycle is provided as follows, R0, R0.5, R1.0, R1.5, R2.0, R2.5, R3.0, R3.5, R4.0, R4.5, W0, W0.5, W1.0, W1.5, W2.0, W2.5, W3.0, W3.5, W4 with a 5 microsecond read portion and a 4 microsecond write portion.

Additionally, a designation is added identifying the duration of the clock pulse, comprising the reference character D and a number representing the period of time in microseconds. For example, a clock pulse which occurs 3 index points after initiation of the write portion of the clock cycle and which has a duration of one and a half microseconds is designated as W1.5(D1.5). Likewise, a pulse which is produced by the WAVEFORM GENERATOR 846 is initiated at a particular index point in the clock cycle and has a particular duration dependent upon the clock pulses which are mixed in the WAVEFORM GENERATOR 846. Consequently, a pulse generated by the WAVEFORM GENERATOR 846 will be identified by the index point at which it is initiated and a designation identifying the duration of the pulse, as for example R0(D4).

The clock pulses generated by the CLOCK PULSE GENERATOR 800 are produced by triggers. Therefore, the left-hand output of a clock pulse trigger will be designated by a bar over the reference character identifying the clock pulse, as for example, $\overline{R0(D1.5)}$, while the right-hand output of a clock pulse trigger will be distinguished from the left-hand output by the absence of a bar over the reference character as for example, R0(D1.5). It should be kept in mind that these designations identify the left and right-hand output of a clock pulse trigger regardless of the state of the trigger. Therefore, when the clock pulse trigger is in the ON state the left-hand output is not up or, in other words, is in the negative or down condition while the right-hand output is in the positive or up condition, whereas, when the clock pulse trigger is in the OFF state the previous conditions of the clock pulse trigger outputs are reversed, that is, the left-hand output is in a positive or up condition while the right-hand output is in a negative or down condition.

Refer now to Fig. 26B which shows the details of the CLOCK 814.

The symbols R0 through R4.5 and W0 through W4 refer to the index points of the clock cycle as previously described. A circuit is provided, to be described hereinafter, for resetting the CLOCK 814 during a POWER ON/MACHINE RESET operation, causing all of the triggers 820 to be switched to the OFF state. The PULSE GENERATOR 818 applies pulses at a 0.5 microsecond rate to one input of each of the AND circuits 816. However, since none of the triggers 820 are in the ON state, none of their associated AND circuits 816 are conditioned to allow any of the pulses from the PULSE GENERATOR 818 through to operate the ring of triggers 820. Now, let it be assumed that the CLOCK CONTROL UNIT 802 brings up the CLOCK GATE line to condition the AND circuit 816a. Therefore, the next pulse from the PULSE GENERATOR 818 passes via the new conditioned AND circuit 816a to set the R0 trigger 820a to its ON state bringing up the R0(D1.5) line and bringing down the $\overline{R0(D1.5)}$ line. The $\overline{R0(D1.5)}$ line in coming down brings down the CLOCK GATE line in certain modes of operation, in a manner to be explained hereinafter, to decondition the AND circuit 816a while the R0(D1.5) line in coming up conditions the next succeeding AND circuit 816b so that the next succeeding pulse from the PULSE GENERATOR 818 passes via the now conditioned AND circuit 816b to set the R0.5 trigger 820b to its ON state bringing up the R0.5(D1.5) line. The remaining triggers 820c to 820s are sequentially turned ON in a similar manner. It should be noted that when the R0.5 trigger 820b is turned ON, the R0 trigger 820a remains ON. Likewise, when the R1 trigger 820e is turned ON the R0 and R0.5 triggers remain ON. However, when the R1.5 trigger 820d is turned ON, it applies a negative shift from its left-hand output to turn OFF the R0 trigger 820a. Since the R1.5 trigger 820d is turned ON 1.5 microseconds after the R0 trigger 820a is turned ON, the R0(D1.5) line is up and $\overline{R0(D1.5)}$ line is down for 1.5 microseconds as indicated by the symbols. Likewise, in a similar fashion, each of the succeeding triggers 820e to 820s in being turned ON cause the third preceding trigger to be turned OFF, as for example, turning ON the R2 trigger 820e causes the R0.5 trigger 12b to be turned OFF, turning ON the R2.5 trigger 820f causes the R1.0 trigger 820c to be turned OFF etc., so that each clock pulse up to and including W3 will have a period of 1.5 microseconds. At W3 time, the W1.5(D1.5) line comes down effectively causing the peaker 822 to produce a positive pulse having a period of 1.5 microseconds so that, at W4.5 time, the trailing edge of the pulse is applied to reset the W3, W3.5 and W4 triggers 820q, 820r and 820s, respectively. Since the W3 trigger 820q is turned ON at W3 time and turned OFF at W4.5 time, the W3(D1.5) line is up for 1.5 microseconds, as indicated by its symbol. Likewise, since the W3.5 trigger 820r is turned ON at W3.5 time and turned OFF at W4.5 time, the W3.5(D1) line is up for 1.0 microsecond, as indicated by its symbol. Also, since the W4.0 trigger 820s is turned ON at W4.0 time and turned OFF at W4.5 time, the W4.0(D0.5) line is up for 0.5 microsecond, as indicated by its symbol.

The W3.5(D1) line in coming up brings up the CLOCK GATE line in certain modes of operation, in a manner to be explained hereinafter, to condition the AND circuit 876a so that the next succeeding pulse from the PULSE GENERATOR 818 occurring at W4 time is effective to turn ON the R0 trigger 820a to initiate another cycle of operation of the CLOCK 814.

Refer now to Fig. 26D which shows the details of the CLOCK CONTROL UNIT 802. The CLOCK CONTROL UNIT 802 functions to gate the operation of the CLOCK 814, that is, for bringing up the CLOCK GATE line. The manner in which this is accomplished depends on the mode of operation being performed and will be described hereinafter in the sections describing the various modes of operation of the machine.

Refer now to Fig. 26A which shows the details of the WAVEFORM GENERATOR 846.

The clock pulses on the R0(D1.5), R0.5(D1.5), R1.5(D1.5) and R2.5(D1.5) lines are sequentially applied to the OR circuit 848 and since they overlap one another, in time, the output from the OR circuit 848 will come up at the time the first mentioned clock pulse comes up, namely at R0 time, and will stay up until the time the last mentioned clock pulse comes down, namely at R4 time, thereby bringing up the R0(D4) line, starting at R0 time, for a period of 4 microseconds.

The positive shift of the leading edge of the clock pulse on the R0(D1.5) line is applied to turn ON the trigger 850 which, in being turned ON, applies a positive signal from its right-hand output to bring up the R0(D4.5) line while the negative shift of the trailing edge of the clock pulse on the R3(D1.5) line is applied to turn OFF the trigger 856 which, in being turned OFF, applies a negative signal from its right-hand output to bring down the R1.5(D2.5) line. Thus, it should be apparent, that the R0(D4.5) line is brought up starting at R0 time, for a period of 4.5 microseconds.

The positive shift of the leading edge of the clock pulse on the R1.5(D1.5) line is applied to the inverter 852 where it is inverted to a negative shift to turn ON the trigger 854 which, in being turned ON, applies a positive signal from its right-hand output to bring up the R1.5(D2.5) line while the positive shift of the leading edge of the clock pulse on the R4(D1.5) line is applied to turn OFF the trigger 854 which, in being turned OFF, applies a negative signal from its right-hand output to bring down the R1.5(D2.5) line. Thus, it should be apparent that the R1.5(D2.5) line is brought up starting at R1.5 time, for a period of 2.5 microseconds.

The negative shift of the trailing edge of the clock pulse on the R3(D1.5) line is applied to turn ON the trigger 856 which, in being turned ON, applies a positive signal from its right-hand output to bring up the R4.5 (D4.5) line while the positive shift of the leading edge of the clock pulse on the W4(D0.5) line is applied to turn OFF the trigger 856 which, in being turned OFF, applies a negative signal from its right-hand output to bring down the R4.5(D4.5) line. Thus, it should be apparent, that the R4.5(D4.5) line is brought up starting at R4.5 time, for a period of 4.5 microseconds.

DATA COORDINATOR READY

The DC RDY UNIT 840 functions to determine whether the DATA COORDINATOR is ready to operate or is busy with a selected TAPE UNIT.

Referring now to the DC RDY UNIT 840 in Fig. 26D, it should be noted that before a mode of operation is chosen the $\overline{\text{BKWD+TU TO DC}}$, $\overline{\text{DC TO TU}}$ and $\overline{\text{TM CALL}}$ lines are all up with the resulting effect being that the AND circuit 842 passes a positive signal via the OR circuit 844 to maintain the DC RDY line up. If a CPU TO DC or DC TO CPU mode of operation is chosen, the CPU TO DC or DC TO CPU line is brought up so that a positive signal is passed via the OR circuit 844 to maintain the DC RDY line up during either of these modes of operation. However, if the BKWD, TU TO DC, DC TO TU or W TM mode of operation is chosen, causing either the $\overline{\text{BKWD+TU TO DC}}$ line, the $\overline{\text{DC TO TU}}$ line or the $\overline{\text{W TM CALL}}$ line to be brought down, a negative signal is passed via the OR circuit 844 to bring down the DC RDY line which remains down during any of these modes of operation. In other words, the DC RDY line is maintained up at all times except when a SELECTED TAPE UNIT is involved, a BACKWARD operation or involved in an operation with the DATA COORDINATOR.

SELECT ADDRESS DECODING

The SELECT ADDRESS DECODER 602 of the TAPE SYNCHRONIZER 600 functions to decode a SELECT ADDRESS and produce a signal selecting a particular TAPE UNIT or the MODE C or MODE D operation. An exemplary SELECT ADDRESS DECODING operation will now be described in conjunction with Figs. 25A and 25B.

Let it be assumed that the CENTRAL PROCESSING UNIT is executing the following SELECT instruction:

SELECT 20607

The operation part 2 of the SELECT instruction designates that a SELECT operation is to be performed while the ADDRESS part 0607 designates the DATA COORDINATOR as the SELECTED input/output unit and the TAPE UNIT 7 as the SELECTED TAPE UNIT. Consequently, the CENTRAL PROCESSING UNIT applies the ADDRESS part 0607 of the SELECT instruction via the SELECT ADDRESS BUS to the SELECT ADDRESS DECODER 602 in the form of binary coded signals. More specifically, the binary coded signals corresponding to the hundreds digit 6, the tents digit 0 and the units digit 7 are applied to the hundreds input, tens input and units input, respectively, of the SELECT ADDRESS DECODER 602.

The binary coded signals, corresponding to the hundreds digit 6 of the SELECT instruction, cause positive signals to be applied via the 4 and 2 lines of the hundreds input to a pair of inputs of the AND circuit 603 and a negative signal to be applied via the 1 line of the hundreds input to the inverter 604 where it is inverted to a positive signal to condition the AND circuit 603.

The binary coded signals, corresponding to the tens digit 0 of the SELECT instruction, cause negative signals to be applied via the 1, 2, 4 and 8 lines of the tens input to the inverters 605 where they are inverted to positive signals and passed via jumper wires to the AND circuit 606 which, in turn, passes a positive signal to the now conditioned AND circuit 603 to bring up the THIS DC SELECTED line.

It should be noted that 10 DATA COORDINATORS may be associated with a single CENTRAL PROCESSING UNIT. Consequently, the jumper wires associated with the tens input of the SELECT ADDRESS DECODER in each of the 10 DATA COORDINATORS are connected so as to decode a different ADDRESS. Thus, the jumper wires in the SELECT ADDRESS DECODER shown in Fig. 25A are connected to decode the digit 0 in the tens order of the SELECT ADDRESS (0600) whereas the jumper wires in the SELECT ADDRESS DECODER of the next DATA COORDINATOR are connected to decode the digit 1 in the tens order of the SELECT ADDRESS (0610) etc.

It will also be noted that before a mode of operation is selected the DC RDY line is maintained up as explained hereinbefore in the section on the DATA COORDINATOR READY. Also, if none of the TAPE UNITS associated with the DATA COORDINATOR have been previously selected to perform a REWIND operation, then, both the SEL & REWIND A and SEL & REWIND B lines are down. Consequently, the OR circuit 607 maintains the SEL & REWIND A+B line down which condition is applied to the inverter 608 where it is inverted to a positive signal to condition the AND circuit 609. Further, the DC RDY line in being up conditions the AND circuit 610 so that when the THIS DC SELECTED line comes up, the now conditioned AND circuit 610 is effective to pass a positive signal to the now conditioned AND circuit 609 which, in turn, brings up the DC SEL & RDY line to signal the CENTRAL PROCESSING UNIT that the DATA COORDINATOR has been SELECTED and is READY to operate. Additionally, the DC SEL & RDY line in coming up conditions the AND circuits 611 to respond to the binary signals corresponding to the units digit of the SELECT ADDRESS.

It will be further noted that if a DC TO TU, TU TO DC or BKWD mode of operation is called for, the DC RDY line comes down, in a manner as previously described in the section on the DATA COORDINATOR READY, which, in turn, brings down the DC SEL & RDY line to signal the CENTRAL PROCESSING UNIT that the DATA COORDINATOR is now busy with a SELECTED TAPE UNIT or a SELECTED TAPE UNIT is involved in a BACKWARD operation. The DC SEL & RDY line remains down during these operations and is effective during the entire operation to block the INSTRUCTION DECODER 300 from decoding a subsequent operational instruction of the PROGRAM involving the DATA COORDINATOR and also to block the SELECT ADDRESS DECODER 602 from decoding the ADDRESS part of a subsequent SELECT instruction which SELECTS the DATA COORDINATOR, as will be explained in greater detail hereinafter. Thus, it should be apparent, that a subsequent instruction of a PROGRAM involving the DATA COORDINATOR cannot be executed until the mode of operation that is presently being executed by the DATA COORDINATOR is completed. Likewise, if a SELECTED TAPE UNIT is performing a REWIND operation or if such operation is called for, the SEL & REWIND A+B line is maintained up or comes up with the resulting effect being that the DC SEL & RDY line again comes down to signal the CENTRAL PROCESSING UNIT that the DATA COORDINATOR is busy and also to block the INSTRUCTION DECODER 300 and the SELECT ADDRESS DECODER 602 from decoding a subsequent instruction of the PROGRAM involving the previously SELECTED TAPE UNIT. Thus, the PROGRAM involving a SELECTED TAPE UNIT cannot proceed so long as the DATA COORDINATOR is busy with the SELECTED TAPE UNIT or the SELECTED TAPE UNIT is involved in a BACKWARD or REWIND operation.

Additionally, the PROGRAM involving a DATA COORDINATOR cannot proceed whenever the DATA COORDINATOR is busy with the CENTRAL PROCESSING UNIT inasmuch as during a CPU TO DC or DC TO CPU mode of operation, the DATA COORDINATOR does not issue a DISCONNECT signal to the CENTRAL PROCESSING UNIT to terminate the present instruction and proceed to the next instruction until the present instruction is completely executed.

Therefore, it is unnecessary to bring down the DC RDY line if the CPU calls for a CPU TO DC or DC TO CPU mode of operation. Hence, the DC RDY line in remaining up during these modes of operation maintains the DC SEL & RDY line up.

The binary coded signals, corresponding to the units digit 7 of the SELECT instruction cause positive signals to be applied to the 1, 2 and 4 lines and a negative signal to the 8 line of the units input of the SELECT ADDRESS DECODER 602. The positive signal on the 1 line is applied to one input of the AND circuits 611a and 611d, respectively, and to the inverter 612a where it is inverted to a negative signal to decondition the AND circuits 611b and 611c. The positive signal on the 2 line is applied to one input of the AND circuits 613b and 613d, respectively, and to the inverter 612b where it is inverted to a negative signal to decondition the AND circuits 613a and 613c. The positive signal on the 4 line is applied to one input of each of the AND circuits 615e to 615h, inclusive, and to the inverter 612c, where it is inverted to a negative signal to decondition the AND circuits 615a to 615d, inclusive. The negative signal on the 8 line is applied to decondition the AND circuits 611c and 611d and to the inverter 612d where it is inverted to a positive signal and applied to the AND circuits 611a and 611b. Now, the DC SEL & RDY line in being up applies a positive signal to each of the AND circuits 611a to 611d, inclusive. Consequently, the AND circuits 611b to 611d, inclusive, are deconditioned while the AND circuit 611a passes a positive signal to the AND circuits 613a and 613d. The AND circuit 613a is deconditioned by the output of the inverter 612b whereas the AND circuit 613d is conditioned to pass the positive signal to the AND circuits 615b and 615h. The AND circuit 615d is deconditioned by the output of the inverter 612c while the AND circuit 615h is conditioned to pass the positive signal to the SEL TU7 line which is transmitted via the SELECT BUS to SELECT the TAPE UNIT 7. The positive signal output of the AND circuit 615h is also applied to condition the AND circuit 615g and via the OR circuit 621b to bring up the TU B SEL line. In a similar manner, each SELECT ADDRESS of a SELECT instruction involving the DATA COORDINATOR is decoded to bring up one of the SEL TU lines or the MODE C line or the MODE D line.

It should be noted that when a SELECT ADDRESS selects one of the SEL TU lines, the selected line remains up only so long as the DC SEL & RDY line (which controls the AND circuits 611) remains up and the SELECT ADDRESS remains unchanged. Thus, if a mode of operation called for a data transfer between the DATA COORDINATOR and the previously SELECTED TAPE UNIT or a BACKWARD operation of the previously SELECTED TAPE UNIT, then, the DC SEL & RDY line comes down to decondition the AND circuits 611 and thereby block the SELECT ADDRESS from maintaining the selected SEL TU line up to keep the previously addressed TAPE UNIT selected. Likewise, if a subsequent SELECT ADDRESS selects a SEL TU line which is different from that which was previously selected, then, the previously selected SEL TU line cannot be maintained up. Therefore, to account for these conditions, the triggers 620 are provided to remember which one of the SEL TU lines was previously selected. As an example, let it be assumed that data is now to be written on the previously selected TAPE UNIT 7. Consequently, the CONTROL 0007 mode of operation is called for, causing the CTRL 0007 line to come up and pass a positive signal via the OR-C circuit 619 to the previously conditioned AND circuit 615g which, in turn, passes the positive signal to turn ON the TU7 SEL trigger 620g, which, in being turned ON, effectively remembers that the TAPE UNIT 7 was previously SELECTED. The TU7 SEL trigger 620g in being turned ON also maintains positive signals on the SEL TU7 and TU B SEL lines. The CTRL 0007 line in coming up in combination with the SEL TU B line being up is effective to select the DC TO TU mode of operation (see Fig. 23), in a manner to be described in greater detail hereinafter. It will be remembered that when a DC TO TU mode of operation is called for, the DC RDY line comes down, as previously explained in the section on DATA COORDINATOR READY, which, in turn, brings down the DC SEL & RDY line. The DC SEL & RDY line in coming down deconditions the AND circuits 611 of the SELECT ADDRESS DECODER 602 to block the previous SELECT ADDRESS from maintaining the SEL TU7 line up, but since the TU7 SEL trigger 620g is ON it maintains the SEL TU7 line up during the entire mode of operation. At the end of the data transfer from the DATA COORDINATOR to the SELECTED TAPE UNIT 7, the DC TO TU line comes down which condition is passed via the OR circuit 622 to reset the TU7 SEL trigger 620g (and any other TU SEL trigger 620 that may have been previously turned ON), which, in being turned OFF, brings down the SEL TU7 and TU B SEL lines to effectively deselect the previously selected TAPE UNIT 7 (or any other previously selected TAPE UNIT).

If a CONTROL 0005 mode of operation (concurrent TAPE operation) is called for after a SELECT instruction SELECTS the TAPE UNIT 7, then, the CTRL 0005 in coming up is effective via circuitry in Fig. 25B to turn ON the TU7 SEL trigger 620g. Now, if a new SELECT instruction is given which selects another TAPE UNIT, the TU7 SEL trigger 620g in being ON effectively remembers that the TAPE UNIT 7 was previously selected and also maintains the SEL TU7 and TU B SEL lines up.

Thus, it should be apparent, that if the DATA COORDINATOR is busy with the previously SELECTED TAPE UNIT, or if the previously SELECTED TAPE UNIT is performing a BACKSPACE operation or if a new SELECT instruction is given, then, the one TU SEL trigger 620 which was turned ON effectively remembers which one of the TAPE UNITS was previously selected.

CENTRAL PROCESSING UNIT TO DATA COORDINATOR

The CPU TO DC mode of operation functions to transfer a RECORD or group of RECORDS from the CENTRAL PROCESSING UNIT to the MEMORY 50 of the DATA COORDINATOR.

A CPU TO DC operation is performed by a process of 2 instructions, namely, a SELECT instruction followed by a WRITE instruction. Thus, the PROGRAM for an exemplary CPU TO DC operation may be as follows:

SELECT 20604

WRITE R1132

Simply interpreted, the operation part 2 of the SELECT instruction designates that a SELECT operation is to be performed, while the ADDRESS part 0604 of the SELECT instruction designates the DATA COORDINATOR as the SELECTED input/output unit and that no TAPE UNIT is involved in this operation. Similarly, the operation part R of the WRITE instruction designates that a WRITE operation is to be performed, while the ADDRESS part 1132 of the WRITE instruction designates the ADDRESS in the MEMORY of the CPU starting from which the RECORD or group of RECORDS may be read and transferred to the MEMORY 50 in the DATA COORDINATOR.

The CPU TO DC mode of operation will now be described in a step by step manner wherein all operations within a step occur at relatively the same instant of time and with reference being made to the detailed logical block diagrams of the major components of the DATA COORDINATOR shown in Figs. 20 to 27, inclusive. Also, reference may be made to the timing diagrams of Figs. 28 to aid in understanding the sequence of the present operation.

Step 1

Initially, the DATA COORDINATOR is ready to perform an operation as previously explained in the section on the DATA COORDINATOR READY. Thus, referring to the DC RDY UNIT 840 in Fig. 26B, a positive signal is initially maintained on the DC RDY line.

Now, when the SELECT instruction is called for, the ADDRESS part is applied to the SELECT ADDRESS DECODER 602 in Fig. 25A in the form of binary coded signals. The SELECT ADDRESS DECODER 602 decodes these signals to bring up the THIS DC SELECTED line, the MODE C line and the DC SEL & RDY line in a manner as previously described in the section on SELECT ADDRESS DECODING.

Step 2

After the execution of the SELECT instruction, the program steps to the WRITE instruction which causes the CPU to go through a cycle of operation during which the first CHARACTER of DATA is effectively transferred from the CPU MEMORY to the CPU W BUS and the CPU W CALL line is brought up. The positive shift on the CPU W CALL line, in combination with the DC SEL & RDY line being up, passes via the AND circuit 304 of the INSTRUCTION DECODER 300 in Fig. 22 to bring up the W CALL line.

Referring now to the STATUS DECODER 400 in Fig. 23, since the machine is not in a CTRL 8 mode of operation, the CTRL 8 line is up to condition the AND circuit 422 so that the positive shift on the W CALL line passes via the AND circuit 422 to turn ON the CPU TO DC status trigger 418 which, in being turned ON, applies a positive signal via its right hand output to bring up the CPU TO DC line and applies a negative signal via its left hand output to bring down the CPU TO DC line. The positive shift on the CPU TO DC line is applied to the RESET UNIT 102, in Fig. 20G, where it passes via the OR circuit 104 to the inverter 106 and is inverted to a negative shift causing the peaker 108 to apply a 2 microsecond positive pulse via the RESET AC 112 line to reset all of the triggers 110 of the ADDRESS COUNTER 112 so that the ADDRESS COUNTER 112 stands with a count of 0. The triggers 110, in being reset, are effective to apply negative signals via their right hand outputs to decondition the AND circuits 114 of the COUNTER GATE 116. The positive shift on the CPU TO DC time is also applied to the RESET EX TIMER 924, in Fig. 27B, where it passes via the OR circuit 940 to the inverter 941 where it is inverted to a negative shift and applied via the RESET LRCR line to the LRCR 242 in Fig. 21D. The negative shift on the RESET LRCR line is effective via negative shift inputs to reset OFF all of the triggers 243 of the LRCR 242 in preparation for initiating the production of a longitudinal redundancy check (LRC) CHARACTER. Additionally, referring to the DC RDY unit 840 in Fig. 26B, the positive signal on the CPU TO DC line passes via the OR circuit 844 to maintain the DC RDY line up during this mode of operation.

Referring now to the DC & CPU TYPE CYCLE UNIT 560, in Fig. 24B, the negative shift on the CPU TO DC line is applied via a negative shift input to turn ON the CPU TO DC TC1 trigger 562 which, in being turned ON, applies a positive signal via its right hand output to bring up the CPU TO DC TC1 line and, via the OR circuit 564, to bring up the CPU TO DC TC1+2 line.

Referring now to the MEMORY EX TIMER 902, in Fig. 27A, the CPU TO DC TC1+2 line in coming up passes a positive signal via the OR circuit 903 to bring up the MEM W line and, via the OR circuit 904 to bring up the MEM R/W line.

Step 3

Shortly after the CENTRAL PROCESSING UNIT calls for a WRITE operation, the CPU issues a positive clock synchronizing pulse which is applied via the CPU SYNC PULSE line to the CLOCK CONTROL UNIT 802, in Fig. 26D, where, in combination with the CPU TO DC line being up via the OR circuit 804, it passes via the AND circuit 806 to the inverter 808 where it is inverted to a negative pulse to turn ON the INITIATE trigger 810. The INITIATE trigger 810 in being turned ON applies a positive signal from its right hand output via the OR circuit 812 to bring up the CLOCK GATE line to initiate a cycle of operation of the CLOCK 814 in a manner as previously described in the section on the CLOCK PULSE GENERATOR.

Step 4

At R0 time, referring to the RESET EX TIMER 924, in Fig. 27B, the positive pulse on the R0(D1.5) line, in combination with the CPU TO DC TC1+2 line being up, passes via the AND circuit 932 and the OR circuit 933 to the inverter 934 where it is inverted to a negative pulse and applied via the RESET CR 214 line to the CR 214 in Fig. 21B. The negative shift of the leading edge of the negative pulse on the RESET CR 214 line is applied via negative shift inputs to reset all of the triggers 218 of the CHARACTER REGISTER 214 in preparation for receiving the first CHARACTER presently on the CPU W BUS.

At R0 time, referring to the CLOCK CONTROL UNIT 802 in Fig. 26D, the negative shift of the leading edge of the negative pulse on the R0(D1.5) line is applied via a negative shift input to turn OFF the INITIATE trigger 810 which, in being turned OFF, applies a negative signal from its right hand output via the OR circuit 812 to bring down the CLOCK GATE line and prevent further cycling of the CLOCK 814 after the present cycle runs out.

At R0 time, referring to the CTR & REG EX TIMER 942 in Fig. 27C, the positive pulse on the R0(D4) line, in combination with the MEM W line being up and the CPU TO DC TC1+2 line being up via the OR circuit 947 passes via the AND circuit 948 to bring up the AC 112 TO AR line which condition is passed to the AND circuits 114 of the COUNTER GATE 116 in Fig. 20G. The positive signal on the AC 112 TO AR line passes via those AND circuits 114 of the COUNTER GATE 116 which are conditioned in accordance with the count setting of the ADDRESS COUNTER 112 and via corresponding ones of the OR circuits 134 in the ADDRESS REGISTER 132 to turn ON corresponding ones of the triggers 136. In the present instance, the AND circuits 114 being deconditioned block the positive pulse on the AC 112 TO AR line from having any effect on the ADDRESS REGISTER 132 with the result being that the ADDRESS REGISTER 132 remains set at a value which is the ADDRESS (0000) of the STORAGE REGISTER in the MEMORY 50 where the first CHARACTER is to be stored.

At R0 time, referring to the RESPONSE EX TIMER 914 in Fig. 27B, the positive pulse on the R0(D4) line, in combination with the CPU TO DC TC1 and CPU TO DC TC2 lines being up via the AND circuit 922 and the OR circuit 920, passes via the AND circuit 921 to bring up the W RESPONSE line to signal the CPU to go through a clock cycle to bring up the next CHARACTER to the CPU W BUS.

At R0 time, referring to the MEMORY EX TIMER 902 in Fig. 27A, the positive pulse on the R0(D4) line, in combination with the MEM R/W line being up and the CPU TO DC line being up via the OR circuit 908, passes via the AND circuit 909 to bring up the R BIAS GATE line which condition is passed to the X SC BIAS & W DRIVERS 172 and 184 in Figs. 20B and 20D, respectively, which are conditioned in accordance with the ADDRESS setting (0000) of the ADDRESS REGISTER 132 to apply negative current pulses to bias OFF all but the SELECTED ROWS (ROWS X0) of the X and Y SWITCH CORE MATRICES 156 and 150 in a manner as previously described in the section on the MEMORY CONTROL UNIT.

Step 5

At R1.5 time, referring to the MEMORY EX TIMER 902 in Fig. 27A, the positive pulse on the R1.5(D2.5) line, in combination with the MEM R/W line being up, passes via the AND circuit 910 to bring up the R GATE line which condition is passed to the Y SC DECODERS 138 and 142 in Figs. 20A and 20E, respectively, which are conditioned in accordance with the ADDRESS setting (0000) of the ADDRESS REGISTER 132, to render the Y SC R DRIVERS 146 and 152 effective to drive the SELECTED COLUMNS (COLUMNS Y0) of the X and Y SWITCH CORE MATRICES 156 and 150. Since only one core in each of the SELECTED COLUMNS is in the unbiased state, only these cores switch from the reset to the set position and induce current in their secondaries which cause negative half select current pulses to be applied to the selected X and Y wires (XX0 and YY0) of the MEMORY 50 to effectively clear the SELECTED STORAGE REGISTER in the MEMORY 50, in a manner as previously described in the section on the MEMORY OPERATION, in preparation for receiving the CHARACTER presently on the CPU W BUS.

Step 6

Referring to the CR 214 in Fig. 21B, the first CHARACTER presently on the CPU W BUS is applied to the AND circuits 216 in such a manner that positive signals corresponding to the 1 bits of the CHARACTER condition those of the AND circuits 216 to which they are applied.

At R2 time, referring to the DATA TFR & CK EX TIMER 947 in Fig. 27C, the positive pulse on the R2(D1.5) line, in combination with the CPU TO DC TC1 line being up, passes via the AND circuit 967 to bring up the CPU W BUS TO CR 214 line which condition is passed to the CR 214 in Fig. 21B. The positive signal on the CPU W BUS to CR 214 line passes via the conditioned ones of the AND circuits 216 and via corresponding ones of the OR circuits 217 to turn ON corresponding ones of the triggers 218 thereby effectively storing the first CHARACTER in the CHARACTER REGISTER 214.

Step 7

At R4 time, referring to the CTR & REG EX TIMER 942 in Fig. 27B, the positive pulse on the R4(D1.5) line, in combination with the MEM W line being up, passes via the AND circuit 946 to bring up the STEP AC 112 line which condition is passed to the ADDRESS COUNTER 112 in Fig. 20G.

Step 8

Referring now to the CR 214 and the INPUT SWITCH 222 in Figs. 21B and 21C, respectively, those of the triggers 218 of the CR 214 which were not previously turned ON and which correspond to a 0 bit of the first CHARACTER apply positive signals via their left hand outputs to condition corresponding ones of the AND circuits 223 of the INPUT SWITCH 222.

At R4.5 time, referring to the DATA TFR & CK EX TIMER 949 in Fig. 27C, the positive pulse on the R4.5(D4.5) line, in combination with the CPU TO DC TC1 line being up, passes via the AND circuit 966 and the OR circuit 965 to bring up the CR 214 TO ID line which condition is passed to the AND circuits 223 of the INPUT SWITCH 222, in Fig. 21C, so that those of the AND circuit 223 which are conditioned by the positive signals corresponding to the 0 bits of the first CHARACTER presently stored in the CR 214, pass positive signals via corresponding ones of the OR circuits 225 to condition corresponding ones of the AND circuits 227 of the INHIBIT DRIVER 226. The signal outputs of the OR circuits 225 are applied to the CHAR CODE CHECK UNIT 248 in Fig. 21E, in accordance with the first CHARACTER stored in the CR 214, where a vertical check is made to insure that there are an even number of 1 bits in the first CHARACTER, in a manner as previously described in the section on CODE CHECKING. If the CHARACTER has an odd number of 1 bits, then this condition is detected by the CHAR CODE CHECK UNIT 248 to bring up the CHAR CODE CK B line which, in coming up, conditions the AND circuit 271 of the ERROR CHECK UNIT 268 in Fig. 21F.

At R4.5 time, referring to the MEMORY EX TIMER 902 in Fig. 27A, the positive pulse on the R4.5(D4.5) line, in combination with the MEM R/W, $\overline{RCLA}$ and $\overline{WCLA}$ lines being up, passes via the AND circuit 911 to bring up the INHIBIT GATE line which condition is passed to the AND circuits 227 of the INHIBIT DRIVER 226 in Fig. 21C. Those of the AND circuits 227 which are conditioned by a positive signal, corresponding to a 0 bit of the first CHARACTER presently stored in the CR 214, pass the positive pulse on the INHIBIT GATE line via corresponding ones of the OR circuits 228 and the AND circuits 229 to corresponding ones of the INHIBIT DRIVERS 230 which apply negative INHIBIT current pulses to the Z wires of the corresponding ones of the bit planes of the MEMORY 50 to INHIBIT these bit planes in a manner as previously described in the section on INHIBIT DRIVING.

At the same time, the positive pulse on the R4.5(D4.5) line, in combination with the MEM R/W, $\overline{RCLA}$ and $\overline{WCLA}$ lines being up, passes via the AND circuit 912 to bring up the W GATE line which condition is passed to the X SC DECODERS 158 and 164 in Fig. 20C, which are conditioned in accordance with the ADDRESS setting (0000) of the ADDRESS REGISTER 132, to render the X SC BIAS & W DRIVERS 172 and 184, in Figs. 20B and 20D, respectively, effective to drive the SELECTED ROWS (ROWS X0) of the X and Y SWITCH CORE MATRICES 156 and 150. Since only one core in each of the SELECTED ROWS is in the set position, only these cores switch from the set to the reset position and induce current in their secondaries which cause positive half select current pulses to be applied to the SELECTED X and Y wires (XX0 and YY0) of the MEMORY 50. These positive half select current pulses are applied to the SELECTED X and Y wires of the MEMORY 50 during the same interval of time that the INHIBIT current pulses are being applied to the Z wires in the MEMORY 50 which correspond to the 0 bits of the CHARACTER to be stored in the MEMORY 50. Consequently, those MEMORY CORES of the SELECTED STORAGE REGISTER in the MEMORY 50 which are not INHIBITED are switched to the 1 state thereby effectively storing a 1 bit whereas those MEMORY CORES of the SELECTED STORAGE REGISTER which are INHIBITED remain in the 0 state thereby effectively storing a 0 bit with the resulting effect being that the first CHARACTER is stored in the SELECTED STORAGE REGISTER of the MEMORY 50.

Step 9

Referring now to the CR 214 and the LRCR 242 in Figs. 21B and 21D, respectively, the right hand outputs of the triggers 218 are applied to the AND circuits 243 of the LRCR 242 in accordance with the first CHARACTER presently stored in the CR 214.

At W0 time, referring to the DATA TFR & CK EX TIMER 949 in Fig. 27C, the positive pulse on the W0 (D1.5) line, in combination with the CPU TO DC TC1 and CPU TO DC TC2 lines being up, passes via the AND circuit 963 and the OR circuit 960 to bring up the CR 214 to LRCR line which condition is passed to the AND circuits 243 of the LRCR 242 in Fig. 21D so that those of the AND circuits 243 which have positive signals applied thereto, corresponding to the 1 bits of the first CHARACTER, pass the positive pulse to corresponding ones of the inverters 244 where it is inverted to negative pulses to switch the state of corresponding ones of the triggers 245 to initiate the production of the longitudinal redundancy check CHARACTER.

Step 10

At W0.5 time, referring to the ADDRESS COUNTER 112 in Fig. 20G, the negative shift of the trailing edge of the positive pulse on the STEP AC 112 line is applied via a negative shift input to turn ON the first trigger 110a and thereby step the ADDRESS COUNTER 112 to a count of 1. The trigger 110a in being turned ON applies a positive signal from its right hand output to condition the AND circuit 114a of the COUNTER GATE 116 while the triggers 110b to 110j, inclusive, remain OFF and maintain negative signals from their right hand outputs to decondition the corresponding AND circuits 114b to 114j, respectively, of the COUNTER GATE 116.

Step 11

At W2 time, referring to the DATA TFR & CK EX TIMER 949 in Fig. 27B, the positive pulse on the W2 (D1.5) line, in combination with the CPU TO DC TC1+2 line being up via the OR circuit 956, passes via the AND circuit 957 to bring up the CHAR CODE CK B TO R/W CK line which condition is passed to the AND circuit 271 in the ERROR CHECK UNIT 268 in Fig. 21F. If the AND circuit 271 is conditioned by the CHAR CODE CK B line being up, due to the existence of an odd number of 1 bits in the first CHARACTER, the positive pulse passes via the AND circuit 271 and the OR-C circuit 270 to turn ON the R/W CK trigger 279 which, in being turned ON, applies a positive signal from its right hand output which, in combination with the THIS DC SELECTED line being up, passes via the AND circuit 281 to bring up the R/W CK line.

Step 12

At W3.5 time, referring to the CLOCK CONTROL UNIT 802 in Fig. 26D, let it be assumed that the CPU has completed a clock cycle during which the next CHARACTER has been effectively transferred from the CPU MEMORY to the CPU W BUS and the CPU again applies a positive pulse to the CPU SYNC PULSE line which, in combination with the CPU TO DC line being up, is effective to turn ON the INITIATE trigger 810 to effectively bring up the CLOCK GATE line to initiate another cycle of operation of the CLOCK 814 in Fig. 26B.

At W3.5 time, referring to the MEMORY EX TIMER 902 in Fig. 27A, the positive pulse on the W3.5(D1) line, in combination with the MEM R/W, RCLA and WCLA lines being up, passes via the AND circuit 913 to bring up the PWD GATE line which condition is passed via the OR circuits 228 of the INHIBIT DRIVER 226 in Fig. 21C and the AND circuits 229 to the INHIBIT DRIVERS 230 which apply post write disturbance current pulses to all of the Z wires of the MEMORY 50 to disturb all of the MEMORY CORES in the SELECTED STORAGE REGISTER to minimize subsequent noise pulses in a manner as previously described in the section on POST WRITE DISTURBANCE.

At W3.5 time, the positive pulse on the W3.5(D1) line is applied to the ADDRESS REGISTER 132 in Fig. 20F.

Step 13

At R0 time, referring to the RESET EX TIMER 924 in Fig. 27B, the positive pulse on the R0(D1.5) line, in combination with the CPU TO DC TC1+2 line being up, passes via the AND circuit 932 and the OR circuit 933 to the inverter 934 where it is inverted to a negative pulse and applied via the RESET CR 214 line to the CR 214 in Fig. 21B. The negative shift of the leading edge of the negative pulse on the RESET CR 214 line is applied via negative shift inputs to reset all of the triggers 218 of the CHARACTER REGISTER 214 in preparation for receiving the next CHARACTER presently on the CPU W BUS.

At R0 time, referring to the CLOCK CONTROL UNIT 802 in Fig. 26D, the negative shift of the leading edge of the negative pulse on the R0(D1.5) line is applied via a negative shift input to turn OFF the INITIATE trigger 810 which, in being turned OFF, is effective, via the OR circuit 812, to bring down the CLOCK GATE line and prevent further cycling of the CLOCK 814 after the present cycle runs out.

At R0 time, referring to CTR & REG EX TIMER 942 in Fig. 27C, the positive pulse on the R0(D4) line, in combination with the MEM W line being up and the CPU TO DC TC1+2 line being up via the OR circuit 947, passes via the AND circuit 948 to bring up the AC 112 TO AR line which condition is passed to the AND circuits 114 of the COUNTER GATE 116 in Fig. 20G. The positive signal on the AC 112 TO AR line passes via those AND circuits 114 of the COUNTER GATE 116 which are conditioned in accordance with the count setting of the ADDRESS COUNTER 112 and via corresponding ones of the OR circuits 134 in the ADDRESS REGISTER 132 to turn ON corresponding ones of the triggers 136. Thus, in the present instance, since only the AND circuit 114a is conditioned, the positive signal on the AC 112 TO AR line passes therethrough and via the corresponding OR circuit 134a to turn ON the corresponding trigger 136a of the ADDRESS REGISTER 132 in Fig. 20F.

At R0 time, referring to the RESPONSE EX TIMER 914 in Fig. 27B, the positive pulse on the R0(D4) line, in combination with the CPU TO DC TC1 and CPU TO DC TC2 lines being up via the AND circuit 922 and the OR circuit 920, passes via the AND circuit 921 to bring up the W RESPONSE line to signal the CPU to go through a clock cycle to bring up the next CHARACTER to the CPU W BUS.

At R0 time, referring to the MEMORY EX TIMER 902 in Fig. 27A, the positive pulse on the R0(D4) line, in combination with MEM R/W line being up and the CPU TO DC line being up via the OR circuit 908, passes via the AND circuit 909 to bring up the R BIAS GATE line, which condition is passed to the X SC BIAS & W DRIVERS 172 and 184 in Figs. 20B and 20D, respectively.

Step 14

At R0.5 time, referring to the ADDRESS REGISTER 132 in Fig. 20F, the negative shift of the trailing edge of the positive pulse on the W3.5(D1) line is applied via negative shift inputs to reset all of those triggers 136 which were not turned ON by the positive pulse on the AC 112 TO AR line in a manner as previously described in the section on the MEMORY CONTROL UNIT whereby the ADDRESS REGISTER 132 is now set to a value corresponding to the count setting of the ADDRESS COUNTER 112 which is the ADDRESS (0001) of the STORAGE REGISTER in the MEMORY 50 where the CHARACTER presently on the CPU W BUS is to be stored.

Now, the X SC BIAS & W DRIVERS 172 and 184 in Figs. 20B and 20D, respectively, being conditioned in accordance with the ADDRESS setting of the ADDRESS REGISTER 132 respond to the positive pulse on the R BIAS GATE line and apply negative current pulses to bias OFF all but the SELECTED ROWS (ROWS X0) of the X and Y SWITCH CORE MATRICES 156 and 150.

Step 15

At R1.5 time, referring to the MEMORY EX TIMER 902 in Fig. 27A, the positive pulse on the R1.5(D2.5) line, in combination with the MEM R/W line being up, passes via the AND circuit 910 to bring up the R GATE line, which condition is passed to the Y SC DECODERS 138 and 142 in Figs. 20A and 20E, respectively, which are conditioned in accordance with the ADDRESS setting (0001) of the ADDRESS REGISTER 132, to render the Y SC R DRIVERS 146 and 152 effective to drive the SELECTED COLUMNS (COLUMNS Y0 and Y1) of the X and Y SWITCH CORE MATRICES 126 and 150. Since only one core in each of the SELECTED COLUMNS is in the unbiased state, only these cores switch from the reset to the set position and induce current in their secondaries which cause negative half select current pulses to be applied to the SELECTED X and Y wires (XX0 and YY1) of the MEMORY 50 to effectively clear the SELECTED STORAGE REGISTER in the MEMORY 50 in a manner as previously described in the section on the MEMORY OPERATION, in preparation for receiving the CHARACTER presently on the CPU W BUS.

Step 16

Referring to the CR 214 in Fig. 21B, the CHARACTER presently on the CPU W BUS is applied to the AND circuits 216 in such a manner that positive signals corresponding to the 1 bits of the CHARACTER condition those of the AND circuits 216 to which they are applied.

At R2 time, referring to the DATA TFR & CK EX TIMER 947 in Fig. 27C, the positive pulse on the R2(D1.5) line, in combination with the CPU TO DC TC1 line being up, passes via the AND circuit 967 to bring up the CPU W BUS TO CR 214 line which condition is passed to the CR 214 in Fig. 21B. The positive signal on the CPU W BUS TO CR 214 line passes via the conditioned ones of the AND circuits 216 and via corresponding ones of the OR circuits 217 to turn ON corresponding ones of the triggers 218 thereby effectively storing the CHARACTER presently on the CPU W BUS in the CHARACTER REGISTER 214.

Step 17

At R4 time, referring to the CTR & REG EX TIMER 942 in Fig. 27B, the positive pulse on the R4(D1.5) line, in combination with the MEM W line being up, passes via the AND circuit 946 to bring up the STEP AC 112 line which condition is passed to the ADDRESS COUNTER 112 in Fig. 20G.

Step 18

Referring now to the CR 214 and the INPUT SWITCH 222 in Figs. 21B and 21C, respectively, those of the triggers 218 of the CR 214 which were not previously turned ON and which correspond to a 0 bit of the CHARACTER presently stored in the CR 214, apply positive signals via their left-hand outputs to condition corresponding ones of the AND circuits 223 of the INPUT SWITCH 222.

At R4,5 time, referring to the DATA TFR & CK EX TIMER 949 in Fig. 27C, the positive pulse on the R4.5(D4.5) line, in combination with the CPU TO DC TC1 line being up, passes via the AND circuit 966 and the OR circuit 965 to bring up the CR 214 TO ID line which condition is passed to the AND circuits 223 of the INPUT SWITCH 222 in Fig. 21C, so that those of the AND circuits 223 which are conditioned by the positive signals corresponding to 0 bits of the CHARACTER presently stored in the CR 214, pass positive signals via corresponding ones of the OR circuits 225 to condition corresponding ones of the AND circuits 227 of the INHIBIT DRIVER 226. The signal outputs of the OR circuits 225 are applied to the CHAR CODE CK UNIT 248 in Fig. 21E, in accordance with the CHARACTER presently stored in the CR 214, where a vertical check is made to insure that there are an even number of 1 bits in the CHARACTER. If the CHARACTER has an odd number of 1 bits, then, this condition is detected by the CHAR CODE CK UNIT 248 to bring up the CHAR CODE CK B line, which, in coming up, conditions the AND circuit 271 of the ERROR CHECK UNIT 268 in Fig. 21F.

At R4.5 time, referring to the MEMORY EX TIMER 902 in Fig. 27A, the positive pulse on the R4.5(D4.5) line, in combination with the MEM R/W, $\overline{\text{RCLA}}$ and $\overline{\text{WCLA}}$ lines being up, passes via the AND circuit 911 to bring up the INHIBIT GATE line which condition is passed to the AND circuits 227 of the INHIBIT DRIVER 226 in Fig. 21C. Those of the AND circuits 227 which are conditioned by a positive signal, corresponding to a 0 bit of the CHARACTER presently stored in the CR 214, pass the positive pulse on the INHIBIT GATE line via corresponding ones of the OR circuits 228 and the AND circuits 229 to corresponding ones of the INHIBIT DRIVERS 230 which apply negative INHIBIT current pulses to the Z wires of the corresponding ones of the bit planes of the MEMORY 50 to INHIBIT these bit planes.

At the same time, the positive pulse on the R4.5(D4.5) line, in combination with the MEM R/W, $\overline{\text{RCLA}}$ and $\overline{\text{WCLA}}$ lines being up, passes via the AND circuit 912 to bring up the W GATE line which condition is passed to the X SC DECODERS 158 and 164 in Fig. 20C, which are conditioned in accordance with the ADDRESS setting (0001) of the ADDRESS REGISTER 132, to render the X SC BIAS & W DRIVERS 172 and 184, in Figs. 20B and 20D, respectively, effective to drive the SELECTED ROWS (ROWS X0) of the X and Y SWITCH CORE MATRICES 156 and 150. Since only one core in each of the SELECTED ROWS is in the set position, only these cores switch from the set to the reset position and induce current in their secondaries which cause positive half select current pulses to be applied to the SELECTED X and Y wires (XX0 and YY1) of the MEMORY 50. These positive half select current pulses are applied to the SELECTED X and Y wires of the MEMORY 50 during the same interval of time that the INHIBIT current pulses are being applied to the Z wires in the MEMORY 50 which correspond to the 0 bits of the CHARACTER to be stored in the MEMORY 50. Consequently, those MEMORY CORES of the SELECTED STORAGE REGISTER in the MEMORY 50 which are not INHIBITED are switched to the 1 state thereby effectively storing a 1 bit whereas those MEMORY CORES of the SELECTED STORAGE REGISTER which are INHIBITED remain in the 0 state thereby effectively storing a 0 bit with the resulting effect being that the next CHARACTER is stored in the SELECTED STORAGE REGISTER of the MEMORY 50.

Step 19

Referring now to CR 214 and the LRCR 242 in Figs. 21B and 21D, respectively, the right-hand outputs of the triggers 218 are applied to the AND circuits 243 of the LRCR 242 in accordance with the CHARACTER presently stored in the CR 214.

At W0 time, referring to the DATA TRF & CK EX TIMER 949 in Fig. 27C, the positive pulse on the W0(D1.5) line, in combination with CPU TO DC TC1 and $\overline{\text{CPU TO DC TC2}}$ lines being up, passes via the AND circuit 963 and the OR circuit 960 to bring up the CR 214 TO LRCR line which condition is passed to the AND circuits 243 of the LRCR 242 in Fig. 21D so that those of the AND circuits 243 which have positive signals applied thereto, corresponding to the 1 bits of the CHARACTER, pass the positive pulse to corresponding ones of the inverters 244 where it is inverted to negative pulses to switch the state of corresponding ones of the triggers whereby the production of the longitudinal redundancy check character is continued.

Step 20

At W0.5 time, referring to ADDRESS COUNTER 112 in Fig. 20G, the negative shift of the trailing edge of the positive pulse on the STEP AC 112 line is applied to step the ADDRESS COUNTER 112. Consequently, in the present instance, the negative shift is effective to turn OFF the first trigger 110a which, in being turned OFF, applies a negative shift from its right-hand output to turn ON the second trigger 110b and thereby step the ADDRESS COUNTER 112 to a count of 2. The trigger 110b in being turned ON applies a positive signal from its right-hand output to condition the AND circuit 114b of the COUNTER GATE 116 while the triggers 110a and 110c to 110j, inclusive, in being OFF maintain negative signals from their right-hand outputs to decondition the corresponding AND circuits 114a and 114c to 114j, respectively, of the COUNTER GATE 116.

Step 21

At W2 time, referring to the DATA TFR & CK EX TIMER 949 in Fig. 27C, the positive pulse on the W2(D1.5) line, in combination with the CPU TO DC TC1+2 line being up via the OR circuit 956, passes via the AND circuit 957 to bring up the CHAR CODE CK B TO R/W CK line which condition is passed to the AND circuit 271 in the ERROR CHECK UNIT 268 in Fig. 21F. If the AND circuit 271 is conditioned by the CHAR CODE CK B line being up, due to the existence of an odd number of 1 bits in the CHARACTER presently stored in the CR 214, the positive pulse passes via the AND circuit 271 and the OR circuit 270 to turn ON the R/W CK trigger 279 which, in being turned ON, applies a positive signal from its right-hand output which, in combination with the THIS DC SELECTED line being up, passes via the AND circuit 281 to bring up the R/W CK line.

Step 22

Steps 12 to 21 are repeated for each CHARACTER of DATA of the RECORD or group of RECORDS transferred from the CENTRAL PROCESSING UNIT to the DATA COORDINATOR.

Now, let it be assumed that the CENTRAL PROCESSING UNIT is performing a clock cycle during which the GM CHARACTER is transferred from the CPU MEMORY to the CPU W BUS.

Thus, at R0 time, Step 13 is repeated wherein the CHARACTER REGISTER 214, in Fig. 21B, is cleared in preparation for receiving the GM CHARACTER and the INITIATE trigger 810 of the CLOCK CONTROL UNIT 802, in Fig. 26D, is reset to effectively prevent further cycling of the CLOCK 814 after the present cycle runs out.

Step 23

At R0.5 time, Step 14 is repeated wherein the ADDRESS REGISTER 132, in Fig. 20F, is set to the ADDRESS of the STORAGE REGISTER in the MEMORY 50 where the GM CHARACTER is to be stored.

Step 24

At R1.5 time, Step 15 is repeated wherein the SELECTED STORAGE REGISTER of the MEMORY 50 is cleared in preparation for receiving the GM CHARACTER.

Step 25

At R2 time, Step 16 is repeated wherein the GM CHARACTER is transferred from the CPU W BUS to the CHARACTER REGISTER 214 in Fig. 21B.

At the same time, the CPU, having previously detected the GM CHARACTER, now effectively brings down the CPU W CALL line. The CPU W CALL line in coming down is effective, in the INSTRUCTION DECODER in Fig. 22, to bring down the W CALL line which, in coming down, applies a negative shift to the peaker 766 of the PROGRAM CONTROL UNIT 778, in Fig. 25J. The peaker 766 responds thereto and applies a 2 microsecond positive pulse via the W CALL CTRL line to the CLOCK CONTROL UNIT 802, in Fig. 26D. Also, at the same time, referring to the DC & CPU TYPE CYCLE UNIT 560 in Fig. 24B, the negative shift on the W CALL line deconditions the AND circuit 573 causing a negative shift to be applied via a negative shift input to turn ON the CPU TO DC TC2 trigger 574 which, in being turned ON, applies a positive signal from its right-hand output to bring up the CPU TO DC TC2 line and applies a negative signal from its left-hand output to bring down the $\overline{\text{CPU TO DC TC2}}$ line. The CPU TO DC TC2 line in coming up is effective to maintain the CPU TO DC TC1+2 line up via the OR circuit 564.

Step 26

At R4 time, Step 17 is repeated causing a positive pulse on the STEP AC 112 line to be applied to the ADDRESS COUNTER 112 in Fig. 20G. At the same time, referring to the CLOCK CONTROL UNIT 802 in Fig. 26D, the negative shift of the trailing edge of the positive pulse on the W CALL CTRL line is applied via a negative shift input to turn ON the EXTRA CYCLE trigger 824 which in being turned ON, applies a positive signal from its right-hand output via the OR circuit 826 to condition the AND circuit 828.

Step 27

At R4.5 time, Step 18 is repeated wherein the GM CHARACTER, presently stored in the CHARACTER REGISTER 214, is stored in the SELECTED STORAGE REGISTER of the MEMORY 50 and a vertical check is made to insure that there are an even number of 1 bits in the GM CHARACTER.

Step 28

At W0 time, Step 19 is not repeated to bring up the CR 214 to CRCR line inasmuch as the $\overline{\text{CPU TO DC TC2}}$ line is down at the present time. Consequently, the GM CHARACTER presently stored in the CHARACTER REGISTER 214 is not transferred to the LRC REGISTER 242.

Step 29

At W0.5 time, Step 20 is repeated to step the ADDRESS COUNTER 112 in Fig. 20F.

Step 30

At W2 time, Step 21 is repeated whereby the R/W CK trigger 279 of the ERROR CHECK UNIT 268, in Fig. 21F, is turned ON if there are an odd number of 1 bits in the GM CHARACTER.

Step 31

At W3.5 time, Step 12 is repeated wherein a POST WRITE DISTURBANCE is made of the SELECTED STORAGE REGISTER but since the GM CHARACTER has been detected, the CPU issues no further CPU SYNC PULSE to the CLOCK CONTROL UNIT 802 in Fig. 26D. However, at W3.5 time, referring to the CLOCK CONTROL UNIT 802 in Fig. 26D, the positive pulse on the W3.5 (D1) is passed via the now conditioned AND circuit 828 and the OR circuit 812 to bring up the CLOCK GATE line to initiate an extra cycle of operation of the CLOCK 814.

Step 32

At R0 time of the EXTRA CYCLE, Step 13 is repeated wherein the CHARACTER REGISTER 214 is cleared but the W RESPONSE line in Fig. 27B is not brought up to signal the CPU inasmuch as the $\overline{\text{CPU TO DC}}$ $\overline{\text{TC2}}$ line is down at the present time.

At the same time, referring to the CLOCK CONTROL UNIT 802 in Fig. 26D, the negative shift of the leading edge of the negative pulse on the $\overline{\text{R0(D1.5)}}$ line is applied via a negative shift input to turn OFF the EXTRA CYCLE trigger 824 which, in being turned OFF, applies a negative signal from its right-hand output via the OR circuit 826 to decondition the AND circuit 828 causing a negative signal to be applied via the OR circuit 812 to bring down the CLOCK GATE line to prevent further cycling of the CLOCK 814 after the extra cycle runs out. Also, at the same time, the negative pulse on the $\overline{\text{R0(D1.5)}}$ line is applied to the OR circuit 571 of the DC & CPU TYPE CYCLE UNIT 560 in Fig. 24B.

*Step 33*

At R0.5 time of the EXTRA CYCLE, Step 14 is repeated whereby the ADDRESS REGISTER 132, in Fig. 20F, is set to the ADDRESS of the STORAGE REGISTER in the MEMORY 50 where the LRC CHARACTER is to be stored.

*Step 34*

At R1.5 time of the EXTRA CYCLE, Step 15 is repeated whereby the SELECTED STORAGE REGISTER in the MEMORY 50 is cleared in preparation for receiving the LRC CHARACTER.

At R1.5 time of the EXTRA CYCLE, referring to the DC & CPU TYPE CYCLE UNIT 560 in Fig. 24B, the positive shift of the trailing edge of the negative pulse on the $\overline{\text{R0(D1.5)}}$ line, in combination with the $\overline{\text{CPU TO DC TC2}}$ line being down, passes via the OR circuit 571 to the inverter 572 where it is inverted to a negative shift to turn OFF the CPU TO DC TC1 trigger 562, which, in being turned OFF, applies a negative signal via its right-hand output to bring down the CPU TO DC TC1 line and applies a positive signal via its left-hand output to bring up the $\overline{\text{CPU TO DC TC1}}$ line. The positive shift on the $\overline{\text{CPU TO DC TC1}}$ line is applied to the DATA TFR & CK EX TIMER 949 in Fig. 27D, where, in combination with the CPU TO DC TC2 and R0(D4.5) lines being up, it passes via the AND circuit 978 and the OR circuit 979 to bring up the W DISC line which condition is passed to the DISCONNECT EX TIMER 984 in Fig. 27A. The positive shift on the W DISC line is passed via the OR circuit 990 to the inverter 991 where it is inverted to a negative shift to turn on the 10 microsecond CTRL/W DISC single shot 992 which, in being turned ON, applies a positive signal from its right-hand output to bring up the CTRL/W DISC line for 10 microseconds to signal the CPU to terminate the WRITE instruction and proceed to the next instruction of the PROGRAM.

*Step 35*

At R2 time of the EXTRA CYCLE, Step 16 is not repeated inasmuch as the CPU TO DC TC1 line is down and the LRC CHARACTER is already stored in the LRCR 242 in Fig. 21D.

*Step 36*

At R4 time of the EXTRA CYCLE, Step 17 is repeated to apply a positive pulse via the STEP AC 112 line to the ADDRESS COUNTER 112 in Fig. 20G.

*Step 37*

At R4.5 time of the EXTRA CYCLE, Step 18 is repeated except for bringing up the CR 214 to LRCR line and instead, referring to the DATA TFR & CK EX TIMER 949 in Fig. 27B, the positive pulse on the R4.5(D4.5) line, in combination with the CPU TO DC TC2 and $\overline{\text{CPU TO DC TC1}}$ line being up, passes via the AND circuit 958 to bring up the LRCR TO ID line which condition is passed to the LRCR 242 in Fig. 21D to permit the LRC CHARACTER to be transferred via the INPUT SWITCH 222, in Fig. 21B, to the INHIBIT DRIVER 226 and to the CHAR CODE CK UNIT 248 in Fig. 21B where a vertical check is made to insure that there are an even number of 1 bits in the LRC CHARACTER. At the same time, in a manner explained in Step 18, the MEMORY CONTROL UNIT 100, in combination with the action of the INHIBIT DRIVER 226, is effective to cause the LRC CHARACTER to be stored in the SELECTED STORAGE REGISTER of the MEMORY 50.

*Step 38*

At W0 time of the EXTRA CYCLE, Step 19 is not repeated to bring up the CR 214 TO LRCR line inasmuch as the $\overline{\text{CPU TO DC TC2}}$ line is down at the present time and the last CHARACTER of the RECORD has already caused the LRC CHARACTER to be stored in the LRCR 242 in Fig. 21D.

*Step 39*

At W0.5 time of the EXTRA CYCLE, Step 20 is repeated to step the ADDRESS COUNTER 112 in Fig. 20G.

*Step 40*

At W2 time of the EXTRA CYCLE, Step 21 is repeated whereby the R/W CK trigger 279 of the ERROR CHECK UNIT 268, in Fig. 21F, is turned ON if there are an odd number of 1 bits in the LRC CHARACTER.

*Step 41*

At W3.5 time of the EXTRA CYCLE, Step 22 is repeated whereby a POST WRITE DISTURBANCE is made of the SELECTED STORAGE REGISTER in the MEMORY 50 but, as before, in Step 31, the CPU issues no CPU SYNC PULSE to the CLOCK CONTROL UNIT 802 in Fig. 26D.

*Step 42*

At W4 time of the EXTRA CYCLE, referring to the DC & CPU TYPE CYCLE UNIT 560 in Fig. 24B, the positive pulse on the W4(D0.5) line, in combination with the $\overline{\text{CPU TO DC TC1}}$ line being up, passes via the AND circuit 575 to turn OFF the CPU TO DC TC2 trigger 574 which, in being turned OFF, applies a negative signal from its right-hand output to bring down the CPU TO DC TC2 line and, via the OR circuit 564, to bring down the CPU TO DC TC1+2 line and applies a positive signal from its left-hand output to bring up the $\overline{\text{CPU TO DC TC2}}$ line. The negative shift on the CPU TO DC TC2 line is applied to turn OFF the CPU TO DC status trigger 418 of the STATUS DECODER 400 in Fig. 23 which, in being turned OFF, applies a negative signal from its right-hand output to bring down the CPU TO DC line and applies a positive signal from its left-hand output to bring up the $\overline{\text{CPU}}$ $\overline{\text{TO DC}}$ line. The negative signal on the CPU TO DC line is applied via the OR circuit 940 to the inverter 941 of the RESET EX TIMER 924 in Fig 27B, where it is inverted to a positive signal to bring up the RESET LRCR line. The negative signal on the CPU TO DC TC1+2 line is applied via the OR circuit 903 of the MEMORY EX TIMER 902, in Fig. 27A, to bring down the MEM W line.

*Step 43*

At the end of the WRITE instruction, the CPU issues a positive signal via the CPU END R/W line to the INSTRUCTION DECODER 300 in Fig. 22. The positive signal on the CPU END R/W line in combination with THIS DC SELECTED line being up, passes via the AND circuit 326 to bring up the END R/W line which condition is passed to turn ON the trigger 277 in the ERROR CHECK UNIT 268 in Fig. 21F. At the termination of the CPU END R/W signal, the END R/W line comes down to turn OFF the trigger 277 which, in being turned OFF, applies a negative signal via its right-hand output to turn OFF the R/W CK trigger 279, if it had been turned ON during the execution of the WRITE instruction, to bring down the R/W CK line to signal the CPU that an ERROR had occurred in the transfer of the RECORD or group of RECORDS from the CPU to the DC. This operation ends the CPU to DC mode of operation.

DATA COORDINATOR TO TAPE UNIT

The DC TO TU mode of operation functions to transfer a RECORD or group of RECORDS from the MEMORY 50 of the DATA COORDINATOR to a SELECTED TAPE UNIT.

A DC TO TU operation is performed by a process of two instructions, namely, a SELECT instruction followed by a CONTROL instruction. Thus, the PROGRAM for an exemplary DC TO TU operation may be as follows:

SELECT 20602

CTRL 30007

Simply interpreted, the operation part 2 of the SELECT instruction designates that a SELECT operation is to be performed while the ADDRESS part 0602 of the SELECT instruction designates the DATA COORDINATOR as the SELECTED input/output unit and the TAPE UNIT 2 as the SELECTED TAPE UNIT. Similarly, the operation part 3 of the CONTROL instruction designates that a CONTROL operation is to be performed, while the ADDRESS part of the CONTROL instruction designates that a RECORD or group of RECORDS is to be transferred from the DATA COORDINATOR to the SELECTED TAPE UNIT.

The DC TO TU mode of operation will now be described in a step by step manner wherein all operations within a step occur at relatively the same instant of time and with reference being made to the detailed logical block diagrams of the major components of the DATA COORDINATOR shown in Figs. 20 to 27, inclusive. Also, reference may be made to the timing diagrams of Fig. 29 to aid in understanding the sequence of the present operation.

Step 1

Initially, the DATA COORDINATOR is ready to perform an operation as previously explained in the section on the DATA COORDINATOR READY. Thus, referring to the DC RDY UNIT 840 in Fig. 26B, a positive signal is initially maintained on the DC RDY line.

Now, when the SELECT instruction is called for, the ADDRESS part is applied to the SELECT ADDRESS DECODER 602 in Fig. 25A in the form of binary coded signals. The SELECT ADDRESS DECODER 602 decodes the signals to bring up the THIS DC SELECTED line, the DC SEL & RDY line, the SEL TU2 line and the TU B SEL line in a manner as previously described in the section on SELECT ADDRESS DECODING. The DC SEL & RDY line in coming up signals the CPU that the DC is SELECTED and READY to operate.

Step 2

After the execution of the SELECT instruction, the PROGRAM steps to the CONTROL 0007 instruction which causes the CPU to go through a cycle of operation during which the CPU CTRL 0007 line is brought up. The positive shift on the CPU CTRL 0007 line, in combination with the DC SEL & RDY line being up, passes via the AND circuit 322 of the INSTRUCTION DECODER 300 in Fig. 22 to bring up the CTRL 0007 line.

Referring now to the SELECT ADDRESS DECODER 602 in Fig. 25B, the positive signal on the CTRL 0007 line passes via the OR–C circuit 619 to the AND circuit 616e where, in combination with the SEL TU2 line being up, it passes via the AND circuit 616e to turn ON the TU2 SEL trigger 620e which, in being turned ON, maintains a positive signal on the SEL TU2 line and, via the OR circuit 621h, on the TU B SEL line thereby remembering which TAPE UNIT was previously selected.

Referring now to the STATUS DECODER 400 in Fig. 23, the positive shift on the CTRL 0007 line passes via the OR circuit 424 to the AND circuit 428 where, in combination with the TU B SEL line being up via the OR circuit 426, it passes via the AND circuit 428 to the inverter 430 where it is inverted to a negative shift to turn ON the DC TO TU status trigger 432 which, in being turned ON, applies a positive signal from its right-hand output to bring up the DC TO TU line and applies a negative signal from its left-hand output to bring down the $\overline{\text{DC TO TU}}$ line.

Referring now to the DISCONNECT EX TIMER 984 in Fig. 27A, the positive shift on the DC TO TU line, in combination with the CTRL 0007 line being up, passes via the AND circuit 993 and the OR circuit 990 to the inverter 991 where it is inverted to a negative shift to turn ON the 10 microsecond CTRL/W DISC single shot 992 which, in being turned ON, applies a positive signal from its right-hand output to bring up the CTRL/W DISC line for 10 microseconds to signal the CPU to terminate the CONTROL instruction and proceed to the next instruction of the PROGRAM.

The negative shift on the $\overline{\text{DC TO TU}}$ line is applied to the AND circuit 842 in the DC RDY UNIT 840 in Fig. 26D, where, in combination with the $\overline{\text{W TM CALL}}$ and $\overline{\text{BKWD+TU TO DC}}$ lines being up, it passes via the AND circuit 842 and the OR circuit 844 to bring down the DC RDY line which remains down during this entire mode of operation. The negative signal on the DC RDY line is applied to the SELECT ADDRESS DECODER 602 in Fig. 25A where it is effective to bring down the DC SEL & RDY line, in a manner as previously described in the section on SELECT ADDRESS DECODING, to signal the CPU that the RDY line in coming down is effective to decondition INSTRUCTION DECODER 300 in Fig. 22 and the SELECT DECODER 300 is blocked from decoding a subsequent operational instruction involving the DATA COORDINATOR and the SELECT ADDRESS DECODER 602 is blocked from decoding the ADDRESS part of a subsequent SELECT instruction which selects the DATA COORDINATOR until the present mode of operation is completed.

The negative shift on the $\overline{\text{DC TO TU}}$ line is also applied to the RESET UNIT 118 in Fig. 20G, where, in combination with the $\overline{\text{DC TO CPU}}$ line being up, it passes via the AND circuit 120 to cause the peaker 122 to apply a 2-microsecond positive pulse via the RESET AC 124 line to reset all of the triggers 126 of the ADDRESS COUNTER 124 in Fig. 20F so that the ADDRESS COUNTER 124 stands with a count of 0. The triggers 126, in being reset, are effective to apply negative signals from their right-hand outputs to decondition the AND circuits 130 of the COUNTER GATE 128.

Referring now to the TAPE W STATUS UNIT 648 in Fig. 25D, the positive signal on the DC TO TU line passes via the OR circuit 639 to the AND circuit 640 where, in combination with the TU B SEL and $\overline{\text{PREP TO R B}}$ lines being up, it passes therethrough to bring up the SET W B line which condition is passed to the SELECTED TAPE UNIT 2 causing it to be set to a WRITE STATUS in preparation for the writing operation.

Step 3

As soon as the SELECTED TAPE UNIT 2 is set to the WRITE STATUS it transfers a signal back via the SEL, RDY & W B line to the AND circuit 641 of the TAPE W STATUS UNIT 648 in Fig. 25D where, in combination with the SET W B and BKWD TO FWD DEL lines being up, it passes therethrough to bring up the START W B line. The positive signal on the START W B line passes via the OR circuit 688 in the TAPE W CONTROL UNIT 720 in Fig. 25F to the AND circuit 689 where, in combination with the PREP TO R B and TU B SEL lines being up, it passes therethrough and via the OR circuit 691 to bring up the GO BUS B line which condition is passed to the SELECTED TAPE UNIT 2 to start the TAPE moving in a forward direction. The positive shift output of the OR circuit 688 also passes via the OR circuit 696 to the inverter 698 where it is inverted to a negative shift to turn ON the 10 microsecond W TGR RESET single shot 699 which, in being turned ON, applies a positive signal from its right-hand output via the OR circuit 706 to the AND circuit 710 where, in combination with the TU B SEL and PREP TO R B lines being up, it passes therethrough to bring up the RESET W TGR B (Z) line which condition is passed to the SELECTED TAPE UNIT 2 causing the WRITE triggers therein to be reset in preparation for the forthcoming WRITE operation.

If the LOAD POINT of the SELECTED TAPE is initially being sensed, then a positive signal is maintained on the SEL & AT LP line. Therefore, assuming that the LOAD POINT of the SELECTED TAPE is presently being sensed, the SEL & AT LP B line is up and in combination with the PREP TO R B line being up causes the AND circuit 693 to apply a positive signal via the OR circuit 694 to condition the AND circuit 697. Now, the positive signal on the START W B line passes via the OR circuits 688 and 696 and the now conditioned AND circuit 697 to the inverter 714 where it is inverted to a negative signal to turn ON the 40 millisecond W LP DEL single shot 715 which, in being turned ON, applies a negative signal from its left-hand output to decondition the AND circuit 717. This 40 millisecond WRITE LOAD POINT DELAY is provided to allow ample time for the LOAD POINT of the SELECTED TAPE to be moved past the R/W heads of the SELECTED TAPE UNIT.

*Step 4*

When the LOAD POINT on the SELECTED TAPE has moved past the LOAD POINT sensing device, the SEL & AT LP line is brought down which, in the present instance, causes a negative signal to be applied via the SEL & AT LP B line to decondition the AND circuit 693 causing a negative signal to be applied via the OR circuit 694 to the inverter 716 where it is inverted to a positive signal which, in combination with the START W B line being up via the OR circuits 688 and 696, conditions the AND circuit 717.

*Step 5*

After the 40 millisecond WRITE LOAD POINT DELAY the W LP DEL single shot 715 returns to its OFF state causing a positive shift to be applied from its left-hand output via the now conditioned AND circuit 717 to the inverter 718 where it is inverted to a negative shift to turn ON the 10 millisecond W DEL single shot 719 which, in being turned ON, applies a positive signal to bring up the 10 MS W DEL line for 10 milliseconds. If the LOAD POINT of the SELECTED TAPE is not initially being sensed, then there is no need for the WRITE LOAD POINT DELAY and instead only a 10 millisecond WRITE DELAY is provided to allow ample time for the TAPE of the SELECTED TAPE UNIT to get up to speed. Consequently, if the LOAD POINT of the SELECTED TAPE is not initially sensed, then, the SEL & AT LP B line is down to decondition the AND circuit 693 causing a negative signal to be passed via the OR circuit 694 to the inverter 716 where it is inverted to a positive signal. The negative signal output of the OR circuit 694 is also applied to decondition the AND circuit 697 and block the positive signal on the START W B line, via the OR circuits 688 and 696, from affecting the W LP DEL single shot 715 with the resulting effect being that the now positive output of the inverter 716 and the positive left-hand output of W LP DEL single shot 715 condition the AND circuit 717 so that the positive signal on the START W B line, via the OR circuits 688 and 696, passes via the now conditioned AND circuit 717 to the inverter 718 where it is inverted to a negative signal to turn ON the 10 millisecond W DEL single shot 719.

Referring now to the RESET EX TIMER 924, in Fig. 27B, the positive signal on the 10 MS W DEL line, in combination with the W TM CALL line being up, passes via the AND circuit 930 and the OR circuit 927 to the inverter 928 where it is inverted to a negative signal and applied via the RESET CR 208 line to the CR 208 in Fig. 21A. The negative shift on the RESET CR 208 line is applied via negative shift inputs to reset OFF all of the triggers 212 to clear the CHARACTER REGISTER 208 in preparation for receiving the first CHARACTER presently stored in the MEMORY 50.

*Step 6*

10 milliseconds later, referring to the TAPE W TYPE CYCLE UNIT 524 in Fig. 24B, the 10 MS W DEL line in coming down, in combination with the DC TO TU line being up, deconditions the AND circuit 554 causing a negative shift to be applied to turn ON the DC TO TU TC1 trigger 556 which, in being turned ON, applies a positive signal from its right-hand output to bring up the DC TO TU TC1 line. The positive shift on the DC TO TU TC1 line is applied via the OR circuit 542 in Fig. 24A to the inverter 544 where it is inverted to a negative shift to turn ON the 21 W PULSE GATE trigger 546 which, in being turned ON, applies a positive signal via its right-hand output to bring up the GATE W PULSE line. Also, referring to the CLOCK CONTROL UNIT 802 in Fig. 26D, the positive shift on the DC TO TU TC1 line is applied via the OR circuit 830 to the inverter 832 where it is inverted to a negative shift to turn ON the LONG CLOCK trigger 834 which, in being turned ON, applies a positive signal from its right-hand output via the OR circuit 826 to condition the AND circuit 828 and applies a negative signal from its left-hand tapped output to turn ON the INITIATE trigger 810 which, in being turned ON, applies a positive signal from its right-hand output via the OR circuit 812 to bring up the CLOCK GATE line to initiate a cycle of operation of the CLOCK 814 in a manner as previously described in the section on the CLOCK PULSE GENERATOR.

*Step 7*

At R0 time, referring to the CLOCK CONTROL UNIT 802 in Fig. 26D, the leading edge of the negative pulse on the R0(D1.5) line applies a negative shift to turn OFF the INITIATE trigger 810 which, in being turned OFF, is effective via the OR circuit 812 to bring down the CLOCK GATE line.

*Step 8*

At W3.5 time, referring to the CLOCK CONTROL UNIT 802 in Fig. 26D, the positive pulse on the W3.5-(D1) line passes via the now conditioned AND circuit 828 and the OR circuit 812 to bring up the CLOCK GATE line to initiate another cycle of operation of the CLOCK 814 in Fig. 26B.

At W3.5 time, referring to the 7 COUNTER 876 in Fig. 26C, the positive shift of the leading edge of the positive pulse on the W3.5(D1) line is applied to the inverter 878 where it is inverted to a negative shift to step the 7 COUNTER 876 by a count of 1. It should be noted that a RECORD or group of RECORDS are processed at a rate of 63 microseconds per CHARACTER whereas the CLOCK PULSE GENERATOR 800 has a CLOCK cycle of 9 microseconds. Consequently, it is necessary to cycle the CLOCK 814 seven times for each CHARACTER to be written on the TAPE in the SELECTED TAPE UNIT. Thus, the 7 COUNTER 876 counts each cycle of the CLOCK 814 and produces a positive output signal whenever it reaches a COUNT OF 7.

Step 9

At R0.5 time, referring to the ADDRESS REGISTER 132 in Fig. 20F, the negative shift of the trailing edge of the positive pulse on the W3.5 (D1) line passes via negative shift inputs to reset all of the triggers 136 of the ADDRESS REGISTER 132.

Step 10

Step 8 is repeated until the CLOCK 814 has performed seven cycles of operation whereupon, referring to the 7 COUNTER 876 in Fig. 26C, the triggers 880, 882 and 884 are all ON to render the AND circuit 886 effective to apply a positive signal to the COUNT OF 7 line. Referring now to the W EX TIMER 994 in Fig. 27D, the positive signal on the COUNT OF 7 line, in combination with the GATE W PULSE and $\overline{\text{W TM CALL}}$ lines being up, passes via the AND circuit 995 to condition the AND circuits 996 and 997.

Step 11

At R0 time, referring to the W EX TIMER 994 in Fig. 27D, the positive pulse on the R0(D4) line passes via the now conditioned AND circuit 996 to bring up the W PULSE line which condition is passed via the OR circuit 738 of the W TN UNIT 739 in Fig. 25G, to bring up W PULSE+W TM PULSE line.

Step 12

At R4 time, referring to the W EX TIMER 994, in Fig. 27D, the negative shift of the trailing edge of the positive pulse on the R0(D4) line deconditions the AND circuit 996 to bring down the W PULSE line which in turn, is effective to bring down the W PULSE+W TM PULSE line in Fig. 25G, to signal the SELECTED TAPE UNIT 2. Normally, this signal would cause a CHARACTER on the TAPE W BUS to be written on the TAPE of the SELECTED TAPE UNIT. However, since the CHARACTER REGISTER 208 was previously cleared nothing is presently on the TAPE W BUS and nothing is written on the TAPE in the SELECTED TAPE UNIT 2.

Step 13

At W2 time, referring to the W EX TIMER 994 in Fig. 27D, the positive pulse on the W2(D1.5) line passes via the now conditioned AND circuit 997 to bring up the INITIATE W SERVICE line and, via the OR circuit 998, the CR 208 NOT RESET GATE TO REC CK line. Normally, the signal on the latter line is applied to the AND circuit 275 of the ERROR CHECK UNIT 268 in Fig. 21F to check whether the CHARACTER REGISTER 208 has been reset by the ECHO of the CHARACTER previously written on the SELECTED TAPE as will be explained in greater detail hereinafter. However, since nothing was previously written on the SELECTED TAPE this signal has no effect at the present time.

Step 14

At W3 time, referring to the PRIORITY R/W SERVICE UNIT 578 in Fig. 24C, the positive pulse on the W3(D1.5) line, in combination with the $\overline{\text{CTRL 8}}$ line being up, passes via the AND circuit 583 and the OR circuit 584 and in combination with the $\overline{\text{RCLB}}$ line being up and the R SERVICE trigger 579 being OFF conditions the AND circuit 582.

Step 15

At W3.5 time, referring to the CLOCK CONTROL UNIT 802 in Fig. 26D and the 7 COUNTER 876 in Fig. 26C, Step 8 is repeated to bring up the CLOCK GATE line to initiate another cycle of operation of the CLOCK 814 in Fig. 26B and to advance the count of the 7 COUNTER 876 to effectively bring down the COUNT OF 7 line.

At W3.5 time, referring to the PRIORITY R/W SERVICE UNIT 578 in Fig. 24C, the negative shift of the trailing edge of the positive pulse on the INITIATE W SERVICE line passes via a negative shift input to turn ON the W SERVICE trigger 580 which, in being turned ON, applies a positive signal from its right-hand output via the now conditioned AND circuit 582 to bring up the W SERVICE CALL line which condition is passed to the TAPE R/W CYCLE UNIT 588. The positive signal on the W SERVICE CALL line is applied to turn ON the WCLA trigger 594 which, in being turned ON, applies a negative signal from its left-hand output to bring down the $\overline{\text{WCLA}}$ line and applies a positive signal from its right-hand output to bring up the WCLA line and, via the OR circuit 595 to bring up the WCL line. The positive signal on the WCL line is applied to the MEMORY EX TIMER 902 in Fig. 27A, where, in combination with the DC TO TU TC1 line being up, it passes via the AND circuit 905 and the OR circuit 906 to bring up the MEM R line and, via the OR circuit 904, to bring up the MEM R/W line.

Step 16

At R0 time, referring to the CTR & REG EX TIMER 942 in Fig. 27B, the positive pulse on the R0(D4) line, in combination with the MEM R line being up and the WCLA line being up via the OR circuit 944, passes via the AND circuit 945 to bring up the AC 124 TO AR line which condition is passed to the AND circuits 130 of the COUNTER GATE 128 in Fig. 20F. The positive signal on the AC 124 TO AR line passes via those AND circuits 130 of the COUNTER GATE 128 which are conditioned in accordance with the count setting of the ADDRESS COUNTER 124 and via corresponding ones of the OR circuits 134 of the ADDRESS REGISTER 132 to turn ON corresponding ones of the triggers 136. In the present instance, the AND circuits 130 being deconditioned, due to the 0 setting of the ADDRESS COUNTER 124, block the positive pulse on the AC 124 TO AR line from having any effect on the ADDRESS REGISTER 132 with the result being that the ADDRESS REGISTER 132 remains set at a value which is the ADDRESS (0000) of the STORAGE REGISTER in the MEMORY 50 where the first CHARACTER is stored.

At R0 time, referring to the MEMORY EX TIMER 902 in Fig. 27A, the positive pulse on the R0 (D4) line, in combination with the MEM R/W line being up and the WCLA line being up via the OR circuit 908, passes via the AND circuit 909, to bring up the R BIAS GATE line which condition is passed to the X SC BIAS & W DRIVERS 172 and 184 in Figs. 20B and 20D, respectively, which are conditioned in accordance with the ADDRESS REGISTER 132 to apply negative current pulses to bias OFF all but the SELECTED ROWS (ROWS X0) of the X and Y SWITCH CORE MATRICES 156 and 150 in a manner as previously described in the section on the MEMORY CONTROL UNIT.

Step 17

At R0.5 time, referring to the RESET EX TIMER 924 in Fig. 27B, the positive pulse on the R0.5 (D1.5) line, in combination with the WCLA line being up and the DC TO TU TC1 line being up via the OR circuit 925, passes via the AND circuit 926 and the OR circuit 927 to the inverter 928 where it is inverted to a negative signal to bring down the RESET CR 208 line. Normally, referring to the CHARACTER REGISTER 208 in Fig. 21A, the negative shift on the RESET CR 208 line passes via negative shift inputs to reset OFF all of the triggers 212 of the CR 208. However, since the CHARACTER REGISTER 208 was previously cleared, in a manner as explained in Step 5, the negative shift on the RESET CR 208 line has no effect at the present time. At the same time, referring to the PRIOITY R/W SERVICE UNIT 578 in Fig. 24C, the negative shift of the trailing edge of the positive pulse on the W3(D1.5) line is effective to decondition and AND circuit 582 to bring down the W SERVICE CALL line.

Step 18

At R1 time, referring to the PRIORITY R/W SERVICE UNIT 578 in Fig. 24B, the positive pulse on the R1 (D1.5) line, in combination with the WCLA line being up, passes via the AND circuit 586 to turn OFF the W SERVICE trigger 580.

Step 19

At R1.5 time, referring to the MEMORY EX TIMER 902 in Fig. 27A, the positive pulse on the R1.5(D2.5) line, in combination with the MEM R/W line being up, passes via the AND circuit 910 to bring up the R GATE line, which condition is passed to the Y SC DECODERS 138 and 143 in Figs. 20A and 20E, respectively, which are conditioned in accordance with the ADDRESS setting (0000) of the ADDRESS REGISTER 132, to render the Y SC R DRIVERS 146 and 152 effective to drive the SELECTED COLUMNS (COLUMNS Y0) of the X and Y SWITCH CORE MATRICES 156 and 150. Since only one core in each of the SELECTED COLUMNS is in the unbiased state only these cores switch from the reset to the set position and induce current in their secondaries which cause negative half select current pulses to be applied to the SELECTED X and Y wires (XX0 and YY0) of the MEMORY 50 to effectively cause the first CHARACTER stored in the SELECTED STORAGE REGISTER of the MEMORY 50 to be read out and applied to the sense wires SW in a manner as previously described in the section on the MEMORY OPERATION. Those MEMORY CORES of the SELECTED STORAGE REGISTER which have a 1 bit stored therein induce voltage pulses in their sense windings SW which are amplified by corresponding ones of the SENSE AMPLIFIERS 206 in Fig. 21A to condition corresponding ones of the diode gates 207.

Step 20

At R2 time, referring to the TAPE R/W CYCLE UNIT 588 in Fig. 24C, the positive pulse on the R2(D1.5) line, in combination with the WCLA line being up, passes via the AND circuit 596 to turn ON the WCLB trigger 599 which, in being turned ON, applies a negative signal from its left-hand output to bring down the $\overline{\text{WCLB}}$ line and applies a positive signal from its right-hand output to bring up the WCLB line and, via the OR circuit 595, to maintain the WCL line up.

Step 21

At R3.5 time, referring to the SENSE AMPLIFIER UNIT 202 in Fig. 21A, the positive shift of the leading edge of the positive pulse on the R3.5(D1.5) line, in combination with the MEM R line being up, passes via the AND circuit 203 to the inverter 204 where it is inverted to a negative shift causing the peaker 205 to apply a 2 microsecond positive pulse via the MEM TO CR 208 line to the diode gates 207. Those of the diode gates 207 conditioned by the positive output of those of the SENSE AMPLIFIERS 206 corresponding to 1 bits of the first CHARACTER pass the positive pulse on the MEM TO CR 208 line via corresponding ones of the OR circuits 211 to turn ON corresponding ones of the triggers 212 of the CR 208 thereby effectively storing the first CHARACTER in the CHARACTER REGISTER 208.

The signals from the left-hand outputs of the triggers 212 are applied to the CHAR CODE CK UNIT 232 in Fig. 21D, in accordance with the first CHARACTER stored in the CR 208, where a vertical check is made to insure that there are an even number of 1 bits in the first CHARACTER, in a manner as previously described in the section on CODE CHECKING. If the CHARACTER has an odd number of 1 bits, then, this condition is detected by the CHAR CODE CK unit 232 to bring up the CHAR CODE CK A line which, in coming up, in combination with the DC TO TU line being up, conditions the AND circuit 276 of the ERROR CHECK UNIT 268 in Fig. 21F. At the same time, referring to the CR 208 and the INPUT SWITCH 222 in Figs. 21A and 21C, respectively, those of the triggers 212 of the CR 208 which were not previously turned ON and which correspond to a 0 bit of the first CHARACTER apply positive signals from their left-hand outputs which, in combination with the MEM R line being up, pass via corresponding ones of the AND circuits 224 and corresponding ones of the OR circuits 225 to condition corresponding ones of the AND circuits 227 of the INHIBIT DRIVER 226.

Step 22

At R4 time, referring to the TAPE R/W CYCLE UNIT 588 in Fig. 24C, the positive pulse on the R4(D1.5) line in combination with the WCLB line being up, passes via the AND circuit 598 to turn OFF the WCLA trigger 594 which, in being turned OFF, applies a positive signal from its left-hand output to bring up the $\overline{\text{WCLA}}$ line and applies a negative signal from its right-hand output to bring down the WCLA line.

At R4 time, referring to the CTR & REG EX TIMER 942 in Fig. 27B, the positive pulse on the R4(D1.5) line, in combination with the MEM R line being up, passes via the AND circuit 943 to bring up the STEP AC 124 line which condition is passed to the ADDRESS COUNTER 124 in Fig. 20F.

Step 23

At R4.5 time, referring to the MEMORY EX TIMER 902 in Fig. 27A, the positive pulse on the R4.5(D4.5) line, in combination with the MEM R/W, $\overline{\text{RCLA}}$ and $\overline{\text{WCLA}}$ lines being up, passes via the AND circuit 911 to bring up the INHIBIT GATE line which condition is passed to the AND circuits 227 of the INHIBIT DRIVER 226 in Fig. 21C. Those of the AND circuits 227 which are conditioned by a positive signal, corresponding to a 0 bit of the first CHARACTER presently stored in the CR 208, pass the positive pulse on the INHIBIT GATE line via corresponding ones of the OR circuits 228 and the AND circuits 229 to corresponding ones of the INHIBIT DRIVERS 230 which apply negative INHIBIT current pulses to the Z wires of the corresponding ones of the bit planes of the MEMORY 50 to INHIBIT these bit planes in a manner as previously described in the section on INHIBIT DRIVING.

At the same time, the positive pulse on the R4.5-(D4.5) line, in combination with the MEM R/W, $\overline{\text{RCLA}}$ and $\overline{\text{WCLA}}$ lines being up, passes via the AND circuit 912 to bring up the W GATE line which condition is passed to the X SC DECODERS 158 and 164 in Fig. 20C, which are conditioned in accordance with the ADDRESS setting (0000) of the ADDRESS REGISTER 132, to render the X SC BIAS & W DRIVERS 172 and 184, in Figs. 20B and 20D, respectively, effective to drive the SELECTED ROWS (ROWS X0) of the X and Y SWITCH CORE MATRICES 156 and 150. Since only one core in each of the SELECTED ROWS is in the set position, only these cores switch from the set to the reset position and induce current in their secondaries which cause positive half select current pulses to be applied to the SELECTED X and Y wires (XX0 and YY0) of the MEMORY 50. These positive half select current pulses are applied to the SELECTED X and Y wires of the MEMORY 50 during the same interval of time that the INHIBIT current pulses are being applied to the Z wires in MEMORY 50 which correspond to the 0 bits of the first CHARACTER. Consequently, those MEMORY CORES of the SELECTED STORAGE REGISTER in the MEMORY 50 which are not INHIBITED are switched to the 1 state thereby effectively storing a 1 bit whereas those MEMORY CORES of the SELECTED STORAGE REGISTER which are INHIBITED remain in the 0 state thereby effectively storing a 0 bit with the resulting effect being that the first CHARACTER is re-written in the SELECTED STORAGE REGISTER of the MEMORY 50.

Step 24

At W0.5 time, referring to the ADDRESS COUNTER 124 in Fig. 20F, the negative shift of the trailing edge of the positive pulse on the STEP AC 124 line is effective to step the ADDRESS COUNTER 124. Thus, in the present instance, the negative shift is effective to turn ON the first trigger 126a and thereby step the ADDRESS COUNTER 124 to a count of 1. The trigger 126a in being turned ON applies a positive signal from its right-hand output to condition the AND circuit 130a of the COUNTER GATE 128 while the triggers 126b to 126j, inclusive, remain OFF and maintain negative signals from their right-hand outputs to decondition the corresponding AND circuits 130b to 130j, respectively, of the COUNTER GATE 128.

Step 25

At W3 time, referring to the DATA TFR & CK EX TIMER 949 in Fig. 27C, the positive pulse on the W3(D1.5) line, in combination with the WCLB and DC TO TU TC1 line being up, passes via the AND circuit 951 to bring up the CHAR CODE CK A TO REC CK line which condition is passed to the AND circuit 276 in the ERROR CHECK UNIT 268 in Fig. 21F. If the AND cricuit 276 is conditioned by the CHAR CODE CK A line being up, due to the existence of an odd number of 1 bits in the first CHARACTER, the positive pulse passes via the AND circuit 276 and the OR circuit 278 to turn ON the REC CK trigger 280 which, in being turned ON, applies a positive signal from its right-hand output which, in combination with the THIS DC SELECTED line being up, passes via the AND circuit 282 to bring up the REC CK line.

At W3 time, referring to the TAPE W TYPE CYCLE UNIT 524 in Fig. 24A, the positive pulse on the W3(D1.5) line, in combination with the WCLB line being up, passes via the AND circuit 532 to turn ON the COND W ECHO trigger 538 which, in being turned ON, applies a positive signal from its right-hand output to bring up the COND W ECHO line.

Step 26

At W3.5 time, referring to the MEMORY EX TIMER 902 in Fig. 27A, the positive pulse on the W3.5(D1) line, in combination with the MEM R/W, $\overline{\text{RCLA}}$ and $\overline{\text{WCLA}}$ lines being up, passes via the AND circuit 913 to bring up the PWD GATE line which condition is passed via the OR circuits 228 of the INHIBIT DRIVER 226 in Fig. 21C and the AND circuits 229 to the INHIBIT DRIVERS 230 which apply post write disturbance current pulses to all of the Z wires of the MEMORY 50 to disturb all of the MEMORY CORES in the SELECTED STORAGE REGISTER to minimize subsequent noise pulses in a manner as previously described in the section on POST WRITE DISTURBANCE.

At W3.5 time, referring to the CLOCK CONTROL UNIT 802 in Fig. 26D and the 7 COUNTER 876 in Fig. 26C, Step 8 is repeated to effectively bring up the CLOCK GATE line to initiate another cycle of operation of the CLOCK 814 and to advance the count of the 7 COUNTER 876.

Also, at W3.5 time, the positive pulse on the W3.5(D1) line is applied to the ADDRESS REGISTER 132 in Fig. 20F.

Step 27

At R0 time, referring to the TAPE R/W CYCLE UNIT 588 in Fig. 24C, the negative shift of the trailing edge of the positive pulse on the W2.5(D1.5) line is applied to turn OFF the WCLB trigger 597 which, in being turned OFF, applies a positive signal from its left-hand output to bring up the $\overline{\text{WCLB}}$ line and applies a negative signal from its right-hand output to bring down the WCLB line and, via the OR circuit 595, to bring down the WCL line. The negative signal on the WCL line is applied to decondition the AND circuit 905 in the MEMORY EX TIMER 902 in Fig. 27A, causing a negative signal to be applied via the OR circuit 906 to bring down the MEM R line and, via the OR circuit 904, to bring down the MEM R/W line.

Step 28

At R0.5 time, referring to the ADDRESS REGISTER 132 in Fig. 20F, the negative shift of the trailing edge of the positive pulse on the W3.5(D1) line is applied via negative shift inputs to reset all of the triggers 136 to effectively clear the ADDRESS REGISTER 132 in preparation for receiving the next ADDRESS.

Step 29

Step 8 is repeated until the 7 COUNTER 876 in Fig. 26C counts another seven cycles of operation of the CLOCK 814 whereupon a positive signal is applied to the COUNT OF 7 line.

Referring now to the TAPE W CONTROL UNIT 720 in Fig. 25F, the positive signal on the COUNT OF 7 line, in combination with the COND W ECHO line being up, passes via the AND circuit 706 and the OR circuit 707 to bring up the GATE W ECHO TO GR 208 which condition is passed to the CR 208 in Fig. 21A. The positive signal on the GATE W ECHO TO CR 208 line is applied to condition the AND circuits 210 of the CR 208 in preparation for receiving the first CHARACTER to be echoed back on the TAPE W ECHO BUS.

Referring now to the W EX TIMER 994 in Fig. 27D, the positive signal on the COUNT OF 7 line, in combination with the GATE W PULSE and $\overline{\text{W TM CALL}}$ lines being up, passes via the AND circuit 995 to condition the AND circuits 996 and 997.

Step 30

At R0 time, referring to the W EX TIMER 994 in Fig. 27D, the positive pulse on the R0(D4) line passes via the now conditioned AND circuit 996 to bring up the W PULSE line which condition is passed via the OR circuit 738 of the W TM UNIT 739 in Fig. 25G, to bring up the W PULSE+W TM PULSE line.

Step 31

The combination of signals from the right-hand outputs of the triggers 212 of the CHARACTER REGISTER 208, corresponding to the CHARACTER presently stored in the CHARACTER REGISTER 208, are applied to the TAPE W BUS in preparation for writing this CHARACTER on the TAPE of the SELECTED TAPE UNIT.

At R4 time, referring to the W EX TIMER 994 in Fig. 27D, the negative shift of the trailing edge of the positive pulses on the R0(D4) line deconditions the AND circuit 996 to bring down the W PULSE line which, in turn, is effective to bring down the W PULSE+W TM PULSE line in Fig. 25G, to signal the SELECTED TAPE UNIT 2 to write the CHARACTER presently on the TAPE W BUS on the TAPE. At the same time that the CHARACTER is being written on the SELECTED TAPE, a combination of signals corresponding to this CHARACTER is echoed back via the TAPE W ECHO BUS to the CHARACTER REGISTER 208 in Fig. 21A so that positive signals, corresponding to the 1 bits of the CHARACTER, pass via corresponding ones of the now conditioned AND circuits 210 to turn OFF corresponding ones of the triggers 212 which were previously turned ON when the CHARACTER was stored in the CR 208. Consequently, the CHARACTER REGISTER 208 is reset only if the CHARACTER that is written on the SELECTED TAPE corresponds to the CHARACTER that is stored in the CHARACTER REGISTER 208.

Referring now to the CR 208 NOT RESET & GM RECOGNITION UNIT 234 in Fig. 21D, the right-hand outputs of the triggers 212 of the CHARACTER REGISTER 208 are applied to the OR–C circuit 236 where a check is made to insure that the CHARACTER REGISTER 208 is reset. If the CHARACTER that is stored in the CR 208 does not correspond to the CHARACTER that is written on the SELECTED TAPE, then, the CR 208 is not reset and one or more of the triggers 212 apply a positive signal from their right-hand output and via the OR–C circuit 236 to bring up the CR 208 NOT RESET line which, in coming up, in combination with the $\overline{\text{CTRL 8}}$ line being up, conditions the AND circuit 275 in the ERROR CHECK UNIT 268 in Fig. 21F.

Step 32

At W2 time, referring to the W EX TIMER 994 in Fig. 27B, the positive pulse on the W2(D1.5) line passes via the now conditioned AND circuit 997 to bring up the INITIATE W SERVICE line and, via the OR circuit 998 to bring up the CR 208 NOT RESET GATE TO REC CK line which condition is passed to the AND circuit 275 of the ERROR CHECK UNIT 268 in Fig. 21F. If the AND circuit 275 is conditioned by the CR 208 NOT RESET line being up, due to a discrepancy between the CHARACTER stored in the CR 208 and the CHARACTER written on the SELECTED TAPE, the positive pulse passes via the AND circuit 275 and the OR circuit 278 to turn ON the REC CK trigger 280 which, in being turned ON, applies a positive signal from its right-hand output which, in combination with the THIS DC SELECTED line being up, passes via the AND circuit 282 to bring up the REC CK line.

It should be noted that any time the REC CK trigger 280 is turned ON during this mode of operation, it will remain ON until after the next READ or WRITE instruction involving the DATA COORDINATOR is completed whereupon the signal on the END R/W line is effective to turn OFF the REC CK trigger 280 which, in being turned OFF, effectively brings down the REC CK line to signal the CENTRAL PROCESSING UNIT that an error occurred in the previous data transfer between the DATA COORDINATOR and a TAPE UNIT associated therewith.

Step 33

At W3 time, referring to the PRIORITY R/W SERVICE UNIT 578 in Fig. 24C, the positive pulse on the W3(D1.5) line, in combination with the $\overline{\text{CTRL 8}}$ line being up, passes via the AND circuit 583 and the OR circuit 584 and in combination with the $\overline{\text{RCLB}}$ line being up and the R SERVICE trigger 579 being OFF conditions the AND circuit 582.

Step 34

At W3.5 time, referring to the CLOCK CONTROL UNIT 802 IN Fig. 26D and the 7 COUNTER 876 in Fig. 26C, Step 8 is repeated to bring up the CLOCK GATE line to initiate another cycle of operation of the CLOCK 814 and to advance the count of the 7 COUNTER 876 to effectively bring down the COUNT OF 7 line. Referring now to TAPE W CONTROL UNIT 720 in Fig. 25F, the COUNT OF 7 line in coming down, deconditions the AND circuit 705 causing a negative signal to be applied via the OR circuit 707 to bring down the GATE W ECHO TO CR 208 line.

At W3.5 time, referring to the PRIORITY R/W SERVICE UNIT 578 in Fig. 24C, the negative shift of the trailing edge of the positive pulse on the INITIATE W SERVICE line passes via a negative shift input to turn ON the W SERVICE trigger 580 which, in being turned ON, applies a positive signal from its right-hand output via the now conditioned AND circuit 582 to bring up the W SERVICE CALL line which condition is passed to the TAPE R/W CYCLE UNIT 588. The positive signal on the W SERVICE CALL line is applied to turn ON the WCLA trigger 594 which, in being turned ON, applies a negative signal from its left-hand output to bring down the $\overline{\text{WCLA}}$ line and applies a positive signal from its right-hand output to bring up the WCLA line and, via the OR circuit 595 to bring up the WCL line. The positive signal on the WCL line is applied to the MEMORY EX TIMER 902 in Fig. 27A where, in combination with the DC TO TU TC1 line being up, it passes via the AND circuit 905 and the OR circuit 906 to bring up the MEM R line and, via the OR circuit 904, to bring up the MEM R/W line.

Step 35

At R0 time, referring to the CTR & REG EX TIMER 942 in Fig. 27B, the positive pulse on the R0 (D4) line, in combination with the MEM R line being up and the WCLA line being up via the OR circuit 944, passes via the AND circuit 945 to bring up the AC 124 TO AR line which condition is passed to the AND circuit 130 of the COUNTER GATE 128 in Fig. 20F. The positive signal on the AC 124 TO AR line passes via those AND circuits 130 of the COUNTER GATE 128 which are conditioned in accordance with the setting of the ADDRESS COUNTER 124 and via corresponding ones of the OR circuits 134 of the ADDRESS REGISTER 132 to turn ON corresponding ones of the triggers 136. Thus, in the present instance, since only the AND circuit 130a is conditioned, the positive signal on the AC 124 TO AR line passes therethrough and via the corresponding OR circuit 134a to turn ON the corresponding trigger 136a of the ADDRESS REGISTER 132 in Fig. 20F.

At R0 time, referring to the MEMORY EX TIMER 902 in Fig. 27A, the positive pulse on the R0(D4) line, in combination with the MEM R/W line being up and the WCLA line being up via the OR circuit 908, passes via the AND circuit 909 to bring up the R BIAS GATE line, which condition is passed to the X SC BIAS & W DRIVERS 172 and 184 in Figs. 20B and 20D, respectively.

Step 36

At R0.5 time, referring to the RESET EX TIMER 924 in Fig. 27B, the positive pulse on the R0.5(D1.5) line, in combination with the WCLA line being up and the DC TO TU TC1 line being up via the OR circuit 925, passes via the AND circuit 926 and the OR circuit 927 to the inverter 928 where it is inverted to a negative signal to bring down the RESET CR 208 line which condition is passed to the CR 208 in Fig. 21A. The negative shift on the RESET CR 208 line passes via negative shift inputs to reset OFF all of the triggers 212 of the CR 208 to effectively clear the CHARACTER REGISTER 208 in preparation for receiving the next CHARACTER stored in the next SELECTED STORAGE REGISTER of the MEMORY 50.

At R0.5 time, referring to the PRIORITY R/W SERVICE UNIT 578 in Fig. 24C, the negative shift of the trailing edge of the positive pulse on the W3(D1.5) line is effective to decondition the AND circuit 582 to bring down the W SERVICE CALL line.

At R0.5 time, referring to the ADDRESS REGISTER 132 in Fig. 20F, the negative shift of the trailing edge of the positive pulse on the W3.5(D1) line is applied via negative shift inputs to reset OFF all of the triggers 136 of the ADDRESS REGISTER 132. However, the AC 124 TO AR line is maintained up during the period of the negative shift and is of sufficient duration as to maintain ON any of the triggers 136, to which it is effectively applied, despite the application of the negative shift. Consequently, in the present instance, the trigger 136a is maintained ON so that the ADDRESS REGISTER 132 is set to a value corresponding to the count setting of the ADDRESS COUNTER 124 which is the ADDRESS (0001) of the STORAGE REGISTER in the MEMORY 50 where the next CHARACTER is presently stored.

Now, the X SC BIAS & W DRIVERS 172 and 184 in Figs. 20B and 20D, respectively, being conditioned in accordance with the ADDRESS REGISTER 132 respond to the positive pulse on the R BIAS GATE line and apply negative current pulses to bias OFF all but the SELECTED ROWS (ROWS X0) of the X and Y SWITCH CORE MATRICES 156 and 150.

*Step 37*

At R1 time, referring to the PRIORITY R/W SERVICE UNIT 578 in Fig. 24B, the positive pulse on the R1(D1.5) line, in combination with the WCLA line being up, passes via the AND circuit 586 to turn OFF the W SERVICE trigger 580.

*Step 38*

At R1.5 time, referring to the MEMORY EX TIMER 902 in Fig. 27A, a positive pulse on the R1.5(D2.5) line, in combination with the MEM R/W line being up, passes via the AND circuit 910 to bring up the R GATE line which condition is passed to the Y SC DECODERS 138 and 143 in Figs. 20A and 20E, respectively, which are conditioned in accordance with the ADDRESS setting (0001) of the ADDRESS REGISTER 132, to render the Y SC R DRIVERS 146 and 152 effective to drive the SELECTED COLUMNS (COLUMNS Y0 and Y1) of the X and Y SWITCH CORE MATRICES 156 and 150. Since only one core in each of the SELECTED COLUMNS is in the unbiased state only these cores switch from the reset to the set position and induce current in their secondaries which cause negative half select current pulses to be applied to the SELECTED X and Y wires (XX0 and YY1) of the MEMORY 50 to effectively cause the next CHARACTER stored in the SELECTED STORage REGISTER of the MEMORY 50 to be read out and applied to the sense wires SW. Those MEMORY CORES of the SELECTED STORAGE REGISTER which have a 1 bit stored therein induce voltage pulses in their sense windings SW which are amplified by corresponding ones of the SENSE AMPLIFIERS 206 in Fig. 21B to condition corresponding ones of the diode gates 207.

*Step 39*

At R2 time, referring to the TAPE R/W CYCLE UNIT 588 in Fig. 24C, the positive pulse on the R2(D1.5) line, in combination with the WCLA line being up, passes via the AND circuit 596 to turn ON the WCLB trigger 599 which, in being turned ON, applies a negative signal from its left-hand output to bring down the $\overline{\text{WCLB}}$ line and applies a positive signal from its right-hand output to bring up the WCLB line and, via the OR circuit 595, to maintain the WCL line up.

*Step 40*

At R3.5 time, referring to the SENSE AMPLIFIER UNIT 202 in Fig. 21A, the positive shift of the leading edge of the positive pulse on the R3.5(D1.5) line, in combination with the MEM R line being up, passes via the AND circuit 203 to the inverter 204 where it is inverted to a negative shift causing the peaker 205 to apply a 2 microsecond positive pulse via the MEM TO CR 208 line to the diode gates 207. Those of the diode gates 207 conditioned by the positive output of those of the SENSE AMPLIFIERS 206 corresponding to a 1 bit of the previously read out CHARACTER, passes the positive pulse on the MEM TO CR 208 line via corresponding ones of the OR circuit 211 to turn ON corresponding ones of the triggers 212 of the CR 208 thereby effectively storing the next CHARACTER in the CHARACTER REGISTER 208.

The signals from the left-hand outputs of the triggers 212 are applied to the CHAR CODE CK UNIT 232 in Fig. 21D, in accordance with the CHARACTER stored in the CR 208, where a vertical check is made to insure that there are an even number of 1 bits in the CHARACTER. If the CHARACTER has an odd number of 1 bits, then, this condition is detected by the CHAR CODE CK UNIT 232 to bring up the CHAR CODE CK A line which, in coming up, in combination with the DC TO TU line being up, conditions the AND circuit 276 of the ERROR CHECK UNIT 268 in Fig. 21F. At the same time, referring to the CR 208 and the INPUT SWITCH 222 in Figs. 21A and 21B, respectively, those of the triggers 212 of the CR 208 which were not previously turned ON and which correspond to a 0 bit of the CHARACTER apply positive signals from their left-hand outputs which, in combination with the MEM R line being up, pass via corresponding ones of the AND circuit 224 and corresponding ones of the OR circuits 225 to condition corresponding ones of the AND circuits 227 of the INHIBIT DRIVER 226.

*Step 41*

At R4 time, referring to the TAPE R/W CYCLE UNIT 588 in Fig. 24C, the positive pulse on the R4-(D1.5) line in combination with the WCLB line being up, passes via the AND circuit 598 to turn OFF the WCLA trigger 594 which, in being turned OFF, applies a positive signal from its left-hand output to bring up the $\overline{\text{WCLA}}$ line and applies a negative signal from its right-hand output to bring down the WCLA line.

At R4 time, referring to the CTR & REG EX TIMER 942 in Fig. 27B, the positive pulse on the R4(D1.5) line, in combination with the MEM R line being up, passes via the AND circuit 943 to bring up the STEP AC 124 line which condition is passed to the ADDRESS COUNTER 124 in Fig. 20F.

*Step 42*

At R4.5 time, referring to the MEMORY EX TIMER 902 in Fig. 27A, the positive pulse on the R4.5(D4.5) line, in combination with the MEM R/W, $\overline{\text{RCLA}}$ and $\overline{\text{WCLA}}$ lines being up, passes via the AND circuit 911 to bring up the INHIBIT GATE line which condition is passed to the AND circuits 227 of the INHIBIT DRIVER 226 in Fig. 21C. Those of the AND circuits 227 which are conditioned by a positive signal, corresponding to an 0 bit of the CHARACTER presently stored in the CR 208, pass the positive pulse on the INHIBIT GATE line via corresponding ones of the OR circuits 228 and the AND circuits 229 to corresponding ones of the INHIBIT DRIVERS 230 which apply negative INHIBIT current pulses to the Z wires of the corresponding ones of the bit planes of the MEMORY 50 to inhibit these bit planes.

At R4.5 time, referring to the MEMORY EX TIMER 902 in Fig. 27A, the positive pulse on the R4.5(D4.5) line, in combination with the MEM R/W, $\overline{\text{RCLA}}$ and $\overline{\text{WCLA}}$ lines being up, passes via the AND circuit 912 to bring up the W GATE line which condition is passed to the X SC DECODERS 158 and 164 in Fig. 20C, which are conditioned in accordance with the ADDRESS setting (0001) of the ADDRESS REGISTER 132 to render the X SC BIAS & W DRIVERS 172 and 184 in Figs. 20B and 20D, respectively, effective to drive the SELECTED ROWS (ROWS X0) of the X and Y SWITCH CORE MATRICES 156 and 150. Since only one core in each of the SELECTED ROWS is in the set position, only these cores switch from the set to the reset position and induce current in their secondaries which cause positive half select current pulses to be applied to the SELECTED X and Y wires (XX0 and YY1) of the MEMORY 50. These positive half select current pulses are applied to the SELECTED X and Y wires of the MEMORY 50 during the same interval of time that the INHIBIT current pulses are being applied to the Z wires in the MEMORY 50 which correspond to the 0 bits of the CHARACTER. Consequently, those MEMORY CORES of the SELECTED STORAGE REGISTER in the MEMORY 50 which are not INHIBITED are switched to the one state thereby effectively storing a 1 bit whereas those MEMORY CORES of the SELECTED STORAGE REGISTER which are INHIBITED remain in the 0 state thereby effectively storing a 0 bit with the resulting effect being that the next CHARACTER is rewritten in the SELECTED STORAGE REGISTER of the MEMORY 50.

*Step 43*

At W0.5 time, referring to the ADDRESS COUNTER 124 in Fig. 20F, the negative shift of the trailing edge of the positive pulse on the STEP AC 124 line is effective to step the ADDRESS COUNTER 124. Hence, in the present instance, the first trigger 126a is turned OFF causing a negative shift to be applied from its right-hand output to turn ON the second trigger 126b and thereby step the ADDRESS COUNTER 124 to a count of 2. The trigger 126b in being turned ON applies a positive signal to condition the AND circuit 130b of the COUNTER GATE 128 while the triggers 126a and 126b to 126j, inclusive, remain OFF and maintain negative signals to decondition the corresponding AND circuits 130a and 130c to 130j, respectively, of the COUNTER GATE 128.

*Step 44*

At W3 time, referring to the DATA TFR & CK EX TIMER 949 in Fig. 27C, the positive pulse on the W3-(D1.5) line, in combination with the WCLB and DC TO TU TC1 lines being up, passes via the AND circuit 951 to bring up the CHAR CODE CK A TO REC CK line which condition is passed to the AND circuit 276 of the ERROR CHECK UNIT 268 in Fig. 21F. If the AND circuit 276 is conditioned by the CHAR CODE CK A line being up, due to the existence of an odd number of 1 bits in the CHARACTER presently stored in the CR 208, the positive pulse passes via the AND circuit 276 and the OR circuit 278 to turn ON the REC CK trigger 280 which, in being turned ON, applies a positive signal from its right-hand output which, in combination with the THIS DC SELECTED line being up, passes via the AND circuit 282 to bring up the REC CK line.

*Step 45*

At W3.5 time, referring to the CLOCK CONTROL UNIT 802 in Fig. 26D and the 7 COUNTER 876 in Fig. 26C, Step 8 is repeated to effectively bring up the CLOCK GATE line to initiate another cycle of operation of the CLOCK 814 and to advance the count of the 7 COUNTER 876.

At W3.5 time, referring to the MEMORY EX TIMER 902 in Fig. 27A, the positive pulse on the W3.5(D1) line, in combination with the MEM R/W RCLA and WCLA lines being up, passes via the AND circuit 913 to bring up the PWD GATE line which condition is passed via the OR circuits 228 of the INHIBIT DRIVER 226 in Fig. 21C and the AND circuits 229 to the INHIBIT DRIVERS 230 which apply post write disturbance current pulses to all of the Z wires of the MEMORY 50 to disturb all of the MEMORY CORES in the SELECTED STORAGE REGISTER to minimize subsequent noise pulses. At the same time, a positive pulse on the W3.5(D1) line as applied to the ADDRESS REGISTER 132 in Fig. 20F.

*Step 46*

At R0 time, referring to the TAPE R/W CYCLE UNIT 588 in Fig. 24C, the negative shift of the trailing edge of the positive pulse on the W2.5(D1.5) line is applied to turn OFF the WCLB trigger 597 which, in being turned OFF, applies a positive signal from its left-hand output to bring up the $\overline{WCLB}$ line and applies a negative signal from its right-hand output to bring down the WCLB line and, via the OR circuit 595, to bring down the WCL line. The negative signal on the WCL line is applied to decondition the AND circuit 905 in the MEMORY EX TIMER 902 in Fig. 27A causing a negative signal to be applied via the OR circuit 906 to bring down the MEM R line and via the OR circuit 904 to bring down the MEM R/W line.

*Step 47*

At R0.5 time, referring to the ADDRESS REGISTER 132 in Fig. 20F, the negative shift of the trailing edge of the positive pulse on the W3.5(D1) line is applied to reset OFF all of the triggers 136 to effectively clear the ADDRESS REGISTER 132 in preparation for receiving the next ADDRESS.

*Step 48*

Step 8 keeps repeating causing the CLOCK 814 in Fig. 26B to keep cycling until the 7 COUNTER 876 in Fig. 26C counts another seven cycles of operation of the CLOCK 814 whereupon a positive signal is applied to the COUNT OF 7 line.

Referring now to the TAPE W CONTROL UNIT 720 in Fig. 25F, the positive signal on the COUNT OF 7 line, in combination with the COND W ECHO line being up, passes via the AND circuit 706 and the OR circuit 707 to bring up the GATE W ECHO TO CR 208 line which condition is passed to the CR 208 in Fig. 21A. The positive signal on the GATE W ECHO TO CR 208 line is applied to condition the AND circuits 210 of the CR 208 in preparation for receiving the next CHARACTER to be echoed back on the TAPE W ECHO BUS.

Referring now to the W EX TIMER 994 in Fig. 27D, the positive signal on the COUNT OF 7 line, in combination with the GATE W PULSE and $\overline{W\ TM\ CALL}$ lines being up, passes via the AND circuit 995 to condition the AND circuits 996 and 997.

*Step 49*

At R0 time, referring to the W EX TIMER 994 in 27D, the positive pulse on the R0(D4) line passes via the now conditioned AND circuit 996 to bring up the W PULSE line which condition is passed via the OR circuit 738 of the W TM UNIT 739 in Fig. 25G to bring up the W PULSE+W TM PULSE line.

*Step 50*

The combination of signals from the right-hand outputs of the triggers 212 of the CHARACTER REGISTER 208, corresponding to the CHARACTER presently stored in the CHARACTER REGISTER 208, are applied to the TAPE W BUS in preparation for writing this CHARACTER on the TAPE of the SELECTED TAPE UNIT.

At R4 time, referring to the W EX TIMER 994 in Fig. 27B, the negative shift of the trailing edge of the positive pulse on the R0(D4) line deconditions the AND circuit 996 to bring down the W PULSE line which, in turn, is effective to bring down the W PULSE+W TM PULSE line in Fig. 25G, to signal the SELECTED TAPE UNIT 2 to write the CHARACTER presently on the TAPE W BUS on the TAPE. At the same time that the CHARACTER is being written on the SELECTED TAPE, a combination of signals corresponding to this CHARACTER is echoed back via the TAPE W ECHO BUS to the CHARACTER REGISTER 208 in Fig. 21A so that positive signals corresponding to the 1 bits of the CHARACTER passes via corresponding ones of the now conditioned AND circuits 210 to turn OFF corresponding ones of the triggers 212 which were previously turned ON when the CHARACTER was stored in the CR 208. Consequently, the CHARACTER REGISTER 208 is reset if the CHARACTER that is written on the SELECTED TAPE corresponds with the CHARACTER that is stored in the CHARACTER REGISTER 208.

Referring now to the CR 208 NOT RESET & GM RECOGNITION UNIT 234 in Fig. 21B, the right-hand outputs of the triggers 212 of the CHARACTER REGISTER 208 are applied to the OR–C circuit 236 where a check is made to insure that the CHARACTER REGISTER 208 is reset. If the CHARACTER that is stored in the CR 208 does not correspond to the CHARACTER that is written on the SELECTED TAPE, then, the CR 208 is not reset and one or more of the triggers 212 apply positive signals from their right-hand outputs via the OR–C circuit 236 to bring up the CR 208 NOT RESET line which, in coming up, in combination with the $\overline{\text{CTRL 8}}$ line being up, conditions the AND circuit 275 in the ERROR CHECK UNIT 268 in Fig. 21F.

*Step 51*

Steps 35 to 50 are repeated for each CHARACTER of the RECORD or group of RECORDS transferred from the DATA COORDINATOR to the SELECTED TAPE UNIT 2.

Now, let it be assumed that the DATA COORDINATOR is performing a cycle of operation during which the GM CHARACTER is read out of the MEMORY 50.

Thus, Steps 32 to 42 are repeated during which the last CHARACTER of the RECORD or group of RECORDS is written on the SELECTED TAPE and an echo check is made to insure that the CHARACTER written on the TAPE corresponding to the CHARACTER stored in the CR 208. Then, the CHARACTER REGISTER 208 is cleared and the GM CHARACTER is read out of the next SELECTED STORAGE REGISTER of the MEMORY 50 and transferred to the CHARACTER REGISTER 208 in Fig. 21A. A vertical check is made in the CHAR CODE CK UNIT 232 in Fig. 21D to insure that there are an even number of 1 bits in the GM CHARACTER after which the GM CHARACTER is rewritten in the SELECTED STORAGE REGISTER of the MEMORY 50.

*Step 52*

At W0 time, referring to the CR 208 NOT RESET & GM RECOGNITION UNIT 234 in Fig. 21D, the positive pulse on the W0(D1.5) line, in combination with the right-hand outputs of the triggers 212a to 212f and the left hand output of the trigger 212g of the CR 208 in Fig. 21A, being up in accordance with the GM CHARACTER (0111111) stored in the CR 208, passes via the AND circuit 235 and the OR circuit 237 to bring up the GM RECOG line.

Referring now to the TAPE W CONTROL UNIT 720 in Fig. 25F, the positive shift on the GM RECOG line, in combination with the DC TO TU TC1 line being up, passses via the AND circuit 700 and the OR circuit 701 to the inverter 702 where it is inverted to a negative shift to turn ON the 275 microseconds RESET DEL single shot 703.

At the same time, referring to the TAPE W TYPE CYCLE UNIT 524 in Fig. 24A, the positive shift on the GM RECOG lines, in combination with $\overline{\text{CTRL 8}}$ lines being up, passes via the AND circuit 548 and the OR circuit 550 to the inverter 552 where it is inverted to a negative shift to turn off the W PULSE GATE trigger 546 which, in being turned OFF, applies a negative signal from its right hand output to bring down the GATE W PULSE line which condition is passed to the PRIORITY R/W SERVICE UNIT 578 in Fig. 24C to turn ON the W SERVICE trigger 580. The W SERVICE trigger 580 in being turned ON applies a positive signal which, in combination with the $\overline{\text{RCLB}}$ line being up and the R SERVICE trigger 579 being OFF, conditions the AND circuit 582.

*Step 53*

At W0.5 time, Step 43 is repeated to step the ADDRESS COUNTER 112 in Fig. 20F.

*Step 54*

At W3 time, referring to the DATA TFR & CK EX TIMER 949 in Fig. 27C, the positive pulse on the W3(D1.5) line, in combination with the WCLB and DC TO TU TC1 lines being up, passes via the AND circuit 951 to bring up the CHAR CODE CK A TO REC CK line which condition is passed to the AND circuit 276 in the ERROR CHECK UNIT 268 in Fig. 21F. If the AND circuit 276 is conditioned by the CHAR CODE CK A line being up, due to the existence of an odd number of 1 bits in the GM CHARACTER, the positive pulse passes via the AND circuit 276 and the OR circuit 278 to turn ON the REC CK trigger 280 which, in being turned ON, applies a positive signal from the right-hand output which, in combination with the THIS DC SELECTED line being up, passes via the AND circuit 282 to bring up the REC CK line.

At W3 time, referring to the PRIORITY R/W SERVICE UNIT 578 in Fig. 24C, the positive pulse on the W3(D1.5) line passes via the now conditioned AND circuit 582 to bring up the W SERVICE CALL line which condition is passed to the TAPE R/W CYCLE UNIT 588. The positive signal on the W SERVICE CALL line is applied to turn ON the WCLA trigger 594 which, in being turned ON, applies a negative signal from its left hand output to bring down the $\overline{\text{WCLA}}$ line and applies a positive signal from its right-hand output to bring up the WCLA line and, via the OR circuit 595, to maintain the WCL line up which, in turn, is effective in the MEMORY EX TIMER 902 in Fig. 27A to maintain the MEM R and the MEM R/W lines up.

*Step 55*

At W3.5 time, STEP 45 is repeated wherein the CLOCK CONTROL UNIT 802 in Fig. 26D is effective to initiate another cycle of operation of the CLOCK 814; the count of the 7 COUNTER 876 in Fig. 26C is advanced and the INHIBIT DRIVER 226 in Fig. 21C is effective to cause a POST WRITE DISTURBANCE of the presently SELECTED STORAGE REGISTER of the MEMORY 50.

*Step 56*

At R0 time, referring to the TAPE R/W CYCLE UNIT 588 in Fig. 24C, the negative shift of the trailing edge of the positive pulse on the W2.5(D1.5) line is applied to turn OFF the WCLB trigger 597 which, in being turned OFF, applies a positive signal from its left-hand output to bring up the $\overline{\text{WCLB}}$ line and applies a negative signal from its right-hand output to bring down the WCLB line.

Steps 35 to 47 are repeated during which the CHARACTER REGISTER 208 is cleared and the LRC CHARACTER is read out of the next SELECTED STORAGE REGISTER of the MEMORY 50 and transferred to the CHARACTER REGISTER 208 in Fig. 21A. A vertical check is made in the CHAR CODE CK UNIT 232 in Fig. 21D to insure that there are an even number of 1 bits in the LRC CHARACTER, after which the LRC CHARACTER is rewritten in the SELECTED STORAGE REGISTER of the MEMORY 50. Next, the CHAR CODE CK A TO REC CK line is brought up to effectively turn ON the REC CK trigger 280 of the ERROR CHECK UNIT 268 in Fig. 21F if the CHAR CODE CHECK UNIT 232 in 21D detected an odd number of 1 bits in the LRC CHARACTER and, lastly, the triggers 136 of the ADDRESS REGISTER 132 in Fig. 20F are reset to effectively clear the ADDRESS REGISTER 132.

Step 57

Referring now to the TAPE W CONTROL UNIT 720 in Fig. 24F, Step 8 is repeated to continue the cycling of the CLOCK 814 until the 275 microsecond RESET DEL single shot 703 returns to its OFF state causing a negative shift to be applied from its right-hand tapped output to turn ON the 10 microsecond RESET GATE single shot 704 which, in being turned ON, applies a positive signal from its right-hand output via the OR circuit 707 to bring up the GATE W ECHO TO CR 208 line which condition is passed to the CR 208 in Fig. 21A. The positive signal on the GATE W ECHO TO CR 208 line is applied to condition the AND circuits 210 of the CR 208 in preparation for receiving the LRC CHARACTER to be echoed back on the TAPE W ECHO BUS.

The positive signal output of the RESET GATE single shot 704 is also applied via the OR circuit 706 and, in combination with the TU B SEL and $\overline{\text{PREP TO R B}}$ lines being up, via the AND circuit 710 to bring up the RESET W TGR B (Z) line which condition is passed to the SELECTED TAPE UNIT 2 causing the WRITE triggers therein to be reset whereby an LRC CHARACTER is written on the TAPE. At the same time that the LRC CHARACTER is being written on the SELECTED TAPE a combination of signals corresponding to this CHARACTER is echoed back via the TAPE W ECHO BUS to the CHARACTER REGISTER 208 in Fig. 21A so that positive signals, corresponding to the 1 bits of the LRC CHARACTER pass via corresponding ones of the now conditioned AND circuits 210 to turn OFF corresponding ones of the triggers 212 which were previously turned ON when the LRC CHARACTER REGISTER 208 is reset only if the CHARACTER that is written on the SELECTED TAPE corresponds to the LRC CHARACTER presently stored in the CHARACTER REGISTER 208. Referring now to the CR 208 NOT RESET & GM RECOGNITION UNIT 234 in Fig. 21D, where a check is made to insure that the CHARACTER REGISTER 208 is reset. If the LRC CHARACTER that is stored in the CR 208 does not correspond to the LRC CHARACTER that is written on the SELECTED TAPE, then, the CR 208 is not reset and the CR 208 NOT RESET line is brought up which, in coming up, in combination with the $\overline{\text{CTRL 8}}$ line being up, conditions the AND circuit 275 in the ERROR CHECK UNIT 268 in Fig. 21F.

Step 58

10 microseconds later, referring to the TAPE W CONTROL UNIT 720 in Fig. 25F, the RESET GATE single shot 704 returns to its OFF state causing a negative shift to be applied from its right hand output to the peaker 708 which responds thereto and applies a 2 microsecond positive pulse to the RESET STATUS line.

Referring now to the W EX TIMER 994 in Fig. 27D, the positive pulse on the RESET STATUS line, in combination with the $\overline{\text{W TM CALL}}$ line being up, passes via the AND circuit 999 and the OR circuit 998 to bring up the CR 208 NOT RESET GATE TO REC CK line which condition is passed to the AND circuit 275 of the ERROR CHECK UNIT 268 in Fig. 21F. If the AND circuit 275 is conditioned by the CR 208 NOT RESET line being up, due to a discrepancy between the LRC CHARACTER written on the SELECTED TAPE and the LRC CHARACTER stored in the CHARACTER REGISTER 208, the positive pulse passes via the AND circuit 275 and the OR circuit 278 to turn ON the REC CK trigger 280 which, in being turned ON, applies a positive signal from its right hand output which, in combination with the THIS DC SELECTED line being up, passes via the AND circuit 282 to bring up the REC CK line.

Step 59

2 microseconds later, referring to the TAPE W TYPE CYCLE UNIT 524 in Fig. 24B, the negative shift of the trailing edge of the positive pulse on the RESET STATUS line passes via negative shift inputs to turn OFF the COND W ECHO trigger 538 and the DC TO TU TC1 trigger 556 which, in being turned OFF, apply negative signals from their right-hand outputs to bring down the COND W ECHO line and the DC TO TU TC1 line, respectively.

At the same time, referring to the STATUS DECODER 400 in Fig. 23, the negative shift of the trailing edge of the positive pulse on the RESET STATUS line passes via a negative shift input to turn OFF the DC TO TU status trigger 432 which, in being turned OFF, applies a positive signal from its left-hand output to bring up the $\overline{\text{DC TO TU}}$ line and applies a negative signal from its right-hand output to bring down the DC TO TU line.

Referring now to the DC RDY UNIT 840 in Fig. 26D, the positive signal on the $\overline{\text{DC TO TU}}$ line, in combination with the $\overline{\text{W TM CALL}}$ and $\overline{\text{BKWD+TU TO DC}}$ lines being up, passes via the AND circuit 842 and the OR circuit 844 to bring up the DC RDY line which condition is passed to the SELECT ADDRESS DECODER 602 in Fig. 25A to bring up the DC SEL & RDY line to signal the CPU that the DC is no longer busy with a TAPE operation and is now READY to operate again.

Referring now to the SELECT ADDRESS DECODER 602 in Fig. 25B, the negative signal on the DC TO TU line also passes via the OR circuit 622 to turn OFF the TU2 SEL trigger 620e.

Referring now to TAPE W STATUS UNIT 648 in Fig. 25D, the negative signal on the DC TO TU line also passes via the OR circuit 639 to decondition the AND circuit 640 and bring down the SET W B line which, in turn, deconditions the AND circuit 641 to bring down the START W B line which condition is passed to the TAPE W CONTROL UNIT 720 in Fig. 25F. The negative signal on the START W B line passes via the OR circuit 688 to decondition the AND circuit 689 causing a negative signal to be applied via the OR circuit 691 to bring down the GO BUS B line to signal the SELECTED TAPE UNIT 2 to stop the forward motion of the TAPE.

Step 60

At W2.5 time, referring to the CLOCK CONTROL UNIT 802 in Fig. 26D, the negative shift of the trailing edge of the positive pulse on the W1(D1.5) line, in combination with the $\overline{\text{BKWD+TU TO DC}}$, $\overline{\text{DC TO TU}}$ and $\overline{\text{CTRL 8}}$ lines being up, passes via the AND circuit 836 to turn OFF the LONG CLOCK trigger 834 which, in being turned OFF, applies a negative signal from its right-hand output via the OR circuit 826 to decondition the AND circuit 828 and thereby prevent any further cycling of the CLOCK 814 and thereby terminate this mode of operation.

WRITE TAPE MARK (CONTROL 0001)

The W TM operation functions to write a special character, namely, a TAPE MARK CHARACTER on a SELECTED TAPE to serve as an indication of the end of a file of RECORDS.

A W TM operation may be performed by a process of two instructions, namely, a SELECT instruction followed by a CONTROL instruction. Thus, the PROGRAM for an exemplary W TM operation may be as follows:

SELECT 20602
   CTRL 30001

Simply interpreted, the operation part 2 of the SELECT instruction designates that a SELECT operation is to be performed while the ADDRESS part 0602 of the SELECT instruction designates the DATA COORDINATOR as the SELECTED input/output unit and the TAPE UNIT 2 as the SELECTED TAPE UNIT. Similarly, the operation part 3 of the CONTROL operation is to be performed, while the ADDRESS part 0001 of the CONTROL instruction designates that a TM CHARACTER is to be written on the TAPE of the SELECTED TAPE UNIT 2.

The W TM mode of operation will now be described in a step by step manner wherein all operations within a step occur at relatively the same instant of time and with reference being made to the detailed logical block diagrams of the major components of the DATA COORDINATOR shown in Figs. 20 to 27, inclusive. Reference may be made to the timing diagrams of Fig. 30 to aid in understanding the sequence of the present operation.

Step 1

Initially, the DATA COORDINATOR is ready to perform an operation as previously explained in the section on the DATA COORDINATOR READY. Thus, referring to the DC RDY UNIT 840 in Fig. 26D, a positive signal is initially maintained on DC RDY line.

Now, when the SELECT instruction is called for, the ADDRESS part is applied to the SELECT ADDRESS DECODER 602 in Fig. 25A in the form of binary coded signals. The SELECT ADDRESS DECODER 602 decodes the signals to bring up the THIS DC SELECTED line, the DC SEL & RDY line, the SEL TU2 line and the TU B SEL line in a manner as previously described in the section on SELECT ADDRESS DECODING. The DC SEL & RDY line in coming up signals the CPU that the DC is SELECTED and READY to operate.

Step 2

After the execution of the SELECT instruction, the PROGRAM steps to the CONTROL 0001 instruction which causes the CPU to go through a cycle of operation during which the CPU CTRL 0001 line is brought up. The positive shift on the CPU CTRL 0001 line, in combination with the DC SEL & RDY line being up, passes via the AND circuit 310 of the INSTRUCTION DECODER 322, to bring up the CTRL 0001 line.

Referring now to the SELECT ADDRESS DECODER 602 in Fig. 25B, the positive signal on the CTRL 0001 line passes via the OR-C circuit 619 and, in combination with the SEL TU2 line being up, via the AND circuit 616e to turn ON the TU2 SEL trigger 620e which, in being turned ON, maintains the positive signal on the SEL TU2 and, via the OR circuit 621b, on the TU B SEL line thereby remembering which TAPE UNIT was previously selected.

Referring now to the W TM UNIT 739 in Fig. 25G, the positive signal on the CTRL 0001 line is applied to the inverter 733 where it is inverted to the negative signal to turn ON the W TM CALL trigger 734 which, in being turned ON, applies a negative signal from its left-hand output to bring down the $\overline{\text{W TM CALL}}$ line and applies a positive signal from its right-hand output to bring up the W TM CALL line and condition the AND circuit 735.

Referring now to the DISCONNECT EX TIMER 984 in Fig. 27A, the positive shift on the W TM CALL line passes via the OR circuit 990 to the inverter 991 where it is inverted to a negative shift to turn ON the 10 microsecond CTRL/W DISC single shot 992 which, in being turned ON, bring up the CTRL/W DISC line for 10 microseconds to signal the CPU to terminate the CONTROL instruction and proceed to the next instruction of the PROGRAM.

Referring now to the CLOCK CONTROL UNIT 802 in Fig. 26D, the negative signal on the $\overline{\text{W TM CALL}}$ line deconditions the AND circuit 842 causing a negative signal to be applied via the OR circuit 844 to bring down the DC RDY line which remains down this mode of operation. The negative signal on the DC RDY line is applied to the SELECT ADDRESS RECODER 602 in Fig. 25A where it is effective to bring down the DC SEL & RDY line, in a manner as previously described in the section on SELECT ADDRESS DECODING to signal the CPU that the DC is now busy with a TAPE operation. Also, the DC SEL & RDY line in coming down is effective to decondition the INSTRUCTION DECODER 300 in Fig. 22 and the SELECT ADDRESS DECODER 602 so that the INSTRUCTION DECODER 300 is blocked from decoding a subsequent operational instruction involving the DATA COORDINATOR and the SELECT ADDRESS DECODER 602 is blocked from decoding the ADDRESS part of a subsequent SELECT instruction which selects the DATA COORDINATOR until the present operation is completed.

Referring now to the CHARACTER REGISTER 208 in Fig. 21A, the negative shift on the $\overline{\text{W TM CALL}}$ line is applied to turn on the triggers 212a to 212d and to turn OFF the triggers 212e to 212g whereby the TM CHARACTER (0001111) is stored in the CHARACTER REGISTER 208.

Referring now to the TAPE W STATUS UNIT 648 in Fig. 25D, the positive signal on the W TM CALL line passes via the OR circuit 639 and, in combination with the TU B SEL and $\overline{\text{PREP TO R B}}$ line being up, via the AND circuit 640 to bring up the SET W B line which condition is passed to the SELECTED TAPE 2 causing it to be set to a WRITE STATUS in preparation for writing the TAPE in CHARACTER on the TAPE.

Step 3

As soon as the SELECTED TAPE UNIT 2 is set to the WRITE STATUS it transfers a signal back via the SEL, RDY & W B line to the TAPE W STATUS UNIT 648 in Fig. 25D where, in combination with the SET W B and $\overline{\text{BKWD TO FWD DEL}}$ lines being up, it passes via the AND circuit 641 to bring up the START W B line. The positive signal on the START W B line passes via the OR circuit 688 in the TAPE W CONTROL unit in 720 in Fig. 25F and, in combination with the $\overline{\text{PREP TO R B}}$ and TU B SEL lines being up, via the AND circuit 689 and the OR circuit 691 to bring up the GO BUS B line which condition is passed to the SELECTED TAPE UNIT 2 to start the TAPE moving in a forward direction. The positive shift output of the OR circuit 688 also passes via the OR circuit 696 to the inverter 698 where it is inverted to a negative shift to turn on the 10 microsecond W TGR RESET single shot 699 which, in being turned ON, applies a positive signal from its right-hand output via the OR circuit 706 and, in combination with the TU B SEL and $\overline{\text{PREP TO R B}}$ lines being up, via the AND circuit 710 to bring up the RESET W TGR B (Z) line which condition is passed to the SELECTED TAPE UNIT 2 causing the WRITE triggers therein to be reset thereby insuring that these triggers are reset before the TM CHARACTER is written on the SELECTED TAPE.

Referring now to the TAPE W CONTROL unit 720 in Fig. 25F, since the LOAD POINT of the SELECTED TAPE is not being sensed, then, the SEL & AT LP line is down to effectively decondition the AND circuit 697 and block the positive signal on the START W B line via the OR circuit 688 and 696 from effecting the W LP DEL single shot 715 with the resulting effect being that the now positive output of the inverter 716 and the positive left-hand output of the W LP DEL single shot 715 condition the AND circuit 717 so that the positive signal on the START W B line, via the OR circuit 688 and 696, passes via the now conditioned AND circuit 717 to the inverter 718 where it is inverted into a negative signal to turn ON the 10 millisecond W DEL single shot 719 to allow sufficient time for the TAPE of the SELECTED TAPE UNIT 2 to get up to speed.

Step 4

10 milliseconds later, referring to the TAPE W TYPE CYCLE UNIT 524 in Fig. 24B, the W DEL single shot 719 returns to its OFF state causing a negative signal to be applied from its right-hand output to bring down the 10 MS W DEL line which condition is passed to the W TM UNIT 739 in Fig. 25G. The negative shift on the 10 MS W DEL line is applied to decondition the AND circuit 735 causing a negative shift to be applied to the inverter 736 where it is inverted to a positive shift to turn ON the TM PULSE single shot 737 causing a positive signal to be applied from its right-hand output to bring up the W TM PULSE line which condition is passed via the OR circuit 738 to bring up W PULSE+ W TM PULSE line and also is passed to the TAPE W CONTROL UNIT 720 in Fig. 25F. The positive shift on the W TM PULSE line passes via the OR circuit 701 to the inverter 702 where it is inverted to a negative shift to turn on the 275 microseconds RESET DEL single shot 703.

Step 5

The combination of signals from the right-hand outputs of the triggers 212 of the CHARACTER REGISTER 208, corresponding to the TM CHARACTER presently stored in the CHARACTER REGISTER 208, are applied to the TAPE W BUS in preparation for writing the TM CHARACTER on the TAPE of the SELECTED TAPE UNIT.

10 microseconds later, referring to the W TM UNIT 739 in Fig. 25G, the TM PULSE single shot 737 returns to its OFF state causing a negative signal to be applied from its right-hand output to bring down the W TM PULSE line which condition is passed via the OR circuit 738 to bring down the W PULSE+W TM PULSE line to signal the SELECTED TAPE UNIT 2 to write the TM CHARACTER presently on the TAPE W BUS on the TAPE.

Step 6

265 microseconds later, referring to the TAPE W CONTROL UNIT 720, Fig. 25F, the RESET DEL single SHOT 703 returns to its OFF state causing a negative shift to be applied from its right-hand OUTPUT to turn ON the 10 microsecond RESET GATE single shot 704 which, in being turned ON, applies a positive signal from its right-hand output via the OR circuit 707 to bring up the GATE W ECHO TO CR 208 line which condition is passed to the CR 208 in Fig. 21A. The positive signal on the GATE W ECHO TO CR 208 line is applied to condition the AND circuits 210 of the CR 208 in preparation for receiving the TM CHARACTER to be echoed back on the TAPE W ECHO BUS.

At the same time, the positive signal output of the RESET GATE single shot 704 is applied via the OR circuit 706 and, in combination with the TU B SEL and PREP TO R B lines being up, via the AND circuit 710 to bring up the RESET W TGR B (Z) line which condition is passed to the SELECTED TAPE UNIT 2 causing the WRITE triggers therein to be reset whereby a CHARACTER is written on the TAPE which is identical to the TM CHARACTER. At the same time that this CHARACTER, corresponding to the TM CHARACTER, is being written on the SELECTED TAPE, a combination of signals corresponding to the CHARACTER is echoed back via the TAPE W ECHO BUS to reset the CHARACTER REGISTER 208 in Fig. 21A only if the CHARACTER that is written on the SELECTED TAPE corresponds to the TM CHARACTER presently stored in the CHARACTER REGISTER 208. Referring now to the CR 208 NOT RESET & GM RECOGNITION UNIT 234 in Fig. 21B where a check is made to insure that the CHARACTER REGISTER 208 is reset, if the TM CHARACTER that is stored in the CHARACTER REGISTER 208 does not correspond to the TM CHARACTER written on the SELECTED TAPE, then the CR 208 is not reset and the CR 208 NOT RESET line is brought up and in combination with the $\overline{\text{CTRL 8}}$ line being up conditions the AND circuit 275 in the ERROR CHECK UNIT 268 in Fig. 21F.

Step 7

10 microseconds later, referring to the TAPE W CONTROL UNIT 720 in Fig. 25F, the RESET GATE single shot 704 returns to its OFF state causing a negative shift to be applied from its right-hand output to the peaker 708 which responds thereto and applies a 2 microsecond positive pulse to the RESET STATUS line which condition is passed to the ERROR CHECK UNIT 268. The positive pulse on the RESET STATUS line, in combination with the W TM CALL line being up and the CR 208 NOT RESET line being up if there is a discrepancy between the TM CHARACTER written on the SELECTED TAPE and the TM CHARACTER stored in the CHARACTER REGISTER 208, passes via the AND circuit 273 to turn ON the R/W CK trigger 279 which, in being turned ON, applies a positive signal from its right-hand output which, in combination with the THIS DC SELECTED line being up, passes via the AND circuit 281 to bring up the REC R/W CK line. The R/W CK trigger 279 remains ON until after the completion of the next READ or WRITE instruction involving the DATA COORDINATOR, whereupon a signal is applied via the END R/W line to effectively turn OFF the R/W CK trigger 279 which, in being turned OFF effectively brings down the R/W CK line to signal the CENTRAL PROCESSING UNIT that an error has occurred in the previous operation involving the DATA COORDINATOR and a TAPE UNIT associated therewith.

Step 8

2 microseconds later, referring to the W TM UNIT 739 in Fig. 25G, the negative shift of the trailing edge of the positive pulse on the RESET STATUS line is applied to turn OFF the W TM CALL trigger 734 which, in being turned OFF, applies a positive signal from its left-hand output to bring up the $\overline{\text{W TM CALL}}$ line and applies a negative signal from its right-hand output to bring down the W TM CALL line. Referring now to the CLOCK CONTROL UNIT 802 in Fig. 26B, the positive signal on the $\overline{\text{W TM CALL}}$ line, in combination with the $\overline{\text{DC TO TU}}$ and $\overline{\text{BKWD+TU TO DC}}$ lines being up, passes via the AND circuit 842 and the OR circuit 844 to bring up the DC RDY line which condition is passed to the SELECT ADDRESS DECORDER 602 in Fig. 25A to bring up the DC SEL & RDY line to signal the CPU that the DC is no longer busy a TAPE operation and is now READY to operate again. At the same time, referring to the SELECT ADDRESS DECODER 602 in Fig. 25B, the negative shift on the W TM CALL line is passed via the OR circuits 222 to turn OFF the TU2 SEL trigger 620e.

Referring now to the TAPE W STATUS UNIT 648 in Fig. 25D, the negative signal on the W TM CALL line passes via the OR circuit 639 to decondition the AND circuit 640 and bring down the SET W B line which condition is passed to decondition the AND circuit 641 to bring down the START W B line which condition is passed to the TAPE W CONTROL UNIT 720 in Fig. 25F. The negative signal on the START W B line passes via the OR circuit 688 to decondition the AND circuit 689 which applies a negative signal via the OR circuit 691 to bring down the GO BUS B line to signal the TAPE UNIT 2 to stop its forward motion, which thereby terminates this mode of operation.

CENTRAL PROCESSING UNIT TO TAPE UNIT (CONTROL 0008 WRITE)

The CPU TO TU mode of operation functions to bypass the DATA COORDINATOR whenever the length of a RECORD or group of RECORDS exceeds the capacity of the MEMORY 50 and transfer the RECORD or group of RECORDS from the CENTRAL PROCESSING UNIT directly to a SELECTED TAPE UNIT.

The CPU TO TU mode of operation may be performed by a process of 3 instructions, namely, a SELECT instruction followed by a CONTROL instruction followed by a WRITE instruction. Thus, the PROGRAM for an exemplary CPU TO TU mode of operation may be as follows:

```
SELECT  20602
CTRL    30008
WRITE   R1132
```

Simply interpreted, the operation part 2 of the SELECT instruction designates that a SELECT operation is to be performed while the ADDRESS part 0602 of the SELECT instruction designates the DATA COORDINATOR as the SELECTED input/output unit and TAPE UNIT 2 as the SELECTED TAPE UNIT. Similarly, the operation part 3 of the CONTROL instruction designates that a CONTROL operation is to be performed, while the ADDRESS part 0008 of the CONTROL instruction designates that the DATA COORDINATOR is to be by-passed. Likewise, the operation part R of the WRITE instruction designates that a WRITE operation is to be performed, while the ADDRESS part 1132 of the WRITE instruction designates the ADDRESS in the MEMORY of the CPU starting from which the RECORD or group of RECORDS may be read and transferred to the TAPE of the SELECTED TAPE UNIT 2.

The CPU TO TU mode of operation will now be described in a step by step manner wherein all operations within a step occur at relatively the same instant of time and with reference being made to the detailed logical block diagrams of the major components of the DATA COORDINATOR shown in Figs. 20 to 27, inclusive.

Step 1

Initially, the DATA COORDINATOR is ready to perform an operation as previously explained in the section on the DATA COORDINATOR READY. Thus, referring to the DC RDY UNIT 840 in Fig. 26D, a positive signal is maintained on the DC RDY line which remains thereon during this entire mode of operation.

Now, when the SELECT instruction is called for, the ADDRESS part is applied to the SELECT ADDRESS DECODER 602 in Figs. 25A and 25B in the form of binary coded signals. The SELECT ADDRESS DECODER 602 decodes the signals to bring up the THIS DC SELECTED line, the DC SEL & RDY line, the SEL TU2 line and the TU B SEL line in a manner as previously described in the section on SELECT ADDRESS DECODING.

Step 2

After the execution of the SELECT instruction, the PROGRAM steps to the CONTROL 0008 instruction which causes the CPU to go through a cycle of operation during which the CPU CTRL 0008 line is brought up. The positive signal on the CPU CTRL 0008 line, in combination with the DC SEL & RDY line being up, passes via the AND circuit 324 of the INSTRUCTION DECODER 300 in Fig. 22, to bring up the CTRL 0008 line.

Referring now to the STATUS DECODER 400 in Fig. 23, the positive shift on the CTRL 0008 line is applied to the inverter 402 where it is inverted to a negative shift to turn ON the CTRL 8 trigger 404 which, in being turned ON, applies a negative signal from its left-hand output to bring down the $\overline{\text{CTRL 8}}$ line and applies a positive signal from its right-hand output to bring up the CTRL 8 line and to condition the AND circuit 408.

At the same time, referring to the DATA TFR & CK EX TIMER 949 in Fig. 27B, the positive shift on the CTRL 8 line, in combination with the $\overline{\text{R CALL}}$ line being up, passes via the AND circuit 977 and the OR circuit 976 to bring up the R DISC line which condition is passed to the DISCONNECT EX TIMER 984 in Fig. 27A. The positive shift on the R DISC line passes via the OR circuit 985 to the inverter 986 where it is inverted to a negative shift to turn ON the 10 microsecond CTRL/R DISC single shot 987 which, in being turned ON, brings up the CTRL/W DISC line for 10 microseconds to signal the CPU to terminate the CONTROL instruction and proceed to the next instruction of the PROGRAM.

Step 3

After the execution of the CONTROL instruction, the PROGRAM steps to the WRITE instruction which causes the CPU to go through a cycle of operation during which the first CHARACTER is effectively transferred from the CPU MEMORY to the CPU W BUS and the CPU W CALL line brought up. The positive shift on the CPU W CALL line, in combination with the DC SEL & RDY line being up, passes via the AND circuit 304 of the INSTRUCTION DECODER 300 in Fig. 22, to bring up the W CALL line.

Referring now to the STATUS DECODER 400 in Fig. 23, the positive signal on the W CALL line passes via the now conditioned AND 408 to bring up the CTRL 8 W line which condition is passed to the TAPE W STATUS UNIT 648 in Fig. 25D. The positive signal on the CTRL 8 W line passes via the OR circuit 639 and, in combination with the TU B SEL and $\overline{\text{PREP TO R B}}$ lines being up, via the AND circuit 640 to bring up the SET W B line which condition is passed to the SELECTED TAPE UNIT 2 causing it to be set to the WRITE STATUS in preparation for the writing operation.

Referring now to the CLOCK CONTROL UNIT 802 in Fig. 26D, the positive shift on the CTRL 8 W line is passed via the OR circuit 830 to the inverter 832 where it is inverted to a negative shift to turn ON the LONG CLOCK trigger 834 which, in being turned ON, applies a positive signal from its right hand output via the OR circuit 826 to condition the AND circuit 828 and applies a negative shift from its left-hand tapped output to turn ON the INITIATE trigger 810 which, in being turned ON, applies a positive signal from its right-hand output via the OR circuit 812 to bring up the CLOCK GATE line to initiate a cycle of operation of the CLOCK 814 in a manner as previously described in the section on the CLOCK PULSE GENERATOR.

Step 4

As soon as the SELECTED TAPE UNIT 2 is set to the WRITE STATUS it transfers a signal back via the SEL, RDY & W B line to the TAPE W STATUS UNIT in Fig. 25D where, in combination with the SET W B and BKWD TO FWD DEL lines being up, it passes via the AND circuit 641 to bring up the START W B line.

Referring now to the TAPE W CONTROL UNIT 720 in Fig. 25F, the positive signal on the START W B line passes via the OR circuit 688 and in combination with the TU B SEL and $\overline{\text{PREP TO R B}}$ lines being up, via the AND circuit 689 and the OR circuit 691 to bring up the GO BUS B line which condition is passed to the SELECTED TAPE UNIT 2 to start the TAPE moving in a forward direction. The positive shift output of the OR circuit 688 also passes via the OR circuit 696 to the inverter 698 where it is inverted to a negative shift to turn ON the 10 microsecond W TGR RESET signal shot 699 which, in being turned ON, applies a positive signal from its right-hand output via the OR circuit 706 and, in combination with the TU B SEL and $\overline{\text{PREP TO R B}}$ lines being up, via the AND circuit 710 to bring up the RESET W TGR B (Z) line which condition is passed to the SELECTED TAPE UNIT 2 causing the WRITE triggers therein to be reset in preparation for the WRITE operation.

If the LOAD POINT of the SELECTED TAPE is initially sensed, then, a positive signal is maintained on the SEL & AT LP line. This signal in combination with the positive signal on the START W B line is effective to initiate a 40 millisecond WRITE LOAD POINT DELAY to allow sufficient time for the LOAD POINT of the SELECTED TAPE to be moved past the R/W heads of the SELECTED TAPE UNIT in a manner as explained in Step 2 of the DC TO TU operation. However, let it be assumed that the LOAD POINT of the SELECTED TAPE is not being sensed and instead only a 10 millisecond WRITE DELAY is necessary to allow sufficient time for the TAPE of the SELECTED TAPE UNIT to get up to speed. Consequently, referring to the TAPE W CONTROL UNIT 720 in Fig. 25F, the SEL & AT LP B line is down to effectively decondition the AND circuit 697 and block the positive signal on the START W B line via the OR circuits 688 and 696 from effecting the W LP DEL single shot 715 with the resulting effect being that the now positive output of the inverter 716 and the positive left-hand output of the W LP DEL single shot 715 condition the AND circuit 717 so that the positive signal output of the OR circuit 696 passes via the now conditioned AND circuit 717 to the inverter 718 where it is inverted to a negative signal to turn ON the 10 milliseconds W DEL single shot 719 which, in being turned ON, applies a positive signal from its right-hand output to bring up 10 MS W DEL line.

Referring now to the RESET EX TIMER 924 in Fig. 27B, the positive shift on the 10 MS W DEL line, in combination with the $\overline{\text{W TM CALL}}$ line being up, passes via the AND circuit 930 and the OR circuit 927 to the inverter 928 where it is inverted to a negative shift to bring down the RESET CR 208 line which condition is passed to the CHARACTER REGISTER 208 in Fig. 21A. The negative shift on the RESET CR 208 line is applied via negative shift inputs to reset all of the triggers 212 of the CHARACTER REGISTER 208 to clear the CHARACTER REGISTER 208 in preparation for receiving the first CHARACTER presently on the CPU W BUS.

Step 5

At R0 time, referring to the CLOCK CONTROL UNIT 802 in Fig. 26D, the negative shift of the leading edge of the negative pulse on the $\overline{\text{R0(D1.5)}}$ line is applied to turn OFF the INITIATE trigger 810 which, in being turned OFF, is effective via the OR circuit 812 to bring down the CLOCK GATE line.

Step 6

At W3.5 time, referring to the CLOCK CONTROL UNIT 802 in Fig. 26D, the positive pulse on the W3.5 (D1) line passes via the now conditioned AND circuit 828 and the OR circuit 812 to bring up the CLOCK GATE line to initiate a cycle of operation of the CLOCK 814 in Fig. 26B.

At W3.5 time, referring to the 7 COUNTER 876 in Fig. 26B, the positive shift of the leading edge of the positive pulse on the W3.5(D1) line is effective to step the 7 COUNTER 876 by a count of 1. It should be noted that a RECORD or group of RECORDS are processed at a rate of 63 microseconds per CHARACTER whereas the CLOCK PULSE GENERATOR 800 has a CLOCK cycle of 9 microseconds. Consequently, it is necessary to cycle the CLOCK 814 seven times for each CHARACTER to be written on the TAPE in the SELECTED TAPE UNIT. Thus, the 7 COUNTER 876 counts each cycle of the CLOCK 814 and produces a positive output signal whenever it reaches a COUNT OF 7.

Step 7

Referring now to the TAPE W TYPE CYCLE UNIT 524 in Fig. 24A, Step 6 is repeated until the W DEL single shot 719 returns to its OFF state to bring down the 10 MS W DEL line causing a negative shift to be applied to turn ON the CTRAL 8 W ECC1 trigger 528 which, in being turned ON applies a positive signal from its right-hand output to bring up the CTRL 8 W ECC1 line and to condition the AND circuit 540.

Step 8

At W3 time, referring to the TAPE W TYPE CYCLE UNIT 524 in Fig. 24O, the positive shift of the leading edge of the positive pulse on the W3(D1.5) line passes via the now conditioned AND circuit 540 and the OR circuit 542 to the inverter 544 where it is inverted to a negative shift to turn ON the W PULSE GATE trigger 546 which, in being turned ON, applies a positive signal from its right-hand output to bring up a GATE W PULSE line.

Step 9

A sequence of steps now occur in the present mode which are identical to Steps 10 to 13 of the DC TO TU mode of operation. Consequently, reference should be made to those steps for a detailed description thereof.

Step 10

At W3.5 time, referring to the CLOCK CONTROL UNIT 802 in Fig. 26D and the 7 COUNTER 876 in Fig. 26C, Step 6 is repeated to bring up the CLOCK GATE line to initiate another cycle of operation of the CLOCK 814 in Fig. 26B and to advance the count of the 7 COUNTER 876 to effectively bring down the COUNT OF 7 line.

At W3.5 time, referring to the PRIORITY R/W SERVICE UNIT 578 in Fig. 24C, the negative shift of INITIATE W SERVICE line passes via a negative shift input to turn ON the W SERVICE trigger 580 which, in being turned ON, applies a positive signal from its right-hand output which, in combination with the $\overline{\text{RCLB}}$ line being up and the R SERVICE trigger 579 being OFF, conditions the AND circuit 582.

Step 11

At W2 time, referring to the PRIORITY R/W SERVICE UNIT 578 in Fig. 24C, the positive pulse on the W2(D1.5) line, in combination with the CTRL 8 line being up, passes via the AND circuit 584 and the OR circuit 585 and the now conditioned AND circuit 582 to bring up the W SERVICE CALL line which condition is applied to the TAPE R/W CYCLE UNIT 588.

The positive signal on the W SERVICE CALL line is applied to turn ON the WCLA trigger 594 which, in being turned ON, applies a negative signal from its left-hand output to bring down the $\overline{\text{WCLA}}$ line and applies a positive signal from its right-hand output to bring up the WCLA line and, via the OR circuit 595, to bring up the WCL line.

Step 12

At W3.5 time, referring to the CLOCK CONTROL UNIT 802 in Fig. 26D and the 7 COUNTER 876 in Fig. 26C, Step 6 is repeated to bring up the CLOCK GATE line to initiate another cycle of operation of the CLOCK 814 in Fig. 26B and to advance the count of the 7 COUNTER 876.

Step 13

At R1 time, referring to the PRIORITY R/W SERVICE UNIT 578 in Fig. 24B, the positive pulse on the R1(D1.5) line, in combination with the WCLA line being up, passes via the AND circuit 586 to turn OFF the W SERVICE trigger 580.

Step 14

At R2 time, referring to the TAPE R/W CYCLE UNIT 588 in Fig. 24C, the positive pulse on the R2(D1.5) line, in combination with WCLA line being up, passes via the AND circuit 596 to turn ON the WCLB trigger 599 which, in being turned ON, applies a negative signal from its left-hand output to bring down the $\overline{\text{WCLB}}$ line and applies a positive signal from its right-hand output to bring up the WCLB and, via the OR circuit 595, to maintain the WCL line up.

Step 15

At R4 time, referring to the TAPE R/W CYCLE UNIT 588 in Fig. 24C, the positive pulse on the R4(D1.5) line, in combination with the WCLB line being up, passes via the AND circuit 598 to turn OFF the WCLA trigger 594 which, in being turned OFF, applies a positive signal from its left-hand output to bring up the $\overline{\text{WCLA}}$ line and applies a negative signal from its right-hand output to bring down the WCLA line.

Step 16

At W1 time, referring to the DATA TFR & CK EX TIMER 949 in Fig. 27D, the positive pulse on the W1(D1.5) line, in combination with the WCL line being up and the CTRL 8 W ECC1 line being up via the OR circuit 973, passes via the AND circuit 974 to bring up the CPU W BUS TO CR 208 line which condition is passed to the CHARACTER REGISTER 208 in Fig. 21A. The positive pulse on the CPU W BUS TO CR 208 line passes via those AND circuits 209 which are conditioned in accordance with the 1 bits of the first CHARACTER presently on the CPU W BUS and via corresponding ones of the OR circuits 211 to turn ON corresponding ones of the triggers 212 so that the first CHARACTER presently on the CPU W BUS is effectively stored in the CHARACTER REGISTER 208.

The signals from the left-hand output of the triggers 212 are applied to the CHAR CODE CK UNIT 232 in Fig. 21D, in accordance with the first CHARACTER stored in the CR 208, where a vertical check is made to insure that there are an even number of 1 bits in the first CHARACTER, in the manner as previously described in the section on CODE CHECKING. If the CHARACTER has an odd number of 1 bits, then, this condition is detected by the CHAR CODE CK UNIT 232 to bring up the CHAR CODE CK A line which conditions the AND circuit 272 of the ERROR CHECK UNIT 268 in Fig. 21F.

Step 17

At W3 time, referring to the DATA TFR & CK EX TIMER 949 in Fig. 27C, the positive pulse on the W3 (D1.5) line, in combination with the WCLB and CTRL 8 W lines being up, passes via the AND circuit 952 and the OR circuit 953 to bring up the CHAR CODE CK A TO R/W CK line which condition is passed to the AND circuit 272 in the ERROR CHECK UNIT 268 in Fig. 21F. If the AND circuit 272 is conditioned by the CHAR CODE CK A line being up, due to the existence of an odd number of 1 bits in the first CHARACTER, the positive pulse passes via the AND circuit 272 and the OR-C circuit 270 to turn ON the R/W CK trigger 279 which, in being turned ON, applies a positive signal from its right-hand output which, in combination with the THIS DC SELECTED line being up, passes via the AND circuit 281 to bring up the R/W CK line.

At W3 time, referring to the TAPE W TYPE CYCLE UNIT 524 in Fig. 24A, the positive pulse of the W3 (D1.5) line, in combination with WCLB line being up, passes via the AND circuit 532 to turn ON the COND W ECHO trigger 538 which, in being turned ON, applies a positive signal from its right-hand output to bring up the COND W ECHO line. At the same time, the positive pulse output of the AND circuit 532 passes via the now conditioned AND circuit 534 to turn ON the CTRL 8 W TC1 trigger which, in being turned ON, applies a positive signal from its righthand output to bring up the CTRL 8 W TC1 line.

Step 18

At W3.5 time, referring to the CLOCK CONTROL UNIT 802 in Fig. 26B and the 7 COUNTER 876 in Fig. 26C, Step 6 is repeated to effectively bring up the CLOCK GATE line to initiate another cycle of operation of the CLOCK 814 and to advance the count of 7 COUNTER 876.

Step 19

At R0 time, referring to the TAPE W TYPE CYCLE UNIT 524 in Fig. 24A, the positive pulse on the R0 (D1.5) line, in combination with WCL and CTRL 8 W TC1 lines being up, passes via the AND circuit 530 to turn OFF the CTRL 8 W ECC1 trigger 528 which, in being turned OFF, applies a negative signal from its right-hand output to bring down the CTRL 8 W ECC1 line.

At R0 time, referring to the TAPE R/W CYCLE UNIT 588 in Fig. 24C, the negative shift of the trailing edge of the positive pulse on the W2.5(D1.5) line is applied to turn OFF the WCLB trigger 597 which, in being turned OFF, applies a positive signal from its left-hand output to bring up the $\overline{\text{WCLB}}$ line and applies a negative signal from its right-hand output to bring down the WCLB line and, via the OR circuit 595, to bring down the WCL line.

Step 20

Step 6 is repeated until the 7 COUNTER 876 in Fig. 26C counts another 7 cycle of operation of the CLOCK 814 whereupon a positive signal is applied to the COUNT OF 7 line.

Referring now to the TAPE W CONTROL UNIT 720 in Fig. 25F, the positive signal on the COUNT OF 7 line, in combination with the COND W ECHO line being up, passes via the AND circuit 706 and the OR circuit 707 to bring up the GATE W ECHO TO CR 208 line which condition is passed to the CR 208 in Fig. 21A. The positive signal on the GATE W ECHO TO CR 208 line is applied to condition the AND circuits 210 of the CR 208 in preparation for receiving the CHARACTER to be echoed back on the TAPE W ECHO BUS.

Referring now to the W EX TIMER 994 in Fig. 27D, the positive signal on the COUNT OF 7 line, in combination with the GATE W PULSE and $\overline{\text{W TM CALL}}$ lines being up, passes via the AND circuit 995 to condition the AND circuits 996 and 997.

Step 21

At R0 time, referring to the RESPONSE EX TIMER 914 in Fig. 27B, the positive pulse on the R0(D4) line, in combination with the CTRL 8 W TC1 and COUNT OF 7 lines being up via the AND circuit 919 and the OR circuit 920, passes via the AND circuit 921 to bring up the W RESPONSE line to signal the CPU to go through a CLOCK cycle to bring up the next CHARACTER to the CPU W BUS.

At R0 time, referring to the W EX TIMER 994 in Fig. 27D, the positive pulse on the R0(D4) line passes via the now conditioned AND circuit 996 to bring up the W PULSE line which condition is passed via the OR circuit 939 of the W TM UNIT 739 in Fig. 25G, to bring up the W PULSE+TM PULSE line.

Step 22

The combination of signals from the right-hand output from the triggers 212 of the CHARACTER REGISTER 208, corresponding to the CHARACTER presently stored in the CHARACTER REGISTER 208, are applied to the TAPE W BUS in preparation for writing the CHARACTER on the TAPE of the SELECTED TAPE UNIT.

At R4 time, referring to the W EX TIMER 994 in Fig. 27B, the R0(D4) line in coming down deconditions the AND circuit 996 to bring down the W PULSE line which, in turn is effective to bring down the W PULSE+W TM PULSE line in Fig. 25G, to signal the SELECTED TAPE UNIT 2 to write the CHARACTER presently on the TAPE W BUS on the TAPE. At the same time that the CHARACTER is being written on the SELECTED TAPE a combination of signals corresponding to this CHARACTER is echoed back via the TAPE W ECHO BUS to the CHARACTER REGISTER 208 in Fig. 21A so that positive signals, corresponding to the 1 bits of the CHARACTER, pass via corresponding ones of the now conditioned AND circuits 210 to turn OFF corresponding ones of the triggers 212 which were turned ON when the CHARACTER was previously stored in the CR 208 whereby the CHARACTER REGISTER 208 is reset only if the CHARACTER that is written on the SELECTED TAPE corresponds to the CHARACTER that is stored in the CHARACTER REGISTER 208. Referring now to the CR 208 NOT RESET & GM RECOGNITION UNIT 234 in Fig. 21D, the right-hand outputs of the triggers 212 of the CHARACTER REGISTER 208 are applied to the OR–C circuit 236 where a check is made to insure that the CHARACTER REGISTER 208 is reset. If the CHARACTER that is stored in the CR 208 does not correspond to the CHARACTER that is written on the SELECTED TAPE, then, the CR 208 is not reset and one or more of the triggers 212 apply a positive signal from their right-hand output and via the OR–C circuit 236 to bring up the CR 208 NOT RESET line which, in coming up, in combination with the CTRL 8 line being up, conditions the AND circuit 274 in the ERROR CHECK UNIT 268 in Fig. 21F.

Step 23

At W2 time, referring to the W EX TIMER 994 in Fig. 27B, a positive pulse on the W2(D1.5) line passes via the now conditioned AND circuit 997 to bring up the INITIATE W SERVICE line and, via the OR circuit 998, to bring up the CR 208 NOT RESET GATE TO REC CK line which condition is passed to the AND circuit 274 of the ERROR CHECK UNIT 268 in Fig. 21F. If the AND circuit 274 is conditioned by the CR 208 NOT RESET line being up, due to a discrepancy between the CHARACTER stored in the CR 208 and the CHARACTER written on the SELECTED TAPE, the positive pulse passes via the AND circuit 274 and the OR–C circuit 270 to turn ON the R/W CK trigger 279 which, in being turned ON, applies a positive signal from its right-hand output which, in combination with the THIS DC SELECTED line being up, passes via the AND circuit 281 to bring up the R/W CK line.

Step 24

At W3.5 time, referring to the CLOCK CONTROL UNIT 802 in Fig. 26D and the 7 COUNTER 876 in Fig. 26C, Step 6 is repeated to bring up the CLOCK GATE line to initiate another cycle of operation of the CLOCK 814 and to advance the count of the 7 COUNTER 876 to effectively bring down the COUNT OF 7 line. Referring now to the TAPE W CONTROL UNIT 720 in Fig. 25F, the COUNT OF 7 line in coming down deconditions the AND circuit 705 causing a negative signal to be applied via the OR circuit 707 to bring down the GATE W ECHO TO CR 208 line.

At W3.5 time, referring to the PRIORITY R/W SERVICE UNIT 578 in Fig. 24C, the negative shift of the trailing edge of the positive pulse on the INITIATE W SERVICE line passes via a negative shift input to turn ON the W SERVICE trigger 580 which, in being turned ON, applies a positive signal from its right-hand output which, in combination with the RCCB line being up and the R SERVICE trigger 579 being OFF, conditions the AND circuit 582.

Step 25

At W2 time, referring to the PRIORITY R/W SERVICE UNIT 578 in Fig. 24C, the positive pulse on the W2(D1.5) line, in combination with the CTRL 8 line being up, passes via the AND circuit 584 and the OR circuit 585 and via the now conditioned AND circuit 582 to bring up the W SERVICE CALL line which condition is passed to the TAPE R/W CYCLE UNIT 588. The positive signal on the W SERVICE CALL line is applied to turn ON the WCLA trigger 594 which, in being turned ON, applies a negative signal from its left-hand output to bring down the $\overline{WCLA}$ line and applies a positive signal from its right-hand output to bring up the WCLA line and, via the OR circut 595, to bring up the WCL line.

Step 26

At W3.5 time, referring to the CLOCK CONTROL UNIT 802 in Fig. 26D and the 7 COUNTER 876 in Fig. 26C, Step 6 is repeated to bring up the CLOCK GATE line to initiate another cycle of operation of the CLOCK 814 in Fig. 26B and to advance the count of the 7 COUNTER 876.

Step 27

At R0.5 time, referring to the RESET EX TIMER 924 in Fig. 27B, the positive pulse on the R0.5(D1.5) line, in combination with WCLA line being up and the CTRL 8 W TC1 line being up via the OR circuit 925, passes via the AND circuit 926 and the OR circuit 927 to the inverter 928 where it is inverted to a negative pulse to bring down the RESET CR 208 which condition is passed to the CR 208 in Fig. 21A. The negative shift on the RESET CR 208 line passes via negative shift inputs to reset all of the triggers 212 of the CR 208 to effectively clear the CHARACTER REGISTER 208 in preparation for receiving the next CHARACTER.

Step 28

At R1 time, referring to the PRIORITY R/W SERVICE UNIT 578 in Fig. 24B, the positive pulse on the R1(D1.5) line, in combination with the WCLA line being up, passes via the AND circuit 586 to turn OFF the W SERVICE trigger 580.

Step 29

At R2 time, referring to the TAPE R/W CYCLE 588 in Fig. 24C, the positive pulse on the R2(D1.5) line, in combination with the WCLA line being up, passes via the AND circuit to turn ON the WCLB trigger 599 which, in being turned ON, applies a negative signal from its left-hand output to bring down the $\overline{WCLB}$ line and applies a positive signal from its right-hand output to bring up the WCLB line and, via the OR circuit 595, to maintain the WCL line up.

Step 30

At R4 time, referring to the TAPE R/W CYCLE UNIT 588 in Fig. 24C, the positive pulse on the R4 (D1.5) line, in combination with the WCLB line being up, passes via the AND circuit 598 to turn OFF the WCLA trigger 594 which, in being turned OFF, applies a positive signal from its left-hand output to bring up the $\overline{WCLA}$ line and applies a negative signal from its right-hand output to bring down the WCLA line.

Step 31

At W1 time, referring to the DATA TFR & CK EX TIMER 949 in Fig. 27D, the positive pulse on the W1 (D1.5) line, in combination with the WCL line being up and the CTRL 8 W TC1 line being up via the OR circuit 973 passes via the AND circuit 934 to bring up the CPU W BUS TO CR 208 which condition is passed to the CHARACTER REGISTER 208 in Fig. 21A. The positive pulse on the CPU W BUS TO CR 208 line passes via those AND circuits 209 wh'ch are conditioned in accordance with the 1 bits of the CHARACTER presently on the CPU W BUS and via corresponding ones of the OR circuit 211 to turn ON corresponding ones of the triggers 212 so that the CHARACTER presently on the CPU W BUS is effectively stored in the CHARACTER REGISTER 208.

The signals from the left-hand outputs of the triggers 212 are applied to the CHAR CODE CK UNIT 232 in Fig. 21D, in accordance with the CHARACTER presently stored in the CR 208, where a vertical check is made to insure that there are an even number of 1 bits in the CHARACTER. If the CHARACTER has an odd number of 1 bits, then this condition is detected by the CHAR CODE CK UNIT 232 to bring up the CHAR CODE CK A line which conditions the AND circuit 274 of the ERROR CHECK UNIT 268 in Fig. 21F.

*Step 32*

At W3 time, referring to the DATA TFR & CK EX TIMER 949 in Fig. 27B, the positive pulse on the W3(D1.5) line, in combination with the WCLB and CTRL 8 W lines being up, passes via the AND circuit 952 and the OR circuit 953 to bring up the CHAR CODE CK A TO R/W CK line which condition is passed to the AND circuit 274 in the ERROR CHECK UNIT 268 in Fig. 21F. If the AND circuit 274 is conditioned by the CHAR CODE CK A line being up, due to the existence of an odd number of 1 bits in the CHARACTER presently stored in the CR 208, the positive pulse passes via the AND circuit 274 and the OR–C circuit 270 to turn ON the R/W CK trigger 279 which, in being turned ON, applies a positive signal from its right-hand output which, in combination with the THIS DC SELECTED line being up, passes via the AND circuit 282 to bring up the R/W CK line.

*Step 33*

At W3.5 time, referring to the CLOCK CONTROL UNIT 802 in Fig. 26D and the 7 COUNTER 876 in Fig. 26C, Step 6 is repeated to effectively bring up the CLOCK GATE line to initiate another cycle of operation of the CLOCK 814 and to advance the count of the 7 COUNTER 876.

*Step 34*

At R0 time, referring to the TAPE R/W CYCLE UNIT 588 in Fig. 24C, the negative shift of the trailing edge of the positive pulse on the W2.5(D1.5) line is applied to turn OFF the WCLB trigger 597 which, in being turned OFF, applies a positive signal from its left-hand output to bring up the $\overline{WCLB}$ line and applies a negative signal from its right-hand output to bring down the WCLB line and, via the OR circuit 595, to bring down the WCL line.

*Step 35*

Steps 20 to 34 are repeated for each CHARACTER of DATA of the RECORD or group of RECORDS transferred from the CENTRAL PROCESSING UNIT to the SELECTED TAPE UNIT 2.

Now, let it be assumed that the CENTRAL PROCESSING UNIT is performing a clock cycle which will transfer the GM CHARACTER from the CPU MEMORY to the CPU W BUS.

Thus, Steps 20 to 29 are repeated during which the last CHARACTER of the RECORD is written on the SELECTED TAPE and then echo checked after which the CHARACTER REGISTER 208 is cleared.

Hence, at R2 time, the CENTRAL PROCESSING UNIT having previously detected the GM CHARACTER, now effectively brings down the CPU W CALL line. The CPU W CALL line in coming down is effective, in the INSTRUCTION DECODER in Fig. 22, to bring down W CALL line which, in coming down applies a negative shift to the peaker 766 of the PROGRAM CONTROL UNIT 778 in Fig. 25J which responds thereto and applies a 2 microsecond positive pulse on the W CALL CTRL line. The positive pulse on the W CALL CTRL line, in combination with the $\overline{CPU\ TO\ DC}$ line being up, passes via the AND circuit 776 to bring up the W CALL CTRL & $\overline{CPU\ TO\ DC}$ line which condition is passed to the TAPE W CONTROL UNIT 720 in Fig. 25F. The positive shift on the W CALL CTRL & CPU TO DC line passes via the OR circuit 701 to the inverter 702 where it is inverted to a negative shift to turn ON the 275 microsecond RESET DEL single shot 703. At the same time, referring to the TAPE W TYPE CYCLE UNIT 524 in Fig. 24A, the positive shift on the W CALL CTRL lines passes via the OR circuit 550 to the inverter 552 where it is inverted to a negative shift to turn OFF the W PULSE GATE trigger 546 and the CTRL 8 W TC1 trigger 536. The CTRL 8 W TC1 trigger 536 in being turned OFF is effective to bring down the CTRL 8 W TC1 line and the W PULSE GATE trigger 546 in being turned OFF is effective to bring down the GATE W PULSE line.

Referring now to the STATUS DECODER 400 in Fig. 23, the W CALL line in coming down is effective to decondition the AND circuit 408 to bring down the CTRL 8 W line which condition is passed to the TAPE W STATUS UNIT 648 in Fig. 25D. The negative signal on the CTRL 8 W line passes via the OR circuit 639 to decondition the AND circuit 640 to bring down the SET W B line which condition is passed to decondition the AND circuit 641 to bring down the START W B line. Referring now to the TAPE W CONTROL UNIT 720 in Fig. 25F, the negative on the START W B line passes via the OR circuit 688 to decondition the AND circuit 639 causing a negative signal to be applied via the OR circuit 691 to bring down the GO BUS B line to signal the SELECTED TAPE UNIT 2 to stop its forward motion.

*Step 36*

At R4 time, referring to the TAPE R/W CYCLE UNIT 588 in Fig. 24C, Step 30 is repeated wherein the WCLA trigger 594 is turned OFF to effectively bring down the WCLA line and bring up the $\overline{WCLA}$ line.

*Step 37*

At W1 time, referring to the DATA TFR & CK EX TIMER 949 in Fig. 27D, Step 31 is not repeated to bring up the CPU W BUS TO CR 208 line inasmuch as the CTRL 8 W TC1 line is now down thereby preventing the GM CHARACTER, presently on the CPU W BUS, from being transferred to the CHARACTER REGISTER 208.

*Step 38*

At W3 time, referring to the DATA TFR & CK EX TIMER 949 in Fig. 27D, Step 32 is not repeated to bring up the CHAR CODE CK A TO R/W CK line inasmuch as the CTRL 8 W line is now down and in any event is unnecessary inasmuch as no CHARACTER is presently stored in the CR 208.

*Step 39*

At W3.5 time, referring to the CLOCK CONTROL UNIT 802 in Fig. 26D and the 7 COUNTER 876 in Fig. 26C, Step 6 is repeated to effectively bring up the CLOCK GATE line to initiate another cycle of operation of the CLOCK 814 in Fig. 26B and to advance the count of the 7 COUNTER 876.

Step 40

At R0 time, referring to the TAPE R/W CYCLE UNIT 588 in Fig. 24C, Step 34 is repeated wherein the WCLB trigger 597 is turned OFF effectively causing the WCLB and WCL lines to be brought down and the $\overline{\text{WCLB}}$ lines to be brought up.

Step 41

Referring now to the TAPE W CONTROL UNIT 720 in Fig. 25F, Step 6 is repeated to continue cycling the CLOCK 814 until the 275 microsecond RESET DEL single shot 703 returns to its OFF state causing a negative shift to be applied from its right-hand tapped output to turn ON the 10 microsecond RESET GATE single shot 704 which, in being turned ON, applies a positive signal from its right-hand output via the OR circuit 707 to bring up the GATE W ECHO TO CR 208 line which condition is passed to the CR 208 in Fig. 21A to effectively condition the CHARACTER REGISTER 208 to receive the LRC CHARACTER to be echoed back on the TAPE W ECHO BUS.

At the same time, the positive signal output of the RESET GATE single shot 704 is applied via the OR circuit 706 and, in combination with the TU B SEL circuit 706 and, in combination with the TU B SEL circuit $\overline{\text{PREP TO R B}}$ line being up, via the AND circuit 710 to bring up the RESET W TGR B (Z) line which condition is passed to the SELECTED TAPE 2 causing the WRITE trigger therein to be reset whereby a LRC CHARACTER is written on the TAPE. At the same time that the LRC CHARACTER is written on the SELECTED TAPE a combination of signals corresponding to this check CHARACTER is echoed back via the TAPE W ECHO BUS to the CHARACTER REGISTER 208 in Fig. 21A. Note, however, no CHARACTER is presently stored in the CHARACTER REGISTER 208 inasmuch as it was previously cleared. Therefore, since the CHARACTER REGISTER 208 is reset the CR 208 NOT RESET & GM RECOGNITION UNIT 234 in Fig. 21D maintains the CR 208 NOT RESET line down to decondition the AND circuit 274 of the ERROR CHECK UNIT 268 in Fig. 21F.

Step 42

10 microseconds later, referring to the TAPE W CONTROL UNIT 720 in Fig. 25F, the RESET GATE single shot 704 returns to the OFF state causing a negative shift to be applied from its right-hand output to the peaker 708 which applies a 2 microsecond positive pulse to the RESET STATUS line.

Referring now to the W EX TIMER 994 in Fig. 27D, the positive pulse on the RESET STATUS line, in combination with the $\overline{\text{W TM CALL}}$ line being up, passes via the AND circuit 999 and the OR circuit 998 to bring up the CR 208 NOT RESET GATE TO REC CK line which condition is passed to the AND circuit 274 of the ERROR CHECK UNIT 268 in Fig. 21F. Since the AND circuit 274 is deconditioned this pulse has no effect on the ERROR CHECK UNIT 268.

Referring now to the DATA TFR & CK EX TIMER 949 in Fig. 27D, the positive pulse on the RESET STATUS line, in combination with the CTRL 8 line being up, passes via the AND circuit 980 and the OR circuit 979 to bring up the W DISC line which condition is passed to the DISCONNECT EX TIMER 984 in Fig. 27A. The positive shift on the W DISC line is passed via the OR circuit 990 to the inverter 991 where it is inverted to a negative shift to turn ON the 10 microsecond CTRL/W DISC single shot 992 which, in being turned ON, applies a positive signal via its right-hand output to bring up the CTRL/W DISC line for 10 microseconds to signal the CPU to terminate the WRITE instruction and proceed to the next instruction of the PROGRAM.

Step 43

Two microseconds later, referring to the TAPE W TYPE CYCLE UNIT 524 in Fig. 24D, the negative shift of the trailing edge of the positive pulse on the RESET STATUS line passes via a negative shift input to turn OFF the COND W ECHO trigger 538 which, in being turned OFF, applies a negative signal from its right-hand output to bring down the COND W ECHO line.

At the same time, referring to the STATUS DECODER 400 in Fig. 23, the negative shift of the trailing edge of the positive pulse on the RESET STATUS line passes via a negative shift input to turn OFF the CTRL 8 trigger 404 which, in being turned OFF, applies a positive signal from its left-hand output to bring up the $\overline{\text{CTRL 8}}$ line and applies a negative signal from its right-hand output to bring down the $\overline{\text{CTRL 8}}$ line.

Step 44

At W2.5 time, referring to the CLOCK CONTROL UNIT 802 in Fig. 26D, the negative shift of the trailing edge of the positive pulse on the W1(D1.5) line in combination with the $\overline{\text{BKWD+TU TO DC}}$, $\overline{\text{DC TO TU}}$ and $\overline{\text{CTRL 8}}$ lines being up, passes via the AND circuit 836 to turn OFF the LONG CLOCK trigger 834 which, in being turned OFF (applies a negative signal from its right-hand output via the OR circuit 826 to decondition the AND circuit 828 and thereby prevent any further cycling of the CLOCK 814.

Step 45

At the end of the WRITE instruction, the CPU issues a positive signal via the CPU END R/W line to the INSTRUCTION DECODER 300 in Fig. 22. A positive signal on the CPU END R/W line in combination with THIS DC SELECTED line being up, passes via the AND circuit 326 to bring up the END R/W line which condition is passed to turn ON the trigger 277 in the ERROR CHECK UNIT 268 in Fig. 21F. At the termination of the CPU END R/W signal the END R/W line comes down to turn OFF the trigger 277 which, in being turned OFF, applies a negative signal from its right-hand output to turn OFF the R/W CK trigger 279 or the REC CK trigger 280 if they have been turned ON during the execution of the WRITE instruction, to bring down the R/W CK line or the REC CK line to signal the CPU that an error had occurred in the transfer of the RECORD or group of RECORDS from the CPU to the SELECTED TAPE UNIT 2. This ends the present mode of operation.

CENTRAL PROCESSING UNIT TO DATA COORDINATOR TO TAPE UNIT

(Early Tape Start)

It will be remembered that the MEMORY 50 of the DATA COORDINATOR is capable of storing 1024 CHARACTERS and, since it requires 9 microseconds to process each CHARACTER transferred from the CENTRAL PROCESSING UNIT to the DATA COORDINATOR, it would require approximately 9.2 milliseconds to transfer the maximum RECORD from the CENTRAL PROCESSING UNIT to the DATA COORDINATOR. Also, it will be remembered that when a SELECTED TAPE UNIT is set to the WRITE STATUS and its TAPE is started, a 10 millisecond WRITE DELAY is provided before the TAPE writing operation commences. Consequently, the CPU TO DC TO TU mode of operation functions to utilize this delay period to transfer a RECORD or group of RECORDS from the CENTRAL PROCESSING UNIT to the MEMORY 50 of the DATA COORDINATOR so that by the time the TAPE writing operation commences the DATA COORDINATOR is ready to transfer the RECORD or group of RECORDS now in the MEMORY 50 to the SELECTED TAPE.

A CPU TO DC TO TU mode of operation is performed by a process of 2 instructions, namely, a SELECT instruction followed by a WRITE instruction. Thus, the PROGRAM for an exemplary CPU TO DC TO TU mode of operation may be as follows:

SELECT 20603
WRITE R1132

Simply interpreted, the operation part 2 of the SELECT instruction designates that a SELECT operation is to be performed, while the ADDRESS part 0603 of the SELECT instruction designates the DATA COORDINATOR as the SELECTED input/output unit and the TAPE UNIT 3 as the SELECTED TAPE UNIT. Similarly, the operation part R of the WRITE instruction designates that a WRITE is to be performed, while the ADDRESS part 1132 of the WRITE instruction designates the ADDRESS in the MEMORY of the CPU starting from which the RECORD group of RECORDS may be transferred to the MEMORY 50 in the DATA COORDINATOR.

THE CPU TO DC TO TU mode of operation will now be described in a step by step manner wherein all operations within a step occur at relatively the instance of time and with reference being made to the detailed logical block diagrams of the major components of the DATA COORDINATOR shown in Figs. 20 to 27, inclusive.

Step 1

Initially, the DATA COORDINATOR is ready to perform an operation as previously explained in the section on the DATA COORDINATOR READY. Thus, referring to the DC RDY UNIT 840 in Fig. 26B, a positive signal is initially maintained on the DC RDY line.

Now, when the SELECT instruction is called for, the ADDRESS part is applied to the SELECT ADDRESS DECODER 602 in Fig. 25A in the form of binary coded signals. The SELECT ADDRESS DECODER 602 decodes the signals to bring up the THIS DC SELECTED line, the DC SEL & RDY line, the SEL TU3 line and the TU B SEL line in a manner as previously described in the section on SELECT ADDRESS DECODING.

Step 2

After the execution of the SELECT instruction, the PROGRAM steps to the WRITE instruction which causes the CPU to go through a cycle of operation during which the first CHARACTER is effectively transferred from the CPU MEMORY to the CPU W BUS and the CPU W CALL line is brought up. The positive shift on the CPU W CALL line, in combination with the DC SEL & RDY line being up, passes via the AND circuit 304 of the INSTRUCTION DECODER 300 in Fig. 22 to bring up the W CALL line.

Referring now to the SELECT ADDRESS DECODER 602 in Fig. 25B, the positive signal on the W CALL line passes via the OR-C circuit 619 and, in combination with the SEL TU3 line being up, passes via the AND circuit 616f to turn ON the TU3 SEL trigger 620f which, in being turned ON, maintains a positive signal on the SEL TU3 line and, via the OR circuit 621b, on the TU B SEL line thereby remembering which TAPE UNIT was previously selected.

Referring now to the STATUS DECODER 400 in Fig. 23, the positive shift on the W CALL line, in combination with the $\overline{CTRL\ 8}$ line being up, passes via the AND circuit 422 to turn ON the CPU to DC trigger 418 which, in being turned ON, applies a negative signal from its left-hand output to bring down the $\overline{CPU\ TO\ DC}$ line and applies a positive signal from its right-hand output to bring up the CPU to DC line. The positive shift output of the AND circuit 422 is also applied via the OR circuit 424 and, in combination with the TUB SEL line being up via the OR circuit 426, passes via the AND circuit 428 to the inverter 430 where it is inverted to a negative shift to turn ON the DC TO TU trigger 432 which, in being turned ON, applies a negative signal from its left-hand output to bring down the $\overline{DC\ TO\ TU}$ line and applies a positive signal from its right-hand output to bring up the DC TO TU line.

Referring now to the RESET UNIT 102 in Fig. 20G, the positive shift on the CPU TO DC line is applied via the OR circuit 104 to the inverter 106 and where it is inverted to a negative shift causing the peaker 108 to apply a 2 microsecond positive pulse via the RESET AC 112 line to reset all of the triggers 110 of the ADDRESS COUNTER 112 so that the ADDRESS COUNTER 112 stands with a count of 0. The positive shift on the CPU TO DC line is also applied to the RESET EX TIMER 924 in Fig. 27B, where it passes via the OR circuit 940 to the inverter 941 where it is inverted to a negative shift and applied via the RESET LRCR line to the LRCR 242 in Fig. 21D. The negative shift on the RESET LRCR line is effective via the negative shift inputs to reset all of the triggers 243 of the LRCR 242 in preparation for initiating the production of a longitudinal redundancy check (LRC) CHARACTER.

Referring now to the DC & CPU TYPE CYCLE UNIT 560 in Fig. 24B, the negative shift on the $\overline{CPU\ TO\ DC}$ line is applied via a negative shift input to turn ON the CPU TO DC TC1 trigger 562 which, in being turned ON, applies a positive isgnal via its right-hand output to bring up the CPU TO DC TC1 line and, via the OR circuit 564, to bring up the CPU TO DC TC1+2 line. The positive signal on the CPU TO DC TC1+2 line passes via the OR circuit 903 in the MEMORY EX TIMER 902 in Fig. 27A to bring up the MEM W line and, via the OR circuit 904, to bring up the MEM R/W line.

Referring now to the DC RDY UNIT 840 in Fig. 26D, the negative shift on the $\overline{DC\ TO\ TU}$ line deconditions the AND circuit 842 causing a negative signal to be applied via the OR circuit 844 to bring down the DC RDY line which remains down during this entire mode of operation. The negative signal on the DC RDY line is applied to the SELECT ADDRESS DECODER 602 in Fig. 25A where it is effective to bring down the DC SEL & RDY line, in a manner as previously described in the section on SELECT ADDRESS DECODING, to signal the CPU that the DC is now busy with a TAPE operation. Also, the DC SEL & and RDY line in coming down is effective to decondition the INSTRUCTION DECODER 300 in Fig. 22 and the SELECT ADDRESS DECODER 602 so that the INSTRUCTION DECODER 300 is blocked from decoding a subsequent operational instruction involving the DATA COORDINATOR and the SELECT ADDRESS DECODER 602 is blocked from decoding the ADDRESS part of a subsequent SELECT instruction which selects the DATA COORDINATOR until the present mode of operation is completed.

Referring now to the RESET UNIT 118 in Fig. 20G, the negative shift on the $\overline{DC\ TO\ TU}$ line also deconditions the AND circuit 120 causing a negative shift to be applied to the peaker 122 which applies a 2 microsecond positive pulse via the RESET AC 124 line to reset all of the triggers 126 of the ADDRESS COUNTER 124 in Fig. 20F so that the ADDRESS COUNTER 124 stands with a count of 0.

Referring now to the TAPE W STATUS UNIT 648 in Fig. 25D, the positive signal on the DC TO TU line passes via the OR circuit 639 and, in combination with the TU B SEL and $\overline{PREP\ TO\ R\ B}$ lines being up, passes via the AND circuit 640 to bring up the SET W B line which condition is passed to the SELECTED TAPE UNIT 3 causing it to be set a WRITE STATUS in preparation for the forthcoming writing operation.

Step 3

As soon as the SELECTED TAPE UNIT 3 is set to the WRITE STATUS it transfers a signal back via the SEL, RDY & W B line to the TAPE W STATUS UNIT 648 in Fig. 25B where, in combination with the SET W B and $\overline{\text{BKWD TO FWD DEL}}$ lines being up, it passes via the AND circuit 941 to bring up the START W B line. The positive signal on the START W B line passes via the OR circuit 688 in the TAPE W CONTROL UNIT 720 in Fig. 25F and, in combination with the SET W B and $\overline{\text{BKWD TO FWD DEL}}$ lines being up, it passes via the AND circuit 941 to bring up the START W B line. The positive signal on the START W B line passes via the OR circuit 688 in the TAPE W CONTROL UNIT 720 in Fig. 25F and, in combination with the $\overline{\text{PREP TO R B}}$ and TU B SEL lines being up, passes via the AND circuit 689 and via the OR circuit 691 to bring up the GO BUS B line which condition is passed to the SELECTED TAPE UNIT 3 to start the TAPE moving in a forward direction. The positive shift output of the OR circuit 688 also passes via the OR circuit 696 to the inverter 698 where it is inverted to a negative shift to turn ON the 10 microsecond W TGR RESET single shot 699 which, in being turned ON applies a positive signal from its right-hand output via the OR circuit 706 and, in combination with the TU B SEL and $\overline{\text{PREP TO R B}}$ lines being up, passes via the AND circuit 710 to bring up the RESET W TGR B (Z) line which condition is passed to the SELECTED TAPE UNIT 3 causing the WRITE TRIGGERS therein to be reset in preparation for the forthcoming writing operation.

Now, let it be assumed that the LOAD POINT of the SELECTED TAPE is not initially being sensed. Consequently, referring to the TAPE W CONTROL UNIT 720 in Fig. 25F, the SEL & AT LP B Line is down to decondition the AND circuit 693 causing a negative signal to be passed via the OR circuit 694 to the inverter 716 where it is inverted to a positive signal. The negative signal output of the OR circuit 694 is also applied to decondition the AND circuit 697 and thereby block the positive signal output of the OR circuit 696 from effecting the W LP DEL single shot 715 with the resulting effect being that the now positive output of the inverter 716 and the positive left-hand output of the W LP DEL single shot 715 condition the AND circuit 717. Consequently, the positive signal on the START W B line passes via the OR circuits 688 and 696 and the now conditioned AND circuit 717 to the inverter 718 where it is inverted to a negative signal to turn ON the 10 millisecond W DEL single shot 719.

Referring now to the RESET EX TIMER 924, in Fig. 20B, the positive shift on the 10 MS W DEL line, in combination with the $\overline{\text{W TM CALL}}$ line being up, passes via the AND circuit 930 and the OR circuit 927 to the inverter 928 where it is inverted to a negative shift and applied via the RESET CR 208 line to the CHARACTER REGISTER 208 in Fig. 21A. The negative shift on the RESET CR 208 is applied via negative shift inputs to reset all of the triggers 212 to effectively clear the CHARACTER REGISTER 208 in preparation for receiving the first CHARACTER from the MEMORY 50.

Step 4

Since the maximum RECORD transfer from the CPU to the DC requires approximately 9.2 milliseconds, then, during the present 10 millisecond WRITE DELAY period a sequence of events occur which are identical to Steps 3 to 43 of the CPU TO DC mode of operation. Consequently, reference should be made thereto for a detailed description thereof.

Step 5

10 milliseconds later, after the RECORD transfer is completed between the CPU and the DC, a sequence of events occur which are identical to Steps 6 to 57 of the DC TO TU mode of operation. Consequently, reference should be made thereto for a detailed description thereof during which the RECORD or group of RECORDS now in the MEMORY 50 of the DATA COORDINATOR is transferred to the TAPE of the SELECTED TAPE UNIT 3, thereby ending this mode of operation.

TAPE UNIT TO DATA COORDINATOR

The TU TO DC mode of operation functions to transfer a RECORD or group of RECORDS from the TAPE of a SELECTED TAPE UNIT to the MEMORY 50 of the DATA COORDINATOR.

A TU TO DC mode of operation may be performed by a process of 2 instructions, namely, a SELECT instruction followed by a CONTROL instruction. Thus, the PROGRAM for an exemplary TU TO DC mode of operation may be as follows:

```
SELECT 20601
CTRL   30006
```

Simply interpreted, the operation part 2 of the SELECT instruction designates that a SELECT operation is to be performed while the ADDRESS part 0601 of the SELECT instruction designates the DATA COORDINATOR as the SELECTED input/output unit and the TAPE UNIT 1 as the SELECTED TAPE UNIT. Similarly, the operation part 3 of the CONTROL instruction designates a CONTROL operation is to be performed, while the ADDRESS part 0006 of the CONTROL instruction designates that a RECORD or group of RECORDS is to be read from the TAPE of the SELECTED TAPE UNIT 1 and transferred to the MEMORY 50 of the DATA COORDINATOR.

The TU TO DC mode of operation will now be described in a step by step manner wherein all operations within a step occur at relatively the instant of time and with reference being made to the detailed logical block diagram of the major components of the DATA COORDINATOR shown in Figs. 20 to 27, inclusive. Reference may be made to the timing diagrams of Fig. 30 to aid in understanding the sequence of the present operation.

Step 1

Initially the DATA COORDINATOR is ready to perform an operation previously explained in the section on the DATA COORDINATOR READY. Thus, referring to the DC RDY UNIT 840 in Fig. 26B, a positive signal is initially maintained on the DC RDY line.

Now, when the SELECT instruction is called for, the ADDRESS part is applied to the SELECT ADDRESS DECODER 602 in Fig. 25A in the form of binary coded signals. The SELECT ADDRESS DECODER 602 decodes the signals to bring up the THIS DC SELECTED line, the DC SEL & RDY line, the SEL TU1 line and the TU A SEL line in a manner as previously described in the section on SELECT ADDRESS DECODING. The DC SEL & RDY line in coming up signals the CPU that the DC is SELECTED and READY to operate.

Step 2

After the execution of the SELECT instruction, the PROGRAM steps to the CONTROL 0006 instruction which causes the CPU to go through a cycle of operation during which the CPU CTRL 0006 line brought up. The positive shift on the CPU CTRL 0006 line, in combination with DC SEL & RDY line being up, passes via the AND circuit 320 of the INSTRUCTION DECODER 300 in Fig. 22, to bring up the CTRL 0006 line.

Referring now to the STATUS DECODER 400 in Fig. 23, the positive shift on the CTRL 0006 line is applied to the inverter 434 where it is inverted to a negative shift to turn ON the CTRL 6 trigger 436 which, in being turned ON, applies a positive signal from its right-hand output to bring up the CTRL 6 line. The positive shift on the CTRL 6 line passes via the OR circuit 538 and, in combination with the $\overline{\text{CTRL 8}}$ line being up and the TU A SEL line being up via the OR circuit 426, via the AND circuit 440 to the inverter 442 where it is inverted to a negative shift to turn ON the TU TO DC status trigger 444 which, in being turned ON, applies a positive signal from its right-hand output to bring up the TU TO DC line. At the same time, referring to the SELECT ADDRESS DECODER 602 in Fig. 25B, the positive shift on the CTRL 6 line passes via the OR-C circuit 619 and, in combination with the SEL TU1 line being up, via the AND circuit 616b to turn ON the TU1 SEL trigger 620b which, in being turned ON maintains a positive signal on the SEL TU1 line and, via the OR circuit 621a, on the TU A SEL line thereby remembering which TAPE UNIT was previously selected. Also, at the same time, referring to the TAPE R STATUS UNIT 638 in Fig. 25C, the positive shift on the CTRL 6 line passes via the OR circuit 623 and, in combination with the PREP TO R B line being up, via the AND circuit 624 to turn ON the PREP TO R A trigger 626 which, in being turned ON, applies a negative signal from its left-hand output to bring down the PREP TO R A line and applies a positive signal from its right-hand output to bring up the PREP TO R A line and to condition the AND circuit 629.

Referring now to the DISCONNECT EX TIMER 984 in Fig. 27A, the positive shift on the TU TO DC line, in combination with CTRL 6 line being up, passes via the AND circuit 988 and the OR circuit 985 to the inverter 986 where it is inverted to a negative shift to turn ON the 10 microsecond CTRL/R DISC single shot 987 which, in being turned ON, brings up the CTRL/R DISC line for 10 microseconds to signal the CPU to terminate the CONTROL instruction and proceed to the next INSTRUCTION of the PROGRAM. The positive shift on the CTRL/R DISC line is also applied to the STATUS DECODER 400 in Fig. 23 to turn OFF the CTRL 6 trigger 436 which, in being turned OFF, applies a negative signal from its right-hand output to bring down the CTRL 6 line.

Referring now to the CLOCK CONTROL UNIT 802 in Fig. 26D, the positive signal on the TU TO DC line passes via the OR circuit 805 to the inverter 807 where it is inverted to a negative signal to bring down the BKWD+TU TO DC line which condition is applied to the DC TDY UNIT 840 to decondition the AND circuit 842 causing a negative signal to be applied via the OR circuit 844 to bring down the DC RDY line which remains down during this entire mode of operation. The negative signal on the DC RDY line is applied to the SELECT ADDRESS DECODER 602 in Fig. 25A where it is effective to bring down the DC SEL & RDY line, in a manner as previously described in the section on SELECT ADDRESS DECODING, to signal the CPU that the DC is now busy with a TAPE operation. Also, the DC SEL & RDY line in coming down is effective to decondition the INSTRUCTION DECODER 300 in Fig. 22 and the SELECT ADDRESS DECODER 602 so that the INSTRUCTION DECODER 300 is blocked from decoding a subsequent operational instruction involving the DATA COORDINATOR and the SELECT ADDRESS DECODER 602 is blocked from decoding the ADDRESS part of a subsequent SELECT instruction, which selects the DATA COORDINATOR, until the present mode of operation is completed.

Referring now to the MULTIPLE OPERATION TIMER UNIT 732 in Fig. 25G, the positive signal on the TU TO DC line, in combination with the left-hand outputs of the TAPE R CALL LP DEL single shot 722 and TAPE R CALL DEL single shot 726 being up, passes via the AND circuit 727 to bring up the TAPE R CALL line which condition is passed to the TAPE R STATUS UNIT 638 in Fig. 25C. The positive signal on the TAPE R CALL line passes via the OR circuit 628 and via the now conditioned AND circuit 629 and via the OR circuits 631 and 633 to bring up the SET R A line which condition is passed to the SELECTED TAPE UNIT 1 causing it to be set to a READ STATUS in preparation for the reading operation.

*Step 3*

As soon as the SELECTED TAPE UNIT 1 is set to the READ STATUS it transfers a signal back via the SEL, RDY & R A line to the TAPE R STATUS UNIT 638 in Fig. 25C. The positive signal on the SEL, RDY & R A line, in combination with the positive output of the OR circuit 631 and the BKWD TO FWD DEL line being up passes via the AND circuit 635 and the OR circuit 637 to bring up the START R line.

Referring now to the TAPE W CONTROL UNIT 720 in Fig. 25F, the positive signal on the START R line, in combination with the PREP TO R A line being up, passes via the AND circuit 712 and the OR circuit 713 to bring up the GO BUS A line which condition is passed to the SELECTED TAPE UNIT 1 to start the TAPE moving in a forward direction.

If the LOAD POINT of the SELECTED TAPE is initially being sensed, then, a positive signal is maintained on the SEL & AT LP line. Therefore, assuming that the LOAD POINT of the SELECTED TAPE is presently being sensed, the SEL & AT LP A line is up and in combination with the PREP TO R A line being up causes the AND circuit 672 to apply a positive signal via the OR circuit 674 to condition the AND circuit 675. The positive signal output of the OR circuit 674 is also applied to the inverter 676 where it is inverted to a negative signal to decondition the AND circuit 679. Thus, the positive signal on the START R line passes via the now conditioned AND circuit 675 to the inverter 677 where it is inverted to a negative signal to turn ON the 20 millisecond R LP DEL single shot 678 which, in being turned ON, applies a negative signal from its left-hand output to maintain the AND circuit 679 deconditioned.

*Step 4*

When the LOAD POINT on the SELECTED TAPE has moved past the LOAD POINT sensing device, the SEL & AT LP line is brought down which, in the present instance, causes a negative signal to be applied via the SEL & AT LP A line to decondition the AND circuit 672 causing a negative signal to be applied via the OR circuit 674 to the inverter 676 where it is inverted to a positive signal which, in combination with the START R and BKSP AFTER W lines being up, conditions the AND circuit 679.

*Step 5*

After the 20 millisecond READ LOAD POINT DELAY, the R LP DEL single shot 678 returns to its OFF state causing a positive shift to be applied from its left hand output via the now conditioned AND circuit 679 to the inverter 680 where it is inverted to a negative shift to turn ON the 5 millisecond R DEL single shot 681 which, in being turned ON, applies a positive signal from its right-hand output to bring up the 5 MS R DEL line. If the LOAD POINT of the SELECTED TAPE is not initially being sensed, then, there is no need for the READ LOAD POINT DELAY and instead only a 5 millisecond READ DELAY is necessary to allow sufficient time for the TAPE of the SELECTED TAPE UNIT to get up to speed. It will be remembered, as explained in the DC TO TU mode of operation, that a 10 millisecond WRITE DELAY was provided before a CHARACTER was written on the SELECTED TAPE. Consequently, in the present instance, since the READ operation is delayed for only 5 milliseconds, the first CHARACTER of the RECORD previously written on the SELECTED TAPE is certain to be read by the time it reaches the R/W heads of the SELECTED TAPE UNIT 1. Thus, if the LOAD POINT of the SELECTED TAPE is not initially sensed, then, the SEL & AT LP A line is down to decondition the AND circuit 672 causing a negative signal to be applied via the OR circuit 674 to the inverter 676 where it is inverted to a positive signal. The negative signal output of the OR circuit 674 is also applied to decondition the AND circuit 675 to block the positive signal on the START R line from effecting the R LP DEL single shot 678 with the resulting effect being that the now positive output of the inverter 676 and the positive left-hand output of the R LP DEL single shot 678 condition the AND circuit 679 so that when the positive signal is applied to the START R line it passes via the now conditioned AND circuit 679 to the inverter 680 where it is inverted to a negative signal to turn ON the 5 millisecond R DEL single shot 681 causing a positive signal to be applied from its right-hand output to bring up the 5 MS R DEL line.

Step 6

5 milliseconds later, referring to the TAPE R CONTROL UNIT 687 in Fig. 25E, the R DEL single shot 681 returns to its OFF state causing a negative shift to be applied from its right-hand output to bring down the 5 MS R DEL line and causing a negative shift to be applied from its right-hand tapped output to turn ON the DEL R CALL trigger 682 which, in being turned ON, applies a positive signal from its right-hand output to bring up the DEL R CALL line. The positive signal on the DEL R CALL line is applied via the OR circuit 522 of the TAPE R TYPE CYCLE UNIT 502 in Fig. 24A to bring up the DEL R CALL + TAPE R TC3 line. The positive signal on the DEL R CALL line is also applied to the READ AMPLIFIER UNIT 741 in Fig. 25H where it is effective to condition the R amplifiers 740 to respond to the CHARACTERS which are to be applied via the R BUS A from the SELECTED TAPE UNIT 1.

Referring now to the TAPE R TYPE CYCLE UNIT 502 in Fig. 24A, the negative shift on the 5 MS R DEL line is applied to turn ON the TAPE R TC1 trigger 506 which, in being turned ON, applies a positive signal from its right-hand output to bring up the TAPE R TC1 line. The positive signal on the TAPE R TC1 line, in combination with the positive signals from the left-hand outputs of the TAPE R TC2 and TAPE R TC3 triggers 510 and 514, respectively, passes via the AND circuit 508 to bring up the TAPE R TC1 but $\overline{2}$ & $\overline{3}$ line. The positive signal on the TAPE R TC1 but $\overline{2}$ & $\overline{3}$ line passes via the OR circuit 516 to bring up the TAPE R TC1 + 2 + 3 line and via the OR circuit 518 to bring up the TAPE R TC1 + 3 but $\overline{2}$ line.

Referring now to the CLOCK CONTROL UNIT 802 in Fig. 26D, the positive shift on the TAPE R TC1 but 2 & 3 line, in combination with the TU TO DC line being up, passes via the AND circuit 838 and the OR circuit 830 to the inverter 832 where it is inverted to a negative shift to turn ON the LONG CLOCK trigger 834. The LONG CLOCK trigger 834, in being turned ON, applies a positive signal from its right-hand output via the OR circuit 826 to condition the AND circuit 828 and applies a negative shift from its left-hand tapped output to turn ON the INITIATE trigger 810 which, in being turned ON applies a positive signal from its right-hand output via the OR circuit 812 to bring up the CLOCK GATE line to initiate a cycle of operation of the CLOCK 814 in a manner as previously described in the section on the CLOCK PULSE GENERATOR.

Referring now to the READ REGISTER 743 in Fig. 25H, the negative shift on the 5 MS R DEL line passes via negative shift inputs to reset all of the triggers 742 to effectively clear the READ REGISTER 743 in preparation for receiving the first CHARACTER from the SELECTED TAPE UNIT 1.

Refering now to the CHARACTER RECOGNITION UNIT 752 in Fig. 25I, the negative shift on the 5 MS R DEL line is applied to turn ON the 1st CHAR GATE trigger 744 which, in being turned ON, applies a positive signal from its right-hand output to bring up the 1st CHAR GATE line and to condition the AND circuit 749. The positive shift on the 1st CHAR GATE line is applied to the RESET UNIT 102 in Fig. 20G where it passes via the OR circuit 104 to the inverter 106 and is inverted to a negative shift causing the peaker 108 to apply a 2 microsecond positive pulse via the RESET AC 112 line to reset all of the trigger 110 of the ADDRESS COUNTER 112 so that the ADDRESS COUNTER 112 stands with a count of 0. The triggers 110, in being reset, are effective to apply negative signals via their right-hand outputs to decondition the AND circuits 114 of the COUNTER GATE 116. The positive shift on the 1st CHAR GATE line is also applied to the RESET EX TIMER 924 in Fig. 27B where it passes via the OR circuit 940 to the inverter 941 where it is inverted to a negative shift and applied via the RESET LRCR line to the LRCR 242 in Fig. 21D. The negative shift on the RESET LRCR line is effective via negative shift inputs to reset all of the triggers 243 of the LRCR 242 in preparation for initiating the production of a longitudinal redundance check (LRC) CHARACTER.

Step 7

At R0 time, referring to the CLOCK CONTROL UNIT 802 in Fig. 26D, the leading edge of the negative pulse on the $\overline{R0(1.5)}$ line applies a negative shift to turn OFF the INITIATE trigger 810 which, in being turned OFF, applies a negative signal from its right-hand output via the OR circuit 812 to bring down the CLOCK GATE line.

Step 8

The bits of a CHARACTER, when they are written on TAPE, are not written perpendicular to the edge of the TAPE because the TAPE as it is guided through the R/W heads of the SELECTED TAPE UNIT has a tendency to shift with respect to the R/W heads. Consequently, the CHARACTERS assume a slight angle to the edge of the TAPE whereby the bits of each CHARACTER are not normally read simultaneously but rather in a serial manner.

Thus, at W3 time, referring to the READ AMPLIFIER UNIT 741 in Fig. 25H, let it be assumed that a pulse, corresponding to the first 1 bit of the first CHARACTER read from the SELECTED TAPE, is passed via the R BUS A to the READ AMPLIFIER UNIT 741 where it is amplified by a corresponding one of the R amplifiers 740 and applied as a negative shift to turn ON a corresponding one of the triggers 742 of the READ REGISTER 743 which, in being turned ON, applies a positive signal from its right-hand output to the CHARACTER RECOGNITION UNIT 752 in Fig. 25I. Thus, for example, yet it be assumed that the trigger 742f is turned ON causing a positive signal to be applied via the B bit line which passes via the OR circuit 746 and the OR–C circuit 747 to bring up the FIRST BIT line.

Referring now to the CHARACTER GATE COUNTER 858 in Fig. 26C, the positive shift on the FIRST BIT line is applied to the inverter 860 where it is inverted to a negative shift to turn ON the START CHAR GATE trigger 862 which, in being turned ON, applies a positive signal from its right-hand output to condition the AND circuit 863.

Step 9

At W3.5 time, referring to the CLOCK CONTROL 802 in Fig. 26D, the positive pulse on the W3.5(D1) line passes via the now conditioned AND circuit 828 and the OR circuit 812 to bring up the CLOCK GATE line to initiate another cycle of operation of the CLOCK 814 in Fig. 26B.

Step 10

At W4 time, referring to the CHARACTER GATE COUNTER 858 in Fig. 26C, the positive pulse on the W4(D0.5) line passes via the OR–C circuit 864 and the now conditioned AND circuit 863 to the inverter 866 where it is inverted to a negative pulse to turn ON the trigger 868.

Step 11

At R0.5 time, referring to the ADDRESS REGISTER 132 in Fig. 20F, the negative shift of the trailing edge of the positive pulse on the W3.5(D1) line passes via negative shift inputs to reset all of the triggers 136 of the ADDRESS REGISTER 132.

Step 12

At R1 time, referring to the CHARACTER GATE COUNTER 858 in Fig. 26C, the positive pulse on the R1(D1.5) line passes via the OR–C circuit 854 and the now conditioned AND circuit 853 to the inverter 866 where it is inverted to a negative pulse to turn OFF the trigger 868 which, in being turned OFF, applies a negative shift from its right hand tapped output to turn ON the trigger 870.

Step 13

At R3 time, the positive pulse on the R3(D1.5) line passes via the OR–C circuit 864 and the conditioned AND circuit 863 to the inverter 866 where it is inverted to a negative pulse to turn ON the trigger 868.

Step 14

At W0 time, the positive pulse on the W0(D1.5) line passes via the OR–C circuit 864 and the conditioned AND circuit 863 to the inverter 866 where it is inverted to a negative pulse to turn OFF the trigger 868 which, in being turned OFF, applies a negative shift to turn OFF the trigger 870 which, in being turned OFF, applies a negative shift to turn ON the trigger 872.

Step 15

At W2 time, the positive pulse on the W2(D1.5) line passes via the OR–C circuit 864 and the conditioned AND circuit 863 to the inverter 866 where it is inverted to a negative pulse to turn ON the trigger 868.

Step 16

At W3.5 time, referring to the CLOCK CONTROL UNIT 802 in Fig. 26D, Step 9 is repeated to bring up the CLOCK GATE line to initiate another cycle of operation of the CLOCK 814 in Fig. 26B.

Step 17

At W4 time, the positive pulse on the W4(D0.5) line passes via the OR–C circuit 864 and the conditioned AND circuit 863 to the inverter 866 where it is inverted to a negative pulse to turn OFF the trigger 868 which, in being turned OFF applies a negative shift to turn ON the trigger 870.

Step 18

At R1 time, the positive pulse on the R1(D1.5) line passes via the OR–C circuit 864 and the conditioned AND circuit 863 to the inverter 866 where it is inverted to a negative pulse to turn ON the trigger 868.

Step 19

At R3 time, the positive pulse on the R3(D1.5) line passes via the OR–C circuit 864 and the conditioned AND circuit 863 to the inverter 866 where it is inverted to a negative pulse to turn OFF the trigger 868, which, in being turned OFF, applies a negative shift to turn OFF the trigger 870 which, in being turned OFF, applies a negative shift to turn OFF the trigger 872 which, in being turned OFF, applies a negative shift to turn ON the trigger 874 which, in being turned ON, applies a positive signal from its right-hand output to bring up the CHAR GATE line at approximately R3.75 time due to the ripple of the triggers 868 to 874.

Step 20

At R3.75 time, referring to the RESET EX TIMER 924 in Fig. 27B, the positive shift on the CHAR GATE line, in combination with the TU TO DC line being up via the OR circuit 935, passes via the AND circuit 936 and the OR circuit 933 to the inverter 934 where it is inverted to a negative shift to bring down the RESET CR 214 line which condition is applied to the CR 214 in Fig. 21A. The negative shift on the RESET CR 214 line is applied via negative shift inputs to reset all of the triggers 212 to clear the CHARACTER REGISTER 214 in preparation for receiving the first CHARACTER.

Referring now to the TAPE R CONTROL UNIT 687 in Fig. 25E, the positive shift on the CHAR GATE line, in combination with the $\overline{\text{BKWD}}$ and DEL R CALL lines being up and the left-hand outputs of the DISC DEL single shot 686 being up, passes via the AND circuit 683 to the inverter 684 where it is inverted to a negative shift to turn ON the 150 microsecond REC GATE single shot 685 which, in being turned ON, applies a positive signal from its right-hand output to bring up the REC GATE line.

Referring now to the READ REGISTER 743 and the CHARACTER RECOGNITION UNIT 752 in Fig. 25H and 25I, if the first CHARACTER that is read from the SELECTED TAPE is a TM CHARACTER (0111111), then, this condition is detected by the CHARACTER RECOGNITION UNIT 752. Thus, assuming that, due to the TAPE SKEW, the bits of the TM CHARACTER are serially stored in the READ REGISTER 743 in such a manner that the trigger 742f, corresponding to the C bit, is turned ON first and the trigger 742a, corresponding to the 1 bit, is turned ON last. Consequently, as soon as the trigger 742f is turned ON it applies a positive signal from its right hand output via the B bit line to the CHARACTER RECOGNITION UNIT 752 where it passes via the OR circuit 746 to the inverter 748 where it is inverted to a positive signal. Each of the triggers 742d, 742c and 742b in being sequentially turned ON applies a positive signal from its right-hand output via the 8, 4 and 2 bit lines, respectively, to condition the AND circuit 745 by the time the last trigger 742a is turned ON. Hence, the positive signal from the right-hand output of the trigger 742a passes via the now conditioned AND circuits 745 and 749 to condition the diode gate 750.

Step 21

At W0 time, referring to the CHARACTER GATE COUNTER 858 in Fig. 26C, the positive pulse on the W0(D1.5) line passes via the OR–C circuit 864 and the conditioned AND circuit 863 to the inverter 866 where it is inverted to a negative pulse to turn ON the trigger 868.

Step 22

At W2 time, the positive pulse on the W2(D1.5) line passes via the OR–C circuit 864 and via the conditioned AND circuit 863 to the inverter 866 where it is inverted to a negative pulse to turn OFF the trigger 868 which, in being turned OFF applies a negative shift to turn ON the trigger 870.

Step 23

At W3.5 time, referring to the CLOCK CONTROL UNIT 802 in Fig. 26D, Step 9 is repeated to bring up the CLOCK GATE line to initiate another cycle of operation of the CLOCK 814 in Fig. 26B.

Step 24

At W4 time, the positive pulse on the W4(D0.5) line passes via the OR–C circuit 864 and the conditioned AND circuit 863 to the inverter 866 where it is inverted to a negative pulse to turn ON the trigger 868.

Step 25

At R1 time, the positive pulse on the R1(D1.5) line is effective in the CHARACTER GATE COUNTER 858 to cause the trigger 868 to be turned OFF which, in being turned OFF applies a negative shift to turn OFF the trigger 870 which, in being turned OFF, applies a negative shift to turn ON the trigger 872.

Step 26

At R3 time, the positive pulse on the R3(D1.5) line is effective in the CHARACTER GATE COUNTER 858 to cause the trigger 868 to be turned ON.

Step 27

At W0 time, the positive pulse on the W0(D1.5) line is effective in the CHARACTER GATE COUNTER 858 to cause the trigger 868 to be turned OFF which, in being turned OFF, applies a negative shift to turn ON the trigger 870.

Step 28

At W2 time, the positive pulse on the W2(D1.5) line is effective in the CHARACTER GATE COUNTER 858 to cause the trigger 868 to be turned ON.

Step 29

At W3.5 time, referring to the CLOCK CONTROL UNIT 802 in Fig. 26D, Step 9 is repeated to bring up the CLOCK GATE line to initiate another cycle of operation of the CLOCK 814 in Fig. 26B.

Step 30

At W4 time, the positive pulse on the W4(D0.5) line is effective in the CHARACTER GATE COUNTER 858 to cause the trigger 868 to be turned OFF which, in being turned OFF, applies a negative shift to turn OFF the trigger 870 which, in being turned OFF, applies a negative shift to turn OFF the trigger 872 which, in being turned OFF, applies a negative shift to turn OFF the trigger 874 which, in being turned OFF, applies a positive signal from its right-hand output to bring down the CHAR GATE line at approximately R0.75 time due to the ripple of the triggers 868 to 874.

Step 31

At R0.75 time, referring to the CHARACTER GATE COUNTER 858 in Fig. 26C, negative shift on the CHAR GATE line is applied to turn OFF the START CHAR GATE trigger 862 which, in being turned OFF, applies a negative signal from its right-hand output to decondition the AND circuit 863.

Referring now to the CHARACTER RECOGNITION UNIT 752 in Fig. 25I, the negative shift on the CHAR GATE line also passes via the now conditioned diode gate 750 to turn ON the TM RECOG trigger 751 which, in being turned ON, applies a positive signal from its right-hand output to bring up the TM RECOG line which condition is passed to the PROGRAM CONTROL UNIT 778 in Fig. 25J. The positive signal on the TM RECOG line, in combination with the SET R A line being up, passes via the AND circuit 768 and the OR circuit 774 to bring up the TURN ON TI A line which condition is passed to the SELECTED TAPE UNIT 1 to turn ON the TAPE INDICATOR trigger which, in being turned ON, indicates that a TAPE MARK CHARACTER was detected. The positive signal on the TURN ON TI A line is also applied to the I/O INDICATOR UNIT 764 where it passes via the OR circuit 753 to turn ON the ANY TI trigger 754 which, in being turned ON, applies a positive signal from its right-hand output to condition the AND circuit 756. The function of the ANY TI trigger 754 will be described in greater detail hereinafter.

Referring now to the RESET EX TIMER 924 in Fig. 27B, the negative shift on the CHAR GATE line is applied to decondition the AND circuit 936 causing a negative signal to be applied via the OR circuit 933 to the inverter 934 where it is inverted to a positive signal to bring up the RESET CR 214 line.

Referring to the CHARACTER RECOGNITION UNIT 752 in Fig. 25I, the negative shift on the CHAR GATE line is applied to turn OFF the 1st CHAR GATE trigger 744 which, in being turned OFF, applies a negative signal from its right-hand output to decondition the AND circuit 749 and to bring down the 1st CHAR GATE line which condition is passed to the RESET EX TIMER 924 in Fig. 27B. The negative shift on the 1st CHAR GATE line passes via the OR circuit 940 to the inverter 941 where it is inverted to a positive signal to bring up the RESET LRCR line.

Referring now to the READ REGISTER 743 in Fig. 25H, the negative shift on the CHAR GATE line is applied to reset all of the triggers 742 of the READ REGISTER 743. Those of the triggers 742 which are turned OFF, corresponding to the 1 bits of the first CHARACTER, apply negative signals from their right-hand outputs via the R BUS to the CR 214 in Fig. 21B to turn ON corresponding ones of the triggers 218 whereby the first CHARACTER is effectively stored in the CHARACTER REGISTER 214.

It should be noted that there is approximately a 27 microsecond period from the time that the first bit of a CHARACTER is read and stored in the READ REGISTER 743 to the time that the READ REGISTER 743 is cleared, by the fall of the CHAR GATE line, in preparation for receiving the next CHARACTER. Since the bits of a CHARACTER are generally not written perpendicular to the edge of the TAPE the time at which the first 1 bit of a CHARACTER is read will vary. Consequently, the 27 microsecond period allows sufficient time, under all conditions, for the entire CHARACTER to be read, stored in the READ REGISTER 743 and then transferred to the CHARACTER REGISTER 214 before the next CHARACTER is read from the TAPE.

Referring now to the PRIORITY R/W SERVICE UNIT 578 in Fig. 24C, the negative shift on the CHAR GATE line is applied to turn ON the R SERVICE trigger 579 which, in being turned ON, applies a positive signal from its right-hand output which, in combination with the $\overline{\text{WCLB}}$ line being up, conditions the AND circuit 581.

Step 32

At W3.5 time, referring to the CLOCK CONTROL UNIT 802 in Fig. 26D, Step 9 is repeated to bring up the CLOCK GATE line to initiate another cycle of operation of the CLOCK 814 in Fig. 26B.

Step 33

At W3 time, referring to the PRIORITY R/W SERVICE UNIT 578 in Fig. 24C, the positive pulse on the W3(D1.5) line, in combination with the $\overline{\text{CTRL 8}}$ line being up, passes via the AND circuit 583 and the OR circuit 585 and the now conditioned AND circuit 581 to bring up the R SERVICE CALL line which condition is passed to the TAPE R/W CYCLE UNIT 588. The positive shift on the R SERVICE CALL line is applied to turn ON the RCLA trigger 589 which, in being turned ON, applies a negative signal from its left-hand output to bring down the $\overline{\text{RCLA}}$ line and applies a positive signal from its right-hand output to bring up the RCLA line. The positive signal on the RCLA line is applied via the OR circuit 590 to bring up the RCL line which condition is passed to the MEMORY EX TIMER 902 in Fig. 27A. The positive signal on the RCL line, in combination with the TAPE R TC1+2+3 and TU TO DC lines being up, passes via the AND circuit 907 and the OR circuit 903 to bring up the MEM W line and, via the OR circuit 904, to bring up the MEM R/W line.

Step 34

At W3.5 time, referring to the CLOCK CONTROL UNIT 802 in Fig. 26D, Step 9 is repeated to bring up the CLOCK GATE line to initiate another cycle of operation of the CLOCK 814 in Fig. 26B.

Step 35

At R0 time, referring to the CTR & REG EX TIMER 942 in Fig. 27C, the positive pulse on the R0(D4) line in combination with the MEM W line being up and the RCLA line being up via the OR circuit 947, passes via the AND circuit 948 to bring up the AC 112 TO AR line which condition is passed to the AND circuits 114 of the COUNTER GATE 116 in Fig. 20G. The positive signal on the AC 112 TO AR line passes via those AND circuits 114 which are conditioned in accordance with the count setting of the ADDRESS COUNTER 112 and via corresponding ones of the OR circuits 134 in the ADDRESS REGISTER 132 to turn ON corresponding ones of the trigger 136. In the present instance, the AND circuits 114 being deconditioned block the positive pulse on the AC 112 TO AR line having an effect on the ADDRESS REGISTER 132 with the result being that the ADDRESS REGISTER 132 remains at a value which is the ADDRESS (0000) of the STORAGE REGISTER in the MEMORY 50 where the first CHARACTER is to be stored.

At R0 time, referring to the MEMORY EX TIMER 902 in Fig. 27A, the positive pulse on the R0(D4) line, in combination with the MEM R/W line being up and the RCLA line being up via the OR circuit 908, passes via the AND circuit 909 to bring up the R BIAS GATE line which condition is passed to the X SC BIAS & W DRIVERS 172 and 184 in Figs. 20B and 20D, respectively, which are conditioned in accordance with the ADDRESS setting (0000) of the ADDRESS REGISTER 132 to apply negative current pulses to bias OFF all but the SELECTED ROW (ROWS X0) of the X and Y SWITCH CORE MATRICES 156 and 150 in a manner as previously described in the section on the MEMORY CONTROL UNIT.

Step 36

At R0.5 time, referring to the PRIORITY R/W SERVICE UNIT 578 in Fig. 24C, the negative shift of the trailing edge of the positive pulse on the W3.5(D1) line is applied to decondition the AND circuit 581 causing the R SERVICE CALL line to be brought down.

Referring now to the ADDRESS REGISTER 132 in Fig. 20F, the negative shift on the W3.5(D1) line is also applied via negative shift inputs to reset all of the triggers 136 of the ADDRESS REGISTER 132. However, the AC 112 TO AR line is maintained up during the period of the negative shift and is of sufficient duration to effectively maintain ON any of the triggers 136, to which it is effectively applied, despite the application of the negative shift.

Step 37

At R1 time, referring to the PRIORITY R/W SERVICE UNIT 578 in Fig. 24C, the positive pulse on the R1(D1.5) line, in combination with the RCLA line being up, passes via the AND circuit 587 to turn OFF the R SERVICE trigger 579.

Step 38

At R1.5 time, referring to the MEMORY EX TIMER 902 in Fig. 27A, the positive pulse on the R1.5(D2.5) line in combination with the MEM R/W line being up, passes via the AND circuit 910 to bring up the R GATE line which condition is passed to the Y SC DECODERS 138 and 142 in Figs. 20a and 20e, respectively, which are conditioned in accordance with the ADDRESS setting (0000) of the ADDRESS REGISTER 132, to render the Y SC R DRIVERS 146 and 152 effective to drive the SELECTED COLUMNS (COLUMNS Y0) of the X and Y SWITCH CORE MATRICES 156 and 150. Since only one core in each of the SELECTED COLUMNS is in the unbiased state, only these cores switch from the reset to the set position and induce current in their secondaries which cause negative half select current pulses to be applied to the SELECTED X and Y wires (XX0 and YY0) of the MEMORY 50 to effectively clear the SELECTED STORAGE REGISTER in the MEMORY 50, in a manner as previously described in the section on the MEMORY OPERATION, in preparation for receiving the CHARACTER presently stored in the CHARACTER REGISTER 214.

Step 39

At R2 time, referring to the TAPE R/W CYCLE UNIT 588 in Fig. 24C, the positive on the R2(D1.5) line, in combination with the RCLA line being up, passes via the AND circuit 591 to turn ON the RCLB trigger 592 which, in being turned ON, applies a negative signal from its left hand output to bring down the $\overline{\text{RCLB}}$ line and applies a positive signal from its right-hand output to bring up the RCLB line and, via the OR circuit 590, to maintain the RCL line up.

Step 40

At R4 time, referring to the CTR & REG EX TIMER 942 in Fig. 27B, the positive pulse on the R4(D1.5) line, in combination with the MEM W line being up, passes via the AND circuit 946 to bring up the STEP AC 112 line which condition is passed to the ADDRESS COUNTER 112 in Fig. 20G.

At R4 time, referring to the TAPE R/W CYCLE UNIT 588 in Fig. 24C, the positive pulse on the R4(D1.5) line, in combination with the RCLB line being up, passes via the AND circuit 593 to turn OFF the RCLA trigger 589 which, in being turned OFF, applies a positive signal from its left-hand output to bring up the $\overline{\text{RCLA}}$ line and applies a negative signal from its right-hand output to bring down the RCLA line.

Step 41

Referring now to the CR 214 and the INPUT SWITCH 222 in Figs. 21B and 21C, respectively, those of the triggers 218 of the CR 214 which were not previously turned ON and which correspond to a 0 bit of the CHARACTER presently stored in the CR 214, applies a positive signal via its left-hand output to condition corresponding ones of the AND circuits 223 of the INPUT SWITCH 222.

At R4.5 time, referring to the DATA TFR & CK EX TIMER 949 in Fig. 27C, a positive pulse on the R4.5(D4.5) line, in combination with the RCLB and TAPE R TC1+3 but $\overline{2}$ lines being up, passes via the AND circuit 964 and the OR circuit 965 to bring up the CR 214 TO ID line which condition is passed to the AND circuits 223 of the INPUT SWITCH 222 in Fig. 21C, so that those of the AND circuits 223 which are conditioned by the positive signals, corresponding to 0 bits of the CHARACTER presently stored in the CR 214, pass positive signals via corresponding ones of the OR circuit 225 to condition corresponding ones of the AND circuit 227 of the INHIBIT DRIVER 226. The signal outputs of the OR circuits 225 are applied to the CHAR CODE CK UNIT 248 in Fig. 21E, in accordance with the CHARACTER presently stored in the CR 214, where a vertical check is made to insure that there are an even number of 1 bits in the CHARACTER. If the CHARACTER has an odd number of 1 bits, then, this condition is detected by the CHAR CODE CK UNIT 248 to bring up the CHAR CODE CK B line which, in coming up, conditions the AND circuit 271 of the ERROR CHECK UNIT 268 in Fig. 21F.

At R4.5 time, referring to the MEMORY EX TIMER 902 in Fig. 27A, the positive pulse on the R4.5(D4.5) line, in combination with the MEM R/W, $\overline{\text{RCLA}}$ and $\overline{\text{WCLA}}$ lines being up, passes via the AND circuit 911 to bring up the INHIBIT GATE line which condition is passed to the AND circuits 227 of the INHIBIT DRIVER 226 in Fig. 21C. Those of the AND circuits 227 which are conditioned by a positive signal, corresponding to a 0 bit of the CHARACTER presently stored in the CR 214, pass the positive pulse on the INHIBIT GATE line via corresponding ones of the OR circuits 228 and the AND circuits 229 to corresponding ones of the INHIBIT DRIVERS 230 which apply negative INHIBIT current pulses to the Z wires of the corresponding ones of the bit planes in the manner as previously described in section on INHIBIT DRIVING.

At the same time, the positive pulse on the R4.5(D4.5) line, in combination with the MEM R/W, $\overline{\text{RCLA}}$ and $\overline{\text{WCLA}}$ lines being up passes via the AND circuit 912 to bring up the W GATE line which condition is passed to the X SC DECODERS 158 and 154 in Fig. 20C, which are conditioned in accordance with the ADDRESS setting (0000) of the ADDRESS REGISTER 132, to render the X SC BIAS & W DRIVERS 172 and 184, in Figs. 20E and 20D, respectively, effective to drive the SELECTED ROWS (ROWS X0) of the X and Y SWITCH CORES MATRICES 156 and 150. Since only one core in each of the SELECTED ROWS is in the set position, only these cores switch from the set to the reset position and induce current in their secondaries which cause positive half selected current pulses to be applied to the SELECTED X and Y wires (XX0 and YY0) of the MEMORY 50. These positive half select current pulses are applied to the SELECTED X and Y wires of the MEMORY 50 during the same interval of time that the INHIBIT current pulses are being applied to the Z wires in the MEMORY 50 which correspond to the 0 bits of the CHARACTER to be stored in the MEMORY 50. Consequently, those MEMORY CORES of the SELECTED STORAGE REGISTER in the MEMORY 50 which are not INHIBITED are switched to the 1 state thereby effectively storing a 1 bit whereas those MEMORY CORES of the selected STORAGE REGISTER which are INHIBITED remain in the 0 state thereby effectively storing a 0 bit resulting in the CHARACTER being stored in the SELECTED STORAGE REGISTER of the MEMORY 50.

Referring now to the CR 214 and the LRCR 242 in Figs. 21B and 21D, respectively, the right-hand outputs of the triggers 218 are applied to the AND circuits 243 of the LRCR 242 in accordance with the CHARACTER presently stored in the CR 214.

At W0 time, referring to the DATA TFR & CK EX TIMER 949 in Fig. 27C, the positive pulse on the W0(D1.5) line, in combination with TU TO DC, TAPE R TC1+3 but $\overline{2}$, RCLB DEL R CALL lines being up, passes via the AND circuit 959 and the OR circuit 960 to bring up the CR 214 TO LRCR line which condition is passed to the AND circuits 243 of the LRCR 242 in Fig. 21D so that those of the AND circuits 243 which have positive signals applied thereto, corresponding to the 1 bits of the CHARACTER, pass a positive pulse to corresponding ones of the inverters 244 where it is inverted to negative pulses to switch the state of the corresponding ones of the triggers 245 to initiate the production of a longitudinal redundancy check (LRC) CHARACTER.

Step 43

At W0.5 time, referring to the ADDRESS COUNTER 112 in Fig. 20G, the negative shift of the trailing edge of the positive pulse on the STEP AC 112 line is applied via a negative shift input to step the ADDRESS COUNTER 112 by a count of 1. In the present instance, the trigger 110a is turned ON causing a positive signal to be applied from its right-hand output to condition the AND circuit 114a of the COUNTER GATE 116 while the triggers 110b to 110j, inclusive, remain OFF to maintain negative signals from their right-hand outputs to decondition the corresponding AND circuits 114b to 114j, respectively, of the COUNTER GATE 116.

Step 44

At W2 time, referring to the DATA TFR & CK EX TIMER 949 in Fig. 27B, the positive pulse on the W2(D1.5) line, in combination with the TU TO DC, RCLB and TAPE R TC1+2+3 lines being up via the AND circuit 955 and the OR circuit 956, passes via the AND circuit 957 to bring up the CHAR CODE CK B TO R/W CK line which condition is passed to the AND circuit 271 of the ERROR CHECK UNIT 268 in Fig. 21F. If the AND circuit 271 is conditioned by the CHAR CODE CK B line being up, due to the existence of an odd number of 1 bits in the CHARACTER, a positive pulse passes via the AND circuit 271 and the OR–C circuit 270 to turn ON the R/W CK trigger 279 which, in being turned ON, applies a positive signal from its right-hand output which, in combination with the THIS DC SELECTED line being up, passes via the AND circuit 281 to bring up the R/W CK line.

It should be noted that any time the R/W CK trigger 279 is turned ON during this mode of operation, it will remain ON until after the next READ or WRITE instruction involving the DATA COORDINATOR is completed whereupon the signal on the END R/W line is effective to turn OFF the REC CK trigger 280 which, in being turned OFF, effectively brings down the R/W CK line to signal the CENTRAL PROCESSING UNIT that an error has occurred in the previous data transfer between the DATA COORDINATOR and a TAPE UNIT associated therewith.

Step 45

At W3.5 time, referring to the CLOCK CONTROL UNIT 802 in Fig. 26D, Step 9 is repeated to bring up the CLOCK GATE line to initiate another cycle of operation of the CLOCK 814 in Fig. 26B.

At W3.5 time, referring to the MEMORY EX TIMER 902 in Fig. 27A, the positive pulse on the W3.5(D1) line, in combination with the MEM R/W, $\overline{\text{RCLA}}$ and $\overline{\text{WCLA}}$ line being up, passes via the AND circuit 913 to bring up the PWD GATE line which condition is passed via the OR circuit 228 of the INHIBIT DRIVER 226 in Fig. 21C and the AND circuits 229 to the INHIBIT DRIVERS 230 which apply post write disturbance current pulses to all of the Z wires of the MEMORY 50 to disturb all of the MEMORY CORES in the SELECTED STORAGE REGISTER to minimize subsequent noise in a manner as previously described in the section on the POST WRITE DISTURBANCE.

At W3.5 time, the positive pulse on the W3.5(D1) line is applied to the ADDRESS REGISTER 132 in Fig. 20F.

Step 46

At R0 time, referring to the TAPE R/W CYCLE UNIT 588 in Fig. 24C, the negative shift of the trailing edge of the positive pulse on the W2.5(D1.5) line is applied to turn OFF the RCLB trigger 592 which, in being turned OFF, applies a positive signal from its left-hand output to bring up the $\overline{\text{RCLB}}$ line and applies a negative signal from its right-hand output to bring down the RCLB line and, via the OR circuit 590, to bring down the RCL line. The negative signal on the RCL line is applied to decondition the AND circuit 907 in the MEMORY EX TIMER 902 in Fig. 27A causing a negative signal to be applied via the OR circuit 903 to bring down the MEM W line and via the OR circuit 904 to bring down the MEM R/W line.

Step 47

At R0.5 time, referring to the ADDRESS REGISTER 132 in Fig. 20F, the negative shift of the trailing edge of the positive pulse on the W3.5(D1) line is applied via negative shift inputs to reset all of the triggers 136 to effectively clear the ADDRESS REGISTER 132 in preparation for receiving the next ADDRESS.

Step 48

The period, from the time that the READ REGISTER 743 is cleared, to the time that the FIRST BIT of the next succeeding CHARACTER is sensed and stored in the READ REGISTER 732, may vary due to TAPE SKEW and variation of the TAPE speed. Consequently, let it be assumed, for purposes of explanation, that at R3 time, approximately 30 microseconds after the READ REGISTER 743 was cleared, a pulse, corresponding to the first 1 bit of the next CHARACTER read from the SELECTED TAPE, is passed via the R BUS A to the READ AMPLIFIER UNIT 741 where it is amplified by one of the R amplifiers 740 and applied as a negative shift to turn ON a corresponding one of the triggers 742 of the READ REGISTER 743 which, in being turned ON, applies a positive signal from its right-hand output to the CHARACTER RECOGNITION UNIT 752 in Fig. 25I. The CHARACTER RECOGNITION UNIT 752 detects which of the triggers 742 is turned ON and brings up the FIRST BIT line.

Step 49

By W2 time, referring to the CHARACTER GATE COUNTER 858 in Fig. 26C, a succession of clock pulses are applied via the W0(D1.5) and W2(D1.5) lines to step the CHARACTER GATE COUNTER 858.

Step 50

At W3.5 time, referring to the CLOCK CONTROL UNIT 802 in Fig. 26D, Step 9 is repeated to bring up the CLOCK GATE line to initiate another cycle of operation of the CLOCK 814 in Fig. 26B.

Step 51

By W2 time, referring to the CHARACTER GATE COUNTER 858 in Fig. 26C, a succession of clock pulses are applied via the R1 W4(D0.5), R3(D1.5), W0(D1.5) and W2(D1.5) lines to step the CHARACTER GATE COUNTER 858 until the triggers 868 to 872 are successively turned OFF and the trigger 874 is turned ON causing a positive signal to be applied from its right-hand output to bring up the CHAR GATE line at approximately W2.75 time due to the ripple of the triggers 868 to 874.

Step 52

At W2.75 time, referring to the RESET EX TIMER 924 Fig. 27B, the positive shift on the CHAR GATE line, in combination with the TU TO DC line being up via the OR circuit 935, passes via the AND circuit 936 and the OR circuit 933 to the inverter 934 where it is inverted to a negative shift to bring down the RESET CR 214 line which condition is applied to the CR 214 in Fig. 21A. The negative shift on the RESET CR 214 line is applied via negative shift inputs to reset all of the trigger 218 to clear the CHARACTER REGISTER 214 in preparation for receiving the next CHARACTER.

Referring now to the TAPE R CONTROL UNIT 687 in Fig. 25E, the positive shift on the CHAR GATE line, in combination with the $\overline{BKWD}$ and DEL R CALL lines being up and the left-hand output of the DISC DEL single shot 686 being up, passes via the AND circuit 683 the inverter 684 where it is inverted to a negative shift to maintain ON the 150 microsecond REC GATE single shot 655 which, in remaining ON maintains the REC GATE line up. It should be noted that the CHAR GATE line is brought down for each CHARACTER read from the SELECTED TAPE and occurs at a rate (nominally, 63 microseconds per character) which is less than the 150 microseconds period of the REC GATE single shot 685. Consequently, the REC GATE single shot 685 is kept ON during the entire TAPE reading operation to maintain the REC GATE line up until the CHAR GATE line is no longer brought down when no further CHARACTERS are read from the SELECTED TAPE.

Step 53

At W3.5 time, referring to the CLOCK CONTROL UNIT 802 in Fig. 26D, Step 9 is repeated to bring up the CLOCK GATE line to initiate another cycle of operation on the CLOCK 814 in Fig. 26B.

Step 54

By W2 time, referring to the CHARACTER GATE COUNTER 858 in Fig. 26C, a succession of clock pulses are applied via the W4(D0.5), R1(D1.5), R3(D1.5), W0(D1.5) and W2(D1.5) lines to step the CHARACTER GATE COUNTER 858.

Step 55

At W3.5 time, referring to the CLOCK CONTROL UNIT 802 in Fig. 26D, Step 9 is repeated to bring up the CLOCK GATE line to initiate another cycle of operation of the CLOCK 814 in Fig. 26B.

Step 56

At R3 time, referring to the CHARACTER GATE COUNTER 858 in Fig. 26C, a succession of clock pulses are applied via the R1(D1.5) and R3(D1.5) lines to step the CHARACTER GATE COUNTER 858 until the triggers 868 to 874 are successively turned OFF causing the CHAR GATE line to be brought down at approximately R3.75 time due to the ripple of the triggers 868 to 874.

Step 57

At R3.75 time, referring to the CHARACTER GATE COUNTER 858 in Fig. 26B, the negative shift on the CHAR GATE line is applied to turn OFF the START CHAR GATE trigger 852 which, in being turned OFF, applies a negative signal from its right-hand output to decondition the AND circuit 863.

Referring now to the RESET EX TIMER 924 in Fig. 27B, the negative shift on the CHAR GATE line is also applied to decondition the AND circuit 936 causing a negative signal to be applied via the OR circuit 933 to the inverter 934 where it is inverted to bring up the RESET CR 214 line.

Referring now to the READ REGISTER 743 in Fig. 25H, the negative shift on the CHAR GATE line is additionally applied to reset all the triggers 742 of the READ REGISTER 743. Those of the triggers 742 which are turned OFF, corresponding to the 1 bits of the CHARACTER, apply negative signals from their right-hand outputs via the R BUS to the CR 214 in Fig. 21B to turn ON corresponding ones of the triggers 218 whereby the next CHARACTER is effectively stored in the CHARACTER REGISTER 214.

Referring now to the PRIORITY R/W SERVICE UNIT 578 in Fig. 24C, the negative shift on the CHAR GATE line is further applied to turn ON the R SERVICE trigger 579 which, in being turned ON, applies a positive signal from its right-hand output which, in combination with the $\overline{WCLB}$ line being up conditions the AND circuit 581.

Step 58

Steps 32 to 47 are repeated during which the following sequence of events occur:

(a) The ADDRESS REGISTER 132 in Fig. 20F is set with the ADDRESS of the STORAGE REGISTER in the MEMORY 50 where the next CHARACTER is to be stored.

115

(b) The now SELECTED STORAGE REGISTER in the MEMORY 50 is cleared in preparation for receiving the next CHARACTER.

(c) The next CHARACTER, presently stored in the SE- CHARACTER REGISTER 214, is written in the SELECTED STORAGE REGISTER of the MEMORY 50 and a vertical check is made, by the CHAR CODE CHECK UNIT 248 in Fig. 21E, to insure that there are an even number of 1 bits in the CHARACTER.

(d) The next CHARACTER which is still presently stored in the CHARACTER REGISTER 214 is transferred to the LRCR 242 in Fig. 21D to continue the production of the LRC CHARACTER.

(e) The ADDRESS COUNTER 112 in Fig. 20G is advanced by a count of 1.

(f) The R/W CK trigger 279 of the ERROR CHECK UNIT 268 in Fig. 21F is turned ON if the CHAR CODE CHECK UNIT 248 in Fig. 21E detected an odd number of 1 bits in the CHARACTER.

(g) A POST WRITE DISTURBANCE is made of the MEMORY CORES in the SELECTED STORAGE REGISTER of the MEMORY 50 to minimize subsequent noise.

(h) The ADDRESS REGISTER 132 in Fig. 20F is cleared in preparation for receiving the ADDRESS of the STORAGE REGISTER in the MEMORY 50 where the next succeeding CHARACTER is to be stored.

Step 59

In a somewhat similar manner, Steps 48 to 58 are repeated for each CHARACTER of the RECORD or group of RECORDS read from the SELECTED TAPE and transferred to the MEMORY 50 of the DATA COORDINATOR. However, it should be remembered that due to TAPE SKEW and variation of TAPE speed, the time at which each CHARACTER is read will generally vary.

Step 60

Now, referring to the TAPE R CONTROL UNIT 687 in Fig. 25E, let it be assumed that the last CHARACTER of the RECORD or group of RECORDS has been processed so that the REC GATE single shot 685 is not pulsed again, and, therefore, at approximately R4.75 time, 150 microseconds after the fall of the CHAR GATE line, the REC GATE single shot 685 returns to its OFF state causing a negative shift to be applied from its right-hand output to bring down the REC GATE line which condition is applied to turn ON the 400 microsecond DISC DEL single shot 686. The DISC DEL single shot 686, in being turned ON, applies a negative signal from its left-hand output to bring down the $\overline{DISC\ DEL}$ line and applies a positive signal from its right-hand output to bring up the DISC DEL line.

The negative shift on the $\overline{DISC\ DEL}$ line is also applied to turn ON the R SERVICE trigger 579 of the PRIORITY R/W SERVICE UNIT 57B in Fig. 24e, which, in being turned ON, applies a positive signal from its right-hand output which, in combination with the WCLB line being up, conditions the AND circuit 581.

At the same time, referring to the TAPE R TYPE CYCLE UNIT 502 in Fig. 24A, the negative shift on the REC GATE line is also applied to turn ON the TAPE R TC2 trigger 510 which, in being turned ON, applies a negative signal from its left-hand output to decondition the AND circuit 508 and bring down the TAPE R TC1 but $\overline{2}$ & $\overline{3}$ lines and applies a positive signal from its right-hand output to bring up the TAPE R TC2 line.

The TAPE R TC1 but $\overline{2}$ & $\overline{3}$ line in coming down applies a negative signal via the OR circuit 518 to bring down the TAPE R TC1+3 but $\overline{2}$ line. Referring now to the RESET EX TIMER 924 in Fig. 27D, the positive shift on the TAPE R TC2 line is applied via the OR circuit 933 to the inverter 934 where it is inverted to a negative shift which is applied via the RESET CR 214 line to the

116

CHARACTER REGISTER 214 in Fig. 21B. The negative shift on the RESET CR 214 line is applied to reset all of the triggers 218 of the CR 214 to effectively clear the CHARACTER REGISTER 214.

At the same time, referring to the TAPE R STATUS UNIT 638 in Fig. 25C, the negative shift on the REC GATE line is also applied to turn OFF the PREP TO R A trigger 626 which, in being turned OFF, applies a positive signal from its left-hand output to bring up the $\overline{PREP\ TO\ R\ A}$ line and applies a negative signal from its right-hand output to bring down the PREP to R A line and to decondition the AND circuit 629 causing a negative signal to be applied via the OR circuits 631 and 633 to bring down the SET R A line. The negative output of the OR circuit 631 also deconditions the AND circuit 635 causing a negative signal to be applied via the OR circuit 637 to bring down the START R line.

Referring now to the TAPE W CONTROL UNIT 720 in Fig. 25F, the negative signals on the PREP TO R A and START R lines now decondition the AND circuit 712 causing a negative signal to be applied via the OR circuit 713 to bring down the GO BUS A line to signal the SELECTED TAPE UNIT 1 to stop the forward motion of the TAPE.

Step 61

At W3 time, Step 33 is repeated during which the RCLA trigger 589 of the TAPE R/W CYCLE UNIT 588 in Fig. 24C is turned ON which, in being turned ON, is effective to bring up the RCLA and RCL lines. The RCL line, in coming up, is effective in the MEMORY EX TIMER 902 in Fig. 27A, to bring up the MEM W and MEM R/W lines.

At the same time, referring to the DATA TFR & CK EX TIMER 949 in Fig. 27B, the positive signal on the RCL line in combination with the TU TO DC and TAPE R TC2 lines being up, passes via the AND circuit 969 to bring up the EMIT GM line which condition is passed to the INPUT SWITCH 222 in Fig. 21C where it is applied via the OR circuit 225g to condition the AND circuit 227g of the INHIBIT DRIVERS 226.

Referring now to the INPUT SWITCH 222 and the LRCR 242 in Figs. 21C and 21D, respectively, it can be seen that since the MEM R, CR 214 to ID and LRCR TO ID lines are down, the AND circuits 224, 223 and 246, respectively, are deconditioned causing negative signals to be applied to all of the inputs of each of the OR circuits 225a to 225f with the resulting effect being that the $\overline{1}$, $\overline{2}$, $\overline{4}$, $\overline{8}$, $\overline{A}$ and $\overline{B}$ output lines of the INPUT SWITCH 222 are maintained down while the $\overline{C}$ output line is maintained up due to the positive signal on the EMIT GM line, corresponding to the CHARACTER 0111111 which is the GM CHARACTER. The CHAR CODE CK UNIT 248 in Fig. 21E responds to the output of the INPUT SWITCH 222 to detect whether there are an even number of 1 bits in the GM CHARACTER and if not brings up the CHAR CODE CK B line to condition the AND circuit 271 of the ERROR CHECK UNIT 268 in Fig. 21F.

Step 62

Steps 34 to 40 are repeated during which the ADDRESS REGISTER 132 in Fig. 20F is set with the ADDRESS of the STORAGE REGISTER in the MEMORY 50 where the GM CHARACTER is to be stored and, then, the SELECTED STORAGE REGISTER is cleared in preparation for receiving the GM CHARACTER.

Step 63

At R4.5 time, referring to the MEMORY EX TIMER 902 in Fig. 27A, the positive pulse on the R4.5(D4.5) line, in combination with the MEM R/W, $\overline{RCLA}$ and $\overline{WCLA}$ lines being up, passes via the AND circuit 911 to bring up the INHIBIT GATE line which condition is passed to the AND circuits 227 of the INHIBIT DRIVER 226 in Fig. 21C. The AND circuit 227g, being conditioned by a positive signal corresponding to the 0 bit of the GM CHARACTER, passes the positive pulse on the INHIBIT GATE line via the OR circuit 228g and the AND circuit 229g to the INHIBIT DRIVER 230g which applies a negative INHIBIT current pulse to the Z wire of the C bit plane of the MEMORY 50 to INHIBIT this plane.

At the same time, the positive pulse on the R4.5(D4.5) line, in combination with the MEM R/W, $\overline{RCLA}$ and $\overline{WCLA}$ line being up, passes via the AND circuit 912 to bring up the W GATE line which condition is passed to the X SC DECODERS 158 and 164 in Fig. 20C, which are conditioned in accordance with the ADDRESS setting of the ADDRESS REGISTER 132, to render the X SC BIAS & W DRIVERS 172 and 184 in Figs. 20B and 20D, respectively, effective to drive the SELECTED ROWS of the X and Y SWITCH CORE MATRICES 156 and 150. Since only one core in each of the SELECTED ROWS is in the set position, only these cores switch from the set to the reset position and induce current pulses to be applied to the SELECTED X and Y wires of the MEMORY 50. These positive half select current pulses are applied to the SELECTED X and Y wires of the MEMORY 50 during the same interval of time that the INHIBIT current pulse is being applied to the Z wire of the C bit plane in the MEMORY 50. Consequently, the MEMORY CORES of the SELECTED STORAGE REGISTER in the MEMORY 50 which are not INHIBITED are switched to the 1 state, thereby effectively storing a 1 bit, whereas the MEMORY CORE of the SELECTED STORAGE REGISTER which is INHIBITED remains in the 0 state, thereby effectively storing a 0 bit, with the resulting effect being that the GM CHARACTER is stored in the SELECTED STORAGE REGISTER of the MEMORY 50.

*Step 64*

At W0 time, Step 42 is not repeated to bring up the CR 214 to LRCR line inasmuch as the TAPE R TC1+3 but $\overline{2}$ line is down at the present time and the previous transfer of the last CHARACTER of the RECORD to the LRCR 242 in Fig. 21D has already completed the production of the LRC CHARACTER which is now stored in the LRCR 242.

*Step 65*

Steps 43 to 46 are repeated during which the ADDRESS COUNTER 112 in Fig. 20G is stepped up by a count of 1, the R/W CK trigger 279 of the ERROR CHECK UNIT 268 in Fig. 21F is turned ON if there are an odd number of 1 bits in the GM CHARACTER, another cycle of operation of the CLOCK 814 in Fig. 26B is initiated and a POST WRITE DISTURBANCE is made of the MEMORY CORES of the SELECTED STORAGE REGISTER in the MEMORY 50.

Now, at R0 time, referring to the TAPE R/W CYCLE UNIT 588 in Fig. 24C, the negative shift of the trailing edge of the positive pulse on the W2.5(D1.5) line is applied to turn OFF the RCLB trigger 592 which, in being turned OFF applies a positive signal from its left-hand output to bring up the $\overline{RCLB}$ and applies a negative signal from its right-hand output to bring down the RCLB line and, via the OR circuit 590, to bring down the RCL line. The negative signal on the RCL line is applied to decondition the AND circuit 907 in the MEMORY EX TIMER 902 in Fig. 27A causing a negative signal to be applied via the OR circuit 903 to bring down the MEM W line and, via the OR circuit 904, to bring down the MEM R/W line. The negative signal on the RCL line is also applied to decondition the AND circuit 969 in the DATA TFR & CK EX TIMER 949 in Fig. 27D causing a negative signal to be applied to bring down the EMIT GM line.

Referring now to the TAPE R TYPE CYCLE UNIT 502 in Fig. 24A, the negative shift on the RCLB line is applied to turn OFF the TAPE R TC2 trigger 510 which, in being turned OFF, applies a negative signal from its right hand output to bring down the TAPE R TC2 line and applies a negative shift from its right-hand tapped output to turn ON the TAPE R TC3 trigger 514. The TAPE R TC3 trigger 514, in being turned ON, applies a negative signal from its left-hand output to decondition the AND circuit 508 to maintain the TAPE R TC1 but $\overline{2}$ & $\overline{3}$ line down and applies a positive signal from its right-hand output to bring up the TAPE R TC3 line and, via the OR circuit 516, to maintain the TAPE R TC1+2+3 line up, and, via the OR circuit 518, to bring up the TAPE R TC1+3 but $\overline{2}$ line. The positive signal on the TAPE R TC3 line is also passed via the OR circuit 522 to maintain the TAPE R TC3+DEL R CALL line up.

Referring now to the RESET EX TIMER 924 in Fig. 27B, the negative signal on the TAPE R TC2 line is applied via the OR circuit 933 to the inverter 934 where it is inverted to a positive signal to bring up the RESET CR 214 line.

*Step 66*

Step 47 is repeated during which the ADDRESS REGISTER 132 in Fig. 20F is cleared in preparation for receiving the ADDRESS of the STORAGE REGISTER in the MEMORY 50 where the LRC CHARACTER is to be stored.

*Step 67*

Reference may now be made to the DC TO TU mode of operation wherein, it will be remembered, that 10 microseconds after the last CHARACTER of the RECORD is written a 275 microsecond RESET DELAY period is initiated after which the LRC CHARACTER is written on the SELECTED TAPE. Now, at R3 time, let it be assumed that the LRC CHARACTER that was written on the SELECTED TAPE is not 0000000 and that the FIRST BIT of the LRC CHARACTER is read approximately 287 microseconds after the last CHARACTER of the RECORD or group of RECORDS is read from the SELECTED TAPE.

Therefore, referring to the CHARACTER RECOGNITION UNIT 752 in Fig. 25I and the CHARACTER GATE COUNTER 858 in Fig. 26C, Steps 48 to 51 are repeated during which the FIRST BIT line is brought up to effectively condition the CHARACTER GATE COUNTER 858 to respond to a succession of clock pulses applied thereto to step the CHARACTER GATE COUNTER 858 until the CHAR GATE line comes up at approximately W2.75 time.

*Step 68*

At W2, 75 time, referring to the RESET EX TIMER 924 in Fig. 27B, the positive shift on the CHAR GATE line, in combination with the TU TO DC line being up via the OR circuit 935 passes via the AND circuit 936 and the OR circuit 933 to the inverter 934 where it is inverted to a negative shift to bring down the RESET CR 214 line which condition is applied to the CR 214 in Fig. 21A. Normally, the negative shift on the RESET CR 214 line is effective to clear the CHARACTER REGISTER 214 in preparation for receiving the next CHARACTER. However, in the present instance, this is unnecessary inasmuch as the CHARACTER REGISTER 214 was previously reset as explained in Step 60.

Referring now to the TAPE R CONTROL UNIT 687 in Fig. 25E, it should be noted that the negative signal presently on the $\overline{DISC\ DEL}$ line is effective to decondition the AND circuit 683 to block the positive

119 shift on the CHAR GATE line from having any effect on the REC GATE single shot 685 which, therefore, remains in its OFF state.

Step 69

Steps 53 to 57 are repeated during which the CLOCK 814 in Fig. 26B is kept cycling and the CHARACTER GATE COUNTER 858 in Fig. 26C is stepped along by a succession of clock pulses until at R3.75 time the CHAR GATE line is brought down to effectively block the CHARACTER GATE COUNTER 858 from responding to further clock pulses and to turn ON the R SERVICE trigger 579 in Fig. 24C. Also referring to the READ REGISTER 743 in Fig. 25H and the CHARACTER REGISTER 214 in Fig. 21B, the negative shift on the CHAR GATE line is applied to reset the triggers 742 of the READ REGISTER 743 causing the LRC CHARACTER presently stored therein to be transferred from the READ REGISTER 743 via the R BUS to the CHARACTER REGISTER 214.

Step 70

Steps 32 and 33 are repeated during which another cycle of operation of the CLOCK 814 in Fig. 26B is initiated and then the RCLA trigger 589 in Fig. 24C is turned ON to effectively bring up the RCLA and RCL lines. The RCL line, in coming up, is effective in Fig. 27A to bring up the MEM W and MEM R/W lines.

Now, referring to the TAPE R TYPE CYCLE UNIT 502 in Fig. 24A, the positive shift on the RCL line, in combination with the TAPE R TC3 line being up passes via the AND circuit 503 to the inverter 504 where it is inverted to a negative shift to turn OFF the TAPE R TC1 trigger 506 which, in being turned OFF, applies a negative signal from its right-hand output to bring down the TAPE R TC1 line.

Step 71

Steps 34 to 41 during which the following sequence of events occur:

(a) THE ADDRESS REGISTER 132 in Fig. 20F is set with the ADDRESS of the STORAGE REGISTER in the MEMORY 50 where the LRC CHARACTER is to be stored.

(b) The SELECTED STORAGE REGISTER in the MEMORY 50 is cleared in preparation for receiving the LRC CHARACTER.

(c) The LRC CHARACTER presently stored in the CHARACTER REGISTER 214 is written in the SELECTED STORAGE REGISTER of the MEMORY 50 and a vertical check is made, by the CHAR CODE CK UNIT 248 in Fig. 21B, to insure that there are an even number of 1 bits in the LRC CHARACTER.

Step 72

The last CHARACTER of the RECORD read from the SELECTED TAPE and later transferred to the LRCR 242 in Fig. 21D completed the production of an LRC CHARACTER which is now stored in the LRCR 242. Consequently, referring now to the LRCR 242, Step 42 is repeated during which the CR 214 to LRCR line is brought up causing the LRC CHARACTER which is read from the SELECTED TAPE and which is presently stored in the CHARACTER REGISTER 214 to be transferred to the LRCR 242. It should be apparent, that if no error has occurred, the newly created LRC CHARACTER presently stored in the LRCR 242, should be identical to the LRC CHARACTER read from the SELECTED TAPE and presently being transferred to the LRCR 242. Therefore, a comparison check is now made in the LRCR 242 and if the CHARACTERS are identical, the signals applied to the LRCR 242, corresponding to the 1 bits of the LRC CHARACTER stored in the CHARACTER REGISTER 214, are effective to turn OFF those triggers 245 of the LRCR 242 which correspond to the 1 bits of the LRC CHARACTER presently stored therein so that all of the triggers 245 of the LRCR 242 are OFF causing negative signals to be applied from their right-hand outputs via the OR circuit 247 to bring down the LRCR NOT ZERO line. If an error has occurred so that one or more of the triggers 245 are ON, then, a positive signal is applied from the right-hand output of one or more of the triggers 245 via the OR circuit 247 to bring up the LRCR NOT ZERO line which condition is applied to condition the AND circuit 269 of the ERROR CHECK UNIT 268 in Fig. 21F.

Step 73

Steps 43 and 44 are repeated during which the ADDRESS COUNTER 112 in 20G is stepped by a count of 1 and the R/W CK trigger 279 of the ERROR CHECK UNIT 268 in Fig. 21F is turned ON if the CHAR CODE CHECK UNIT 248 in Fig. 21E detected an odd number of 1 bits in the LRC CHARACTER which was read from the SELECTED TAPE and which is still stored in the CHARACTER REGISTER 214.

At the same time, that is, at W2 time, referring to the DATA TFR & CK EX TIMER 949 in Fig. 27D, the positive pulse on the W2(D1.5) line, in combination with the TU TO DC TAPE R TC3 and RCLB lines being up, passes via the AND circuit 970 and the OR circuit 971 to bring up the LRCR NOT RESET TO R/W CK line which condition is passed to the ERROR CHECK UNIT 268 in Fig. 21F. If the AND circuit 271 is conditioned by the LRCR NOT ZERO line being up, due to a discrepancy between the LRC CHARACTER created during the reading operation and the LRC CHARACTER read from the SELECTED TAPE, the positive pulse passes via the AND circuit 269 and the OR-C circuit 270 to turn on the R/W CK trigger 279 which, in being turned ON, applies a positive signal from its right-hand output which, in combination with the THIS DC SELECTED line being up, passes via the AND circuit 281 to bring up the R/W CK line.

Step 74

At W3.5 time, Step 49 is repeated during which another cycle of operation of the CLOCK 814 in Fig. 26B is initiated and a POST WRITE DISTURBANCE is made of the SELECTED STORAGE REGISTER in the MEMORY 50.

At the same time, referring to the TAPE R TYPE CYCLE UNIT 502 in Fig. 24A, the negative shift of the positive pulse on the W2(D1.5) line deconditions the AND circuit 512 causing a negative shift to be applied to turn OFF the TAPE R TC3 trigger which, in being turned OFF, applies a negative signal from its right-hand output to bring down the TAPE R TC3 line and, via the OR circuit 518, to bring down the TAPE R TC1+3 but $\bar{2}$ line and, via the OR circuit 516, to bring down the TAPE R TC1+2+3 line.

Step 75

Steps 46 and 47 are repeated during which the RCLB trigger in Fig. 24C is turned OFF to effectively bring down the RCLB and RCL lines and the ADDRESS REGISTER 132 in Fig. 20F is reset in preparation for receiving a new ADDRESS.

Step 76

Referring now to the TAPE R CONTROL UNIT 687 in Fig. 25E, Step 9 is repeated to continue the cycling of the CLOCK 814 in Fig. 26B until the 400 microsecond DISC DEL single shot 686 returns to its OFF state causing a negative shift to be applied from its right-hand output via the DISC DEL line to turn OFF the DEL R CALL trigger 682 which, in being turned OFF, applies a negative signal from its right-hand output to bring down the DEL R CALL line.

Referring now to the SELECT ADDRESS DECODER 602 in Fig. 25B, the negative shift on the DEL R CALL line passes via the OR circuit 622 and via a negative shift input to turn OFF the TU1 SEL trigger 620b. The negative shift on the DEL R CALL line is also applied to decondition the R amplifiers 740 of the READ AMPLIFIER UNIT 741 in Fig. 25H. Additionally, referring to the TAPE R TYPE CYCLE UNIT 502 in Fig. 24A, the negative shift on the DEL R CALL line is passed via the OR circuit 522 to bring down the TAPE R TC3+ DEL R CALL line.

Referring now to the STATUS DECODER 400 in Fig. 23, the negative shift on the DEL R CALL+TAPE R TC3 line is applied to turn OFF the TU TO DC status trigger 494 which, in being turned OFF, applies a negative signal from its right-hand output to bring down the TU TO DC line. The negative signal on the TU TO DC line is applied to decondition the AND circuit 727 in the MULTIPLE OPERATION TIMER UNIT 732 in Fig. 25G causing a negative signal to be applied to bring down the TAPE R CALL line. The negative shift on the TU TO DC line is also applied via a negative shift to turn OFF the TM RECOG trigger 757 in the CHARACTER RECOGNITION UNIT 752 in Fig. 25I if it had been previously turned ON due to the reading of a TAPE MARK CHARACTER.

Step 77

At W2.5 time, referring to the CLOCK CONTROL UNIT 802 in Fig 26D, the negative shift of the trailing edge of the positive pulse on the W1(D1.5) line deconditions the AND circuit 836 causing a negative shift to be applied to turn OFF the LONG CLOCK trigger 834 which, in being turned OFF, applies a negative signal from its right-hand output via the OR circuit 826 to decondition the AND circuit 828 and thereby prevent any further cycling of the CLOCK 814 in Fig. 26B which operation terminates this mode of operation.

Step 67A

It should be noted, that if an even number of 1 bits were written in each of the seven horizontal tracks of the SELECTED TAPE during the TAPE write operation, then, the LRC CHARACTER that is written on the SELECTED TAPE would be 0000000 and, therefore, would contain no 1 bits. Consequently, during the TAPE read operation, after the last CHARACTER of the RECORD is read, the CHARACTER RECOGNITION UNIT 752 would detect no 1 bit of the LRC CHARACTER to bring up the FIRST BIT line and initiate a CHARACTER GATE to start a cycle during which the LRC CHARACTER is stored in the MEMORY 50. Therefore, Step 67 would not be performed to bring up the FIRST BIT line inasmuch as the LRC CHARACTER would contain no 1 bit. Therefore, let it be assumed, that Step 66 has just been completed by which time the GM CHARACTER has been stored in the MEMORY 50 and the ADDRESS REGISTER 32 in Fig. 20F has been cleared in preparation for receiving the ADDRESS of the STORAGE REGISTER in the MEMORY 50 where the LRC CHARACTER is to be stored.

Referring now to the TAPE R CONTROL UNIT 687 in Fig. 25E, Step 9 is repeated to continue the cycling of the CLOCK 814 in Fig. 26B until the 400 microseconds DISC DEL single shot 686 returns to its OFF state causing a negative shift to be applied from its right-hand output via the DISC DEL line to turn OFF the DEL R CALL trigger 682 which, in being turned OFF, applies a negative signal from its right-hand output to bring down the DEL R CALL line.

Referring now to the SELECT ADDRESS DECODER 602 in Fig. 25B the negative shift on the DEL R CALL line passes via the OR circuit 622 to turn OFF the TU1 SEL trigger 620b. The negative shift on the DEL R CALL line is also applied to decondition the R amplifiers 740 of the READ AMPLIFIER 741 in Fig. 25H.

Referring now to the PRIORITY R/W SERVICE UNIT 578 in Fig. 24C, the negative shift on the $\overline{DISC\ DEL}$ line is applied to turn ON the R SERVICE trigger 579 which, in being turned ON, applies a positive signal from its right-hand output which, in combination with the $\overline{WCLB}$ line being up and the W3(D1.5) and $\overline{CTRL\ 8}$ lines being up via the AND circuit 583 and the OR circuit 585, passes via the AND circuit 581 and via the R SERVICE CALL line to turn ON the RCLA trigger 589 in the TAPE R/W CYCLE UNIT 588. The RCLA trigger 589 in being turned ON applies a negative signal from its left-hand output to bring down the $\overline{RCLA}$ line and applies a positive from its right-hand output to bring up the RCLA line and, via the OR circuit 590, to bring up the RCL line. The positive signal on the RCL line is applied to the MEMORY EX TIMER 902 in Fig. 27A, where, in combination with the TU TO DC and TAPE R TC1+2+3 lines being up, it passes via the AND circuit 907 and the OR circuit 903 to bring up the MEM W line and, via the OR circuit 904, to bring up the MEM R/W line.

Referring now to the TAPE R TYPE CYCLE UNIT 502 in Fig. 24A, the positive signal on the RCL line, in combination with the TAPE R TC3 line being up, passes via the AND circuit 503 to the inverter 504 where it is inverted to a negative shift to turn OFF the TAPE R TC1 trigger 506 which, in being turned OFF, applies a negative signal from its right-hand output to bring down the TAPE R TC1 line.

Step 68A

Steps 34 to 41 are repeated during which the following sequence of events occur:

(a) Another cycle of operation of the CLOCK 814 in Fig. 26B is initiated.

(b) The ADDRESS REGISTER 132 in Fig. 20F is set with the ADDRESS of the STORAGE REGISTER in the MEMORY 50 where the LRC CHARACTER is to be stored.

(c) The SELECTED STORAGE REGISTER in the MEMORY 50 is cleared in preparation for receiving the LRC CHARACTER.

(d) Since the CHARACTER REGISTER 214 is in a reset condition as per Step 60, which is comparable to having the CHARACTER 0000000 stored therein, the LRC CHARACTER 0000000 is written in the SELECTED STORAGE REGISTER of the MEMORY 50.

Step 69A

Step 42 is not repeated to bring up the CR 214 TO LRCR line as the DEL R CALL line is down and inasmuch as it is unnecessary. Thus, if the LRC CHARACTER read from the TAPE was not, in fact, 0000000, but the newly created LRC CHARACTER presently stored in the LRCR was, in fact, 0000000, then, the LRC CHARACTER read from the TAPE and stored in the CHARACTER REGISTER 214 would be transferred to the LRCR 242 for a comparison check causing the LRCR NOT ZERO line to be brought up. Also, if the LRC CHARACTER read from the TAPE was, in fact, 0000000, but the newly created LRC CHARACTER presently stored in the LRCR was not, in fact, 0000000, then, no transfer from the CR 214 to the LRCR 242 is necessary as the LRCR NOT ZERO line would be brought up as soon as the LRC CHARACTER was created.

Step 70A

Step 73 is repeated during which the ADDRESS COUNTER 112 in Fig. 20G is stepped by a count of 1, the R/W CK trigger 279 of the ERROR CHECK UNIT 268 in Fig. 21F is turned ON if the CHAR CODE CHECK UNIT 248 in Fig. 21E detected an odd number of 1 bits in the LRC CHARACTER or if there was a discrepancy between the newly created LRC CHARACTER and the LRC CHARACTER read from the SELECTED TAPE.

Step 71A

Step 45 is repeated to initiate another cycle of operation of the CLOCK 814 in Fig. 26B and to make a POST WRITE DISTURBANCE of the SELECTED STORAGE REGISTER in the MEMORY 50.

Now, at W3.5 time, referring to the TAPE R TYPE CYCLE UNIT 702 in Fig. 24A, the negative shift of the trailing edge of the positive pulse on the W2(D1.5) deconditions the AND circuit 512 causing a negative shift to be applied to turn OFF the TAPE R TC3 trigger 514 which, in being turned OFF, applies a negative signal from its right-hand output to bring down the TAPE R TC3 line and, via the OR circuit 518, to bring down the TAPE R TC1+3 but $\bar{2}$ line and, via the OR circuit 516, to bring down the TAPE R TC1+2+3 line. The negative signal on the TAPE R TC3 line is also applied via the OR circuit 522 to bring down the R TC3+DEL R CALL line.

Referring now to the STATUS DECODER in Fig. 23, the negative shift on the DEL R CALL +TAPE R TC3 line is applied to turn OFF the TU TO DC status trigger 444 which, in being turned OFF, applies a negative signal from its right-hand output to bring down the TU TO DC line. The negative signal on the TU TO DC line is applied to decondition the AND circuit 727 in the MULTIPLE OPERATION TIMER UNIT 732 in Fig. 25G causing a negative signal to be applied to bring down the TAPE R CALL line.

Step 72A

Step 77 is repeated to turn OFF the LONG CLOCK trigger 834 in Fig. 26D, to prevent any further cycling of the CLOCK 814 and thereby terminate this mode of operation.

DATA COORDINATOR TO CENTRAL PROCESSING UNIT

The DC TO CPU mode of operation functions to transfer a RECORD or group of RECORDS from the MEMORY 50 of the DATA COORDINATOR to the CENTRAL PROCESSING UNIT.

A DC TO CPU operation may be performed by a process of 2 instructions, namely, a SELECT instruction followed by a READ instruction. Thus, the PROGRAM for an exemplary DC TO CPU mode of operation may be as follows:

SELECT 20604
READ Y1132

Simply interpreted, the operation part 2 of the SELECT instruction designates that a SELECT operation is to be performed, while the ADDRESS part 0604 of the SELECT instruction designates the DATA COORDINATOR as the SELECTED input/output unit and that no TAPE UNIT is involved in this operation. Similarly, the operation part Y of the READ instructions designates that a READ operation is to be performed, while the ADDRESS part 1132 of the READ instruction designates the ADDRESS in the MEMORY of the CPU starting at which the RECORD or group of RECORDS may be read from the MEMORY 50 of the DATA COORDINATOR.

The DC TO CPU mode of operation will now be described in step by step manner wherein all operations within a step at relatively the same instant of time and with reference being made to the detailed logical block diagrams of the major component of the DATA COORDINATOR shown in Figs. 20 to 27, inclusive. Also, reference may be made to the timing diagrams of Fig. 32 to aid in understanding the sequence of the present operation.

Step 1

Initially, the DATA COORDINATOR is ready to perform an operation as previously explained in the section on the DATA COORDINATOR READY. Thus, referring to the DC RDY UNIT 840 in Fig. 26B, a positive signal is initially maintained on the DC RDY line.

Now, when the SELECT instruction is called for, the ADDRESS part is applied to the SELECT ADDRESS DECODER 602 in Fig. 25A in the form of binary signals. The SELECT ADDRESS DECODER 602 decodes these signals to bring up the THIS DC SELECTED line, the MODE C line and the DC SEL & RDY lines in a manner as previously described in the section on SELECT ADDRESS DECODING.

Step 2

After the execution of the SELECT instruction, the PROGRAM steps to the READ instruction which causes the CPU to perform a cycle of operation during which the CPU PREP TO R line is brought up. The positive shift on the CPU PREP TO R line, in combination with the DC SEL & RDY line being up, passes via the AND circuit 306 of the INSTRUCTION DECODER 300 in Fig. 22 to bring up the PREP TO R line.

Step 3

Shortly thereafter (approximately 6 microseconds) the CPU brings up the CPU R CALL line. The positive shift on the CPU R CALL line, in combination with the DC SEL & RDY line being up, passes via the AND circuit 302 of the INSTRUCTION DECODER 300 in Fig. 22 to bring up the R CALL line.

Referring now to the STATUS DECODER 400 in Fig. 23, the positive shift on the R CALL line, in combination with the PREP TO R line being up, passes via the AND circuit 410 and, in combination with the $\overline{CTRL\ 8}$ line being up, passes via the AND circuit 412 to the inverter 414 where it is inverted to a negative shift to turn ON the DC TO CPU & TC1 status trigger 416 which, in being turned ON, applies a negative signal from its left-hand output to bring down the $\overline{DC\ TO\ CPU}$ line and applies a positive signal from its right-hand output to bring up the DC to CPU line.

The negative shift on the $\overline{DC\ TO\ CPU}$ line is applied to decondition the AND circuit 120 in the RESET UNIT 118 in Fig. 20G and apply a negative shift causing the peaker 122 to apply a 2 microsecond positive pulse via the RESET AC 124 line to reset all of the triggers 126 so that the ADDRESS COUNTER 124 in Fig. 20F stands with the count of 0. The triggers 126, in being reset, are effective to apply negative signals from their right-hand outputs to decondition the AND circuits 130 of the COUNTER GATE 128. The negative shift on the $\overline{DC\ TO\ CPU}$ line is also applied via a negative shift input to turn ON the CPU R BUS trigger 981 in the DATA TFR & CK EX TIMER 949 in Fig. 27B, which, in being turned ON applies a positive signal from its right-hand output to bring up the CR 214 to CPU R BUS line and condition the AND circuits 220 of the CHARACTER REGISTER 214 in Fig. 21B.

Referring now to the DC & CPU TYPE CYCLE UNIT 560 in Fig. 24B, the positive signal on the DC TO CPU line passes via the OR circuit 561 to bring up the DC TO CPU TC1+2 line which condition is passed to the MEMORY EX TIMER 902 in Fig. 27A. The positive signal on the DC TO CPU TC1+2 line passes via the OR circuit 906 to bring up the MEM R line and, via the OR circuit 904, to bring up the MEM R/W line. Additionally, referring to the DC RDY unit 840 in Fig. 26B, the positive signal on the DC TO CPU line passes via the OR circuit 844 to maintain the BC RDY line up during this mode of operation.

Step 4

Shortly after the CENTRAL PROCESSING UNIT calls for a READ operation, the CPU issues a positive clock synchronizing pulse which is applied via the CPU SYNC PULSE line to the CLOCK CONTROL unit 802 in Fig. 26D where, in combination with the DC TO CPU line being up via the OR circuit 804, it passes via the AND circuit 806 to the inverter 808 where it is inverted to a negative pulse to turn ON the INITIATE trigger 810. The INITIATE trigger 810, in being turned ON, applies a positive signal from its right-hand output via the OR circuit 812 to bring up the CLOCK GATE line to initiate a cycle of operation of the CLOCK 814 in Fig. 26B in a manner as previously described in this section on the CLOCK PULSE GENERATOR.

Step 5

At R0 time, referring to the CLOCK CONTROL UNIT 802 in Fig. 26D, the negative shift of the leading edge of the negative pulse on the $\overline{R0(D1.5)}$ line is applied via a negative shift input to turn OFF the INITIATE trigger 810 which, in being turned OFF, applies a negative signal from its right-hand output via the OR circuit 812 to bring down the CLOCK GATE line and prevent further cycling of the CLOCK 814 after the present cycle runs out.

At R0 time, referring to the CTR & REG EX TIMER 942 in Fig. 27, the positive pulse on the R0(D4) line, in combination with the MEM R line being up and the DC TO CPU TC1+2 line being up via the OR circuit 944, passes via the AND circuit 945 to bring up the AC 124 to AR line which condition is passed to the AND circuits 130 of the COUNTER GATE 128 in Fig. 20F. The positive signal on the AC 124 TO AR line passes via those AND circuits 130 of the COUNTER GATE 128 which are conditioned in accordance with the count setting of the ADDRESS COUNTER 124 and via corresponding ones of the OR circuits 134 in the ADDRESS REGISTER 132 to turn ON corresponding ones of the triggers 136. In the present instance, the AND circuits 130 being deconditioned, block the positive pulse on the AC 124 TO AR line from having any effect on the ADDRESS REGISTER 132 with the result being that the ADDRESS REGISTER 132 remains set at a value which is the ADDRESS (0000) of the STORAGE REGISTER in the MEMORY 50 where the first CHARACTER is stored.

At R0 time, referring to the MEMORY EX TIMER 902 in Fig. 27A, the positive pulse on the R0(D4) line, in combination with the MEM R/W line being up and the DC TO CPU line being up via the OR circuit 908, passes via the AND circuit 909 to bring up the R BIAS GATE line which condition is passed to the X SC BIAS & W DRIVERS 172 and 184 in Figs. 20B and 20D, respectively, which are conditioned in accordance with the ADDRESS setting (0000) of the ADDRESS REGISTER 132 to apply negative current pulses to bias OFF all but the SELECTED ROWS (X0) of the X and Y SWITCH CORE MATRICES 156 and 150 in a manner as previously described in the section on the MEMORY CONTROL UNIT.

Step 6

At R0.5 time, referring to the RESET EX TIMER 924, in Fig. 27B, the positive pulse on the R0.5(D1.5) line, in combination with the DC TO CPU TC1+2 line being up, passes via the AND circuit 929 and the OR circuit 927 to the inverter 928 where it is inverted to a negative pulse and applied via the RESET CR 208 line to the CHARACTER REGISTER 208 in Fig. 21A. The negative shift of the leading edge of the negative pulse on the RESET CR 208 line is applied via negative shift inputs to reset all of the triggers 212 of the CHARACTER REGISTER 208 in preparation for receiving the first CHARACTER presently stored in the MEMORY 50.

Step 7

At R1.5 time, referring to the MEMORY EX TIMER 902 in Fig. 27A, the positive pulse on the R1.5(D2.5) line, in combination with the MEM R/W line being up, passes via the AND circuit 910 to bring up the R GATE line, which condition is passed to the Y SC DECODERS 138 and 143 in Figs. 20A and 20E, respectively, which are conditioned in accordance with the ADDRESS SETTING (0000) of the ADDRESS REGISTER 132, to render the Y SC R DRIVERS 146 and 152 effective to drive the SELECTED COLUMNS (COLUMNS Y0) of the X and Y SWITCH CORE MATRICES 156 and 150. Since only one core in each of the SELECTED COLUMNS is in the unbiased state, only those cores switch from the reset to the set position and induce current in their secondaries which cause negative half select current pulses to be applied to the SELECTED X and Y wires (XX0 and YY0) of the MEMORY 50 to effectively cause the first CHARACTER presently stored in the SELECTED STORAGE REGISTER of the MEMORY 50 to be read out and applied to the sense wires SW in a manner as previously described in the section on the MEMORY OPERATION. Those MEMORY CORES of the SELECTED STORAGE REGISTER which have a one bit stored induct voltage pulses in their sense windings SW which are amplified by corresponding ones of the SENSE AMPLIFIERS 206 in Fig. 21A to condition corresponding ones of the diode gates 207.

Step 8

At R3.5 time, referring to the SENSE AMPLIFIER UNIT 202 in Fig. 21A, positive shift of the leading edge of the positive pulse on the R3.5(D1.5) line, in combination with the MEM R line being up, passes via the AND circuit 203 to the inverter 204 where it is inverted to a negative shift causing the peaker 205 to apply a two microsecond positive pulse via the MEM TO CR 208 line to the diode gates 207. Those of the diode gates 207 conditioned by the positive output of those of the SENSE AMPLIFIERS 206 corresponding to a 1 bit of the first CHARACTER pass the positive pulse on the MEM TO CR 208 line via corresponding ones of the OR circuits 211 to turn ON corresponding ones of the triggers 212 of the CR 208 thereby effectively storing the first CHARACTER in the CHARACTER REGISTER 208.

The signals from the left-hand outputs of the triggers 212 are applied to the CHAR CODE CK UNIT 232 in Fig. 21D, in accordance with the first CHARACTER presently stored in the CR 208, where a vertical check is made to insure that there are an even number of 0 bits in the first CHARACTER in a manner as previously described in the section of CODE CHECKING. If the CHARACTER has an odd number of 1 bits, then, this condition is detected by the CHAR CODE CK UNIT 232 to bring up the CHAR CODE CK A line which, in coming up, conditions the AND circuit 272 of the ERROR CHECK UNIT 268 in Fig. 21F. At the same time, referring to the CR 208 and the INPUT SWITCH 222 in Figs. 21A and 21C, respectively, those of the triggers 212 of the CR 208 which were not previously turned ON, and which correspond to a 0 bit of the first CHARACTER, apply positive signals from their left-hand outputs which in combination with the MEM R line being up, pass via corresponding ones of the AND circuits 224 and corresponding ones of the OR circuits 225 to condition corresponding ones of the AND circuits 227 of the INHIBIT DRIVER 226.

Step 9

At R4 time, referring to the CTR & REG EX TIMER 942 in Fig. 27D, the positive pulse on the R4(D1.5) line, in combination with the MEM R line being up, passes via the AND circuit 943 to bring up the STEP AC 124 line which condition is passed to the ADDRESS COUNTER 124 in Fig. 20F.

Step 10

At R4.5 time, referring to the MEMORY EX TIMER 902, in Fig. 27A, the positive pulse on the R4.5(D4.5) line, in combination with the MEM R/W $\overline{RCLA}$ and $\overline{WCLA}$ lines being up, passes via the AND circuit 911 to bring up the INHIBIT GATE line which condition is passed to the AND circuits 227 of the INHIBIT DRIVER 226 in Fig. 21C. Those of the AND circuits 227 which are conditioned by a positive signal, corresponding to a 0 bit of the first CHARACTER presently stored in the CR 208, pass the positive pulse on the INHIBIT GATE line via corresponding ones of the OR circuit 228 and the AND circuits 229 to corresponding ones of the IN- HIBIT DRIVERS 230 which apply negative INHIBIT current pulses to the Z wires of the corresponding ones of the bit planes of the MEMORY 50 to INHIBIT these bit planes in a manner as previously described in the section on INHIBIT DRIVING.

At the same time, the positive pulse on the R4.5(D4.5) line, in combination with the MEM R/W, $\overline{RCLA}$ and $\overline{WCLA}$ lines being up, passes via the AND circuit 912 to bring up the W GATE line which condition is passed to the X SC DECODERS 158 and 164 in Fig. 20C, which are conditioned in accordance with the ADDRESS setting (0000) of the ADDRESS REGISTER 132, to render the X SC BIAS & W DRIVERS 172 and 184, in Figs. 20B and 20D, respectively, effective to drive the SELECTED ROWS (ROW X0) of the X and Y SWITCH CORE MATRICES 156 and 150. Since only one core in each of the SELECTED ROWS is in the set position, only these cores switch from a set to the reset position and induce current in their secondaries which cause positive half select current pulses to be applied to the SELECTED X and Y wires (XX0 and YY0) of the MEMORY 50. These positive half select current pulses are applied to the SELECTED X and Y wires of the MEMORY 50 during the same interval of time that the INHIBIT current pulses are being applied to the Z wires in the MEMORY 50 which corresponds to the 0 bits of the first CHARACTER. Consequently, those MEMORY CORES of the SELECTED STORAGE REGISTER in the MEMORY 50 which are not INHIBITED are switched to the 1 state thereby effectively storing a 1 bit whereas those MEMORY CORES of the SELECTED STORAGE REGISTER which are INHIBITED remain in the 0 state thereby effectively storing a 0 bit with the resulting effect being that the first CHARACTER is re- written in the SELECTED STORAGE REGISTER of the MEMORY 50.

Step 11

At W0 time, referring to the RESET X TIMER 924 in Fig. 27B, the positive pulse on the W0(D1.5) line, in combination with the DC TO CPU TC1+2 line being up, passes via the AND circuit 931 and the OR circuit 933 to the inverter 934 where it is inverted to a negative pulse and applied via the RESET CR 214 line to the CR 214 in Fig. 21B. The negative shift of the leading edge of the negative pulse on the RESET CR 214 line is applied via negative shift inputs to reset all of the triggers 218 of the CHARACTER REGISTER 214 in preparation for receiving the first CHARACTER present- ly stored in the CHARACTER REGISTER 208.

Step 12

At W0.5 time, referring to the ADDRESS COUNTER 112 in Fig. 20G, the negative shift of the trailing edge of the positive pulse on the STEP AC 112 line is applied to turn ON the first trigger 110a and thereby step the ADDRESS COUNTER 112 to a count of 1. The trigger 110a in being turned ON applies a positive signal from its right-hand output to condition the AND circuit 114a of the COUNTER GATE 116 while the triggers 110b to 110j, inclusive, remain OFF and maintain negative signals from their right-hand outputs to decondition the corre- sponding AND 114b to 114j, respectively, of the COUNTER GATE 116.

Step 13

At W1 time, referring to the DC & CPU TYPE CYCLE UNIT 560 in Fig. 24B, the positive pulse on the W1(D1.5) line, in combination with the DC TO CPU line being up, passes via the AND circuit 576 to turn ON the DC TO CPU TC1 but $\overline{ECC1}$ trigger 577 which, in being turned ON, applies a positive signal from its right-hand output to bring up the DC TO CPU TC1 but $\overline{ECC1}$ line.

At W1 time, referring to the DATA TFR & CK EX TIMER 949 in Fig. 27C, the positive pulse on the W1(D1.5) line, in combination with the DC TO CPU TC1+2 line being up, passes via the AND circuit 954 and the OR circuit 953 to bring up the CHAR CODE CK A TO R/W CK line which condition is passed to the AND circuit 272 of the ERROR CHECK UNIT 268 in Fig. 21F. If the AND circuit 272 is conditioned by the CHAR CODE CK A line being up, due to the existence of an odd number of 1 bits in the first CHARACTER, the positive pulse passes via the AND circuit 272 and the OR-C circuit 270 to turn ON the R/W CK trigger 279, which, in being turned ON, applies a positive signal from its right-hand output which, in combination with the THIS DC SELECTED line being up, passes via the AND circuit 281 to bring up the R/W CK line.

Step 14

At W2 time, referring to the DATA TFR & CK EX TIMER 949 in Fig. 27C, the positive pulse on the W2(D1.5) line, in combination with the DC TO CPU TC1+2 line being up, passes via the AND circuit 950 to bring up the CR 208 TO CR 214 line which condition is passed to the CHARACTER REGISTER 214 in Fig. 21B). Those of the AND circuits 215 which are con- ditioned by a positive signal, corresponding to a 1 bit of the first CHARACTER presently stored in the CR 208, pass the positive pulse on the CR 208 TO CR 214 line via corresponding ones of the OR circuits 217 to turn ON corresponding ones of the triggers 218 so that the first CHARACTER is effectively stored in the CHARAC- TER REGISTER 214. Those of the triggers 218 which are turned ON apply positive signals from their right-hand outputs, corresponding to the 1 bits of the first CHARAC- TER, via corresponding ones of the now conditioned AND circuits 220 to the CPU R BUS whereby the first CHARACTER is effectively applied to the CPU R BUS.

Step 15

At W3.5 time, referring to the CLOCK CONTROL UNIT 802 in Fig. 26D, let it be assumed that the CPU has completed a clock cycle and again applies a positive pulse to the CPU SYNC PULSE line which, in combination with the DC TO CPU line being up, is effective to turn ON the INITIATE trigger 810 to effectively bring up the CLOCK GATE line to initiate another cycle of operation of the CLOCK 814 in Fig. 26B.

At W3.5 time, referring to the MEMORY EX TIMER 902 in Fig. 27A, the positive pulse on the W3.5(D1) line, in combination with the MEM R/W, $\overline{RCLA}$ and $\overline{WCLA}$ lines being up, passes via the AND circuit 913 to bring up the PWD GATE line which condition is passed via the OR circuits 228 of the INHIBIT DRIVER 226 in Fig. 21C and the AND circuits 229 to the INHIBIT DRIVERS 230 which apply post write disturbance current pulses to all of the Z wires of the MEMORY 50 to disturb all of the MEMORY CORES in the SELECTED STORAGE REGISTER to minimize subsequent noise pulses in a manner as previously described in the section on POST WRITE DISTURBANCE.

At W3.5 time, the positive pulse on the W3.5(D1) line is also applied to the ADDRESS REGISTER 132 in Fig. 20F.

Step 16

At R0 time, referring to the CLOCK CONTROL UNIT 802 in Fig. 26D, the negative shift of the leading edge of the negative pulse on the $\overline{R0(D1.5)}$ line is applied via a negative shift input to turn OFF the INITIATE trigger 810 which, in being turned OFF, is effective, via the OR circuit 812 to bring down the CLOCK GATE line and prevent further cycling of the CLOCK 814 after the present cycle runs out.

At R0 time, referring to the CTR & REG EX TIMER 942 in Fig. 27B, the positive pulse on the R0(D4) line, in combination with the MEM R line being up and the DC TO CPU TC1+2 line being up via the OR circuit 944, passes via the AND circuit 945 to bring up the AC 124 TO AR line which condition is passed to the AND circuits 130 of the COUNTER GATE 128 in Fig. 20F. The positive signal on the AC 124 TO AR line passes via those AND circuits 130 of the COUNTER GATE 128 which are conditioned in accordance with the count setting of the ADDRESS COUNTER 124 and via corresponding ones of the OR circuits 134 in the ADDRESS REGISTER 132 to turn ON corresponding ones of the triggers 136. Thus, in the present instance, since only the AND circuit 114a is conditioned, the positive signal on the AC 124 to AR line passes therethrough and via the corresponding trigger 136a of the ADDRESS REGISTER 132 in Fig. 20F.

At R0 time, referring to the MEMORY EX TIMER 902 in Fig. 27A, the positive pulse on the R0(D4) line, in combination with the MEM R/W line being up and the DC TO CPU line being up via the OR circuit 908, passes via the AND circuit 909 to bring up the R BIAS GATE line which condition is passed to the X SC BIAS & W DRIVERS 172 and 184 in Figs. 20B and 20D, respectively.

At R0 time, referring to the RESPONSE EX TIMER 914 in Fig. 27B, the positive pulse on the R0(D4) line, in combination with the DC TO CPU TC1+2 and DC TO CPU TC1 but $\overline{ECC1}$ lines being up, passes via the AND circuit 917 and the OR circuit 916 to bring up the R RESPONSE line to signal the CPU to sample the first CHARACTER presently on the CPU R BUS.

Step 17

At R0.5 time, referring to the RESET EX TIMER 924 in Fig. 27B the positive pulse on the R0.5(D1.5) line, in combination with the DC TO CPU TC1+2 line being up, passes via the AND 929 and the OR circuit 927 to the inverter 928 where it is inverted to a negative pulse and applied via the RESET CR 208 line to the CHARACTER REGISTER 208 in Fig. 21A. The negative shift of the leading edge of the negative pulse on the RESET CR 208 line is applied via negative shift inputs to reset all of the triggers 212 to effectively clear the CHARACTER REGISTER 208 in preparation for receiving the next CHARACTER.

At R0.5 time, referring to the ADDRESS REGISTER 132 in Fig. 20F, the negative shift of the trailing edge of the positive pulse on the W3.5(D1) line is applied via negative shift inputs to reset all of the triggers 136 of the ADDRESS REGISTER 132. However, the AC 124 to AR line is maintained up during the period of the negative shift and is of sufficient duration as to maintain ON any of the triggers 136, to which it is effectively applied, despite the application of the negative shift so that the ADDRESS REGISTER 132 is now set to a value corresponding to the count setting of the ADDRESS COUNTER 124 which is the ADDRESS (0001) of the STORAGE REGISTER in the MEMORY 50 where the next CHARACTER is presently stored.

Now, the X SC BIAS & W DRIVERS 172 and 184 in Figs. 20B and 20D, respectively, being conditioned in accordance with the ADDRESS setting of the ADDRESS REGISTER 132 respond to the positive pulse on the R BIAS GATE line and apply negative current pulses to bias OFF all but the SELECTED ROWS (ROWS X0) of the X and Y SWITCH CORE matrices 156 and 150.

Step 18

At R1.5 time, referring to the MEMORY EX TIMER 902 in Fig. 27A, the positive pulse on the R1.5(D2.5) line in combination with MEM R/W line being up, passes via the AND circuit 910 to bring up the R GATE line which condition is passed to the Y SC DECODERS 138 and 143 in Figs. 20A and 20E, respectively, which are conditioned in accordance with the ADDRESS SETTING (0001) of the ADDRESS REGISTER 132, to render the R SC R DRIVERS 146 and 152 effective to drive the SELECTED COLUMNS (COLUMNS Y0 and Y1) of the X and Y SWITCH CORE MATRICES 156 and 150. Since only one core in each of the SELECTED COLUMNS is in the unbiased state only these cores switch from the reset to set position and induce current in their secondaries which cause negative half select current pulses to be applied to the SELECTED X and Y wires (SS0 and YY1) of the MEMORY 50 to effectively cause the CHARACTER stored in the next SELECTED STORAGE REGISTER of the MEMORY 50 to be read out and applied to the sense wires SW. Those MEMORY CORES of the SELECTED STORAGE REGISTER which have a 1 bit stored therein induce voltage pulses in their sense windings SW which are amplified by corresponding ones of the SENSE AMPLIFIERS 206 in Fig. 21B to condition corresponding ones of the diode gates 207.

Step 19

At R3.5 time, referring to the SENSE AMPLIFIER UNIT 202 in Fig. 21A, the positive shift of the leading edge of the positive pulse on R3.5(D1.5) line, in combination with the MEM R line being up passes via the AND circuit 203 to the inverter 204 where it is inverted to a negative shift causing the peaker 205 to apply a 2 microsecond positive pulse via the MEM TO CR 208 line to the diode gates 207. Those of the diode gates 207 conditioned by the positive output of those of the SENSE AMPLIFIERS 206, corresponding to a 1 bit of the previously read out CHARACTER, pass the positive pulse on the MEM TO CR 208 line via corresponding ones of the OR circuit 211 to turn ON corresponding ones of the triggers 212 of the CR 208 thereby effectively storing the next CHARACTER in the CHARACTER REGISTER 208.

The signals from the left-hand outputs of the triggers 212 are applied to the CHAR CODE CK UNIT 232 in Fig. 21D, in accordance with the CHARACTER presently stored in the CR 208, where a vertical check is made to insure that there are an even number of 1 bits in the CHARACTER. If the CHARACTER has an odd number of 1 bits, then, this condition is detected by the CHAR CODE CK UNIT 232 to bring up the CHAR CODE CK A line which conditions the AND circuit 272 of the ERROR CHECK UNIT 268 in Fig. 21F. At the same time referring to the CR 208 and the INPUT SWITCH 222 in Figs. 21A and 21B, respectively, those of the triggers 212 of the CR 208 which were not previously turned ON, and which correspond to a 0 bit of the CHARACTER, apply positive signals from their left-hand outputs which, in combination with the MEM R line being up, passes via corresponding ones of the AND circuit 224 and corresponding ones of the OR circuit 225 to condition corresponding ones of the AND circuits 227 of the INHIBIT DRIVER 226.

Step 20

At R4 time, referring to the CTR & REG EX TIMER 942 in Fig. 27B, the positive pulse on the R4(D1.5) line, in combination with the MEM R line being up, passes via the AND circuit 943 to bring up the STEP AC 124 line which condition is passed to the ADDRESS COUNTER 124 in Fig. 20F.

Step 21

At R4.5 time, referring to the MEMORY EX TIMER 902 in Fig. 27A, the positive pulse on the R4.5(D4.5) line, in combination with the MEM R/W, $\overline{RCLA}$ and $\overline{WCLA}$ lines being up, passes via the AND circuit 911 to bring up the INHIBIT GATE line which condition is passed to the AND circuits 227 of the INHIBIT DRIVER 226 in Fig. 21C. Those of the AND circuits 227 which are conditioned by a positive signal, corresponding to a 0 bit of the CHARACTER presently stored in the CR 208, pass the positive pulse on the INHIBIT GATE line via corresponding ones of the OR circuits 228 and the AND circuits 229 to corresponding ones of the INHIBIT DRIVERS 230 which apply negative INHIBIT current pulses to the Z wires of the corresponding ones of the bit planes of the MEMORY 50 to inhibit these bit planes.

At R4.5 time, referring to the MEMORY EX TIMER 902 in Fig. 27A, the positive pulse on the R4.5(D4.5) line, in combination with the MEM R/W, $\overline{RCLA}$ and $\overline{WCLA}$ lines being up, passes via the AND circuit 912 to bring up the W GATE line which condition is passed to the X SC DECODERS 158 and 164 in Fig. 20C, which are conditioned in accordance with the ADDRESS setting (0001) of the ADDRESS REGISTER 132 to render the X SC BIAS & W DRIVERS 172 and 184 in Fig. 20B and 20D, respectively, effective to drive the SELECTED ROWS (ROWS X0) of the X and Y SWITCH CORE MATRICES 156 and 150. Since only one core in each of the SELECTED ROWS is in the set position, only these cores switch from the set to the reset position and induce current in their secondaries which cause positive half select current pulses to be applied to the SELECTED X and Y wires (XX0 and YY1) of the MEMORY 50. These positive half select current pulses are applied to the SELECTED X and Y wires of the MEMORY 50 during the same interval of time that the INHIBIT current pulses are being applied to the Z wires of the MEMORY 50 which correspond to the 0 bits of the CHARACTER. Consequently, these MEMORY CORES of the SELECTED STORAGE REGISTER in the MEMORY 50 which are not inhibited are switched to the 1 state thereby effectively storing a 1 bit whereas those MEMORY CORES of the SELECTED STORAGE REGISTER which are INHIBITED remain in the 0 state thereby effectively storing a 0 bit with the resulting effect being that the CHARACTER is rewritten in the SELECTED STORAGE REGISTER of the MEMORY 50.

Step 22

At W0 time, referring to the RESET EX TIMER 924 in Fig. 27B, the positive pulse on the W0(D.15) line, in combination with the DC TO CPU TC1+2 line being up, passes via the AND circuit 931 and the OR circuit 933 to the inverter 934 where it is inverted to a negative pulse and applied via the RESET CR 214 line to the CR 214 in Fig. 21B. The negative shift of the leading edge of the negative pulse on RESET CR 214 line is applied via negative shift inputs to reset all of the triggers 218 of the CHARACTER REGISTER 214 in preparation for receiving the next CHARACTER presently stored in the CHARACTER REGISTER 208.

Step 23

At W0.5 time, referring to the ADDRESS COUNTER 124 in Fig. 20F, the negative shift of the trailing edge of the positive pulse on the STEP AC 124 line is effective to step the ADDRESS COUNTER 124. Hence, in the present instance, the first trigger 126a is turned OFF causing a negative shift to be applied from its right-hand output to turn ON the second trigger 126b and thereby step the ADDRESS COUNTER 124 to a count of 2. The trigger 126b in being turned ON applies a positive signal to condition the AND circuit 130b of the COUNTER GATE 128 while the triggers 126a and 126c to 126j, inclusive, remain OFF and apply negative signals from their left-hand outputs to decondition the corresponding AND circuits 130a and 130c to 130j, respectively, of the COUNTER GATE 128.

Step 24

At W1 time, referring to the DATA TFR & CK EX TIMER 949 in Fig. 27C, the positive pulse on the W1(D1.5) line, in combination with the DC TO CPU TC1+2 line being up, passes via the AND circuit 954 and the OR circuit 953 to bring up the CHAR CODE CK A TO R/W CK line which condition is passed to the AND circuit 272 of the ERROR CHECK UNIT 268 in Fig. 21F. If the AND circuit 272 is conditioned by the CHAR CODE CK A line being up, due to the existence of an odd number of 1 bits in the CHARACTER presently stored in the CR 208, the positive pulse passes via the AND circuit 272 and the OR–C circuit 270 to turn ON the R/W CK trigger 279 which, in being turned ON, applies a positive signal from its right-hand output which, in combination with the THIS DC SELECTED line being up, passes via the AND circuit 282 to bring up the R/W CK line.

Step 25

At W2 time, referring to the DATA TFR & CK EX TIMER 949 in Fig. 27C, the positive pulse on the W2(D1.5) line, in combination with the DC TO CPU TC1+2 line being up, passes via the AND circuit 950 to bring up the CR 208 TO CR 214 line which condition is passed to the CHARACTER REGISTER 214 in Fig. 21B. Referring now to the CHARACTER REGISTER 208 and the CHARACTER REGISTER 214 in Figs. 21A and 21B, respectively, those of the AND circuits 215 which are conditioned by a positive signal, corresponding to a 1 bit of the CHARACTER presently stored in the CR 208, pass the positive pulse on the CR 208 TO CR 214 line via corresponding ones of the OR circuits 217 to turn ON corresponding ones of the triggers 218 to effectively transfer the next CHARACTER presently stored in the CR 208 to CHARACTER REGISTER 214. Those of the triggers 218 of the CHARACTER REGISTER 214 which are turned ON, corresponding to the 1 bits of the CHARACTER presently stored therein, apply positive signals from their right-hand outputs via corresponding ones of the conditioned AND circuits 220 to the CPU R BUS so that the CHARACTER now effectively appears on the CPU R BUS and is ready to be sampled by the CPU.

Step 26

Steps 15 to 25 are repeated for each CHARACTER of the RECORD or group of RECORDS transferred from the MEMORY 50 of the DATA COORDINATOR to the CENTRAL PROCESSING UNIT.

Step 27

Now let it be assumed, that the next CHARACTER to be processed is the GM CHARACTER. Consequently, Steps 15 to 19 are repeated, during which the following sequence of events occur:

(a) Another cycle of operation of the CLOCK 814 in Fig. 26B is initiated.

(b) The last CHARACTER of the RECORD or group of RECORDS, presently on the CPU R BUS, is sampled by the CENTRAL PROCESSING UNIT.

(c) The CHARACTER REGISTER 208 is cleared in preparation for receiving the GM CHARACTER presently stored in the MEMORY 50.

(d) The GM CHARACTER is read out of the SELECTED STORAGE REGISTER of the MEMORY 50 and stored in the CHARACTER REGISTER 208 after which a vertical check is made to insure that there are an even number of 1 bits in the GM CHARACTER.

Now, at R3.5 time, referring to the CR 208 in Fig. 21A and the CR 208 NOT RESET & GM RECOGNITION UNIT 234 in Fig. 21D, the triggers 212 of the CHARACTER REGISTER 208 apply positive signals via the $\overline{1}$, $\overline{2}$, $\overline{4}$, $\overline{8}$, $\overline{A}$, $\overline{B}$, and C lines, in accordance with the GM CHARACTER 0111111 stored therein, to condition the AND circuit 235 in the CR 208 NOT RESET & GM RECOGNITION UNIT 234.

Step 28

Steps 20 to 22 are repeated during which the following sequence of events occur:

(a) The GM CHARACTER is rewritten in the SELECTED STORAGE REGISTER of the MEMORY 50.

(b) The CHARACTER 214 is cleared in preparation for receiving the GM CHARACTER presently stored in the CHARACTER REGISTER 208.

Now, at W0 time, referring to the CR 208 NOT RESET & GM RECOGNITION UNIT 234 in Fig. 21D, the positive pulse on the W0(D1.5) line passes via the now conditioned AND circuit 235 and the OR circuit 237 to bring up the GM RECOG line. The positive shift on the GM RECOG line is applied to the inverter 982 in the DATA TFR & CK EX TIMER 949 in Fig. 27F, where it is inverted to a negative shift to turn OFF the CPU R BUS trigger 981 which, in being turned OFF, applies a negative signal from its right-hand output to bring down the CR 214 TO CPU R BUS line which condition is passed to the CHARACTER REGISTER 214 in Fig. 21B to prevent the GM CHARACTER from being applied to the CPU R BUS.

Referring now to the DC & CPU TYPE CYCLE UNIT 560 in Fig. 24B, the positive shift on the GM RECOG line, in combination with the DC TO CPU line being up, passes via the AND circuit 563 to the inverter 566 where it is inverted to a negative shift to turn ON the DC TO CPU TC2 trigger 568 which, in being turned ON, applies a positive signal from its right-hand output to bring up the DC TO CPU TC2 line and, via the OR circuit 561, to maintain the DC TO CPU TC1+2 line up.

Step 29

Steps 23 to 25 are repeated during which the GM CHARACTER is transferred from the CHARACTER REGISTER 208 and stored in the CHARACTER REGISTER 214 and the R/W CK trigger 279 of the ERROR CHECK UNIT 268 in Fig. 21F is turned ON if there are an odd number of 1 bits in the GM CHARACTER.

Now, at W2 time, referring to the DATA TFR & CK EX TIMER 949 in Fig. 27D, the positive pulse on the W2(D1.5) line, in combination with the DC TO CPU TC2 line being up, passes via the AND circuit 975 and the OR circuit 976 to bring up the R DISC line which condition is passed to the D'SCONNECT EX T'MER 984 in Fig. 27A. The positive shift on the R D'SC line is passed via the OR circuit 985 to the inverter 986 where it is inverted to a negative shift to turn ON the 10 microsecond CTRL/R D'SC single shot 987 which, in being turned ON, applies a positive signal from its right-hand output to bring up the CTRL/R D'SC line for 10 microseconds to signal the CPU to terminate the READ instruction and proceed to the next instruction of the PROGRAM.

Step 30

Steps 15 to 17 are repeated during which the CPU again applies a positive pulse via the CPU SYNC PULSE line to effectively initiate a last cyc'e of operation of the CLOCK in Fig. 26B, a POST WRITE DISTURBANCE is made of the SELECTED STORAGE REGISTER of the MEMORY 50 to minimize subsequent noise, the CHARACTER REGISTER 208 is cleared and the ADDRESS REGISTER 132 is set with the ADDRESS of the STORAGE REGISTER in the MEMORY 50 where the LRC CHARACTER is stored. However, referring to the RESPONSE EX TIMER 914 in Fig. 27B, the R RESPONSE line is not brought up at this time to signal the CPU, inasmuch as the DC TO CPU TC1 but ECC1 line is down, and since the GM CHARACTER was not previously transferred to the CPU R BUS.

Step 31

At R1 time, referring to the DC & CPU TYPE CYCLE UNIT 560 in Fig. 24B, the positive pulse on the R1(D1.5) line is applied to turn OFF the DC TO CPU TC2 trigger 568 which, in being turned OFF, applies a negative signal from its right-hand output to bring down the DC TO CPU TC2 line and, via the OR circuit 561, to bring down the DC TO CPU TC1+2 line. The negative shift on the DC TO CPU TC2 line is applied to turn OFF the DC TO CPU TC1 but $\overline{ECC1}$ trigger 577 which, in being turned OFF, applies a negative signal from its right-hand output to bring down the DC TO CPU TC1 but $\overline{ECC1}$ line. The negative shift on the DC TO CPU TC2 line is also applied to turn OFF the DC TO CPU & TC1 status trigger 416 in the STATUS DECODER 400 in Fig. 23, which, in being turned OFF, applies a negative signal from its right-hand output to bring down the DC TO CPU line and applies a positive signal from its left-hand output to bring up the $\overline{DC\ TO\ CPU}$ line.

Referring now to the MEMORY EX TIMER 902 in Fig. 27A, the negative signal on the DC TO CPU TC1+2 is applied via the OR circuit 906 to bring down the MEM R line and, via the OR circuit 904, to bring down the MEM R/W line.

Referring now to the INSTRUCTION DECODER 300 in Fig. 22, let it be assumed that the CPU R CALL line now comes down to decondition the AND circuit 302 causing the R CALL line to be brought down.

Step 32

Steps 18 to 25 are not repeated to read out the LRC CHARACTER inasmuch as both the MEM R and DC TO CPU TC1+2 lines are down.

Step 33

At W4.5 time, referring to the ADDRESS REGISTER 132 in Fig. 20F, the negative shift of the trailing edge of the positive pulse on the W3.5(D1) line is applied via negative shift inputs to reset all of the triggers 136 thereby effectively clearing the ADDRESS REGISTER 132 and terminating this mode of operation.

MICROSECOND INTERROGATION

The MICROSECOND INTERROGATION mode of operation functions to transfer a small part of a large RECORD or group of RECORDS from the MEMORY 50 of the DATA COORDINATOR to the CENTRAL PROCESSING UNIT where an interrogation is made to determine whether the remainder of the RECORD or group of RECORDS is to be transferred. By manually setting a four position switch it is possible to transfer only 8, 16, 32 or 64 CHARACTERS of a maximum 1022 CHARACTER RECORD from the DATA COORDINATOR to the CENTRAL PROCESSING UNIT. Thus, if the switch is set to 16, the first 16 CHARACTERS of the RECORD or group of RECORDS are transferred from the MEMORY 50 to the CENTRAL PROCESSING UNIT for interrogation.

A MICROSECOND INTERROGATION mode of operation is performed by a process of 2 instructions, namely, a SELECT INSTRUCTION followed by a READ instruction. Thus, the PROGRAM for an exemplary MICROSECOND INTERROGATION mode of operation may be as follows:

SELECT 20609
READ Y1132

Simply interpreted, the operation part 2 of the SELECT Instruction designates that a SELECT operation is to be performed, while the ADDRESS part 0609 of the SELECT instruction designates the DATA COORDINATOR as the SELECTED input/output unit and that no TAPE UNIT is involved in this operation. Similarly, the operation part Y of the READ instruction designates that a READ operation is to be performed, while the ADDRESS part 1132 of the READ instruction designates the ADDRESS in the MEMORY of the CPU starting at which the RECORD or group of RECORDS may be stored.

The MICROSECOND INTERROGATION mode of operation will now be described in a step by step manner wherein operations within a step occur at relatively the same instant of time and with reference being made to the detailed logical block diagrams of the major components of the DATA COORDINATOR shown in Figs. 20 to 27, inclusive.

Step 1

Referring now to the CR 208 NOT RESET & GM RECOGNITION UNIT 234 in Fig. 21D, let it be assumed that the switch 238 is manually set to the 16 position so that 16 CHARACTERS of the RECORD or group RECORDS presently stored in the MEMORY 50 of the DATA COORDINATOR will be transferred to the CENTRAL PROCESSING UNIT for interrogation.

Step 2

Initially, the DATA COORDINATOR is ready to perform an operation as previously explained in the section on the DATA COORDINATOR READY. Thus, referring to the DC RDY UNIT 840 in Fig. 26B, a positive signal is initially maintained on the DC RDY line.

Now, when the SELECT instruction is called for, the ADDRESS part is applied to the SELECT ADDRESS DECODER 602 in Fig. 25A in the form of binary coded signals. The SELECT ADDRESS DECODER 602 decodes these signals to bring up the THIS DC SELECTED line, the MODE D line and the DC SEL & RDY line in a manner as previously described in the section on SELECT ADDRESS DECODING.

Step 3

A sequence of steps now occur which are identical to Steps 2 to 26 of the DC TO CPU mode of operation. Consequently, reference should be made to those steps or a detailed description thereof during which 15 CHARACTERS of the RECORD or group of RECORDS have been transferred from the MEMORY 50 of the DATA COORDINATOR to the CENTRAL PROCESSING UNIT, the 16th CHARACTER is on the CPU R BUS and the ADDRESS COUNTER 124 in Fig. 20F has stepped from a count of 0 to a count of 16 so that the trigger 126e is ON. The trigger 126e in being ON applies a positive signal from its right-hand output via the AC 124-16 line to the CR208 RESET & GM RECOGNITION UNIT 234 in Fig. 21D where it passes via the switch 238 to the AND circuit 240.

Step 4

A sequence of steps now occur which are identical to Steps 12 to 22 of the DC TO CPU operation. Consequently, reference should be made to those steps for a detailed description thereof during which the following sequence of events occur:

(a) The 16th CHARACTER, presently on the CPU R BUS, is sampled by the CENTRAL PROCESSING UNIT.

(b) The CHARACTER REGISTER 208 is cleared in preparation for receiving the 17th CHARACTER presently stored in the MEMORY 50.

(c) The 17th CHARACTER is read out of the SELECTED STORAGE REGISTER of the MEMORY 50 and stored in the CHARACTER REGISTER 208 after which a vertical check is made to insure that there are an even number of 1 bits in the CHARACTER.

(d) The 17th CHARACTER, presently stored in the CHARACTER REGISTER 208 is rewritten in the SELECTED STORED REGISTER of the MEMORY.

(e) The CHARACTER REGISTER 214 is cleared in preparation for receiving the 17th CHARACTER from the CHARACTER REGISTER 208.

Now, at the W0 time, referring to the CR 208 NOT RESET & GM RECOGNITION UNIT 234 in Fig. 21D, the positive pulse on the W0(D1.5) line in combination with the MODE D and AC 124-16 lines being up condition the AND circuit 240.

Step 5

At W0.5 time, referring to the ADDRESS COUNTER 124 in Fig. 20F the negative shift of the trailing edge of the positive pulse on Step AC 124 line is effective to turn ON the first trigger 126a which, in being turned ON, applies a positive signal from its right-hand output via the AC 124-1 line to the CR 208 NOT RESET & GM RECOGNITION UNIT 234 in Fig. 21D. The positive signal on the AC 124-1 line passes via the now conditioned AND circuit 240 and the OR circuit 237 to bring up the GM RECOG line as if the 17th CHARACTER were a GM CHARACTER.

Step 6

A sequence of steps now occur which are identical to Steps 28 to 33 of the DC TO CPU operation. Consequently, reference should be made to those steps for a detailed description thereof during which the 17th CHARACTER is blocked from being transferred to the CPU T BUS and terminating operations are performed to end this mode of operation. Thus, in a similar, either 8, 16, 32 or 64 CHARACTERS of a RECORD or group of RECORDS may be transferred from the DATA COORDINATOR to the CENTRAL PROCESSING UNIT.

DATA COORDINATOR TO CENTRAL PROCESSING UNIT AND TAPE UNIT TO DATA COORDINATOR (Early Tape Start)

When a SELECTED TAPE UNIT is set to the READ status and its TAPE is started, a 5 millisecond READ DELAY is provided to allow sufficient time for the SELECTED TAPE to accelerate to its normal operating speed before the TAPE reading operation commences. Consequently, the DC TO CPU & TU TO DC mode of operation functions to utilize this delay period to transfer a RECORD or group of RECORDS from the DATA COORDINATOR to the CENTRAL PROCESSING UNIT so that by the end of the READ DELAY period, when the TAPE reading operation commences, the previous transfer from the DATA COORDINATOR to the CENTRAL PROCESSING UNIT is completed and the DATA COORDINATOR is ready to receive the next RECORD or group of RECORDS from the SELECTED TAPE.

At the beginning of this mode of operation a check is made to determine if the RECORD or group of RECORDS presently stored in the DATA COORDINATOR is greater than 512 CHARACTERS. If the RECORD or group of RECORDS is less than 512 CHARACTERS, then, remembering that it takes 9 microseconds to process each CHARACTER transferred from the DATA COORDINATOR to the CENTRAL PROCESSING UNIT, it would only require approximately 4.6 milliseconds to transfer a maximum of 511 CHARACTERS from the DATA COORDINATOR to the CENTRAL PROCESSING UNIT. Therefore, the SELECTED TAPE may be started at the same time that the RECORD transfer is started and by the end of the 5 milliseconds RECORD DELAY, the RECORD transfer from the DATA COORDINATOR to the CENTRAL PROCESSING UNIT is completed and the DATA COORDINATOR is ready to receive the next RECORD or group of RECORDS from the SELECTED TAPE. Also, it will be remembered that the DATA COORDINATOR is capable of transferring a maximum of 1022 CHARACTERS to the CENTRAL PROCESSING UNIT. Consequently, it would require a period of approximately 9.2 milliseconds to transfer the maximum RECORD or group of RECORDS from the DATA COORDINATOR to the CENTRAL PROCESSING UNIT which period exceeds the 5 millisecond READ DELAY period. Therefore, in the latter case a TAPE START TIME DELAY is initiated simultaneously with the start of the RECORD transfer from the DATA COORDINATOR to the CENTRAL PROCESSING UNIT. At the end of this delay period, the TAPE is started and the 5 millisecond READ DELAY period commences. The RECORD transfer from the DATA COORDINATOR to the CENTRAL PROCESSING UNIT is completed during the 5 millisecond READ DELAY period so that by the time TAPE reading operation commences the DATA COORDINATOR is ready to receive the next RECORD or group of RECORDS from the SELECTED TAPE.

A DC TO CPU & TU TO DC mode of operation is performed by a process of 2 instructions, namely, a SELECT instruction followed by a READ instruction. Thus, the PROGRAM for an exemplary DC TO CPU & TU TO DC mode of operation may be as follows:

SELECT 20601
READ Y1132

Simply interpreted, the operation part 2 of the SELECT instruction designates that a SELECT operation is to be performed, while the ADDRESS part 0601 of the SELECT instruction designates the DATA COORDINATOR as the SELECTED input/output unit and the TAPE UNIT 1 as the SELECTED TAPE UNIT. Similarly, the operation part Y of the READ instruction designates that a READ operation is to be performed, while the ADDRESS part 1132 of the READ instruction designates the ADDRESS part in the MEMORY of the CPU starting at which the RECORD or group of RECORDS, which are transferred from the MEMORY 50 of the DATA COORDINATOR, may be stored and that the next RECORD or group of RECORDS may then be read from the SELECTED TAPE and transferred to the MEMORY 50 of the DATA COORDINATOR.

The DC TO CPU & TU TO DC mode of operation will now be described in a step by step manner wherein all operations within a step occur at relatively the same instant of time and with reference being to the detailed logical block diagrams of the major components of the DATA COORDINATOR shown in Figs. 20 to 27, inclusive.

*Step 1*

Initially, the DATA COORDINATOR is ready to perform an operation as previously explained in the section on DATA COORDINATOR READY. Thus, referring to the DC RDY UNIT 840 in Fig. 26D, a positive signal is initially maintained on the DC RDY line.

Now, when the SELECT instruction is called for, the ADDRESS part is applied to the SELECT ADDRESS DECODER 602 in Fig. 25A in the form of binary coded signals. The SELECT ADDRESS DECODER 602 decodes the signals to bring up THIS DC SELECTED line, the DC SEL & RDY line, the SEL TU1 line and the TU A SEL line in a manner as previously described in the section on SELECT ADDRESS DECODING.

*Step 2*

Let it be assumed that in a previous mode of operation a RECORD or group of RECORDS was stored in the MEMORY 50 of the DATA COORDINATOR having a length which was greater then 512 CHARACTERS. Consequently, referring to the ADDRESS COUNTER 112 in Fig. 20G, during the previous RECORD transfer when the 512th CHARACTER was processed, the ADDRESS COUNTER 112 was set to a count of 512 causing the trigger 110j to be turned ON and apply a positive signal from its right-hand output to bring up the AC 112–512 line which condition was passed to the MULTIPLE OPERATION TIMER UNIT 732 in Fig. 25G. The positive shift on the AC 112–512 was applied to the inverter 728 where it was inverted to a negative shift to turn ON the 512 trigger 731 which, in being turned ON, applied a positive signal from its right-hand output to condition the AND circuit 724.

Now, after the execution of the SELECT instruction, the PROGRAM steps to the READ instruction which causes the CPU to go through a cycle of operation during which the CPU PREP TO R line is brought up. The positive shift on the CPU PREP TO R line, in combination with the DC SEL & RDY line being up passes via the AND circuit 306 of the INSTRUCTION DECODER 300 in Fig. 22 to bring up the PREP TO R line.

Referring now to the MULTIPLE OPERATION TIMER UNIT 732 in Fig. 25G, the positive shift on the PREP TO R line passes via the now conditioned AND circuit 724 and the OR circuit 725 to turn ON the 8 millisecond TAPE R CALL DEL single shot 726 which, in being turned ON, applies a negative signal from its left-hand output to decondition the AND circuit 727 to prevent the TAPE R CALL line from coming up for a period of 8 milliseconds.

*Step 3*

Shortly thereafter (approximately 6 microseconds) the CPU brings up the CPU R CALL line which condition, in combination with the DC SEL & RDY line being up, passes via the AND circuit 302 of the INSTRUCTION DECODER 300 in Fig. 22 to bring up the R CALL line.

Referring now to the STATUS DECODER 400 in Fig. 23, the positive shift on the R CALL line, in combination with the PREP TO R line being up, passes via the AND circuit 410 and, in combination with the $\overline{\text{CTRL 8}}$ line being up, passes via the AND circuit 412 to the inverter 414 where it is inverted to a negative shift to turn ON the DC TO CPU & TC1 status trigger 416 which, in being turned ON, applies a negative signal from its left-hand output to bring down the $\overline{\text{DC TO CPU}}$ line and applies a positive signal from its right-hand output to bring up the DC TO CPU line. The positive shift on the R CALL line also passes via the OR circuit 538 and, in combination with $\overline{\text{CTRL 8}}$ line being up and the TU A SEL line being up via the OR circuit 426, passes via the AND circuit 440 to the inverter 442 where it is inverted to a negative shift to turn ON the TU TO DC status trigger 444 which, in being turned ON, applies a positive signal from its right-hand output to bring up the TU TO DC line which condition is passed to the CLOCK CONTROL UNIT 802 in Fig. 26D.

The positive signal on the TU TO DC line passes via the OR circuit 805 to the inverter 807 where it is inverted to a negative signal to bring down the $\overline{\text{BKWD+TU TO DC}}$ line which condition is applied to the DC RDY UNIT 840 to decondition the AND circuit 842 causing a negative signal to be applied via the OR circuit 844 to bring down the DC RDY line which remains down during this entire mode of operation. The negative signal on the DC RDY line is applied to the SELECT ADDRESS DECODER 601 in Fig. 25A, where it is effective to bring down the DC SEL & RDY line, in a manner as previously described in the section on SELECT ADDRESS DECODING, to signal the CPU that the DC is now busy with a TAPE operation. Also, the DC SEL & RDY line in coming down is effective to decondition the INSTRUCTION DECODER 300 in Fig. 22 and the SELECT ADDRESS DECODER 602 so that the INSTRUCTION DECODER 300 is blocked from decoding a subsequent operational instruction involving the DATA COORDINATOR and the SELECT ADDRESS DECODER 602 is block from decoding the ADDRESS part of a subsequent SELECT instruction, which selects the DATA COORDINATOR, until the present mode of operation is completed. Additionally, referring to the SELECT ADDRESS DECODER 602 in Fig. 25B, the positive shift on the R CALL line is applied via the OR circuit 618 and, in combination with the CTRL 8 line being up, passes via the AND circuit 617 and the OR-C circuit 619 and, in combination with the SEL TU1 line being up, passes via the AND circuit 616b to turn on the TU1 SEL trigger 620b. The TU1 SEL trigger 620b, in being turned ON maintains a positive signal on the SEL TU1 line and, via the OR circuit 620a, on the TU A SEL line thereby remembering which TAPE UNIT was previously selected.

Referring now to the RESET UNIT 118 in Fig. 20G, the negative shift on the DC TO CPU line is applied to decondition the AND circuit 120 to apply a negative shift to the peaker 122 which applies a 2 microsecond positive pulse via the RESET AC 124 line to reset all of the triggers 126 so that the ADDRESS COUNTER 124 in Fig. 20F, stands with a count of 0. The negative shift on the DC TO CPU line is also applied via a negative shift input to turn ON the CPU R BUS trigger 981 in the DATA TFR & CK EX TIMER 949 in Fig. 27B, which, in being turned ON, applies a positive signal from its right-hand output via the CR 214 TO CPU R BUS line to condition the AND circuits 220 of the CHARACTER REGISTER 214 in Fig. 21B.

Referring now to the DC & CPU TYPE CYCLE UNIT 560 in Fig. 24B, the positive signal on the DC TO CPU line passes via the OR circuit 561 to bring up the DC TO CPU TC1+2 line which condition is passed to the MEMORY EX TIMER 902 in Fig. 27A. The positive signal on the DC TO CPU TC1+2 line passes via the OR circuit 906 to bring up the MEM R line and, via the OR circuit 904, to bring up the MEM R/W line.

Referring now to the TAPE R TYPE CYCLE UNIT 502 in Fig. 24A, the negative shift on the R CALL line is applied to turn ON the R CALL trigger 509 which, in being turned ON, applies a positive signal from its right-hand output to bring up the R CALL TGR ON line which condition is passed to the TAPE R STATUS UNIT 638 in Fig. 25G. The positive shift on the R CALL TGR ON line passes via the OR circuit 623 and, in combination with the TU A SEL and PREP TO R B lines being up, passes via the AND circuit 624 to turn ON the PREP TO R A trigger 626 which, in being turned ON, applies a negative signal from its left-hand output to bring down the PREP TO R A and applies a positive signal from its right-hand output to bring up the PREP TO R A line which, in coming up, conditions the AND circuit 629.

Step 4

A sequence of steps now occur in the present mode which are identical to Steps 4 to 33 of the DC TO CPU mode of operation. Consequently, reference should be made to those steps for a detailed description thereof during which a RECORD transfer continues from the DATA COORDINATOR to the CENTRAL PROCESSING UNIT.

Step 5

8 milliseconds later, referring to the MULTIPLE OPERATION TIMER UNIT 732 in Fig. 25G, the TAPE R CALL DEL single shot 726 returns to its OFF state causing a positive signal to be applied from its right-hand output which, in combination with the TU TO DC line being up and the left-hand output of the TAPE R CALL LP DEL single shot 722 being up, assuming that the LOAD POINT of the SELECTED TAPE is not being sensed, passes via the AND circuit 727 to bring up the TAPE R CALL line which condition is passed to the TAPE R STATUS UNIT 638 in Fig. 25C. The positive signal on the TAPE R CALL line passes via the OR circuit 628 and via the now conditioned AND circuit 629 and the OR circuits 631 and 632 to bring up the SET R A line which condition is passed to the SELECTED TAPE UNIT 1 causing it to be set to a READ STATUS in preparation for the reading operation.

Step 6

As soon as the SELECTED TAPE UNIT 1 is set to the READ STATUS it transfers a signal back via the SEL, RDY & R A line to the TAPE R STATUS UNIT 638 in Fig. 25C. The positive signal on the SEL, RDY & R A line, in combination with the output of the OR circuit 631 being up and the BKWD TO FWD DEL line being up, passes via the AND circuit 635 and the OR circuit 637 to bring up the START R line.

Referring now to the TAPE W CONTROL UNIT 720 in Fig. 25F, the positive signal on the START R line, in combination with the PREP TO R A line being up, passes via the AND circuit 712 and the OR circuit 713 to bring up the GO BUS A line which condition is passed to the SELECTED TAPE UNIT 1 to start the TAPE moving in a forward direction.

Assuming that the LOAD POINT of the SELECTED TAPE is not initially sensed, then, the SEL & AT LP A line is down to decondition the AND circuit 672 in the TAPE R CONTROL UNIT 687 in Fig. 25E causing a negative signal to be applied via the OR circuit 674 to the inverter 676 where it is inverted to a positive signal. The negative signal output of the OR circuit 674 is also applied to decondition the AND circuit 675 to block the positive signal on the START R line from effecting the LP DEL single shot 678 with the resulting effect being that the now positive output of the inverter 676 and the positive left-hand output of the R LP DEL single shot 678 condition the AND circuit 679 so that when the positive signal is applied to the START R line it passes via the now conditioned AND circuit 679 to the inverter 680 where it is inverted to a negative signal to turn ON the 5 millisecond R DEL single shot 681 and initiate the 5 millisecond READ DELAY period.

If the maximum RECORD capacity of the MEMORY 50 of the DATA COORDINATOR is being transferred from the DATA COORDINATOR to the CENTRAL PROCESSING UNIT, then, by this time, that is, 8 milliseconds after the transfer from the DATA COORDINATOR to the CENTRAL PROCESSING UNIT was initiated, less than 512 CHARACTERS remain to be transferred to the CENTRAL PROCESSING UNIT, and since each CHARACTER requires only 9 microseconds to be processed, the RECORD transfer from the DATA COORDINATOR to the CENTRAL PROCESSING UNIT will be completed during the 5 millisecond READ DELAY period so that by the time the TAPE reading operation commences, the DATA COORDINATOR is ready to receive the next RECORD or group of RECORDS from the SELECTED TAPE.

Step 7

A sequence of steps now occur in the present mode which are identical to Steps 6 to 77 of the TU TO DC mode of operation. Consequently, reference should be made to those steps for a detailed description thereof during which the next RECORD or group of RECORDS are read from the SELECTED TAPE and transferred to the DATA COORDINATOR to thereby terminate this mode of operation.

Step 8A

If, in the previous mode of operation, the RECORD or group of RECORDS stored in the MEMORY 50 of the DATA COORDINATOR is less than 512 CHARACTERS, then, referring to the ADDRESS COUNTER 112 in Fig. 20G, the trigger 110j would not be turned ON inasmuch as the count would not go above 511.

141

Therefore, the AC 112–512 line would not be brought up and, referring to the MULTIPLE OPERATION TIMER UNIT 732 in Fig. 25G, the 512 trigger 731 would not be turned ON to effectively initiate the 8 millisecond TAPE READ DELAY. However, in the latter case, the TAPE READ DELAY is not necessary inasmuch as it only requires approximately a 4.6 millisecond period to transfer a maximum of 511 characters from the DATA COORDINATOR to the CENTRAL PROCESSING UNIT which period is less than the 5 millisecond READ DELAY period. Consequently, in the latter case, let it be assumed that Step 3 has just been performed and, additionally, referring to the MULTIPLE OPERATION TIMER UNIT 732 in Fig. 25G, since the 8 millisecond TAPE R DEL single shot 726 is OFF and assuming that the LOAD POINT of the SELECTED TAPE is not being sensed so that the TAPE R CALL LP DEL single shot 722 is also OFF, then, the AND circuit 727 is conditioned to pass the positive signal on the TU TO DC line, which is brought up in a manner as explained in Step 3, to bring up the TAPE R CALL line which condition is passed to the TAPE R STATUS UNIT 638 in Fig. 25C. The positive signal on the TAPE R CALL line passes via the OR circuit 628 and the now conditioned AND circuit 629 and via the OR circuits 631 and 633 to bring up the SET R A line which condition is passed to the SELECTED TAPE UNIT 1 causing it to be set to the READ STATUS in preparation for the reading operation.

Step 9A

As soon as the SELECTED TAPE UNIT 1 is set to the READ STATUS it transfers a signal back via the SEL, RDY & R A lines to the TAPE R STATUS UNIT 638 in Fig. 25C. The positive signal on the SEL, RDY & R A line, in combination with the output of the OR circuit 631 being up and the $\overline{\text{BKWD TO FWD DEL}}$ line being up, passes via the AND circuit 635 and the OR circuits 637 to bring up the START R line.

Referring now to the TAPE W CONTROL UNIT 720 in Fig. 25F, the positive signal on the START R line, in combination with the PREP TO R A line being up, passes via the AND circuit 712 and the OR circuit 713 to bring up the GO BUS A line which condition is passed to the SELECTED TAPE UNIT 1 to start the TAPE moving in a forward direction.

If the LOAD POINT of the SELECTED TAPE is not initially sensed, then, the SEL & AT LP A line is down to decondition the AND circuit 672 causing a negative signal to be applied via the OR circuit 764 to the inverter 676 where it is inverted to a positive signal. A negative signal output of the OR circuit 674 is also applied to decondition the AND circuit 675 to block the positive signal on the START R line from effecting the LRP DEL single shot 678 with the resulting effect being that the now positive output of the inverter 676 and the positive left-hand output of the R LP DEL single shot 678 condition the AND circuit 679 so that when the positive signal is applied to the START R line it passes via the now conditioned AND circuit 679 to the inverter 680 where it is inverted to a negative signal to turn ON the 5 millisecond R DEL single shot 681 thereby initiating the 5 millisecond READ DELAY period during which the RECORD transfer from the DATA COORDINATOR to the CENTRAL PROCESSING UNIT is completed so that by the time the TAPE reading operation commences the DATA COORDINATOR is ready to receive the next RECORD or group of RECORDS from the SELECTED TAPE.

Step 10A

Steps 6 to 77 of the TU TO DC mode of operation is now repeated to complete the transfer of the next RECORD or group of RECORDS from the SELECTED TAPE to the DATA COORDINATOR.

142

TAPE UNIT TO CENTRAL PROCESSING UNIT (CONTROL 0008 READ)

The TU TO CPU mode of operation functions to by-pass the DATA COORDINATOR whenever the length of a RECORD or group of RECORDS exceeds the capacity of the MEMORY 50 and transfer the RECORD or group of RECORDS from a SELECTED TAPE UNIT directly to the CENTRAL PROCESSING UNIT.

The TU TO CPU mode of operation may be performed by a process of three instructions, namely, a SELECT INSTRUCTION followed by a CONTROL INSTRUCTION followed by a READ INSTRUCTION. Thus, the PROGRAM from an exemplary TU TO CPU mode of operation may be as follows:

SELECT 20601
CTRL 30008
READ Y1132

Simply interpreted, the operation part 2 of the SELECT instruction designates that a SELECT operation is to be performed while the ADDRESS PART 0602 of the SELECT INSTRUCTION designates the DATA COORDINATOR as the SELECTED input/output unit and TAPE UNIT 2 as the SELECED TAPE UNIT. Similarly, the operation part three of the CONTROL instruction designates that a CONTROL operation is to be performed, while ADDRESS part 0008 of the CONTROL instruction designates that the DATA COORDINATOR is to be by-passed. Likewise, the operation part Y of the READ instruction designates that a READ operation is to be performed, while the ADDRESS part 1132 of the READ instruction designates the ADDRESS in the MEMORY of the CPU starting at which the RECORD or group of RECORDS may be stored.

The TU TO CPU mode of operation will now be described in a step by step manner wherein all operations within a step occur at relatively the same instant of time and with reference being made to the detailed logical block diagrams of the major components of the DATA COORDINATOR shown in Figs. 20 to 27, inclusive.

Step 1

Initially, the DATA COORDINATOR is ready to perform an operation as previously explained in the section on the DATA COORDINATOR READY. Thus, referring to the DC RDY UNIT 840 in Fig. 26D, a positive signal is maintained on the DC RDY line which remains thereon during the entire mode of operation.

Now, when the SELECT instruction is called for, the ADDRESS part is applied to the SELECT ADDRESS DECODER 602 in Figs. 25A and 25B in the form of binary coded signals. The SELECT ADDRESS DECODER 602 decodes the signals to bring up the THIS DC SELECTED line, the DC SEL & RDY line, the SEL TU1 line and the TU A SEL line in the manner previously described in the section on SELECT ADDRESS DECODING. The DC SEL & RDY in coming up signals the CPU that the DC is SELECTED and READY to operate.

After the execution of the SELECT instruction, the PROGRAM steps to the CONTROL 0008 instruction which causes the CPU to go through a cycle of operation during which the CPU CTRL 0008 line is brought up. The positive signal on the CPU CTRL 0008 line, in combination with the DC SEL & RDY line being up, passes via the AND circuit 324 of the INSTRUCTION DECODER 300 to bring up the CTRL 0008 line.

Referring now to the STATUS DECODER 400 in Fig. 23, the positive shift on the CTRL 0008 line is applied to inverter 402 where it is inverted to a negative shift to turn ON the CTRL 8 trigger 404 which, in being turned ON, applies a negative signal from its left-hand output to bring down the $\overline{\text{CTRL 8}}$ line and applies a positive signal from its right-hand output to bring up the CTRL 8 line and to condition AND circuit 406.

143

At the same time, referring to the DATA TFR & CK EX TIMER 949 in Fig. 27B, the positive shift on the CTRL 8 line, in combination with the $\overline{\text{R CALL}}$ line being up, passes via the AND circuit 977 and OR circuit 976 to bring up the R DISC line which condition is passed to the DISCONNECT EX TIMER 984 in Fig. 27A. The positive shift on the R DISC line passes via the OR circuit 985 to the inverter 986 where it is inverted to a negative shift to turn ON the 10 microsecond CTRL/R DISC single shot 987 which, in being turned ON, applies a positive signal from its right-hand output to bring up the CTRL/R DISC line for 10 microseconds to signal the CPU to terminate the CONTROL instruction and proceed to the next instruction of the PROGRAM.

Step 3

After the execution of the CONTROL instruction, the PROGRAM steps to the READ instruction which causes the CPU to go through a cycle of operation to effectively bring up the CPU PREP TO R line which, in combination with the DC SEL & RDY line being up, passes via the AND circuit 306 of the INSTRUCTION DECODER 300 in Fig. 22, to bring up PREP TO R line.

Step 4

Shortly thereafter (approximately 6 microseconds), the CPU brings up the CPU R CALL line which, in combination with the DC SEL & RDY line being up, passes via the AND circuit 302 to bring up the R CALL line.

Referring now to the STATUS DECODER 400 in Fig. 23, the positive signal on the R CALL line, in combination with the PREP TO R line being up, passes via the AND circuit 410 and the now conditioned AND circuit 406 to bring up the CTRL 8 R line.

Referring now to the CLOCK CONTROL UNIT 802 in Fig. 26D, the positive shift on the CTRL 8 R line passes via the OR circuit 830 to the inverter 832 where it is inverted to a negative shift to turn ON the LONG CLOCK TRIGGER 834 which, in being turned ON, applies a positive signal from its right-hand output via the OR circuit 826 to condition the AND circuit 828 and applies a negative shift from its left-hand tapped output to turn ON the INITIATE trigger 810 which, in being turned ON, applies a positive signal from its right-hand output via the OR circuit 812 to bring up the CLOCK GATE line, to initiate a cycle of operation of the CLOCK 814 in Fig. 26B in a manner as previously described in the section on the CLOCK PULSE GENERATOR.

Referring now to the TAPE R TYPE CYCLE UNIT 502 in Fig. 24A, the negative shift on the $\overline{\text{R CALL}}$ line is applied to turn ON the R CALL trigger 509 which, in being turned ON, applies a positive signal from its right-hand output to bring up the R CALL TGR ON line which condition is passed to the TAPE R STATUS UNIT 638 in Fig. 25C. The positive shift on the R CALL TGR ON line is applied via the OR circuit 623 and, in combination with the $\overline{\text{PREP TO R B}}$ and TU SEL lines being up, passes via the AND circuit 624 to turn ON the PREP TO R A trigger 626 which, in being turned ON, applies a negative signal from its left-hand output to bring down the $\overline{\text{PREP TO R A}}$ line and applies a positive signal from its right-hand output to bring up the PREP TO R A line and to condition the AND circuit 629.

Referring now to the DATA TFR & CK EX TIMER 949 in Fig. 27D, the positive shift on the CTRL 8 R line is applied to the inverter 983 where it is inverted to a negative shift to turn ON the CPU R BUS trigger 981 which, in being turned ON, applies a positive signal from its right-hand output via the CR 214 TO CPU R BUS line to condition the AND circuits 220 of the CHARACTER REGISTER 214 in Fig. 21B.

Referring now to the TAPE R STATUS UNIT 638 in Fig. 25C, the positive signal on the PREP TO R A line, in combination with the CTRL 8 R line being up via the OR circuit 628, passes via the AND circuit 629 and the OR circuits 631 and 633 to bring up the SET R A line which condition is passed to the SELECTED TAPE UNIT 1 causing it to be set in a READ STATUS in preparation for the reading operation.

Step 5

As soon as the SELECTED TAPE UNIT 1 is set to the READ STATUS it transfers a signal back via the SEL, RDY & R A line to the TAPE R STATUS UNIT 638 in Fig. 25C. The positive signal on the SEL, RDY & R A line, in combination with the output of the OR circuit 631 being up and the $\overline{\text{BKWD TO FWD DEL}}$ line being up passes via the AND circuit 635 and the OR circuit 637 to bring up the START R line.

Referring now to the TAPE W CONTROL UNIT 720 in Fig. 25F, the positive signal on the START R line, in combination with the PREP TO R A line being up, passes via the AND circuit 712 and the OR circuit 713 to bring up the GO BUS A line which condition is passed to the SELECTED TAPE UNIT 1 to start the TAPE moving in a forward direction.

If the LOAD POINT of the SELECTED TAPE is initially sensed, then, a positive signal is maintained on the SEL & AT LP line. This signal in combination with the PREP TO R A line being up and the START R line in coming up is effective to initiate a 20 millisecond READ LOAD POINT DELAY to allow sufficient time for the LOAD POINT of the SELECTED TAPE to be moved past the R/W heads of the SELECTED TAPE UNIT in a manner as explained in Step 3 of the TU TO DC mode of operation. However, let it be assumed that the LOAD POINT of the SELECTED TAPE is not being sensed and instead only a 5 millisecond READ DELAY is necessary to allow sufficient time for the TAPE of the SELECTED TAPE UNIT to accelerate up to its normal operating speed before the first CHARACTER of the RECORD reaches the R/W heads as explained in greater detail in Step 5 of the TU TO DC mode of operation. Consequently, referring to the TAPE R CONTROL UNIT 687 in Fig. 25E, the SEL & AT LP A line is down to decondition the AND circuit 672 causing a negative signal to be applied via the OR circuit 674 to the inverter 676 where it is inverted to a positive signal. The negative signal output of the OR circuit 674 is also applied to decondition the AND circuit 675 to block the positive signal on the START R line from effecting the R LP DEL single shot 678 with the resulting effect being that the now positive output of the inverter 676 and the positive left-hand output of the R LP DEL single shot 678 condition the AND circuit 679 so that when the positive signal is applied to the START R line it passes via the now conditioned AND circuit 679 to the inverter 680 where it is inverted to a negative signal to turn ON the 5 millisecond R DEL single shot 681 causing a positive signal to be applied from its right-hand output to bring up the 5 MS R DEL line.

Step 6

At R0 time, referring to the CLOCK CONTROL UNIT 802 in Fig. 26D, the negative shift of the leading edge of the negative pulse on the $\overline{\text{R0(D1.5)}}$ line is applied to turn OFF the INITIATE trigger 810 which, in being turned OFF, is effective via the OR circuit 812 to bring down the CLOCK GATE line.

Step 7

At W 3.5 time, referring to the CLOCK CONTROL UNIT 802 in Fig. 26D, the positive pulse on the W3.5(D1) line passes via the now conditioned AND circuit 828 and the OR circuit 812 to bring up the CLOCK GATE line to initiate another cycle of operation of the CLOCK 814 in Fig. 26B.

Step 8

Referring now to the TAPE R CONTROL Unit 687 in Fig. 25E, Step 7 is repeated until the 5 millisecond R DEL single shot 681 returns to its OFF state causing a negative shift to be applied from its right-hand output to bring down the 5 MS R DEL line and causing a negative shift to be applied from its right-hand output to turn ON the DEL R CALL trigger 682 which, in being turned ON applies a positive signal from its right-hand output to bring up the DEL R CALL line. The positive signal on the DEL R CALL line is applied via the OR circuit 522 in the TAPE R TYPE CYCLE UNIT 502 in Fig. 24A to bring up the DEL R CALL+TAPE R TC3 line. The positive signal on the DEL R CALL line is also applied to the READ AMPLIFIER UNIT 741 in Fig. 25H where it is effective to condition the R amplifiers 740 to respond to the CHARACTERS which are to be applied via the R BUS A from the SELECTED TAPE UNIT 1.

Referring now to the TAPE R TYPE CYCLE UNIT 502 in Fig. 24A, the negative shift on the 5 MS R DEL line is applied to turn ON the TAPE R TC1 trigger 506 which, in being turned ON, applies a positive signal from its right-hand output to bring up the TAPE R TC1 line. The positive signal on the TAPE R TC1 line, in combination with the left-hand outputs of the TAPE R TC2 and TAPE R TC3 triggers 510 and 514, respectively, being up, passes via the AND circuit 508 to bring up the TAPE R TC1 but $\bar{1}$ & $\bar{2}$ line. The positive signal on the TAPE R TC1 but $\bar{2}$ & $\bar{3}$ line passes via the OR circuit 516 to bring up the TAPE R TC1+2+3 line and via the OR circuit 518 to bring up the TAPE R TC1+3 but $\bar{2}$ line.

Referring now to the READ REGISTER 743 in Fig. 25H, the negative shift on the 5 MS R DEL line passes via negative shift inputs to reset all of the triggers 742 to effectively clear the READ REGISTER 743 in preparation for receiving the first CHARACTER from the SELECTED TAPE UNIT 1.

Referring now to the CHARACTER RECOGNITION UNIT 752 in Fig. 25A, the negative shift on the 5 MS R DEL line is applied to turn ON the 1st CHAR GATE trigger 744 which, in being turned ON, applies a positive signal from its right-hand output to bring up the 1st CHAR GATE line and to condition the AND circuit 749. The positive shift on the 1st CHAR GATE line is applied to the RESET UNIT 102 in Fig. 20G where it passes via the OR circuit 104 to the inverter 106 and is inverted to a negative shift causing the peaker 108 to apply 2 microsecond positive pulse via the RESET AC 112 line to reset all of the triggers 110 of the ADDRESS COUNTER 112 so that the ADDRESS COUNTER 112 stands with a count of 0. The triggers 110, in being reset, are effective to apply negative signals from their right-hand outputs to decondition the AND circuits 114 of the COUNTER GATE 116. The positive shift on the 1st CHAR GATE line is also applied to the RESET EX TIMER 924 in Fig. 27E where it passes via the OR circuit 940 to the inverter 941 where it is inverted to a negative shift and applied via the RESET LRCR lines to the LRCR 242 in Fig. 21D. The negative shift on the RESET LRCR is effective via negative shift inputs to reset all of the triggers 243 of the LRCR in preparation for initiating the production of a longitudinal redundancy check (LRC) CHARACTER.

Referring now to the TAPE R TYPE CYCLE UNIT 502 in Fig. 24A, the negative shift on the 5 MS R DEL line is applied via a negative shift input to turn OFF the R CALL trigger 509 which, in being turned OFF, applies a negative signal from its right-hand output to bring down the R CALL TGR ON line.

*Step 9*

The bits of a CHARACTER, when they are written on TAPE, are not written perpendicular to the edge of the TAPE because the TAPE as it iss guided through the R/W heads of the SELECTED TAPE UNIT has a tendency to shift with respect to the R/W heads. Consequently, the CHARACTERS assume a slight angle to the edge of the TAPE whereby the bits of each CHARACTER are not normally read simultaneously but rather in a serial manner.

Thus, at W3 time, referring to the READ AMPLIFIER UNIT 741 in Fig. 25H, let it be assumed that a pulse, corresponding to the first 1 bit of the first CHARACTER read from the SELECTED TAPE, is passed via the R BUS A to the READ AMPLIFIER UNIT 741 where it is amplified by a corresponding one of the R AMPLIFIERS 740 and applies as a negative shift to turn ON a corresponding one of the triggers 742 of the READ REGISTER 743 which, in being turned ON, applies a positive signal from its right-hand output to the CHARACTER RECOGNITION UNIT 752 in Fig. 25I. Thus, for example, let it be assumed that the trigger 742f is turned ON causing a positive signal to be applied via the B bit line which passes via the OR circuit 746 and the OR–C circuit 747 to bring up the FIRST BIT line.

Referring now to the CHARACTER GATE COUNTER 858 in Fig. 26C, the positive shift on the FIRST BIT line is applied to the inverter 860 where it is inverted to a negative shift to turn ON the START CHAR GATE trigger 862 which, in being turned ON, applies a positive signal from its right-hand output to condition the AND circuit 863.

*Step 10*

A sequence of steps now occur in the present mode which are identical to Steps 9 to 19 of the TU TO DC mode of operation. Consequently, reference should be made to those steps for a detailed description thereof during which the CLOCK 814 in Fig. 26B is kept cycling and the CHARACTER GATE COUNTER 858 in Fig. 26C is kept stepping by clock pulses applied thereto until the CHAR GATE line comes up.

*Step 11*

At R3.75 time, referring to the RESET EX TIMER 924 in Fig. 27B, the positive shift on the CHAR GATE line, in combination with the CTRL 8 R line being up via the OR circuit 935, passes via the AND circuit 936 and the OR circuit 933 to the inverter 934 where it is inverted to a negative shift to bring down the RESET CR 214 line which condition is applied to the CR 214 in Fig. 21A. The negative shift on the RESET CR 214 line is applied via negative shift inputs to reset all of the triggers 212 to clear the CHARACTER REGISTER 214 in preparation for receiving the first CHARACTER.

Referring now to the TAPE R CONTROL UNIT 687 in Fig. 25E, the positive shift on the CHAR GATE line, in combination with $\overline{BKWD}$ and DEL R CALL lines being up and the left-hand output of the DISC DEL single shot 686 being up, passes via the AND circuit 683 to the inverter 684 where it is inverted to a negative shift to turn ON the 150 microsecond REC GATE single shot 685 which, in being turned ON, applies a positive signal from its right-hand output to bring up the REC GATE line.

*Step 12*

A sequence of steps now occur in the present mode which are identical to Steps 21 to 30 of the TU TO DC mode of operation. Consequently, reference should be made to those steps for a detailed description thereof during which the CLOCK 814 in Fig. 26B is kept cycling and the CHARACTER GATE COUNTER 858 in Fig. 26C is kept stepping by the clock pulses applied thereto until the CHAR GATE line is brought down and the START CHAR GATE trigger 862 is turned OFF to block the CHARACTER GATE COUNTER 858 from responding to any further clock pulses.

*Step 13*

At approximately R0.75 time, referring to the RESET EX TIMER 924 in Fig. 27B, the negative shift on the CHAR GATE line is applied to decondition the AND circuit 936 causing a negative signal to be applied via the OR circuit 933 to the inverter 934 where it is inverted to a positive signal to bring up the RESET CR 214 line.

At the same time, referring to the CHARACTER RECOGNITION UNIT 752 in Fig. 25I, the negative shift on the CHAR GATE line is applied to turn OFF the 1st CHAR GATE trigger 744 which, in being turned OFF, applies a negative signal from its right-hand output to decondition the AND circuit 749 to bring down the 1st CHAR GATE line which condition is passed to the RESET EX TIMER 924 in Fig. 27C. The negative shift on the 1st CHAR GATE line passes via the OR circuit 940 to the inverter 941 where it is inverted to a positive signal to bring up the RESET LRCR line.

Referring now to the READ REGISTER 743 in Fig. 25H, the negative shift on the CHAR GATE line is applied to reset all of the triggers 742 of the READ REGISTER 743. Those of the triggers 742 which are turned OFF, corresponding to the 1 bits of the first CHARACTER, apply negative signals from their right-hand outputs via the R BUS to the CR 214 in Fig. 21B to turn ON corresponding ones of the triggers 218 whereby the first CHARACTER is effectively stored in CHARACTER REGISTER 214. Those of the triggers 218 of the CHARACTER REGISTER 214 which are turned ON, corresponding to the 1 bits of the CHARACTER presently stored therein, apply positive signals from their right-hand outputs via corresponding ones of the conditioned AND circuits 220 to the CPU R BUS so that the first CHARACTER now effectively appears on the CPU R BUS and is ready to be sampled by the CPU.

It should be noted that there is approximately a 27 microsecond period from the time that the first bit of a CHARACTER is read and stored in the READ REGISTER 743 to the time that the READ REGISTER 743 is cleared, by the fall of the CHAR GATE line, in preparation for receiving the next CHARACTER. Since the bits of a CHARACTER are generally not written perpendicular to the edge of the TAPE, the time at which the first 1 bit of a CHARACTER is sesnsed will vary. Consequently, the 27 microsecond period allows sufficient time, under all conditions, for the entire CHARACTER to be read, stored in the READ REGISTER 743 and then transferred to the CHARACTER REGISTER 214 before the next CHARACTER is read from the TAPE.

Referring now to the PRIORITY R/W SERVICE UNIT 578 in Fig. 24C, the negative shift on the CHAR GATE line is also applied to turn ON the R SERVICE trigger 579 which, in being turned ON, applies a positive signal from its right-hand output which, in combination with the $\overline{WCLB}$ line in being up, conditions the AND circuit 581.

Step 14

At W2 time, referring to the PRIORITY R/W SERVICE UNIT 578 in Fig. 24C, the positive pulse on the W2(D1.5) line, in combination with the CTRL 8 line being up, passes via the AND circuit 584 and the OR circuit 585 and the now conditioned AND circuit 581 to bring up the R SERVICE CALL line which condition is passed to the TAPE R/W CYCLE UNIT 588. The positive shift on the R SERVICE CALL line is applied to turn ON the RCLA trigger 589 which, in being turned ON, applies a negative signal from its left-hand output to bring down $\overline{RCLA}$ line and applies a positive signal from its righthand output to bring up the RCLA line and, via the OR circuit 590, to bring up the RCL line.

Step 15

At W3.5 time, referring to the CLOCK CONTROL UNIT 802 in Fig. 26B, Step 7 is repeated to bring up the CLOCK GATE line to initiate another cycle of operation of the CLOCK 814 in Fig. 26B.

Referring now to the PRIORITY R/W SERVICE UNIT 578 in Fig. 24C, the negative shift of the trailing edge of the positive pulse on the W2(D1.5) line deconditions the AND circuit 584 causing a negative signal to be applied via the OR circuit 585 to decondition the AND circuit 581 to bring down the R SERVICE CALL line.

Step 16

At R0 time, referring to the RESPONSE EX TIMER 914 in Fig. 27B, the positive pulse on the R0(D4) line, in combination with the CTRL 8 R, RCLA and TAPE R TC1 but $\overline{2}$ & $\overline{3}$ lines being up, passes via the AND circuit 915 and the OR circuit 916 to bring up R RESPONSE line to signal the CPU to sample the first CHARACTER now on the CPU R BUS.

Step 17

A sequence of steps now occur in the present mode which are identical to Steps 37 and 39 of the TU TO DC mode of operation. Consequently, reference should be made to those steps for a detailed description thereof during which the R SERVICE trigger 579 is turned OFF after which the RCLB trigger 592 is turned ON bringing up the RCLB line and maintaining up the RCL line.

Step 18

At R4 times, referring to the TAPE R/W CYCLE UNIT 588 in Fig. 24B, the positive pulse on the R4(D1.5) line, in combination with the RCLB line being up, passes via the AND circuit 593 to turn OFF the RCLA trigger 589 which, in being turned OFF, applies a positive signal from its left-hand output to bring up the $\overline{RCLA}$ line and applies a negative signal from its right-hand output to bring down the RCLA line.

Step 19

Referring now to the CR 213 and the INPUT SWITCH 222 in Figs. 21E and 21C, respectively, those of the triggers 218 of the CR 214 which were not previously turned ON and which correspond to a 0 bit of the CHARACTER presently stored in the CR 214 apply a positive signal via their left-hand outputs to condition corresponding ones of the AND circuits 223 of the INPUT SWITCH 222.

At R4.5 time, referring to the DATA TFR & CK EX TIMER 949 in Fig. 27C, the positive pulse on the R4.5(D4.5) line, in combination with the RCLB and TAPE R TC1+3 but $\overline{2}$ lines being up, passes via the AND circuits 954 and the OR circuit 955 to bring up the CR 214 to ID line which condition is passed to the AND circuit 223 of the INPUT SWITCH 222 in Fig. 21C so that those of the AND circuits 223 which are conditioned by the positive signals, corresponding to 0 bits of the CHARACTER presently stored in the CR 214, pass positive signals via corresponding ones of the OR circuits 225 to the CHAR CODE CK UNIT 248 in Fig. 21E, in accordance with the CHARACTER presently stored in the CR 214, where a vertical check is made to insure that there are an even number of 1 bits in the CHARACTER. If the CHARACTER has an odd number of 1 bits, then, this condition is detected by the CHAR CODE CK UNIT 248 to bring up the CHAR CODE CK B line which, in coming up, conditions the AND circuit 271 of the ERROR CHECK UNIT 268 in Fig. 21F.

Step 20

A sequence of steps now occur in the present mode which are identical to Steps 42 and 44 of the TU TO DC mode of operation. Consequently, reference should be made to those steps for a detailed description thereof during which the CHARACTER presently stored in the CHARACTER REGISTER 214 is transferred to the LRCR 242 in Fig. 21D to initiate the production of a longitudinal redundancy check (LRC) CHARACTER and to turn on the R/W CK trigger 279 of the ERROR CHECK UNIT 268 in Fig. 21F if the CHAR CODE CK UNIT 248 detected an odd number of 1 bits in the CHARACTER presently stored in the CHARACTER REGISTER 214.

Step 21

At W3.5 time, referring to the CLOCK CONTROL unit 802 in Fig. 26B, Step 7 is repeated to bring up the CLOCK GATE line to initiate another cycle of operation of the CLOCK 814 in Fig. 26B.

Step 22

At R0 time, referring to the TAPE R/W CYCLE UNIT 588 in Fig. 24C, the negative shift of the trailing edge of the positive pulse on the W2.5(D1.5) line is applied to turn OFF the RCLB trigger 592 which, in being turned OFF, applies a positive signal from its left-hand output to bring up the $\overline{RCLB}$ line and applies a negative signal from its right-hand output to bring down the RCLB line and, via the OR circuit 590, to bring down the RCL line.

Step 23

A sequence of steps now occur in the present mode which are identical to Steps 48 to 57 of the TU TO DC mode of operation. Consequently, references should be made to those steps for a detailed description thereof during which the following sequence of events occur:

(a) The next CHARACTER of the RECORD or groups of RECORDS is read from the SELECTED TAPE and stored in the READ REGISTER 743 in Fig. 25H with the FIRST BIT thereof being effective to condition the CHARACTER GATE COUNTER 858 in Fig. 26C to respond to a succession of clock pulses.

(b) The CHARACTER REGISTER 214 in Fig. 21B is cleared in preparation for receiving the next CHARACTER presently stored in the READ REGISTER 743.

(c) The READ REGISTER 743 is reset and the next CHARACTER of the RECORD or group of RECORDS is transferred to the CHARACTER REGISTER 214.

Additionally, referring to the CHARACTER REGISTER 214 in Fig. 21B, those of the triggers 218 which were turned ON, corresponding to the 1 bits of the CHARACTER presently stored in the CR 214, apply positive signals from the right-hand outputs via corresponding ones of the conditioned AND circuits 220 to the CPU R BUS so that the next CHARACTER now effectively appears on the CPU R BUS and is ready to be sampled by the CPU.

Step 24

Steps 14 to 22 are repeated during which the following sequence of events occur:

(a) The CPU is signalled via the R RESPONSE line to sample the next CHARACTER presently on the CPU R BUS.

(b) The CHAR CODE CHECK UNIT 248 in Fig. 21B, makes a vertical check of the CHARACTER presently stored in the CHARACTER REGISTER 214 to insure that there are an even number of 1 bits in the CHARACTER.

(c) Signals corresponding to the CHARACTER presently stored in the CHARACTER REGISTER 214 are transferred to the LRCR 242 in Fig. 21B to continue the production of the LRC CHARACTER.

(d) The R/W CK trigger 279 of the ERROR CHECK UNIT 268 in Fig. 21F is turned ON if the CHAR CODE CHECK UNIT 248 in Fig. 21E detected an odd number of 1 bits in the CHARACTER presently stored in the CHARACTER REGISTER 214.

Step 25

In a somewhat similar manner, Steps 23 and 24 are repeated for each CHARACTER of the RECORD or group of RECORDS read from the SELECTED TAPE. However, it should be remembered that due to TAPE SKEW and variation of TAPE speed the time at which each CHARACTER is read will generally vary.

Step 26

Now, let it be assumed that the last CHARACTER of the RECORD or group of RECORDS has been processed so that, referring to the TAPE R CONTROL UNIT 687 in Fig. 25E, the REC GATE single shot 685 is not pulsed again, and therefore, at approximately R4.75 time, 150 microseconds after the fall of the CHAR GATE line the REC GATE single shot 685 returns to its OFF state causing a negative shift to be applied from its right-hand output to bring down the REC GATE line and causing a negative shift to be applied from its right-hand tapped output to turn ON the 400 microsecond DISC DEL single shot 686. The DISC DEL single shot 686, in being turned ON, applies a negative signal from its left-hand output to bring down the $\overline{DISC\ DEL}$ line and applies a positive signal from its right-hand output to bring up the DISC DEL line. The negative shift on the $\overline{DISC\ DEL}$ line is also applied to turn ON the R SERVICE trigger 579 of the PRIORITY R/W SERVICE UNIT 578 in Fig. 24C, which, in being turned ON, applies a positive signal from its right-hand output which, in combination with the $\overline{WCLB}$ line being up, conditions the AND circuit 581.

At the same time, referring to the TAPE R TYPE CYCLE UNIT 502 in Fig. 24A, the negative shift on the REC GATE line is also applied to turn ON the TAPE R TC 2 trigger 510 which, in being turned ON, applies a negative signal from its left-hand output to decondition the AND circuit 508 and bring down the TAPE R TC1 but $\overline{2}$ & $\overline{3}$ line and applies a positive signal from its right-hand output to bring up the TAPE R TC2 line. The TAPE R TC1 but $\overline{2}$ & $\overline{3}$ line in coming down applies a negative signal via the OR circuit 518 to bring down the TAPE R TC1+3 but $\overline{2}$ line. Referring now to the RESET EX TIMER 924 in Fig. 27B, the positive shift on the TAPE R TC2 line is applied via the OR circuit 933 to the inverter 934 where it is inverted to a negative shift which is applied via the RESET CR 214 line to the CHARACTER REGISTER 214 Fig. 21B. The negative shift on the RESET CR 214 line is applied to reset all of the triggers 218 of the CR 214 to effectively clear the CHARACTER REGISTER 214 in preparation for receiving the LRC CHARACTER.

At the same time, referring to the TAPE R STATUS UNIT 638 in Fig. 25C, the negative shift on the REC GATE line is also applied to turn OFF the PREP TO R A trigger 262 which, in being turned OFF, applies a positive signal from its left-hand output to bring up the $\overline{PREP\ TO\ R\ A}$ line and applies a negative signal from its right-hand output to bring down the PREP TO R A line and to decondition the AND circuit 629 causing a negative signal to be applied via the OR circuits 631 and 633 to bring down the SET R A line. The negative output of the OR circuit 631 also deconditions the AND circuit 635 causing a negative signal to be applied via the OR circuit 637 to bring down the START R line. Referring now to the TAPE W CONTROL UNIT 720 in Fig. 25F, the negative signals on the PREP TO R A and START R lines now decondition the AND circuit 712 causing a negative signal to be applied via the OR circuit 713 to bring down the GO BUS A line to signal the SELECTED TAPE UNIT 1 to stop the forward motion of the TAPE.

Also, at the same time, referring to the DATA TFR & CK EX TIMER 949 in Fig. 27D, the negative shift on the REC GATE line is also applied to turn OFF the CPU R BUS trigger 981 which, in being turned OFF, applies a negative signal from its right-hand output to bring down the CR 214 to CPU R BUS line to decondition the AND circuit 220 in the CHARACTER REGISTER 214 thereby preventing the next CHARACTER (LRC CHARACTER) which will be stored in the CR 214 from being transferred to the CPU R BUS.

*Step 27*

Steps 14 and 15 are repeated during which the RCLA trigger 589 in Fig. 24C is turned ON bringing up the RCLA and RCL lines after which another cycle of operation of the CLOCK 814 in Fig. 26B is initiated and the R SERVICE CALL line is brought down in Fig. 24C.

*Step 28*

Step 16 is not repeated to bring up the R RESPONSE line at this time to signal the CPU, inasmuch as the TAPE R TC1 but $\overline{2}$ & $\overline{3}$ line is down, and since nothing is presently on the CPU R BUS.

*Step 29*

Steps 17 and 18 are repeated during which the R SERVICE trigger 579 is turned OFF after which the RCLB trigger 592 is turned ON bringing up the RCLB line and maintaining up the RCL line, and then the RCLA trigger 589 in Fig. 24B is turned OFF bringing down the RCLA line.

*Step 30*

Steps 19 and 20 are not repeated to bring up the CR 214 TO ID line, the CR 214 TO LRCR line and the CHAR CODE CK B TO R/W CK line inasmuch as the TAPE R TC1+3 but $\overline{2}$ and TAPE R TC1 but $\overline{2}$ & $\overline{3}$ lines are down and since no CHARACTER is presently stored in the CHARACTER REGISTER 214 which was cleared as per Step 26.

*Step 31*

At W3.5 time, referring to the CLOCK CONTROL UNIT 802 in Fig. 26D, Step 7 is repeated to bring up the CLOCK GATE line to initiate another cycle of operation of the CLOCK 814 in Fig. 26B.

*Step 32*

Step 22 is repeated during which the RCLB trigger 592 in Fig. 24C is turned OFF bringing down the RCLB and RCL lines.

Referring now to the TAPE R TYPE CYCLE UNIT 502 in Fig. 24A, the negative shift on the RCLB line is applied to turn OFF the TAPE R TC2 trigger 510 which, in being turned OFF, applies a negative signal from its right-hand output to bring down the TAPE R TC2 line and applies a negative shift from its right-hand tapped output to turn ON the TAPE R TC3 trigger 514. The TAPE R TC3 trigger 514 in being turned ON applies a negative signal from its left-hand output to decondition the AND circuit 508 to maintain the TAPE R TC1 but $\overline{2}$ & $\overline{3}$ line down and applies a positive signal from its right-hand output to bring the TAPE R TC3 line and, via the OR circuit 516, to maintain the TAPE R TC1+2+3 line up, and, via the OR circuit 518, to bring up the TAPE R TC1+3 but $\overline{2}$ line. The positive signal on the TAPE R TC3 line is also passed via the OR circuit 522 to maintain the TAPE R TC3+DEL R CALL line up.

Referring now to the RESET EX TIMER 924 in Fig. 27B, the negative signal on the TAPE R TC2 line is applied via the OR circuit 933 to the inverter 934 where it is inverted to a positive signal to bring up the RESET CR 214 line.

*Step 33*

Let it be assumed that, at R3 time, approximately 287 microseconds after the last CHARACTER of the RECORD or group of RECORDS is read from the SELECTED TAPE, that the first 1 bit of the LRC CHARACTER is read causing the FIRST BIT line to be brought up to effectively condition the CHARACTER GATE COUNTER 858 in Fig. 26C to respond to a succession of clock pulses until, approximately 27 microseconds later, the LRC CHARACTER has been completely stored in the READ REGISTER 743 in Fig. 25H and the CHAR GATE line is brought down to effectively block the CHARACTER GATE COUNTER 858 from responding to further clock pulses. Now, referring to the READ REGISTER 743 in Fig. 25H and the CHARACTER REGISTER 214 in Fig. 21B, the negative shift on the CHAR GATE line is applied to reset the triggers 742 of the READ REGISTER 743 causing the LRC CHARACTER presently stored therein to be transferred from the READ REGISTER 743 via the R BUS to the CHARACTER REGISTER 214.

*Step 34*

Step 14 is repeated during which the RCLA trigger 589 in Fig. 24C is turned ON to effectively bring up the RCLA at RCL lines.

Referring now to the TAPE R TYPE CYCLE UNIT 502 in Fig. 24A, the positive shift on the RCL line, in combination with the TAPE R TC3 line being up passes via the AND circuit 503 to the inverter 504 where it is inverted to a negative shift to thrn OFF the TAPE R TC1 trigger 506 which, in being turned OFF, applies a negative signal from its right-hand output to bring down the TAPE R TC1 line.

*Step 35*

Step 15 is repeated during which another cycle of operation of the CLOCK 814 in Fig. 26B is initiated and the R SERVICE CALL line is brought down in Fig. 24C.

*Step 36*

Step 16 is not repeated to bring up the R RESPONSE line at this time to signal the CPU, inasmuch as the TAPE R TC1 but $\overline{2}$ & $\overline{3}$ line is down and since nothing is presently on the CPU R BUS as the LRC CHARACTER was blocked from being transferred thereto.

The last CHARACTER of the RECORD read from the SELECTER TAPE and later transferred to the LRCR 242 in Fig. 21D completed the production of an LRC CHARACTER which is now stored in the LRCR 242. Referring now to the CR 214 in Fig. 21B, the right-hand outputs of the triggers 218 are applied to condition the AND circuits 243 or the LRCR 242 in accordance with the LRC CHARACTER presently stored in the CR 214.

At R0 time, referring to the DATA TFR & CK EX TIMER 949 in Fig. 27C, the positive pulse on the R0(D1.5) line, in combination with the CTRL 8 R, DEL R CALL, TAPE R TC3 and RCLA lines being up, passes via the AND circuit 962 and the OR circuit 960 to bring up the CR 214 TO LRCR line and apply a positive signal via those of the conditioned AND circuits 243 of the CRCR 242 corresponding to the 1 bits of the LRC CHARACTER stored in the CR 214, to corresponding ones of the inverters 244 where they are inverted to negative pulses and applied to corresponding ones of the triggers 245. It should be apparend, that if no error has occurred the newly created LRC CHARACTER presently stored in the LRCR 242 should be identical to the LRC CHARACTER read from the SELECTED TAPE and presently being transferred to the LRCR 242. Therefore, a comparison check is now made in the LRCR 242 and if the CHARACTERS are identical, the signals applied to the LRCR 242, corresponding to the 1 bit of the LRC CHARACTER stored in the CHARACTER REGISTER 214, are effective to turn OFF those triggers 245 of the LRCR 242 which correspond to the 1 bits of the LRC CHARACTER presently stored therein so that all of the triggers 245 of the LRCR 242 are OFF causing negative signals to be applied from their right-hand outputs via the OR circuit 247 to bring down the LRCR NOT 0 line. If an error has occurred so that one or more of the triggers 245 are ON, then, a positive signal is applied from the right-hand output of one or more of the triggers 245 via the OR circuit 247 to bring up the LRCR NOT 0 line and apply a positive signal to condition the AND circuit 269 of the ERROR CHECK UNIT 268 in Fig. 21F.

Step 37

Step 17 is repeated during which R SERVICE trigger 579 in Fig. 24C is turned OFF and then the RCLB trigger 592 is turned ON bringing up the RCLB line which maintains the RCL line up.

Step 38

Step 18 is repeated during which the RCLA trigger 589 in Fig. 24C is turned OFF bringing down the RCLA line.

Step 39

Step 19 is repeated during which a vertical check is made, by the CHAR CODE CK UNIT 248 in Fig. 21E, to insure that there are an even number of 1 bits in the LRC CHARACTER presently stored in the CHARACTER REGISTER 214.

Step 40

A step now occurs in the present mode which is identical to Step 44 of the TU TO DC mode of operation. Consequently, reference should be made to that step for a detailed description thereof during which the R/W CK trigger 279 of the ERROR CHECK UNIT 268 in Fig. 21F is turned ON if the CHAR CODE CK UNIT 248 in Fig. 21E detected an odd number of 1 bits in the LRC CHARACTER which was read from the SELECTED TAPE and which is still stored in the CHARACTER REGISTER 214.

At the same time, that is at W2 time, referring to the DATA TFR & CK EX TIMER 949 in Fig. 27D, the positive pulse on the W2(D1.5) line, in combination with the CTRL 8 R, TAPE R TC3 and RCLB lines being up, passes via the AND circuit 972 and the OR circuit 971 to bring up the LRCR NOT RESET TO R/W CK line which condition is passed to the ERROR CHECK UNIT 268 in Fig. 21F. If the AND circuit 271 is conditioned by the LRCR NOT 0 line being up, due to a discrepancy between the LRC CHARACTER created during the reading operation and the LRC CHARACTER read from the SELECTED TAPE, the positive pulse is passed via the AND circuit 269 and the OR-C circuit 270 to turn on the R/W CK trigger 279 which, in being turned ON, applies a positive signal from its right-hand output which, in combination with the THIS DC SELECTED line being up, passes via the AND circuit 281 to bring the R/W CK line.

Step 41

At W2.5 time, referring to the CLOCK CONTROL UNIT 802 in Fig. 26D, Step 7 is repeated to initiate another cycle of operation of the CLOCK 814 in Fig. 26B.

At the same time, referring to the TAPE R TYPE CYCLE UNIT 502 in Fig. 24A, the negative shift of the trailing edge of the positive pulse on the W2(D1.5) line deconditions the AND circuit 512 causing a negative shift to be applied to turn OFF the TAPE R TC3 trigger which, in being turned OFF, applies a negative signal from its right-hand output to bring down the TAPE R TC3 line and, via the OR circuit 518, to bring down the TAPE R TC1+3 but 2̄ line and, via the OR circuit 516, to bring down the TAPE R TC1+2+3 line.

Step 42

Step 22 is repeated during which the RCLB trigger 592 in Fig. 24C is turned OFF bringing down the RCLB and RCL lines.

Step 43

A sequence of steps now occur in the present mode which are identical to Steps 76 and 77 of the TU TO DC mode of operation. Consequently, reference should be made to those steps for a detailed description thereof during which terminating operations are performed to end the present mode of operation.

DATA COORDINATOR TO TAPE UNIT AND TAPE UNIT TO DATA COORDINATOR

The DC TO TU & TU TO DC mode of operation functions to transfer a RECORD or group of RECORDS from the DATA COORDINATOR to a SELECTED TAPE UNIT and after a period of delay to concurrently transfer a RECORD or group of RECORDS from another SELECTED TAPE UNIT to the DATA COORDINATOR.

A DC TO TU & TU TO DC mode of operation is performed by a process of 4 instructions, namely, a SELECT instruction followed by a CONTROL instruction followed by a second SELECT instruction followed by a second CONTROL instruction. Thus, the PROGRAM for an exemplary DC TO TU & TU TO DC mode of operation may be as follows:

```
SELECT 20601
CTRL   30005
SELECT 20602
CTRL   30007
```

Simply interpreted, the operation part 2 of the first SELECT instruction designates that a SELECT operation is to be performed while the ADDRESS part 0601 of the SELECT instruction designates the DATA COORDINATOR as the SELECTED input/output unit and the TAPE UNIT 1 as the SELECTED TAPE UNIT. Similarly, the operation part 3 of the first CONTROL instruction designates that a CONTROL operation is to be performed while the ADDRESS part of the CONTROL instruction designates that a read while writing operation is to be concurrently performed. Also, the ADDRESS part 0602 of the second SELECT instruction again designates the DATA COORDINATOR as the SELECTED input/output unit and the TAPE UNIT 2 as the second SELECTED TAPE UNIT. Additionaly, the ADDRESS part of the second CONTROL instruction designates that a RECORD or group of RECORDS is to be transferred from the DATA COORDINATOR TO THE SELECTED TAPE UNIT 2 and that a RECORD or group of RECORDS is to be transferred from the SELECTED TAPE UNIT 1 to the DATA COORDINATOR.

The DC TO TU & TU TO DC mode of operation will now be described in a step by step manner wherein all operations within a step occur at relatively the same instant of time and with reference being made to the detailed logical block diagrams of the major components of the DATA COORDINATOR shown in Figs. 20 to 27, inclusive. Also, reference may be made to the timing diagrams of Fig. 33 to aid in understanding the sequence of events of the present operation.

Step 1

Initially, the DATA COORDINATOR is ready to perform an operation as previously explained in the section on the DATA COORDINATOR READY. Thus, referring to the DC RDY UNIT 840 in Fig. 26B, a positive signal is initially maintained on the DC RDY line.

Now, when the first SELECT instruction is called for, the ADDRESS part is applied to the SELECT ADDRESS DECODER 602 in Fig. 25A in the form of binary coded signals. The SELECT ADDRESS DECODER 602 decodes the signals to bring up the THIS DC SELECTED line, the DC SEL & RDY line, the SEL TU1 line and the TU A SEL line in a manner as previously described in the section on the SELECT ADDRESS DECODING. The DC SEL & RDY line in coming up signals the CPU that the DC is SELECTED and READY to operate.

Step 2

After the execution of the first SELECT instruction, the program steps to the CONTROL 0005 instruction, which causes the CPU to go through a cycle of operation during which the CPU CTRL 0005 line is brought up. The positive shift on the CPU CTRL 0005 line, in combination with the DC SEL & RDY line being up, passes via the AND circuit 318 of the INSTRUCTION DECODER 300 in Fig. 22 to bring up the CTRL 0005 line.

Referring now to the SELECT ADDRESS DECODER 602 in Fig. 25B, the positive signal on the CTRL 0005 line passes via the OR circuit 618 and, in combination with the $\overline{\text{CTRL 8}}$ line being up, passes via the AND circuit 617 and the OR-C circuit 619 and, then, in combination with the SEL TU1 line being up, passes via the AND circuit 616b to turn ON the TU1 SEL trigger 620b which, in being turned ON, maintains the positive signal on the SEL TU1 line and, via the OR circuit 621b, on the TU A SEL line to thereby effectively remember which TAPE UNIT was previously selected.

Referring now to the TAPE R STATUS UNIT 638 in Fig. 25C, the positive signal on the CTRL 0005 line also passes via the OR circuit 623 and, in combination with the TU A SEL and $\overline{\text{PREP TO R B}}$ lines being up, passes via the AND circuit 624 to turn ON the PREP TO R A trigger 626 which, in being turned ON, applies a negative signal from its left-hand output to bring down the $\overline{\text{PREP TO R A}}$ line and applies a positive signal from its right-hand output to condition the AND circuit 629 and to bring up the PREP TO R A line.

Referring now to the DISCONNECT EX TIMER 984 in Fig. 27A, the positive shift on the CTRL 0005 line passes via the OR circuit 985 to the inverter 986 where it is inverted to a negative shift to turn ON the 10 microsecond CTRL/W DISC single shot 992 which, in being turned ON, applies a positive signal from its right-hand output to bring up the CTRL/W DISC line for 10 microseconds to signal the CPU to terminate the CONTROL instruction and proceed to the next instruction of the PROGRAM.

Step 3

After the execution of the CONTROL 0005 instruction, the PROGRAM steps to the second SELECT instruction which causes the CPU to go through a cycle of operation during which the first SELECT ADDRESS is terminated and a new SELECT ADDRESS is brought up. During this period the THIS DC SELECTED and DC SEL & RDY lines are brought down inasmuch as no ADDRESS is being applied to the SELECT ADDRESS DECODER 602 in Fig. 25A.

Step 4

As soon as the new SELECT ADDRESS is brought up, it is applied to the SELECT ADDRESS DECODER in Fig. 25A in the form of binary coded signals. The SELECT ADDRESS DECODER 602 again decodes the signals to bring up the THIS DC SELECTED line, the DC SEL & RDY line and now the SEL TU2 line and the TU B SEL line in a manner as previously described in the section on SELECT ADDRESS DECODING. The DC SEL & RDY line in coming up again signals the CPU that the DC is SELECTED and READY to operate.

Referring now to the TAPE W CONTROL UNIT 720 in Fig. 25F, if the LOAD POINT of the TAPE at the SELECTED TAPE UNIT 2, hereinafter referred to as the WRITE TAPE, is initially being sensed then the SEL & AT LP B line is up and in combination with the $\overline{\text{PREP TO R B}}$ line being up causes the AND circuit 693 to apply a positive signal via the OR circuit 694 to bring up the W TAPE AT LP line which condition is passed to the MULTIPLE OPERATION TIMER UNIT 732 in Fig. 25G. The positive signal on the W TAPE AT LP line in combination with the TU A SEL line being up conditions the AND circuit 721. Now, the positive signal on the TU B SEL line passes via the now conditioned AND circuit 721 to turn ON the 47 millisecond TAPE R CALL LP DEL single shot 722 which in being turned ON, applies a negative signal from its left-hand output to decondition the AND circuit 727 and thereby delay the TAPE R CALL line from being brought up for 47 milliseconds.

Step 5

After the execution of the second SELECT instruction, the PROGRAM steps to the CONTROL 0007 instruction. A sequence of steps now occur in the present mode which are identical to Steps 2 to 5 of the DC TO TU mode of operation. Consequently, reference should be made to those steps for a detailed description thereof during which the following sequence of events occur:

(a) The CTRL 0007 line in Fig. 22 is brought up.
(b) The TU2 SEL trigger 620 in Fig. 25B is turned ON to maintain the SEL TU2 and TU B SEL lines up.
(c) The DC TO TU status trigger 432 in Fig. 23 is turned ON bringing up the DC TO TU line and bringing down the $\overline{\text{DC TO TU}}$ line.
(d) The 10 microsecond CTRL/W DISC single shot 987 is turned ON to signal the CPU to terminate the CONTROL 0007 instruction and to proceed to the next instruction of the PROGRAM.
(e) The DC RDY line in Fig. 26D is brought down causing the DC SEL & RDY line in Fig. 25A to be brought down to signal the CPU that the DC is now busy with a TAPE operation, to block the INSTRUCTION DECODER 300 in Fig. 22 from decoding a subsequent operational instruction involving the DATA COORDINATOR and to block the SELECT ADDRESS DECODER 602 in Fig. 25A from decoding the ADDRESS part of a subsequent SELECT instruction, which selected the DATA COORDINATOR, until the present mode of operation is completed.
(f) The ADDRESS COUNTER 124 in Fig. 20F is reset to a count of 0.
(g) The SET W B line in Fig. 25D is brought up to effectively cause the SELECTED TAPE UNIT 2 to be set to the WRITE STATUS in preparation for the writing operation.
(h) As soon as the SELECTED TAPE UNIT 2 is set to the WRITE STATUS it transfers a signal back causing the START W B line to be brought up in Fig. 25D.
(i) The GO BUS B line in Fig. 25F is brought up to effectively cause the WRITE TAPE to start moving in a forward direction.
(j) The RESET W TGR B (Z) line to be brought up to effectively cause the WRITE triggers of the SELECTED TAPE UNIT 2 to be reset in preparation for the forthcoming WRITE operation.
(k) If the LOAD POINT of the WRITE TAPE is initially being sensed, then, the W LP DEL single shot 750 in Fig. 25F is turned ON to provide a 40 millisecond WRITE LOAD POINT DELAY.
(l) At the end of the WRITE LOAD POINT DELAY, the W DEL single shot 719 in Fig. 25F is turned ON to bring up the 10 MS W DEL line and provide a 10 millisecond WRITE DELAY which, if the LOAD POINT of the WRITE TAPE was not initially sensed, would allow ample time for the WRITE TAPE to accelerate up to its normal operating speed.
(m) At the end of the WRITE DELAY, the CHARACTER REGISTER 208 in Fig. 21A is cleared in preparation for receiving the first CHARACTER presently stored in the MEMORY 50.

Referring now to the MULTIPLE OPERATION TIMER UNIT 732 in Fig. 25F, the positive signal on the 10 MS DEL line, in combination with the TU A SEL and TU B SEL lines being up, passes via the AND circuit 723 to bring up the MULT OP PREP TO R CALL line and also passes via the OR circuit 725 to turn ON the 8 millisecond TAPE R CALL DEL single shot 726 which, in being turned ON, applies a negative signal from its left-hand output to decondition the AND circuit 727 and thereby delay the TAPE R CALL line from being brought up for 8 milliseconds.

Referring now to the STATUS DECODER 400 in Fig. 23, the positive shift on the MULT OP PREP TO R CALL line passes via the OR circuit 438 and, in combination with the $\overline{\text{CTRL 8}}$ line being up and the TU A SEL or TU B SEL lines being up via the OR circuit 426, passes via the AND circuit 440 to the inverter 442 where it is inverted to a negative shift to turn ON the TU TO DC status trigger 444 which, in being turned ON, applies a positive signal from its right-hand output to bring up the TU TO DC line.

Step 6

Approximately 7 milliseconds later, referring to the MULTIPLE OPERATION TIMER UNIT 732 in Fig. 25G, the 47 millisecond TAPE R CALL LP DEL single shot 722 returns to its OFF state causing a positive signal to be applied from its left-hand output which in combination with the TU TO DC line being up conditions the AND circuit 727.

Step 7

At the end of the TAPE READ CALL DELAY, referring to the MULTIPLE OPERATION TIMER UNIT 732 in Fig. 25F, the 8 millisecond TAPE R CALL DEL single shot 726 returns to its OFF state causing a positive signal to be applied from its left-hand output via the now conditioned AND circuit 727 to bring up the TAPE R CALL line which condition is passed to the TAPE R STATUS UNIT 638 in Fig. 25C. The positive signal on the TAPE R CALL line passes via the OR circuit 628 and the now conditioned AND circuit 629 and via the OR circuits 631 and 633 to bring up the SET R A line which condition is passed to the SELECTED TAPE UNIT 1 casing it to be set to a READ STATUS in preparation for the reading operation.

Referring now to the TAPE W STATUS UNIT 648 in Fig. 25D, the positive signal on the SET R A line, in combination with the TU A SEL line being up, passes via the AND circuit 645 to turn OFF or maintain OFF the BLOCK R trigger 646 which, in being turned OFF or being OFF, applies a negative signal from its right-hand output to bring down the BLOCK R A line which condition is applied to the inverter 647 where it is inverted to a positive signal to bring up the BLOCK R B line both of which are supplied to the READ amplifiers 740 of the READ AMPLIFIER UNIT 741 in Fig. 25H.

It will be noted that both the R BUS A and R BUS B are connected to the READ AMPLIFIER UNIT 741. Therefore, during a concurrent READ/WRITE operation DATA read at the SELECTED TAPE UNIT 1 will be transferred via the R BUS A to the READ AMPLIFIER UNIT 741 while DATA being concurrently written at the SELECTED TAPE UNIT 2 will be sensed by the read portion of the R/W heads therein and be transferred via the R BUS B to the READ AMPLIFIER UNIT 741. Consequently, the positive signal on the BLOCK R B line is effective to block DATA on the R BUS B from being applied to the READ amplifiers 740 while the negative signal on the BLOCK R A line is effective to permit DATA on the R BUS A to be applied to the READ amplifiers 741 in a manner as will be explained in greater detail hereinafter in the section on READ AMPLIFIERS.

Step 8

As soon as the SELECTED TAPE UNIT 1 is set to the READ STATUS it transfers a signal back via the SEL, RDY & R A line to the TAPE R STATUS UNIT 638 in Fig. 25C. The positive signal on the SEL, RDY & R A line, in combination with the output of the OR circuit 631 being up and the BKWD TO FWD DEL line being up, passes via the AND circuit 635 and the OR circuit 637 to bring up the START R line.

Referring now to the TAPE W CONTROL UNIT 720 in Fig. 25F, the positive signal on the START R line, in combination with the PREP TO R A line being up, passes via the AND circuit 712 and the OR circuit 713 to bring up the GO BUS A line which condition is passed to the SELECTED TAPE UNIT 1 to start its TAPE moving in a forward direction.

It should be noted, in view of Steps 5 to 8, that due to the assumed condition that the LOAD POINT on the WRITE TAPE is initially being sensed, the TAPE at the SELECTED TAPE UNIT 1, hereinafter referred to as the READ TAPE, is started 48 milliseconds after the WRITE TAPE is started due to the combination of the 40 millisecond WRITE LOAD POINT DELAY and the 8 millisecond TAPE READ CALL DELAY. However, it will be apparent that if the LOAD POINT of the WRITE TAPE is not initially being sensed, then no WRITE LOAD POINT DELAY is necessary and the READ TAPE is started 8 milliseconds after the WRITE TAPE is started.

If the LOAD POINT of the READ TAPE is initially being sensed, then, a positive signal is being maintained on the SEL & AT LP line. Therefore, assuming that the LOAD POINT of the READ TAPE is presently being sensed, the SEL & AT LP A line is up and in combination with the PREP TO R A line being up causes the AND circuit 672 to apply a positive signal via the OR circuit 674 to condition the AND circuit 675. The positive signal output of the OR circuit 674 is also applied to the inverter 676 where it is inverted to a negative signal to decondition the AND circuit 679. Hence, the positive signal on the START R line passes via the now conditioned AND circuit 675 to the inverter 677 where it is inverted to a negative signal to turn ON the 20 millisecond R LP DEL single shot 678 which in being turned ON, initiates a READ LOAD POINT DELAY and applies a negative signal from its left-hand output to maintain the AND circuit 679 deconditioned.

Step 9

When the LOAD POINT of the READ TAPE has moved past the LOAD POINT sensing device, the SEL & AT LP line is brought down which, in the present instance, causes a negative signal to be applied via the SEL & AT LP A line to decondition the AND circuit 672 causing a negative signal to be applied via the OR circuit 674 to the inverter 676 where it is inverted to a positive signal which, in combination with the START R and $\overline{\text{BKSP AFTER W}}$ line being up, now conditions the AND circuit 679.

Step 10

At the end of the 10 millisecond WRITE DELAY which occurs approximately 2 milliseconds after the end of the 8 millisecond TAPE READ CALL DELAY, referring now to the TAPE W CONTROL UNIT 720 in Fig. 25F, the 10 MS W DEL single shot 719 returns to its OFF state bringing down the 10 MS W DEL line which condition is applied to the TAPE W TYPE CYCLE UNIT 524 in Fig. 24B. The negative signal on the 10 MS W DEL line deconditions the AND circuit 554 causing a negative shift to be applied to turn ON the DC TO TU TC1 trigger 556 which, in being turned ON, applies a positive signal from its right-hand output to bring up the DC TO TU TC1 line. The positive shift on the DC TO TU TC1 line is applied via the OR circuit 542 in Fig. 24A to the inverter 544 where it is inverted to a negative shift to turn ON the W PULSE GATE trigger 546 which, in being turned ON, applies a positive signal via its right-hand output to bring up the GATE W PULSE line. Also, referring to the CLOCK CONTROL UNIT 802 in Fig. 26D, the positive shift on the DC TO TU TC1 line is applied via the OR circuit 830 to the inverter 832 where it is inverted to a negative shift to turn ON the LONG CLOCK trigger 834 which, in being turned ON, applies a positive signal from its right-hand output via the OR circuit 826 to condition the AND circuit 828 and applies a negative signal from its left-hand tapped output to turn ON the INITIATE trigger 810 which, in being turned ON, applies a positive signal from its right-hand output via the OR circuit 812 to bring up the CLOCK GATE line to initiate a cycle of operation of the CLOCK 814 in Fig. 26B in a manner as previously described in the section on the CLOCK PULSE GENERATOR.

*Step 11*

A sequence of steps now occur in the present mode which are identical to Steps 7 to 31 of the DC TO TU mode of operation. Consequently, reference should be made to those steps for the detailed description thereof during which the first CHARACTER of the RECORD or group of RECORDS stored in the DATA COORDINATOR is transferred to and written on the WRITE TAPE.

*Step 12*

During the remaining period of the 20 millisecond READ LOAD POINT DELAY, a sequence of steps occur in the present mode which are identical to Steps 32 to 50 of the DC TO TU mode of operation. Consequently, reference should be made to those steps for a detailed description thereof during which approximately 285 CHARACTERS may be transferred from the DATA COORDINATOR to be written on the WRITE TAPE.

At the end of the READ LOAD POINT DELAY, referring to the TAPE R CONTROL UNIT 687 in Fig. 25E, the R LP DEL single shot 678 returns to its OFF state causing a positive shift to be applied from its left-hand output via the now conditioned AND circuit 679 to the inverter 680 where it is inverted to a negative shift to turn ON the 5 millisecond R DEL single shot 681 which, in being turned ON, initiates a READ DELAY period during which approximately 79 more CHARACTERS may be transferred from the DATA COORDINATOR to be written on the WRITE TAPE.

*Step 13*

At the end of the 5 millisecond READ DELAY period, the R DEL single shot 681 in Fig. 25E returns to its OFF state causing a step now to occur in the present mode which is identical to Step 5 of the TU TO DC mode of operation except for turning on the LONG CLOCK trigger 834 in Fig. 26D which was turned ON as per Step 10. Conesequently, reference should be made to that step for a detailed description thereof during which the following events occur:

(a) The DEL R CALL trigger 682 in Fig. 25E is turned ON bringing up the DEL R CALL line to condition the READ amplifiers 740 in Fig. 25H to respond to the CHARACTERS which are to be read from the READ TAPE.

(b) The TAPE R TC1 trigger 506 in Fig. 24A is turned ON bringing up the TAPE R TC1, TAPE R TC1 but not $\overline{2}$ & $\overline{3}$, TAPE R TC1+2+3 and TAPE R TC1+3 but $\overline{2}$ lines.

(c) The READ REGISTER 743 in Fig. 25H is cleared in preparation for receiving the first CHARACTER read from the READ TAPE.

(d) The 1st CHAR GATE trigger 744 in Fig. 25I is turned ON bringing up the 1st CHAR GATE line which causes the ADDRESS COUNTER 112 in Fig. 20G to be reset to a count of 0 and the LRCR 242 in Fig. 21D to be cleared in preparation for initiating the production of a longitudinal redundancy check (LRC) CHARACTER.

*Step 14*

It will be remembered, as was pointed out in Step 18 of the DC TO TU mode of operation, that CHARACTERS are synchronously written on a WRITE TAPE at the rate of 63 microseconds per CHARACTER whereas the CLOCK PULSE GENERATOR 800 has a clock cycle of 9 microseconds. Consequently, the CLOCK 814 in Fig. 26B cycles seven times for each CHARACTER that is written on the WRITE TAPE. However, it should be apparent from Steps 34 to 47 of the DC TO TU mode of operation, that only approximately one of the seven clock cycles is required to perform a WRITE SERVICE operation during which a CHARACTER is read out of a SELECTED STORAGE REGISTER of the MEMORY 50 and stored in a CHARACTER REGISTER (208) in preparation for writing it on the WRITE TAPE after which the CHARACTER is rewritten in the SELECTED STORAGE REGISTER.

Likewise, it should be apparent from Steps 33 to 47 of the TU TO DC mode of operation, that it requires approximately one clock cycle to perform a READ SERVICE operation during which a CHARACTER, which was read from the READ TAPE and which is presently stored in a CHARACTER REGISTER (214), is written in a SELECTED STORAGE REGISTER. However, since only one STORAGE REGISTER of the MEMORY 50 can be selected at a time, then, the above operations cannot be performed simultaneously. If the TAPE reading operation were of a synchronous nature, as is the TAPE writing operation, then, the system could be controlled so that during one of the seven clock cycles a WRITE SERVICE operation could be performed while doing another of the seven clock cycles a READ SERVICE operation could be performed. However, as pointed out in Step 48 of the TU TO DC mode of operation, CHARACTERS are asynchronously read from a READ TAPE due to the TAPE SKEW and variation of TAPE speed. Consequently, a situation may arise where a READ SERVICE operation may be called for at the same time as a WRITE SERVICE operation. Therefore, to avoid this situation, provision is made in the PRIORITY R/W SERVICE UNIT 578 in Fig. 24C, so that the first SERVICE operation called for is given priority and the other SERVICE operation is delayed approximately one clock cycle. Since there are seven clock cycles for each tape cycle, this delay creates no problem.

Now, a situation will be described wherein the first CHARACTER of a two CHARACTER RECORD read from the READ TAPE is being stored in the MEMORY 50 at the same time that the last CHARACTER of the RECORD being transferred to the WRITE TAPE is being read out of the MEMORY 50.

Consequently, let it be assumed that the CLOCK 814 in Fig. 26B has continued cycling until the 7 COUNTER 876 in Fig. 26C has stepped to a count of 4 and now, at W2 time, a pulse, corresponding to the first 1 bit of the first CHARACTER read from the READ TAPE, passes via the R BUS A to the READ AMPLIFIER UNIT 741 where it is amplified by the R amplifier 740f and applied as a negative shift to turn ON the trigger 742f of the READ REGISTER 743. The trigger 742f, in being turned ON, applies a positive signal via the B bit line to the CHARACTER RECOGNITION UNIT 752 in Fig. 25I. The positive signal on the B bit line passes via the OR circuit 746 and the OR–C circuit 747 to bring up the FIRST BIT line.

At the same time, referring to the CHARACTER GATE COUNTER 858 in Fig. 26B, the positive pulse on the W2(D1.5) line passes via the OR–C 864 to condition AND circuit 863. Now, the positive shift on the FIRST BIT line is applied to the inverter 860 where it is inverted to a negative shift to turn ON the START CHAR GATE trigger 862 which, in being turned ON, applies a positive shift from its right-hand output via the now conditioned AND circuit 863 to the inverter 866 where it is inverted to a negative shift to turn ON the trigger 868 and thereby step the CHARACTER GATE COUNTER 858.

*Step 15*

At W3.5 time, referring to the CLOCK CONTROL UNIT 802 in Fig. 26B, the positive pulse on the W3.5(D1) line passes via the now conditioned AND circuit 828 and the OR circuit 812 to bring up the CLOCK GATE line to initiate another cycle of operation of the CLOCK 814 in Fig. 26B.

At W3.5 time, referring to the 7 COUNTER 876 in Fig. 26C, the positive shift at the leading edge of the positive pulse on the W3.5(D1) line is applied to the inverter 878 where it is inverted to a negative shift to advance the count of the 7 COUNTER 876 (to a count of 5).

Step 16

At W4 time, referring to the CHARACTER GATE COUNTER 858 to Fig. 26C, a clock pulse is applied via the W4(D1.5) line to step the CHARACTER GATE COUNTER 858.

Step 17

At R0.5 time, referring to the ADDRESS REGISTER 132 in Fig. 20F, the negative shift of the trailing edge of the positive pulse on the W3.5(D1) line passes via negative shift inputs to reset all of the triggers 136 and thereby clear the ADDRESS REGISTER 132.

Step 18

By W2 time, referring to the CHARACTER GATE COUNTER 858 in Fig. 26C, a succession of clock pulses are applied via the R1(D1.5), R3(D1.5), W0(D1.5) and W2(D1.5) lines to step the CHARACTER GATE COUNTER 858.

Step 19

At W3.5 time, referring to the CLOCK CONTROL UNIT 802 in Fig. 26D and the 7 COUNTER 876 in Fig. 26C, Step 15 is repeated to bring up the CLOCK GATE line to initiate another cycle of operation of the CLOCK 814 in Fig. 26B and to advance the count of the 7 COUNTER 876 (to a count of 6).

Step 20

By R1 time, referring to the CHARACTER GATE COUNTER 858 in Fig. 26C, successive clock pulses are applied via the W4(D0.5) and R1(D1.5) lines to step the CHARACTER GATE COUNTER 858 until the triggers 868 to 872 are successively turned OFF and the trigger 874 is turned ON causing a positive signal to be applied from its right-hand output to bring up the CHAR GATE line at approximately R1.75 time due to the ripple of the triggers 868 to 874.

Step 21

At R1.75 time, referring to the RESET EX TIMER 924 in Fig. 27B, the positive shift on the CHAR GATE line, in combination with the TU TO DC line being up via the OR circuit 935, passes via the AND circuit 936 and the OR circuit 933 to the inverter 934, where it is inverted to a negative shift to bring down the RESET CR 214 line which condition is passed to the CR 214 in Fig. 21B. The negative shift on the RESET CR 214 line is applied via negative shift inputs to reset all of the triggers 218 to clear the CHARACTER REGISTER 214 in preparation for receiving the first CHARACTER read from the READ TAPE.

Referring now to the TAPE R CONTROL UNIT 687 in Fig. 25E, the positive shift on the CHAR GATE line, in combination with the $\overline{\text{BKWD}}$ and at DEL R CAL lines being up and the left-hand output of the DISC DEL single shot 686 being up, passes via the AND circuit 683 to the inverter 684 where it is inverted to a negative shift to turn ON the 150 microsecond REC GATE single shot 685 which, in being turned ON, applies a positive signal from its right-hand output to bring up the REC GATE line.

Step 22

By W2 time, referring to the CHARACTER GATE COUNTER 858 in Fig. 26C, a succession of clock pulses are applied via the R3(D1.5), W0(D1.5) and W2(D1.5) lines to step the CHARACTER GATE COUNTER 858.

Step 23

At W3.5 time, referring to the CLOCK CONTROL UNIT 802 in Fig. 26D and the 7 COUNTER 876 in Fig. 26C, Step 15 is repeated to bring up the CLOCK GATE line to initiate another cycle of operation of the CLOCK 814 in Fig. 26B and to advance the 7 COUNTER 876 to a count of 7 whereby a positive signal is applied to the COUNT OF 7 line.

Referring now to the TAPE W CONTROL UNIT 720 in Fig. 25F, the positive signal on the COUNT OF 7 line, in combiatnion with the COND W ECHO line being up, passes via the AND circuit 706 and the OR circuit 707 to bring up the GATE W ECHO TO CR 208 line which condition is passed to the CR 208 in Fig. 21A. The positive signal on the GATE W ECHO TO CR 208 line is applied to condition the AND circuits 210 of the CR 208 in preparation for receiving the next CHARACTER to be echoed back on the TAPE W ECHO BUS.

Referring now to the W EX TIMER 994 in Fig. 27D, the positive signal on the COUNT OF 7 line, in combination with the GATE W PULSE and $\overline{\text{W TM CALL}}$ lines being up, passes via the AND circuit 995 to condition the AND circuit 996 and 997.

Step 24

At R0 time, referring to the W EX TIMER 994 in Fig. 27D, the positive pulse on the R0(D4) line passes the now conditioned AND circuit 996 to bring up the W PULSE line which condition is passed via the OR circuit 738 of the W TM UNIT 739 in Fig. 25G to bring up the W PULSE+W TM PULSE line.

At R0 time, referring to the CHARACTER GATE COUNTER 858 in Fig. 26C, a clock pulse is applied via the W4(D0.5) line to step the CHARACTER GATE COUNTER 858.

Step 25

By R3 time, referring to the CHARACTER GATE COUNTER 858 in Fig. 26C, successive clock pulses are applied via the R1(D1.5) and R3(D1.5) lines to step the CHARACTER GATE COUNTER 858.

Step 26

At R4 time, Step 31 of the DC TO TU mode of operation is performed during which the CHARACTER presently stored in the CHARACTER REGISTER 208 in Fig. 21A is written on the WRITE TAPE and signals, corresponding thereto, are echoed back via the TAPE W ECHO BUS to reset the CR 208 if the CHARACTER that is written on the WRITE TAPE corresponds to the CHARACTER that is stored in the CR 208. If the CHARACTERS are not identical, then, this condition is detected by the CR 208 NOT RESET & GM RECOGNITION UNIT 234 in Fig. 21D.

Step 27

At W2 time, Step 32 of the DC TO TU mode of operation is performed during which the REC CK trigger 280 of the ERROR CHECK UNIT 268 in Fig. 21F is turned ON if the CR 208 NOT RESET & GM RECOGNITION UNIT 234 in Fig. 21D detected that the CR 208 was not reset. It should be noted that any time either the R/W CK trigger 279 or the REC CK trigger 280 is turned on during this mode of operation, it will remain ON until after the next READ or WRITE instruction involving the DATA COORDINATOR is completed whereupon the signal on the END R/W line is effective to turn OFF both the R/W CK trigger 279 and the REC CK trigger 280 which, in being turned OFF, effectively brings down the R/W CK line and the REC CK line to signal the CENTRAL PROCESSING UNIT that an error occurred in the previous data transfer between the DATA COORDINATOR and the TAPE UNITS associated therewith.

Also, at W2 time, the positive pulse on the D2(D1.5) line passes via the now conditioned AND circuit 997 in Fig. 27D to bring up the INITIATE W SERVICE line.

Additionally, referring to the CHARACTER GATE COUNTER 858 in Fig. 26C, successive clock pulses are applied via the W0(D1.5) and W2(D2.5) lines to step the CHARACTER GATE COUNTER 858 until now the triggers 868 to 874 are successively turned OFF causing the CHAR GATE line to be brought down at approximately W2.75 time due to the ripple of the triggers 868 to 874.

Step 28

At W2.75 time, referring to the CHARACTER GATE COUNTER 858 in Fig. 26C, the negative shift on the CHAR GATE line is applied to turn OFF the START CHAR GATE trigger 858 causing a negative signal to be applied from its right-hand output to decondition the AND circuit 868 and thereby prevent the COUNTER 858 from responding to any further clock pulses.

Referring now to the RESET EX TIMER 924 in Fig. 27B, the negative shift on the CHAR GATE line is also applied to decondition the AND circuit 936 causing a negative signal to be applied via the OR circuit 933 to the inverter 934 where it is inverted to bring up the RESET CR 214 line.

Referring now to the CHARACTER RECOGNITION UNIT 752 in Fig. 25I, the negative shift on the CHAR GATE line is also applied to turn OFF the 1st CHAR GATE trigger 744 which, in being turned OFF, applies a negative signal from its right-hand output to decondition the AND circuit 749 to bring down the 1st CHAR GATE line which condition is passed to the RESET EX TIMER 924 in Fig. 27B. The negative shift on the 1st CHAR GATE line passes via the OR circuit 940 to the inverter 941 where it is inverted to a positive signal to bring up the RESET LRCR line.

Referring now to the READ REGISTER 743 in Fig. 25H, the negative shift on the CHAR GATE line is also applied to reset all of the triggers 742. Those of the triggers 742 which are turned OFF, corresponding to the 1 bits of the first CHARACTER read from the READ TAPE, apply negative signals from their right-hand outputs via the R BUS to turn ON corresponding ones of the triggers 218 of the CR 214 in Fig. 21B whereby the first CHARACTER read from the READ TAPE is effectively stored in the CHARACTER REGISTER 214. It should be noted that there is approximately a 27 microsecond period from the time that the first 1 bit of a CHARACTER is read and stored in the READ REGISTER 743 to the time that the READ REGISTER 743 is cleared in preparation for receiving the next CHARACTER. Since the bits of a CHARACTER are generally not written perpendicular to the edge of the TAPE, the time at which the first 1 bit of a CHARACTER is read will vary. Consequently, the 27 microsecond period allows sufficient time, under all conditions, for the entire CHARACTER to be read, stored in the READ REGISTER 743 and then transferred to the CHARACTER REGISTER 214 before the first 1 bit of the next CHARACTER is read from the READ TAPE.

Referring now to the PRIORITY R/W SERVICE UNIT 578 in Fig. 24C, the negative shift on the CHAR GATE line is also applied to turn ON the R SERVICE TRIGGER 579 which, in being turned ON, applies a positive signal from its right-hand output which, in combination with the $\overline{WCLB}$ line being up, conditions the AND circuit 581 and applies a negative signal from its left-hand output to decondition the AND circuit 582 to prevent a WRITE SERVICE operation from being performed thereby giving priority to the READ SERVICE operation.

Step 29

At W3 time, referring to the PRIORITY R/W SERVICE UNIT 578 in Fig. 24C, the positive pulse on the W3(D1.5) line, in combination with the $\overline{CTRL\ 8}$ line being up, passes via the AND circuit 583 and the OR circuit 585 and the now conditioned AND circuit 585 to bring up the R SERVICE CALL line which condition is passed to the TAPE R/W CYCLE UNIT 588. The positive shift on the R SERVICE CALL line is applied to turn ON the RCLA trigger 589 which, in being turned ON, applies a negative signal from its left-hand output to bring down the $\overline{RCLA}$ line and applies a positive signal from its right-hand output to bring up the RCLA line. The positive signal on the RCLA line is applied via the OR circuit 590 to bring up the RCL line which condition is passed to the MEMORY EX TIMER 902 in Fig. 27A. The positive signal on the RCL line, in combination with the TAPE R TC1+2+3 and TU TO DC lines being up, passes via the AND circuit 907 and the OR circuit 903 to bring up the MEM W line and, via the OR circuit 904, to bring up the MEM R/W line.

Step 30

At W3.5 time, referring to the CLOCK CONTROL UNIT 802 in Fig. 26D and the 7 COUNTER 876 in Fig. 26C, Step 15 is repeated to bring up the CLOCK GATE line to initiate another cycle of operation of the CLOCK 814 in Fig. 26B and to advance the count of the 7 COUNTER 876 (to a count of 1) to effectively bring down the COUNT OF 7 line.

Referring now to the TAPE W CONTROL UNIT 720 in Fig. 25F, the COUNT OF 7 line in coming down deconditions the AND circuit 705 causing a negative signal to be applied via the OR circuit 707 to bring down the GATE W ECHO TO CR 208 line.

At W3.5 time, referring to the PRIORITY R/W SERVICE UNIT 578 in Fig. 24C, the negative shift of the trailing edge of the positive pulse on the INITIATE W SERVICE line passes via a negative shift input to turn ON the W SERVICE trigger 580 which, in being turned ON, applies a positive signal from its right-hand output to the AND circuit 582. However, since the R SERVICE trigger 579 is ON to decondition the AND circuit 582 the positive signal output of the W SERVICE trigger 580 is blocked from passing through the AND circuit 582 to initiate a WRITE SERVICE operation which must wait a clock cycle during which the R SERVICE trigger 579 will be turned OFF permitting the AND circuit 582 to be conditioned so that the next positive pulse on the W3(D1.5) line will effectively pass via the AND circuit 582 to initiate the WRITE SERVICE operation.

Step 31

Steps 35 to 47 of the TU TO DC mode of operation are now performed during which the following sequence of events occur:

(a) The ADDRESS REGISTER 132 in Fig. 20F is set with the ADDRESS of the STORAGE REGISTER in the MEMORY 50 where the first CHARACTER read from the READ TAPE is to be stored.

(b) The R ERVICE trigger 579 in Fig. 24C is turned OFF causing a positive signal to be applied from its left-hand output to the AND circuit 582.

(c) The now SELECTED STORAGE REGISTER in the MEMORY 50 is cleared in preparation for receiving the first CHARACTER read from the READ TAPE and which is presently stored in the CHARACTER REGISTER 214.

(d) The RCLB trigger 592 in Fig. 24C is turned ON bringing up the RCLB line and maintaining up the RCL line.

(e) The RCLA trigger 589 in Fig. 24C is turned OFF bringing down the RCLA line.

(f) The first CHARACTER read from the READ TAPE, presently stored in the CHARACTER REGISTER 214, is written in the SELECTED STORAGE REGISTER of the MEMORY 50 and a vertical check is made, by the CHAR CODE CK UNIT 248 in Fig. 21E, to insure that there are an even number of 1 bits in the CHARACTER.

(g) The first CHARACTER which is still presently stored in the CHARACTER REGISTER 214 is transferred to the LRCR 242 in Fig. 21D to initiate the production of the longitudinal redundancy check (LRC) CHARACTER.

(h) The ADDRESS COUNTER 112 in Fig. 20G is advanced by a count of 1.

(i) The R/W CK trigger 279 of ERROR CHECK UNIT 268 in Fig. 21F is turned ON if the CHAR CODE CHECK UNIT 248 in Fig. 21B detected an odd number of 1 bits in the first CHARACTER.

(j) The CLOCK GATE line is brought up to initiate another cycle of operation of the CLOCK 814 in Fig. 26D.

(k) The 7 COUNTER 876 in Fig. 26C is advanced to a count of 2.

(l) A POST WRITE DISTURBANCE is made of the MEMORY CORES in the SELECTED STORAGE REGISTER of the MEMORY 50 to minimize subsequent noise.

(m) The RCLB trigger 592 in Fig. 24C is turned OFF effectively bringing down the RCLB, RCL, MEM W and MEM R/W lines and bringing up the $\overline{RCLB}$ line. Now, the positive signal on the RCLB line, the positive signal from the right-hand output of the W SERVICE trigger 580 and the positive signal from the left-hand output from the R SERVICE trigger 579 condition the AND circuit 582 in preparation for the WRITE SERVICE operation.

(n) The ADDRESS REGISTER 132 in Fig. 20F is cleared in preparation for receiving the ADDRESS of the STORAGE REGISTER in the MEMORY 50 where the last CHARACTER to be written on the WRITE TAPE is presently stored.

Step 32

Now, at R3 time, let it be assumed that a pulse, corresponding to the first 1 bit of the last CHARACTER read from the READ TAPE, is passed via the R BUS A to the READ AMPLIFIER UNIT 741 where it is amplified by one of the R amplifiers 740 and applied as a negative shift to turn ON a corresponding one of the triggers 742 of the READ REGISTERS 743 which, in being turned ON, applies a positive signal from its right-hand output to the CHARACTER RECOGNITION UNIT 752 in Fig. 25I. The CHARACTER RECOGNITION UNIT 752 detects which of the triggers 742 is turned ON and brings up the FIRST BIT line which is applied to condition the CHARACTER GATE COUNTER 858 in Fig. 26C to respond to the clock pulses applied thereto in a manner as previously described.

Step 33

By W3 time, referring to the CHARACTER GATE COUNTER 858 in Fig. 26C, successive clock pulses are applied via the W0(D1.5) and W2(D1.5) lines to step the CHARACTER GATE COUNTER 858.

Step 34

At W3 time, referring to the PRIORITY R/W SERVICE UNIT 578 in Fig. 24C, the positive pulse on the W3(D1.5) line, in combination with the $\overline{CTRL\ 8}$ line being up, passes via the AND circuit 583 and the OR circuit 585 and via the now conditioned AND circuit 582 to bring up the W SERVICE CALL line which condition is passed to the TAPE R/W CYCLE UNIT 588. The positive signal on the W SERVICE CALL line is applied to turn ON the WCLA trigger 594 which, in being turned ON, applies a negative signal from its left-hand output to bring down the $\overline{WCLA}$ line and applies a positive signal from its right-hand output to bring up the WCLA line and, via the OR circuit 595, the WCL line.

The positive signal on the WCL line is applied to the MEMORY EX TIMER 902 in Fig. 27A where, in combination with the DC TO TU TC1 line being up, it passes via the AND circuit 905 and the OR circuit 906 to bring up to MEM R line and via, the OR circuit 904, to bring up the MEM R/W line.

Step 35

At W3.5 time, referring to the CLOCK CONTROL UNIT 802 in Fig. 27D and the 7 COUNTER 876 in Fig. 26C, Step 15 is repeated to bring up the CLOCK GATE line to initiate another cycle of operation of the CLOCK 814 in Fig. 26B and to advance the count of the 7 COUNTER 876 to a count of 3.

Step 36

Steps 35 to 43 of the DC TO TU mode of operation are now performed during the which the following sequence of events occur:

(a) The ADDRESS REGISTER 132 in Fig. 20F is set with the ADDRESS of the STORAGE REGISTER in the MEMORY 50 where the last CHARACTER, which is to be transferred to the WRITE TAPE, is presently stored.

(b) The CHARACTER REGISTER 208 is cleared in preparation for receiving the last CHARACTER to be written on the WRITE TAPE.

(c) The W SERVICE trigger 580 in Fig. 24C is turned OFF.

(d) The last CHARACTER to be written on the WRITE TAPE is read out of the SELECTED STORAGE REGISTER of the MEMORY 50 and applied to the SENSE AMPLIFIER UNIT 202 in Fig. 21A.

(e) The WCLB trigger 597 in Fig. 24C is turned ON bringing up the WCLB lines and maintaining up the WCL line.

(f) The output of the SENSE AMPLIFIER UNIT 202 in Fig. 21A is time sampled to transfer the last CHARACTER to the CHARACTER REGISTER 208 after which a vertical check is made, by the CHAR CODE CK UNIT 232 in Fig. 21D, to insure that there are an even number of 1 bits in the last CHARACTER.

(g) The WCLA trigger 594 in Fig. 24C is turned OFF bringing down the WCLA line.

(h) The last CHARACTER, presently stored in the CHARACTER REGISTER 208, is rewritten back into the SELECTED STORAGE REGISTER of the MEMORY 50.

(i) The ADDRESS COUNTER 124 in Fig. 20F is advanced by a count of 1.

During the same period of time that the above events occur, Step 51 of the TU TO DC mode of operation is performed during which, referring to the CHARACTER GATE COUNTER 858 in Fig. 26C, a succession of clock pulses are applied via the W4(D0.5), R1(D1.5), R3(D1.5), W0(D1.5) and W2(D1.5) lines to step the CHARACTER GATE COUNTER 858 until now the triggers 868 to 872 are successively turned OFF and the trigger 874 is turned ON causing a positive signal to be applied from its right-hand output to bring up the CHAR GATE line ta approximately W2.75 time due to the ripple of the triggers 868 to 874.

Step 37

At W2.75 time, referring to the RESET EX TIMER 924 in Fig. 27B, the positive shift on the CHAR GATE line, in combination with the TU TO DC line being up via the OR circuit 935, passes via the AND circuit 936 and the OR circuit 933 to the inverter 934 where it is inverted to a negative shift to bring down the RESET CR 214 line which condition is applied to the CR 214 in Fig. 21B. The negative shift on the RESET CR 214 line is applied via negative shift inputs to reset all of the triggers 218 to clear the CHARACTER REGISTER 214 in preparation for receiving the last CHARACTER read from the READ TAPE.

Referring now to the TAPE R CONTROL UNIT 687 in Fig. 25E, the positive shift on the CHAR GATE line, in combination with the $\overline{BKWD}$ and DEL R CALL lines being up and the left-hand output of the DISC DEL single shot 686 being up, passes via the AND circuit 683 to the inverter 684 where it is inverted to a negative shift to maintain on the 150 microsecond REC GATE single shot 655 which, in remaining ON maintains the REC GATE line. It should be noted that the CHAR GATE line is brought up for each CHARACTER read from the READ TAPE and occurs at a rate which is less than the 150 microsecond period of the REC GATE single shot 685. Consequently, the REC GATE single shot 685 remains ON during the entire TAPE reading operation to maintain the REC GATE line up until the CHAR GATE line is no longer brought down when no further CHARACTER is read from the READ TAPE during a 150 microsecond interval of time.

Step 38

Steps 44 to 46 of the DC TO TU mode of operation are performed during which the following sequence of events occur:

(a) The REC CK trigger 280 of the ERROR CHECK UNIT 268 in Fig. 21F is turned ON if the CHAR CODE CHECK UNIT 232 in Fig. 21D detected an odd number of 1 bits in the last CHARACTER to be written on the WRITE TAPE.

(b) A POST WRITE DISTURBANCE is made of the MEMORY CORES in the SELECTED STORAGE REGISTER of the MEMORY 50 to minimize subsequent noise.

(c) The CLOCK GATE line is brought up to initiate another cycle of operation of the CLOCK 814 in Fig. 26B.

(d) The 7 COUNTER 876 in Fig. 26C advanced to a count of 4.

(e) The WCLB trigger 597 in Fig. 24C is turned OFF effectively bringing down the WCLB, WCL, MEM R and MEM R/W lines.

Additionally, a clock pulse is applied via the W4(D0.5) line to step the CHARACTER GATE COUNTER 858 in Fig. 26C.

Step 39

At R0.5 time, referring to the ADDRESS REGISTER 132 in Fig. 20F, the negative shift of the trailing edge of the positive pulse on the W3.5(D1) line is applied to reset all of the triggers 136 to effectively clear the ADDRESS REGISTER 132 in preparation for receiving the next ADDRESS.

Step 40

By W2 time, referring to the CHARACTER GATE COUNTER 858 in Fig. 26C, a succession of clock pulses are applied via the R1(D1.5), R3(D1.5), W0(D1.5) and W2(D1.5) lines to step up CHARACTER GATE COUNTER 858.

Step 41

Steps 56 and 57 of the TU TO DC mode of operation are performed during which the following sequence of events occur:

(a) The CLOCK GATE line is brought up to initiate another cycle of operation of the CLOCK 814 in Fig. 26B.

(b) The 7 COUNTER 876 in Fig. 26C is advanced to a count of 5.

(c) A succession of clock pulses are applied via the W4(D0.5), R1(D1.5) and R3(D1.5) lines to step the CHARACTER GATE COUNTER 858 until now the triggers 868 to 872 are successively turned OFF and the trigger 874 is turned ON causing a positive signal to be applied from its right-hand output to bring up the CHAR GATE line at approximately W2.75 time due to the ripple of the triggers 868 to 874.

Step 42

At R3.75 time, referring to the CHARACTER GATE COUNTER 858 in Fig. 26B, the negative shift on the CHAR GATE line is applied to turn OFF the START CHAR GATE trigger 852 which, in being turned OFF, applies a negative signal from its right-hand output to decondition the AND circuit 863 and thereby prevent the COUNTER from responding to any further clock pulses.

Referring now to the RESET EX TIMER 924 in Fig. 27B, the negative shift on the CHAR GATE line is also applied to decondition the AND circuit 936 causing a negative signal to be applied via the OR circuit 933 to the inverter 934 where it is inverted to bring up the RESET CR 214 line.

Referring now to the READ REGISTER 743 in Fig. 25H, the negative shift on the CHAR GATE line is additionally applied to reset all of the triggers 742. Those of the triggers 742 which are turned OFF, corresponding to the 1 bits of the last CHARACTER read from the READ TAPE, apply negative signals from their right-hand outputs via the R BUS to turn ON corresponding ones of the triggers 218 whereby the last CHARACTER read from the READ TAPE is effectively stored in the CHARACTER REGISTER 214.

Referring now to the PRIORITY R/W SERVICE UNIT 578 in Fig. 24C, the negative shift on the CHAR GATE line is further applied to turn ON the R SERVICE trigger 579 which, in being turned ON, applies a positive signal from its right-hand output, which, in combination with the $\overline{WCLB}$ line being up, conditions the AND circuit 581 and applies a negative signal from its left-hand output to decondition the AND circuit 582 and thereby prevent a WRITE SERVICE operation from being performed.

Step 43

Steps 33 to 44 of the TU TO DC mode of operation are now performed during which the following sequence of events occur:

(a) The RCLA trigger 589 in Fig. 24C is turned ON effectively bringing up the RCLA, RCL, MEM W and MEM R/W lines.

(b) The CLOCK GATE line is brought up to initiate another cycle of operation of the CLOCK 814 in Fig. 26B.

(c) The 7 COUNTER 876 in Fig. 26C is advanced to a count of 6.

(d) The ADDRESS REGISTER 132 in Fig. 20F is set with the ADDRESS of the STORAGE REGISTER in the MEMORY 50 where the last CHARACTER read from the READ TAPE is to be stored.

(e) The R SERVICE trigger 579 in Fig. 24C is turned OFF.

(f) The now SELECTED STORAGE REGISTER in the MEMORY 50 is cleared in preparation for receiving the last CHARACTER read from the READ TAPE.

(g) The RCLB trigger 592 in Fig. 24C is turned ON bringing up the RCLB line and maintaining up the RCL line.

(h) The RCLA trigger 589 in Fig. 24C is turned OFF bringing down the RCLS line.

(i) The last CHARACTER read from the READ TAPE, presently stored in the CHARACTER REGISTER 214, is written in the SELECTED STORAGE REGISTER of the MEMORY 50 and a vertical check is made, by the CHAR CODE CHECK UNIT 248 in Fig. 21E, to insure that there are an even number of 1 bits in the CHARACTER.

(j) The last CHARACTER read from the READ TAPE, which is still presently stored in the CHARACTER REGISTER 214, is transferred to the LRCR 242 in Fig. 21D to complete the production of the LRC CHARACTER.

(k) The ADDRESS COUNTER 112 in Fig. 20G is advanced by a count of 1.

(l) The R/W CK trigger 279 of the ERROR CHECK UNIT 268 in Fig. 21F, is turned ON if the CHAR CODE CHECK UNIT 248 in Fig. 21E detected an odd number of 1 bits in the last CHARACTER read from the READ TAPE.

Step 44

At W3.5 time, referring to the CLOCK CONTROL UNIT 802 in Fig. 26D and the 7 COUNTER 876 in Fig. 26C, Step 15 is repeated to bring up the CLOCK GATE line to initiate another cycle of operation of the CLOCK 814 in Fig. 26B and to advance the count of the 7 COUNTER 876 to a count of 7 so that a positive signal is applied to the COUNT OF 7 line.

Referring now to the TAPE W CONTROL UNIT 720 in Fig. 25F, the positive signal on the COUNT OF 7 line, in combination with the COND W ECHO line being up, passes via the AND circuit 706 and the OR circuit 707 to bring up the GATE W ECHO TO CR 208 line which condition is passed to the CR 208 in Fig. 21A. The positive signal on the GATE W ECHO TO CR 208 line is applied to condition the AND circuits 210 of the CR 208 in preparation for receiving the last CHARACTER to be echoed back on the TAPE W ECHO BUS.

Referring now to the W EX TIMER 994 in Fig. 27D, the positive signal on the COUNT OF 7 line, in combination with the GATE W PULSE and $\overline{\text{W TM CALL}}$ lines being up, passes via the AND circuit 995 to condition the AND circuits 996 and 997.

At the same time, a POST WRITE DISTURBANCE is made of the MEMORY CORES in the presently SELECTED STORAGE REGISTER of the MEMORY 50 to minimize subsequent noise.

Step 45

At R0 time, referring to the TAPE R/W CYCLE UNIT 588 in Fig. 24C, the negative shift of the trailing edge of the positive pulse on the W2.5(D1.5) line is applied to turn OFF the RCLB trigger 592 which, in being turned OFF applies a positive signal from its right-hand output to bring down the RCLB line and, via the OR circuit 590, to bring down the RCL line. The negative signal on the RCL line is applied to decondition the AND circuit 907 in a MEMORY EX TIMER 902 in Fig. 27A causing a negative signal to be applied via the OR circuit 902 to bring down the MEM W line and, via the OR circuit 904, to bring down the MEM R/W line.

At R0 time, referring to the W EX TIMER 994 in Fig. 27D, the positive pulse on the R0(D4) line passes via the now conditioned AND circuit 996 to bring up the W PULSE line which condition is passed via the OR circuit 738 of the W TM UNIT 739 in Fig. 25G, to bring up the W PULSE+W TM PULSE line.

Step 46

At R0.5 time, referring to the ADDRESS REGISTER 132 in Fig. 20F, the negative shift of the trailing edge of the positive pulse on the W3.5(D1) line is applied via negative shift inputs to reset all of the triggers 136 to effectively clear the ADDRESS REGISTER 132 in preparation for receiving the next ADDRESS.

Step 47

The combination of signals from the right-hand outputs of the triggers 212 of the CHARACTER REGISTER 208, corresponding to the last CHARACTER of the RECORD to be transferred to the WRITE TAPE and presently stored in the CHARACTER REGISTER 208, are applied to the TAPE W BUS in preparation for writing this CHARACTER on the WRITE TAPE.

At R4 time, referring to the W EX TIMER 994 in Fig. 27D, the negative shift of the trailing edge of the positive pulse on the R9(D4) line deconditions the AND circuit 996 to bring down the W PULSE line which, in turn, is effective to bring down the W PULSE+W TM PULSE line in Fig. 25G, to signal the SELECTED TAPE UNIT 2 to write the last CHARACTER presently on the TAPE W BUS on the WRITE TAPE. At the same time that the CHARACTER is being written on the WRITE TAPE, a combination of signals corresponding to this CHARACTER is echoed back via the TAPE W ECHO BUS to the CHARACTER REGISTER 208 in Fig. 21A so that positive signals, corresponding to the 1 bits of the CHARACTER, pass via corresponding ones of the now conditioned AND circuit 210 to turn OFF corresponding ones of the triggers 212 which were previously ON when the last CHARACTER of the RECORD was stored in the CR 208. Consequently, the CHARACTER REGISTER 208 is reset if the CHARACTER that is written on the WRITE TAPE corresponds to the CHARACTER that is stored in the CHARACTER REGISTER 208.

Referring now to the CR 208 NOT RESET & GM RECOGNITION UNIT in Fig. 21D, the right-hand outputs of the triggers 212 of the CHARACTER REGISTER 208 are applied to the OR–C circuit 236 where a check is made to insure that the CHARACTER REGISTER 208 is reset. If the CHARACTER that is stored in the CR 208 does not correspond to the CHARACTER that was written on the WRITE TAPE, then, the CR 208 is not reset and one or more of the triggers 212 apply positive signals from their right-hand outputs and via the OR–C circuit to bring up the CR 208 NOT RESET line which, in coming up, in combination with the $\overline{\text{CTRL 8}}$ line being up, conditions the AND circuit 275 in the ERROR CHECK UNIT 268 in Fig. 21F.

Step 48

A sequence of steps now occur in the present mode which are identical to Steps 32 to 42 of the DC TO TU mode of operation. Consequently, reference should be made to those steps for a detailed description thereof during which the following sequence of events occur:

(a) The REC CK trigger 280 of the ERROR CHECK UNIT 268 in Fig. 21F is turned ON if the CR 208 NOT RESET & TM RECOGNITION 234 in Fig. 21D detected that the CHARACTER REGISTER 208 was not reset due to a discrepancy between the last CHARACTER of the RECORD written on the WRITE TAPE and the CHARACTER stored in the CHARACTER REGISTER 208.

(b) The ADDRESS REGISTER 132 in Fig. 20F is set with the ADDRESS of the STORAGE REGISTER in the MEMORY 50 where the GM CHARACTER is presently stored.

(c) The CHARACTER REGISTER 208 in Fig. 21A is cleared in preparation for receiving the GM CHARACTER from the MEMORY 50.

(d) The GM CHARACTER is read out of the SELECTED STORAGE REGISTER of the MEMORY 50 and applied to the SENSE AMPLIFIER UNIT 202 in Fig. 21A.

(e) The output of the SENSE AMPLIFIER UNIT 202 in Fig. 21A is time sampled so as to transfer the GM CHARACTER to the CHARACTER REGISTER 208 after which a vertical check is made, by the CHAR CODE CHECK UNIT 232 in Fig. 21D, to insure that there are an even number of 1 bits in the GM CHARACTER.

(f) The GM CHARACTER, presently stored in the

CHARACTER REGISTER 208, is rewritten in the SELECTED STORAGE REGISTER of the MEMORY 50.

Step 49

Steps 51 to 56 of the DC TO TU mode of operation are now performed during which the following sequence of events occur:

(a) The CR 208 NOT RESET & GM RECOGNITION UNIT 234 in Fig. 21D recognizes that the GM CHARACTER is now stored in the CHARACTER REGISTER 208 and causes the 275 microsecond RESET DEL single shot 703 in Fig. 25F to be turned ON.

(b) The W PULSE GATE trigger 546 in Fig. 24A is turned OFF bringing down the GATE W PULSE line to effectively block the W PULSE line in Fig. 27D from signalling the SELECTED TAPE UNIT 2 to write on the WRITE TAPE.

(c) The W SERVICE trigger 580 in Fig. 24C is turned ON to initiate another WRITE SERVICE operation.

(d) The ADDRESS COUNTER 124 in Fig. 20F is advanced by a count of 1.

(e) The REC CK trigger 280 of the ERROR CHECK UNIT 268 in Fig. 21F is turned ON if the CHAR CODE CHECK UNIT 232 in Fig. 21D detected an odd number of 1 bits in the GM CHARACTER.

(f) The CLOCK GATE line is brought up to initiate another cycle of operation of the CLOCK 814 in Fig. 26B.

(g) A POST WRITE DISTURBANCE is made of the MEMORY CORES in the SELECTED STORAGE REGISTER of the MEMORY 50 to minimize subsequent noise.

(h) The ADDRESS REGISTER 132 in Fig. 20F is set with the ADDRESS of the STORAGE REGISTER in the MEMORY 50 where the LRC CHARACTER is stored.

(i) The CHARACTER REGISTER 208 in Fig. 21A is cleared in preparation for receiving the LRC CHARACTER.

(j) The LRC CHARACTER is read out of the SELECTED STORAGE REGISTER of the MEMORY 50 and applied to the SENSE AMPLIFIER UNIT 202 in Fig. 21A.

(k) The output of the SENSE AMPLIFIER UNIT 202 in Fig. 21A is time sampled so that the LRC CHARACTER is transferred to the CHARACTER REGISTER 208 and a vertical check is made, by the CHAR CODE CHECK UNIT 232 in Fig. 21D, to insure that there are an even number of 1 bits in the LRC CHARACTER.

(l) The LRC CHARACTER presently stored in the CHARACTER REGISTER 208, is rewritten into the SELECTED STORAGE REGISTER of the MEMORY 50.

(m) The ADDRESS COUNTER 124 in Fig. 20F is advanced by a count of 1.

(n) The REC CK trigger 280 of the ERROR CHECK UNIT 268 in Fig. 21F is turned ON if the CHAR CODE CHECK UNIT 232 in Fig. 21B detected an odd number of 1 bits in the LRC CHARACTER.

(o) The CLOCK GATE line is brought up to initiate another cycle of operation of the CLOCK 814 in Fig. 26B.

(p) A POST WRITE DISTURBANCE is made of the MEMORY CORES in the SELECTED STORAGE REGISTER of the MEMORY 50 to minimize subsequent noise.

(q) The ADDRESS REGISTER 132 in Fig. 20F is cleared in preparation for receiving the next ADDRESS.

Step 50

Step 15 keeps repeating to continue the cycling of the CLOCK 814 in Fig. 26B until, at approximately R4.5 time, 150 microseconds after the CHAR GATE line last came up, the REC GATE single shot 685 in Fig. 25E returns to its OFF state causing the 400 microsecond DISC DEL single shot 686 to be turned ON.

Steps 60 to 66 of the TU TO DC mode of operation are now performed during which the following sequence of events occur:

(a) The R SERVICE trigger 579 in Fig. 24C is turned ON to initiate a READ SERVICE operation.

(b) The CHARACTER REGISTER 214 in Fig. 21B is cleared in preparation for receiving a GM CHARACTER.

(c) The GO BUS A line in Fig. 25F is effectively brought down to signal the SELECTED TAPE UNIT 1 to stop the movement of the READ TAPE.

(d) The EMIT GM line in Fig. 27D is brought up effectively causing the INPUT SWITCH 222 in Fig. 21C to produce a GM CHARACTER at the output thereof and a vertical check is made, by the CHAR CODE CHECK UNIT 248 in Fig. 21E, to insure that there are an even number of 1 bits in the GM CHARACTER.

(e) The CLOCK GATE line is brought up to initiate another cycle of operation of the CLOCK 814 in Fig. 26B.

(f) The ADDRESS REGISTER 132 in Fig. 20F is set with the ADDRESS of the STORAGE REGISTER in the MEMORY 50 where the GM CHARACTER is to be stored.

(g) The now SELECTED STORAGE REGISTER in the MEMORY 50 is cleared in preparation for receiving the GM CHARACTER.

(h) The GM CHARACTER is now written in the SELECTED STORAGE REGISTER of the MEMORY 50.

(i) The ADDRESS COUNTER 112 in Fig. 20G is advanced by a count of 1.

(j) The R/W CK trigger 279 of the ERROR CHECK UNIT 268 in Fig. 21F is turned ON if the CHAR CODE CHECK UNIT 248 in Fig. 21E detected an odd number of 1 bits in the GM CHARACTER.

(k) The CLOCK GATE line is brought up to initiate another cycle of operation of the CLOCK 814 in Fig. 26B.

(l) A POST WRITE DISTURBANCE is made of the MEMORY CORES in the SELECTED STORAGE REGISTER of the MEMORY 50 to minimize subsequent noise.

(m) The ADDRESS REGISTER 132 in Fig. 20F is cleared in preparation for receiving the ADDRESS of the STORAGE REGISTER in the MEMORY 50 where the LRC CHARACTER is to be stored.

Step 51

It will be remembered from the description in the DC TO TU mode of operation that 10 microseconds after the last CHARACTER of a RECORD is written on TAPE a 275 microsecond RESET DELAY period is initiated after which the LRC CHARACTER is written thereon. Consequently, now, at R3 time, approximately 287 microseconds after the last CHARACTER of the RECORD was read from the READ TAPE let it be assumed that the first 1 bit of the LRC CHARACTER is read (assuming that the LRC CHARACTER is not 000000). It should be noted that the 275 microsecond RESET DELAY period was initiated as per Step 51, approximately 56 microseconds after the first 1 bit of the last CHARACTER of the RECORD was read from the READ TAPE, that is, after the start of the 287 microsecond period. Consequently, at the end of the 287 microsecond period, when the first 1 bit of the LRC CHARACTER is read from the READ TAPE, approximately 44 microseconds still remain of the RESET DELAY period. Therefore, during this remaining period a sequence of steps now occur in the present mode which are identical to Steps 67 to 75 of the TU TO DC mode of operation. Consequently, reference should be made to those steps for a detailed description thereof during which the following sequence of events occur:

(a) The FIRST BIT line is brought up to condition the CHARACTER GATE COUNTER 858 in Fig. 26C to respond to a succession of clock pulses applied thereto which steps the COUNTER until the CHAR GATE line is brought down by which time the LRC CHARACTER is completely stored in the READ REGISTER 743 in Fig. 25H.

(b) The CHAR GATE line in coming down resets the READ REGISTER 743 causing the LRC CHARACTER read from the READ TAPE to be transferred via the R BUS to the CHARACTER REGISTER 214.

(c) The CHAR GATE line in coming down also causes the R SERVICE trigger 579 in Fig. 24C to be turned ON to initiate a READ SERVICE operation.

(d) The CLOCK GATE line is brought up to intiate another cycle of operation of the CLOCK 814 in Fig. 26B.

(e) The ADDRESS REGISTER 132 in Fig. 20F is set with the ADDRESS of the STORAGE REGISTER in the MEMORY 50 where the LRC CHARACTER is to be stored.

(f) The now SELECTED STORAGE REGISTER in the MEMORY 50 is cleared in preparation for receiving the LRC CHARACTER.

(g) The LRC CHARACTER, presently stored in the CHARACTER REGISTER 214, is written in the SELECTED STORAGE REGISTER of the MEMORY 50 and a vertical check is made, by the CHAR CODE CHECK UNIT 248 in Fig. 21B, to insure there are an even number of 1 bits in the LRC CHARACTER.

(h) The LRC CHARACTER read from the READ TAPE and presently stored in the CHARACTER REGISTER 214 is transferred to the LRCR 242 in Fig. 21D which presently contains the LRC CHARACTER created during the TAPE reading operation.

(i) The ADDRESS COUNTER 112 in Fig. 20G is advanced by a count of 1.

(j) The R/W CK trigger 279 of the CHECK UNIT 268 in Fig. 21F is turned ON if the CHAR CODE CHECK UNIT 248 in Fig. 21E detected an odd number of 1 bits in the LRC CHARACTER read from the READ TAPE.

(k) The R/W CK trigger 279 of the ERROR CHECK UNIT 268 in Fig. 21F is turned ON if there is a discrepancy between the LRC CHARACTER created during the reading operation and the LRC CHARACTER read from the READ TAPE.

(l) The CLOCK GATE line is brought up to initiate another cycle of operation of the CLOCK 814 in Fig. 26B.

(m) A POST WRITE DISTURBANCE is made of the MEMORY CORES in the SELECTED STORAGE REGISTER of the MEMORY 50 to minimize subsequent noise.

(n) The ADDRESS REGISTER 132 in Fig. 20F is cleared in preparation for receiving the next ADDRESS.

Step 52

Now, the 275 microsecond RESET DEL single shot 703 in Fig. 25F returns to its OFF state causing a negative shift to be applied from its right-hand output to turn ON the 10 microsecond RESET GATE single shot 704 which, in being turned ON, applies a positive signal from its right-hand output via the OR circuits 707 to bring up the GATE W ECHO TO CR 208 line which condition is passed to the CR 208 in Fig. 21A. The positive signal on the GATE W ECHO TO CR 208 line is applied to condition the AND circuits 210 of the CR 208 in preparation for receiving the LRC CHARACTER to be echoed back on the TAPE W ECHO BUS. It should be remembered that the LRC CHARACTER read out of the MEMORY 50 during the RECORD transfer from the DATA COORDINATOR to the WRITE TAPE is still stored in the CHARACTER REGISTER 208 as per Step 49.

The positive signal output of the RESET GATE single shot 704 is also applied via the OR circuit 706 and, in combination with the TU B SEL and $\overline{\text{PREP TO R B}}$ line being up, passes via the AND circuit 710 to bring up the RESET W TGR B (Z) line which condition is passed to the SELECTED TAPE UNIT 2 causing the WRITE triggers therein to be reset whereby a LRC CHARACTER is written on the WRITE TAPE. At the same time that the LRC CHARACTER is being written on the WRITE TAPE a combination of signals corresponding to this CHARACTER is echoed back via the TAPE W ECO BUS to the CHARACTER REGISTER 208 in Fig. 21A so that positive signals, corresponding to the 1 bits of the LRC CHARACTER, passes via corresponding ones of the now conditioned AND circuits 210 to turn OFF corresponding ones of the triggers 212 which were previously turned ON when the LRC CHARACTER was stored in the CR 208. Consequently, the CHARACTER REGISTER 208 is reset if the CHARACTER that is written on the WRITE TAPE corresponds to the LRC CHARACTER presently stored in the CHARACTER REGISTER 208.

Referring now to the CR 208 NOT RESET & GM RECOGNITION UNIT 234 in Fig. 21B, where a check is made to insure that the CHARACTER REGISTER 208 is reset, if the LRC CHARACTER that is stored in the CR 208 does not correspond to the LRC CHARACTER that is written on the WRITE TAPE, then the CR 208 is not reset and the CR 208 NOT RESET line is brought up which, in coming up, in combination with the $\overline{\text{CTRL 8}}$ line being up, conditions the AND circuit 275 in ERROR CHECK UNIT 268 in Fig. 21F.

Step 53

10 microseconds later, referring to the W CONTROL UNIT 720 in Fig. 25F, the RESET GATE single shot 704 returns to its OFF state causing a negative shift to be applied from its right-hand output to the peaker 708 which applies a 2 microsecond positive pulse to the RESET STATUS line.

Referring to the W EX TIMER 994 in Fig. 27D, the positive pulse on the RESET STATUS line, in combination with the $\overline{\text{W TM CALL}}$ line being up, passes via the AND circuit 999 and the OR circuit 998 to bring up the CR 208 NOT RESET GATE TO REC CK line which condition is passed to the AND circuit 275 of the ERROR CHECK UNIT 268 in Fig. 21F. If the AND circuit 275 is conditioned by the CR 208 NOT RESET line being up, due to a discrepancy between the LRC CHARACTER written on the WRITE TAPE and the LRC CHARACTER stored in the CHARACTER REGISTER 208, the positive pulse passes via the AND circuit 275 and the OR circuit 278 to turn ON the REC CK trigger 280 which, in being turned ON, applies a positive pulse signal from its right-hand output which, in combination with the THIS DC SELECTED line being up, passes via the AND circuit 282 to bring up REC CK line.

Step 54

2 microseconds later, referring to the TAPE W TYPE CYCLE UNIT 524 in Fig. 24D, the negative shift of the trailing edge of the positive pulse on the RESET STATUS line passes via negative shift inputs to turn OFF the COND W ECHO trigger 538 and the DC TO TU TC1 trigger 556 which, in being turned OFF, apply negative signals from their right-hand outputs to bring down the COND W ECHO line and the DC TO TU TC1 line, respectively.

At the same time, referring to the STATUS DECODER 400 in Fig. 23, the negative shift of the trailing edge of the positive pulse on the RESET STATUS line passes via a negative shift input to turn OFF the DC TO TU status trigger 432 which, in being turned OFF, applies a positive signal from its left-hand output to bring up the $\overline{\text{DC TO TU}}$ line and applies a negative signal from its right-hand output to bring down the DC TO TU line.

Referring now to the TAPE W STATUS UNIT 648 in Fig. 25B, the negative signal on the DC TO TU line also passes via the OR circuit 639 to decondition the AND circuit 640 and bring down the SET W B line which, in turn, deconditions the AND circuit 641 to bring down the START W B line which condition is passed to the TAPE W CONTROL UNIT 720 in Fig. 25F. The negative signal on the START W B line passes via the OR circuit 688 to decondition the AND circuit 689 causing a negative signal to be applied via the OR circuit 691 to bring down the GO BUS B line to signal the SELECTED TAPE UNIT 2 to stop the forward motion of the WRITE TAPE.

*Step 55*

Referring now to the TAPE R CONTROL UNIT 687 in Fig. 25E, Step 15 is repeated to continue cycling the CLOCK 814 in Fig. 26B until the 400 microsecond DISC DEL single shot 686 returns to its OFF state causing a negative shift to be applied from its right-hand output via the DISC DEL line to turn OFF the DEL R CALL trigger 682 which, in being turned OFF, applies a negative signal from its right-hand output to bring down the DEL R CALL line.

Referring now to the SELECT ADDRESS DECODER 602 in Fig. 25B, the negative shift on the DEL R CALL line passes via the OR circuit 622 and via a negative shift input to turn OFF the TU1 SEL trigger 620B and the TU2 SEL trigger 620e. The negative shift on the DEL R CALL line is also applied to the READ AMPLIFIER UNIT 741 in Fig. 25H to decondition the R amplifiers 740. Additionally, referring to the TAPE R TYPE CYCLE UNIT 502 in Fig. 24A, the negative shift on the DEL R CALL line is passed via the OR circuit 522 to bring down the TAPE R TC3+DEL R CALL line.

Referring now to the STATUS DECODER 423, the negative shift on the DEL R CALL+TAPE R TC3 line is applied to turn OFF the TU TO DC status trigger 494 which, in being turned OFF, applies a negative signal from its righthand output to bring down the TU TO DC line. The negative signal on the TU TO DC line is applied to decondition the AND circuit 727 in the MULTIPLE OPERATION TIMER UNIT 732 in Fig. 25G causing a negative signal to be applied to bring down the TAPE R CALL line. The negative shift on the TU TO DC line is also applied via a negative shift input to turn OFF the TM RECOG trigger 757 in the CHARACTER RECOGNITION UNIT 752 in Fig. 25I if it had been previously turned ON due to the reading of a TAPE MARK character.

*Step 56*

At W2.5 time, referring to the CLOCK CONTROL UNIT 802 in Fig. 26D, the negative shift of the trailing edge of the positive pulse on W1(D1.5) line deconditions the AND circuit 836 causing a negative shift to be applied to turn OFF the LONG CLOCK trigger 834 which, in being turned OFF, applies a negative signal from its righthand output via the OR circuit 826 to decondition the AND circuit 828 and thereby prevent any further cycling of the CLOCK 814 in Fig. 26B which operation terminates this mode of operation.

CENTRAL PROCESSING UNIT TO DATA COORDINATOR TO TAPE UNIT AND TAPE UNIT TO DATA COORDINATOR (Early Tape Start)

It will be remembered that the MEMORY 50 of the DATA COORDINATOR is capable of storing 2024 CHARACTERS and, since it requires 9 microseconds to process each CHARACTER transferred from the CENTRAL PROCESSING UNIT to the DATA COORDINATOR, it would require approximately 9.2 milliseconds to transfer the maximum RECORD from the CENTRAL PROCESSING UNIT to the DATA COORDINATOR. Also, it will be remembered that when a WRITE TAPE is started, a 10 millisecond WRITE DELAY is provided before the TAPE writing operation commences. Consequently, the CPU TO DC TO TU & TU TO DC mode of operation functions to utilize this delay period to transfer a RECORD or group of RECORDS from the CENTRAL PROCESSING UNIT to the MEMORY 50 of the DATA COORDINATOR. Then, by the time TAPE writing operation commences, the RECORD or group of RECORDS now in the DATA COORDINATOR is transferred to a SELECTED TAPE UNIT and after a period of delay a RECORD or group of RECORDS is concurrently transferred from another selected TAPE UNIT to the DATA COORDINATOR.

A CPU TO DC TO TU & TU TO DC mode of operation is performed by process of four instructions, namely, a SELECT instruction followed by a CONTROL instruction followed by a second SELECT instruction followed by a WRITE instruction. Thus, the PROGRAM for an exemplary CPU TO DC TO TU & TU TO DC mode of operation may be as follows:

SELECT 20601
CTRL 30005
SELECT 20602
WRITE R 1132

Simply interpreted, the operation part 2 of the first SELECT instruction designates that a SELECT operation is to be performed while the ADDRESS part 0601 of the SELECT instruction designates the DATA COORDINATOR as the SELECTED input/output unit and the TAPE UNIT 1 as the first SELECTED TAPE UNIT. Similarly, the operation part 3 of the CONTROL instruction designates that a CONTROL operation is to be performed while the ADDRESS part of the CONTROL instruction designates that a read while writing operation is to be concurrently performed. Also, the ADDRESS part 0602 of the second SELECT instruction again designates the DATA COORDINATOR as the SELECTED input/out put unit and the TAPE UNIT 2 as the second SELECTED TAPE UNIT. Additionally, the operation part R of the WRITE instruction designates that a WRITE operation is to be performed, while the ADDRESS part 1132 of the WRITE instruction designates the ADDRESS in the MEMORY of the CPU starting from which a RECORD or group of RECORDS may be transferred to the MEMORY 50 of the DATA COORDINATOR and then written on the second SELECTED TAPE and after a period of delay to concurrently transfer a RECORD or group of RECORDS from the first SELECTED TAPE UNIT to the DATA COORDINATOR.

The CPU TO DC TO TU & TU TO DC mode of operation will now be described in a step by step wherein all operations within a step occur at relatively the same instant of time and with reference being made to the detailed logical block diagrams of the major components of the DATA COORDINATOR shown in Figs. 20 to 27, inclusive.

*Step 1*

Initially, the DATA COORDINATOR is ready to perform an operation as previously explained in the section on the DATA COORDINATOR READY. Thus, referring to the DC RDY UNIT in Fig. 26D, a positive signal is initially maintained on the DC RDY line.

Now, when the first SELECT instruction is called for the ADDRESS part is applied to the SELECT ADDRESS DECODER 602 in Fig. 25A in the form of a binary coded signal. The SELECT ADDRESS DECODER 602 decodes the signals to bring up the THIS DC SELECTED line, the DC SEL & RDY line, the SEL TU1 line and the TU A SEL line in a manner as previously described in the section on the SELECT ADDRESS DECODING. The DC SEL & RDY line in coming up signals the CPU that the DC is SELECTED and READY to operate.

Step 2

After the execution of the first SELECT instruction, the PROGRAM steps to the CONTROL 0005 which causes the CPU to go through a cycle of operations during the CPU CTRL 0005 line is brought up. The positive shift on the CPU CTRL 0005 line, in combination with the DC SEL & RDY line being up, passes via the AND circuit 318 of the INSTRUCTION DECODER 300 in Fig. 22 to bring up the CTRL 0005 line.

Referring now to the SELECT ADDRESS DECODER 602 in Fig. 25B, the positive signal on the CTRL 0005 passes via the OR circuit 618 and, in combination with the $\overline{CTRL\ 8}$ line being up, passes via the AND circuit 617 and the OR–C circuit 619 and, then, in combination with the SEL TU1 line being up, passes via the AND circuit 616b to turn ON the TU1 SEL trigger 620b which, in being turned ON, maintains the positive signal on the SEL TU1 line and, via the OR circuit 621b, on the TU A SEL line to thereby effectively remember which TAPE UNIT was previously selected.

Referring now to the TAPE R STATUS UNIT 638 in Fig. 25C, the positive signal on the CTRL 0005 line also passes via the OR circuit 623 and, in combination with the TU A SEL and $\overline{PREP\ TO\ R\ B}$ lines being up, passes via the AND circuit 624 to turn ON the PREP TO R A trigger 626 which, in being turned ON, applies a negative signal from its left-hand output to bring down the $\overline{PREP\ TO\ R\ A}$ line and applies a positive signal from its right-hand output to condition the AND circuit 629 and to bring up the PREP TO R A line.

Referring now to the DISCONNECT EX TIMER 984 in Fig. 27A, the positive shift on the CTRL 0005 line passes via the OR circuit 985 to the inverter 986 where it is inverted to a negative shift to turn ON the 10 microsecond CTRL/R DISC single shot 987 which, in being turned ON applies a positive signal from its right-hand output to bring up the CTRL/R DISC line for 10 microseconds to signal the CPU to terminate the CONTROL instruction and proceed to the next instruction of the PROGRAM.

Step 3

After the execution of the CONTROL 0005 instruction, the program steps to the second SELECT instruction which causes the CPU to go through another cycle of operation during which the first SELECT ADDRESS is terminated and a new SELECT ADDRESS is brought up. During this period the THIS DC SELECTED and DC SEL & RDY lines are brought down inasmuch as no ADDRESS is being applied to the SELECT ADDRESS DECODER 602 in Fig. 25A.

Step 4

As soon as the new SELECT ADDRESS is brought up, it is applied to the SELECT ADDRESS DECODER 602 in Fig. 25A in the form of binary coded signals. The SELECT ADDRESS DECODER 602 again decodes the signals to bring up the THIS DC SELECTED line, the DC SEL & RDY line and now the SEL TU2 line and the TU B SEL line in a manner as previously described in the section on SELECT ADDRESS DECODING. The DC SEL & RDY line in coming up again, signals the CPU that the DC is SELECTED and READY to operate.

Step 5

After the execution of the second SELECT instruction, the PROGRAM steps to the WRITE instruction which causes the CPU to go through another cycle of operation during which the first CHARACTER is effectively transferred from the CPU MEMORY to the CPU W BUS and the CPU W CALL line is brought up. The positive shift on the CPU W CALL line, in combination with the DC SEL & RDY line being up, passes via the AND circuit 304 of the INSTRUCTION DECODER 300 in Fig. 22 to bring up the W CALL line.

Referring now to the SELECT ADDRESS DECODER 602 in Fig. 25B, the positive signal on the W CALL line passes via the OR–C circuit 619 and, in combination with the SEL TU2 line being up, passes via the AND circuit 616e to turn ON the TU2 SEL trigger 620e which, in being turned ON, maintains a positive signal on the SEL TU2 line and, via the OR circuit 621b, on the TU B SEL line thereby remembering which TAPE UNIT was previously selected.

Referring now to the STATUS DECODER 400 in Fig. 23, the positive shift on the W CALL line, in combination with the $\overline{CTRL\ 8}$ line being up, passes via the AND circuit 422 to turn ON the CPU TO DC trigger 418 which, in being turned ON, applies a negative signal from its left-hand output to bring down the $\overline{CPU\ TO\ DC}$ lines and applies a positive signal from its right-hand output to bring up the CPU TO DC line. The positive shift output of the AND circuit 422 is also applied via the OR circuit 424 and, in combination with the TU B SEL line being up via the OR circuit 426, passes via the AND circuit 428 to the inverter 430 where it is inverted to a negative shift to turn ON the DC TO TU trigger 432 which, in being turned ON, applies a negative signal from its left-hand output to bring down the $\overline{DC\ TO\ TU}$ line and applies a positive signal from its right-hand output to bring up the DC TO TU line.

Referring now to the RESET UNIT 102 in Fig. 20G, the positive shift on the CPU TO DC line is applied via the OR circuit 104 to the inverter 106 where it is inverted to a negative shift causing the peaker 108 to apply a 2 microsecond positive pulse via the RESET AC 112 line to reset all of the triggers 110 of the ADDRESS COUNTER 112 so that the ADDRESS COUNTER 112 stands with a count of 0. The positive shift on the CPU TO DC line is also applied to the RESET EX TIMER 924 in Fig. 27B, where it passes via the OR circuit 940 to the inverter 941 and is inverted to a negative shift and applied via the RESET LRCR line to reset all of the triggers 243 of the LRCR 242 in Fig. 21D in preparation for initiating the production of a longitudinal redundancy check (LCR) CHARACTER.

Referring now to the DC & CPU TYPE CYCLE UNIT 560 in Fig. 24B, the negative shift on the $\overline{CPU\ TO\ DC}$ line is applied via a negative shift input to turn ON the CPU TO DC TC1 trigger 562 which, in being turned ON, applies a positive signal via its right-hand output to bring up the CPU TO DC TC1 line and, via the OR circuit 564, to bring up the CPU TO DC TC1+2 line. The positive signal on the CPU TO DC TC1+2 line passes via the OR circuit 903 in the MEMORY EX TIMER 902 in Fig. 27A to bring up the MEM W line and, via the OR circuit 904, to bring up the MEM R/W line.

Referring now to the DC RDY UNIT 840 in Fig. 26D, the negative shift on the DC TO TU line deconditions the AND circuit 842 causing a negative signal to be applied via the OR circuit 844 to bring down the DC RDY line which remains down during this entire mode of operation. The negative signal on the DC RDY line is applied to the SELECT ADDRESS DECODER in Fig. 25A where it is effective to bring down the DC SEL & RDY line, in a manner as previously described in the section on SELECT ADDRESS DECODING, to signal the CPU that the DC is now busy with a TAPE operation. Also, the DC SEL & RDY line in coming down is effective to decondition the INSTRUCTION DECODER 300 in Fig. 22 and the SELECT ADDRESS DECODER 602 so that the INSTRUCTION DECODER 300 is blocked from decoding a subsequent operational instruction involving the DATA COORDINATOR and the SELECT ADDRESS DECODER 602 is blocked from decoding the ADDRESS part of a subsequent SELECT instruction, which selects the DATA COORDINATOR, until the present mode of operation is completed.

Referring now to the RESET UNIT 118 in Fig. 20G, the negative shift on the $\overline{\text{DC TO TU}}$ line also deconditions the AND circuit 120 causing a negative shift to be applied to the peaker 122 which applies a 2 microsecond positive pulse via the RESET AC 124 line to reset all of the triggers 126 of the ADDRESS COUNTER 124 in Fig. 20 so that the ADDRESS COUNTER 124 stands with a count of 0.

Referring now to the TAPE W STATUS UNIT in Fig. 25D, the positive signal on the DC TO TU line passes via the OR circuit 639 and, in combination with the TU B SEL and $\overline{\text{PREP TO R B}}$ lines being up, passes via the AND circuit 640 to bring up the SET W B line which condition is passed to the SELECTED TAPE UNIT 3 causing it to be set to a WRITE STATUS in preparation for the forthcoming writing operation.

Step 6

As soon as the SELECTED TAPE UNIT 2 is set to the WRITE STATUS it transfers a signal back via the SEL, RDY & W B line to the TAPE W STATUS UNIT 648 in Fig. 25B where, in combination with the SET W B and $\overline{\text{BKWD TO FWD DEL}}$ lines being up, it passes via the AND circuit 941 to bring up the START W B line. The positive signal on the START W B line passes via the OR circuit 688 in the TAPE W CONTROL UNIT 720 in Fig. 25F and, in combination with the $\overline{\text{PREP TO R B}}$ and TU B SEL lines being up, passes via the AND circuit 689 and via the OR circuit 691 to bring up the GO BUS B line which condition is passed to the SELECTED TAPE UNIT 2 to start the WRITE TAPE moving in a forward direction. The positive shift output of the OR circuit 688 also passes via the OR circuit 696 to the inverter 698 where it is inverted to a negative shift to turn ON the 10 microsecond W TGR RESET single shot 699 which, in being turned ON, applies a positive signal from its right-hand output via the OR circuit 706 and, in combination with the TU B SEL and $\overline{\text{PREP T R B}}$ lines being up, passes via the AND circuit 710 to bring up the RESET W TGR B (Z) line which condition is passed to the SELECTED TAPE UNIT 2 causing the WRITE triggers therein to be reset in preparation for the forthcoming writing operation.

Now, let it be assumed that the LOAD POINT of the WRITE TAPE is not initially being sensed. Consequently, referring to the TAPE W CONTROL UNIT 720 in Fig. 25F, the SEL & AT LP B line is down to decondition the AND circuit 693 causing a negative signal to be passed via the OR circuit 694 to the inverter 716 where it is inverted to a positive signal. The negative signal output of the OR circuit 694 is also applied to decondition the AND circuit 697 and thereby block the positive signal output of the OR circuit 696 from effecting the W LP DEL single shot 715 with the resulting effect being that the now positive output of the inverter 716 and the positive left-hand output of the W LP DEL single shot 715 condition the AND circuit 717. Consequently, the positive signal on the START W B line passes via the OR circuits 688 and 696 and the now conditioned AND circuit 717 to the inverter 718 where it is inverted to a negative signal to turn ON the 10 millisecond W DEL single shot 719.

Referring now to the RESET EX TIMER 924 in Fig. 20B, the positive shift on the 10 MS W DEL line, in combination with the $\overline{\text{W TM CALL}}$ line being up, passes via the AND circuit 930 and the OR circuit 927 to the inverter 928 where it is inverted to a negative shift and applied via the RESET CR 208 line to reset all of the triggers 212 in the CR 208 in Fig. 21A to effectively clear the CHARACTER REGISTER 208 in preparation for receiving the first CHARACTER from the MEMORY 50.

Referring now to the MULTIPLE OPERATION TIMER UNIT 732 in Fig. 25G, the positive signal on the 10 MS W DEL line, in combination with the TU A SEL and TU B SEL lines being up, passes via the AND circuit 723 to bring up the MULT OP PREP TO R CALL line and also passes via the OR circuit 725 to turn ON the 8 millisecond TAPE R CALL DEL single shot 726 which, in being turned ON, applies a negative signal from its left-hand output to decondition the AND circuit 727 and thereby delay the TAPE R CALL line from being brought up for 8 milliseconds.

Referring now to the STATUS DECODER 400 in Fig. 23, the positive shift on the MULT OP PREP TO R CALL line passes via the OR circuit 438 and, in combination with the $\overline{\text{CTRL 8}}$ line being up and the TU A SEL or TU B SEL lines being up via the OR circuit 426, passes via the AND circuit 440 to the inverter 442 where it is inverted to a negative shift to turn ON the TU TO DC status trigger 444 which, in being turned ON, applies a positive signal from its right-hand output to bring up the TU TO DC line.

Step 7

Since the maximum RECORD transfer from the CENTRAL PROCESSING UNIT to the DATA COORDINATOR requires approximately 9.2 milliseconds, then, during the 10 millisecond WRITE DELAY period of sequence of events now occur in the present mode which are identical to Steps 3 to 43 of the CPU TO DC mode of operation. Consequently, reference should be made to those steps for a detailed description thereof during which the RECORD transfer from the CPU to the DC is completed.

Now, let it be assumed that the LOAD POINT of the READ TAPE is initially being sensed. Consequently, a sequence of events now occur in the present mode which are identical to Steps 7 to 56 of the DC TO TU and TU TO DC mode of operation. Therefore, reference should be made to those steps for a detailed description thereof during which the RECORD now in the DATA COORDINATOR is transferred to the WRITE TAPE currently with a RECORD being transferred from the READ TAPE to the DATA COORDINATOR.

CONTROL 0002 INSTRUCTION

(Rewind)

The CTRL 0002 instruction functions to rewind the TAPE of a SELECTED TAPE UNIT, at high speed, until the beginning of the TAPE is reached, that is, until the LOAD POINT is photo-electrically sensed.

Referring now to the SELECT ADDRESS DECODER 602 in Fig. 25A, if the SELECTED TAPE is already rewinding, then, the SELECTED TAPE UNIT maintains a positive signal on either the SEL & REWIND A or SEL & REWIND B line which passes via the OR circuit 607 to bring up the SEL & REWIND A+B line to condition the AND circuit 772 of the PROGRAM CONTROL UNIT 778 in Fig. 25J.

Referring now to the INSTRUCTION DECODER 300 in Fig. 22, let it be assumed a TAPE UNIT has been previously selected so that the DC SEL & RDY line is up to condition the AND circuit 312. Now, when the PROGRAM steps to the CONTROL 0002 instruction it causes the CPU to go through a cycle of operation during which the CPU CTRL 0002 line is brought up. The positive signal on the CPU CTRL 0002 line passes via the now conditioned AND circuit 312 to bring up the CTRL 002 line. The positive signal on the CTRL 0002 line passes via the now conditioned AND circuit 772 and the OR circuit 773 to bring up a CTRL DISC line which condition is passed to the DISCONNECT EX TIMER 984 in Fig. 27A. The positive shift on the CTRL DISC line is applied via the OR circuit 985 to the inverter 986 where it is inverted to a negative shift to turn ON the CTRL/R DISC single shot 987 which, in being turned ON, applies a positive from its right-hand output to bring up the CTRL/R DISC line for 10 microseconds to signal the CPU to terminate the CONTROL instruction and proceed to the next instruction of the PROGRAM. Thus, it should be apparent, that if the SELECTED TAPE is already rewinding when the CONTROL 0002 instruction is given, the CPU is immediately signalled to terminate the instruction and proceed to the next instruction of the PROGRAM.

Referring now to the PROGRAM CONTROL UNIT 778 in Fig. 25J, if the LOAD POINT of the SELECTED TAPE is initially being sensed, then, the SELECTED TAPE UNIT maintains a positive signal on either the SEL & AT LP A or SEL & AT LP B line which passes via the OR circuit 770 to condition the AND circuit 771 so that when the positive signal is applied to the CTRL 002 line it passes via the conditioned AND circuit 771 and the OR circuit 773 to bring up the CTRL DISC line which condition is again applied to the DISCONNECT EX TIMER 984 to effectively bring up the CTRL/R DISC line to signal the CPU to terminate the CONTROL instruction and proceed to the next instruction of the PROGRAM. Thus, it should be apparent, that if the LOAD POINT of the SELECTED TAPE is initially being sensed when the CONTROL 0002 instruction is given, the CPU is also immediately signalled to terminate the instruction and proceed to the next instruction of the PROGRAM.

Referring now to the TAPE R STATUS UNIT 638 in Fig. 25C, if the SELECTED TAPE UNIT is initially in the WRITE STATUS, then, the positive signal on the CTRL 0002 line is applied via either the OR circuit 633 or the OR circuit 634 to bring up either the SET R A or SET R B line which condition is passed to the SELECTED TAPE UNIT causing it to be set to the READ STATUS. This is necessary inasmuch as the information presently on the TAPE would be erased during the rewind operation if the TAPE UNIT remained in the WRITE STATUS. Now, let it be assumed that the SELECTED TAPE is not initially rewinding and that the LOAD POINT of the SELECTED TAPE is not initially being sensed. Consequently, the SELECTED TAPE UNIT maintains a negative signal on either the SEL & AT LP A or SEL & AT LP B line which condition is passed via the OR circuit which condition is passed via the OR circuit 665 of the BACKWARD UNIT 671 in Fig. 25D, to the inverter 666 where it is inverted to a positive signal to bring up the SEL & AT LP A+B line which in combination with the CTRL 0002 line being up conditions the AND circuit 668. Then, as soon as the SELECTED TAPE UNIT is set to the READ STATUS it transfers a positive signal back via either the SEL, RDY & R A or SEL, RDY & R B line which passes via the OR circuit 667 and the now conditioned AND circuit 668 to bring up the START REWIND line to signal SELECTED TAPE UNIT to initiate the REWIND operation which requires approximately 1 minute for an entire reel of tape. As soon as the REWIND operation commences, the SELECTED TAPE UNIT transfers a positive signal back via either the SELECT & REWIND A or SELECT & REWIND B line to the SELECT ADDRESS DECODER 602 in Fig. 25A to effectively bring down the DC SEL & RDY line in a manner as explained in the section on SELECT ADDRESS DECODING.

Referring now to the PROGRAM CONTROL UNIT 778 in Fig. 25G, the positive signal on the SEL & REWIND A+B line, in combination with the CTRL 0002 line being up passes via the AND circuit 772 and the OR circuit 773 to bring up the CTRL DISC line which condition is passed to the DISCONNECT EX TIMER 984 in Fig. 27A to effectively bring up the CTRL/R DISC line to signal the CPU to terminate the CONTROL 0002 instruction and proceed to the next instruction of the PROGRAM. Now, let it be assumed that after the completion of the CONTROL 0002 instruction the PROGRAM steps to another SELECT instruction which selects the DATA COORDINATOR and a TAPE UNIT other than the TAPE UNIT 1. Consequently, since the TAPE UNIT 1 is no longer selected, the SEL & REWIND A line comes down. Therefore, referring to the SELECT ADDRESS DECODER 602 in Fig. 25A, the negative signal on the SEL & REWIND A line is applied via the OR circuit 607 to bring down the SEL & REWIND A+B line which condition is applied to the inverter 608 where it is inverted to a positive signal to condition the AND circuit 609. Now, the binary coded signals, corresponding to the hundreds and tens digit of the new SELECT instruction are decoded to bring up the THIS DC SELECTED line which in combination with the DC RDY line being up passes via the AND circuit 610 and the now conditioned AND circuit 609 to bring up the DC SEL & RDY line. The DC SEL & RDY line in coming up permits the units digit of the new SELECT instruction to be decoded, in a manner as previously described in the section on SELECT ADDRESS DECODING, to bring up one of the SEL TU lines which condition is passed to SELECT a TAPE UNIT for further operation. The PROGRAM may be such that the newly SELECTED TAPE UNIT may be given an instruction to REWIND so that the two previously SELECTED TAPES may be performing a REWIND operation simultaneously and, in fact, in a similar manner, all of the TAPE UNIT may be sequentially instructed to perform a REWIND operation so that all of the TAPES associated with the DATA COORDINATOR may be performing a REWIND operation simultaneously. Also, it should be apparent, that the second SELECTED TAPE UNIT may be given a READ instruction (CTRL 0006) or a WRITE instruction (CTRL 0007) instead of a REWIND instruction whereby during the period that the first SELECTED TAPE UNIT is performing a REWIND operation, the second SELECTED TAPE UNIT may be performing a TAPE read or TAPE write operation. Also, if the RECORD being read from or being written on the second SELECTED TAPE is short enough a third TAPE UNIT may be subsequently selected to perform a REWIND operation, a TAPE reading operation or a TAPE writing operation while the first SELECTED TAPE UNIT is still performing the REWIND operation. Therefore, it should be apparent that after a REWIND operation is initiated any one or more of the remaining TAPE units associated with the DATA COORDINATOR may be selected to perform an operation in accordance with the PROGRAM that is being processed.

CONTROL 0003 INSTRUCTION

(Turn On Tape Indicator)

The TAPE INDICATOR of a SELECTED TAPE UNIT is turned ON, if it is OFF, due to one of the following conditions:

(a) When the physical end of the TAPE is reached, that is, when the TAPE INDICATOR POINT aluminum strip is photo-electrically sensed during a TAPE writing operation.

(b) When the end of a file of RECORDS is reached, that is, when the TAPE MARK CHARACTER is read during a TAPE reading operation.

(c) When a CONTROL 0003 instruction is given, as for example, when it is desired to create an end of file condition.

Thus, the CONTROL 0003 instruction functions to signal the previously SELECTED TAPE UNIT to turn ON its TAPE INDICATOR if it is OFF. After the TAPE INDICATOR is turned ON, referring to the I/O INDICATOR UNIT 764 in Fig. 25I, the SELECTED TAPE UNIT transfers a signal back via the TU SEL & TI ON line to the DATA COORDINATOR to turn ON the ANY TI trigger 754 and to signal the CPU via the DC I/O IND ON line that the TAPE INDICATOR of the SELECTED TAPE UNIT is ON.

As long as a TAPE UNIT remains SELECTED and its TAPE INDICATOR is ON the TU SEL & TI ON line remains up, but, as soon as a new TAPE UNIT is SELECTED whose TAPE INDICATOR was OFF, the TU SEL & TI ON line comes down. However, the ANY TI trigger 754 in being previously turned ON, when the TAPE INDICATOR of the previously SELECTED TAPE UNIT was turned ON, remembers that the TAPE INDICATOR of the previously SELECTED TAPE UNIT was turned ON and if a MODE C or D select instruction is given, the DC I/O IND ON line is again brought up to signal the CPU that the TAPE INDICATOR of one of the TAPE UNIT associated with the DATA COORDINATOR is ON.

If the TAPE INDICATOR of a SELECTED TAPE UNIT is initially ON, then, referring to the I/O INDICATOR UNIT 764 in Fig. 25I and the PROGRAM CONTROL UNIT 778 in Fig. 25J, the combination of positive signals on the THIS DC SELECTED and TU SEL & TI ON lines causes the AND circuit 757 to apply a positive signal via OR circuit 758 to bring up the DC I/O line to signal the CPU that the TAPE INDICATOR of the SELECTED TAPE UNIT is ON and to condition the AND circuit 867. Now, when the PROGRAM steps to the CONTROL 0003 instruction it causes the CPU to go through a cycle of operation during which the CPU CTRL 0003 line is brought up. The positive shift on the CPU CTRL 0003 line, in combination with the DC SEL & RDY line being up, passes via the AND circuit 314 of the INSTRUCTION DECODER 300 in Fig. 22 to bring up the CTRL 0003 line.

Referring now to the PROGRAM CONTROL UNIT 778 in Fig. 25G, the positive signal on the CTRL 0003 line passes via the now conditioned AND circuit 767 and the OR circuit 773 to bring up the CTRL DISC line which condition is passed to the DISCONNECT EX TIMER 984 in Fig. 27A. The positive shift on the CTRL DISC line is applied via the OR circuit 985 to the inverter 986 where it is inverted to a negative shift to turn ON the 10 microsecond CTRL/R DISC single shot 987 which, in being turned ON, applies a positive signal from its right-hand output to bring up the CTRL/R DISC line for 10 microseconds to signal the CPU to terminate the CONTROL instruction and proceed to the next instruction of the PROGRAM. Thus, it should be apparent, that if the TAPE INDICATOR of a SELECTED TAPE UNIT is initially ON when the CONTROL 0003 instruction is given, the CPU is immediately signalled to proceed to the next instruction of the PROGRAM.

Now, let it be assumed, that when the CONTROL 0003 instruction is given that the TAPE INDICATOR of the SELECTED TAPE UNIT is not ON. Consequently, referring to the PROGRAM CONTROL UNIT 778 in Fig. 25J, the positive signal on the CTRL 0003 line is applied to condition the AND circuit 767 and is passed via either the OR circuit 774 or the OR circuit 775 to bring up either the TURN ON TI A line or the TURN ON TI B line to signal the SELECTED TAPE UNIT to turn ON its TAPE INDICATOR. Referring now to the I/O INDICATOR UNIT 764 in Fig 25I, as soon as the TAPE INDICATOR of the SELECTED TAPE UNIT is turned ON, a signal is fed back via the TU SEL & TI ON line to turn ON the ANY TI trigger 754 which, in being turned ON, applies a positive signal from its right-hand output to condition the AND circuit 756. Additionally, the positive signal on the TU SEL & TI ON line, in combination with the THIS DC SELECTED line being up, passes via the AND circuit 757 and the OR circuit 758 to bring up the DC I/O IND ON line to signal the CPU that the TAPE INDICATOR of the SELECTED TAPE UNIT is ON. The positive signal on the DC I/O IND ON line is also applied via the now conditioned AND circuit 767 in the PROGRAM CONTROL UNIT 778 in Fig. 25J and via the OR circuit 773 to bring up the CTRL DISC line which condition is passed to the DISCONNECT EX TIMER 984 where it is effective to bring up the CTRL/R DISC line to signal the CPU to terminate the CONTROL 0003 instruction and proceed to the next instruction of the PROGRAM. Now, if the presently SELECTED TAPE UNIT is deselected and a new TAPE UNIT is SELECTED whose TAPE INDICATOR is OFF, the TU SEL & TI ON line is brought down to decondition the AND circuit 757 causing a negative signal to be applied via the OR circuit 758 to bring down the DC I/O IND ON line. However, the ANY TI trigger 754 is still ON to condition the AND circuit 756. Consequently, if a SELECT instruction is given causing the MODE C or MODE D line to be brought up, in a manner as previously described in the section on SELECT ADDRESS DECODING, a positive signal is passed via the OR circuit 755 and the now conditioned AND circuit 756 and via the OR circuit 758 to again bring up the DC I/O ON line to signal the CPU that the TAPE INDICATOR of one of the TAPE UNITS associated with the DATA COORDINATOR is ON.

CONTROL 0000 INSTRUCTION (TURN OFF TAPE INDICATOR)

The CONTROL 0000 instruction functions to signal the previously SELECTED TAPE UNIT to turn OFF its TAPE INDICATOR if it is ON.

Referring to the INSTRUCTION DECODER 300 in Fig. 22, when the PROGRAM steps to the CONTROL 0000 instruction it causes the CPU to go through a cycle of operation during which the CPU CTRL 0000 line is brought up. The positive shift on the CPU CTRL 0000 line, in combination with the DC SEL & RDY line being up, passes via the AND circuit 308 of the INSTRUCTION DECODER 300 in Fig. 22 to bring up the CTRL 0000 line.

Referring now to the PROGRAM CONTROL UNIT 778 in Fig. 25J, if the TAPE INDICATOR of the SELECTED TAPE UNIT is already OFF, then, the SELECTED TAPE UNIT maintains a positive signal on the SEL & TI OFF line to condition the AND circuit 765. Now, when the CTRL 0000 line is brought up, a positive signal is passed via the now conditioned AND circuit 765 and the OR circuit 773 to bring up the CTRL DISC line which condition is passed to the DISCONNECT EX TIMER in Fig. 27A. The positive shift on the CTRL DISC line is applied via the OR circuit 985 to the inverter 986 where it is inverted to a negative shift to turn ON the 10 microsecond CTRL/R DISC single shot 987 which, in being turned ON, brings up the CTRL/R DISC line to signal the CPU to terminate the CONTROL instruction and proceed to the next instruction of the PROGRAM. Thus, it should be apparent, that if the TAPE INDICATOR of the SELECTED TAPE UNIT is already OFF when the CONTROL 0000 instruction is given, then, the CPU is immediately signalled to terminate the instruction and proceed to the next instruction of he PROGRAM.

If the TAPE INDICATOR of the previously SELECTED TAPE UNIT is not initially OFF, then, when the CTRL 0000 line is brought up this condition is passed to signal the SELECTED TAPE UNIT to turn OFF the TAPE INDICATOR. At the same time, referring to the I/O INDICATOR UNIT 564 in Fig. 25I and the PROGRAM CONTROL UNIT 778 in Fig. 25J, the positive signal on the CTRL 0000 line is effective to condition the AND circuit 765 and to turn OFF the ANY TI trigger 754 which, in being turned OFF, applies a negative signal from its right-hand output to decondition the AND circuit 756 causing a negative signal to be passed via the OR circuit 758 to bring down the DC I/O IND ON line.

As soon as the TAPE INDICATOR of the SELECTED TAPE UNIT is turned OFF, the SELECTED TAPE UNIT applies a positive signal via the SEL & TI OFF line which passes via the now conditioned AND circuit 765 and the OR circuit 773 to bring up the CTRL DISC line which condition is passed to the DISCONNECT EX TIMER 984 in Fig. 27A where it effectively brings up the CTRL/R DISC line to signal the CPU to terminate the CONTROL 0000 instruction and to proceed to the next instruction of the PROGRAM.

CONTROL 0004 INSTRUCTION (BACKSPACE)

After each TAPE reading or TAPE writing operation, a check may be made for a READ-WRITE error. If an error is detected, the TAPE of the previously SELECTED TAPE UNIT may be backspaced and reread to check for the error. Consequently, the CONTROL 0004 instruction functions to signal the previously SELECTED TAPE UNIT to backspace its TAPE. However, a TAPE WRITE instruction can be followed by a CONTROL 0000 instruction only if the remainder of the TAPE contains unwanted information inasmuch as the information backspaced over will be erased if the TAPE UNIT remains set in the WRITE STATUS.

A BACKSPACE mode of operation may be performed by a process of 2 instructions, namely, a SELECT instruction followed by a CONTROL instruction. Thus the PROGRAM for an exemplary BACKSPACE mode of operation may be as follows:

```
SELECT 20601
CTRL   30004
```

Simply interpreted, the operation part 2 of the SELECT instruction designates that a SELECT operation is to be performed while the ADDRESS part 0601 of the SELECT instruction designates the DATA COORDINATOR as the SELECTED input/output unit and the TAPE UNIT 1 as the SELECTED TAPE UNIT. Similarly, the operation part 3 of the CONTROL instruction designates that a CONTROL operation is to be performed while the ADDRESS part of the CONTROL instruction designates that the previously selected TAPE is to be backspaced.

The BACKSPACE mode of operation will now be described in a step by step manner wherein all operations within a step occur at relatively the same instant of time and with reference being made to the detailed logical block diagrams of the major components of the DATA COORDINATOR shown in Figs. 20 to 27, inclusive. Also, reference may be made to the timing diagram of Fig. 34 to aid in understanding the sequence of events of the present operation.

Step 1

Initially, the DATA COORDINATOR is ready to perform an operation as previously explained in the section on the DATA COORDINATOR READY. Thus, referring to the DC RDY UNIT 840 in Fig. 26D, a positive signal is initially maintained on the DC RDY line.

Now, when the SELECT instruction is called for, the ADDRESS part is applied to the SELECT ADDRESS DECODER 602 in Fig. 25A in the form of binary coded signals. The SELECT ADDRESS DECODER 602 decodes the signals to bring up the THIS DC SELECTED line, the DC SEL & RDY line, the SEL TU1 line and the TU A SEL line in a manner as previously described in the section on SELECT ADDRESS DECODING. The DS SEL & RDY line in coming up signals the CPU that the DC is SELECTED and READY to operate.

Step 2

After the execution of the SELECT instruction, the PROGRAM steps to the CONTROL 0004 instruction which causes the CPU to go through a cycle of operation during which the CPU CTRL 0004 line is brought up. The positive shift on the CPU CTRL 0004 line, in combination with the DC SEL & RDY line being up, passes via the AND circuit 316 of the INSTRUCTION DECODER 300 in Fig. 22 to bring up the CTRL 0004 line.

Referring now to the SELECT ADDRESS DECODER 602 in Fig. 25B, the positive signal on the CTRL 0004 line passes via the OR-C circuit 619 and, in combination with the SEL TU1 line being up, passes via the AND circuit 616b to turn ON the TU1 SEL trigger 620b which, in being turned ON, maintains the positive signal on the SEL TU1 line and, via the OR circuit 621b, on the TU A SEL line to thereby effectively remember which TAPE UNIT was previously selected.

Now, referring to the BACKWARD UNIT 671 in Fig. 25D, let it be assumed that the LOAD POINT of the SELECTED TAPE is not initially being sensed so that the SELECTED TAPE UNIT 1 maintains a negative signal on the SEL & AT LP A line which condition is passed via the OR circuit 665 to the inverter 666 where it is inverted to a positive signal to bring up the $\overline{\text{SEL \& AT LP A}+\text{B}}$ line which condition, in turn, is passed to the AND circuit 650 in Fig. 25E. Also, let it be assumed that the SELECTED TAPE UNIT 1 is initially in a WRITE STATUS so that a positive signal is maintained on the SEL, RDY & W A line which condition is applied via the OR circuit 649 to the AND circuit 650. Therefore, the positive signals on the $\overline{\text{SEL \& AT LP A}+\text{B}}$ and SEL, RDY & W A lines in combination with the $\overline{\text{BKWD TO FWD DEL}}$ line being up conditions the AND circuit 650 so that the positive shift on the CTRL 0004 line passes therethrough to the inverter 651 where it is inverted to a negative shift to turn ON the 6 millisecond W FWD BEFORE BKSP single shot 652 which, in being turned ON, applies a positive signal from its right-hand tapped output to bring up the W FWD BEFORE BKSP line which condition is passed to the TAPE W CONTROL UNIT 720 in Fig. 25F. The positive signal on the W FWD BEFORE BKSP line passes via the OR circuit 695 and, in combination with the TU A SEL and $\overline{\text{PREP TO R A}}$ lines being up, passes via the AND circuit 711 and the OR circuit 713 to bring up the GO BUS A line to signal the SELECTED TAPE UNIT 1 to start its TAPE moving in a forward direction.

It should be noted that if the SELECTED TAPE UNIT is in the WRITE STATUS and it is not desired to erase the information presently on the TAPE, then, the SELECTED TAPE UNIT must be switched to the READ STATUS before the backspacing operation commences. However, this change of STATUS may cause an unwanted noise signal to be recorded on the TAPE. Then, if the TAPE is backspaced and reread, the TAPE may stop at a point where the noise signal would be beyond the ERASE head so that if it desired to write again, the noise signal would not be erased but, instead, would create a false CHARACTER during a subsequent reading operation.

Also, it is possible, that after the TAPE has been backspaced and reread, that the TAPE may stop at a point which is beyond the point from which backspacing operation started and now, if it is desired to write again, then, that portion of the TAPE between where the backspacing operation started to where the TAPE is stopped will not be erased and may cause subsequent reading errors.

Therefore, to avoid these conditions, when the SELECTED TAPE UNIT is initially in the WRITE STATUS and it desires to backspace the TAPE, the TAPE is moved forward for a 6 millisecond WRITE FORWARD BEFORE BACKSPACE period, which, insures that the noise signal recorded on the TAPE, when the SELECTED TAPE UNIT is switched to the WRITE STATUS, is far enough behind the RECORD, backspaced over, so that it will be erased if its desired to write again on the same TAPE and also insured that that portion of the TAPE between where the backspacing operation started to where the TAPE is presently stopped will not cause any subsequent reading errors.

Step 3

6 milliseconds later, referring to the BACKWARD UNIT 671 in Fig. 21E, the W FWD BEFORE BKSP single shot 652 returns to its OFF state causing a negative signal to be applied from its right-hand output to bring down the W FWD BEFORE BKSP line. Referring now to the TAPE W CONTROL UNIT 720 in Fig. 25F, the negative signal on the W FWD BEFORE BKSP line passes via the OR circuit 695 to decondition the AND circuit 711 causing a negative signal to be applied via the OR circuit 713 to bring down the GO BUS A line to signal the SELECTED TAPE UNIT 1 to stop the forward movement of its TAPE.

Referring now to Fig. 25D, the negative shift on the W FWD BEFORE BKSP line is applied via a negative shift input to turn ON the BKSP AFTER W trigger 654 which, in being turned ON, applies a negative signal from its left-hand output to bring down the $\overline{\text{BKSP AFTER W}}$ line and applies a positive signal from its right-hand output to condition the AND circuit 657.

At the same time, referring to Fig. 25E, the negative shift on the W FWD BEFORE BKSP line is also applied via a negative shift input to turn ON the BKWD trigger 653 which, in being turned ON, applies a negative signal from its left-hand output to bring down the $\overline{\text{BKWD}}$ line and applies a positive signal from its right-hand output to bring up the BKWD line. It should be noted that if the SELECTED TAPE UNIT 1 were initially in the READ STATUS and the LOAD POINT of the TAPE were not initially being sensed, then, positive signals are maintained on the $\overline{\text{BKWD TO FWD DEL}}$, $\overline{\text{SEL & AT LP A+B}}$ and SEL, RDY & R A+B lines to condition the AND circuit 669 so that when the positive shift is applied to the CTRL 0004 line it passes via the AND circuit 669 to the inverter 670 where it is inverted to a negative shift to turn ON the BKWD trigger 653 in Fig. 25E.

The BKWD line in coming up signals the SELECTED TAPE UNIT 1 to switch to the REVERSE condition so that the next GO signal applied thereto will cause the TAPE to move in a backward direction. The negative shift on the $\overline{\text{BKWD}}$ line is applied to turn ON the 24 millisecond FWD TO BKWD DEL single shot 655 which, in being turned ON, delays the start of the TAPE to allow sufficient time for the SELECTED TAPE UNIT to be set to the REVERSE condition. The negative shift on the $\overline{\text{BKWD}}$ line is also applied to turn ON the 10 microsecond CTRL/R DISC single shot 987 of the DISCONNECT EX TIMER 984 in Fig. 27A which, in being turned ON, applies a positive signal from its right-hand output to bring up the CTRL/R DISC line for 10 microseconds to signal the CPU to terminate the CONTROL instruction and proceed to the next instruction of the PROGRAM.

Referring now to the CLOCK CONTROL UNIT 802 in Fig. 26D, the positive shift on the BKWD line is also applied via the OR circuit 830 to the inverter 832 where it is inverted to a negative shift to turn ON the LONG CLOCK trigger 834 which, in being turned ON, applies a positive signal from its right-hand output via the OR circuit 826 to condition the AND circuit 828 and applies a negative shift from its left-hand tapped output to turn ON the INITIATE trigger 810 which, in being turned ON, applies a positive signal from its right-hand output via the OR circuit 812 to bring up the CLOCK GATE line to initiate a cycle of operation of the CLOCK 814 in Fig. 26B, in a manner as previously described in the section on the CLOCK PULSE GENERATOR.

At the same time, the positive signal on the BKWD line additionally passes via the OR circuit 805 to the inverter 807 where it is inverted to a negative signal to bring down the $\overline{\text{BKWD+TU TO DC}}$ line which is applied to decondition the AND circuit 842 in the DC RDY UNIT 840 causing a negative signal to be applied via the OR circuit 844 to bring down the DC RDY line which remains down during the entire mode of operation. The negative signal on the DC RDY line is applied to the SELECT ADDRESS DECODER 602 in Fig. 25A where it is effective to bring down the DC SEL & RDY line, in a manner as previously described in the section on SELECT ADDRESS DECODING, to signal the CPU that the DC is now busy with a TAPE operation. Also, the DC SEL & RDY line in coming down is effective to decondition the INSTRUCTION DECODER 300 in Fig. 22 and the SELECT ADDRESS DECODER 602 in Fig. 25 so that the INSTRUCTION DECODER 300 is blocked from decoding a subsequent operational instruction involving the DATA COORDINATOR and the SELECT ADDRESS DECODER 602 is blocked from decoding the ADDRESS part of a subsequent SELECT INSTRUCTION, which selects the DATA COORDINATOR, until the present mode of operation is completed.

Step 4

At R0 time, referring to the CLOCK CONTROL UNIT 802 in Fig. 26D, the negative shift of the leading edge of the negative pulse on the $\overline{\text{R0(D1.5)}}$ line is applied to turn OFF the INITIATE trigger 810 effectively causing the CLOCK GATE line to come down.

Step 5

At W3.5 time, referring to the CLOCK CONTROL UNIT 802 in Fig. 26D, the positive pulse on the W3.5(D1) line passes via the now conditioned AND circuit 828 and the OR circuit 812 to bring up the CLOCK GATE line to initiate another cycle of operation of the CLOCK 814 in Fig. 26B. It should be apparent that as long as the LONG CLOCK trigger 834 remains ON each succeeding clock pulse on the W3.5(D1) line will initiate another cycle of operation of the CLOCK 814.

Step 6

Approximately 24 milliseconds later, referring to the BACKWARD UNIT 671 in Fig. 25B, the FWD TO BKWD DEL single shot 655 returns to its OFF state causing a negative shift to be applied from its right-hand tapped output to turn ON the DEL PKSP CALL trigger 656 which, in being turned ON, applies a positive signal from its right-hand output to bring up the DEL PKSP CALL line which condition is applied to the TAPE R STATUS UNIT 638 in Fig. 25C. The positive signal on the DEL PKSP CALL line is applied via the OR circuits 631 and 633 to bring up the SET R A line which condition is passed to the SELECTED TAPE UNIT 1 causing it to be set to the READ STATUS in preparation for the backspacing operation.

Step 7

As soon as the SELECTED TAPE UNIT 1 is set to the READ STATUS it transfers a signal back via the SEL, RDY & R A line to the AND circuit 635 of the TAPE R STATUS UNIT 638 in Fig. 25C where, in combination with the $\overline{\text{BKWD TO FWD DEL}}$ line being up and the DEL PKSP CALL line being up via the OR circuit 631, passes via the AND circuit 655 and the OR circuit 637 to bring up the START R line.

Referring now to the TAPE W CONTROL UNIT 720 in Fig. 25F, the positive signal on the START R line, in combination with the SEL, RDY & R A line being up, passes via the AND circuit 759 and the OR circuit 713 to bring up the GO BUS A line which condition is passed to the SELECTED TAPE UNIT 1 to start the TAPE moving in a backward direction.

Referring now to the BACKWARD UNIT 671 in Fig. 25D, the positive signal on the START R line also passes via the now conditioned AND circuit 657 to the inverter 658 where it is inverted to a negative shift to turn ON the 6 millisecond R AFTER W DEL single shot 659. The 6 millisecond READ AFTER WRITE DELAY allows the TAPE of the SELECTED TAPE UNIT 1 to return to the point at which it started the WRITE FORWARD BEFORE BACKSPACE operation as per Step 2.

Step 8

6 milliseconds later, referring to the BACKWARD UNIT 671 in Fig. 25D, the R AFTER W DEL single shot 659 returns to its OFF state causing a negative signal to be applied via the R AFTER W DEL line to the TAPE R CONTROL UNIT 687 in Fig. 25E. The negative shift on the R AFTER W DEL line is applied via a negative shift input to turn ON the DEL R CALL trigger 682 which, in being turned ON, applies a positive signal from its right-hand output to bring up the DEL R CALL line which condition is passed to the READ AMPLIFIER UNIT 741 in Fig. 25H to condition the R amplifiers 740 to respond to the information to be read from the SELECTED TAPE via the R BUS A.

It should be noted that if the SELECTED TAPE UNIT 1 were initially in the READ STATUS, then, the BKSP AFTER W trigger 654 in Fig. 25D would not be turned ON as per Step 3 with the resulting effect being that the PKSP AFTER W line would be maintained up. Therefore, assuming that the LOAD POINT of the SELECTED TAPE was not initially sensed, then, the SELECTED TAPE UNIT 1 would maintain a negative signal on the SEL & AT LP A line to decondition the AND circuit 672 in Fig. 25E causing a negative signal to be applied via the OR circuit 674 to the inverter 675 where it is inverted to a positive signal which, in combination with the positive signal now on the PKSP AFTER W line and the positive signal from the left-hand output of the R LP DEL single shot 678, conditions the AND circuit 679. Then, when the positive signal is applied to the START R line, as per Step 7, it passes via the now conditioned AND circuit 679 to the inverter 680 where it is inverted to a negative signal to turn ON the 5 millisecond R DEL single shot 681. After the 5 millisecond READ DELAY, the R DEL single shot 681 returns to its OFF state causing a negative shift to be applied from its right-hand tapped output to turn ON the DEL R CALL trigger 682 bringing up the DEL R CALL line to condition the READ AMPLIFIER UNIT 741 in Fig. 25H to respond to information to be read from the SELECTED TAPE.

Step 9

Shortly thereafter, referring to the READ AMPLIFIER UNIT 741 in Fig. 25H, let it be assumed that a pulse, corresponding to the first 1 bit of the first CHARACTER read from the SELECTED TAPE which will be the LRC CHARACTER, is passed via the R BUS A to the READ AMPLIFIER UNIT 741 where it is amplified by a corresponding one of the amplifiers 740 and applied as a negative shift to turn ON a corresponding one of the triggers 742 of the READ REGISTER 743, which, in being turned ON, applies a positive signal via a corresponding bit line to the CHARACTER RECOGNITION UNIT 752 in Fig. 25I where it passes via the OR–C circuit 747 to bring up the FIRST BIT line.

Referring now to the CHARACTER GATE COUNTER 858 in Fig. 26C the positive shift on the FIRST BIT line is applied to the inverter 860 where it is inverted to a negative shift to turn ON the START CHAR GATE trigger 862 which, in being turned ON, applies a positive signal from its right-hand output to condition the AND circuit 863 and thereby condition the COUNTER to respond to clock pulses applied thereto.

Step 10

Referring now to the CHARACTER GATE COUNTER 858 in Fig. 26C, a succession of clock pulses are applied via the W4(D0.5), R1(D1.5), R3(D1.5), W0(D1.5) and W2(D1.5) lines to step the CHARACTER GATE COUNTER 858 until the triggers 868 to 872 are successively turned OFF and the trigger 874 is turned ON causing a positive signal to be applied from its right-hand output to bring up the CHAR GATE line.

Referring now to the BACKWARD UNIT 671 in Fig. 25E, the positive shift on the CHAR GATE line, in combination with the DEL PKSP CALL line being up, passes via the AND circuit 660 to the inverter 661 where it is inverted to a negative shift to turn ON the 500 microsecond BOR RECOG single shot 662.

It should be noted that the CHAR GATE line is brought up for each CHARACTER read from the SELECTED TAPE. However, the period from the time that the LRC CHARACTER is read to the time that the last CHARACTER of the RECORD is read is approximately 285 microseconds whereas the RECORD being backspaced over is read at a nominal rate of 63 microseconds per CHARACTER both of which periods are less than the 500 microsecond period of the BOR RECOG single shot 662. Consequently, the BOR RECOG single shot 662 is kept ON during the entire backspacing operation by the successive positive shifts on the CHAR GATE line until the BEGINNING OF THE RECORD (BOR) when the first CHARACTER of the RECORD or group of RECORDS is read after which the CHAR GATE line is no longer brought up.

Step 11

500 microseconds after the CHAR GATE line comes up the last time, referring to the BACKWARD UNIT 671 in Fig. 25E, the BOR RECOG single shot 662 returns to its OFF state causing a negative signal to be applied from its right-hand output to bring down the BOR RECOG line which condition is applied to turn OFF the BKSP AFTER W trigger 654 in Fig. 25D and to turn ON the 3 millisecond BKWD RESET DEL single shot 663. Referring now to the TAPE R CONTROL UNIT 687 in Fig. 25E, the negative shift on the BOR RECOG line is also applied via a negative shift input to turn OFF the DEL R CALL trigger 682 which, in being turned OFF, applies a negative signal from its right-hand output to bring down the DEL R CALL line. The negative shift on the DEL R CALL line passes via the OR circuit 622 in Fig. 25B to turn OFF the TU1 SEL trigger 620b.

Referring now to the CLOCK CONTROL UNIT 802 in Fig. 26D, the negative shift on the BOR RECOG line is applied via a negative shift input to turn OFF the LONG CLOCK trigger 834 which, in being turned OFF, applies a negative signal from its right-hand output via the OR circuit 826 to decondition the AND circuit 828 and thereby prevent any further cycling of the CLOCK 814 in Fig. 26B.

Referring now to Fig. 25E, the negative shift on the BOR RECOG line is also applied to turn OFF the DEL PKSP CALL trigger 656 which, in being turned OFF, applies a negative signal from its right-hand output to bring down the DEL PKSP CALL line. The negative shift on the DEL PKSP CALL line is applied to turn ON the 28 millisecond BKWD TO FWD DEL single shot 664 which, in being turned ON, applies a negative signal from its left-hand output to bring down the BKWD TO FWD DEL line. The negative signal on the DEL PKSP CALL line is also applied via the OR circuits 631 and 633 of the TAPE R STATUS UNIT 658 in Fig. 25C to bring down the SET R A line. The negative signal output of the OR circuit 631 also deconditions the AND circuit 635 causing a negative signal to be applied via the OR circuit 637 to bring down the START R line.

Referring now to the TAPE W CONTROL UNIT 720 in Fig. 25F, the negative signal now on the START R line deconditions the AND circuit 759 causing a negative signal to be applied via the OR circuit 713 to bring down the GO BUS A line to signal the SELECTED TAPE UNIT 1 to stop the backward movement of the TAPE.

*Step 12*

It should be noted that during the remainder of the BACKWARD TO FORWARD DELAY period, the negative signal on the $\overline{\text{BKWD TO FWD DEL}}$ line is effective to decondition the AND circuits 635 and 636 in Fig. 25C and the AND circuits 641 and 643 in Fig. 25D to block the START R and START W lines from being brought up which, in turn, blocks the GO BUS lines from being brought up to signal a SELECTED TAPE UNIT to start its TAPE moving. Consequently, the BACKWARD TO FORWARD DELAY period allows sufficient time for the SELECTED TAPE UNIT 1, when signalled, to be switched from the REVERSE condition to the FORWARD condition before the SELECTED TAPE UNIT can be signalled again to move in a FORWARD direction.

3 milliseconds later, referring to the BACKWARD RESET DEL single UNIT 671 in Fig. 25E, the BKWD RESET DEL single shot 663 returns to its OFF state causing a negative shift to be applied from its right-hand tapped output to turn OFF the BKWD trigger 658 which, in being turned OFF, applies a negative signal from its right-hand output to bring down the BKWD line and applies a positive signal from its left-hand output to bring up the $\overline{\text{BKWD}}$ line. The BKWD line in coming down signals the SELECTED TAPE UNIT 1 to switch from the REVERSE condition to the FORWARD condition.

Referring now to the CLOCK CONTROL UNIT 802 in Fig. 26D, the negative signal on the BKWD line is applied via the OR circuit 805 to the inverter 807 where it is inverted to a positive signal to bring up the $\overline{\text{BKWD+TU TO DC}}$ line which, in combination with the $\overline{\text{DC TO TU}}$ and $\overline{\text{W TM CALL}}$ line being up, passes via the AND circuit 842 and the OR circuit 844 to bring up the DC RDY line. The positive signal on the DC RDY line is applied to the SELECT ADDRESS DECODER 602 in Fig. 25A to effectively bring up the DC SEL & RDY lines to signal the CPU that the DATA COORDINATOR is no longer busy with a TAPE operation and thereby terminate this mode of operation.

BLOCK SYMBOL DETAILS

The block symbols which have been hereinbefore employed to simplify the description of the logical block diagrams of the DATA COORDINATOR have schematic circuit details which are shown in Figs. 35 to 66.

For convenient reference, all positive and negative supply sources are identified by a number cooresponding to their potential, for example, a supply terminal labeled 140V, indicates a 140 volt supply source. Further, the terminals in the schematic circuit details which correspond to the same terminals in the corresponding block symbol diagrams are identified by their equivalent position. Also, where the terms positive and/or negative potentials or shift of potentials are used, the terms refer to relative values, rather than values with respect to ground.

Throughout the description of the operation of the DATA COORDINATOR no reference has been made to passive elements such as cathode followers, level setters and the like. It should be obvious that the characteristics of these elements vary and are largely determined not only by the component load but also by the length of conductors coupling one component to another. Therefore, in a specific construction of a machine in accordance with the principles of the present invention, the passive elements may be used wherever and in any manner that is deemed necessary. However, in special cases, where the details of the passive elements are not obvious, as in particular types of amplifiers and drivers herein illustrated, the details will be described.

OR CIRCUIT—OR

Referring first to Fig. 25, there is illustrated a block symbol of a standard positive OR circuit and also the details of the circuit within the block.

A positive OR circuit functions to isolate two or more positive input signals from each other and to produce a positive output signal in response to a positive input signal at any or all of the input terminals thereof.

A standard positive OR circuit is composed of at least two diodes, the anodes of which are connected to the input terminals IN, while the cathodes of which are connected to the output terminal OUT and via a common resistor R to a −130 volt source. While only two input terminals have been shown in Fig. 35, it is to be understood that a positive OR circuit may have any number of input terminals so long as a diode is provided between each input terminal and the output terminal.

The standard positive OR circuit has been represented by a block symbol containing the alphabetic characters OR. The ohmic value of the common resistor R may vary depending upon circuit requirement and, therefore, is indicated in the lower right-hand corner of the block symbol.

Referring to Fig. 36, there is illustrated a cascaded OR circuit OR–C circuit and also the details of the circuit within the block. The operation of this circuit is identical to the standard OR circuit. However, to reduce the loading on the circuits which drive the OR circuits an additional diode is provided for each pair of input terminals. The anode of each additional diode is connected between the commonly connected cathodes of each pair of diodes and the output terminal. It is to be understood that a cascaded OR circuit may have inputs which exceed or which are less than those shown. If an odd number of inputs are required, an input terminal is connected via two diodes to the output terminal.

AND CIRCUIT—A

Referring to Fig. 37, there is illustrated a block symbol of a standard positive AND circuit and also the details of the circuit within the block.

A positive AND circuit functions to produce a positive output signal only when there is a coincidence of positive signals at all of the input terminals thereof.

It should be noted at this point that the positive input signals are not necessarily applied simultaneously to the input terminals of the positive AND circuit. Hence, in instances where positive signals are applied to all but one of the input terminals thereof, the circuit is said to be conditioned so that when a positive signal is applied to the remaining input terminal there is a coincidence of positive input signals causing the production of a positive output signal.

A standard positive AND circuit is composed of at least two diodes, the cathodes of which are connected to the input terminals IN, while the anodes of which are connected to the output terminal OUT and via a common resistor R to a +140 volt source.

The standard positive AND circuit has been represented by a block symbol containing the alphabetic character A. The ohmic value of the common resistor R in an AND circuit may vary depending upon circuit requirements and, therefore, its value is indicated in the upper right-hand corner of the block.

Referring to Fig. 38, there is illustrated an AND circuit A–B which operates in basically the same manner as the standard AND circuit A, except that it produces a somewhat smaller signal output. This is accomplished by having the output from a voltage divider consisting of the resistors R1 and R2, which replaces the resistor R of AND circuit A.

Referring now to Fig. 39, there is illustrated a block symbol of a cascaded AND circuit and also the details of the circuit within the block.

The cascaded AND circuit has the same logical operation as the conventional AND circuit previously described. The particular arrangement of diodes in the cascaded AND circuit is used for the same considerations described in conjunction with the cascaded OR circuit OR-C previously described.

It is to be understood that a cascaded AND circuit may have inputs which exceed or which are less than those shown.

The cascaded AND circuit has been represented by a block symbol containing the alphabetic characters A-C. The ohmic value of the common resistor R may vary depending upon circuit requirements and, therefore, its value is indicated in the upper right-hand corner of the block.

INVERTER—I

Referring now to Fig. 40, there is illustrated a block symbol of a standard inverter and also the details of the circuit within the block.

An inverter functions to produce an output signal having substantially the same wave shape as the input signal but of opposite polarity and with no appreciable time difference between the input signal and the output signal.

A standard inverter, which may comprise a 6211 tube, as indicated in Fig. 40, has its plate connected via a series circuit, comprising a 250 microhenry inductor, a 3K ohm resistor and a 3.3K ohm resistor, to a +140 volt source. A tapped output terminal (T) is connected to the junction of the 3K ohm and the 3.3K ohm resistors. The plate is also connected via a voltage divider network, comprising a 390K ohm resistor and a 430K ohm resistor, to a −130 volt source. Additionally, a compensating 8.2 micro-microfarad capacitor is connected in parallel with the 390K ohm resistor. The triode also includes a grid coupled via a 150 ohm resistor and a current limiting 22K ohm resistor, having a compensating 47 micro-microfarad capacitor connected in parallel therewith, to the input terminal IN and a cathode connected directly to ground. An output terminal OUT is tapped from the junction of the 3K ohm resistor and the 3.3K ohm resistor in the plate circuit.

The standard inverter has been represented by a block symbol containing the alphabetic character I.

Inverter I–1 of Fig. 41 operates in a similar manner to the standard inverter 1, but the plate resistor and positive voltage necessary for the operation of this inverter is found in the circuit to which it is connected. Inverter I–1 is a pull-over inverter which functions to pull a hold over single shot multivibrator, to be described hereinafter, to its ON state.

PEAKER—PKR

Referring now to Fig. 42, there is illustrated the block diagram of a peaker and also the details of the circuit within the block.

A peaker functions in response to a negative shift, to produce a positive output pulse having a very short duration but an extremely sharp leading edge.

The peaker may employ, for example, a triode tube, the plate of which is connected to a parallel RLC network and the output of which is taken from the plate of the triode. The grid is maintained at a slightly positive potential so that the triode is normally conducting a heavy current thereby maintaining the plate and the output terminal to which it is connected at a relatively negative potential. When a negative pulse or a negative shift of potential is applied to the grid of the triode, the triode is cut off and the plate current drops to zero with a resulting collapse of the magnetic field around the inductance in the plate circuit. However, in so doing, the change in magnetic field induces a voltage in the plate circuit inductance which tends to keep the current flowing. The induced voltage is of such a polarity that a sharp positive shift of potential appears at the plate of the triode and at the output thereof. The width of the pulse is dependent upon the inductance and the capacitance in the plate circuit while the amplitude of the pulse is largely dependent upon the amount of inductance in the plate circuit and the rate of change in current through the tube when it is cut off. The induced current in the plate circuit inductance begins to oscillate between the inductance and the capacitance in the plate circuit of the triode, but the triode itself provides sufficient damping so that the energy is damped out in the first period of the signal and only a single sharp positive pulse appears at the output thereof.

A standard peaker may employ a 5965 half tube having a plate connected via a series circuit, comprising a 1 millihenry inductor having a 22K ohm resistor and a diode connected in parallel therewith and a 3K ohm resistor to a +140 volt source. The junction of the 3K ohm resistor and the 1 millihenry inductor is connected via a .01 microfarad capacitor to ground. The triode also includes a grid connected via a 150 ohm resistor and a 68 micromicrofarad capacitor to an input terminal IN. The junction of the 150 ohm resistor and the 68 micro-microfarad capacitor is connected via a 100K ohm resistor to the junction of the 3K ohm resistor and the 1 millihenry inductor. Additionally, the triode includes a cathode which is connected directly to ground, while an output terminal OUT is coupled via a 330 micro-microfarad capacitor to the plate of the triode.

The peaker has been represented by a block symbol containing the alphabetic character PKR and a numerical designation, i.e., PKR–1. Additionally, the pulse width, in microseconds, of the output pulse is indicated in the lower right-hand corner of the block symbol.

Peaker PKR–2 shown in Fig. 43, operates basically in the same manner as the peaker PKR–1. The changes in the peaker PKR–2 are obvious from the respective figure and are well known to those skilled in the art. Consequently, no detailed description thereof is believed necessary. Peaker PKR–2 is a pulse forming peaker which is used to generate pulses at various points in the machine. Additionally, positive shifts of potential at the input are clamped out by the diode to ground and by the diode to the grid resistor. The pulse forming peaker PKR–2 responds to a negative shift of potential to produce a positive output signal. The pulse width, in microseconds, of the output pulse from the above unit is indicated in the lower right-hand corner of the block symbol.

TRIGGER—T

Referring now to Fig. 44, there is illustrated a block symbol of a standard electronic trigger and also the details of the circuit within the block.

A trigger, commonly known as the Eccles-Jordan trigger, functions as a storage or control device inasmuch as it is a bistable device, that is, one that remains in either one of two stable states until it is forced or triggered by an input signal to assume the other state, each subsequent input signal being effective to turn the trigger to the opposite state.

The trigger may comprise a cross-coupled dual triode, that is, the plate of the right-hand tube is resistively coupled via a voltage divider network to the grid of the left-hand tube, while the plate of the left-hand tube is resistively coupled via a voltage divider network to the grid of the right-hand tube. Therefore, any changes in potential at the plates of the dual triode are coupled to the grids of the opposite tubes. One stable state of the trigger is termed the OFF state and exists when the right-hand tube is in a conductive state while the left-hand tube is in a non-conductive state. In this state, the plate of the right-hand tube is at a relatively negative potential while the plate of the left-hand tube is at a relatively positive potential. If a negative pulse or negative shift of potential is applied to the grid of the right-hand tube, the right-hand tube is forced or triggered to a nonconductive state with a resulting positive shift of potential occurring at the plate thereof which is coupled via the voltage divider cross coupling to the grid of the left-hand tube so that the left-hand tube is triggered to a conductive state with a resulting negative shift of potential occurring at the plate thereof. This is the other stable state of the trigger and is termed the ON state. Some triggers may be set to the ON state by applying a positive pulse or positive shift of potential to the grid of the nonconducting left-hand tube. This causes the left-hand tube to be triggered to a conductive state with a resulting negative shift of potential occurring at the plate thereof, which is coupled via the voltage divider cross coupling to the grid of the conducting right-hand tube so that the right-hand tube is triggered to a nonconductive state. In a similar manner, when a trigger is in the ON state it may be triggered to the OFF state by the application of a negative pulse or a negative shift of potential at the grid of the left-hand tube or a positive pulse or a positive shift of potential at the grid of the right-hand tube. Outputs are tapped from the plate circuit resistance of both tubes and from other voltage divider networks connected to the plates of the dual triode. Consequently, upon setting the trigger to the ON state, positive shifts of potential occur at the outputs associated with the right-hand tube while negative shifts of potential occur at the outputs associated with the left-hand tube and vice versa when the trigger is placed in the OFF state.

A standard trigger may comprise a dual triode of the 6211 type having each plate connected via a voltage divider network comprising an 82K ohm resistor, a 62K ohm resistor and a 47K ohm resistor, to a −130 volt source. The junction of the 82K ohm resistor and the 62K ohm resistor in each voltage divider network is connected via a 150 ohm resistor to the respective grids of the dual triode. Additionally, a 15 micro-microfarad capacitor is connected in parallel with each of the 82K ohm resistors. A terminal IN is connected to each junction. Each plate of the dual triode is connected via a serial circuit, comprising a 750 microhenry inductor, a 3.9K ohm resistor and a 4.3K ohm resistor, to a +140 volt source. The right-hand output terminal (T) is tapped from the junction of the 4.3K ohm resistor and the 3.9K ohm resistor associated with the right-hand tube, while the left-hand output terminal (T) is tapped from the junction of the 4.3K ohm resistor and the 3.9K ohm resistor associated with the left-hand tube. Each plate of the dual triode is also connected via a voltage network, comprising a 390K ohm and a 470K ohm resistor, to a −130 volt source. An 8.2 microfarad capacitor is connected in parallel with the 390K ohm resistor in each voltage divider network. Additionally, output terminals OUT are connected to the junction of the 390K ohm resistor and the 470K ohm resistor in each voltage divider network. The left-hand grid is connected via one of the 150 ohm resistors to the cathode of a diode, the anode of which is connected to a −12 volt terminal. The right-hand grid is connected via the other 150 ohm resistor to the cathode of a diode, the anode of which is connected to a terminal labeled X or R, which is connected either to the POWER ON/MANUAL RESET lead (X) or the RESET AC 112 or RESET AC 124 leads previously described. Each trigger having an X in its lower right-hand corner is initially reset to the OFF condition by a positive pulse on the POWER ON/MANUAL RESET lead (X) while the triggers having an R in their lower right-hand corner are reset by a positive pulse on the RESET AC line 112 or RESET AC 124 line as shown.

The standard trigger has been represented by a block symbol diagram containing the alphabetic characters TA. Trigger TB shown in Fig. 45 operates basically in the same manner as the standard trigger TA. The difference between triggers TA and TB are obvious and consequently no detailed description thereof is believed necessary.

Referring now to Fig. 46, there is illustrated a block symbol of a standard contact operated trigger TC and also the details of the circuit within the block. The contact operated trigger TC resembles the standard trigger TA in that it is a bistable device, but differs therefrom in that the switching from one state to the other is always controlled by a shift in potential at the grid of the left-hand tube. When the potential at the grid of the left-hand tube reaches a particular value, switching action takes place and the trigger is set to the ON state, that is, with the left-hand tube in a conductive state and the right-hand tube in a non-conductive state so that the potential at the output of the trigger is switched to a relatively positive value. The contact operated trigger remains in this state until the mechanical device is deactuated whereupon a negative shift of potential is applied to the grid of the left-hand tube causing the trigger to be reset back to the OFF state.

Referring now to Fig. 47, there is illustrated a block symbol of a Schmitt type trigger TS and also the details of the circuit within the block.

The Schmitt trigger functions as a control device and operates in a similar manner as the contact operated trigger TC except that it is not operated by a mechanical device. When a positive shift of potential is applied to the grid of the left-hand tube, the potential at the grid rises and when it reaches a certain level, switching action takes place and the trigger is set to the ON state bringing up the output to a relatively positive potential. When the potential at the grid of the left-hand tube drops down to a certain level, not necessarily the same level which turned it ON, switching action again takes place and the trigger is turned OFF bringing down the output to a relatively negative potential.

SINGLE SHOT MULTIVIBRATOR—SS

Referring now to Fig. 48, there is illustrated a block symbol of a standard single shot multivibrator and also the details of the circuit within the block.

A single shot multivibrator functions to produce positive and/or negative rectangular wave shaped signals of predetermined time duration.

The single shot multivibrator resembles the standard trigger in that it may be triggered to the ON state by an input signal, but differs therefrom in that it automatically returns to the OFF state after a predetermined period of time without requiring a subsequent input signal.

The single shot multivibrator may comprise a cross coupled dual triode, that is, the plate of the right-hand tube is resistively coupled via a voltage divider network to the grid of the left-hand tube, while the plate of the left-hand tube is capacitively coupled to the grid of the right-hand tube. Additionally, an RC network is connected to the grid of the right-hand tube which is used to control the time duration of the ON state of the single shot multivibrator and an input circuit is connected to the grid of the left-hand tube. The grids of the dual triode are so biased that the single shot multivibrator is normally in the OFF state, that is, with the left-hand tube in a non-conductive state and the right-hand tube in a conductive state. If a positive shift of potential is applied via the input circuit to the grid of the left-hand tube, switching action occurs, as in the standard trigger, and the single shot multivibrator is set to the ON state with a resulting negative shift of potential occurring at the plate of the left-hand tube and a positive shift of potential occurring at the plate of the right-hand tube. The single shot multivibrator remains in the ON state for a period of time dependent upon the time constant of the RC network associated with the grid of the right-hand tube. The capacitance of the RC network, connected to the grid of the right-hand tube, starts to charge through its associated resistance causing the potential at the grid of the right-hand tube to rise toward a relatively positive value. When the potential reaches a slightly positive value the right-hand tube begins to conduct once more and switching action takes place causing the single shot multivibrator to be reset to the OFF state. The time duration of the ON state of the single shot multivibrator can be varied by varying the values of the resistance and capacitance in the RC network connected to the grid of the right-hand tube. Outputs are tapped from the plate circuit resistance of both tubes and from other voltage divider networks connected to the plates of the dual triode. Consequently, as with the standard trigger, upon setting the single shot multivibrator to the ON state, positive shifts of potential occur at the outputs associated with the right-hand tube, while negative shifts of potential occur at the outputs associated with the left-hand tube and vice versa when the single shot multivibrator is reset back to the OFF state.

A standard single shot multivibrator may comprise a dual triode of the 6211 type. The plate of the left-hand tube is connected via a series circuit, comprising two 6.2K ohm resistors, to a +140 volt source and via a voltage divider network, comprising a 390K ohm resistor and a 430K ohm resistor, to a −130 volt source. An output terminal (T) is tapped from the junction of the two 6.2K ohm resistors. A 10 micromicrofarad capacitor is connected in parallel with the 390K ohm resistor and an output terminal OUT is connected to the junction of the voltage divider network. The plate of the left-hand tube is also cross coupled via a 15 micro-microfarad capacitor and a 150 ohm grid resistor to the grid of the right-hand tube. The plate of the right-hand tube is connected via a series circuit, comprising a 5.1K ohm resistor, a 6.8K ohm resistor and an 8.2K ohm resistor, to a +140 volt source. An output terminal (T) is tapped from the junction of the 8.2K ohm resistor and the 6.8K ohm resistor. The junction of the 6.8K ohm resistor and the 5.1K ohm resistor is connected via a voltage divider network, comprising a 430K ohm resistor and a 470K ohm resistor, to a −130 volt source. A 10 micromicrofarad capacitor is connected in parallel with the 430K ohm resistor and an output terminal OUT is connected to the junction of the voltage divider network. The plate of the right-hand tube is also cross coupled via a parallel network, comprising a 330K ohm resistor and a 15 micromicrofarad capacitor, and a 150 ohm grid resistor to the grid of the left-hand tube. The cathodes of the dual triode are interconnected and coupled via a series circuit, comprising a 2.4K ohm resistor and a 7.5K ohm resistor, to a −60 volt source. The grid resistor of the left-hand tube is connected via a 220K ohm resistor to the −60 volt source, while the grid resistor of the right-hand tube is connected via a parallel circuit, comprising a 1.8 megohm timing resistor and a 47 micromicrofarad capacitor to the junction of a voltage divider network, comprising a 100K ohm resistor connected to the −60 volt source and an 82K ohm resistor connected to a +140 volt source. The junction of the left-hand grid resistor and the 220K ohm resistor is connected via a diode to the junction of the 2.4K ohm resistor and the 7.5K ohm resistor in the cathode circuit and via a 47 micromicrofarad capacitor and a 39 micromicrofarad capacitor to the input terminal IN. The junction of the 39 micromicrofarad capacitor and the 47 micromicrofarad capacitor is connected via a parallel circuit comprising a diode and a 100K ohm resistor to ground. Although almost all of the elements in the circuit effect the timing to a greater or less extent, the 1.8 megohm resistor and the 47 micromicrofarad capacitor associated with the grid of the right-hand tube are the components used to vary the timing.

The single shot multivibrator has been represented by a block symbol containing the alphabetic characters SS, and a sign designation to indicate the sign of the pulses which operate it, i.e., SS+. Additionally, the time duration N of the output pulse from the single shot multivibrator is indicated at the bottom of the block. A μs after the number indicates the time duration in microseconds, and an Ms indicates the time duration in milliseconds.

Single shot multivibrator SS− shown in Fig. 49, is similar in circuitry to the standard single shot multivibrator SS+ except that the capacitor associated with the grid of the right-hand tube is not connected in parallel with the 1.8 megohm resistor but via an input circuit to an input terminal IN, with the result being that the single shot multivibrator SS− may be triggered by negative input pulses.

Single shot multivibrator SSD shown in Fig. 50, is a holdover single shot multivibrator which is driven by a pull over I–1 heretofore described. Generally, a series of input pulses are applied to the holdover single shot multivibrator SSD having a pulse repetition rate which is greater than the time duration of the multivibrator. Thus, when the first pulse is applied thereto, the multivibrator is switched to the ON state and remains in such state as long as the series is applied thereto. When the input pulses cease, the capacitance in the RC network, associated with the grid of the right-hand tube, starts to charge up until the right-hand tube conducts whereupon the multivibrator SSD is switched back to the OFF state.

DIODE GATE—DG

Figure 51:
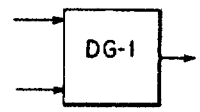

Referring now to Fig. 51, there is illustrated a positive diode gate and also the details of the circuit within the block.

This type of diode gate is composed of a 22 μμf. capacitor, one terminal of which is connected to the input terminal C–IN while the other terminal of which is connected via a diode D1 to the input terminal D–IN and via a diode D2 to the output terminal OUT and via a 33K ohm resistor to a −12 volt source. The output of the diode gate is clamped to ground by a diode D3. The terminal D–IN is normally biased so that the diode D1 is conducting heavily and the output terminal OUT is at a relatively negative potential. If a positive pulse is applied to the input terminal C–IN it is swamped out by the heavily conducting diode D1. However, if a positive signal is applied to the input terminal D–IN the potential at the cathode of the diode D1 is raised to a more positive value causing the diode D1 to be cut off and the gate is said to be conditioned. Now if a positive pulse is applied to the input terminal C–IN, it instantaneously appears at the output terminal, as the potential across a capacitor cannot change instantaneously, causing the output to swing sharply from a relatively negative potential to ground potential. Thus, it is apparent that this type of diode gate functions as a two way AND circuit, and therefore will generate a sharp positive shift of potential or spike.

This type of positive gate has been represented by a block symbol containing the alphabetic character DG and a numeric designation i.e. DG–1.

STANDARD TRIGGER INPUTS

In order to increase the versatility of triggers, a variety of input circuits have been devised to be utilized with triggers. In general, an input circuit may be described as being either a positive D.C. input circuit, a negative shift input circuit or a self-gated binary input circuit.

A positive D.C. input circuit functions to pass a positive shift of potential to an input terminal of the trigger to which it is connected. Thus, if a positive D.C. input circuit is connected to the side of the trigger which is not conducting, the positive shift of potential will raise the potential at the grid of the tube on this side causing the tube to conduct and the trigger to shift from is present state to its opposite state. A positive D.C. input circuit may be connected to either or both input terminals of the trigger.

A negative shift input circuit functions to pass a negative shift of potential to an input terminal of the trigger to which it is connected. Thus, if a negative shift input circuit is connected to the side of the trigger which is conducting, the negative shift of potential will lower the potential at the grid of this tube on this side causing the tube to be cut off and the trigger to shift from its present state to its opposite state. A negative shift input circuit may be connected to either or both input terminals of the trigger.

A self-gated binary input circuit is connected to both input terminals of the trigger and functions to pass a negative shift of potential to that side of the trigger which is conducting thereby shifting the trigger from one state to the other regardless of its previous state. For example, if the trigger is in the OFF state and is fed a pulse through a self-gated binary input circuit the trigger will shift to the ON state. If another pulse is then applied to self-gated binary input, the trigger will shift back to the OFF state.

Figure 52:
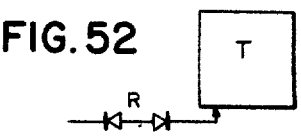

Referring now to Fig. 52, there is illustrated a block symbol of a single positive D.C. input circuit and also the details of the circuit within the block.

A single input circuit is composed of a one-way AND circuit, which is clamped to ground, and an isolating diode. The input terminal of the single input circuit is normally at a negative potential and, therefore, the diode to which it is connected is in a conductive state. If a negative shift of potential is applied to the one-way AND circuit, conduction through the diode increases causing the potential at the output of the one-way AND circuit to drop, which drop in potential is applied to the anode of the isolating diode and is of such a magnitude as to maintain the isolating diode cut off, thereby isolating the input terminal of the trigger from negative shifts of potential. However, if a positive shift of potential is applied to the one-way AND circuit, its diode is cut off and the potential at the output of the one-way AND circuit and at the anode of the isolating diode starts to rise toward ground potential. When the potential reaches a value corresponding to that existing at the cathode of the isolating diode, the isolating diode conducts and the potential at the input terminal of the trigger, which is connected to the cathode of the isolating diode, then follows the rise in potential occurring at the anode of the isolating diode. If the input circuit is connected to the conductive side of the trigger the rise in potential has no effect thereon as the tube associated therewith is in a conductive state. However, if the input circuit is connected to the non-conductive side of the trigger the rise in potential causes the trigger to shift to the opposite state from which it is presently set.

A single input circuit is composed of two diodes D1 and D2, the cathode of the diode D1 being connected to the input terminal IN while the cathode of the diode D2 is connected directly to ground. The anodes are coupled via a common resistor R to a +140 volt source and via an isolating diode D3 to either terminals of the trigger.

Figure 53:
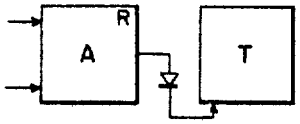

Referring now to Fig. 53, there is illustrated a block symbol of a +AND positive D.C. input circuit and also the details of the circuit within the block.

A +AND positive D.C. input circuit consists of a two-way positive AND circuit, which is clamped to ground, and an isolating diode. It operates in a similar manner as the single input circuit except that it requires a coincidence of positive signals at the inputs of the two-way positive AND circuit before it passes a positive shift of potential to cause the trigger to shift from its present state to its opposite state.

Figure 54:
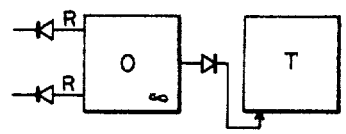

Referring now to Fig. 54, there is illustrated a block symbol of a +OR positive D.C. input circuit consisting of a two-way positive OR circuit and two clamping diodes. Such an arrangement permits the trigger to be turned ON when a positive signal is applied to either or both of the inputs thereof.

Figure 55:
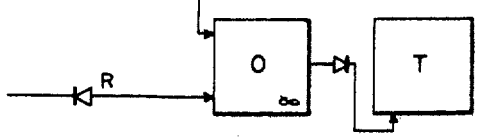

Referring now to Fig. 55, there is illustrated a block symbol arrangement of a positive D.C. input circuit, consisting of a positive OR circuit fed by a single input and positive AND circuit, and also the details of the circuit within the block. The operation of these individual units have been described hereinbefore. Consequently, no detailed description of this type of positive D.C. input circuit is believed necessary.

Referring to Fig. 56, there is illustrated a block symbol arrangement of a positive D.C. input circuit, consisting of a positive OR circuit fed by a pair of positive AND circuits. Since the operation of these individual units have been described hereinbefore, no detailed description is believed necessary.

Figure 57:
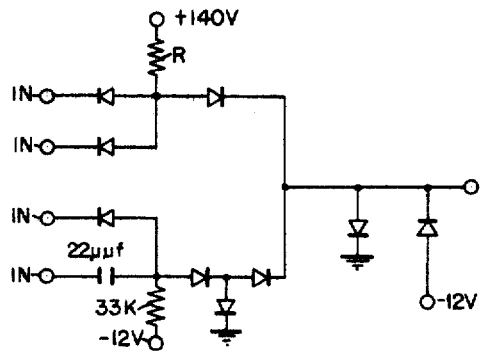

Referring now to Fig. 57, there is illustrated a block symbol arrangement of a positive D.C. input circuit, consisting of a positive OR circuit fed by a positive AND circuit and a positive diode gate. Since the operation of these individual units have been described hereinbefore, no detailed description is believed necessary.

Figure 58:
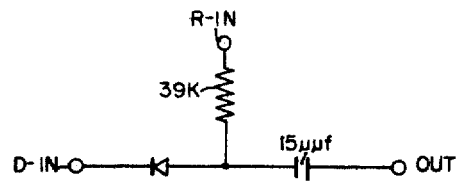

Referring now to Fig. 58, there is illustrated a block symbol of a negative diode gate input circuit and also the details of the circuit within the block.

A negative diode gate, if properly conditioned, functions to produce a sharp negative output pulse or spike in response to a negative shift of potential.

The negative diode gate is composed of a diode, the cathode of which is connected to the input terminal thereof, while the anode of which is connected via a capacitor to the output terminal thereof and via a resistor R to a supply terminal thereof. The supply and input terminals are normally biased so that the diode is cut off and the output terminal is at a potential determined by the circuit to which it is connected. If a positive pulse is applied to the input terminal, the potential at the cathode is driven more positive, thereby maintaining the diode in a cut off condition. If a positive signal is applied to the supply terminal, the potential at the anode is raised to a more positive value causing the diode to conduct and the gate is said to be conditioned. Now, if a positive pulse is applied to the input terminal, the positive shift of potential at the leading edge of the pulse raises the potential at the cathode to a more positive potential than that existing at the anode and the diode is cut off. The potential at the anode then rises exponentially to approximately that value existing at the input terminal, whereupon the diode again conducts and the potential at the anode stops rising and is maintained at the value existing at the input terminal. When the negative shift of potential at the trailing edge of the positive input pulse appears at the input terminal, it instantaneously appears at the anode of the diode as the resistance across a conducting diode is negligible. Further, since the potential across a capacitor cannot change instantaneously, the potential at the output terminal has the same instantaneous negative shift of potential and then rises rapidly to its quiescent state. Thus, it is apparent that if the diode gate is properly conditioned, it will generate a sharp negative pulse or spike in response to a negative shift in potential.

A negative diode gate is composed of a diode, the cathode of which is connected to the input terminal D–IN and the anode of which is connected via a 15 micro-microfarad capacitor to the output terminal OUT and via a 39K ohm resistor to the supply terminal R–IN.

The negative diode gate has been represented by a block symbol containing the alphabetic characters DG and a numerical designation, i.e. DG–2.

Figure 59:
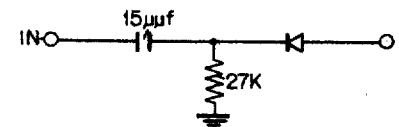

Referring now to Fig. 59, there is illustrated a block symbol of a negative shift input circuit and also the details of the circuit within the block.

A negative shift input circuit consists of a differentiating circuit and an isolating diode. If a positive shift of potential is applied to the differentiating circuit, a sharp positive pulse occurs at the output thereof which is applied to the cathode of the isolating diode and is of such a magnitude as to maintain the isolating diode cut off, thereby isolating the input terminal of the standard trigger T from positive shifts of potential. However, if a negative shift of potential is applied to the differentiating circuit, a sharp negative pulse, occurring at the output thereof, is applied to the cathode of the isolating diode. When the potential at the cathode drops to a value corresponding to that existing at the anode of the isolating diode, the isolating diode conducts and the potential at the input terminal of the trigger, which is connected to the anode of the isolating diode, then follows the drop in potential occurring at the cathode of the isolating diode. If the input circuit is connected to the non-conductive side of the trigger, the drop in potential has no effect thereon as the tube associated therewith is in a non-conductive state. However, if the input circuit is connected to the conductive side of the trigger, the drop in potential causes the trigger to shift to the opposite side from which it is presently set.

A negative shift input circuit is composed of a differentiating circuit, including a 15 micro-microfarad capacitor and a 27K ohm resistor, and an isolating diode.

Figure 60:
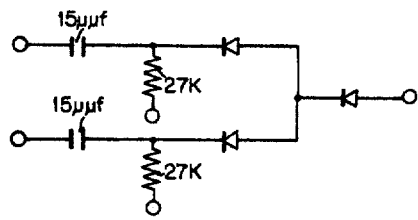

More than one negative shift input circuit may be used at either or both input terminals of a trigger, the only restriction being that only one diode shall be connected to the input terminal of the trigger. Consequently, Fig. 60 shows a block symbol of a multiple negative shift input circuit and also the details of the circuit within the block.

Figure 61:
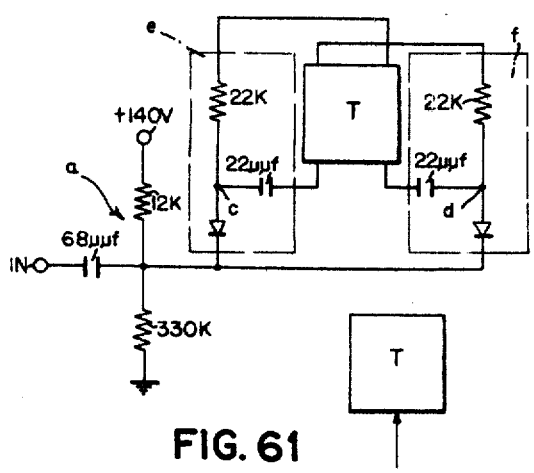

Referring now to Fig. 61, there is illustrated a block symbol of a self-gated binary input circuit and also the details of the circuit within the block. A self-gated binary input circuit is recognized by the fact that the trigger has a lead entering the center of the bottom line of the block symbol.

A self-gated binary input circuit consists of a differentiating circuit $a$ and two diode gates $e$ and $f$. Normally, the voltage at the junction $d$ is about plus 135 volts, but when a 30 volt negative shift of potential is applied to the self-gated binary input circuit, the voltage at the junction $b$ drops to plus 105 volts. When the trigger is in the OFF state, the potential at the junction $c$ is about plus 132 volts while the potential at the junction $d$ is about 94 volts. Therefore, the diode associated with the diode gate $e$ cannot conduct while the diode associated with the diode gate $f$ will conduct. Thus, a negative shift of potential is applied to the grid of the right-hand conducting tube causing it to be cut off and the trigger to shift to the ON state. The conditions of the diode gates are now reversed and the next pulse applied to the self-gated binary input circuit causes the trigger to shift back to the OFF state. Thus, a self-gated binary input circuit allows a trigger to be shifted with each negative input pulse regardless of its previous state.

SENSE AMPLIFIER—SA

Referring to Fig. 62, there is illustrated a block symbol of a sense amplifier and also the details of the circuit within the block.

A sense amplifier functions to amplify the signals applied to the sense wires of the MEMORY 50.

Due to the fact that the sense wires of the MEMORY 50 passes through the MEMORY CORES in a checkerboard fashion, the signals applied to the sense wires are either positive or negative depending on which core is selected. Because of this, the signal on the sense wire must be rectified before being amplified. Therefore, the signal on the sense wire is applied to the primary windings of a transformer T, the secondary windings of which are connected to a full wave rectifier well known in the art. The rectified signal appears across the 10K ohm resistor and is then fed through a first and second stage of amplification, utilizing 6136 type pentodes, to a cathode follower utilizing a 5965 type triode, where it appears at the output terminal OUT.

The standard sense amplifier has been represented by a block symbol containing the alphabetic characters SA.

Fig. 63 is a plot of signal amplitude induced in a sense wire SW of a bit plane of the MEMORY 50 versus time. It will be remembered, as explained in the section on MEMORY OPERATION, that reading out of the MEMORY 50 is accomplished by driving the SELECTED MEMORY CORES to negative saturation. The flux created by those MEMORY CORES which are in the 1 state, corresponding to a 1 bit, induce a relatively large pulse in the sense wire SW while the flux created by those MEMORY CORES which are in the 0 state, corresponding to a 0 bit, induce a relatively small pulse in the sense wire SW. Also, since the sense wire SW is bipolar, most of the flux created by those MEMORY CORES which are half selected is cancelled so that only a relatively small pulse is induced in the sense wire SW due to the half selected CORES. Therefore, by the time, the 1 bit pulse reaches its peak the 0 bit pulse and the $\Sigma$HS pulse has returned to zero amplitude. This fact is utilized, by having the output of the sense amplifier sampled only during the period of the peak of the 1 bit pulse so that the presence of a pulse during the sampling period indicates a 1 bit while the absence of a pulse during the sampling period indicates a 0 bit.

SWITCH CORE DRIVER—SD

Referring to Fig. 64, there is illustrated a block symbol of a switch core driver and also the details of the circuit within the block.

A switch core driver functions to power amplify the a voltage pulse to produce a current driving pulse of a constant current level for operating the switch core.

A signal applied to the input terminal IN is amplified by the memory reference amplifier comprising a 5965 type triode. The amplified signal is taken from the plate of the 5965 triode and applied via a .01 microfarad capacitor to the memory pulse amplifier comprising a 5965 type triode where it is further amplified and transmitted from the plate of the 5965 triode via a .01 microfarad capacitor to a cathode follower comprising two 6350 type triodes connected in parallel. The signal is now taken from the cathode of the cathode follower and fed to a driver amplifier comprising two 5998 tubes connected in parallel. The amplified current through the driver amplifier is then sent through a row or column of switch cores as in Figs. 20A and 20E to keep the current through the switch cores constant, two degenerative feedback circuits are provided in the switch core driver. If the current through the switch cores tends to vary in one direction of polarity, the voltage at the cathode of the memory pulse amplifier to which it is connected will vary in the opposite direction of polarity with respect to the grid, acting in opposition to the signal, and thus tending to keep the current through the cores constant. The cathode of the cathode follower is also connected via a 10 micro-microfarad capacitor to the cathode of the memory reference amplifier and acts as a degenerative feedback to aid in keeping the current constant.

The standard switch core driver has been represented by a block symbol containing the alphabetic characters SD.

INHIBIT DRIVER—ID

Referring to Fig. 65, there is illustrated a block symbol of an inhibit driver and also the details of the circuit within the block.

An inhibit driver functions to power amplify a voltage pulse to produce a current driving pulse of a constant current level for controlling the writing of 1 bits or 0 bits in the MEMORY CORES of the MEMORY 50. The operation of the inhibit driver is similar to that of the switch core driver of Fig. 63 and the differences of details are readily apparent from the drawings. Consequently no detailed description is believed necessary.

The standard inhibit driver has been represented by a block symbol containing the characters ID.

READ AMPLIFIER—RA

Referring to Fig. 66, there is illustrated a block symbol of a read amplifier and also the details of the circuit within the block.

A read amplifier, in this machine, functions to convert a bipolar 1 bit signal read from a SELECTED TAPE to a unipolar 1 bit signal after which it is amplified to produce a negative pulse at the output thereof.

When a TAPE write operation is to be performed, the DEL R CALL line is down causing a negative signal to be applied via a pair of inverters 70 and 72 to decondition the grounded grid amplifier 74 thereby preventing any information that may be sensed by the read winding of the R/W head performing the TAPE write operation and appearing on either the R BUS A or R BUS B from passing via the read amplifier. On the other hand, when a TAPE read operation is being performed, the DEL R CALL line is up causing a positive signal to be applied via the pair of inverters 70 and 72 to condition the grounded grid amplifier 74, thereby allowing information that is sensed by the read winding of the R/W head performing the TAPE read operation and appearing on either the R BUS A or R BUS B to be amplified.

When a TAPE read while writing operation is to be performed, information read from one SELECTED TAPE is transferred via an R BUS, for example, R BUS A to a read amplifier while information being concurrently written on another SELECTED TAPE is sensed by the read winding of the R/W head performing the TAPE write operation and is transferred via the other R BUS, namely, R BUS B to the read amplifier. Also, since a TAPE reading operation is also being performed, the DEL R CALL line is up to effectively condition the grounded grid amplifier 74 to allow information on the R BUS B to be amplified. However, to prevent information on the R BUS A from passing to the grounded grid amplifier 74 a pair of inputs, BLOCK R A and BLOCK R B, are provided for controlling the operation of the read amplifier. Thus, when the SELECTED TAPE UNIT performing the TAPE read operation is set to the READ STATUS, a negative signal is applied to the BLOCK R A line whereas when the SELECTED TAPE UNIT performing the TAPE write operation is set to the WRITE STATUS, a positive signal is applied to the BLOCK R B line and vice versa if it were desired to read from R BUS B, in a manner as previously described in the section on the DC TO TU & TU TO DC mode of operation.

The negative signal on the BLOCK R A line is inverted to a positive signal by the inverter 76 to effectively condition the inverter 78 to pass a 1 bit signal applied to the R BUS A. At the same time, the positive signal on the BLOCK R B line is inverted to a negative signal by the inverter 80 to effectively decondition the inverter 82 and thereby block the 1 bit signal applied to the R BUS B from passing therethrough. The 1 bit signal output of the inverter 78 is applied to the cathode follower OR circuit 84 from which it is applied to the voltage amplifier 86 and then to a phase inverter comprising triodes 88 and 89. Since the polarity of the 1 bit signals are alternately positive and negative, the phase inverter operates to make the signals unipolar so as to produce a positive pulse at the cathodes of the triodes 89 regardless of the polarity of the signals on the R BUS A. The positive pulse is applied to the grounded grid amplifier 74 causing a positive signal to be applied to the amplifier 92 which produces a negative signal at the output thereof corresponding to the 1 bit signal on the R BUS A.

The standard read amplifier has been represented by a block symbol containing the alphabetic characters R A.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention.

It is the intention therefore, to be limited only as indicated by the scope of the following claims.

What is claimed is:

1. In a data handling system, a first storage device, a second storage device, a tape unit, means for driving said tape unit, means for transferring information between said first storage device and said tape unit, means for initiating the operation of said tape driving means including means for delaying the operation of said information transfer means for a period after the initiation of the operation of said tape driving means to allow said tape unit to attain its operating speed and means for transferring information between said storage devices during said period of delay.

2. In a data handling system, a first storage device, a second storage device, means for transferring data between said storage devices, a tape unit, means for transferring data between said first storage device and said tape unit, means for driving said tape unit, means for simultaneously initiating the operation of said first mentioned data transfer means and said tape driving means, means for delaying the operation of said second mentioned data transfer means for a period after the initiation of the operation of said tape driving means to allow said tape unit to attain its operating speed.

3. In a data handling system, a source of data, a storage device, means for transferring data from said source to said storage device, a write tape unit, means for transferring data from said storage device to said write tape unit, means for driving said write tape unit, means for simultaneously initiating the operation of said first data transfer means and said tape driving means and means for delaying the operation of said second mentioned data transfer means for a period after the initiation of the operation of said tape driving means to allow said tape unit to attain its operating speed, during which period the data transfer from said source to said storage device is completed.

4. In a data handling system, a first storage device having information stored therein, a second storage device, a tape unit, means for driving said tape unit, means for transferring information from said tape unit to said first storage unit, means for initiating the operation of said tape driving means including means for delaying the operation of said information transfer means for a period after the initiation of the operation of said tape driving means to allow said tape unit to attain its operating speed and means for transferring information from said first storage device to said second storage device during said period of delay.

5. In a data handling system, a first storage device having information stored therein, a second storage device, means for transferring information from said first storage device to said second storage device, a read tape unit having information stored therein, means for transferring information from said read tape unit to said first storage device, means for driving said read tape unit, means for simultaneously initiating the operation of said first information transfer means and said tape driving means and means for delaying the operation of said second mentioned information transfer means for a period after the initiation of the operation of said tape driving means to allow said read tape unit to attain its operating speed, during which period the information transfer from said first storage device to said second storage device is completed.

6. In a data handling system, a first tape unit, means for driving said first tape unit, a storage device, first means for transferring data from said storage device to said first tape unit, means for initiating the operation of said driving means including means for delaying the operation of said first data transfer means for a first predetermined period after the initiation of the operation of said tape driving means to allow said first tape unit to attain its operating speed, a second tape unit having data stored therein, means for driving said second tape unit, second means for transferring data from said second tape unit to said storage device, means for initiating the operation of said second mentioned driving means during said first predetermined period including means for delaying the operation of said second data transfer means for a second predetermined period after the initiation of the operation of said second mentioned tape driving means to allow said second tape unit to attain its operating speed, said second predetermined period terminating after said first predetermined period so that only said first data transfer means is effective during the period from the termination of said first predetermined period to the termination of said second predetermined period and means for controlling said first and second data transfer means to operate concurrently after the termination of said second predetermined period.

7. In a data handling system, a first storage device, a second storage device having information stored therein, a first tape unit, means for driving said first tape unit, means for transferring data from said first storage device to said first tape unit, means for initiating the operation of said tape driving means including means for delaying the operation of said data transfer means for a first predetermined period after the initiation of the operation of said tape driving means to allow said first tape unit to attain its operating speed, means for transferring data from said second storage device to said first storage device during said first predetermined period, a second tape unit having data stored therein, means for driving said second tape unit, means for transferring data from said second tape unit to said first storage device means for initiating the operation of said second mentioned driving means operable during said first predetermined period including means for delaying the operation of said last mentioned data transfer means for a second predetermined period after the initiation of the operation of said second mentioned tape driving means to allow said second tape unit to attain its operating speed, said second predetermined period terminating after said first predetermined period so that only said second mentioned data transfer means is effective during the period from the termination of said first predetermined period to the termination of said second predetermined period and means for controlling said last two mentioned transfer means to operate concurrently after the termination of said second predetermined period.

8. In combination, a magnetizable member, recording means, means energized to feed said magnetizable member past said recording means at a certain speed, means conditioning said recording means to record data representations on the said magnetizable member as it is fed, a storage device for storing data representations, signal means emitting data representations, means controlling transfer of data representations from said signal source to said magnetizable member, said last named means including means to first energize said feed means, means rendering said conditioning means inoperative for a fixed period after said feed means is first energized until said tape is being fed at said certain speed, means transferring data representations from said signal source to said storage device during said fixed period and means reading data representations from said signal source to said recording means after said fixed period.

9. In combination, a record medium having data representations recorded thereon, reading means, means energized to feed said record medium past said reading means at a certain speed, means conditioning said reading means to read data representations from said record medium as it is fed, a storage device having data representations stored therein, a data processing device, means controlling transfer of data representations from said record medium to said storage device and from said storage device to said data processing device, said last named means including means to first energize said feed means, means rendering said conditioning means inoperative for a fixed period after said feed means is first energized until said tape is being fed at said certain speed, means reading data representations from said storage device to said processing device during said fixed period and means transferring data representations from said reading means to said storage device after said fixed period.

10. In combination, a record medium having data representations recorded thereon, reading means, means capable of being energized to feed said record medium past said reading means at a certain speed, means conditioning said reading means to read said data representations from said record medium as it is fed, a storage device having data representations stored therein, a data processing device, means controlling transfer of data representations from said record medium to said storage device and from said storage device to said data processing device, said last named means including means to initiate transfer of data from said storage device to the processing device, means first energizing said feed means during the transfer of data from said storage device to the processing device, means rendering said conditioning means inoperative for a fixed period after said feed means is first energized, and means transferring data representations from said reading means to said storage device after said fixed period.

11. In combination, a first tape storage medium, recording means, means energized to feed said first tape storage medium past said recording means at a certain speed, means conditioning said recording means to record data representations on the said first tape storage medium as it is fed, a second tape storage medium having data representations recorded thereon, reading means, second means energized to feed said second tape storage medium past said reading means at a certain speed, means conditioning said reading means to read data representations from said second tape storage medium as it is fed, a storage device having data representations stored therein, means controlling transfer of data from said second tape storage medium to said storage device and from said storage device to said first tape storage medium, said last named means including means to first energize said first feed means, means rendering the means conditioning the recording means inoperative for a first fixed period after said first feed means is first energized, means first energizing said second feed means during said first fixed period, means rendering the means conditioning the reading means inoperative for a second fixed period after said second feed means is first energized, means transferring data representations from said storage device to said recording means after termination of said first fixed period and prior to termination of said second fixed period, and means transferring data representations from said reading means to said storage device after said second fixed period.

12. In combination, a first tape storage medium, recording means, means energized to feed said first tape storage medium past said recording means at a certain speed, means conditioning said recording means to record data representations on the said first tape storage medium as it is fed, a second tape storage medium having data representations recorded thereon, reading means, second means energized to feed said second tape storage past said reading means at a certain speed, means conditioning said reading means to read data representations from said second tape storage medium as it is fed, a storage device for storing data representations, a signal device emitting data representations, means controlling transfer of data from said signal device to said first tape storage and from said second tape storage to said storage device, said last named means including means storing data representations emitted by said signal device in said storage device and simultaneously energizing said first feed means, means rendering the means conditioning the recording means inoperative for a first fixed period after said first feed means is first energized, means first energizing said second feed means during said first fixed period, means rendering the means conditioning the reading means inoperative for a second fixed period after said second feed means is first energized, means transferring data representations from said storage device to said recording means after termination of said first fixed period and prior to termination of said second fixed period, and means transferring data representations from said reading means to said storage device after said second fixed period.

13. In a data handling system, a storage unit having a plurality of storage registers for storing a file of information, a write tape unit, means for transferring a first file of information from a group of storage registers of said storage unit to said write tape unit, a read tape unit, means for transferring a second file of information from said read tape unit to said group of storage registers and means for controlling said transferring means to operate concurrently so that the first file of information is transferred from said group of storage registers to said write tape unit while the second file of information is concurrently transferred from said read tape unit to said group of storage registers.

14. In a data processing machine, a storage device comprised of a group of registers for storing manifestations representing data, register selecting means connected to said storage device for selecting registers in said group of registers, a first tape unit having data representations recorded thereon, first operative means to read representations from said first tape unit and store manifestations in registers selected by the selecting means, a second tape unit for recording data representations, second operative means to read manifestations from registers selected by the selecting means and record representations on said second tape unit, means controlling said first and second operative means to operate concurrently and controlling said selecting means to select identical ones of said registers whereby data representations are transferred from said first to said second tape.

15. In combination with a central processing unit which operates in accordance with a program of instructions, a storage unit having a plurality of storage registers for storing information, a write tape unit, means for transferring information from a group of storage registers of said storage unit to said write tape unit, a read tape unit, means for transferring information from said read tape unit to said group of storage registers and means operable under control of said central processing unit in accordance with an instruction of the program to control said transferring means to operate concurrently while said central processing unit is processing data.

16. In combination with a data processing machine, which produces a sequence of signals representing a sequence of instructions, a storage device, a plurality of tape units, means for decoding a first signal representing an instruction for selecting a tape unit, means responsive to said decoding means for selecting one of said plurality of tape units, means for transferring data between said storage device and the selected one of said tape units, means for decoding a second signal representing an instruction for operating said data transfer means, means responsive to said last mentioned decoding means for rendering said data transfer means effective to transfer data and means for preventing said decoding means from decoding subsequent signals during the data transfer between said storage device and the selected one of said tape units.

17. In a data handling system, a storage device, a plurality of tape units adapted to operate with said storage device, a plurality of selecting means each corresponding to one of said plurality of tape units, each of said plurality of selecting means operable to select the corresponding one of said plurality of tape units for operation with said storage device, means for emitting tape selection signals, means responsive to a first one of said tape selection signals for rendering one of said plurality of selecting means effective, said rendering means being responsive to a second one of said tape selection signals for rendering another one of said plurality of selecting means effective whereby two tape units are simultaneously selected for operation with said storage device.

18. In a data handling system, a source of data consisting of a plurality of multi-element characters wherein each element is represented by first and second signals, the first signal being indicative of the presence of a weighted value and the second signal being indicative of the absence of the weighted value, a character register having a plurality of elements each corresponding to one of said multi-elements, means for transferring data, character by character, from said source to said character register, a storage device having a plurality of storage registers, each storage register having a plurality of elements each corresponding to one of said multi-elements, a check register having a plurality of elements each corresponding to said one of multi-elements and having a first and second stable state, means sampling the output of said character register for transferring data, character by character, from said character register to successive storage registers of said storage device, means concurrently sampling the output of said character register for transferring data, character by character, to said check register so that each element is switched from one state to the other by successive ones of said first signals thereby creating a longitudinal redundancy check character after the completion of the data transfer from said character register to said check register and means sampling the output of said check register for transferring the longitudinal redundancy check character from said check register to the storage register of said storage device next succeeding that in which the last character transferred from said character register is stored whereby an even number of weighted values are longitudinally stored in each row of elements of the plurality of storage registers of said storage device having characters stored therein.

19. A data handling system as recited in claim 18 wherein said first mentioned sampling means includes means for sensing each character, character by character, to provide an indication when the number of first signals which are present in any character bears a predetermined relation to the number of second signals which are present in any character.

20. In a data handling system, a source of data consisting of a plurality of multi-element characters wherein each element is represented by first and second signals, the first signal being indicative of the presence of a weighted value and the second signal being indicative of the absence of the weighted value, a character register having a plurality of elements each corresponding to one of said multi-elements, means for transferring data, character by character, from said source to said character register, a tape unit, recording means for recording data in said tape unit, means sampling the output of said character reigster for transferring data, character by character, from said character register to said recording means, means associated with said recording means for simultaneously transferring data, character by character, to said character register, corresponding to the data recorded in said tape unit, for resetting said character register and means coupled to said character register and adapted to provide an error indication whenever said character register is not reset due to a difference between the character in said character register and the character recorded in said tape unit.

21. In a data handling system, a storage device having a plurality of storage registers, each storage register having a plurality of elements for storing a multi-element character wherein each element of said storage register corresponds to one of said multi-elements and each element of said storage register is adapted to provide first and second output signals, the first signal being indicative of the presence of a weighted value and the second signal being indicative of the absence of the weighted value, a character register having a plurality of elements each corresponding to one of said multi-elements, means for transferring data, character by character, from successive storage registers of said storage device to said character register, a moving magnetizable member, recording means for recording data on said magnetizable member, means sampling the output of said character register for transferring data, character by character, from said character register to said recording means, means associated with said recording means for simultaneously transferring data, character by character, to said character register corresponding to the data recorded on said magnetizable member for resetting said character register and means coupled to said character register and adapted to provide an error indication whenever said character register is not reset due to a difference between the character in said character register and the character recorded on said magnetizable member.

22. In a data handling system, a source of data consisting of a plurality of multi-element characters wherein each element is represented by first and second signals, the first signal being indicative of the presence of a weighted value and the second signal being indicative of the absence of the weighted value, a character register having a plurality of elements each corresponding to one of said multi-elements, means for transferring data, character by character, from said source to said character register, means sensing the output of said character register, character by character, to provide an indication when the number of first signals which are present in any character bears a predetermined relation to the number of second signals which are present in any character, a tape unit, recording means for recording data in said tape unit, means sampling the output of said character register for transferring data, character by character, from said character register to said recording means, means associated with said recording means for simultaneously transferring data, character by character, to said character register, corresponding to the data recorded in said tape unit, for resetting said character register and means coupled to said character register and adapted to provide an error indication whenever said character register is not reset due to a difference between the character in said character register and the character recorded in said tape unit.

23. In a data handling system, a source of data consisting of a plurality of multi-element characters wherein each element is represented by first and second signals, the first signal being indicative of the presence of a weighted value and the second signal being indicative of the absence of the weighted value, said source emitting a group of data consisting of a plurality of characters followed by a longitudinal redundancy check character, a character register having a plurality of elements each corresponding to one of said multi-elements, means for transferring said group of data, character by character, from said source to said character register, a tape unit, recording means for recording data in said tape unit, means sampling the output of said character register for transferring said plurality of characters, character by character, from said character register to said recording means, means rendering said sampling means ineffective to transfer said longitudinal redundancy character to said recording means, means effective after the completion of the data transfer from said character register to said tape unit, for rendering said recording means operable to record a longitudinal redundancy check character in said tape unit, means associated with said recording means for simultaneously transferring a character, corresponding to said recorded longitudinal redundancy check character to reset said character register and means coupled to said character register and adapted to provide an error indication if said character register is not reset due to a difference between the longitudinal redundancy check character first transferred thereto and the longitudinal redundancy character recorded in said tape unit.

24. In a data handling system, data consisting of a plurality of multi-element characters including a longitudinal rendundancy check character at the end thereof wherein each element is represented by first and second signals, the first signal being indicative of the presence of a weighted value and the second signal being indicative of the absence of the weighted value, a character register having a plurality of elements each corresponding to one of said multi-elements, means for transferring said data, character by character, from said reading means to said character register a storage device having a plurality of storage registers, each storage register having a plurality of elements each corresponding to one of said multi-elements, means sampling the output of said character register for transferring data, character by character, from said character register to successive storage registers of said storage device whereby an even number of weighted values are longitudinally stored in each row of elements of the plurality of storage registers of said storage device having characters stored therein.

25. In a data handling system, data consisting of a group of multi-element characters and a longitudinal redundancy check character at the end thereof wherein each element is represented by first and second signals, the first signal being indicative of the presence of a weighted value and the second signal being indicative of the absence of the weighted value, a character register having a plurality of elements each corresponding to one of said multi-elements, means for transferring said data, character by character, from said reading means to said character register, a check register having a plurality of elements each corresponding to one of said multi-elements and having a first and second stable state, means sampling the output of said character register for transferring said group of characters, character by character, from said character register to said check register so that each element is switched from one state to the other by successive ones of said first signals thereby creating a longitudinal redundancy check character said sampling means being effective thereafter for sampling the output of said character register to transfer the longitudinal redundancy check character read from said magnetizable member to said check register and means coupled to said check register to provide an error indication if the created longitudinal redundancy check character differs from the longitudinal redundancy check character read from said magnetizable member.

26. In a data handling system, data consisting of a group of multi-element characters and a longitudinal redundancy check character at the end thereof wherein each element is represented by first and second signals, the first signal being indicative of the presence of a weighted value and the second signal being indicative of the absence of the weighted value, a character register having a plurality of elements each corresponding to one of said multi-elements, means for transferring said data, character by character, from said reading means to said character register, a storage device having a plurality of storage registers, each storage register having a plurality of elements each corresponding to one of said multi-elements, a check register having a plurality of elements each corresponding to one of said multi-elements and having a first and second stable state, means sampling the output of said character register for transferring said data, character by character, from said character register to successive storage registers of said storage device so that an even number of weighted values are longitudinally stored in each row of elements of the plurality of storage registers of said storage device having characters stored therein, means concurrently sampling the output of said character register for transferring said group of characters, character by character, to said check register so that each element is switched from one state to the other by successive one of said first signals thereby creating a longitudinal redundancy check character said concurrent sampling means being effective thereafter for sampling the output of said character register to transfer the longitudinal redundancy check character read from said magnetizable member to said check register and means coupled to said check register to provide an error indication if the created longitudinal redundancy check character differs from the longitudinal redundancy check character read from said magnetizable member.

27. A data handling system as recited in claim 25 wherein said sampling means includes means for sensing each character, character by character, to provide an indication when the number of first signals which are present in any character bears a predetermined relation to the number of second signals which are present in any character.

28. In a data handling system, a source of data consisting of a plurality of multi-element characters wherein each element is represented by first and second signals, the first signal being indicative of the presence of a weighted value and the second signal being indicative of the absence of the weighted value, a first character register having a plurality of elements each corresponding to one of said multi-elements, means for transferring data, character by character, from said source to said first character register, a storage device having a plurality of storage registers, each storage register having a plurality of elements each corresponding to one of said multi-elements, a check register having a plurality of elements each corresponding to one of said multi-elements and having a first and second stable state, means sampling the output of said character register for transferring data, character by character, from said character register to successive storage registers of said storage device, means concurrently sampling the output of said character register for transferring data, character by character, to said check register so that each element is switched from one state to the other by successive ones of said first signals thereby creating a longitudinal redundancy check character after the completion of the data transfer from said character register to said check register, means sampling the output of said check register for transferring the created longitudinal redundancy check character from said check register to the storage register of said storage device next succeeding that in which the last character transferred from said character register is stored whereby an even number of weighted values are longitudinally stored in each row of elements of the plurality of storage registers of said storage device having characters stored therein, a second character register having a plurality of elements each corresponding to one of said multi-elements, means thereafter effective for transferring data successively, character by character from the storage registers of said storage device to said second character register, a movable magnetizable member, recording means for recording data on said magnetizable member, means sampling the output of said second character register for transferring data, character by character, from said second character register to said recording means, means associated with said recording means for simultaneously transferring data, character by character, to said second character register corresponding to the data recorded on said magnetizable member for resetting said character register, means coupled to said second character register and adapted to provide an error indication whenever said character register is not reset due to a difference between the character in said second character register and the character recorded on said magnetizable member, means rendering said last mentioned sampling means ineffective to transfer said previously created longitudinal redundancy check character to said recording means, means effective, after the completion of the data transfer from said second character register to said magnetizable member, for rendering said recording means operable to record a longitudinal check character on said magnetizable member, said last mentioned transferring means being simultaneously effective to transfer a character, corresponding to the longitudinal redundancy check character recorded on said magnetizable member, to said second character register whereby said error indication means provides an indication if the previously created longitudinal redundancy check character differs from the longitudinal redundancy check character recorded on said magnetizable member.

29. A data handling system as recited in claim 28 wherein each of said means sampling the outputs of said character registers includes means for sensing each character, character by character, to provide an indication when the number of first signals which are present in any character bears a predetermined relation to the number of second signals which are present in any character.

References Cited in the file of this patent

UNITED STATES PATENTS

| | | |
|---|---|---|
| 2,521,623 | Arndt et al. | Sept. 5, 1950 |
| 2,645,764 | McWhirter | July 14, 1953 |
| 2,667,533 | Zenner | Jan. 26, 1954 |
| 2,700,067 | Lockemann | Jan. 18, 1955 |
| 2,702,380 | Brustman | Feb. 15, 1955 |
| 2,721,990 | McNaney | Oct. 25, 1955 |
| 2,826,752 | Hendricks | Mar. 11, 1958 |

OTHER REFERENCES

Publication: Faster, Faster; W. J. Eckert and Rebecca Jones; McGraw-Hill Book Co. Copyright 1955.

Notice of Adverse Decision in Interference

In Interference No. 93,305 involving Patent No. 2,960,683, R. A. Gregory, C. T. Baker, Jr., W. Wolensky, P. W. Jackson, W. D. Winger, and R. W. Murphy, DATA COORDINATOR, final judgment adverse to the patentees was rendered Nov. 28, 1966, as to claims 1, 2, 3, 4, 5, 9 and 10.

[*Official Gazette January 31, 1967.*]